US010492102B2

(12) United States Patent
Raleigh et al.

(10) Patent No.: US 10,492,102 B2
(45) **Date of Patent: *Nov. 26, 2019**

(54) INTERMEDIATE NETWORKING DEVICES

(71) Applicant: Headwater Partners I LLC, Tyler, TX (US)

(72) Inventors: Gregory G. Raleigh, Woodside, CA (US); Vien-Phuong Nguyen, Newark, CA (US); Lisa Stark, Santa Cruz, CA (US); Jose Tellado, Mountain View, CA (US)

(73) Assignee: HEADWATER RESEARCH LLC, Tyler, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/158,526

(22) Filed: May 18, 2016

(65) Prior Publication Data

US 2017/0078922 A1 Mar. 16, 2017

Related U.S. Application Data

(63) Continuation of application No. 14/098,523, filed on Dec. 5, 2013, now Pat. No. 9,351,193, which is a (Continued)

(51) Int. Cl.

*H04L 12/28* (2006.01)
*H04W 28/10* (2009.01)

(Continued)

(52) U.S. Cl.

CPC ........... *H04W 28/10* (2013.01); *H04W 28/02* (2013.01); *H04W 80/04* (2013.01); *H04W 84/12* (2013.01); *H04W 88/06* (2013.01)

(58) Field of Classification Search

CPC .................................................... H04W 28/10

See application file for complete search history.

(56) References Cited

U.S. PATENT DOCUMENTS 5,131,020 A 7/1992 Liebesny et al.
5,283,904 A 2/1994 Carson et al.

(Continued)

FOREIGN PATENT DOCUMENTS

CA 2688553 12/2008
CN 1310401 A 2/2000

(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.

(Continued)

*Primary Examiner* — Guang W Li
(74) *Attorney, Agent, or Firm* — James E. Harris

(57) ABSTRACT

A wireless communication device comprising: one or more network modems enabling the wireless communication device to communicate over a first wireless network; one or more network modems enabling the wireless communication device to communicate with two or more end-point devices over a second wireless network; one or more processors configured to execute one or more instructions; and memory coupled to the one or more processors and configured to provide the one or more processors with the one or more instructions. The one or more instructions, when executed by the processors, cause processors to: establish a first connection between the wireless communication device and a first end-point device; establish a second connection between the wireless communication device and a second end-point device; apply a first control to traffic transmitted by or to the first end-point device; and apply a second (Continued)

control to traffic transmitted by or to the second end-point device.

1 Claim, 143 Drawing Sheets

Related U.S. Application Data continuation-in-part of application No. 13/239,321, filed on Sep. 21, 2011, now Pat. No. 8,898,293, and a continuation-in-part of application No. 13/247,998, filed on Sep. 28, 2011, now Pat. No. 8,725,123, and a continuation-in-part of application No. 13/309,463, filed on Dec. 1, 2011, now Pat. No. 8,793,758, and a continuation-in-part of application No. 13/309,556, filed on Dec. 1, 2011, now Pat. No. 8,893,009, and a continuation-in-part of application No. 13/656,620, filed on Oct. 19, 2012, now Pat. No. 8,630,617, and a continuation-in-part of application No. 13/674,808, filed on Nov. 12, 2012, now Pat. No. 8,634,821, and a continuation-in-part of application No. 13/718,936, filed on Dec. 18, 2012, now Pat. No. 8,630,630, said application No. 13/239,321 is a continuation-in-part of application No. 13/237,827, filed on Sep. 20, 2011, now Pat. No. 8,832,777, said application No. 13/247,998 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, said application No. 13/309,463 is a continuation-in-part of application No. 13/134,028, filed on May 25, 2011, now Pat. No. 8,589,541, and a continuation-in-part of application No. 13/237,827, and a continuation-in-part of application No. 13/253,013, filed on Oct. 4, 2011, now Pat. No. 8,745,191, said application No. 13/309,556 is a continuation-in-part of application No. 13/134,028, said application No. 13/656,620 is a continuation of application No. 12/694,451, filed on Jan. 27, 2010, now Pat. No. 8,548,428, said application No. 13/674,808 is a continuation of application No. 12/694,445, filed on Jan. 27, 2010, now Pat. No. 8,391,834, said application No. 13/718,936 is a continuation of application No. 12/695,980, filed on Jan. 28, 2010, now Pat. No. 8,340,634, said application No. 13/237,827 is a continuation-in-part of application No. 12/380,780, and a continuation-in-part of application No. 12/695,019, filed on Jan. 27, 2010, now Pat. No. 8,275,830, said application No. 13/134,028 is a continuation-in-part of application No. 12/695,021, filed on Jan. 27, 2010, now Pat. No. 8,346,225, and a continuation-in-part of application No. 13/134,005, filed on May 25, 2011, now Pat. No. 8,635,335, said application No. 12/695,980 is a continuation-in-part of application No. 12/695,019, and a continuation-in-part of application No. 12/695,021, said application No. 13/253,013 is a continuation-in-part of application No. 12/695,020, filed on Jan. 27, 2010, now Pat. No. 8,406,748, and a continuation of application No. 12/694,455, filed on Jan. 27, 2010, now Pat. No. 8,402,111, said application No. 15/695,020 is a continuation-in-part of application No. 12/380,780.

(60) Provisional application No. 61/758,694, filed on Jan. 30, 2013, provisional application No. 61/756,332, filed on Jan. 24, 2013, provisional application No. 61/734,288, filed on Dec. 6, 2012, provisional application No. 61/550,906, filed on Oct. 24, 2011, provisional application No. 61/472,606, filed on Apr. 6, 2011, provisional application No. 61/435,564, filed on Jan. 24, 2011, provisional application No. 61/422,565, filed on Dec. 13, 2010, provisional application No. 61/422,574, filed on Dec. 13, 2010, provisional application No. 61/422,572, filed on Dec. 13, 2010, provisional application No. 61/420,727, filed on Dec. 7, 2010, provisional application No. 61/418,507, filed on Dec. 1, 2010, provisional application No. 61/418,509, filed on Dec. 1, 2010, provisional application No. 61/407,358, filed on Oct. 27, 2010, provisional application No. 61/389,547, filed on Oct. 4, 2010, provisional application No. 61/387,243, filed on Sep. 28, 2010, provisional application No. 61/387,247, filed on Sep. 28, 2010, provisional application No. 61/385,020, filed on Sep. 21, 2010, provisional application No. 61/384,456, filed on Sep. 20, 2010, provisional application No. 61/381,159, filed on Sep. 9, 2010, provisional application No. 61/381,162, filed on Sep. 9, 2010, provisional application No. 61/348,022, filed on May 25, 2010, provisional application No. 61/264,126, filed on Nov. 24, 2009, provisional application No. 61/264,120, filed on Nov. 24, 2009, provisional application No. 61/252,151, filed on Oct. 15, 2009, provisional application No. 61/252,153, filed on Oct. 15, 2009, provisional application No. 61/237,753, filed on Aug. 28, 2009, provisional application No. 61/275,208, filed on Aug. 25, 2009, provisional application No. 61/270,353, filed on Jul. 6, 2009, provisional application No. 61/207,739, filed on Feb. 13, 2009, provisional application No. 61/207,393, filed on Feb. 10, 2009, provisional application No. 61/206,944, filed on Feb. 4, 2009, provisional application No. 61/206,354, filed on Jan. 28, 2009.

(51) Int. Cl.

| | |
|---|---|
| ***H04W 28/02*** | (2009.01) |
| *H04W 84/12* | (2009.01) |
| *H04W 88/06* | (2009.01) |
| *H04W 80/04* | (2009.01) |

(56) References Cited

U.S. PATENT DOCUMENTS

| | | | |
|---|---|---|---|
| 5,325,532 | A | 6/1994 | Crosswy et al. |
| 5,572,528 | A | 11/1996 | Shuen |
| 5,577,100 | A | 11/1996 | McGregor et al. |
| 5,594,777 | A | 1/1997 | Makkonen et al. |
| 5,617,539 | A | 4/1997 | Ludwig et al. |
| 5,630,159 | A | 5/1997 | Zancho |
| 5,633,484 | A | 5/1997 | Zancho et al. |
| 5,633,868 | A | 5/1997 | Baldwin et al. |
| 5,754,953 | A | 5/1998 | Briancon et al. |
| 5,774,532 | A | 6/1998 | Gottlieb et al. |
| 5,794,142 | A | 8/1998 | Vanttila et al. |
| 5,814,798 | A | 9/1998 | Zancho |
| 5,889,477 | A | 3/1999 | Fastenrath |
| 5,892,900 | A | 4/1999 | Ginter et al. |
| 5,903,845 | A | 5/1999 | Buhrmann et al. |
| 5,915,008 | A | 6/1999 | Dulman |
| 5,915,226 | A | 6/1999 | Martineau |
| 5,933,778 | A | 8/1999 | Buhrmann et al. |
| 5,940,472 | A | 8/1999 | Newman et al. |
| 5,974,439 | A | 10/1999 | Bollella |
| 5,983,270 | A | 11/1999 | Abraham et al. |

(56) References Cited

U.S. PATENT DOCUMENTS 6,035,281 A 3/2000 Crosskey et al.
6,038,452 A 3/2000 Strawczynski et al.
6,038,540 A 3/2000 Krist et al.
6,047,268 A 4/2000 Bartoli et al.
6,058,434 A 5/2000 Wilt et al.
6,061,571 A 5/2000 Tamura
6,064,878 A 5/2000 Denker et al.
6,078,953 A 6/2000 Vaid et al.
6,081,591 A 6/2000 Skoog
6,098,878 A 8/2000 Dent et al.
6,104,700 A 8/2000 Haddock et al.
6,115,823 A 9/2000 Velasco et al.
6,119,933 A 9/2000 Wong et al.
6,125,391 A 9/2000 Meltzer et al.
6,141,565 A 10/2000 Feuerstein et al.
6,141,686 A 10/2000 Jackowski et al.
6,148,336 A 11/2000 Thomas et al.
6,154,738 A 11/2000 Call
6,157,636 A 12/2000 Voit et al.
6,185,576 B1 2/2001 McIntosh
6,198,915 B1 3/2001 McGregor et al.
6,219,786 B1 4/2001 Cunningham et al.
6,226,277 B1 5/2001 Chuah
6,246,870 B1 6/2001 Dent et al.
6,263,055 B1 7/2001 Garland et al.
6,292,828 B1 9/2001 Williams
6,317,584 B1 11/2001 Abu-Amara et al.
6,370,139 B2 4/2002 Redmond
6,381,316 B2 4/2002 Joyce et al.
6,393,014 B1 5/2002 Daly et al.
6,397,259 B1 5/2002 Lincke et al.
6,401,113 B2 6/2002 Lazaridis et al.
6,418,147 B1 7/2002 Wiedeman
6,438,575 B1 8/2002 Khan et al.
6,445,777 B1 9/2002 Clark
6,449,479 B1 9/2002 Sanchez
6,466,984 B1 10/2002 Naveh et al.
6,477,670 B1 11/2002 Ahmadvand
6,502,131 B1 12/2002 Vaid et al.
6,505,114 B2 1/2003 Luciani
6,510,152 B1 1/2003 Gerszberg et al.
6,522,629 B1 2/2003 Anderson, Sr.
6,532,235 B1 3/2003 Benson et al.
6,532,579 B2 3/2003 Sato et al.
6,535,855 B1 3/2003 Cahill et al.
6,535,949 B1 3/2003 Parker
6,539,082 B1 3/2003 Lowe et al.
6,542,500 B1 4/2003 Gerszberg et al.
6,542,992 B1 4/2003 Peirce et al.
6,546,016 B1 4/2003 Gerszberg et al.
6,563,806 B1 5/2003 Yano et al.
6,570,974 B1 5/2003 Gerszberg et al.
6,574,321 B1 6/2003 Cox et al.
6,574,465 B2 6/2003 Marsh et al.
6,578,076 B1 6/2003 Putzolu
6,581,092 B1 6/2003 Motoyama
6,591,098 B1 7/2003 Shieh et al.
6,598,034 B1 7/2003 Kloth
6,601,040 B1 7/2003 Kolls
6,603,969 B1 8/2003 Vuoristo et al.
6,603,975 B1 8/2003 Inouchi et al.
6,606,744 B1 8/2003 Mikurak
6,628,934 B2 9/2003 Rosenberg et al.
6,631,122 B1 10/2003 Arunachalam et al.
6,636,721 B2 10/2003 Threadgill et al.
6,639,975 B1 10/2003 O'Neal et al.
6,640,097 B2 10/2003 Corrigan et al.
6,640,334 B1 10/2003 Rasmussen
6,650,887 B2 11/2003 McGregor et al.
6,651,101 B1 11/2003 Gai et al.
6,654,786 B1 11/2003 Fox et al.
6,654,814 B1 11/2003 Britton et al.
6,658,254 B1 12/2003 Purdy et al.
6,662,014 B1 12/2003 Walsh
6,678,516 B2 1/2004 Nordman et al.
6,683,853 B1 1/2004 Kannas et al.
6,684,244 B1 1/2004 Goldman et al.
6,690,918 B2 2/2004 Evans et al.
6,697,821 B2 2/2004 Ziff et al.
6,725,031 B2 4/2004 Watler et al.
6,725,256 B1 4/2004 Albal et al.
6,732,176 B1 5/2004 Stewart et al.
6,735,206 B1 5/2004 Oki et al.
6,748,195 B1 6/2004 Phillips
6,748,437 B1 6/2004 Mankude et al.
6,751,296 B1 6/2004 Albal et al.
6,754,470 B2 6/2004 Hendrickson et al.
6,757,717 B1 6/2004 Goldstein
6,760,417 B1 7/2004 Wallenius
6,763,000 B1 7/2004 Walsh
6,763,226 B1 7/2004 McZeal, Jr.
6,765,864 B1 7/2004 Natarajan et al.
6,765,925 B1 7/2004 Sawyer et al.
6,782,412 B2 8/2004 Brophy et al.
6,785,889 B1 8/2004 Williams
6,792,461 B1 9/2004 Hericourt
6,829,596 B1 12/2004 Frazee
6,829,696 B1 12/2004 Balmer et al.
6,839,340 B1 1/2005 Voit et al.
6,842,628 B1 1/2005 Arnold et al.
6,873,988 B2 3/2005 Hermann et al.
6,876,653 B2 4/2005 Ambe et al.
6,879,825 B1 4/2005 Daly
6,882,718 B1 4/2005 Smith
6,885,997 B1 4/2005 Roberts
6,901,440 B1 5/2005 Bimm et al.
6,920,455 B1 7/2005 Weschler
6,922,562 B2 7/2005 Ward et al.
6,928,280 B1 8/2005 Xanthos et al.
6,934,249 B1 8/2005 Bertin et al.
6,934,751 B2 8/2005 Jayapalan et al.
6,947,723 B1 9/2005 Gurnani et al.
6,947,985 B2 9/2005 Hegli et al.
6,952,428 B1 10/2005 Necka et al.
6,957,067 B1 10/2005 Iyer et al.
6,959,202 B2 10/2005 Heinonen et al.
6,959,393 B2 10/2005 Hollis et al.
6,965,667 B2 11/2005 Trabandt et al.
6,965,872 B1 11/2005 Grdina
6,967,958 B2 11/2005 Ono et al.
6,970,692 B2 11/2005 Tysor
6,970,927 B1 11/2005 Stewart et al.
6,982,733 B1 1/2006 McNally et al.
6,983,370 B2 1/2006 Eaton et al.
6,996,062 B1 2/2006 Freed et al.
6,996,076 B1 2/2006 Forbes et al.
6,996,393 B2 2/2006 Pyhalammi et al.
6,998,985 B2 2/2006 Reisman et al.
7,002,920 B1 2/2006 Ayyagari et al.
7,007,295 B1 2/2006 Rose et al.
7,013,469 B2 3/2006 Smith et al.
7,017,189 B1 3/2006 DeMello et al.
7,024,200 B2 4/2006 McKenna et al.
7,024,460 B2 4/2006 Koopmas et al.
7,027,055 B2 4/2006 Anderson et al.
7,027,408 B2 4/2006 Nabkel et al.
7,031,733 B2 4/2006 Alminana et al.
7,032,072 B1 4/2006 Quinn et al.
7,039,027 B2 5/2006 Bridgelall
7,039,037 B2 5/2006 Wang et al.
7,039,403 B2 5/2006 Wong
7,039,713 B1 5/2006 Van Gunter et al.
7,042,988 B2 5/2006 Juitt et al.
7,043,225 B1 5/2006 Patel et al.
7,043,226 B2 5/2006 Yamauchi
7,043,268 B2 5/2006 Yukie et al.
7,047,276 B2 5/2006 Liu et al.
7,058,022 B1 6/2006 Carolan et al.
7,058,968 B2 6/2006 Rowland et al.
7,068,600 B2 6/2006 Cain
7,069,248 B2 6/2006 Huber
7,082,422 B1 7/2006 Zirngibl et al.
7,084,775 B1 8/2006 Smith
7,092,696 B1 8/2006 Hosain et al.

(56) References Cited

U.S. PATENT DOCUMENTS

| | | | |
|---|---|---|---|
| 7,095,754 | B2 | 8/2006 | Benveniste |
| 7,102,620 | B2 | 9/2006 | Harries et al. |
| 7,110,753 | B2 | 9/2006 | Campen |
| 7,113,780 | B2 | 9/2006 | McKenna et al. |
| 7,113,997 | B2 | 9/2006 | Jayapalan et al. |
| 7,120,133 | B1 | 10/2006 | Joo et al. |
| 7,133,386 | B2 | 11/2006 | Holur et al. |
| 7,133,695 | B2 | 11/2006 | Beyda |
| 7,136,361 | B2 | 11/2006 | Benveniste |
| 7,139,569 | B2 | 11/2006 | Kato |
| 7,142,876 | B2 | 11/2006 | Trossen et al. |
| 7,149,229 | B1 | 12/2006 | Leung |
| 7,149,521 | B2 | 12/2006 | Sundar et al. |
| 7,151,764 | B1 | 12/2006 | Heinonen et al. |
| 7,158,792 | B1 | 1/2007 | Cook et al. |
| 7,162,237 | B1 | 1/2007 | Silver et al. |
| 7,165,040 | B2 | 1/2007 | Ehrman et al. |
| 7,167,078 | B2 | 1/2007 | Pourchot |
| 7,174,156 | B1 | 2/2007 | Mangal |
| 7,174,174 | B2 | 2/2007 | Boris et al. |
| 7,177,919 | B1 | 2/2007 | Truong et al. |
| 7,180,855 | B1 | 2/2007 | Lin |
| 7,181,017 | B1 | 2/2007 | Nagel et al. |
| 7,191,248 | B2 | 3/2007 | Chattopadhyay et al. |
| 7,197,321 | B2 | 3/2007 | Erskine et al. |
| 7,200,112 | B2 | 4/2007 | Sundar et al. |
| 7,200,551 | B1 | 4/2007 | Senez |
| 7,203,169 | B1 | 4/2007 | Okholm et al. |
| 7,203,721 | B1 | 4/2007 | Ben-Efraim et al. |
| 7,203,752 | B2 | 4/2007 | Rice et al. |
| 7,212,491 | B2 | 5/2007 | Koga |
| 7,219,123 | B1 | 5/2007 | Fiechter et al. |
| 7,222,190 | B2 | 5/2007 | Klinker et al. |
| 7,222,304 | B2 | 5/2007 | Beaton et al. |
| 7,224,968 | B2 | 5/2007 | Dobson et al. |
| 7,228,354 | B2 | 6/2007 | Chambliss et al. |
| 7,236,780 | B2 | 6/2007 | Benco |
| 7,242,668 | B2 | 7/2007 | Kan et al. |
| 7,242,920 | B2 | 7/2007 | Morris |
| 7,245,901 | B2 | 7/2007 | McGregor et al. |
| 7,248,570 | B2 | 7/2007 | Bahl et al. |
| 7,251,218 | B2 | 7/2007 | Jorgensen |
| 7,260,382 | B1 | 8/2007 | Lamb et al. |
| 7,266,371 | B1 | 9/2007 | Amin et al. |
| 7,269,157 | B2 | 9/2007 | Klinker et al. |
| 7,271,765 | B2 | 9/2007 | Stilp et al. |
| 7,272,660 | B1 | 9/2007 | Powers et al. |
| 7,280,816 | B2 | 10/2007 | Fratti et al. |
| 7,280,818 | B2 | 10/2007 | Clayton |
| 7,283,561 | B1 | 10/2007 | Picher-Dempsey |
| 7,283,963 | B1 | 10/2007 | Fitzpatrick et al. |
| 7,286,834 | B2 | 10/2007 | Walter |
| 7,286,848 | B2 | 10/2007 | Vireday et al. |
| 7,289,489 | B1 | 10/2007 | Kung et al. |
| 7,290,283 | B2 | 10/2007 | Copeland, III |
| 7,310,424 | B2 | 12/2007 | Gehring et al. |
| 7,313,237 | B2 | 12/2007 | Bahl et al. |
| 7,315,892 | B2 | 1/2008 | Freimuth et al. |
| 7,317,699 | B2 | 1/2008 | Godfrey et al. |
| 7,318,111 | B2 | 1/2008 | Zhao |
| 7,320,029 | B2 | 1/2008 | Rinne et al. |
| 7,322,044 | B2 | 1/2008 | Hrastar |
| 7,324,447 | B1 | 1/2008 | Morford |
| 7,325,037 | B2 | 1/2008 | Lawson |
| 7,336,960 | B2 | 2/2008 | Zavalkovsky et al. |
| 7,340,772 | B2 | 3/2008 | Panasyuk et al. |
| 7,346,410 | B2 | 3/2008 | Uchiyama |
| 7,349,695 | B2 | 3/2008 | Oommen et al. |
| 7,353,533 | B2 | 4/2008 | Wright et al. |
| 7,356,011 | B1 | 4/2008 | Waters et al. |
| 7,356,337 | B2 | 4/2008 | Florence |
| 7,366,497 | B2 | 4/2008 | Nagata |
| 7,366,654 | B2 | 4/2008 | Moore |
| 7,369,848 | B2 | 5/2008 | Jiang |
| 7,369,856 | B2 | 5/2008 | Ovadia |
| 7,373,136 | B2 | 5/2008 | Watler et al. |
| 7,373,179 | B2 | 5/2008 | Stine et al. |
| 7,379,731 | B2 | 5/2008 | Natsuno et al. |
| 7,388,950 | B2 | 6/2008 | Elsey et al. |
| 7,389,412 | B2 | 6/2008 | Sharma et al. |
| 7,391,724 | B2 | 6/2008 | Alakoski et al. |
| 7,395,244 | B1 | 7/2008 | Kingsford |
| 7,401,338 | B1 | 7/2008 | Bowen et al. |
| 7,403,763 | B2 | 7/2008 | Maes |
| 7,409,447 | B1 | 8/2008 | Assadzadeh |
| 7,409,569 | B2 | 8/2008 | Illowsky et al. |
| 7,411,930 | B2 | 8/2008 | Montojo et al. |
| 7,418,253 | B2 | 8/2008 | Kavanah |
| 7,418,257 | B2 | 8/2008 | Kim |
| 7,421,004 | B2 | 9/2008 | Feher |
| 7,423,971 | B1 | 9/2008 | Mohaban et al. |
| 7,428,750 | B1 | 9/2008 | Dunn et al. |
| 7,433,362 | B2 | 10/2008 | Mallya et al. |
| 7,440,433 | B2 | 10/2008 | Rink et al. |
| 7,444,669 | B1 | 10/2008 | Bahl et al. |
| 7,450,591 | B2 | 11/2008 | Korling et al. |
| 7,450,927 | B1 | 11/2008 | Creswell et al. |
| 7,454,191 | B2 | 11/2008 | Dawson et al. |
| 7,457,265 | B2 | 11/2008 | Julka et al. |
| 7,457,870 | B1 | 11/2008 | Lownsbrough et al. |
| 7,460,837 | B2 | 12/2008 | Diener |
| 7,466,652 | B2 | 12/2008 | Lau et al. |
| 7,467,160 | B2 | 12/2008 | McIntyre |
| 7,472,189 | B2 | 12/2008 | Mallya et al. |
| 7,478,420 | B2 | 1/2009 | Wright et al. |
| 7,486,185 | B2 | 2/2009 | Culpepper et al. |
| 7,486,658 | B2 | 2/2009 | Kumar |
| 7,493,659 | B1 | 2/2009 | Wu et al. |
| 7,496,652 | B2 | 2/2009 | Pezzutti |
| 7,499,438 | B2 | 3/2009 | Hinman et al. |
| 7,499,537 | B2 | 3/2009 | Elsey et al. |
| 7,502,672 | B1 | 3/2009 | Kolls |
| 7,505,756 | B2 | 3/2009 | Bahl |
| 7,505,795 | B1 | 3/2009 | Lim et al. |
| 7,508,799 | B2 | 3/2009 | Sumner et al. |
| 7,512,128 | B2 | 3/2009 | DiMambro et al. |
| 7,512,131 | B2 | 3/2009 | Svensson et al. |
| 7,515,608 | B2 | 4/2009 | Yuan et al. |
| 7,515,926 | B2 | 4/2009 | Bu et al. |
| 7,516,219 | B2 | 4/2009 | Moghaddam et al. |
| 7,522,549 | B2 | 4/2009 | Karaoguz et al. |
| 7,522,576 | B2 | 4/2009 | Du et al. |
| 7,526,541 | B2 | 4/2009 | Roese et al. |
| 7,529,204 | B2 | 5/2009 | Bourlas et al. |
| 7,535,880 | B1 | 5/2009 | Hinman et al. |
| 7,536,695 | B2 | 5/2009 | Alam et al. |
| 7,539,132 | B2 | 5/2009 | Werner et al. |
| 7,539,862 | B2 | 5/2009 | Edgett et al. |
| 7,540,408 | B2 | 6/2009 | Levine et al. |
| 7,545,782 | B2 | 6/2009 | Rayment et al. |
| 7,546,460 | B2 | 6/2009 | Maes |
| 7,546,629 | B2 | 6/2009 | Albert et al. |
| 7,548,875 | B2 | 6/2009 | Mikkelsen et al. |
| 7,548,976 | B2 | 6/2009 | Bahl et al. |
| 7,551,921 | B2 | 6/2009 | Petermann |
| 7,551,922 | B2 | 6/2009 | Roskowski et al. |
| 7,554,983 | B1 | 6/2009 | Muppala |
| 7,555,757 | B2 | 6/2009 | Smith et al. |
| 7,561,899 | B2 | 7/2009 | Lee |
| 7,562,213 | B1 | 7/2009 | Timms |
| 7,564,799 | B2 | 7/2009 | Holland et al. |
| 7,565,141 | B2 | 7/2009 | Macaluso |
| 7,574,509 | B2 | 8/2009 | Nixon et al. |
| 7,574,731 | B2 | 8/2009 | Fascenda |
| 7,577,431 | B2 | 8/2009 | Jiang |
| 7,580,356 | B1 | 8/2009 | Mishra et al. |
| 7,580,857 | B2 | 8/2009 | VanFleet et al. |
| 7,583,964 | B2 | 9/2009 | Wong |
| 7,584,298 | B2 | 9/2009 | Klinker et al. |
| 7,586,871 | B2 | 9/2009 | Hamilton et al. |
| 7,593,417 | B2 | 9/2009 | Wang et al. |
| 7,593,730 | B2 | 9/2009 | Khandelwal et al. |
| 7,599,288 | B2 | 10/2009 | Cole et al. |
| 7,599,714 | B2 | 10/2009 | Kuzminskiy |

(56) References Cited

U.S. PATENT DOCUMENTS 7,602,746 B2 10/2009 Calhoun et al.
7,606,918 B2 10/2009 Holzman et al.
7,607,041 B2 10/2009 Kraemer et al.
7,609,650 B2 10/2009 Roskowski et al.
7,609,700 B1 10/2009 Ying et al.
7,610,047 B2 10/2009 Hicks, III et al.
7,610,057 B2 10/2009 Bahl et al.
7,610,328 B2 10/2009 Haase et al.
7,610,396 B2 10/2009 Taglienti et al.
7,614,051 B2 11/2009 Glaum et al.
7,617,516 B2 11/2009 Huslak et al.
7,620,041 B2 11/2009 Dunn et al.
7,620,065 B2 11/2009 Falardeau
7,620,162 B2 11/2009 Aaron et al.
7,620,383 B2 11/2009 Taglienti et al.
7,627,314 B2 12/2009 Carlson et al.
7,627,600 B2 12/2009 Citron et al.
7,627,767 B2 12/2009 Sherman et al.
7,627,872 B2 12/2009 Hebeler et al.
7,633,438 B2 12/2009 Tysowski
7,634,388 B2 12/2009 Archer et al.
7,636,574 B2 12/2009 Poosala
7,636,626 B2 12/2009 Oesterling et al.
7,643,411 B2 1/2010 Andreasen et al.
7,644,151 B2 1/2010 Jerrim et al.
7,644,267 B2 1/2010 Ylikoski et al.
7,644,414 B2 1/2010 Smith et al.
7,647,047 B2 1/2010 Moghaddam et al.
7,650,137 B2 1/2010 Jobs et al.
7,653,394 B2 1/2010 McMillin
7,656,271 B2 2/2010 Ehrman et al.
7,657,920 B2 2/2010 Arseneau et al.
7,660,419 B1 2/2010 Ho
7,661,124 B2 2/2010 Ramanathan et al.
7,664,494 B2 2/2010 Jiang
7,668,176 B2 2/2010 Chuah
7,668,612 B1 2/2010 Okkonen
7,668,903 B2 2/2010 Edwards et al.
7,668,966 B2 2/2010 Klinker et al.
7,676,673 B2 3/2010 Weller et al.
7,680,086 B2 3/2010 Eglin
7,681,226 B2 3/2010 Kraemer et al.
7,684,370 B2 3/2010 Kezys
7,685,131 B2 3/2010 Batra et al.
7,685,254 B2 3/2010 Pandya
7,685,530 B2 3/2010 Sherrard et al.
7,688,792 B2 3/2010 Babbar et al.
7,693,107 B2 4/2010 De Froment
7,693,720 B2 4/2010 Kennewick et al.
7,697,540 B2 4/2010 Haddad et al.
7,710,932 B2 5/2010 Muthuswamy et al.
7,711,848 B2 5/2010 Maes
7,719,966 B2 5/2010 Luft et al.
7,720,206 B2 5/2010 Devolites et al.
7,720,464 B2 5/2010 Batta
7,720,505 B2 5/2010 Gopi et al.
7,720,960 B2 5/2010 Pruss et al.
7,721,296 B2 5/2010 Ricagni
7,724,716 B2 5/2010 Fadell
7,725,570 B1 5/2010 Lewis
7,729,326 B2 6/2010 Sekhar
7,730,123 B1 6/2010 Erickson et al.
7,734,784 B1 6/2010 Araujo et al.
7,742,406 B1 6/2010 Muppala
7,746,854 B2 6/2010 Ambe et al.
7,747,240 B1 6/2010 Briscoe et al.
7,747,699 B2 6/2010 Prueitt et al.
7,747,730 B1 6/2010 Harlow
7,752,330 B2 7/2010 Olsen et al.
7,756,056 B2 7/2010 Kim et al.
7,756,534 B2 7/2010 Anupam et al.
7,756,757 B1 7/2010 Oakes, III
7,760,137 B2 7/2010 Martucci et al.
7,760,711 B1 7/2010 Kung et al.
7,760,861 B1 7/2010 Croak et al.
7,765,294 B2 7/2010 Edwards et al.
7,769,397 B2 8/2010 Funato et al.
7,770,785 B2 8/2010 Jha et al.
7,774,323 B2 8/2010 Helfman
7,774,412 B1 8/2010 Schnepel
7,774,456 B1 8/2010 Lownsbrough et al.
7,778,176 B2 8/2010 Morford
7,778,643 B2 8/2010 Laroia et al.
7,792,257 B1 9/2010 Vanier et al.
7,792,538 B2 9/2010 Kozisek
7,792,708 B2 9/2010 Alva
7,797,019 B2 9/2010 Friedmann
7,797,060 B2 9/2010 Grgic et al.
7,797,204 B2 9/2010 Balent
7,797,401 B2 9/2010 Stewart et al.
7,801,523 B1 9/2010 Kenderov
7,801,783 B2 9/2010 Kende et al.
7,801,985 B1 9/2010 Pitkow et al.
7,802,724 B1 9/2010 Nohr
7,805,140 B2 9/2010 Friday et al.
7,805,522 B2 9/2010 Schlüter et al.
7,805,606 B2 9/2010 Birger et al.
7,809,351 B1 10/2010 Panda et al.
7,809,372 B2 10/2010 Rajaniemi
7,813,746 B2 10/2010 Rajkotia
7,817,615 B1 10/2010 Breau et al.
7,817,983 B2 10/2010 Cassett et al.
7,822,837 B1 10/2010 Urban et al.
7,822,849 B2 10/2010 Titus
7,826,427 B2 11/2010 Sood et al.
7,826,607 B1 11/2010 de Carvalho Resende et al.
7,835,275 B1 11/2010 Swan et al.
7,843,831 B2 11/2010 Morrill et al.
7,843,843 B1 11/2010 Papp, III et al.
7,844,034 B1 11/2010 Oh et al.
7,844,728 B2 11/2010 Anderson et al.
7,848,768 B2 12/2010 Omori et al.
7,849,161 B2 12/2010 Koch et al.
7,849,170 B1 12/2010 Hargens et al.
7,849,477 B2 12/2010 Cristofalo et al.
7,853,255 B2 12/2010 Karaoguz et al.
7,853,656 B2 12/2010 Yach et al.
7,856,226 B2 12/2010 Wong et al.
7,860,088 B2 12/2010 Lioy
7,865,182 B2 1/2011 Macaluso
7,865,187 B2 1/2011 Ramer et al.
7,868,778 B2 1/2011 Kenwright
7,873,001 B2 1/2011 Silver
7,873,344 B2 1/2011 Bowser et al.
7,873,346 B2 1/2011 Petersson et al.
7,873,540 B2 1/2011 Arumugam
7,873,705 B2 1/2011 Kalish
7,877,090 B2 1/2011 Maes
7,881,199 B2 2/2011 Krstulich
7,881,697 B2 2/2011 Baker et al.
7,882,029 B2 2/2011 White
7,882,247 B2 2/2011 Sturniolo et al.
7,882,560 B2 2/2011 Kraemer et al.
7,886,047 B1 2/2011 Potluri
7,889,384 B2 2/2011 Armentrout et al.
7,890,084 B1 2/2011 Dudziak et al.
7,890,111 B2 2/2011 Bugenhagen
7,894,431 B2 2/2011 Goring et al.
7,899,039 B2 3/2011 Andreasen et al.
7,899,438 B2 3/2011 Baker et al.
7,903,553 B2 3/2011 Liu
7,907,970 B2 3/2011 Park et al.
7,911,975 B2 3/2011 Droz et al.
7,912,025 B2 3/2011 Pattenden et al.
7,912,056 B1 3/2011 Brassem
7,920,529 B1 4/2011 Mahler et al.
7,921,463 B2 4/2011 Sood et al.
7,925,740 B2 4/2011 Nath et al.
7,925,778 B1 4/2011 Wijnands et al.
7,929,959 B2 4/2011 DeAtley et al.
7,929,960 B2 4/2011 Martin et al.
7,929,973 B2 4/2011 Zavalkovsky et al.
7,930,327 B2 4/2011 Craft et al.
7,930,446 B2 4/2011 Kesselman et al.

(56) References Cited

U.S. PATENT DOCUMENTS 7,930,553 B2 4/2011 Satarasinghe et al.
7,933,274 B2 4/2011 Verma et al.
7,936,736 B2 5/2011 Proctor, Jr. et al.
7,937,069 B2 5/2011 Rassam
7,937,450 B2 5/2011 Janik
7,940,685 B1 5/2011 Breslau et al.
7,940,751 B2 5/2011 Hansen
7,941,184 B2 5/2011 Prendergast et al.
7,944,948 B2 5/2011 Chow et al.
7,945,238 B2 5/2011 Baker et al.
7,945,240 B1 5/2011 Klock et al.
7,945,945 B2 5/2011 Graham et al.
7,948,952 B2 5/2011 Hurtta et al.
7,948,953 B2 5/2011 Melkote et al.
7,948,968 B2 5/2011 Voit et al.
7,949,529 B2 5/2011 Weider et al.
7,953,808 B2 5/2011 Sharp et al.
7,953,877 B2 5/2011 Vemula et al.
7,957,020 B2 6/2011 Mine et al.
7,957,381 B2 6/2011 Clermidy et al.
7,957,511 B2 6/2011 Drudis et al.
7,958,029 B1 6/2011 Bobich et al.
7,962,622 B2 6/2011 Friend et al.
7,965,983 B1 6/2011 Swan et al.
7,966,405 B2 6/2011 Sundaresan et al.
7,969,950 B2 6/2011 Iyer et al.
7,970,350 B2 6/2011 Sheynman
7,970,426 B2 6/2011 Poe et al.
7,974,624 B2 7/2011 Gallagher et al.
7,975,184 B2 7/2011 Goff et al.
7,978,627 B2 7/2011 Taylor et al.
7,978,686 B2 7/2011 Goyal et al.
7,979,069 B2 7/2011 Hupp et al.
7,979,889 B2 7/2011 Gladstone et al.
7,979,896 B2 7/2011 McMurtry et al.
7,984,130 B2 7/2011 Bogineni et al.
7,984,511 B2 7/2011 Kocher et al.
7,986,935 B1 7/2011 D'Souza et al.
7,987,496 B2 7/2011 Bryce et al.
7,987,510 B2 7/2011 Kocher et al.
7,990,049 B2 8/2011 Shioya
8,000,276 B2 8/2011 Scherzer et al.
8,000,318 B2 8/2011 Wiley et al.
8,005,009 B2 8/2011 McKee et al.
8,005,459 B2 8/2011 Balsillie
8,005,726 B1 8/2011 Bao
8,005,913 B1 8/2011 Carlander
8,005,988 B2 8/2011 Maes
8,010,080 B1 8/2011 Thenthiruperai et al.
8,010,081 B1 8/2011 Roskowski
8,010,082 B2 8/2011 Sutaria et al.
8,010,990 B2 8/2011 Ferguson et al.
8,015,133 B1 9/2011 Wu et al.
8,015,234 B2 9/2011 Lum et al.
8,019,687 B2 9/2011 Wang et al.
8,019,820 B2 9/2011 Son et al.
8,019,846 B2 9/2011 Roelens et al.
8,019,868 B2 9/2011 Rao et al.
8,019,886 B2 9/2011 Harrang et al.
8,023,425 B2 9/2011 Raleigh
8,024,397 B1 9/2011 Erickson et al.
8,024,424 B2 9/2011 Freimuth et al.
8,027,339 B2 9/2011 Short et al.
8,031,601 B2 10/2011 Feroz et al.
8,032,168 B2 10/2011 Ikaheimo
8,032,409 B1 10/2011 Mikurak
8,032,899 B2 10/2011 Archer et al.
8,036,387 B2 10/2011 Kudelski et al.
8,036,600 B2 10/2011 Garrett et al.
8,044,792 B2 10/2011 Orr et al.
8,045,973 B2 10/2011 Chambers
8,046,449 B2 10/2011 Yoshiuchi
3,060,463 A1 11/2011 Spiegel
8,050,275 B1 11/2011 Iyer
8,050,690 B2 11/2011 Neeraj
8,050,705 B2 11/2011 Sicher et al.
8,059,530 B1 11/2011 Cole
8,060,017 B2 11/2011 Schlicht et al.
8,064,418 B2 11/2011 Maki
8,064,896 B2 11/2011 Bell et al.
8,065,365 B2 11/2011 Saxena et al.
8,068,824 B2 11/2011 Shan et al.
8,068,829 B2 11/2011 Lemond et al.
8,073,427 B2 12/2011 Koch et al.
8,073,721 B1 12/2011 Lewis
8,078,140 B2 12/2011 Baker et al.
8,078,163 B2 12/2011 Lemond et al.
8,085,808 B2 12/2011 Brusca et al.
8,086,398 B2 12/2011 Sanchez et al.
8,086,497 B1 12/2011 Oakes, III
8,086,791 B2 12/2011 Caulkins
8,090,359 B2 1/2012 Proctor, Jr. et al.
8,090,361 B2 1/2012 Hagan
8,090,616 B2 1/2012 Proctor, Jr. et al.
8,091,087 B2 1/2012 Ali et al.
8,094,551 B2 1/2012 Huber et al.
8,095,112 B2 1/2012 Chow et al.
8,095,124 B2 1/2012 Balia
8,095,175 B2 * 1/2012 Todd .................... H04W 36/18 370/328
8,095,640 B2 1/2012 Guingo et al.
8,095,666 B2 1/2012 Schmidt et al.
8,098,579 B2 1/2012 Ray et al.
8,099,077 B2 1/2012 Chowdhury et al.
8,099,517 B2 1/2012 Jia et al.
8,102,814 B2 1/2012 Rahman et al.
8,103,285 B2 1/2012 Kalhan
8,104,080 B2 1/2012 Burns et al.
8,107,953 B2 1/2012 Zimmerman et al.
8,108,520 B2 1/2012 Ruutu et al.
8,108,680 B2 1/2012 Murray
8,112,435 B2 2/2012 Epstein et al.
8,116,223 B2 2/2012 Tian et al.
8,116,749 B2 2/2012 Proctor, Jr. et al.
8,116,781 B2 2/2012 Chen et al.
8,122,128 B2 2/2012 Burke, II et al.
8,122,249 B2 2/2012 Falk et al.
8,125,897 B2 2/2012 Ray et al.
8,126,123 B2 2/2012 Cai et al.
8,126,396 B2 2/2012 Bennett
8,126,476 B2 2/2012 Vardi et al.
8,126,722 B2 2/2012 Robb et al.
8,130,793 B2 3/2012 Edwards et al.
8,131,256 B2 3/2012 Martti et al.
8,131,281 B1 3/2012 Hildner et al.
8,131,840 B1 3/2012 Denker
8,131,858 B2 3/2012 Agulnik et al.
8,132,256 B2 3/2012 Bari
8,134,954 B2 3/2012 Godfrey et al.
8,135,388 B1 3/2012 Gailloux et al.
8,135,392 B2 3/2012 Marcellino et al.
8,135,657 B2 3/2012 Kapoor et al.
8,140,690 B2 3/2012 Ly et al.
8,144,591 B2 3/2012 Ghai et al.
8,145,194 B2 3/2012 Yoshikawa et al.
8,146,142 B2 3/2012 Lortz et al.
8,149,748 B2 4/2012 Bata et al.
8,149,823 B2 4/2012 Turcan et al.
8,150,394 B2 4/2012 Bianconi et al.
8,150,431 B2 4/2012 Wolovitz et al.
8,151,205 B2 4/2012 Follmann et al.
8,155,155 B1 4/2012 Chow et al.
8,155,620 B2 4/2012 Wang et al.
8,155,666 B2 4/2012 Alizadeh-Shabdiz
8,155,670 B2 4/2012 Fullam et al.
8,156,206 B2 4/2012 Kiley et al.
8,159,520 B1 4/2012 Dhanoa et al.
8,160,015 B2 4/2012 Rashid et al.
8,160,056 B2 4/2012 Van der Merwe et al.
8,160,598 B2 4/2012 Savoor
8,165,576 B2 4/2012 Raju et al.
8,166,040 B2 4/2012 Brindisi et al.
8,166,554 B2 4/2012 John
8,170,553 B2 5/2012 Bennett

(56) References Cited

U.S. PATENT DOCUMENTS 8,174,378 B2 5/2012 Richman et al.
8,174,970 B2 5/2012 Adamczyk et al.
8,175,574 B1 5/2012 Panda et al.
8,180,333 B1 5/2012 Wells et al.
8,180,881 B2 5/2012 Seo et al.
8,180,886 B2 5/2012 Overcash et al.
8,184,530 B1 5/2012 Swan et al.
8,184,590 B2 5/2012 Rosenblatt
8,185,088 B2 5/2012 Klein et al.
8,185,093 B2 5/2012 Jheng et al.
8,185,127 B1 5/2012 Cai et al.
8,185,152 B1 5/2012 Goldner
8,185,158 B2 5/2012 Tamura et al.
8,190,087 B2 5/2012 Fisher et al.
8,190,122 B1 5/2012 Alexander et al.
8,190,675 B2 5/2012 Tribbett
8,191,106 B2 5/2012 Choyi et al.
8,191,116 B1 5/2012 Gazzard
8,191,124 B2 5/2012 Wynn et al.
8,194,549 B2 6/2012 Huber et al.
8,194,553 B2 6/2012 Liang et al.
8,194,572 B2 6/2012 Horvath et al.
8,194,581 B1 6/2012 Schroeder et al.
8,195,093 B2 6/2012 Garrett et al.
8,195,153 B1 6/2012 Frencel et al.
8,195,163 B2 6/2012 Gisby et al.
8,195,661 B2 6/2012 Kalavade
8,196,199 B2 6/2012 Hrastar et al.
8,200,163 B2 6/2012 Hoffman
8,200,200 B1 6/2012 Belser et al.
8,200,509 B2 6/2012 Kenedy et al.
8,200,775 B2 6/2012 Moore
8,200,818 B2 6/2012 Freund et al.
8,204,190 B2 6/2012 Bang et al.
8,204,505 B2 6/2012 Jin et al.
8,204,794 B1 6/2012 Peng et al.
8,208,788 B2 6/2012 Ando et al.
8,208,919 B2 6/2012 Kotecha
8,213,296 B2 7/2012 Shannon et al.
8,213,363 B2 7/2012 Ying et al.
8,214,536 B2 7/2012 Zhao
8,214,890 B2 7/2012 Kirovski et al.
8,219,134 B2 7/2012 Maharajh et al.
8,223,655 B2 7/2012 Heinz et al.
8,223,741 B1 7/2012 Bartlett et al.
8,224,382 B2 7/2012 Bultman
8,224,773 B2 7/2012 Spiegel
8,228,818 B2 7/2012 Chase et al.
8,229,394 B2 7/2012 Karlberg
8,229,914 B2 7/2012 Ramer et al.
8,230,061 B2 7/2012 Hassan et al.
8,233,433 B2 7/2012 Kalhan
8,233,883 B2 7/2012 De Froment
8,233,895 B2 7/2012 Tysowski
8,234,583 B2 7/2012 Sloo et al.
8,238,287 B1 8/2012 Gopi et al.
8,239,520 B2 8/2012 Grah
8,242,959 B2 8/2012 Mia et al.
8,244,241 B2 8/2012 Montemurro
8,249,601 B2 8/2012 Emberson et al.
8,254,880 B2 8/2012 Aaltonen et al.
8,254,915 B2 8/2012 Kozisek
8,255,515 B1 8/2012 Melman et al.
8,255,534 B2 8/2012 Assadzadeh
8,255,689 B2 8/2012 Kim et al.
8,259,692 B2 9/2012 Bajko
8,264,965 B2 9/2012 Dolganow et al.
8,265,004 B2 9/2012 Toutonghi
8,266,249 B2 9/2012 Hu
8,266,681 B2 9/2012 Deshpande et al.
8,270,955 B2 9/2012 Ramer et al.
8,270,972 B2 9/2012 Otting et al.
8,271,025 B2 9/2012 Brisebois et al.
8,271,045 B2 9/2012 Parolkar et al.
8,271,049 B2 9/2012 Silver et al.
8,271,992 B2 9/2012 Chatley et al.
8,275,415 B2 9/2012 Huslak
8,275,830 B2 9/2012 Raleigh
8,279,067 B2 10/2012 Berger et al.
8,279,864 B2 10/2012 Wood
8,280,351 B1 10/2012 Ahmed et al.
8,280,354 B2 10/2012 Smith et al.
8,284,740 B2 10/2012 O'Connor
8,285,249 B2 10/2012 Baker et al.
8,285,992 B2 10/2012 Mathur et al.
8,291,238 B2 10/2012 Ginter et al.
8,291,439 B2 10/2012 Jethi et al.
8,296,404 B2 10/2012 McDysan et al.
8,300,575 B2 10/2012 Willars
8,301,513 B1 10/2012 Peng et al.
8,306,518 B1 11/2012 Gailloux
8,306,741 B2 11/2012 Tu
8,307,067 B2 11/2012 Ryan
8,307,095 B2 11/2012 Clark et al.
8,315,198 B2 11/2012 Corneille et al.
8,315,593 B2 11/2012 Gallant et al.
8,315,594 B1 11/2012 Mauser et al.
8,315,718 B2 11/2012 Caffrey et al.
8,315,999 B2 11/2012 Chatley et al.
8,320,244 B2 11/2012 Muqattash et al.
8,320,902 B2 11/2012 Moring et al.
8,320,949 B2 11/2012 Matta
8,325,638 B2 12/2012 Jin et al.
8,325,906 B2 12/2012 Fullarton et al.
8,326,319 B2 12/2012 Davis
8,326,359 B2 12/2012 Kauffman
8,326,828 B2 12/2012 Zhou et al.
8,331,223 B2 12/2012 Hill et al.
8,331,293 B2 12/2012 Sood
8,332,375 B2 12/2012 Chatley et al.
8,332,517 B2 12/2012 Russell
8,335,161 B2 12/2012 Foottit et al.
8,339,991 B2 12/2012 Biswas et al.
8,340,625 B1 12/2012 Johnson et al.
8,340,628 B2 12/2012 Taylor et al.
8,340,678 B1 12/2012 Pandey
8,340,718 B2 12/2012 Colonna et al.
8,346,210 B2 1/2013 Balsan et al.
8,346,923 B2 1/2013 Rowles et al.
8,347,104 B2 1/2013 Pathiyal
8,347,362 B2 1/2013 Cai et al.
8,347,378 B2 1/2013 Merkin et al.
8,350,700 B2 1/2013 Fast et al.
8,351,592 B2 1/2013 Freeny, Jr. et al.
8,351,898 B2 1/2013 Raleigh
8,352,360 B2 1/2013 De Judicibus et al.
8,352,630 B2 1/2013 Hart
8,352,980 B2 1/2013 Howcroft
8,353,001 B2 1/2013 Herrod
8,355,570 B2 1/2013 Karsanbhai et al.
8,355,696 B1 1/2013 Olding et al.
8,356,336 B2 1/2013 Johnston et al.
8,358,638 B2 1/2013 Scherzer et al.
8,358,975 B2 1/2013 Bahl et al.
8,363,658 B1 1/2013 Delker et al.
8,363,799 B2 1/2013 Gruchala et al.
8,364,089 B2 1/2013 Phillips
8,364,806 B2 1/2013 Short et al.
8,369,274 B2 2/2013 Sawai
8,370,477 B2 2/2013 Short et al.
8,370,483 B2 2/2013 Choong et al.
8,374,090 B2 2/2013 Morrill et al.
8,374,592 B2 2/2013 Proctor, Jr. et al.
8,375,128 B2 2/2013 Tofighbakhsh et al.
8,375,136 B2 2/2013 Roman et al.
8,379,847 B2 2/2013 Bell et al.
8,380,247 B2 2/2013 Engstrom
8,385,199 B1 2/2013 Coward et al.
8,385,896 B2 2/2013 Proctor, Jr. et al.
8,385,964 B2 2/2013 Haney
8,385,975 B2 2/2013 Forutanpour
8,386,386 B1 2/2013 Zhu
8,391,262 B2 3/2013 Maki et al.
8,391,834 B2 3/2013 Raleigh

(56) References Cited

U.S. PATENT DOCUMENTS 8,392,982 B2 3/2013 Harris et al.
8,396,458 B2 3/2013 Raleigh
8,396,929 B2 3/2013 Helfman et al.
8,401,968 B1 3/2013 Schattauer et al.
8,402,165 B2 3/2013 Deu-Ngoc et al.
8,402,540 B2 3/2013 Kapoor et al.
8,406,427 B2 3/2013 Chand et al.
8,406,736 B2 3/2013 Das et al.
8,407,472 B2 3/2013 Hao et al.
8,407,763 B2 3/2013 Weller et al.
8,411,587 B2 4/2013 Curtis et al.
8,411,691 B2 4/2013 Aggarwal
8,412,798 B1 4/2013 Wang
8,413,245 B2 4/2013 Kraemer et al.
8,418,168 B2 4/2013 Tyhurst et al.
8,422,988 B1 4/2013 Keshav
8,423,016 B2 4/2013 Buckley et al.
8,429,403 B2 4/2013 Moret et al.
8,429,409 B1 4/2013 Wall et al.
8,437,734 B2 5/2013 Ray et al.
8,441,955 B2 5/2013 Wilkinson et al.
8,442,015 B2 5/2013 Behzad et al.
8,446,831 B2 5/2013 Kwan et al.
8,447,324 B2 5/2013 Shuman et al.
8,447,607 B2 5/2013 Weider et al.
8,447,980 B2 5/2013 Godfrey et al.
8,448,015 B2 5/2013 Gerhart
8,452,858 B2 5/2013 Wu et al.
8,461,958 B2 6/2013 Saenz et al.
8,463,194 B2 6/2013 Erlenback et al.
8,463,232 B2 6/2013 Tuli et al.
8,468,337 B2 6/2013 Gaur et al.
8,472,371 B1 6/2013 Bari et al.
8,477,778 B2 7/2013 Lehmann, Jr. et al.
8,483,135 B2 7/2013 Cai et al.
8,483,694 B2 7/2013 Lewis et al.
8,484,327 B2 7/2013 Werner et al.
8,484,568 B2 7/2013 Rados et al.
8,488,597 B2 7/2013 Nie et al.
8,489,110 B2 7/2013 Frank et al.
8,489,720 B1 7/2013 Morford et al.
8,494,559 B1 7/2013 Malmi
8,495,181 B2 7/2013 Venkatraman et al.
8,495,227 B2 7/2013 Kaminsky et al.
8,495,360 B2 7/2013 Falk et al.
8,495,700 B2 7/2013 Shahbazi
8,495,743 B2 7/2013 Kraemer et al.
8,499,087 B2 7/2013 Hu
8,571,598 B2 7/2013 Valavi
RE44,412 E 8/2013 Naqvi et al.
8,500,533 B2 8/2013 Lutnick et al.
8,503,358 B2 8/2013 Hanson et al.
8,503,455 B2 8/2013 Heikens
8,504,032 B2 8/2013 Lott et al.
8,504,574 B2 8/2013 Dvorak et al.
8,504,687 B2 8/2013 Maffione et al.
8,504,690 B2 8/2013 Shah et al.
8,504,729 B2 8/2013 Pezzutti
8,505,073 B2 8/2013 Taglienti et al.
8,509,082 B2 8/2013 Heinz et al.
8,514,927 B2 8/2013 Sundararajan et al.
8,516,552 B2 8/2013 Raleigh
8,520,589 B2 8/2013 Bhatt et al.
8,520,595 B2 8/2013 Yadav et al.
8,521,110 B2 8/2013 Rofougaran
8,521,775 B1 8/2013 Poh et al.
8,522,039 B2 8/2013 Hyndman et al.
8,522,249 B2 8/2013 Beaule
8,522,337 B2 8/2013 Adusumilli et al.
8,523,547 B2 9/2013 Pekrul
8,526,329 B2 9/2013 Mahany et al.
8,527,410 B2 9/2013 Markki et al.
8,527,662 B2 9/2013 Biswas et al.
8,528,068 B1 9/2013 Weglein et al.
8,531,954 B2 9/2013 McNaughton et al.
8,531,995 B2 9/2013 Khan et al.
8,532,610 B2 9/2013 Manning Cassett et al.
8,533,775 B2 9/2013 Alcorn et al.
8,535,160 B2 9/2013 Lutnick et al.
8,538,394 B2 9/2013 Zimmerman et al.
8,538,402 B2 9/2013 Vidal et al.
8,538,421 B2 9/2013 Brisebois et al.
8,538,458 B2 9/2013 Haney
8,539,544 B2 9/2013 Garimella et al.
8,539,561 B2 9/2013 Gupta et al.
8,543,265 B2 9/2013 Ekhaguere et al.
8,543,814 B2 9/2013 Laitinen et al.
8,544,105 B2 9/2013 Mclean et al.
8,548,427 B2 10/2013 Chow et al.
8,548,428 B2 10/2013 Raleigh
8,549,173 B1 10/2013 Wu et al.
8,554,876 B2 10/2013 Winsor
8,559,369 B2 10/2013 Barkan
8,565,746 B2 10/2013 Hoffman
8,566,236 B2 10/2013 Busch
8,571,474 B2 10/2013 Chavez et al.
8,571,501 B2 10/2013 Miller et al.
8,571,993 B2 10/2013 Kocher et al.
8,572,117 B2 10/2013 Rappaport
8,572,256 B2 10/2013 Babbar
8,583,499 B2 11/2013 De Judicibus et al.
8,588,240 B2 11/2013 Ramankutty et al.
8,589,541 B2 11/2013 Raleigh et al.
8,589,955 B2 11/2013 Roundtree et al.
8,594,665 B2 11/2013 Anschutz
8,595,186 B1 11/2013 Mandyam et al.
8,600,895 B2 12/2013 Felsher
8,601,125 B2 12/2013 Huang et al.
8,605,691 B2 12/2013 Soomro et al.
8,615,507 B2 12/2013 Varadarajulu et al.
8,619,735 B2 12/2013 Montemurro et al.
8,620,257 B2 12/2013 Qiu et al.
8,621,056 B2 12/2013 Coussemaeker et al.
8,626,115 B2 1/2014 Raleigh et al.
8,630,314 B2 1/2014 York
8,631,428 B2 1/2014 Scott et al.
8,634,425 B2 1/2014 Gorti et al.
8,635,164 B2 1/2014 Rosenhaft et al.
8,639,215 B2 1/2014 McGregor et al.
8,644,702 B1 2/2014 Kalajan
8,644,813 B1 2/2014 Gailloux et al.
8,645,518 B2 2/2014 David
8,655,357 B1 2/2014 Gazzard et al.
8,656,472 B2 2/2014 McMurtry et al.
8,660,853 B2 2/2014 Robb et al.
8,666,395 B2 3/2014 Silver
8,667,542 B1 3/2014 Bertz et al.
8,670,334 B2 3/2014 Keohane et al.
8,670,752 B2 3/2014 Fan et al.
8,675,852 B2 3/2014 Maes
8,676,682 B2 3/2014 Kalliola
8,676,925 B1 3/2014 Liu et al.
8,693,323 B1 4/2014 McDysan
8,694,772 B2 4/2014 Kao et al.
8,700,729 B2 4/2014 Dua
8,701,015 B2 4/2014 Bonnat
8,705,361 B2 4/2014 Venkataraman et al.
8,706,863 B2 4/2014 Fadell
8,712,631 B2 4/2014 Tietjen et al.
8,713,535 B2 4/2014 Malhotra et al.
8,713,641 B1 4/2014 Pagan et al.
8,719,397 B2 5/2014 Levi et al.
8,719,423 B2 5/2014 Wyld
8,725,899 B2 5/2014 Short et al.
8,730,842 B2 5/2014 Collins et al.
8,731,519 B2 5/2014 Flynn et al.
8,732,808 B2 5/2014 Sewall et al.
8,739,035 B2 5/2014 Trethewey
8,739,287 B1 5/2014 Polyakov et al.
8,744,339 B2 6/2014 Halfmann et al.
8,761,711 B2 6/2014 Grignani et al.
8,780,857 B2 7/2014 Balasubramanian et al.
8,787,249 B2 7/2014 Giaretta et al.
8,793,304 B2 7/2014 Lu et al.

(56) References Cited

U.S. PATENT DOCUMENTS 8,799,227 B2 8/2014 Ferguson et al.
8,804,517 B2 8/2014 Oerton
8,804,695 B2 8/2014 Branam
8,811,338 B2 8/2014 Jin et al.
8,811,991 B2 8/2014 Jain et al.
8,812,525 B1 8/2014 Taylor, III
8,818,394 B2 8/2014 Bienas et al.
8,819,253 B2 8/2014 Simeloff et al.
8,825,109 B2 9/2014 Montemurro et al.
8,826,411 B2 9/2014 Moen et al.
8,831,561 B2 9/2014 Sutaria et al.
8,837,322 B2 9/2014 Venkataramanan et al.
8,838,686 B2 9/2014 Getchius
8,838,752 B2 9/2014 Lor et al.
8,843,849 B2 9/2014 Neil et al.
8,845,415 B2 9/2014 Lutnick et al.
8,849,297 B2 9/2014 Balasubramanian
8,855,620 B2 10/2014 Sievers et al.
8,862,751 B2 10/2014 Faccin et al.
8,863,111 B2 10/2014 Selitser et al.
8,868,725 B2 10/2014 Samba
8,868,727 B2 10/2014 Yumerefendi et al.
8,875,042 B2 10/2014 Lejeune et al.
8,880,047 B2 11/2014 Konicek et al.
8,891,483 B2 11/2014 Connelly et al.
8,898,748 B2 11/2014 Burks et al.
8,908,516 B2 12/2014 Tzamaloukas et al.
8,929,374 B2 1/2015 Tönsing et al.
8,930,238 B2 1/2015 Coffman et al.
8,943,551 B2 1/2015 Ganapathy et al.
8,948,726 B2 2/2015 Smith et al.
8,949,382 B2 2/2015 Cornett et al.
8,949,597 B1 2/2015 Reeves et al.
8,955,038 B2 2/2015 Nicodemus et al.
8,966,018 B2 2/2015 Bugwadia et al.
8,971,841 B2 3/2015 Menezes et al.
8,971,912 B2 3/2015 Chou et al.
8,972,537 B2 3/2015 Bastian et al.
8,977,284 B2 3/2015 Reed
8,977,856 B2 3/2015 Malek et al.
8,983,860 B1 3/2015 Beda, III et al.
8,995,952 B1 3/2015 Baker et al.
9,002,322 B2 4/2015 Cotterill
9,002,342 B2 4/2015 Tenhunen et al.
9,014,973 B2 4/2015 Ruckart
9,015,331 B2 4/2015 Lai et al.
9,021,069 B2 4/2015 Ducrou et al.
9,030,934 B2 5/2015 Shah et al.
9,032,427 B2 5/2015 Gallant et al.
9,042,923 B1 5/2015 Mirho
9,043,462 B2 5/2015 Badiee et al.
9,047,651 B2 6/2015 Roumeliotis et al.
9,049,010 B2 6/2015 Jueneman et al.
9,064,275 B1 6/2015 Lu et al.
9,105,031 B2 8/2015 Shen et al.
9,111,088 B2 8/2015 Ghai et al.
9,135,037 B1 9/2015 Petrescu-Prahova et al.
9,137,286 B1 9/2015 Yuan
9,137,389 B2 9/2015 Neal et al.
9,172,553 B2 10/2015 Dawes et al.
9,173,090 B2 10/2015 Tuchman et al.
9,176,913 B2 11/2015 Millet et al.
9,177,455 B2 11/2015 Remer
9,191,394 B2 11/2015 Novak et al.
9,282,460 B2 3/2016 Souissi
9,286,469 B2 3/2016 Kraemer et al.
9,286,604 B2 3/2016 Aabye et al.
9,298,723 B1 3/2016 Vincent
9,313,708 B2 4/2016 Nam et al.
9,325,737 B2 4/2016 Gutowski et al.
9,326,173 B2 4/2016 Luft
9,344,557 B2 5/2016 Gruchala et al.
9,361,451 B2 6/2016 Oberheide et al.
9,363,285 B2 6/2016 Kitamura
9,367,680 B2 6/2016 Mahaffey et al.
9,369,959 B2 6/2016 Ruutu et al.
9,386,045 B2 7/2016 Kgil et al.
9,402,254 B2 7/2016 Kneckt et al.
9,413,546 B2 8/2016 Meier et al.
9,418,381 B2 8/2016 Ahuja et al.
9,454,598 B2 9/2016 Hwang et al.
9,459,767 B2 10/2016 Cockcroft et al.
9,501,803 B2 11/2016 Bilac et al.
9,589,117 B2 3/2017 Ali et al.
9,609,459 B2 3/2017 Raleigh
9,634,850 B2 4/2017 Taft et al.
2001/0048738 A1 12/2001 Baniak et al.
2001/0053694 A1 12/2001 Igarashi et al.
2002/0013844 A1 1/2002 Garrett et al.
2002/0022472 A1 2/2002 Watler et al.
2002/0022483 A1 2/2002 Thompson et al.
2002/0049074 A1 4/2002 Eisinger et al.
2002/0099848 A1 7/2002 Lee
2002/0116338 A1 8/2002 Gonthier et al.
2002/0120370 A1 8/2002 Parupudi et al.
2002/0120540 A1 8/2002 Kende et al.
2002/0131404 A1 9/2002 Mehta et al.
2002/0138599 A1 9/2002 Dilman et al.
2002/0138601 A1 9/2002 Piponius et al.
2002/0154751 A1 10/2002 Thompson et al.
2002/0161601 A1 10/2002 Nauer et al.
2002/0164983 A1 11/2002 Raviv et al.
2002/0176377 A1 11/2002 Hamilton
2002/0188732 A1 12/2002 Buckman et al.
2002/0191573 A1 12/2002 Whitehill et al.
2002/0199001 A1 12/2002 Wenocur et al.
2003/0004937 A1 1/2003 Salmenkaita et al.
2003/0005112 A1 1/2003 Krautkremer
2003/0013434 A1 1/2003 Rosenberg et al.
2003/0018524 A1 1/2003 Fishman et al.
2003/0028623 A1 2/2003 Hennessey et al.
2003/0046396 A1 3/2003 Richter et al.
2003/0050070 A1 3/2003 Mashinsky et al.
2003/0050837 A1 3/2003 Kim
2003/0084321 A1 5/2003 Tarquini et al.
2003/0088671 A1 5/2003 Klinker et al.
2003/0133408 A1 7/2003 Cheng et al.
2003/0134650 A1 7/2003 Sundar et al.
2003/0159030 A1 8/2003 Evans
2003/0161265 A1 8/2003 Cao et al.
2003/0171112 A1 9/2003 Lupper et al.
2003/0182420 A1 9/2003 Jones et al.
2003/0182435 A1 9/2003 Redlich et al.
2003/0184793 A1 10/2003 Pineau
2003/0188006 A1 10/2003 Bard
2003/0188117 A1 10/2003 Yoshino et al.
2003/0220984 A1 11/2003 Jones et al.
2003/0224781 A1 12/2003 Milford et al.
2003/0229900 A1 12/2003 Reisman
2003/0233332 A1 12/2003 Keeler et al.
2003/0236745 A1 12/2003 Hartsell et al.
2004/0019539 A1 1/2004 Raman et al.
2004/0019564 A1 1/2004 Goldthwaite et al.
2004/0021697 A1 2/2004 Beaton et al.
2004/0024756 A1 2/2004 Rickard
2004/0030705 A1 2/2004 Bowman-Amuah
2004/0039792 A1 2/2004 Nakanishi
2004/0044623 A1 3/2004 Wake et al.
2004/0047358 A1 3/2004 Chen et al.
2004/0054779 A1 3/2004 Takeshima et al.
2004/0073672 A1 4/2004 Fascenda
2004/0082346 A1 4/2004 Skytt et al.
2004/0098715 A1 5/2004 Aghera et al.
2004/0102182 A1 5/2004 Reith et al.
2004/0103193 A1 5/2004 Pandya et al.
2004/0107360 A1 6/2004 Herrmann et al.
2004/0114553 A1* 6/2004 Jiang ...................... H04L 63/08 370/328
2004/0116140 A1 6/2004 Babbar et al.
2004/0127200 A1 7/2004 Shaw et al.
2004/0127208 A1 7/2004 Nair et al.
2004/0127256 A1 7/2004 Goldthwaite et al.
2004/0132427 A1 7/2004 Lee et al.
2004/0133668 A1 7/2004 Nicholas, III

(56) References Cited

U.S. PATENT DOCUMENTS

2004/0137890 A1 7/2004 Kalke
2004/0167958 A1 8/2004 Stewart et al.
2004/0168052 A1 8/2004 Clisham et al.
2004/0170191 A1 9/2004 Guo et al.
2004/0176104 A1 9/2004 Arcens
2004/0198331 A1 10/2004 Coward et al.
2004/0203755 A1 10/2004 Brunet et al.
2004/0203833 A1 10/2004 Rathunde et al.
2004/0225561 A1 11/2004 Hertzberg et al.
2004/0225898 A1 11/2004 Frost et al.
2004/0236547 A1 11/2004 Rappaport et al.
2004/0243680 A1 12/2004 Mayer
2004/0243992 A1 12/2004 Gustafson et al.
2004/0249918 A1 12/2004 Sunshine
2004/0255145 A1 12/2004 Chow
2004/0259534 A1 12/2004 Chaudhari et al.
2004/0260766 A1 12/2004 Barros et al.
2004/0267872 A1 12/2004 Serdy et al.
2005/0007993 A1 1/2005 Chambers et al.
2005/0009499 A1 1/2005 Koster
2005/0021995 A1 1/2005 Lal et al.
2005/0041617 A1 2/2005 Huotari et al.
2005/0048950 A1 3/2005 Morper
2005/0055291 A1 3/2005 Bevente et al.
2005/0055309 A1 3/2005 Williams et al.
2005/0055595 A1 3/2005 Frazer et al.
2005/0060266 A1 3/2005 DeMello et al.
2005/0060525 A1 3/2005 Schwartz et al.
2005/0075115 A1 4/2005 Corneille et al.
2005/0079863 A1 4/2005 Macaluso
2005/0091505 A1 4/2005 Riley et al.
2005/0096024 A1 5/2005 Bicker et al.
2005/0097516 A1 5/2005 Donnelly et al.
2005/0107091 A1 5/2005 Vannithamby et al.
2005/0108075 A1 5/2005 Douglis et al.
2005/0111463 A1 5/2005 Leung et al.
2005/0128967 A1 6/2005 Scobbie
2005/0135264 A1 6/2005 Popoff et al.
2005/0163320 A1 7/2005 Brown et al.
2005/0166043 A1 7/2005 Zhang et al.
2005/0183143 A1 8/2005 Anderholm et al.
2005/0186948 A1 8/2005 Gallagher et al.
2005/0198377 A1 9/2005 Ferguson et al.
2005/0216421 A1 9/2005 Barry et al.
2005/0226178 A1* 10/2005 Forand ................. H04W 48/16
370/328
2005/0228985 A1 10/2005 Ylikoski et al.
2005/0238046 A1 10/2005 Hassan et al.
2005/0239447 A1 10/2005 Holzman et al.
2005/0245241 A1 11/2005 Durand et al.
2005/0246282 A1 11/2005 Naslund et al.
2005/0250508 A1 11/2005 Guo et al.
2005/0250536 A1 11/2005 Deng et al.
2005/0254435 A1 11/2005 Moakley et al.
2005/0266825 A1 12/2005 Clayton
2005/0266880 A1 12/2005 Gupta
2006/0014519 A1 1/2006 Marsh et al.
2006/0019632 A1 1/2006 Cunningham et al.
2006/0020787 A1 1/2006 Choyi et al.
2006/0026679 A1 2/2006 Zakas
2006/0030306 A1 2/2006 Kuhn
2006/0034256 A1 2/2006 Addagatla et al.
2006/0035631 A1 2/2006 White et al.
2006/0040642 A1 2/2006 Boris et al.
2006/0045245 A1 3/2006 Aaron et al.
2006/0048223 A1 3/2006 Lee et al.
2006/0068796 A1 3/2006 Millen et al.
2006/0072451 A1 4/2006 Ross
2006/0072550 A1 4/2006 Davis et al.
2006/0072646 A1 4/2006 Feher
2006/0075506 A1 4/2006 Sanda et al.
2006/0085543 A1 4/2006 Hrastar et al.
2006/0095517 A1 5/2006 O'Connor et al.
2006/0098627 A1 5/2006 Karaoguz et al.
2006/0099970 A1 5/2006 Morgan et al.
2006/0101507 A1 5/2006 Camenisch
2006/0112016 A1 5/2006 Ishibashi
2006/0114821 A1 6/2006 Willey et al.
2006/0114832 A1 6/2006 Hamilton et al.
2006/0126562 A1 6/2006 Liu
2006/0135144 A1 6/2006 Jothipragasam
2006/0136882 A1 6/2006 Noonan et al.
2006/0143066 A1 6/2006 Calabria
2006/0143098 A1 6/2006 Lazaridis
2006/0156398 A1 7/2006 Ross et al.
2006/0160536 A1 7/2006 Chou
2006/0165060 A1 7/2006 Dua
2006/0168128 A1 7/2006 Sistla et al.
2006/0173959 A1 8/2006 McKelvie et al.
2006/0174035 A1 8/2006 Tufail
2006/0178917 A1 8/2006 Merriam et al.
2006/0178918 A1 8/2006 Mikurak
2006/0182137 A1 8/2006 Zhou et al.
2006/0183462 A1 8/2006 Kolehmainen
2006/0190314 A1 8/2006 Hernandez
2006/0190987 A1 8/2006 Ohta et al.
2006/0193280 A1* 8/2006 Lee ..................... H04B 7/2606
370/315
2006/0199608 A1 9/2006 Dunn et al.
2006/0200663 A1 9/2006 Thornton
2006/0206709 A1 9/2006 Labrou et al.
2006/0206904 A1 9/2006 Watkins et al.
2006/0218395 A1 9/2006 Maes
2006/0233108 A1 10/2006 Krishnan
2006/0233166 A1 10/2006 Bou-Diab et al.
2006/0236095 A1 10/2006 Smith et al.
2006/0242685 A1 10/2006 Heard et al.
2006/0258341 A1 11/2006 Miller et al.
2006/0277590 A1 12/2006 Limont et al.
2006/0291419 A1 12/2006 McConnell et al.
2006/0291477 A1 12/2006 Croak et al.
2007/0005795 A1 1/2007 Gonzalez
2007/0019670 A1 1/2007 Falardeau
2007/0022289 A1 1/2007 Alt et al.
2007/0025301 A1 2/2007 Petersson et al.
2007/0033194 A1 2/2007 Srinivas et al.
2007/0033197 A1 2/2007 Scherzer et al.
2007/0036312 A1 2/2007 Cai et al.
2007/0055694 A1 3/2007 Ruge et al.
2007/0060200 A1 3/2007 Boris et al.
2007/0061243 A1 3/2007 Ramer et al.
2007/0061800 A1 3/2007 Cheng et al.
2007/0061878 A1 3/2007 Hagiu et al.
2007/0073899 A1 3/2007 Judge et al.
2007/0076616 A1 4/2007 Ngo et al.
2007/0093243 A1 4/2007 Kapadekar et al.
2007/0100981 A1 5/2007 Adamczyk et al.
2007/0101426 A1 5/2007 Lee et al.
2007/0104126 A1 5/2007 Calhoun et al.
2007/0109983 A1 5/2007 Shankar et al.
2007/0111740 A1 5/2007 Wandel
2007/0130283 A1 6/2007 Klein et al.
2007/0130315 A1 6/2007 Friend et al.
2007/0140113 A1 6/2007 Gemelos
2007/0140145 A1 6/2007 Kumar et al.
2007/0140275 A1 6/2007 Bowman et al.
2007/0143824 A1 6/2007 Shahbazi
2007/0147317 A1 6/2007 Smith et al.
2007/0147324 A1 6/2007 McGary
2007/0155365 A1 7/2007 Kim et al.
2007/0165630 A1 7/2007 Rasanen
2007/0168499 A1 7/2007 Chu
2007/0171856 A1 7/2007 Bruce et al.
2007/0174490 A1 7/2007 Choi et al.
2007/0191006 A1 8/2007 Carpenter
2007/0192460 A1 8/2007 Choi et al.
2007/0198656 A1 8/2007 Mazzaferri et al.
2007/0201502 A1 8/2007 Abramson
2007/0213054 A1 9/2007 Han
2007/0220251 A1 9/2007 Rosenberg et al.
2007/0226225 A1 9/2007 Yiu et al.
2007/0226775 A1 9/2007 Andreasen et al.
2007/0234402 A1 10/2007 Khosravi et al.
2007/0243862 A1 10/2007 Coskun et al.

(56) References Cited

U.S. PATENT DOCUMENTS

| | | | |
|---|---|---|---|
| 2007/0248100 | A1 | 10/2007 | Zuberi et al. |
| 2007/0254646 | A1 | 11/2007 | Sokondar |
| 2007/0254675 | A1 | 11/2007 | Zorlu Ozer et al. |
| 2007/0255769 | A1 | 11/2007 | Agrawal et al. |
| 2007/0255797 | A1 | 11/2007 | Dunn et al. |
| 2007/0255848 | A1 | 11/2007 | Sewall et al. |
| 2007/0257767 | A1 | 11/2007 | Beeson |
| 2007/0259656 | A1 | 11/2007 | Jeong |
| 2007/0259673 | A1 | 11/2007 | Willars et al. |
| 2007/0263558 | A1 | 11/2007 | Salomone |
| 2007/0265003 | A1* | 11/2007 | Kezys ..................... H04L 12/66 455/435.1 |
| 2007/0266422 | A1 | 11/2007 | Germano et al. |
| 2007/0274327 | A1 | 11/2007 | Kaarela et al. |
| 2007/0280453 | A1 | 12/2007 | Kelley |
| 2007/0282896 | A1 | 12/2007 | Wydroug et al. |
| 2007/0293191 | A1 | 12/2007 | Mir et al. |
| 2007/0294395 | A1 | 12/2007 | Strub et al. |
| 2007/0294410 | A1 | 12/2007 | Pandya et al. |
| 2007/0297378 | A1 | 12/2007 | Poyhonen et al. |
| 2007/0298764 | A1 | 12/2007 | Clayton |
| 2007/0299965 | A1 | 12/2007 | Nieh et al. |
| 2007/0300252 | A1 | 12/2007 | Acharya et al. |
| 2008/0005285 | A1 | 1/2008 | Robinson et al. |
| 2008/0005561 | A1 | 1/2008 | Brown et al. |
| 2008/0010379 | A1 | 1/2008 | Zhao |
| 2008/0010452 | A1 | 1/2008 | Holtzman et al. |
| 2008/0018494 | A1 | 1/2008 | Waite et al. |
| 2008/0022354 | A1 | 1/2008 | Grewal et al. |
| 2008/0025230 | A1 | 1/2008 | Patel et al. |
| 2008/0032715 | A1 | 2/2008 | Jia et al. |
| 2008/0034063 | A1 | 2/2008 | Yee |
| 2008/0034419 | A1 | 2/2008 | Mullick et al. |
| 2008/0039102 | A1* | 2/2008 | Sewall ................ H04L 12/2856 455/445 |
| 2008/0049630 | A1 | 2/2008 | Kozisek et al. |
| 2008/0050715 | A1 | 2/2008 | Golczewski et al. |
| 2008/0051076 | A1 | 2/2008 | O'Shaughnessy et al. |
| 2008/0052387 | A1 | 2/2008 | Heinz et al. |
| 2008/0056273 | A1 | 3/2008 | Pelletier et al. |
| 2008/0059474 | A1 | 3/2008 | Lim |
| 2008/0059743 | A1 | 3/2008 | Bychkov et al. |
| 2008/0060066 | A1 | 3/2008 | Wynn et al. |
| 2008/0062900 | A1 | 3/2008 | Rao |
| 2008/0064367 | A1 | 3/2008 | Nath et al. |
| 2008/0066149 | A1 | 3/2008 | Lim |
| 2008/0066150 | A1 | 3/2008 | Lim |
| 2008/0066181 | A1 | 3/2008 | Haveson et al. |
| 2008/0070550 | A1 | 3/2008 | Hose |
| 2008/0077705 | A1 | 3/2008 | Li et al. |
| 2008/0080457 | A1 | 4/2008 | Cole |
| 2008/0081606 | A1 | 4/2008 | Cole |
| 2008/0082643 | A1 | 4/2008 | Storrie et al. |
| 2008/0083013 | A1 | 4/2008 | Soliman et al. |
| 2008/0085707 | A1 | 4/2008 | Fadell |
| 2008/0089295 | A1 | 4/2008 | Keeler et al. |
| 2008/0089303 | A1 | 4/2008 | Wirtanen et al. |
| 2008/0095339 | A1 | 4/2008 | Elliott et al. |
| 2008/0096559 | A1 | 4/2008 | Phillips et al. |
| 2008/0098062 | A1 | 4/2008 | Balia |
| 2008/0101291 | A1* | 5/2008 | Jiang ...................... H04L 63/08 370/331 |
| 2008/0109679 | A1 | 5/2008 | Wright et al. |
| 2008/0120129 | A1 | 5/2008 | Seubert et al. |
| 2008/0120668 | A1 | 5/2008 | Yau |
| 2008/0120688 | A1 | 5/2008 | Qiu et al. |
| 2008/0125079 | A1 | 5/2008 | O'Neil et al. |
| 2008/0126287 | A1 | 5/2008 | Cox et al. |
| 2008/0127304 | A1 | 5/2008 | Ginter et al. |
| 2008/0130534 | A1 | 6/2008 | Tomioka |
| 2008/0130656 | A1 | 6/2008 | Kim et al. |
| 2008/0132201 | A1 | 6/2008 | Karlberg |
| 2008/0132268 | A1 | 6/2008 | Choi-Grogan et al. |
| 2008/0134330 | A1 | 6/2008 | Kapoor et al. |
| 2008/0139210 | A1 | 6/2008 | Gisby et al. |
| 2008/0147454 | A1 | 6/2008 | Walker et al. |
| 2008/0160958 | A1 | 7/2008 | Abichandani et al. |
| 2008/0162637 | A1 | 7/2008 | Adamczyk et al. |
| 2008/0162704 | A1 | 7/2008 | Poplett et al. |
| 2008/0164304 | A1 | 7/2008 | Narasimhan et al. |
| 2008/0166993 | A1 | 7/2008 | Gautier et al. |
| 2008/0167027 | A1 | 7/2008 | Gautier et al. |
| 2008/0167033 | A1 | 7/2008 | Beckers |
| 2008/0168275 | A1 | 7/2008 | DeAtley et al. |
| 2008/0168523 | A1 | 7/2008 | Ansari et al. |
| 2008/0177998 | A1 | 7/2008 | Apsangi et al. |
| 2008/0178300 | A1 | 7/2008 | Brown et al. |
| 2008/0183812 | A1 | 7/2008 | Paul et al. |
| 2008/0184127 | A1 | 7/2008 | Rafey et al. |
| 2008/0189760 | A1 | 8/2008 | Rosenberg et al. |
| 2008/0201266 | A1 | 8/2008 | Chua et al. |
| 2008/0207167 | A1 | 8/2008 | Bugenhagen |
| 2008/0212470 | A1 | 9/2008 | Castaneda et al. |
| 2008/0212751 | A1 | 9/2008 | Chung |
| 2008/0219268 | A1 | 9/2008 | Dennison |
| 2008/0221951 | A1 | 9/2008 | Stanforth et al. |
| 2008/0222692 | A1 | 9/2008 | Andersson et al. |
| 2008/0225748 | A1 | 9/2008 | Khemani et al. |
| 2008/0229385 | A1 | 9/2008 | Feder et al. |
| 2008/0229388 | A1 | 9/2008 | Maes |
| 2008/0235511 | A1 | 9/2008 | O'Brien et al. |
| 2008/0240373 | A1 | 10/2008 | Wilhelm |
| 2008/0250053 | A1 | 10/2008 | Aaltonen et al. |
| 2008/0256593 | A1 | 10/2008 | Vinberg et al. |
| 2008/0259924 | A1 | 10/2008 | Gooch et al. |
| 2008/0262798 | A1 | 10/2008 | Kim et al. |
| 2008/0263348 | A1 | 10/2008 | Zaltsman et al. |
| 2008/0268813 | A1 | 10/2008 | Maes |
| 2008/0270212 | A1 | 10/2008 | Blight et al. |
| 2008/0279216 | A1 | 11/2008 | Sharif-Ahmadi et al. |
| 2008/0282319 | A1 | 11/2008 | Fontijn et al. |
| 2008/0293395 | A1 | 11/2008 | Matthews et al. |
| 2008/0298230 | A1 | 12/2008 | Luft et al. |
| 2008/0305793 | A1 | 12/2008 | Gallagher et al. |
| 2008/0311885 | A1 | 12/2008 | Dawson et al. |
| 2008/0313315 | A1 | 12/2008 | Karaoguz et al. |
| 2008/0313730 | A1 | 12/2008 | Iftimie et al. |
| 2008/0316923 | A1 | 12/2008 | Fedders et al. |
| 2008/0318547 | A1 | 12/2008 | Ballou et al. |
| 2008/0318550 | A1 | 12/2008 | DeAtley |
| 2008/0319879 | A1 | 12/2008 | Carroll et al. |
| 2008/0320497 | A1 | 12/2008 | Tarkoma et al. |
| 2009/0005000 | A1 | 1/2009 | Baker et al. |
| 2009/0005005 | A1 | 1/2009 | Forstall et al. |
| 2009/0006116 | A1 | 1/2009 | Baker et al. |
| 2009/0006200 | A1 | 1/2009 | Baker et al. |
| 2009/0006229 | A1 | 1/2009 | Sweeney et al. |
| 2009/0013157 | A1 | 1/2009 | Beaule |
| 2009/0016310 | A1 | 1/2009 | Rasal |
| 2009/0036111 | A1 | 2/2009 | Danford et al. |
| 2009/0042536 | A1 | 2/2009 | Bernard et al. |
| 2009/0044185 | A1 | 2/2009 | Krivopaltsev |
| 2009/0046707 | A1 | 2/2009 | Smires et al. |
| 2009/0046723 | A1 | 2/2009 | Rahman et al. |
| 2009/0047989 | A1 | 2/2009 | Harmon et al. |
| 2009/0048913 | A1 | 2/2009 | Shenfield et al. |
| 2009/0049156 | A1 | 2/2009 | Aronsson et al. |
| 2009/0049518 | A1 | 2/2009 | Roman et al. |
| 2009/0054030 | A1 | 2/2009 | Golds |
| 2009/0065571 | A1 | 3/2009 | Jain |
| 2009/0067372 | A1 | 3/2009 | Shah et al. |
| 2009/0068984 | A1 | 3/2009 | Burnett |
| 2009/0070379 | A1 | 3/2009 | Rappaport |
| 2009/0077622 | A1 | 3/2009 | Baum et al. |
| 2009/0079699 | A1 | 3/2009 | Sun |
| 2009/0113514 | A1 | 4/2009 | Hu |
| 2009/0125619 | A1 | 5/2009 | Antani |
| 2009/0132860 | A1 | 5/2009 | Liu et al. |
| 2009/0149154 | A1 | 6/2009 | Bhasin et al. |
| 2009/0157792 | A1 | 6/2009 | Fiatal |
| 2009/0163173 | A1 | 6/2009 | Williams |
| 2009/0170554 | A1* | 7/2009 | Want ................ H04M 1/72502 455/552.1 |
| 2009/0172077 | A1 | 7/2009 | Roxburgh et al. |

(56) References Cited

U.S. PATENT DOCUMENTS

2009/0180391 A1 7/2009 Petersen et al.
2009/0181662 A1 7/2009 Fleischman et al.
2009/0197585 A1 8/2009 Aaron
2009/0197612 A1 8/2009 Kiiskinen
2009/0203352 A1 8/2009 Fordon et al.
2009/0217364 A1 8/2009 Salmela et al.
2009/0219170 A1 9/2009 Clark et al.
2009/0248883 A1 10/2009 Suryanarayana et al.
2009/0254857 A1 10/2009 Romine et al.
2009/0257379 A1 10/2009 Robinson et al.
2009/0271514 A1 10/2009 Thomas et al.
2009/0282127 A1 11/2009 LeBlanc et al.
2009/0286507 A1 11/2009 O'Neil et al.
2009/0287921 A1 11/2009 Zhu et al.
2009/0288140 A1* 11/2009 Huber ................ G06Q 20/1235 726/2
2009/0291665 A1 11/2009 Gaskarth et al.
2009/0299857 A1 12/2009 Brubaker
2009/0307696 A1 12/2009 Vals et al.
2009/0307746 A1 12/2009 Di et al.
2009/0315735 A1 12/2009 Bhavani et al.
2009/0320110 A1 12/2009 Nicolson et al.
2010/0017506 A1 1/2010 Fadell
2010/0020822 A1 1/2010 Zerillo et al.
2010/0027469 A1 2/2010 Gurajala et al.
2010/0027525 A1* 2/2010 Zhu ....................... H04W 48/16 370/350
2010/0027559 A1 2/2010 Lin et al.
2010/0030890 A1 2/2010 Dutta et al.
2010/0041364 A1 2/2010 Lott et al.
2010/0041365 A1 2/2010 Lott et al.
2010/0042675 A1 2/2010 Fujii
2010/0043068 A1 2/2010 Varadhan et al.
2010/0069074 A1 3/2010 Kodialam et al.
2010/0071053 A1 3/2010 Ansari et al.
2010/0075666 A1 3/2010 Garner
2010/0080202 A1 4/2010 Hanson
2010/0082431 A1 4/2010 Ramer et al.
2010/0103820 A1 4/2010 Fuller et al.
2010/0113020 A1 5/2010 Subramanian et al.
2010/0121744 A1 5/2010 Belz et al.
2010/0131584 A1 5/2010 Johnson
2010/0142478 A1 6/2010 Forssell et al.
2010/0144310 A1 6/2010 Bedingfield
2010/0151866 A1 6/2010 Karpov et al.
2010/0153781 A1 6/2010 Hanna
2010/0167696 A1 7/2010 Smith et al.
2010/0188975 A1 7/2010 Raleigh
2010/0188990 A1 7/2010 Raleigh
2010/0188992 A1 7/2010 Raleigh
2010/0188994 A1 7/2010 Raleigh
2010/0190469 A1 7/2010 Vanderveen et al.
2010/0191576 A1 7/2010 Raleigh
2010/0191612 A1 7/2010 Raleigh
2010/0191846 A1 7/2010 Raleigh
2010/0192170 A1 7/2010 Raleigh
2010/0192212 A1 7/2010 Raleigh
2010/0195503 A1 8/2010 Raleigh
2010/0197268 A1 8/2010 Raleigh
2010/0198698 A1 8/2010 Raleigh et al.
2010/0198939 A1 8/2010 Raleigh
2010/0235329 A1 9/2010 Koren et al.
2010/0241544 A1 9/2010 Benson et al.
2010/0248719 A1 9/2010 Scholaert
2010/0284327 A1 11/2010 Miklos
2010/0284388 A1* 11/2010 Fantini ................. H04W 48/18 370/338
2010/0287599 A1 11/2010 He
2010/0311402 A1 12/2010 Srinivasan et al.
2010/0318652 A1 12/2010 Samba
2010/0325420 A1 12/2010 Kanekar
2011/0004917 A1 1/2011 Saisa et al.
2011/0013569 A1 1/2011 Scherzer et al.
2011/0019574 A1 1/2011 Malomsoky et al.
2011/0081881 A1 4/2011 Baker et al.
2011/0082790 A1 4/2011 Baker et al.
2011/0110309 A1 5/2011 Bennett
2011/0126141 A1 5/2011 King et al.
2011/0145920 A1 6/2011 Mahaffey et al.
2011/0159818 A1 6/2011 Scherzer et al.
2011/0173678 A1 7/2011 Kaippallimalil et al.
2011/0177811 A1 7/2011 Heckman et al.
2011/0195700 A1 8/2011 Kukuchka et al.
2011/0238545 A1 9/2011 Fanaian et al.
2011/0241624 A1 10/2011 Park et al.
2011/0252430 A1 10/2011 Chapman et al.
2011/0264923 A1 10/2011 Kocher et al.
2011/0277019 A1 11/2011 Pritchard, Jr.
2012/0020296 A1 1/2012 Scherzer et al.
2012/0029718 A1 2/2012 Davis
2012/0101952 A1 4/2012 Raleigh et al.
2012/0108225 A1 5/2012 Luna et al.
2012/0144025 A1 6/2012 Melander et al.
2012/0155296 A1 6/2012 Kashanian
2012/0166364 A1 6/2012 Ahmad et al.
2012/0166604 A1 6/2012 Fortier et al.
2012/0196644 A1 8/2012 Scherzer et al.
2012/0238287 A1 9/2012 Scherzer
2012/0330792 A1 12/2012 Kashanian
2013/0024914 A1 1/2013 Ahmed et al.
2013/0029653 A1 1/2013 Baker et al.
2013/0030960 A1 1/2013 Kashanian
2013/0058274 A1 3/2013 Scherzer et al.
2013/0065555 A1 3/2013 Baker et al.
2013/0072177 A1 3/2013 Ross et al.
2013/0084835 A1 4/2013 Scherzer et al.
2013/0095787 A1 4/2013 Kashanian
2013/0103376 A1 4/2013 Gaddam et al.
2013/0111572 A1 5/2013 Gaddam et al.
2013/0117140 A1 5/2013 Kashanian
2013/0117382 A1 5/2013 Gaddam et al.
2013/0144789 A1 6/2013 Aaltonen et al.
2013/0149994 A1 6/2013 Gaddam et al.
2013/0183937 A1 7/2013 Neal et al.
2013/0275583 A1 10/2013 Roach et al.
2013/0326356 A9 12/2013 Zheng et al.
2014/0066101 A1 3/2014 Lyman et al.
2014/0073291 A1 3/2014 Hildner et al.
2014/0080458 A1 3/2014 Bonner et al.
2014/0241342 A1 8/2014 Constantinof
2015/0149358 A1 5/2015 Robbin et al.
2015/0181628 A1 6/2015 Haverinen et al.

FOREIGN PATENT DOCUMENTS

CN 1345154 A 4/2002
CN 1508734 A 6/2004
CN 1538730 A 10/2004
CN 1567818 A 1/2005
CN 101035308 A 3/2006
CN 1801829 A 7/2006
CN 1802839 A 7/2006
CN 1889777 A 7/2006
CN 101155343 A 9/2006
CN 1867024 A 11/2006
CN 1878160 A 12/2006
CN 1878160 A 12/2006
CN 1937511 A 3/2007
CN 101123553 A 9/2007
CN 101080055 A 11/2007
CN 101115248 A 1/2008
CN 101127988 A 2/2008
CN 101183958 A 5/2008
CN 101335666 A 12/2008
CN 101341764 A 1/2009
CN 101815275 A 8/2010
EP 1098490 A2 5/2001
EP 1289326 A1 3/2003
EP 1463238 9/2004
EP 1503548 A1 2/2005
EP 1545114 6/2005
EP 1545114 A1 6/2005
EP 1739518 1/2007
EP 1772988 4/2007

(56) References Cited

FOREIGN PATENT DOCUMENTS

| | | | |
|---|---|---|---|
| EP | 1850575 | | 10/2007 |
| EP | 1887732 | | 2/2008 |
| EP | 1887732 | A1 | 2/2008 |
| EP | 1942698 | A1 | 7/2008 |
| EP | 1978772 | | 10/2008 |
| EP | 2007065 | | 12/2008 |
| EP | 2007065 | A1 | 12/2008 |
| EP | 2026514 | A1 | 2/2009 |
| EP | 2466831 | A1 | 6/2012 |
| JP | 3148713 | B2 | 3/2001 |
| JP | 2005339247 | A | 12/2005 |
| JP | 2006041989 | | 2/2006 |
| JP | 2006155263 | A | 6/2006 |
| JP | 2006-197137 | | 7/2006 |
| JP | 2006-344007 | | 12/2006 |
| JP | 2007-318354 | | 12/2007 |
| JP | 2008-301121 | | 12/2008 |
| JP | 2009-111919 | | 5/2009 |
| JP | 2009-212707 | | 9/2009 |
| JP | 2009-218773 | | 9/2009 |
| JP | 2009-232107 | | 10/2009 |
| KR | 20040053858 | | 6/2004 |
| WO | 1998058505 | | 12/1998 |
| WO | 1999027723 | A1 | 6/1999 |
| WO | 1999065185 | | 12/1999 |
| WO | 0208863 | | 1/2002 |
| WO | 2002045315 | | 6/2002 |
| WO | 2002067616 | | 8/2002 |
| WO | 2002067616 | A1 | 8/2002 |
| WO | 2002093877 | | 11/2002 |
| WO | 2003014891 | | 2/2003 |
| WO | 2003017063 | | 2/2003 |
| WO | 2003017063 | A2 | 2/2003 |
| WO | 2003017065 | | 2/2003 |
| WO | 2003017065 | A2 | 2/2003 |
| WO | 2003058880 | | 7/2003 |
| WO | 2004028070 | | 4/2004 |
| WO | 2004064306 | A2 | 7/2004 |
| WO | 2004077797 | | 9/2004 |
| WO | 2004095753 | | 11/2004 |
| WO | 2005008995 | | 1/2005 |
| WO | 2005053335 | A1 | 6/2005 |
| WO | 2005083934 | | 9/2005 |
| WO | 2006004467 | | 1/2006 |
| WO | 2006004784 | | 1/2006 |
| WO | 2006012610 | | 2/2006 |
| WO | 2006050758 | | 5/2006 |
| WO | 2006073837 | | 7/2006 |
| WO | 2006077481 | | 7/2006 |
| WO | 2006093961 | | 9/2006 |
| WO | 2006120558 | | 11/2006 |
| WO | 2006130960 | | 12/2006 |
| WO | 2007001833 | | 1/2007 |
| WO | 2007014630 | | 2/2007 |
| WO | 2007018363 | | 2/2007 |
| WO | 2007053848 | | 5/2007 |
| WO | 2007068288 | A1 | 6/2007 |
| WO | 2007069245 | | 6/2007 |
| WO | 2007097786 | | 8/2007 |
| WO | 2007107701 | | 9/2007 |
| WO | 2007120310 | | 10/2007 |
| WO | 2007124279 | | 11/2007 |
| WO | 2007126352 | | 11/2007 |
| WO | 2007129180 | A2 | 11/2007 |
| WO | 2007133844 | | 11/2007 |
| WO | 2008017837 | | 2/2008 |
| WO | 2008051379 | | 5/2008 |
| WO | 2008066419 | | 6/2008 |
| WO | 2008080139 | | 7/2008 |
| WO | 2008080430 | | 7/2008 |
| WO | 2008099802 | | 8/2008 |
| WO | 2009008817 | | 1/2009 |
| WO | 2009091295 | | 7/2009 |
| WO | 2010088413 | | 8/2010 |
| WO | 2010128391 | A2 | 11/2010 |
| WO | 2011002450 | | 1/2011 |
| WO | 2011002450 | A1 | 1/2011 |
| WO | 2011149532 | A1 | 12/2011 |
| WO | 2012047275 | | 4/2012 |

OTHER PUBLICATIONS

3rd Generation Partnership Project, “Technical Specification Group Services and System Aspects; Policy and Charging Control Architecture,” Release 8, Document No. 3GPP TS 23.203, V8.4.0, Dec. 2008.

Alonistioti et al., “Intelligent Architectures Enabling Flexible Service Provision and Adaptability,” 2002.

Amazon Technologies, Inc., “Kindle™ User’s Guide,” 3rd Edition, Copyright 2004-2009.

Chandrasekhar et al., “Femtocell Networks: A Survey,” Jun. 28, 2008.

Chaouchi et al., “Policy Based Networking in the Integration Effort of 4G Networks and Services,” 2004 IEEE.

Cisco Systems, Inc., “Cisco Mobile Exchange (CMX) Solution Guide: Chapter 2—Overview of GSM, GPRS, and UMTS,” Nov. 4, 2008.

Dikaiakos et al., “A Distributed Middleware Infrastructure for Personalized Services,” Nov. 24, 2003.

European Commission, “Data Roaming Tariffs—Transparency Measures,” [online] retrieved from http://web.archive.org/web/20081220232754/http://ec.europa.eu/information_society/activities/roaming/data/measures/index_en.htm, Dec. 20, 2008 [retrieved May 16, 2012].

Farooq et al., “An IEEE 802.16 WiMax Module for the NS-3 Simulator,” Mar. 2-6, 2009.

Han et al., “Information Collection Services for Qos-Aware Mobile Applications,” 2005.

Hartmann et al., “Agent-Based Banking Transactions & Information Retrieval—What About Performance Issues?” 1999.

Hewlett-Packard Development Company, LP, “IP Multimedia Services Charging,” white paper, Jan. 2006.

Hossain et al., “Gain-Based Selection of Ambient Media Services in Pervasive Environments,” Mobile Networks and Applications. Oct. 3, 2008.

Knight et al., “Layer 2 and 3 Virtual Private Networks: Taxonomy, Technology, and Standarization Efforts,” IEEE Communications Magazine, Jun. 2004.

Koutsopoulou et al., “Middleware Platform for the Support of Charging Reconfiguration Actions,” 2005.

Kyriakakos et al., “Ubiquitous Service Provision in Next Generation Mobile Networks,” Proceedings of the 13th IST Mobile and Wireless Communications Summit, Lyon, France, Jun. 2004.

Li, Yu, “Dedicated E-Reading Device: The State of the Art and the Challenges,” Scroll, vol. 1, No. 1, 2008.

Nilsson et al., “A Novel MAC Scheme for Solving the QoS Parameter Adjustment Problem in IEEE802.11e EDCA,” Feb. 2006.

Oppliger, Rolf, “Internet Security: Firewalls and Bey,” Communications of the ACM, May 1997, vol. 40. No. 5.

Rao et al., “Evolution of Mobile Location-Based Services,” Communication of the ACM, Dec. 2003.

Steglich, Stephan, “I-Centric User Interaction,” Nov. 21, 2003.

Van Eijk, et al., “GigaMobile, Agent Technology for Designing Personalized Mobile Service Brokerage,” Jul. 1, 2002.

Zhu et al., “A Survey of Quality of Service in IEEE 802.11 Networks,” IEEE Wireless Communications, Aug. 2004.

Anton, B. et al., “Best Current Practices for Wireless Internet Service Provider (WISP) Roaming”; Release Date Feb. 2003, Version 1.0; Wi-Fi Alliance—Wireless ISP Roaming (WISPr).

Ruckus Wireless—White Paper; “Smarter Wi-Fi for Mobile Operator Infrastructures” 2010.

Accuris Networks, “The Business Value of Mobile Data Offload—a White Paper”, 2010.

Wireless Broadband Alliance, “WISPr 2.0, Apr. 8, 2010”; Doc. Ref. No. WBA/RM/WISPr, Version 01.00.

(56) References Cited

OTHER PUBLICATIONS

Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wi-Fi Alliance Technical Committee Hotspot 2.0 Technical Task Group, "Hotspot 2.0 (Release 1) Technical Specification—Version 1.0.0"; 2012.
Wi-Fi Alliance Hotspot 2.0 Technical Task Group, "Wi-Fi Certified Passpoint™ (Release 1) Deployment Guidelines—Version 1.0—Oct. 2012".
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
"The Construction of Intelligent Residential District in Use of Cable Television Network," Shandong Science, vol. 13, No. 2, Jun. 2000.
"Communication Concepts for Mobile Agent Systems," by Joachim Baumann et al.; Inst. of Parallel and Distributed High-Performance Systems, Univ. of Stuttgart, Germany, pp. 123-135, 1997.
"Prevent iCloud Documents & Data from using your data plan," Oct. 26, 2011; CNET webarchive, by Jason Cipriani.
"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"ASA/PIX: Allow Split Tunneling for VPN Clients on the ASA Configuration Example," Document ID 70917, Jan. 10, 2008.
Dixon et al., Triple Play Digital Services: Comcast and Verizon (Digital Phone, Television, and Internet), Aug. 2007.
3rd Generation Partnership Project; "Technical Specification Group Services and System Aspects; IP Flow Mobility and seamless WLAN offlload; Stage 2," Release 10, Document No. 3GPP TS 23.261, V1.0.0, Mar. 2010.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
Ahmed et al., "Multi Access Data Network Connectivity and IP Flow Mobility in Evolved Packet System (EPS)," 2010 IEEE.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Kassar et al., "An overview of vertical handover decision strategies in heterogeneous wireless networks," ScienceDirect, University Pierre & Marie Curie, Paris, France, Jun. 5, 2007.
Schiller et al., "Location-Based Services," The Morgan Kaufmann Series in Data Management Systems, 2004.
Sadeh et al., "Understanding and Capturing People's Privacy Policies in a Mobile Social Networking Application," ISR School of Computer Science, Carnegie Mellon University, 2007.
Jing et al., "Client-Server Computing in Mobile Environments," GTE Labs. Inc., Purdue University, ACM Computing Surveys, vol. 31, No. 2, Jun. 1999.
Rivadeneyra et al., "A communication architecture to access data services through GSM," San Sebastian, Spain, 1998.
Loopt User Guide, metroPCS, Jul. 17, 2008.
"Jentro Technologies launches Zenlet platform to accelerate location-based content delivery to mobile devices," The Mobile Internet, Boston, MA, Feb. 2008.
"Ads and movies on the run," the Gold Coast Bulletin, Southport, Qld, Jan. 29, 2008.
Richtel, "Cellphone consumerism; If even a debit card is too slow, now you have a new way to act on impulse: [National Edition]," National Post, Canada, Oct. 2, 2007.
Kim, "Free wireless a high-wire act; MetroFi needs to draw enough ads to make service add profits," San Francisco Chronicle, Aug. 21, 2006.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Sabat, "The evolving mobile wireless value chain and market structure," Nov. 2002.
Nuzman et al., "A compund model for TCP connection arrivals for LAN and WAN applications," Oct. 22, 2002.
Kuntze et al., "Trustworthy content push," Fraunhofer-Institute for Secure Information Technology SIT; Germany; WCNC 2007 proceedings, IEEE.
Blackberry Mobile Data System, version 4.1, Technical Overview, 2006.
Client Guide for Symantec Endpoint Protection and Symantec Network Access Control, 2007.
Ehnert, "Small application to monitor IP trafic on a Blackberry—1.01.03", Mar. 27, 2008; http://www.ehnert.net/MiniMoni/.
NetLimiter Lite 4.0.19.0; http://www.heise.de/download/netlimiter-lite-3617703.html from vol. 14/2007.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Fujitsu, "Server Push Technology Survey and Bidirectional Communication in HTTP Browser," Jan. 9, 2008 (JP).
Roy et al., "Energy Management in Mobile Devices with the Cinder Operating System", Stanford University, MIT CSAIL, Jun. 3, 2010.
Windows7 Power Management, published Apr. 2009.
Quintana, David, "Mobile Multitasking," Apr. 14, 2010.
Open Mobile Alliance (OMA), Push Architecture, Candidate Version 2.2; Oct. 2, 2007; OMA-AD-Push-V2_2-20071002-C.
Android Cupcake excerpts, The Android Open Source Project, Feb. 10, 2009.

* cited by examiner

| Service Processor 115 Embodiment | Partial Summary of Embodiment Functions |
|---|---|
| Service Control Device Link 1691 | Device side control plane link for connecting Service Processor 115 to Service Controller. In some embodiments, also serves as the link for the agent heartbeat function. |
| Access Control Integrity Agent 1694 | Collects device information on service policy, service usage, agent configuration and agent behavior. Cross checks this information to identify integrity breaches in the service policy implementation and control system. Initiates action when a service policy violation or a system integrity breach is suspected. In some embodiments, verifies configuration of other agents or performs challenge-response sequence testing. In some embodiments, monitors software loading activity, protected memory access or communication with Service Processor agents to detect unauthorized changes to Service Processor software or configuration. |
| Policy Control Agent 1692 | Takes policy instructions from the network and sets instantaneous device service policy. In some embodiments, performs a policy control function to adapt instantaneous service policies to achieve a service usage objective. |
| Policy Implementation Agent 1690 | Implements traffic control and QoS policy rules for device. In some embodiments, provides the functions of access control and/or firewall function or perform traffic inspection and characterization. In some embodiments, packet inspection is aided by literal or virtual application layer tagging while in other embodiments packet inspection is performed completely in the Policy Implementation Agent 1690. |
| Service Monitor Agent 1696 | Records and reports device service usage. In some embodiments, assists in communicating application tagging of traffic flows through the networking stack policy implementation. In some embodiments, maintains a history and provides reports or summary reports of which networks in addition to the networks controlled by the Service Controller that the device has connected to. In some embodiments, this network activity summary may include a summary of the networks accessed, activity vs. time per connection, traffic vs. time per connection. |
| Application Interface Agent 1693 | Rich feature interface for device application programs. In some embodiments, identifies application level traffic, reports service usage, or tags traffic for service QoS control. In some embodiments, interacts with applications or programs applications to arrange application settings such as email file transfer options or browser headers. In some embodiments, intercepts certain application traffic to modify traffic application layer parameters such as email file transfer options or browser headers. In some embodiments, implements certain aspects of traffic control or other service policies. In some embodiments, provides the functions of traffic control, access control, and/or firewall. |

FIG. 30A

| Service Processor 115 Embodiment | Partial Summary of Embodiment Functions |
|---|---|
| Modem Firewall 1655 | Blocks or passes traffic based on service policies and traffic attributes. In some embodiments, assists in traffic flow tagging. In some embodiments, provides the functions of traffic control and/or access control. |
| Billing Agent 1695 | Detects and reports billing events. In some embodiments, interacts with the User Interface Agent 1697 to provide the user with service plan options, accept service plan selections, provide notification on service usage levels, provide options on service usage control policy, accept choices on service usage policy, provide transaction options, or accept transaction choices. In some embodiments, interacts with Transaction Servers 134 to conduct e-commerce transactions with central billing. |
| User Interface Agent 1697 | Provide service interface to users |
| Service Downloader 1663 | Provides a download function to install or update service software elements on the device. |
| Connection Manager 1804 | Provides a control and supervision function for one or more modem drivers or modems that connect to an access network. |
| Modem Selection and Control 1811 | Selects the access network connection. |
| Modem Drivers 1831, 1815, 1814, 1813, 1812 | Converts data traffic into modem bus traffic for one or more modems. |
| Modems 2141, 2125, 2124, 2123, 2122 | Connects the device to one or more networks. |

FIG. 30B

| Service Controller 122 Element | Partial Summary of Embodiment Functions |
|---|---|
| Service Control Server Link 1638 | Network side control plane link for connecting Service Controller 122 Service Processor 115 device agents. In some embodiments, also serves as the link for the agent heartbeat function. |
| Access Control Integrity Server 1654 | Collects device information on service policy, service usage, agent configuration, and agent behavior. Cross-checks this information to identify integrity breaches in the service policy implementation and control system. Initiates action when a service policy violation or a system integrity breach is suspected. |
| Policy Management Server 1652 | Transmits policies to the Service Processor 115. |
| Access Network AAA Server 121 | Provides access control and authorization functions for the device access layer. Records and reports device network service usage. |
| Service History Server 1650 | Collects and records service usage reports from the Access Network AAA Server 121 and the Service Monitor Agent 1696. In some embodiments, maintains a history of which networks in addition to the networks controlled by the Service Controller that the device has connected to. In some embodiments, this network activity summary may include a summary of the networks accessed, activity vs. time per connection, traffic vs. time per connection. In some embodiments, this activity summary is further analyzed or reported to estimate the type of service plan associated with the traffic activity for the purpose of bill sharing reconciliation. |
| Central Provider Billing System 123 | Provides mediation function for central provider billing events. Accepts service plan changes. In some embodiments, provides updates on device service usage, service plan limits, or service policies. |
| Billing Event Server 1662 | In some embodiments, collects billing events, provides service plan information to the Service Processor 115, provides service usage updates to the Service Processor 115, serves as interface between device and Central Provider Billing System 123, or provides trusted third-party function for certain e-commerce billing transactions. |
| Network Traffic Analysis Server 1656 | Collects service usage history for devices or groups of devices and analyzes the service usage. In some embodiments, presents service usage statistics in various formats to identify improvements in network service quality or service profitability. In other embodiments, estimates the service quality or service usage for the network under variable settings on potential service policy. In other embodiments, identifies actual or potential service behaviors by one or more devices that are causing problems for overall network service quality or service cost. |
| Beta Test Server 1658 | Publishes candidate service plan policy setting to one or more devices. In some embodiments, provides summary reports of network service usage or user feedback information for one or more candidate service plan policy setting. In some embodiments, provides a means to compare the beta test results for different candidate service plan policy settings or select the optimum candidates for further setting optimization. |
| Service Download Control Server 1660 | Provides a download function to install or update service software elements on the device. |
| Transaction Server 134 | Provides an electronic commerce offer and transaction platform to the device. |

FIG. 31

| Example Service Processor Heartbeat Parameter Embodiment | Description | Frequency |
|---|---|---|
| Access control integrity report | Contains the latest results of the Access Control Integrity agents Service Processor system checks and reports any error events. | Not necessary to report in every heartbeat if there are no errors. Can report only on error, set a minimum frequency, or respond to Service Controller polling. |
| Service monitor report | Reports filtered summary of Service Monitor Agent measurements. Summary reduces control traffic and filters out unauthorized private information. | Every heartbeat. Some embodiments link this to amount of data usage in the data path to keep overhead low. Report immediately upon polling from Service Controller. |
| Billing event report | Reports any billing activity since the last heartbeat. Billing events may include service usage events, transaction events, bill by account records, bill by account offset reports, or any other event that results in a billing event report. | Send upon billing event. Report immediately upon polling from Service Controller. |
| Service Processor settings report | Reports service policy settings for all Service Processor agents. | Not necessary to send every heartbeat. Some embodiments link this to amount of data usage to reduce overhead. Can report every N heartbeats. Report immediately upon polling from Service Controller. |
| Customer resource management report | Reports filtered summary of Service Monitor Agent measurements or filtered summary of other device or user activity such as service preferences, advertisement behavior, and location. Summary reduces control traffic and filters out unauthorized private information. | Not necessary to send every heartbeat. Some embodiments link this to amount of data usage to reduce overhead. Can report every N heartbeats. Report immediately upon polling from Service Controller. |
| Responses to Service Processor agent queries | Sends agent responses to challenge-response queries from the Service Controller. | Report immediately upon polling from Service Controller. |

FIG. 34A

| Example Service Processor Heartbeat Parameter Embodiment | Description | Frequency |
|---|---|---|
| Location tracking service update | Reports filtered summary of location tracking information. Summary reduces control traffic and filters out unauthorized private information. | Not necessary to send every heartbeat. Some embodiments call for a minimum time based transmission frequency. |
| Service usage based transmission frequency | Lowers overhead by buffering and reserving heartbeat communications from agents and servers until a certain amount of data has been transmitted or received in the network, or a certain amount of service has been consumed. When the parameters are chosen properly, this can result in the network control plane traffic overhead being a small percentage of data path traffic or result in the control plane traffic cost being a small percentage of the service usage cost. | Ranges depending on settings. For example, if there are five agent messages that typically need to be communicated, and each message is less than 100 bytes, and Service Processor heartbeat framing plus network overhead would result in a packet size of less than 1,000 bytes, and the heartbeat packet is transmitted when 10,000,000 bytes have been communicated over the data path, then the overhead loss due to one heartbeat packet in each direction is less than 0.02% |
| Constant frequency transmissions | Since the device may be offline for long periods of time where the Service Control Processor needs to verify service control integrity, in some embodiments it can be advantageous to transmit heartbeat packets at a minimum rate regardless of data traffic activity. This is accomplished by setting a timer that sends queued heartbeat packets on a regular schedule. | Ranges depending on settings and applications. |
| Service Controller polled transmissions | In some embodiments, the Service Controller may poll the Service Processor for a heartbeat transmission at which time the Service Processor will frame and transmit all queued heartbeat messages. | Ranges depending on applications. In some embodiments, this is used as an on demand function, while in others it is used as a way to set heartbeat transmission timing functions in the Service Controller. |
| Service Processor polled transmissions | In some embodiments, the Service Processor polls the Service Controller for a heartbeat transmission at which time the Service Controller will frame and transmit all queued heartbeat messages. | Ranges depending on applications. In some embodiments, this is used as an on demand function, while in others it is used as a way to set heartbeat transmission timing functions in the Service Processor. |

FIG. 34B

| Example Service Process or Heartbeat Parameter Embodiment | Description | Frequency |
|---|---|---|
| Agent self-check reports | Agent reports results of various agent self-diagnosis procedures to ensure that the agent is properly configured, operating properly, properly implementing service control policy, or has not been tampered with. [provide examples which are extensions of typical software security self diagnosis reporting] | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Environment reports | One or more agents scan the storage or execution environment for one or more of the agents to identify potential threats to the integrity of the service implementation or agent integrity and makes a report. In one example embodiment, a scan is done to determine if unauthorized software or hardware is executing in a secure agent environment. In another embodiment, a scan is done to determine the software that has been loaded into a portion of the device operating environment, memory, or storage, and the software list is referenced against a known threat list. In another example embodiment, the list of entities that accessed one or more agents is scanned to determine if an unauthorized access to an agent has occurred. In another embodiment, a scan is performed to determine if unauthorized access to secure execution environment, memory, or storage has occurred. In another example embodiment, the network access pattern for the device is logged and analyzed to determine if there is an access pattern that is known to be associated with a threat to service or agent control integrity. In another example embodiment, the internal device software, memory, or peripheral access pattern is logged and analyzed to determine if there is an access pattern that is known to be associated with a threat to service or agent control integrity. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |

FIG. 34C

| Example Service Processor Heartbeat Parameter Embodiment | Description | Frequency |
|---|---|---|
| User notification response reports | Billing agent, UI agent, or other agent logs user notification events and the response of the user to the notification event. In some embodiments, these events may be cross-referenced to the notification policy that should be in force on the device and the device service usage to ensure that the proper notification sequences are being adhered to. In other embodiments, the user notification responses are logged and used to document user choices to notification events, billing event decisions, service control decisions, or service cost control decisions. In some embodiments, the user may be asked to provide a password, biometric signature, hardware key, or other mechanism to positively identify that the user is in possession of the device or to verify that the service is operating properly or is implemented properly. In some embodiments, the user may be asked to acknowledge a service overage notification and/or to also provide a password, biometric signature, hardware key, or other mechanism to verify the service overage acknowledgement. | In some embodiments, a report is made during every heartbeat transmission. In other embodiments, the report is generated by a request from the Service Controller. In other embodiments, the report is generated by timing determined by the device, for example, when there has been a user notification sequence action with the user. In some embodiments, the report is generated when there is a verification error of some kind that is identified. |
| User warning response reports | Billing agent, UI agent, or another agent logs user warning events and the response of the user to warning event. In some embodiments, the user response is used to determine if the user is in positive control of the device. In some embodiments, the response is used to confirm that the user acknowledges a billing overage or other service cost event. In some embodiments, the user may be asked to provide a password, biometric signature, hardware key, or other mechanism to positively identify that the user is in possession of the device or to verify that the service is operating properly or is implemented properly. | In some embodiments, a report is made during every heartbeat transmission. In other embodiments, the report is generated by a request from the Service Controller. In other embodiments, the report is generated by timing determined by the device, for example, when there has been a warning sequence action with the user. In some embodiments, the report is generated when there is a verification error of some kind that is identified. |

FIG. 34D

| Example Service Processor Heartbeat Parameter Embodiment | Description | Frequency |
|---|---|---|
| Agent communication log reports | Reports entities that established or attempted to establish communication with the agents. In one embodiment, reports a list of entities and the number of times the entity communicated or attempted to communicate with the agent. In other embodiments, reports an error flag when unauthorized entities attempt to establish communication with an agent | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Service usage synchronization data | IPDR or other data that is used to synchronize the device service usage counters. In some embodiments, the data is time-stamped so that the service usage at the point in time may be reconciled between the local device usage count and the network-based usage count, and then the local device usage count since the point in time may be used to estimate the present real-time usage count. In some embodiments, the service usage data from the device is used by the network as the actual service usage or billing data base for the device. In other embodiments, a bill by account function is included in the service usage synchronization data so that the service usage may be billed to different accounts other than a single or main user account. | Service usage synchronization is continuous with each heartbeat in some embodiments. In other embodiments, service usage synchronization is based on a push from the Service Controller or other network function that sends the IPDR information to the device. In other embodiments, the device requests a synchronization data transmission. |
| Service cost synchronization data | Information to reconcile a service cost estimate on the local device with a service cost count from a network-based function. Similar to the service usage count, in some embodiments the service cost information is time-stamped so that service cost at a point in time may be reconciled between the device and the network-based function, and then a local measure of service cost may be used to estimate the present real-time service cost. In some embodiments, the local service cost is determined by taking recorded billing events and looking up the cumulative cost of one or more billing events using a service usage to cost look up database stored locally on the device or available from a network function. In some embodiments, service cost estimation is done entirely in the network and the result is pushed out to the device UI. In other embodiments, service cost estimation is done in the device based on local usage estimates and a local usage to cost lookup table. | Service usage synchronization is continuous with each heartbeat in some embodiments. In other embodiments, service usage synchronization is based on a push from the Service Controller or other network function that sends the IPDR information to the device. In other embodiments, the device requests a synchronization data transmission. |

FIG. 34E

| Example Service Processor Heartbeat Parameter Embodiment | Description | Frequency |
| --- | --- | --- |
| Available network information and roaming information | Device receives available network or available roaming service provider information from a network function. The available network or roaming service information may include the potential network service or roaming service a device or user may choose to select, or the network service or roaming service the user has already selected. In some embodiments, this information includes service cost information to aid the device or the user in determining the potential or actual costs of service usage while using the available network or roaming network. In some embodiments, the service cost information is used to help the user in selecting the available network provider or roaming service provider. In some embodiments, the available network cost information or roaming cost information is combined with a measure of expected or possible service usage to estimate how much a typical usage scenario may cost. In some embodiments, the available network information or roaming information is used to help the user estimate the present available network or roaming service charges for services used to date. In some embodiments, service usage is recorded and sent to a network function that estimates the current service cost. In other embodiments, the service cost is estimated locally on the device based on a service usage estimate and a service usage to cost look up function. In other embodiments, the service cost is derived by querying the available network or roaming network billing system. | In some embodiments, available network information or roaming information is requested by the device. In other embodiments, the information is periodically updated by the Service Controller or other network function that contains the information. |

FIG. 34F

| Example Service Processor Heartbeat Parameter Embodiment | Description | Frequency |
| --- | --- | --- |
| System messages and responses | In some embodiments, the heartbeat function may be used as a secure control channel to display a system message or screen that is generated by a network function or server to the end user and possibly report user inputs to the UI message or screen. | System messages are generated by the Service Controller and transmitted as needed in some embodiments. In other embodiments, some system messages are generated in response to user input or requests. In other embodiments, system messages are generated on a regular time table or in accordance with a certain amount of service usage. |
| UI screen messages and responses | In some embodiments, the heartbeat function may be used as a secure control channel to display a user interface message or screen that is generated by a network function or server to the end user and possibly report user inputs to the UI message or screen. Examples include service usage UI, service choice UI, upgrade UI, transaction UI, marketing UI, billing UI, user identity confirmation UI, user service warning UI, user potential service tamper response request UI, etc. | UI screen messages are generated by the Service Controller and transmitted as needed in some embodiments. In other embodiments, some user UI messages are generated in response to user input or requests. In other embodiments, UI messages are generated on a regular time table or in accordance with a certain amount of service usage. |
| Local agent check-in history | Logs and reports agent check-ins or self-reports that are made to a local agent integrity verification function. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. |
| Software install report | Logs and reports one or more aspects of software installs that have occurred on the device. | In some embodiments, a report is made during every heartbeat transmission. In other embodiments, the report is generated by a request from the Service Controller. In other embodiments, the report is generated by timing determined by the device. In some embodiments, the report is generated when there is a verification error of some kind that is identified. In some embodiments, the report is generated when new software is installed. |

FIG. 34G

| Example Service Process or Heartbeat Parameter Embodiment | Description | Frequency |
|---|---|---|
| Test billing event | In some embodiments, the Service Controller or other network function may send or cause a test billing event wherein the device triggers a local billing sequence for the purpose of verifying that the billing sequence is properly logged, conducted, and reported. The billing sequence can be related to a service usage event or sequence, a transaction event or sequence, or any other event or sequence that should result in a billing event. | In some embodiments, the test billing event timing is determined by the Service Controller or other network function. In others it is generated by the device or on a regular schedule. |
| Test service event | In some embodiments, the Service Controller or other network function may send or cause a service usage event wherein the device triggers a local service usage event or sequence for the purpose of verifying that the service usage event or sequence is properly logged and reported. | In some embodiments, the test service usage event timing is determined by the Service Controller or other network function. In others it is generated by the device or on a regular schedule. |

FIG. 34H

| Service Policy Implementation Verification Technique Embodiments | Example Error Trigger Criteria Embodiments | Example Error Response Embodiments |
|---|---|---|
| Verify service usage measure in network is consistent with expected service behavior. | Network service usage measure is in conflict with expected service usage. Examples: traffic usage outside limits, address access outside limits, data rate outside limits, traffic shaping rules not being followed. | In some embodiments, the severity of the error and/or the persistence of the error and/or the existence of the other errors are used to determine the appropriate response or action. In some embodiments, reset service policies and see if errors persist. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device-based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service inspection process, or usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify service usage measure at device is consistent with expected service behavior. | Device service usage measure is in conflict with expected service usage. Examples: traffic usage too high, address access outside limits, email accessed against policy. | Same as above. |

FIG. 35A

| Service Policy Implementation Verification Technique Embodiments | Example Error Trigger Criteria Embodiments | Example Error Response Embodiments |
|---|---|---|
| Verify service usage measure in network is consistent with service usage measure at device. | Device service usage measure varies significantly from network service usage measure. | Same as above. |
| Verify service usage measure at one point in device is consistent with service usage measure at a second point in device. | Service usage measure at one point in device stack that is inconsistent with another point indicates error or potential parasitic usage. | Same as above. In some embodiments, the differences in service measures on the device may be used to evaluate the nature of the service usage policy implementation problem. |
| Verify that service policies in effect are as intended. | Service policy setting queries result in settings that are different than intended. | In some embodiments, reset service policies and see if error persists. If this does not clear the error, or if this is not the error correction method employed, then perform one or more of the following actions: In some embodiments, perform agent query/response to determine agent integrity. In some embodiments, run dynamic agent load, in some cases with different encryption, sequencing, or obfuscation for the new agent code to refresh one or more agents. In some embodiments, a user query or warning is sent to the UI to notify the user, confirm that the device is in the user's possession, or involve the user in the process of determining the source or error or to assist in verifying the device-based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 35B

| Service Policy Implementation Verification Technique Embodiments | Example Error Trigger Criteria Embodiments | Example Error Response Embodiments |
|---|---|---|
| Verify presence of Service Processor agents | Agent does not respond to agent communication or query-response | In some embodiments, run dynamic agent load, in some cases with different encryption, sequencing or obfuscation for the new agent code to refresh one or more agents. If this does not clear the error, or if this is not the error correction method employed, then perform one or more of the following actions:<br>In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify configuration of Service Processor agents | Agent configuration audit or configuration self check fails. | In some embodiments, run dynamic agent load, in some cases with different encryption, sequencing or obfuscation for the new agent code to refresh one or more agents. If this does not clear the error, or if this is not the error correction method employed, then perform one or more of the following actions:<br>In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments , the device is placed on a SPAN process, or a similar traffic or service inspection process, or another service usage watch status, to closely monitor service behavior and determine if it is consistent with the service usage policy that is<br>*(cont. on FIG. 35D)* |

FIG. 35C

| Service Policy Implementation Verification Technique Embodiments | Example Error Trigger Criteria Embodiments | Example Error Response Embodiments |
|---|---|---|
| | | intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify billing events are reported or are reported properly | Billing Agent query reveals logged billing events that have not been reported. | In some embodiments, perform a billing event test to determine if the billing event reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 35D

| Service Policy Implementation Verification Technique Embodiments | Example Error Trigger Criteria Embodiments | Example Error Response Embodiments |
|---|---|---|
| Verify network reported service usage measure are consistent with reported device billing data. | Billing agent is not properly reporting billing events for service usage, transactions , bill by account, or other billing event functions. | In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed , then perform one or more of the following actions: In some embodiments the severity of the error and/or the persistence of the error and/or the existence of other errors are used to determine the appropriate response or action. In some embodiments, reset service policies and see if error persists. In some embodiments , perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place . In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system , such as email or text messaging, as an alternative to or in addition to a message sent to the device. In some embodiments, an error message is sent to a human interface in the network for further error analysis. |
| Verify device reported service usage measure are consistent with reported device billing data. | Billing agent reports are inconsistent with service usage reports. | In some embodiments, perform a billing event test to determine if the billing event reporting sequence is operating properly. In some embodiments, run dynamic agent load, in some cases with different encryption, sequencing or obfuscation for the new agent code to refresh one or more agents. In some embodiments, perform a service usage test to determine if the service usage reporting sequence is operating properly . In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In *(cont. on FIG. 35F)* |

FIG. 35E

| Service Policy Implementation Verification Technique Embodiments | Example Error Trigger Criteria Embodiments | Example Error Response Embodiments |
|---|---|---|
| | | some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Send test billing event through device and verify it is reported. | Test billing event is not properly reported by the device. | In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being *(cont. on FIG. 35G)* |

FIG. 35F

| Service Policy Implementation Verification Technique Embodiments | Example Error Trigger Criteria Embodiments | Example Error Response Embodiments |
|---|---|---|
| | | sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify device reports billing events reported from transaction servers. | Transaction server receipts do not correspond with billing events from device. | In some embodiments, perform checks to determine if transaction server receipts are valid. In some embodiments, run dynamic agent load, in some cases with different encryption, sequencing or obfuscation for the new agent code to refresh one or more agents. If this does not clear the error, or if these are not the error correction methods employed, then perform one or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 35G

| Service Policy Implementation Verification Technique Embodiments | Example Error Trigger Criteria Embodiments | Example Error Response Embodiments |
|---|---|---|
| Verify activation tracking system presence, configuration or operation | Activation tracking service is not present, is not providing scheduled network activity reporting, or is exhibiting erroneous reports. | In some embodiments the response is to place the device ID. on a list of devices suspected of having activation tracking functions that have been tampered with for the purpose of central provider billing reconciliation. In some embodiments, install a new copy of the activation tracking service agent software either from a locally stored device copy or a network download. In some embodiments where authorization exists to manage device software and some aspects of service tracking, run further checks on device service integrity such as agent query-response. In some embodiments where authorization exists to manage a device access service connection, send error message to device UI, suspend device or place device on quarantine route. In some embodiments send error message to human interface for troubleshooting. |
| Verify device standing or service plan standing | No service plan on record or device not authorized | In some embodiments, if device is not yet activated with a service plan, provide UI with activation sequence. In some embodiments, if device is not authorized for service on one of the networks controlled by the Service Controller, send the UI an error message instructing the user how to proceed. In some embodiments, configure the Service Processor for the ambient service intended for that device. In some embodiments, download the appropriate Service Processor agent software that is appropriate for that device. |
| Verify proper operation of Service Processor agents | Check input to output relationship on Policy Implementation agent, Firewall agent. Check billing event reports to verify events are being recorded. Check application and traffic inspection tagging system correctly tagging traffic. Verify Service Processor heartbeat reports proper agent integrity self-checks, cross-checks and query/response sequences with Service Controller. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being *(cont. on FIG. 35I)* |

FIG. 35H

| Service Policy Implementation Verification Technique Embodiments | Example Error Trigger Criteria Embodiments | Example Error Response Embodiments |
|---|---|---|
| | | sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Service Processor heartbeat response reports | One or more of the heartbeat reports indicate an error in operation, configuration, or tamper and error prevention system. Heartbeat function not functioning properly but device is still indicating service usage on the network. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Test service event | Service usage reporting system does not properly report test service usage event | In some embodiments, run dynamic agent load, in some cases with different encryption, sequencing or obfuscation for the new agent code to refresh one or more agents. If this does not clear the error, or if this is not the error correction method employed, then perform one or more of the following actions: In some embodiments, reset service policies and see if error persists. In some embodiments, perform agent settings check to verify that *(cont. on FIG. 35J)* |

FIG. 35I

| Service Policy Implementation Verification Technique Embodiments | Example Error Trigger Criteria Embodiments | Example Error Response Embodiments |
|---|---|---|
| | | agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing test event to determine if the device is properly reporting billing events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Load a fresh version of Service Processor software and perform integrity reports | After fresh load of Access Control Integrity Agent, agent discovers one or more of the other agents are corrupted | Run dynamic agent load, in some cases with different encryption, sequencing or obfuscation for the new agent code to refresh other agents and see if problem persists. If this does not clear the error, or if this is not the error correction method employed, then perform one or more of the following actions: In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the *(cont. on FIG. 35K)* |

FIG. 35J

| Service Policy Implementation Verification Technique Embodiments | Example Error Trigger Criteria Embodiments | Example Error Response Embodiments |
|---|---|---|
| | | user messages are sent through an alternative messaging system, such as email or text messaging, as an alternative to or in addition to a message sent to the device. In some embodiments, an error message is sent to a human interface in the network for further error analysis. |
| Verify Service Processor code configuration with agent self diagnosis checks | One or more of the agents indicates an error after running a self-check | Run dynamic agent load, in some cases with different encryption, sequencing or obfuscation for the new agent code to refresh other agents and see if problem persists. If this does not clear the error, or if this is not the error correction method employed, then perform one or more of the following actions:<br>In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify that device uses service only after being authorized | Device gains access to the network and does not check in with the Access Control Integrity Server and service measures indicate device is on the network. | In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is *(cont. on FIG. 35L)* |

FIG. 35K

| Service Policy Implementation Verification Technique Embodiments | Example Error Trigger Criteria Embodiments | Example Error Response Embodiments |
|---|---|---|
| | | placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments , an error message is sent to a human interface in the network for further error analysis. |
| Verify user standing | User does not respond with proper response to UI query such as request for ID. , password or biometric input. This process may be part of handling a suspected error. | In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments , an error message is sent to a human interface in the network for further error analysis. In some embodiments, the user may be asked to acknowledge a service overage notification and/or to also provide a password, biometric signature, hardware key or other mechanism to verify the service overage acknowledgment. |

FIG. 35L

| Service Policy Implementation Verification Technique Embodiments | Example Error Trigger Criteria Embodiments | Example Error Response Embodiments |
|---|---|---|
| Agent communications log | Unauthorized communications with one or more agents is detected | In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 35M

| Service Policy Implementation Tamper or Error Protection Techniques | Example Error Trigger Criteria | Example Error Responses |
|---|---|---|
| Detect or block device networking activity that is potentially harmful for the operation of Service Processor. | Network activity is observed in service monitor reports that fit known patterns that indicated harmful software may be present on device. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Detect or block unauthorized Service Processor software from being loaded. | Access Control Integrity Agent discovers software that is on a known malicious list. | Same as above. |
| Detect or block unauthorized access of protected Service Processor software or hardware memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code . In some embodiments send message to UI and either suspend device, place on SPAN, place on watch list, place on further action list or place on quarantine network. In some embodiments send error message to human interface for troubleshooting. |
| Detect or block unauthorized communication with Service Processor software or hardware. | Unauthorized communication is detected. | Same as above. |
| Secure loader with signed SW installed into protected memory | Unauthorized access is detected, memory contents are corrupted or unresponsive. | Same as above. |
| Secure encrypted communication between Service Processor agents. | Secure communication link is in error or unauthorized access is detected. | Identify the entity that has gained access to the Service Processor if possible and eradicate. In some embodiments repair any compromised agents with dynamic agent load, in some cases with different encryption, sequencing or obfuscation for the new agent code. In some embodiments, run dynamic agent load, in some cases with different encryption, sequencing or obfuscation for the new agent code to refresh agents with communication links that are in error or entire Service Processor. In some embodiments send message to UI and either suspend device, place on SPAN, place on watch list, place on further action list or place on quarantine network. In some embodiments send error message to human interface for troubleshooting. |

FIG. 36A

| Service Policy Implementation Tamper or Error Protection Techniques | Example Error Trigger Criteria | Example Error Responses |
|---|---|---|
| Secure encrypted communication between Service Processor and Service Controller. | Service Processor communication is lost. | Send error message to device UI (if possible), suspend device, place on SPAN, place on watch list, place on further action list or place device on quarantine route. In some embodiments send error message to human interface for troubleshooting. |
| Execution of Service Processor software within secure memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Storage of service processor software in secure memory | Secure memory violation or Service Processor stored in non-secure memory | Same as above. |
| Detection or removal of software thought to be harmful to Service Processor operation. | Unauthorized software is detected. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Recording and reporting of software loading signatures, software activity signatures or network activity signatures for later identification of threat sequences. | Unauthorized software or malicious network activity is detected | Same as above. |

FIG. 36B

| Service Policy Implementation Tamper or Error Protection Techniques | Example Error Trigger Criteria | Example Error Responses |
|---|---|---|
| Implement critical Service Processor software as a self-refreshing program that resists corruption by running self-audit and reinstall processes such as placing audit function in inaccessible memory or OS functions or bios. | Re-installation function alerts that re-installation has been required. Continued re-installations or failure to re-install alert increases severity of warnings. | Identify the entity that has gained access to the Service Processor if possible and eradicate. In some embodiments send message to UI and either suspend device, place on SPAN, place on watch list, place on further action list or place on quarantine network. In some embodiments send error message to human interface for troubleshooting. |
| Encrypted agent code | Code check, agent query-response, agent self check or other agent configuration check discovers error in code encryption | In some embodiments repair any compromised agents with dynamic agent load, in some cases with different encryption , sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Obfuscated agent code | Code check, agent query-response, agent self check or other agent configuration check discovers error in code obfuscation | Same as above. |
| Unique agent identification numbers and signatures | Agent is discovered to have an incorrect ID or fails signature | Same as above. |
| Secure agent communication bus | Agent communication bus monitoring discovers unauthorized communication or other unauthorized access to one or more agents is discovered | Same as above. |
| Agent level message encryption | Agent is found to be communicating without the required level of agent communication encryption | Same as above. |

FIG. 36C

| Service Policy Implementation Tamper or Error Protection Techniques | Example Error Trigger Criteria | Example Error Responses |
|---|---|---|
| Service control link message level encryption | Unauthorized communication traffic is discovered on service control link | In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Service control link transport layer encryption | Unauthorized communication traffic is discovered on service control link | Same as above. |
| Agent communication access permissions | Unauthorized communication is discovered with one or more agents | Same as above. |
| Agent communication log | Unauthorized communication is discovered with one or more agents | Same as above. |
| Encrypted agent code for downloads | Agent download is found to have incorrect or absent encryption or signature | Same as above. |
| Secure downloader memory | Unauthorized access to or storage in secure downloader memory is discovered | Same as above. |

FIG. 36D

| Example Device CRM Data Collection and Reporting Classification | Partial Description | Example Sensitivity Level Classification | Example Authorization Level to Include in Report |
|---|---|---|---|
| Basic non-specific service usage parameters | User sensitive information is filtered from this report, which is used for purposes such as service control, service control integrity monitoring, or network traffic analysis. | Low | None |
| Service billing events or service plan selection events | Documents user selection process from service plan selection or billing options. | Low | Customer authorization with basic service agreement or enterprise agreement. |
| Transaction billing events | Documents user selection process from service plan selection or billing options. | Low | Customer authorization with central billing agreement or enterprise agreement. |
| Device location -- customer location based service assist | Reports customer location for the purpose of assisting with location-based services such as directions, yellow pages, shopping, and social networking. | High | Customer authorization with basic service agreement or enterprise agreement. |
| Device location -- device or people tracking | Reports customer location for the purpose of providing tracking services for the device or the user. | High | Customer authorization with separate device tracking service agreement or enterprise agreement. |
| Transaction associated information | Reports customer information such as networking activity, location, advertising usage, shopping behavior that is associated with a commerce transaction or happens around the same time as the transaction. | High | Customer authorization -- potential service discount or upgrade or enterprise agreement. |
| URL history | Reports customer web surfing history. | High | Customer authorization -- potential service discount or upgrade or enteprise agreement. |
| Served and visited advertisement history | Reports the advertisements served to the user or which advertisements the user responded to. This information may be used to determine customer preferences or for a revenue sharing relationship with the advertisers. | Medium | Customer authorization -- potential service discount, perk, or upgrade or enterprise agreement. |
| 911 Service usage and location trace log | This log contains all information pertinent to emergency service personnel responding to a 911 call or other emergency situation. In some embodiments, this information is password protected and generally not available to the service provider unless it happens to also be contained in reports authorized by the consumer as in the examples above. | Very High | Available only for 911 support or enterprise agreement. |

FIG. 49

| Partial List of Example Service Policy Functionality Embodiments | Partial Description of Functionality Example | Example Authorization Level Required to Implement Embodiment |
|---|---|---|
| Block downstream or upstream traffic | Various embodiments block traffic associated with one or more of user, network address identifier, application, content or data type, type of network, central provider, transaction provider, or transaction type. Typical but non-exhaustive examples of command usage are access control prior to authorization, access control policy limits as defined by service plan or special device type, access control for ambient activation services, access control for error handling, or access control for tamper prevention. This command may be implemented in instantaneous policy implementation mode or adaptive policy control mode. | Basic authority to pass or block traffic for access control, authorization, ambient services, or plan specific services typically may be provided by the user when they acknowledge the service plan agreement. Authorization to block traffic access as part of controlling user service costs typically may be provided by the service plan agreement options the user chooses to manage cost or may be provided when the user acknowledges the limitations in the UI notifications. |
| Pass downstream or upstream traffic | Various embodiments allow traffic associated with one or more of user, network address identifier, application, content or data type, type of network, central provider, transaction provider, or transaction type. Typical but non-exhaustive examples of command usage are access control prior to authorization, access control policy limits as defined by service plan or special device type, access control for ambient activation services, access control for error handling, or access control for tamper prevention. This command may be implemented in instantaneous policy implementation mode or adaptive policy control mode. | Same as above. |
| Limit maximum data rate | Various embodiments limit maximum data rate for traffic associated with one or more of user, network address identifier, application, content or data type, type of network, central provider, transaction provider, or transaction type. Typical but non-exhaustive examples of how this command can be implemented include limiting data rate to the device according to service plan; limiting data rate by network address identifier, application or content type for the purpose of implementing a tiered garden ; limiting data rate in to different levels according to the type of access technology used by the present network connection; limiting data rate to different levels according to the service provider for the present network; or limiting data rate according to an agreement or lack of agreement with a transaction provider. This command may be implemented in instantaneous policy implementation mode or adaptive policy control mode. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |

FIG. 50A

| Example Service Policy Functionality Embodiments | Partial Description of Functionality Example | Example Authorization Level Required to Implement Embodiment |
|---|---|---|
| Analyze traffic | Provides capability resident on the device to analyze device or user traffic statistics to determine how to implement adaptive policy control or how best to assist the user with notification messages. In some embodiments it is important to perform traffic analysis locally on the device to reduce network chatter with the Control Processor or to maintain user CRM privacy levels by not sharing sensitive raw traffic usage history needed to determine implementation of less sensitive service control policies. Typical but non-exhaustive examples of command usage are analyzing traffic usage statistics or patterns to determine compliance with service plan limits; analyzing traffic usage statistics or patterns to determine likely future compliance with service plan limits; analyzing traffic statistics or patterns to categorize usage according to network address identifiers, applications, content types, network types or central providers; analyzing traffic demand vs. usage statistics or patterns to determine if user may be better served with another service plan; analyzing traffic statistics or patterns to identify potential tamper threats. This command may be implemented in instantaneous policy implementation mode or adaptive policy control mode, but adaptive application of the analysis results is typically associated with adaptive policy control mode. | Authorization to analyze traffic for local device service policy control purposes or 911 service typically may be provided for in the basic service contract. Authorization to transmit a complete or filtered version of the traffic analysis to the Service Controller typically may be provided under user selected options in the service plan contract. |
| Successive limitation | Provides capability to begin with one limit on access or data rate according to a set of defined service usage trigger criteria, to further limit access or data rate according to said criteria, and then to successively remove limits according to said criteria. In some embodiments this function provides for service usage that starts at a given level for one or more service aspects, but as said service aspect exhibits usage that potentially threatens an overage on service plan limits then the level of service for said service aspect is reduced successively until the threat of service plan overage is reduced or eliminated. In some embodiments, the limits on service level for said service aspect are eventually removed either all at once or successively over a specified time period or set of time periods so that the limits on service level for said service aspect are eventually removed if the service aspect is used less vigorously for a period of time. In this type of embodiment the projection for future service usage by a given service aspect is assisted by the analyze traffic statistics function. As a more specific example, the service aspect may be a URL address that is popular with the user and demands a high service consumption, and the data rate allowed to that URL may start at a relatively high level when the user first begins to surf and as long as the surfing session is finished quickly there is never a reduction in service level, but if the user surfs for a longer time so that service usage begins to threaten plan limit overage, the data rate allowed to that URL is successively reduced the longer the surfing session occurs. Continuing this example embodiment, if the URL is not visited for a defined period *(cont. on FIG. 50C)* | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |

FIG. 50B

| Example Service Policy Functionality Embodiments | Partial Description of Functionality Example | Example Authorization Level Required to Implement Embodiment |
|---|---|---|
| | of time then the data rate limitation may be removed in steps over multiple pre-defined time periods, or may be removed all at once back to the initial data rate established in the service policy for that URL. Other specific embodiment examples include email download or upload data rate; download or upload rates for certain types of file transfers; or download or upload rates for a given network access technology or central provider. This command is associated with adaptive policy control mode for the Service Processor. In more advanced adaptive embodiments, the policy control system first identifies those service aspects that are consuming a large percentage of the service usage and then begins to successively limit service level only for these highest usage service aspects so that all other service aspects that are not responsible for potential service plan limit overage continue to receive relatively high service levels. In another embodiment, some high usage service aspects may be exempt or partially exempt from limitations in service level, as for example a service aspect that is associated with a secondary source of service or transaction payment or that may be separately accounted for in the service plan usage reporting. | |
| Limit email file transfers | Sets and enforces limits on email downloads. In some embodiments this can include use of the successively limit functionality. In some embodiments, this is accomplished by identifying specific email downloads or uploads and controlling traffic for those traffic flows. In other embodiments, this includes interacting with the email application to set download or upload file settings. This functionality may be implemented in instantaneous policy implementation mode or adaptive policy control mode, with the more advanced functionality such as successive limitation on email file transfers being implemented in the adaptive policy control mode. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |
| Seek to manage below service limit | Implements adaptive policy control in an attempt to manage service usage to reduce service plan limit overages. In some embodiments there are successive limits on service level for overall traffic, or for the highest usage service aspects, with the successive limits being lowered until average service usage is projected to be below service plan limits. The algorithms that may be applied to achieve this adaptive service level limitation are quite varied and only a few are given here. In one embodiment, the service usage for the service plan period is projected using the analyze traffic functionality, and overall device data rate is successively limited until service usage is projected to be below the service plan limit. In another embodiment, the analyze traffic functionality is used to identify those service aspects that are causing the *(cont. on FIG. 50D)* | Same as above. |

FIG. 50C

| Example Service Policy Functionality Embodiments | Partial Description of Functionality Example | Example Authorization Level Required to Implement Embodiment |
|---|---|---|
| | majority of the service plan usage, and then each of those service plan aspects are limited using the successive limitation functionality, with the service level limitations being based on the traffic usage patterns and specific application scenarios for each service aspect. For example, in some embodiments the service aspects that are creating the most service usage are subjected to more service level limitation than service aspects that are creating less service usage. Service usage may be defined as usage of a raw service measurement such as total data consumption, files downloaded or time spent on network, or it may be translated into an economic measure using the lookup service cost functionality. In some embodiments, the period of time elapsed in the service accounting period is taken into account in determining... | |
| Synchronize service usage counters | Synchronizes service usage counters on device from time to time to minimize service accounting errors between the device data base and the central billing data base. In some embodiments this is a part of the Service Processor heartbeat communication system that need not happen every heartbeat. In some embodiments this occurs with a request for update by the device to the central billing system or to a server function in the Service Processor. | Provided for in the basic service agreement. |
| Lookup service cost | Provides a data base of service usage vs. cost for each type of service offered on the device. Provides for a lookup function of service cost. | Same as above. |
| Convert service usage to service cost | Uses the service cost vs. usage lookup function to transform one or more service usage aspects to one or more service cost aspect. One example embodiment provides a service cost measure for one specific aspect of service usage, for example total data consumed over a period of time. Another example embodiment provides a total service cost measure for all service usage over a period of time. | Same as above. |
| Notify user of service overage | Sends a notification message or screen to the UI to inform the user that the one or more aspects of service usage has exceeded the specified limits of one or more service plans. In some embodiments, the user notice is a pop-up window and in some embodiments there is a continuous display on a small gauge in main screen. | Same as above. |
| Project service usage | Uses the analyze traffic functionality and projects an estimate of what the traffic usage will be at the end of a service plan measurement interval if the service usage does not change. In some embodiments the projected service usage is made based on assuming the average service usage per unit time in the present service plan measurement interval does not change for the remainder of the service plan measurement interval. | Same as above. |

FIG. 50D

| Example Service Policy Functionality Embodiments | Partial Description of Functionality Example | Example Authorization Level Required to Implement Embodiment |
|---|---|---|
| Notify user of service cost overage | Performs a service cost estimate based on one or more aspects of service usage and informs the user that the one or more aspects of service cost has exceeded the specified limits of a service plan. In some embodiments, the user notice is a pop-up window and in some embodiments there is a continuous display on a small gauge in main screen. | Provided for in the basic service agreement. |
| Notify user of usage behavior likely to run over service usage limit | Uses the project service usage functionality to determine if the service usage is projected to go beyond the service plan limit, notifies the user if the projected service usage is over the service plan limit for the service plan measurement interval. In some embodiments, the user notice is a pop-up window and in some embodiments there is a continuous display on a small gauge on the main screen. In some embodiments, the projected service usage is made based on assuming the average service usage per unit time in the present service plan measurement interval does not change for the remainder of the service plan measurement interval. | Same as above. |
| Notify user of usage behavior likely to run over cost limit | Uses the project service usage functionality to determine if the service usage is projected to go beyond the service plan limit, uses convert service measure to service cost functionality to estimate the service cost of the projected service overage, notifies the user if the projected cost is over the service plan cost associated with the service plan service limit for the service plan measurement interval. In some embodiments, the user notice is a pop-up window and in some embodiments there is a continuous display on a small gauge in main screen. In some embodiments the projected cost is made based on assuming the average service usage per unit time in the present service plan measurement interval does not change for the remainder of the service plan measurement interval. | Same as above. |
| Project user service cost if usage behavior continues. | Uses the project service usage functionality to determine if the service usage is projected to go beyond the service plan limit, uses convert service measure to service cost functionality to estimate the service cost of the projected service overage, notifies the user of what the projected cost will be if the service usage behavior remains the same. In some embodiments, the user notice is a pop-up window and in some embodiments there is a continuous display on a small gauge in main screen. In some embodiments the projected cost is made based on assuming the average service usage per unit time in the present service plan measurement interval does not change for the remainder of the service plan measurement interval. | Same as above. |

FIG. 50E

| Example Service Policy Functionality Embodiments | Partial Description of Functionality Example | Example Authorization Level Required to Implement Embodiment |
|---|---|---|
| Limit access likely to cause overage and notify | Uses the project service usage functionality to determine if the service usage is projected to go beyond the service plan limit, if the service usage is projected to go over the service limit, notifies the user that limits are being applied to keep service usage or cost under the service limit, applies limits to various aspects of service usage to bring down usage so that projections are within service limits. In one embodiment, the seek to manage below service limit functionality is used. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |
| Require acknowledgement of notification | Requires the user to acknowledge a notification of potential service or cost overage or a notification of an option to limit the service overage or cost of service overage. | Provided for in the basic service agreement. |
| Log or report acknowledgment of notification | In some embodiments, the user acknowledgment of notification is stored, or sent to the Service Controller, or stored and later sent to the service Controller. | Same as above. |
| Notify user of service plan options prior to running over service usage limit | Notifies the user of options to extend the service plan limit before reaching the service plan limit. In some embodiments, accepts user input on which service plan extension option if any the user wishes to accept. In some embodiments, notifies the billing system when the user has accepted a service plan extension option. | Same as above. |
| Notify user of service plan options after running over service usage limit | Notifies the user of options to extend the service plan limit after reaching the service plan limit. In some embodiments, accepts user input on which service plan extension option if any the user wishes to accept. In some embodiments, notifies the billing system when the user has accepted a service plan extension option. | Same as above. |
| Time of day variations | Each of the functionalities for traffic control, service cost, service limits may be modified with a time of day variation so that the values used are different for different times of day. | Same as above. |

FIG. 50F

| Example Service Policy Functionality Embodiments | Partial Description of Functionality Example | Example Authorization Level Required to Implement Embodiment |
|---|---|---|
| Access control enable list | List of service usage activities that are enabled. | Authorization restricted to service controller, VSP or other network function with proper credentials to access the control data base. |
| Access control block list | List of service usage activities that are blocked. | Same as above. |
| User service control option UI | Provides the user with a list of options for how they would like to control service usage or service cost. | In some embodiments UI screens and scripts are defined by the UI agent software version and access to modifying this software is restricted to service controller, VSP or other network function with proper credentials to access the UI data base. Some embodiments call for the UI screens or UI screen content to be generated by the service controller, VSP or another network function (e.g. service usage notification gateway or billing system) and in this case access is restricted to service controller, VSP or other network function with proper credentials to access the UI pass through screens. |
| User service notification option preference | Provides the user with a list of options for how they would like service notification information to be displayed. In some embodiments provides the user with the option to turn off one or more aspects of service notification. In some embodiments the user is not allowed to turn off notification for service usage events that require user decision or acknowledgement. | In some embodiments UI screens and scripts are defined by the UI agent software version and access to modifying this software is restricted to service controller, VSP or other network function with proper credentials to access the UI data base. Some embodiments call for the UI screens or UI screen content to be generated by the service controller, VSP or another network function (e.g. service usage notification gate ay or billing system) and in this case access is restricted to service controller, VSP or other network function with proper credentials to access the UI pass through screens. |

FIG. 50G

| Example Service Policy Functionality Embodiments | Partial Description of Functionality Example | Example Authorization Level Required to Implement Embodiment |
|---|---|---|
| User CRM or service usage monitoring filtering option preference | Filters the device and/or user information that is being collected before it is reported to the network to maintain the desired level of user privacy. In some embodiments the user defines preferences on user privacy that are used to define the filter settings. | In some embodiments this is not accessible by the network and only may be modified by the user. In other embodiments it may be read but not written by the network and in this case authorization is restricted to service controller, VSP or other network function with proper credentials to access the filter settings database. In some embodiments the network is allowed to change the CRM filter settings and in this case authorization restricted to service controller, VSP or other network function with proper credentials to access the CRM filter settings database. |
| Service usage billing event record | A record of service usage billing events. In some embodiments this record is transmitted to the billing server or another network function to aid service billing or billing reconciliation. | In some embodiments authorization restricted to service controller, VSP, or other network function with proper credentials to access the billing database. In some embodiments the user is allowed to read but not write the database. |
| Bill by account | The bill by account embodiments provide for service billing to accounts different than the main user account, for example tracking network device chatter that is not desired to be billed to the user, transaction partner access costs that are shared with or billed to the transaction partner, ambient service cost tracking, tracking temporary account costs, etc. | Same as above. |
| Central billing transaction and event recording | Billing event tracking and reporting associated with the central provider open billing embodiments. Some embodiments include generation of billing certificates or receipts. In some embodiments the device may serve as a billing feed. | Same as above. |
| Service owner registration or re-registration | Function that allows a portion of the device credentials to be programmed to indicated the VSP. | In some embodiments authorization to write the device is restricted with security signatures or other security methods to the VSP and possibly the central provider. Some embodiments involve provisions to report to a network function when the VSP settings are changed or the software is uninstalled. Other embodiments involve restoring VSP settings or software if removed. |

FIG. 50H

| Example Service Policy Functionality Embodiments | Partial Description of Functionality Example | Example Authorization Level Required to Implement Embodiment |
|---|---|---|
| Credentials swap | Function that provides for swapping of credentials, for example temporary credentials to permanent credentials. | Authorization restricted to service controller, VSP or other network function with proper credentials to access the credentials database. |
| Account information swap | Function that provides for swapping the account information, for example temporary account to permanent account. | Authorization restricted to service controller, VSP or other network function with proper credentials to access the activation service profile database. |
| Configure or re-configure service processor for new device service | Function that provides for service processor programming for all the information that defines the service profile, device credentials, VSP, and other necessary parameters. | Authorization restricted to service controller, VSP or other network function with proper credentials to access the service profile database. |
| Ambient service profile definition | Function that provides for service processor programming for all the information that defines the ambient service profile, device credentials, VSP, and other necessary parameters. | Authorization restricted to service controller, VSP or other network function with proper credentials to access the ambient service profile database. |
| Analyze service usage statistics | VSP function to analyzer service usage statistics for a device, defined group of devices, defined group of service plans or service profiles, defined group of users or other groupings. | Authorization typically restricted to service controller, VSP or other network entity with the credentials to access the service usage history databases. |
| Dry lab test new service policy | Allows simulated testing of draft service profiles and/or service plans against device usage statistics for a defined group of devices or users or service profiles, or against simulated device service usage behavior. Some embodiments show the estimated profitability of proposed service profile and service plan. Some embodiments allow decomposition of the service usage statistics to identify the user group service usage activities that may be modified by changing the service usage control policies or made more profitable by changing the service plan billing policies. | Authorization typically restricted to service controller, VSP, or other network entity with the credentials to access the service usage history databases. |
| Beta test publishing system | Function that provides for service processor programming for all the information that defines the service profile device credentials, VSP and other necessary parameters for a beta test device group. | Authorization restricted to service controller, VSP or other network function with proper credentials to access the service profile data base. |

FIG. 50I

| Example Service Policy Functionality Embodiments | Partial Description of Functionality Example | Example Authorization Level Required to Implement Embodiment |
| --- | --- | --- |
| Publish new service | Function that provides for service processor programming for all the information that defines the service profile, device credentials, VSP and other necessary parameters for a production device group. | Authorization restricted to service controller, VSP or other network function with proper credentials to access the service profile database. |
| Roaming selection service | Function that surveys available roaming service partners, looks up the billing rates for the partners, and displays to the user the set of choices and billing rates. In some embodiments the roaming partner billing rates for one or more roaming partners are applied to a typical user service usage scenario for the purpose of estimating possible projected roaming costs and displaying those costs to the user. In some embodiments the roaming data is stored locally on the device and periodically updated with network refreshes, while in other embodiments the data base is looked up at the time of service. In some embodiments, the user is asked if they would like to modify their service usage notification or control profiles to save roaming costs and if the user responds yes they are provided with a set of options for changing service usage notification or service usage control policies. | Authorization to modify the policies typically restricted to the VSP or other entity responsible for managing the roaming service. |
| Roaming usage count | Provides a service usage estimate to the user while roaming. | Same as above. |
| Roaming cost service | Provides a service cost estimate to the user while roaming. | Same as above. |
| Roaming policy control service | Provides the user or VSP with the capability to switch service usage notification or service usage control policies while roaming. Some embodiments provide for restrictions to roaming carrier options. Some embodiments provide policies based on carrier chosen. Some embodiments provide policies based on the service cost for carrier chosen. Some embodiments specify preferred roaming lists that may be different than the central provider roaming list. | Same as above. |
| Switch policies for new network | Provides the user or VSP with the capability to switch service usage notification or service usage control policies depending on which network the device is connected to. Some embodiments provide for restrictions to certain network options. Some embodiments provide policies based on network chosen. Some embodiments provide policies based on the service cost for network chosen. Some embodiments provide for a network connection preference list. | Authorization to modify the policies typically restricted to the VSP or other entity responsible for managing the network selection policies. |

INTERMEDIATE NETWORKING DEVICES

BACKGROUND

With the advent of mass market digital communications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMAX (Worldwide Interoperability for Microwave Access), and Wi-Fi (Wireless Fidelity) wireless networks increasingly becoming user capacity constrained. Although wireless network capacity will increase with new higher capacity wireless radio access technologies, such as MIMO (Multiple-Input Multiple-Output), and with more frequency spectrum being deployed in the future, these capacity gains are likely to be less than what is required to meet growing digital networking demand.

Similarly, although wire line access networks, such as cable and DSL, can have higher average capacity per user, wire line user service consumption habits are trending toward very high bandwidth applications that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

FIGS. 30A and 30B provide tables summarizing various service processor agents (and/or components/functions implemented in software and/or hardware) in accordance with some embodiments.

FIG. 31 provides a table summarizing various service controller server elements (and/or components/functions implemented in software and/or hardware) in accordance with some embodiments.

FIGS. 34A through 34H provide tables summarizing various service processor heartbeat functions and parameters in accordance with some embodiments.

FIGS. 35A through 35M provide tables summarizing various device-based service policy implementation verification techniques in accordance with some embodiments.

FIGS. 36A through 36D provide tables summarizing various techniques for protecting the device-based service policy from compromise in accordance with some embodiments.

FIG. 49 provides a table summarizing various privacy levels for service history reporting in accordance with some embodiments.

FIGS. 50A through 50J provide tables summarizing various service policy control commands in accordance with some embodiments.

DETAILED DESCRIPTION

Figure 1:
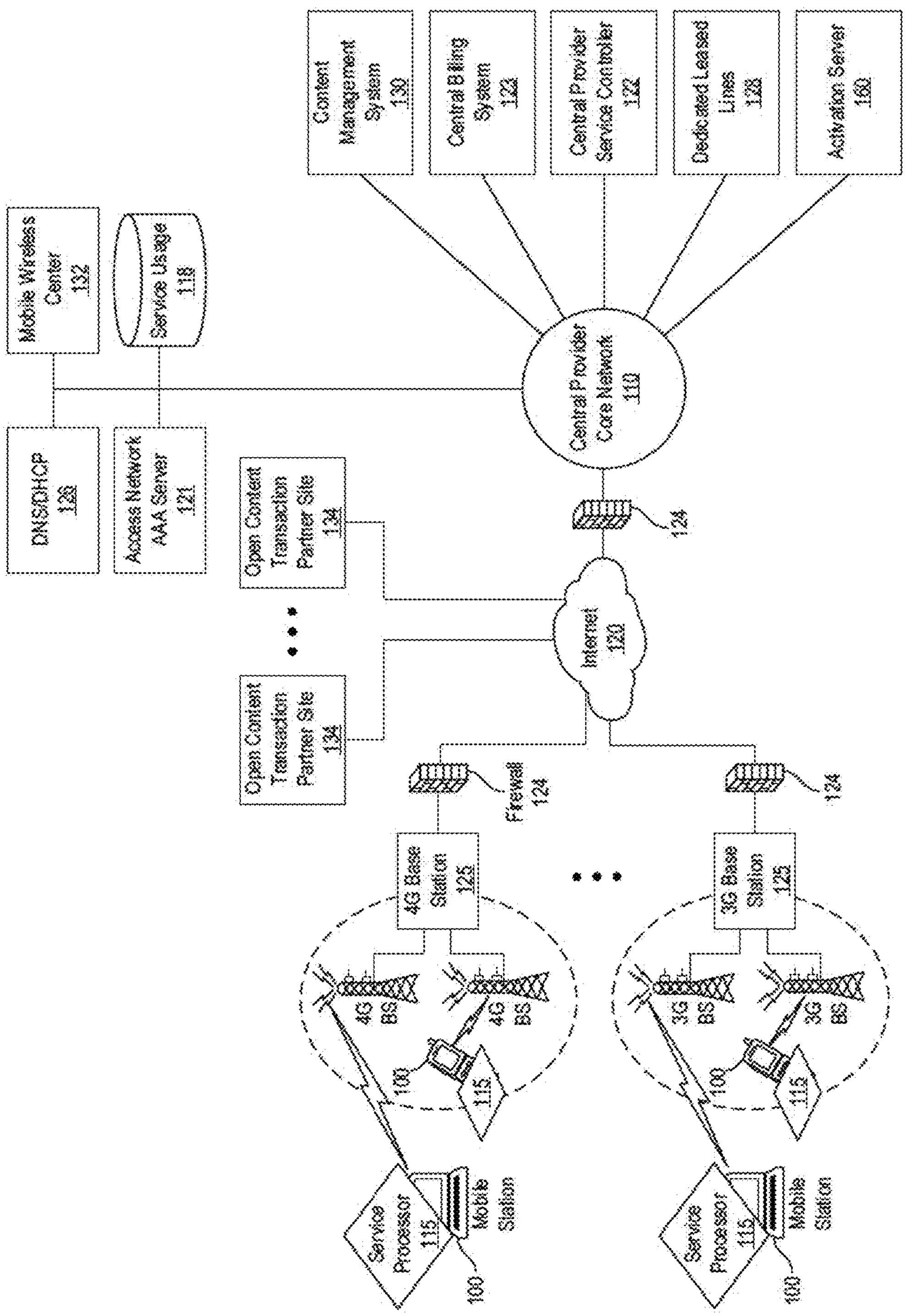
FIG. 1 illustrates a simplified (e.g., "flattened") network architecture in accordance with some embodiments.

The invention can be implemented in numerous ways, including as a process; an apparatus; a system; a composition of matter; a computer program product embodied on a non-transitory computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With the development and increasing proliferation of mass-market digital communications and content distribution, communication network capacity gains are being outpaced by growing digital networking demand. For example, some industry experts project average wireless device usage of four devices per subscriber, with a mixture of general purpose devices like smart phones and computers along with special purpose devices like music players, electronic readers, connected (e.g., networked) cameras and connected gaming devices. In addition, wire line user service consumption habits are trending toward very high bandwidth applications that can quickly consume the available capacity and degrade overall network service experience if not efficiently managed. Because some components of service provider costs go up with increasing bandwidth, this trend will also negatively impact service provider profits.

There is a need for a communication system and method that provides for flexible service plans and management of user network services to provide consumer choice of more refined service plan offerings and efficient management of network capacity.

Also, it is becoming increasingly important to more deeply manage the level of services delivered to networked devices to provide cost-effective services that match growing digital networking usage patterns. For example, access providers can move away from only billing for basic access and move toward billing for higher level service delivery with example services including rich Internet access and email, application-based billing, content distribution, entertainment activities, information or content subscription or gaming. In addition, a growing number of new special purpose and general purpose networked devices are fueling demand for new service plans, for example, tailored to the new device usage models (e.g., a special service plan for an e-book reader device).

As network capabilities grow and new networked device offerings grow, access network service providers will realize increasing value in opening up their networks to allow innovation and expanded offerings for network service consumers. However, opening up the networks to provide efficient third-party definition of alternative service and billing models requires more flexible service and billing policy management solutions. For example, machine to machine applications such as telemetry, surveillance, shipment tracking and two way power control systems are example new applications that would require new offerings to make such available to network service customers. The need to customize service offerings for these new applications requires more efficient methods for defining, testing and launching new services with more refined control of service functions and service costs. In some embodiments, this means billing for different types of service elements, such as total traffic, content downloads, application usage, information or content subscription services, people or asset tracking services, real time machine-to-machine information or electronic commerce transactions.

In some embodiments, network user capacity is increased and user service costs are reduced by managing and billing for service consumption in a more refined manner (e.g., to satisfy network neutrality requirements). By managing service consumption in a user friendly manner, the overall service capacity required to satisfy the user device needs can be tailored more closely to the needs of a given user thereby reducing user service costs and increasing service provider profits. For example, managing service usage while maintaining user satisfaction includes service usage policy implementation and policy management to identify, manage and bill for service usage categories, such as total traffic consumption, content downloads, application usage, information or content subscription services, electronic commerce transactions, people or asset tracking services or machine to machine networking services.

As described herein, service activity is used to refer to any service usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, SMS, IP multimedia system (IMS), or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of verifiable service control policies. As will be apparent to one of ordinary skill in the art in view of the embodiments described herein, some embodiments identify various service activities for the purpose of decomposing overall service usage into finer sub-categories of activities that can be verifiably monitored, categorized, cataloged, reported, controlled, monetized and used for end user notification in a manner that results in superior optimization of the service capabilities for various levels of service cost or for various types of devices or groups. In some embodiments, it will be apparent to one of ordinary skill in the art that the terms service activity or service usage are associated with categorizing and possibly monitoring or controlling data traffic, application usage, communication with certain network end points, or transactions, and it will also be apparent that in some embodiments the term service activity is intended to include one or more of the broader aspects listed above. The shortened term service usage can be used interchangeably with service activity, but neither term is intended in general to exclude any aspect of the other. In some cases, where the terms service usage or service activity are used, more specific descriptors such as traffic usage, application usage, website usage, and other service usage examples are also used to provide more specific examples or focus in on a particular element of the more encompassing terms.

In some embodiments, employing this level of service categorization and control is accomplished in a manner that satisfies user preferences. In some embodiments, employing this level of service categorization and control is accomplished in a manner that also satisfies government rules or regulations regarding open access, for example, network neutrality requirements. In some embodiments, service management solutions that also collect and/or report user or device service usage or service activity behavior to determine how best to meet the user's simultaneous desires for service quality and lower service costs are disclosed. For example, such monitoring and reporting are accomplished in a manner that includes approval by the user and in a manner that also protects the privacy of user information and service usage behavior or service activity history.

In some embodiments, a system and method is disclosed for increasing network user capacity for wireless networks in the face of increasing service demand per user by providing for a greater number of base stations, also sometimes referred to as access points, base terminals, terminal nodes or other well known acronyms, to be more easily and/or more cost effectively deployed. For example, to simplify the process of deploying base stations, the installation complexity and the network infrastructure required for the base station to obtain backhaul service to the various networks that users desire to connect with are reduced.

In some embodiments, dense base station deployments are simplified by reducing the requirement to aggregate or concentrate the base station traffic through a specific dedicated core network infrastructure, so that the base stations connect to the desired user networks through a more diverse set of local loop, back bone and core routing options. This approach also reduces network infrastructure equipment, installation and maintenance costs. In some embodiments, this is accomplished by distributing the network traffic policy implementation and control away from the core network by providing for more control for service policy implementation and management on the end user device and, in some embodiments, in the end user device with respect to certain service policies and the network (e.g., control plane servers) with respect to other service policies. For example, this approach facilitates connecting the base stations directly to the local loop Internet with a minimum of specific dedicated networking infrastructure.

In some embodiments, service and transaction billing event capture and logging are distributed to the device. For example, providing service and transaction billing event capture and logging at the device provides a greater capability to monitor, classify and control deeper aspects of service usage or service activity at the device as compared to the relatively less capability for the same in the network infrastructure (e.g., for certain traffic flows, such as encrypted traffic flows). Furthermore, billing at the device provides for very specialized with many different billing and service plans for different device and service usage or service activity scenario combinations without the problem of attempting to propagate and manage many different deep packet inspection (DPI) and traffic shaping profiles in the networking equipment infrastructure. For example, service billing at the device can provide for more sophisticated, more specialized and more scalable billing and service plans.

Another form of billing that needs improvement is electronic commerce transaction billing with device-assisted central billing. Today, most central billing and content distribution models require either centralized content distribution maintained by the central service provider or central billing authority, or a centralized ecommerce website or portal traffic aggregation system controlled by the central service provider or central billing provider, or both. In such systems, content and transaction providers such as media providers, application developers, entertainment providers, transaction website providers and others must adapt their mainstream electronic offering and commerce systems, such as shopping experience websites, to fit within the various proprietary customized infrastructure and content storage solutions for ecommerce markets, such as BREW® (Binary Runtime Environment for Wireless from Qualcomm® Inc.), Symbian OS (from Symbian Software Ltd) and Apple iPhone 3G App Store (from Apple Inc.). This approach requires a large amount of unnecessary custom interface development and stifles open market creativity for HTTP, WAP or portal/widget based shopping destinations and experiences. As disclosed below, a superior approach includes device-based transaction billing for an open ecosystem in which a central billing provider provides users and ecommerce transaction providers with a central billing solution and experience that does not require extensive custom development or ecommerce infrastructure interfacing.

In some embodiments, products that incorporate device-assisted service policy implementation, network services and service profiles (e.g., a service profile includes a set of one or more service policy settings for the device for a service on the network) are disclosed, as described below. For example, aspects of the service policy (e.g., a set of policies/policy settings for the device for network services, typically referring to lower level settings, such as access control settings, traffic control settings, billing system settings, user notification settings, user privacy settings, user preference settings, authentication settings and admission control settings) that are moved out of the core network and into the end user device include, for example, certain lower level service policy implementations, service usage or service activity monitoring and reporting including, for example, privacy filtering, customer resource management monitoring and reporting including, for example, privacy filtering, adaptive service policy control, service network access control services, service network authentication services, service network admission control services, service billing, transaction billing, simplified service activation and sign up, user service usage or service activity notification and service preference feedback and other service capabilities.

As discussed below, product designs that move certain aspects of one or more of these service profile or service policy implementation elements into the device provide several advantageous solutions to the needs described above. For example, benefits of certain embodiments include the ability to manage or bill for a richer and more varied set of network services, better manage overall network capacity, better manage end user access costs, simplify user or new device service activation, simplify development and deployment of new devices with new service plans (e.g., service profile and billing/costs information associated with that service profile), equip central service providers with more effective open access networks for new third-party solutions, simplify the equipment and processes necessary to deploy wireless base stations and simplify the core networking equipment required to deploy certain access networks.

As discussed below, there are two network types that are discussed: a central provider network and a service provider network. The central provider network generally refers to the access network required to connect the device to other networks. The central provider network generally includes the physical layer, the Media Access Control (MAC) and the various networking functions that can be implemented to perform authentication, authorization and access control, and to route traffic to a network that connects to the control plane servers, as discussed below. The service provider network generally refers to the network that includes the control plane servers. In some embodiments, a central provider network and a service provider network are the same, and in some embodiments, they are different. In some embodiments, the owner or manager of the central provider network and the owner or manager of the service provider network are the same, and in some embodiments, they are different.

In some embodiments, control of the device service policies is accomplished with a set of service control plane servers that reside in the access network or any network that can be reached by the device. This server-based control plane architecture provides for a highly efficient means of enabling third-party control of services and billing, such as for central carrier open development programs or Mobile Virtual Network Operator (MVNO) relationships. As device processing and memory capacity expands, moving to this distributed service policy processing architecture also becomes more efficient and economical. In some embodiments, several aspects of user privacy and desired network neutrality are provided by enabling user control of certain aspects of device-based service usage or service activity reporting, traffic reporting, service policy control and customer resource management (CRM) reporting.

In many access networks, such as wireless access networks, bandwidth capacity is a valuable resource in the face of the increasing popularity of devices, applications and content types that consume more bandwidth. To maintain reasonable service profit margins, a typical present service provider practice is to charge enough per user for access to make service plans profitable for the higher bandwidth users. However, this is not an optimal situation for users who desire to pay less for lower bandwidth service usage or service activity scenarios.

Accordingly, in some embodiments, a range of service plan pricing can be enabled that also maintains service profitability for the service provider, for example, by providing a more refined set of management and control capabilities for service profiles. For example, this approach generally leads to service management or traffic shaping where certain aspects of a service are controlled down based on service policies to lower levels of quality of service. Generally, there are three problems that arise when these techniques are implemented. The first problem is maintaining user privacy preferences in the reporting of service usage or service activity required to set, manage, or verify service policy implementation. This problem is solved in a variety of ways by the embodiments described below with a combination of user notification, preference feedback and approval for the level of traffic information the user is comfortable or approves and the ability to filter service usage or service activity, in some embodiments, specifically traffic usage or CRM reports so that only the level of information the user prefers to share is communicated. The second problem is satisfying network neutrality requirements in the way that traffic is shaped or services are managed. This problem is solved in a variety of ways as described in the embodiments described below by empowering the user to make the choices on how service usage, service activity, traffic usage, or CRM data is managed down to control costs, including embodiments on user notification and service policy preference feedback. By allowing the user to decide how they want to spend and manage their service allowance or resources, a more neutral or completely neutral approach to network usage can be maintained by the service provider. The third problem is to help the user have an acceptable and enjoyable service experience for the lower cost plans that will result in much wider scale adoption of connected devices and applications but are more constrained on service activity usage or options or bandwidth or traffic usage. As lower cost service plans are offered, including plans where the basic connection service may be free, these service plans will require service provider cost controls to maintain profitability or preserve network capacity that result in lower limits on service usage or service activity. These lower service usage or service activity limit plans will result in more users who are likely run over service usage limits and either experience service shutdown or service cost overages unless they are provided with more capable means for assistance on how to use and control usage for the lower cost services. This problem is solved in a variety of ways with a rich collection of embodiments on user notification, service usage and cost projection, user notification policy feedback, user service policy preference feedback, and adaptive traffic shaping or service policy implementation. As described herein, some embodiments allow a wide range of flexible and verifiable service plan and service profile implementations ranging from examples such as free ambient services that are perhaps sponsored by transaction revenues and/or bill by account sponsored service partner revenues, to intermediately priced plans for basic access services for mass market user devices or machine to machine communication devices, to more expensive plans with very high levels of service usage or service activity limits or no limits at all. Several bill by account embodiments also provide for the cataloging of service usage that is not a direct benefit to end users but is needed for basic maintenance of the device control channels and access network connection, so that the maintenance traffic service cost can be removed from the user billing or billed to non-user accounts used to track or account for such service costs. These embodiments and others result in a service usage or service activity control capability that provides more attractive device and service alternatives to end users while maintaining profitability for service providers and their partners.

In some embodiments, the above-described various embodiments for device-based service policy and/or service profile communications control are implemented using network-based service control, for example, for satisfying various network neutrality and/or privacy requirements, based on indication(s) received from the device (e.g., user input provided using the device UI using the service processor) and network-based service control (e.g., using a DPI service monitor or DPC policy implementation and/or other network elements).

In some embodiments, a virtual network overlay includes a device service processor, a network service controller and a control plane communication link to manage various aspects of device-based network service policy implementation. In some embodiments, the virtual network overlay networking solution is applied to an existing hierarchical network (e.g., for wireless services), and in some embodiments, is applied to simplify or flatten the network architecture as will be further described below. In some embodiments, the large majority of the complex data path network processing required to implement the richer service management objectives of existing hierarchical networks (e.g., for wireless services) are moved into the device, leaving less data path processing required in the edge network and in some cases even less in the core network. Because the control plane traffic between the service control servers and the device agents that implement service policies can be several orders of magnitude slower than the data plane traffic, service control server network placement and backhaul infrastructure is much less performance sensitive than the data plane network. In some embodiments, as described further below, this architecture can be overlaid onto all the important existing access network architectures used today. In some embodiments, this architecture can be employed to greatly simplify core access network routing and data plane traffic forwarding and management. For example, in the case of wireless networks, the incorporation of device-assisted service policy implementation architectures can result in base stations that directly connect to the Internet local loop, and the data traffic does not need to be concentrated into a dedicated core network. This results, for example, in a large reduction in backhaul cost, core network cost and maintenance cost. These cost savings can be re-deployed to purchase and install more base stations with smaller cells, which results in higher data capacity for the access network leading to better user experience, more useful applications and lower service costs. This flattened networking architecture also results in latency reduction as fewer routes are needed to move traffic through the Internet. In some embodiments, the present invention provides the necessary teaching to enable this powerful transformation of centralized network service architectures to a more distributed device-based service architectures.

Device-based billing can be compromised, hacked and/or spoofed in many different ways. Merely determining that billing reports are being received from the device, that the device agent software is present and properly configured (e.g., the billing agent is present and properly configured) is insufficient and easily spoofed (e.g., by spoofing the agent itself, providing spoofed billing reports using a spoofed billing agent or providing spoofed agent configurations). Accordingly, in some embodiments, verifiable device-assisted and/or network-based service policy implementation is provided. For example, verifiable service usage and/or service usage billing can be provided as described herein with respect to various embodiments.

While much of the below discussion and embodiments described below focus on paid service networks, those of ordinary skill in the art will appreciate that many of the embodiments also apply to other networks, such as enterprise networks. For example, the same device-assisted network services that create access control services, ambient activation services and other service profiles can be used by corporate IT managers to create a controlled cost service policy network for corporate mobile devices. As another example, embodiments described below for providing end user service control can also allow a service provider to offer parental controls by providing parents with access to a website with a web page that controls the policy settings for the access control networking service for a child's device.

Network Architecture for Device Assisted/Based Service Control

FIG. 1 illustrates a simplified (e.g., "flattened") network architecture in accordance with some embodiments. As shown, this provides for a simplified service infrastructure that exemplifies a simplified and "flattened" network architecture in accordance with some embodiments that is advantageous for wireless network architectures. This also reduces the need for complex data path protocol interaction between the base station and network infrastructure. For example, in contrast to a complex edge and core network infrastructure connecting base stations to the central service provider network, as shown the base stations 125 are connected directly to the Internet 120 via firewalls 124 (in some embodiments, the base stations 125 include the firewall functionality 124). Accordingly, in some embodiments, a central provider network is no longer required to route, forward, inspect or manipulate data plane traffic, because data plane traffic policy implementation is conducted in the device 100 by the service processor 115. However, it is still an option, in some embodiments, to bring data plane traffic in from the base stations 125 to a central provider network using either open or secure Internet routing if desired. Base station control plane communication for access network AAA (Authentication, Authorization, and Accounting) server 121, DNS/DHCP (Domain Name System/Dynamic Host Configuration Protocol) server 126, mobile wireless center 132 (sometimes referenced to in part as a home location register (HLR) or other acronym) or other necessary functions are accomplished, for example, with a secure IP tunnel or TCP connection between the central provider network and the base stations. The base station 125 is used to refer to multiple base station embodiments where the base station itself is directly connected to the RAN, or where the base station connects to a base station controller or base station aggregator function that in turn connects to the RAN, and all such configurations are collectively referred to herein as base station 125 in FIG. 1 and most figures that follow that reference base station 125 as described below.

As shown, the central provider access network is both 3G and 4G capable, the devices 100 can be either 3G, 4G or multi-mode 3G and 4G. Those of ordinary skill in the art will also appreciate that in the more general case, the network could be 2G, 3G and 4G capable, or the device could be 2G, 3G and 4G capable with all or a subset of Global System for Mobile (GSM), General Packet Radio Service (GPRS), Code Division Multiple Access (CDMA) 1×, High Speed Packet Access (HSPA), Evolution Data Optimized (EVDO), Long Term Evolution (LTE) and WiMAX modem capability. If the devices are single mode, then the 3G devices 100 will be activated with a service profile applied to service processor 115 that is consistent with the 3G network capacity and speed, and the 4G devices will be activated with service profiles applied to service processor 115 that are consistent with 4G network capacity and speed. In both cases, the same service controller 122 manages services for both sets of devices in accordance with some embodiments. If the devices are multimode, then the service processor 115 can be activated with a dual mode service profile capability in which the service profile for 3G offers a similar rich set of services as the service profile for 4G but with, for example, scaled back bandwidth. For example, this approach is allows central providers to offer a richer set of service offerings with 3G and then migrate the same set of service offerings to 4G but with higher performance. In particular, this approach allows 3G to 4G rich service migration to occur, for example, with the only change being the increased bandwidth settings in the service profiles that will be available in 4G at the same cost as 3G with lower service profile bandwidth settings.

In some embodiments, if the devices are multimode, a network selection policy implementation within service processor 115 is provided, or in some embodiments, a network selection policy is driven by policy decisions made in service controller 122 based on service availability reports received from service processor 115. The network selection policy allows the selection of the network that corresponds to the most desirable service profile to meet the user's service preferences. For example, if the user specifies, within the framework of the service notification and user preference feedback embodiments described below, that maximum performance is the most important factor in selecting which access network to connect to, then the best profile is likely to be the 4G network as 4G is typically faster, except perhaps, for example, if the device 100 is closer to the 3G base station so that there is a much stronger signal or if the 4G network is much more heavily loaded than the 3G network. On the other hand, if the user preference set specifies cost as the most important factor, then depending on the central provider service costs the 3G network may prove to be the most desirable service profile.

This is a simple example and many other selection criteria are possible in the network selection embodiment as discussed further below.

In some embodiments, a service controller (e.g., a network device based service control element/function) facilitates coordination for and/or provisions wireless access/radio access bearers (e.g., RABs) on a device (e.g., a communications device, such as a mobile wireless communications device and/or an intermediate networking device), on network, and/or on device plus network. In some embodiments, the service controller provides device capacity demand reports to other network equipment/elements/functions, and then also provisions the RAB channel based on various criteria and determinations.

Network-Based Service Usage Monitoring for Verification and Other Purposes

In some embodiments, if the base station data plane traffic is transmitted via the Internet 120 as discussed above, then IPDRs (Internet Protocol Detail Records, also sometimes and interchangeably referred to herein as Charging Data Records or CDRs, which as used herein refer to any network measure of service usage or service activity for voice and/or data traffic (e.g., IPDRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the IPDRs can be generated by one or more of the following: base station 125, RAN or transport gateways and AAA 121. In some access network embodiments, the IPDRs are transmitted to equipment functions that aggregate the IPDRs for the purpose of service billing and other functions. Aggregation can occur in the AAA, the transport gateways or other functions including the billing system 123. As discussed below, it is often the case that the IPDRs are assumed to be obtained from the AAA server 121 and/or a service usage data store 118 (e.g., a real-time service usage collection stored in a database or a delayed feed service usage collection stored in a database), or some other network function. However, this does not imply that the IPDRs may not be obtained from a variety of other network functions, and in some embodiments, the IPDRs are obtained from other network functions as disclosed herein. In some embodiments, existing IPDR sources are utilized to obtain network-based service usage measures for multiple purposes including but not limited to service policy or profile implementation verification, triggering service verification error responds actions, and service notification synchronization. Certain types of IPDRs can be based on, or based in part on, what are sometimes referred to as CDRs (Charging Data Records, which can track charges for voice and data usage) or modifications of CDRs. Although the capability to monitor, categorize, catalog, report and control service usage or service activity is in general higher on the device than it is in the network, and, as described herein, device-based service monitoring or control assistance is in some ways desirable as compared to network-based implementations, as described herein many embodiments take advantage of network-based service monitoring or control to augment device-assisted service monitoring or control and vice versa. For example, even though many embodiments work very well with minimal IPDR service usage or service activity information that is already available in a network, deeper levels of IPDR packet inspection information in general enable deeper levels of service monitoring or service control verification, which can be desirable in some embodiments. As another example, deeper levels of network capability to control service usage or service activity can provide for more sophisticated error handling in some embodiments, for example, providing for more options of the Switched Port Analyzer (SPAN) and network quarantine embodiments as described herein. As another example, in some embodiments it is advantageous to take advantage of network-based service monitoring or control for those service aspects the network is capable of supporting, while using device-assisted service monitoring or control for the service aspects advantageously implemented on the device.

A charging data record (CDR) is a term that as used herein defines a formatted measure of device service usage information, typically generated by one or more network functions that supervise, monitor, and/or control network access for the device. CDRs typically form the basis for recording device network service usage, and often form the basis for billing for such usage. Various embodiments are provided herein for device-assisted CDR creation, mediation, and billing. There are many limitations to the capabilities of service usage recording, aggregation and/or billing when CDRs are generated exclusively by network-based functions or equipment. Accordingly, by either augmenting network-based service usage measures with device-based service usage measures, or by replacing network-based service usage measures with device-based service usage measures, it is possible to create a CDR generation, aggregation, mediation and/or billing solution that has superior or more desirable capabilities/features. While in theory, many of the service usage measures that can be evaluated on a device can also be evaluated in the network data path using various network equipment technologies including but not limited to deep packet inspection (DPI), there are many examples where measuring service usage at the device is either more desirable or more practical, or in some cases it is the only way to obtain the desired measure. Such examples include but are not limited to the following: application layer service usage measures (e.g., traffic usage categorized by application or by combinations of application, destination, and/or content type); usage measures that do not involve user traffic but instead involve network overhead traffic (e.g., basic connection maintenance traffic, signaling traffic, network logon/AAA/authentication/monitoring traffic, service software update traffic); usage that is associated with services that are charged to another entity other than the end user (e.g., basic network connection service offer traffic, traffic associated with providing network access to or downloading service marketing information, traffic associated with advertiser sponsored services, traffic associated with content provider sponsored services, 911 service traffic); usage measures involving encrypted traffic (e.g., traffic that is run over encrypted networking protocols or between secure end points); implementing service usage measure collection and/or service usage billing across multiple networks that may have different and in some cases incompatible, inaccessible (to the CDR system of record) or incomplete service usage measurement capabilities; service usage measurement and/or service usage billing capabilities that are not supported by the present network gateways, routers, MWC/HLRs, AAA, CDR aggregation, CDR mediation, billing and/or provisioning systems; new service usage measures and/or new service usage billing capabilities that are desirable to implement in a manner that does not require major changes or upgrades to the existing network gateways, routers, MWC/HLRs, AAA, CDR aggregation, CDR mediation, billing and/or provisioning systems; new service usage measures and/or new service usage billing capabilities that are desirable to implement in a manner that allows for rapid definition and implementation of new service measures and/or billing plans; new service usage measures and/or new service usage billing capabilities that are desirable to implement in a manner that may be implemented in a manner that enables multiple device group definitions in which each device group gets a customized programmable definition for service usage collection, accounting and/or billing; multi-device billing; multi-user billing; intermediate device billing with single user and multi user with and without multi device; content downloads from a specific source to a specific application with the content being of a specific type or even identified down to a particular content ID; and/or various other single event transactions used for billing purposes. For these and other reasons, it is desirable to provide a system/process that utilizes device-assisted service usage measures that provides either an enhancement of existing network-based service usage CDR system capabilities and techniques and/or a replacement for network-based CDR system capabilities and techniques.

In some embodiments, service usage information includes network-based service usage information. In some embodiments, the network-based service usage information includes network-based CDRs. In some embodiments, service usage information includes device-based service usage information. In some embodiments, device-based service usage information includes device assisted CDRs, also referred to herein as micro-CDRs, as described herein. In some embodiments, micro-CDRs are used for CDR mediation or reconciliation that provides for service usage accounting on any device activity that is desired (e.g., providing granular service usage information, such as based on application layer service usage monitoring, transaction service usage monitoring, QoS activities/sessions/transactions, and/or other types of service usage information). In some embodiments, each device includes a service processor (e.g., a service processor executed on a processor of a communications device, such as a mobile device or an intermediate networking device that can communicate with a wireless network).

In some embodiments, techniques, such as a system and/or process, that utilize device-assisted service usage measures include one or more of the following: (1) receiving a service usage measure from a device in communication with a wireless network, (2) verifying or protecting the validity of the service usage measure, (3) generating a CDR based on the service usage measure (e.g., device-assisted CDR), (4) aggregating CDRs, and (5) mediating the CDR with network CDRs. In some embodiments, the techniques also include providing a design and provisioning of devices/network equipment to recognize the CDRs. In some embodiments, the techniques also include provisioning to recognize that the device belongs to a Device Assisted Services (DAS) device group and that corresponding CDRs should be accepted and mediated. In some embodiments, the device-assisted CDRs are also generated using formats, network communications protocols, network device authentication and/or provisioning to allow device-assisted CDRs into the network CDR system, encryption, and/or signatures as required by the network (e.g., to comply with network generated CDR requirements or based on any other network and/or service provider requirements and/or standards).

In some embodiments, mediation rules include multi-device, multi-user, single-user devices, and/or intermediate networking devices that can be single-user or multi-user, as described herein.

In some embodiments, a device-assisted CDR generator collects device-based service usage measures that are used as the basis for, or as an enhancement (e.g., as a supplement or in addition) to, one or more (e.g., network generated) CDRs that provide one or more networking functions with properly formatted service usage reports that the network function(s) accepts as being transmitted from an authorized source, read, and utilized for helping to determine the service usage of a device or group of devices. In some embodiments, the network functions that the device-assisted CDR generator shares CDRs with typically include one or more of the following: service usage/CDR aggregation and/or mediation servers, gateways, routers, communication nodes, Mobile Wireless Centers (MWCs, including HLRs), databases, AAA systems, billing interfaces, and billing systems. For example, the process of CDR creation in the CDR generator typically includes either using one or more device-based measures of service usage, or one or more device-based measures of service usage in combination with one or more network-based measures of service usage, possibly processing one or more of such service usage measures according to a set of CDR creation, CDR aggregation, and/or CDR mediation rules to arrive at a final device usage measure that is, for example, then formatted with the proper syntax, framed, possibly encrypted and/or signed, and encapsulated in a communication protocol or packet suitable for sharing with network functions. In some embodiments, the CDR generator resides in the device. In some embodiments, the CDR generator resides in a network server function that receives the device-assisted service usage measures, along with possibly network-based usage measures, and then creates a CDR (e.g., in the service controller 122).

In some embodiments, the device-assisted CDR generator can reside in the service processor (e.g., service processor 115), for example, in the service usage history or billing server functions. In some embodiments, the device-assisted CDR generator resides in the device itself, for example, within the service processor functions, such as the billing agent or the service monitor agent.

There are several factors that are considered in the various embodiments in order to create a useful, reliable, and secure device-assisted CDR system, including, for example, but not limited to: identification of each device-based service usage measure with one or more usage transaction codes; verification of the device-based usage measure(s); secure communication of the device-based usage measures to the network; efficient (e.g., low bandwidth) communication of the device-based service usage measure; coordination/comparison/aggregation of the device-based service usage measure with network-based service usage measure(s); formatting the device-based service usage measure into a CDR that can be properly communicated to the network functions and/or equipment that process service usage information; causing the network-based functions and/or equipment used for CDR collection, aggregation, mediation and/or billing to recognize, authorize, and accept communications and CDRs from the device-assisted CDR generator, reading and properly implementing the correct network session context for the CDR so that the CDR is properly associated with the correct device/user/session; implementing the CDR aggregation rules that determine how to collect and aggregate the device-assisted CDRs as they are reported through the network CDR system hierarchy; implementing the mediation rules that determine how the various device-based service usage transaction code measures are combined and mediated with the other device-based service usage transaction code measures to result in consistent service usage information for each of the transaction code categories maintained in the network; implementing the mediation rules that determine how the device-assisted CDRs are combined and mediated with network-based CDRs to result in consistent service usage information for each of the transaction code categories maintained in the network; implementing mediation rules to reconcile the variances between network-based CDR usage measures and device-assisted CDR usage measures; classification of one or more device groups, with each group having the capability to uniquely define the service usage collection, accounting, and/or billing rules; collecting CDRs generated on networks other than the home network so that service usage may be measured, accounted for, and/or billed for across multiple networks; multi-device billing; multi-user billing; and/or intermediate device billing with single user and multi user with and without multi device.

In some embodiments, verification of the relative accuracy of the device-assisted service usage measure is provided. Given that, for example, the service usage measure is often being generated on an end user device or a device that is readily physically accessed by the general public or other non-secure personnel from a network management viewpoint, in some embodiments, the device agents used in one or more of the service processor 115 agents are protected from hacking, spoofing, and/or other misuse. Various techniques are provided herein for protecting the integrity of the agents used for generating the device-assisted service usage measures.

In some embodiments, the service usage measures are verified by network-based cross checks using various techniques. For example, network-based cross checks can provide valuable verification techniques, because, for example, it is generally not possible or at least very difficult to defeat well designed network-based cross checks using various techniques, such as those described herein, even if, for example, the measures used to protect the device agents are defeated or if no device protection measures are employed. In some embodiments, network-based cross checks used to verify the device-assisted service usage measures include comparing network-based service usage measures (e.g. CDRs generated by service usage measurement apparatus in the network equipment, such as the BTS/BSCs 125, RAN Gateways, Transport Gateways, Mobile Wireless Center/HLRs 132, AAA 121, Service Usage History/CDR Aggregation, Mediation, Feed 118, or other network equipment), sending secure query/response command sequences to the service processor 115 agent(s) involved in device-assisted CDR service usage measurement or CDR creation, sending test service usage event sequences to the device and verifying that the device properly reported the service usage, and using various other techniques, such as those described herein with respect to various embodiments.

In some embodiments, one or more of the following actions are taken if the device-based service usage measure is found to be in error or inaccurate: bill the user for usage overage or an out of policy device, suspend the device, quarantine the device, SPAN the device, and/or report the device to a network administration function or person.

In some embodiments, the CDR syntax used to format the device-assisted service usage information into a CDR and/or network communication protocols for transmitting CDRs are determined by industry standards (e.g., various versions of 3GPP TS 32.215 format and 3GPP2 TSG-X X.S0011 or TIA-835 format). In some embodiments, for a given network implementation the network designers will specify modifications of the standard syntax, formats and/or network communication/transmission protocols. In some embodiments, for a given network implementation the network designers will specify syntax, formats, and/or network communication/transmission protocols that are entirely different than the standards.

In some embodiments, within the syntax and formatting for the CDR the device-assisted service usage is typically categorized by a transaction code. For example, the transaction code can be similar or identical to the codes in use by network equipment used to generate CDRs, or given that the device is capable of generating a much richer set of service usage measures, the transaction codes can be a superset of the codes used by network equipment used to generate CDRs (e.g., examples of the usage activities that can be labeled as transaction codes that are more readily supported by device-assisted CDR systems as compared to purely network-based CDR systems are provided herein).

In some embodiments, the device sends an identifier for a usage activity tag, an intermediate server determines how to aggregate into CDR transaction codes and which CDR transaction code to use.

In some embodiments, the device service processor 115 compartmentalizes usage by pre-assigned device activity transaction codes (e.g., these can be sub-transactions within the main account, transactions within a given bill-by-account transaction or sub-transactions within a bill-by-account transaction). The device implements bill-by-account rules to send different usage reports for each bill-by-account function. In some embodiments, the service controller 122 programs the device to instruct it on how to compartmentalize these bill-by-account service usage activities so that they can be mapped to a transaction code.

In some embodiments, the device reports less compartmentalized service usage information and the service controller 122 does the mapping of service usage activities to CDR transaction codes, including in some cases bill-by-account codes.

In some embodiments, the CDR sent to 118 or other network equipment, for example, can include various types of transaction codes including but not limited to a raw device usage CDR, a bill-by-account (e.g., a sub-activity transaction code) CDR, a billing offset CDR, and/or a billing credit CDR. For example, the decision logic (also referred to as business rules or CDR aggregation and mediation rules) that determines how these various types of CDR transaction codes are to be aggregated and mediated by the core network and the billing system can be located in the network equipment (e.g., a network element, such as service usage 118), in the service controller 122, and/or in the billing system 123.

In some embodiments, the device-assisted CDR generator uses the device-assisted service usage measures to generate a CDR that includes service usage information, service usage transaction code(s), and, in some embodiments, network information context. In some embodiments, the service usage information, transaction code, and/or network information context is formatted into communication framing, syntax, encryption/signature, security and/or networking protocols that are compatible with the formatting used by conventional networking equipment to generate CDRs. For example, this allows networking equipment used for CDR collection, recording, aggregation, mediation, and/or conversion to billing records to properly accept, read, and interpret the CDRs that are generated with the assistance of device-based service usage measurement. In some embodiments, the device-assisted service measures are provided to an intermediate network server referred to as a service controller (e.g., service controller 122). In some embodiments, the service controller uses a CDR feed aggregator for a wireless network to collect device generated usage information for one or more devices on the wireless network; and provides the device generated usage information in a syntax (e.g., charging data record (CDR)), and a communication protocol (e.g., 3GPP or 3GPP2, or other communication protocol(s)) that can be used by the wireless network to augment or replace network generated usage information for the one or more devices on the wireless network.

In some embodiments, mediation rules include multi-device, multi-user, single-user devices, and intermediate networking devices that can be single-user or multi-user. For example, the device-assisted CDRs can be formatted by the device-assisted CDR generator to include a transaction code for one user account, even though the CDRs originate from multiple devices that all belong to the same user. This is an example for a multi-user device-assisted CDR billing solution. In another example for a multi-user device-assisted CDR billing solution, device-assisted CDRs from multiple devices and multiple users can all be billed to the same account (e.g., a family plan or a corporate account), but the bill-by-account CDR transaction records can be maintained through the billing system so that sub-account visibility is provided so that the person or entity responsible for the main account can obtain visibility about which users and/or devices are creating most of the service usage billing. For example, this type of multi-user, multi-device device-assisted CDR billing solution can also be used to track types of service usage and/or bill for types of service usage that are either impossible or at least very difficult to account and/or bill for with purely network-based CDR systems. In some embodiments, bill-by-account CDR transaction records can be used to provide sponsored transaction services, account for network chatter, provide service selection interfaces, and other services for multi-user or multi-device service plans.

In addition to conventional single user devices (e.g., cell phones, smart phones, netbooks/notebooks, mobile internet devices, personal navigation devices, music players, electronic eReaders, and other single user devices) device-assisted service usage measurement and CDRs are also useful for other types of network capable devices and/or networking devices, such as intermediate networking devices (e.g., 3G/4G WWAN to WLAN bridges/routers/gateways, femtocells, DOCSIS modems, DSL modems, remote access/backup routers, and other intermediate network devices). For example, in such devices, particularly with a secure manner to verify that the device-assisted service usage measures are relatively accurate and/or the device service processor 115 software is not compromised or hacked, many new service provider service delivery and billing models can be supported and implemented using the techniques described herein. For example, in a Wi-Fi to WWAN bridge or router device multiple user devices can be supported with the same intermediate networking device in a manner that is consistent and compatible with the central provider's CDR aggregation and/or billing system by sending device-assisted CDRs as described herein that have a service usage and/or billing code referenced to the end user and/or the particular intermediate device.

In some embodiments, the device-assisted CDRs generated for the intermediate networking device are associated with a particular end user in which there can be several or many end users using the intermediate networking device for networking access, and in some embodiments, with each end user being required to enter a unique log-in to the intermediate networking device. For example, in this way, all devices that connect using Wi-Fi to the intermediate networking device to get WWAN access generate CDRs can either get billed to a particular end user who is responsible for the master account for that device, or the CDRs can get billed in a secure manner, with verified relative usage measurement accuracy to multiple end users from the same intermediate networking device. In another example, an end user can have one account that allows access to a number of intermediate networking devices, and each intermediate networking device can generate consistent device-assisted CDRs with transaction codes for that end user regardless of which intermediate networking device the end user logs in on.

In some embodiments, some of the services provided by the intermediate networking device are billed to a specific end user device-assisted CDR transaction code, while other bill-by-account services are billed to other transaction code accounts, such as sponsored partner transaction service accounts, network chatter accounts, sponsored advertiser accounts, and/or service sign up accounts. For example, in this manner, various embodiments are provided in which intermediate networking devices (e.g., a WWAN to Wi-Fi router/bridge) can sold to one user but can service, and be used to bill, other users (e.g., and this can be covered in the first purchasing user's service terms perhaps in exchange for a discount), or such intermediate networking devices can be located wherever access is desired without concern that the device will be hacked into so that services can be acquired without charge.

In some embodiments, various types of service usage transactions are billed for on the intermediate networking device, to any of one or more users, in which the information required to bill for such services is not available to the central provider or MVNO network equipment, just as is the case with, for example, conventional single user devices. In view of the various embodiments and techniques described herein, those skilled in the art will appreciate that similar service models are equally applicable not just to WWAN to Wi-Fi intermediate networking devices, but also to the femtocell, remote access router, DOCSIS, DSL and other intermediate WWAN to Wi-Fi networking devices.

In some embodiments, each device activity that is desired to be associated with a billing event is assigned a micro-CDR transaction code, and the service processor is programmed to account for that activity associated with that transaction code (e.g., various transaction codes can be associated with service usage associated with Apple iTunes music, Apple App Store applications, Facebook social networking, Google search, eBay online commerce, and Amazon Kindle eBooks, respectively, which can be used for providing granular service usage for these various Internet/network-based services/sites/transactions and/or any other Internet/network-based services/sites, which can include transactional based services, such as Apple iTunes, Apple App Store, and Amazon Kindle). For example, using these techniques, as described herein, essentially any type of device activity can be individually accounted for and/or controlled (e.g., throttled, restricted, and/or otherwise controlled as desired). In some embodiments, the service processor periodically reports (e.g., during each heartbeat or based on any other periodic, push, and/or pull communication technique(s)) micro-CDR usage measures to, for example, a service controller or some other network element/function. In some embodiments, the service controller reformats the heartbeat micro-CDR usage information into a valid CDR format (e.g., a CDR format that is used and can be processed by an SGSN or GGSN or some other authorized network element/function for CDRs) and then transmits the reformatted micro-CDRs to a network element/function for performing CDR mediation.

In some embodiments, CDR mediation is used to properly account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system can process the mediated CDR feed from CDR mediation, apply the appropriate account billing codes to the aggregated micro-CDR information that was generated by the device, and then generate billing events in a manner that does not require changes to existing billing systems, infrastructures, and techniques (e.g., using new transaction codes to label the new device-assisted billing capabilities).

In some embodiments, the communications device is a mobile communications device, and the service includes one or more Internet-based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem. In some embodiments, an intermediate networking device includes any type of networking device capable of communicating with a device and a network, including a wireless network, example intermediate networking devices include a femtocell, or any network communication device that translates the wireless data received from the device to a network, such as an access network. In some embodiments, intermediate networking devices include 3G/4G WWAN to WLAN bridges/routers/gateways, femtocells, DOCSIS modems, DSL modems, remote access/backup routers, and other intermediate network devices.

In some embodiments, a revenue sharing model is provided using a settlement platform. In some embodiments, a revenue sharing model is provided using a settlement platform for providing one or more of the following: service activation revenue share or bounty (e.g., to one or more partners, such as OEMs, an ambient service partner, a roaming service partner, a carrier network partner, a device retailer or distributor, a service seller, a service re-seller, distributors, MVNOs, carriers, and/or service providers), service usage billing (e.g., to one or more partners, such as OEMs, distributors, MVNOs, carriers, and/or service providers), service usage revenue share (e.g., to one or more partners, such as OEMs, distributors, MVNOs, carriers, and/or service providers), and transactional revenue share (e.g., to one or more partners, such as an OEM, an ambient service partner, a roaming service partner, a carrier network partner, a device retailer or distributor, a service seller, a service re-seller, distributors, MVNOs, carriers, and/or service providers). For example, a revenue sharing model can allow for a distribution partner to access activation information for a specified device or a specified device group for which they are potentially entitled to a bounty (e.g., a fixed fee or some other payment or credit terms, etc.) for activation, and the revenue sharing model can also allow for one or more OEMs (e.g., or other device group partner) access to information regarding service usage for the specified device or the specified device group for which they are potentially entitled to a service usage revenue share (e.g., percentage, fixed fee, transactional fee or credit, or some other form of revenue share) for the associated or particular service usage. For example, a distributor (e.g., Amazon, Best Buy, or any other distributor) can be allocated a bounty for each activated eBook reader based on service activation for that eBook reader (e.g., the value/terms of the bounty can vary based on the type of service that is activated for that eBook reader, such as an ambient service versus a premium data plan service), and the bounty can also require activation within a certain period of time of the sale (e.g., if activated within 30 days after sale by the distributor of the eBook to a customer). As another example, a service revenue share can be provided with an OEM (e.g., Sony or Google, or another eBook manufacturer, or another device group distribution partner), for example, for a period of time after the initial activation of the eBook reader (e.g., 2 years after activation), which is referred to herein as, for example, a service revenue bounty, a service revenue share, or a service revenue sharing model. In some embodiments, a partner (e.g., Amazon, Barnes & Noble, Google, or any other partner) pays for or subsidizes the cost of the associated service usage for the eBook reader, and a revenue share for each book paid for by the service provider is provided (e.g., a transactional service revenue share) between the service provider (e.g., carrier, central provider, MVNO, and/or other service provider) and the partner. In some embodiments, these and other revenue share model techniques are implemented using a settlement platform, as described herein. In some embodiments, these and other revenue share and service billing techniques are implemented using a settlement platform and micro-CDRs, as described herein.

Figure 2:
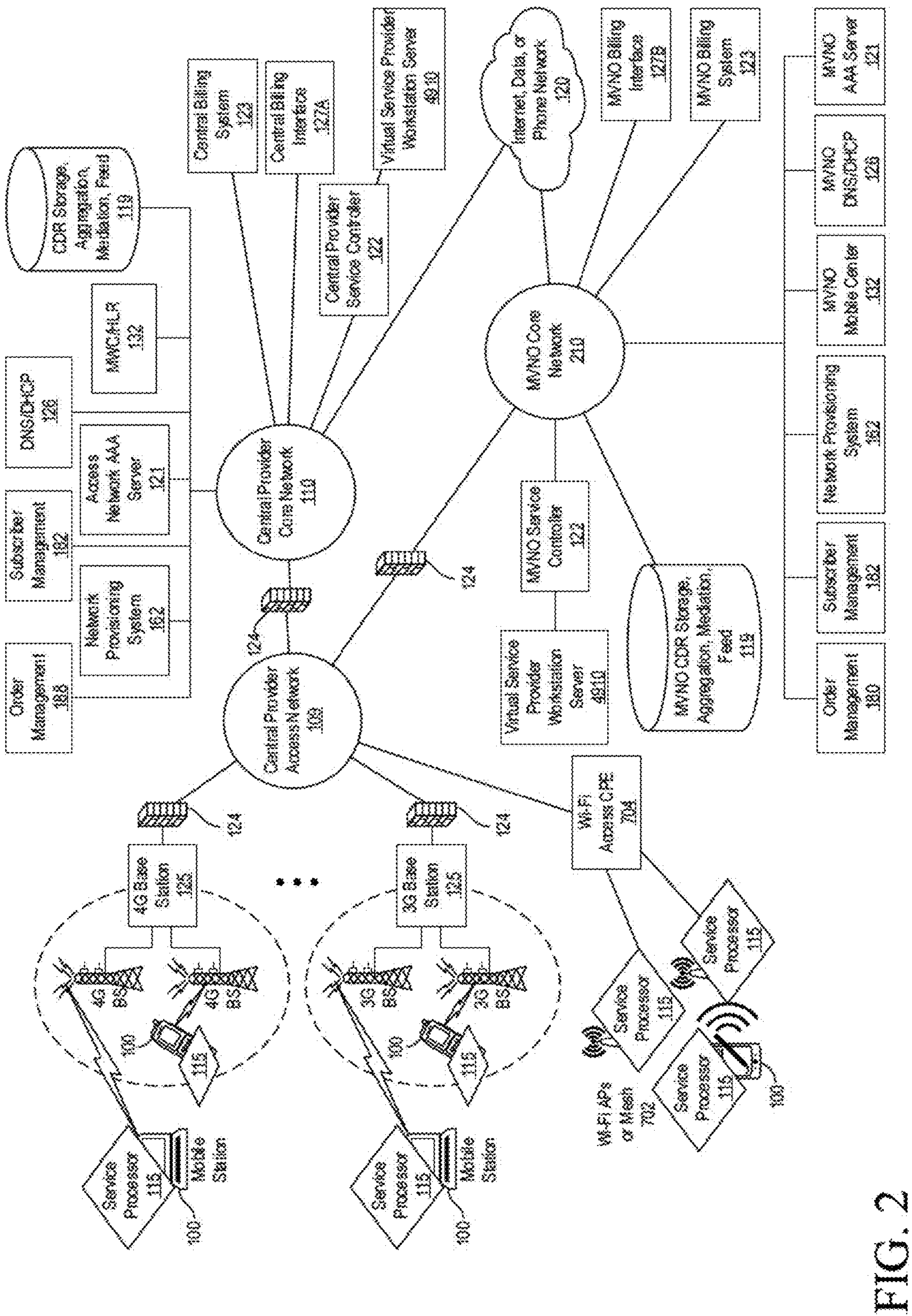
FIG. 2 illustrates a wireless network architecture for providing device-assisted CDR creation, aggregation, mediation and billing in accordance with some embodiments.

FIG. 2 illustrates a wireless network architecture for providing device-assisted CDR creation, aggregation, mediation and billing in accordance with some embodiments. As shown, FIG. 2 includes a 4G/3G/2G wireless network operated by, for example, a central provider. As shown, various wireless devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the wireless devices 100 includes a service processor 115 (as shown), and each service processor connects through a secure control plane link to a service controller 122. In some embodiments, the network based service usage information (e.g., CDRs) is obtained from one or more network elements. As shown, an MVNO core network 210 also includes a CDR storage, aggregation, mediation, feed 119, a MVNO billing interface 122, and a MVNO billing system 123 (and other network elements as shown in FIG. 2). A Virtual Service Provider Work Station 4910 (also referred to herein as a service design interface) provides a user interface to central provider service designers, MVNO service designers or other service designers for the purpose of simplifying and organizing the process of service design as described herein.

Figure 3:
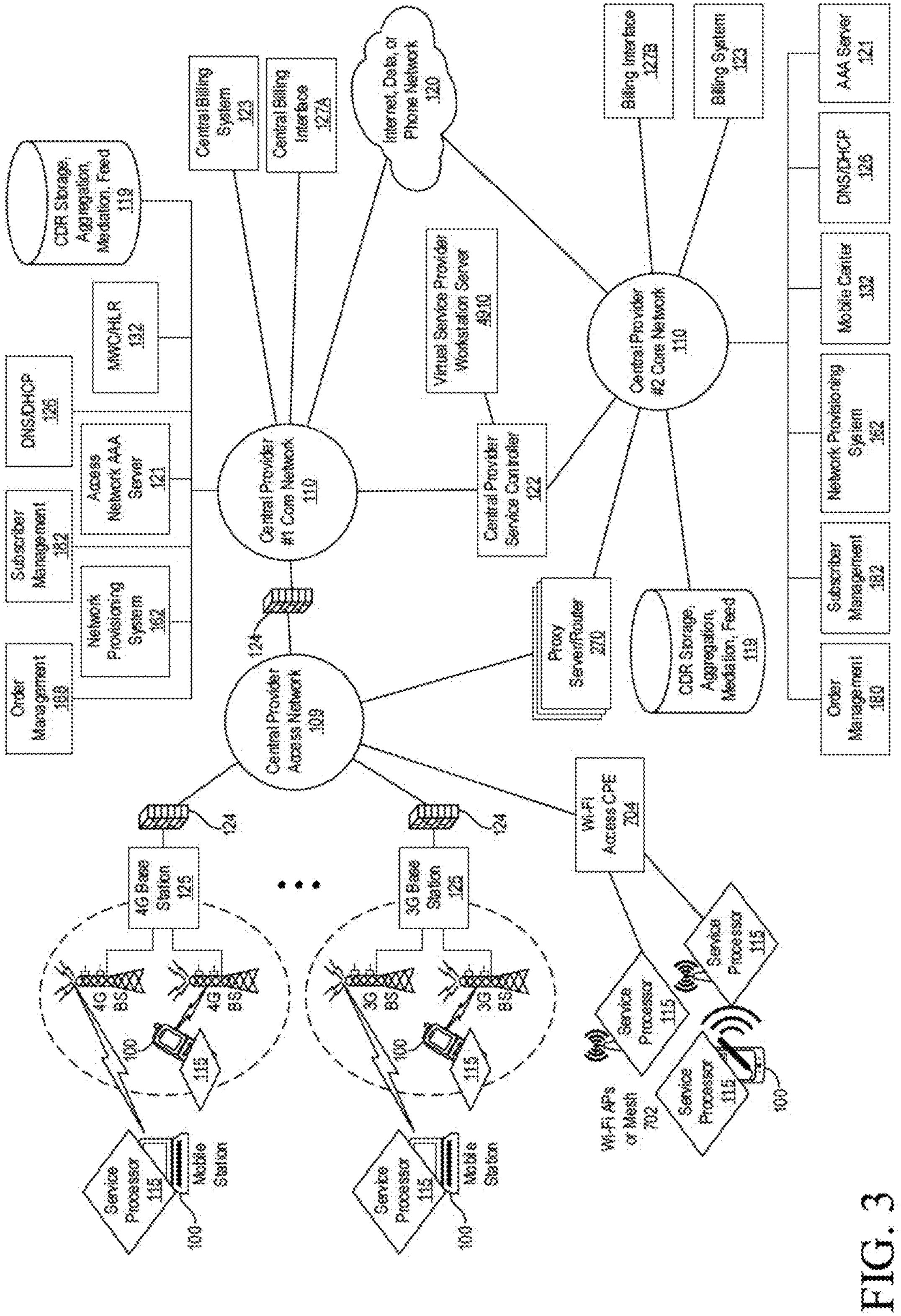
FIG. 3 illustrates a wireless network architecture for providing device-assisted CDR creation, aggregation, mediation and billing including two service provider networks in accordance with some embodiments.

FIG. 3 illustrates a wireless network architecture for providing device-assisted CDR creation, aggregation, mediation and billing including two service provider networks in accordance with some embodiments. The description of the network equipment element functions is generally identical to the embodiments depicted in other figures, except that one or more service controllers 122 and/or proxy servers/routers 270 and/or service design interfaces (VSP Interface 4910) are shared between the two networks as described herein. For example, the network equipment, charging record formats, provisioning systems can be similar in the two networks, or may be completely different since in the various embodiments the service controller 122, service processor 115, and/or proxy server/router 270 are used to provide unified roaming services, or in some embodiments, to provide common network service features across the different networks.

Figure 4:
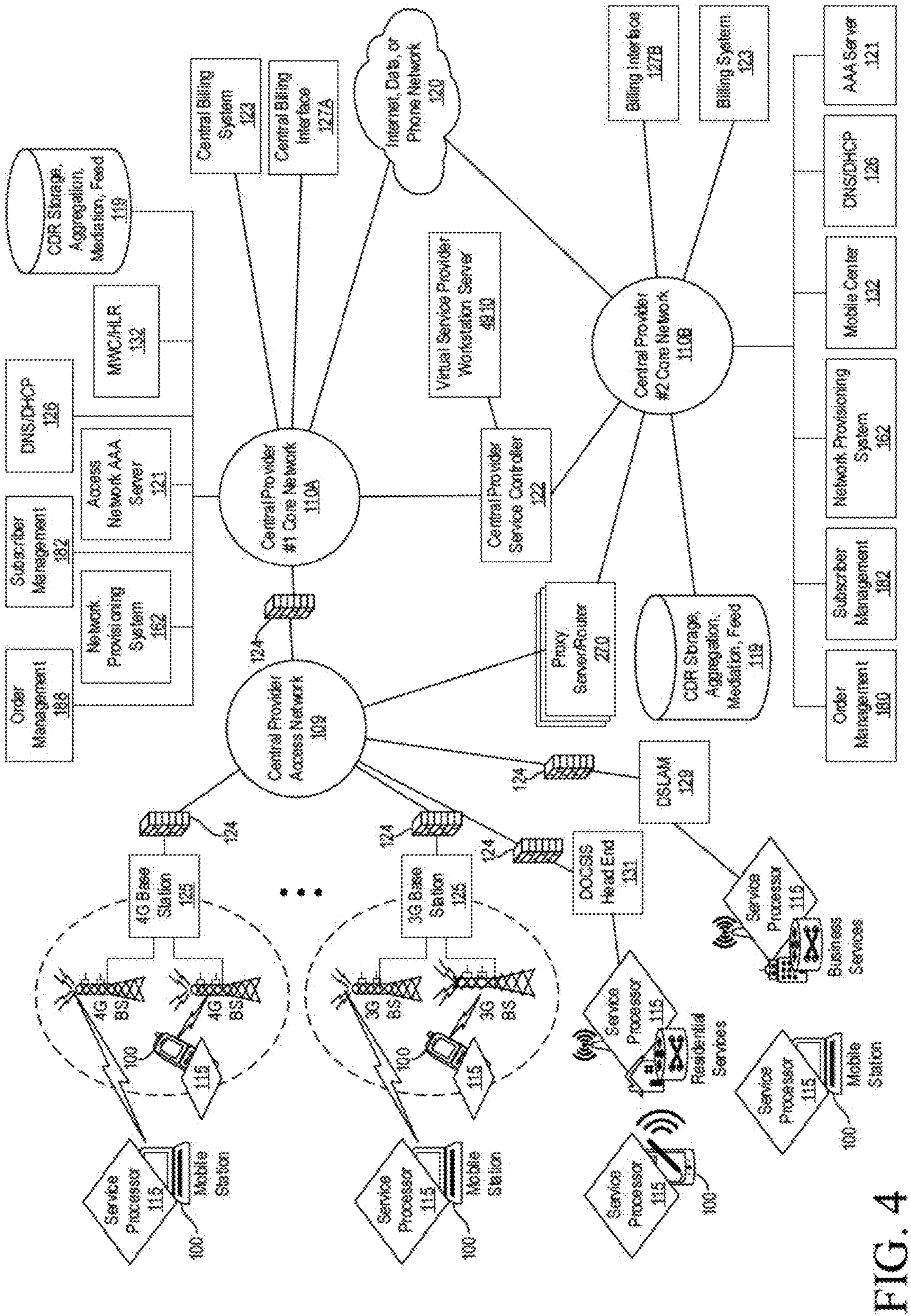
FIG. 4 illustrates a wireless network architecture for providing device-assisted CDR creation, aggregation, mediation and billing including two service provider networks in accordance with some embodiments, involving one or more of service controllers and/or service processors.

FIG. 4 illustrates a wireless network architecture for providing device-assisted CDR creation, aggregation, mediation and billing including two service provider networks in accordance with some embodiments, involving one or more of service controllers and/or service processors. FIG. 4 is similar to FIG. 3 except that FIG. 4 illustrates that various types of access network technology and equipment can be used on any number of the central provider networks (e.g., 2G/3G/4G cellular wireless plus Wi-Fi is the example in FIG. 3 while 2G/3G/4G cellular wireless plus DSL and cable is the example in FIG. 4). FIG. 3 and FIG. 4 do not show the access network connections to the central provider #2 core network, but that the second central provider network can have all of or some of the access equipment elements that the first central provider network possesses, or the second central provider network can posses different access network technology and equipment as described herein would be apparent to one of ordinary skill in the art. For example, if any aspect of the 2G/3G/4G technology is different for the two networks, then multi-mode wireless modules can be used in the device modems to allow for access connection using one technology on the first central provider network, and access connection using a second technology on the second central provider network. As many of the techniques and embodiments described herein allow for network service policy implementation at layers above the modem physical layer, modem MAC layer and the access network access control and authorization layers, then any number of multi-mode modem technologies can be employed to bridge connect to either of the two networks while enhancing roaming services or providing unified network services in one or more of the areas of service traffic control, user notification interfaces, charging policies and/or systems, QoS services, instant activation services and/or billing services. It will be apparent to one of ordinary skill in the art that while the discussion herein is for service provider (e.g., central provider, MVNO, VSP, etc.) networks, many of the embodiments can similarly be applied to private networks such as, for example, enterprise networks, enterprise WAN solutions and/or remote office solutions, government networks, emergency networks, and/or networks involving intermediate networking devices.

Figure 5:
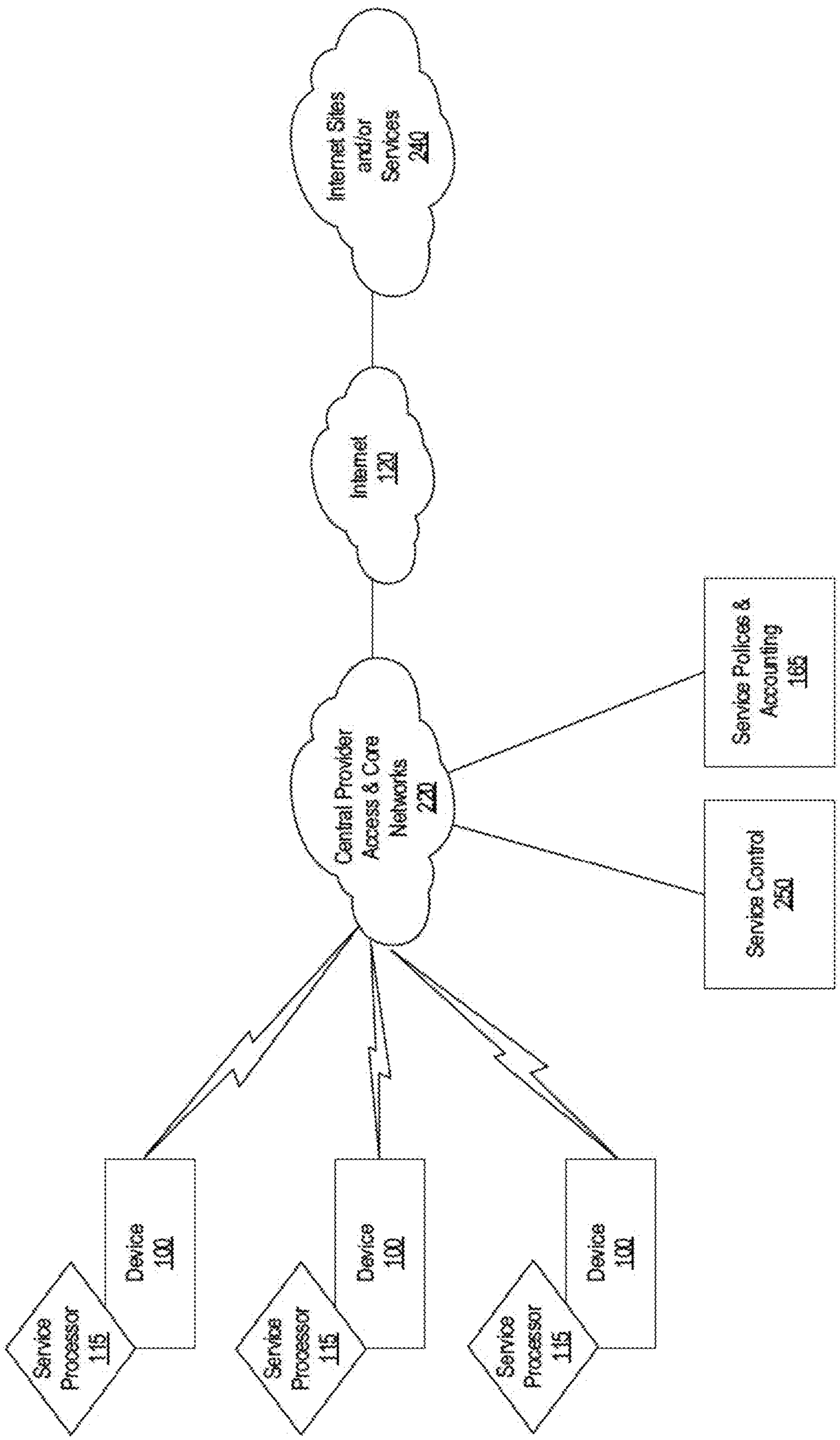
FIG. 5 illustrates a functional diagram of a network architecture for quality of service (QoS) for device-assisted services (DAS) in accordance with some embodiments.

FIG. 5 illustrates another wireless network architecture for providing device group partitions and a settlement platform in accordance with some embodiments. As shown, FIG. 5 includes various devices 100 including service processors 115. For example, devices 100 can include various types of mobile devices, such as phones, PDAs, computing devices, laptops, netbooks, tablets, cameras, music/media players, GPS devices, networked appliances, and any other networked device; and/or devices 100 can include various types of intermediate networking devices, as described herein. The devices 100 are in communication with service control 250 and central provider access and core networks 220. Service policies and accounting functions 165 are also provided in communication with the central provider access and core networks 220. For example, devices 100 can communicate via the central provider access and core networks 220 to the Internet 120 for access to various Internet sites/services 240 (e.g., Google sites/services, Yahoo sites/services, Blackberry services, Apple iTunes and App Store, Amazon.com, Facebook, and/or any other Internet service or other network facilitated service).

Referring again to FIG. 1, in some embodiments, where base station data plane traffic is backhauled and concentrated in a central provider core network 110, then the IPDRs can originate in the base stations or a router or gateway in the central provider network 110, and the IPDRs are collected at the AAA server 121 and stored in the service usage data store 118. In some embodiments, the central billing system 123 collects the IPDRs from the AAA server 121 for service billing accounting purposes. In some embodiments, a central billing system 123 collects the IPDRs directly from the initial IPDR source or some other aggregator. In some embodiments, outside partners like MVNOs gain access to the IPDRs from the central billing system 123. As discussed below, it is assumed that the IPDRs are obtained from the AAA server 121, and it is understood that the source of the IPDRs is interchangeable in the embodiments.

In some embodiments, the IPDR information is used by the service processor 115, the service controller 122 and/or other network apparatus or device apparatus to implement service control verification is provided as described below. In some embodiments, an IPDR feed (e.g., also referred to as a charging data record (CDR)) flows between network elements. For example, an IPDR feed can flow from the RAN gateway 410 (e.g., SGSN 410, BSC packet control 510 or RNC 512) and the transport gateway 420 (e.g., GGSN or PDSN). In other embodiments, the IPDRs originate and flow from the base station 125 or some other component/element in the network. In some embodiments, one or more of these IPDR feeds is transmitted to an IPDR aggregation function (e.g., also referred to as a charging gateway). For example, this aggregation function can be located in the AAA 121, in the mobile wireless center 132 (and/or in the home location register (HLR) or other similar function referred to by other common industry names), in the transport gateway 420, or in some other network element. This aggregation function collects the IPDR feeds into a database with an entry for each device 100. In some embodiments, an intermediate aggregation function is provided that feeds a higher level aggregation function, for example, the transport gateway 420 can receive IPDR feeds from the RAN gateway 410 or the base station 125 before sending them to another aggregation function. At some point in time (e.g., at the end of a specified time period, at the end of a device network connection session and/or at a specified time of day), the IPDR aggregation function sends summary information or detailed information of the IPDRs for a given device or group of devices to the billing system for billing and/or reconciliation. In some embodiments, in which the IPDR aggregation feed to the billing system is frequent enough for one or more of the IPDR information purposes described herein, the IPDR feed for the service controller 122 is derived from the aggregated feed, either by having the billing system 123 transmit it to the service controller 122, or by copying it from the IPDR aggregation function.

In some embodiments, the IPDR feed is obtained from the network function that is generating or aggregating the IPDR feed as described herein. In some embodiments, the IPDR feed is copied from the aggregation function in a manner that does not interrupt the operation of the network. For example, a switch-based port analysis function can be used to copy the traffic to a traffic analysis or server element that filters out the IPDR traffic and records it to a data base that is then either pushed to the service controller 122 (or any other network element that uses IPDR information as described herein), or is queried by the service controller 122 (or any other function that uses the IPDR information as described herein). In some embodiments, if the aggregated IPDR information transmitted to the billing system is delayed from real-time traffic usage events by an amount of time that is, for example, too long for desired operation, or for any other reason that makes it less desirable to obtain the IPDR information from the same aggregated feed used for the billing system 123, the IPDR information can be collected from one or more of the sources discussed above including, for example, from another aggregation point (e.g., the feed to the charging gateway, AAA server and/or mobile wireless center/HLR), one or more of the gateways 410, 420, 508, 512, 520, 608, 612, 620, 708, 712, 720 the base station 125 and/or another network element. In some embodiments, the IPDR feeds from these or other network functions are copied to a database as described above, which is either pushed or queried to get the information to the service controller 122 or other network elements that request the IPDR information.

In some embodiments, the service processor 115 includes various components, such as device agents, that perform service policy implementation or management functions. In some embodiments, these functions include service policy or implementation verification, service policy implementation tamper prevention, service allowance or denial, application access control, traffic control, network access control services, various network authentication services, service control plane communication, device heartbeat services, service billing, transaction billing, simplified activation services and/or other service implementations or service policy implementations. It will be apparent to those of ordinary skill in the art that the division in functionality between one device agent and another is a design choice, that the functional lines can be re-drawn in any technically feasible way that the product designers see fit, and that the placing divisions on the naming and functional breakouts for device agents aids in understanding, although in more complex embodiments, for example, it can make sense to the product designer to break out device agent functionality specifications in some other manner in order to manage development specification and testing complexity and workflow.

In some embodiments, network control of the service policy settings and services as discussed above is accomplished with the service controller 122 which in various embodiments includes one or more server functions. As with the service processor 115 agent naming and functional break out, it is understood that service controller 122 server naming and functional breakout is also a design choice and is provided mainly to aid in the discussion. It will be apparent to those of ordinary skill in the art that the server names and functional breakouts do not imply that each name is an individual server, and, for example, a single named function in the various embodiments can be implemented on multiple servers, or multiple named functions in the various embodiments can be implemented on a single server.

As shown, there are multiple open content transaction partner sites 134 (e.g., open content transaction servers), which represent the websites or experience portals offered by content partners or ecommerce transaction partners of the service provider. For example, transaction servers 134 can provide an electronic commerce offering and transaction platform to the device. In some embodiments, the central provider has ownership and management of the service controller 122, so the central provider and the service provider are the same, but as discussed below the service provider that uses the service controller 122 to manage the device services by way of service processor 115 is not always the same as the central provider who provides the access network services.

In some embodiments, further distribution of central provider access networking functions such as access network AAA server 121, DNS/DHCP server 126, and other functions are provided in the base stations 125. In some embodiments, network-based device service suspend/resume control is also provided in the base stations 125 (or in some embodiments, for hierarchical or overlay networks, this function is provided by one or more of the following: RAN gateways, transport gateways, AAA 121 or some other network function). As shown, the following are connected (e.g., in network communication with) the central provider network 110: central provider billing system 123, dedicated leased lines 128 (e.g., for other services/providers), central provider service controller 122, a content management (e.g., content switching, content billing, and content catching) system 130, central provider DNS/DHCP server 126, access network AAA server 121, service usage data store 118 and central provider mobile wireless center 132. These embodiments may be advantageous particularly for flat networks as that shown in FIG. 1 that are provided by the present invention.

In some embodiments, the base stations 125 implement a firewall function via firewall 124 and are placed directly onto the local loop Internet for backhaul. Voice traffic transport is provided with a secure protocol with Voice Over IP (VOIP) framing running over a secure IP session, for example, Virtual Private Network (VPN), IP Security (IPSEC) or another secure tunneling protocol. In some embodiments, the VOIP channel employs another layer of application level security on the aggregated VOIP traffic trunk before it is placed on the secure IP transport layer. Base station control traffic and other central provider traffic can be provided in a number of ways with secure transport protocols running over Transmission Control Protocol (TCP), Internet Protocol (IP) or User Datagram Protocol (UDP), although TCP provides a more reliable delivery channel for control traffic that is not as sensitive to delay or jitter. One example embodiment for the control channel is a control link buffering, framing, encryption and secure transport protocol similar to that described below for the service control link between a device and the network. In some embodiments, a service control heartbeat function is provided to the base stations 125 similar to that implemented between the service controller 122 and the service processor 115 as described below. If the need to maintain a bandwidth efficient control plane channel between the base stations and the central provider base station control network is not as critical as it is in the case of access network connection to the device, then there are many other approaches for implementing a secure control channel over the Internet including, for example, one or more of various packet encryption protocols running at or just below the application layer, running TCP Transport Layer Security (TLS), and running IP level security or secure tunnels.

In some embodiments, the device-based services control plane traffic channel between the service processor 115 and the service controller 122 is implemented over the same control plane channel used for the flat base station control architecture, or in some embodiments, over the Internet. As discussed below, it is assumed that the device bases services control plane channel for service processor 115 to service controller 122 communications is established through the Internet 120 or through the access network using IP protocols as this is the more general case and applies to overlay network applications for various embodiments as well as applications where various embodiments are used to enable flattened access networks.

In some embodiments, by enabling the device to verifiably implement a rich set of service features as described herein, and by enabling the base station 125 to connect directly to the Internet 120 with a local firewall for device data traffic, tunnel the voice to a voice network with VOIP and secure Internet protocols, and control the base station 125 over a secure control plane channel using base station control servers located in a central provider network, base stations 125 can be more efficiently provisioned and installed, because, for example, the base station 125 can accommodate a greater variety of local loop backhaul options. In such embodiments, it is advantageous to perform certain basic network functions in the base station 125 rather than the central provider network.

Figure 24:
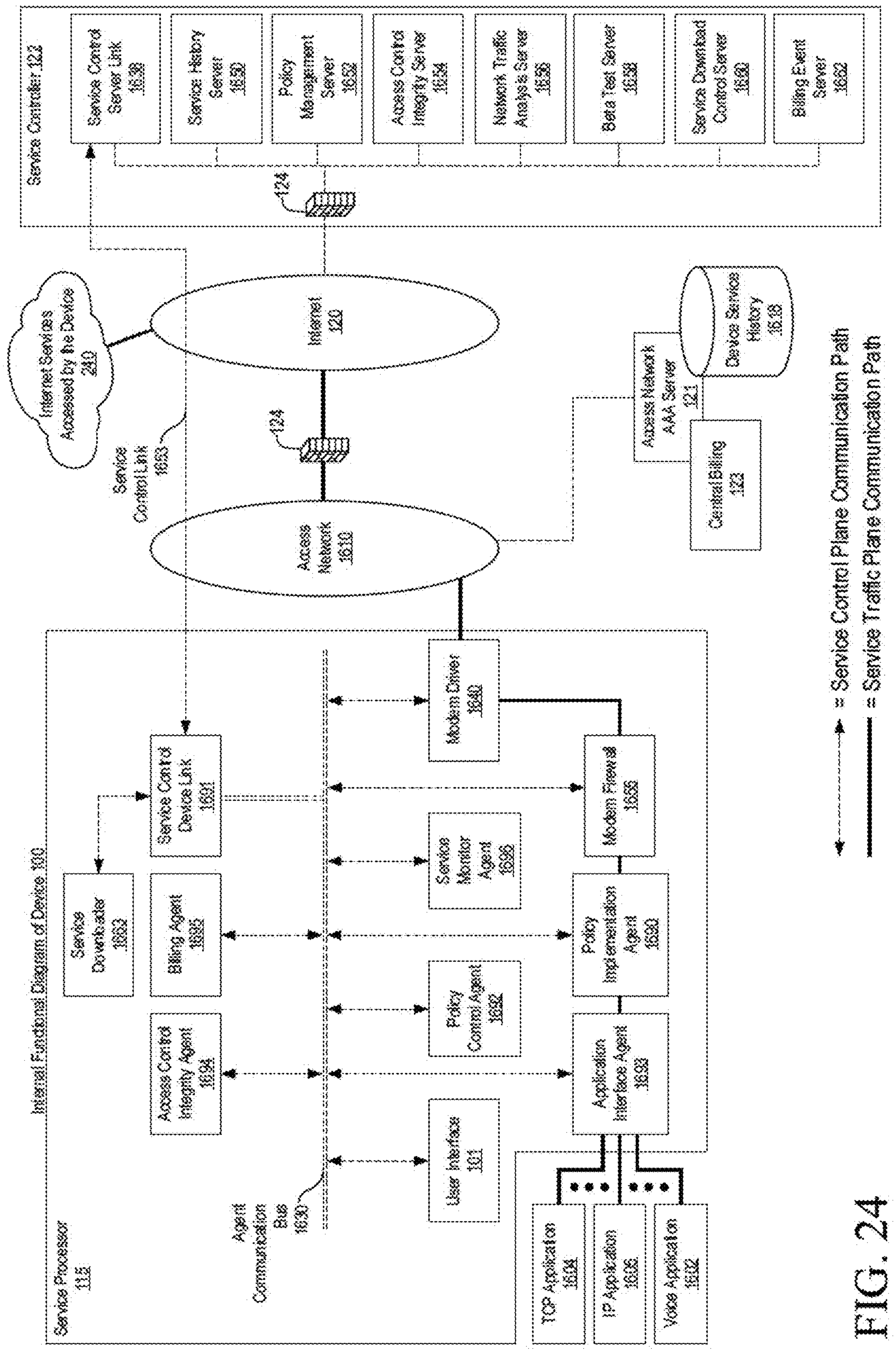
FIG. 24 is a functional diagram illustrating a device-based service processor and a service controller in accordance with some embodiments.

In some embodiments, a basic device suspend/resume function for allowing or disallowing the device Internet access is provided by the base stations 125 (or in some embodiments, for hierarchical or overlay networks in some embodiments this function is provided by one or more of the following: RAN gateways, transport gateways, AAA 121 or some other network function). This functionality, as will be discussed below, is important for certain embodiments involving taking action to resolve, for example, service policy verification errors. In some embodiments, this function is performed at the base station (e.g., base stations 125) thereby eliminating the need for a more complex networking equipment hierarchy and traffic concentration required to perform the suspend/resume function deeper in the network. Access network base stations control media access and are therefore designed with awareness of which device identification number a given traffic packet, group of packets, packet flow, voice connection or other traffic flow originates from and terminates to. In some embodiments, the suspend/resume function is implemented in the base station 125 by placing an access control function in the traffic path of each device traffic flow. The suspend resume function can be used by various network elements, and in the context of the present embodiment can be used by the service controller 122 (e.g., in some embodiments, access control integrity server 1654 (as illustrated in FIG. 24) of service controller 122 or other service controller elements) to suspend and resume device service based on the assessment of the service policy implementation verification status as described below.

In some embodiments, at least a basic traffic monitoring or service monitoring function is performed at the base station (e.g., base stations 125) similar to the service history records or IPDRs collected deeper in the network in more conventional hierarchical access network infrastructure architectures. For example, the service or traffic monitoring history records are advantageous for tracking device network service usage or service activity behavior and for certain verification methods for device-based service policy implementation or higher device-based services as discussed below. In some embodiments, a traffic monitoring function is provided in the base station 125 in which the traffic for each device is at least counted for total traffic usage and recorded. In some embodiments, traffic inspection beyond simply counting total traffic usage is provided. For example, the base station traffic monitor can record and report IP addresses or include a DNS lookup function to report IP addresses or IP addresses and associated Uniform Resource Locators (URLs). Another example allows the base station 125 to attach location data to the IPDR to provide device location data in the records. In some embodiments, traffic inspection includes recording deeper levels of traffic or service monitoring.

In some embodiments, device traffic associated with service verification conditions indicating service usage is out of policy or profile limits or allowances is routed to a quarantine network rather than or as an initial alternative to a suspending service. For example, the advantages for this approach and a more detailed description of the quarantine network are discussed below. In some embodiments, the quarantine network capability is provided for in which rather than simply suspending device traffic completely from the network as described above, the base station 125 includes a firewall function (e.g., firewall 124) that is capable of passing device access traffic with the quarantine network destinations and blocking device access to all other destinations. In some embodiments, when it is discovered that service verification conditions indicate that service usage is out of policy or profile limits or allowances, then one or more of the following actions are taken: the user is notified of the overage condition, the user is required to acknowledge the overage condition, the user account is billed for the overage condition, and the device is flagged for further analysis by a network device analysis function or a network manager.

In some embodiments, network complexity is reduced using the device without moving completely to a flat base station network as described above. Device participation in the core network services implementation provides for numerous measures for simplifying or improving network architecture, functionality or performance. For example, two approaches are discussed below ranging from a simple overlay of the service processor 115 onto devices and the service controller 122 in a conventional hierarchical access network as illustrated in FIGS. 8 through 11, to a completely flat network as illustrated in FIGS. 1, 6, 7, and 12. Those of ordinary skill in the art will appreciate that the disclosed embodiments provided herein can be combined with the above embodiments and other embodiments involving flat network base stations to provide several advantages including, for example, richer service capability, less access network complexity, lower access network expenses, more flexible base station deployments, or less complex or less expensive base station back haul provisioning and service costs.

In most of the discussion that follows, the network-based service history records and the network-based suspend-resume functionality used in certain embodiments involving service implementation verification are assumed to be derived from the device service history 1618 (as shown in FIG. 24) central provider network element and the AAA server 121 central provider network element, and in some embodiments, working in conjunction with other central provider network elements. It is understood that these functions provided by the network can be rearranged to be provided by other networking equipment, including the base station as discussed above. It is also understood that the network-based device traffic monitoring, recording and reporting to the device service history 1618 element can be accomplished at the base stations. Furthermore, it is understood that while the AAA server 121 is assumed to provide the suspend/resume functionality, quarantine network routing or limited network access called for in some embodiments, the AAA server 121 can be a management device in which the actual implementation of the traffic suspend/resume, firewall, routing, re-direction forwarding or traffic limiting mechanisms discussed in certain embodiments can be implemented in the base stations as discussed above or in another network element.

In some embodiments, an activation server 160 (or other activation sequencing apparatus) provides for provisioning, as described below, of the devices 100 and/or network elements in the central provider network so that, for example, the device credentials can be recognized for activation and/or service by the network. In some embodiments, the activation server 160 provides activation functions, as described below, so that, for example, the devices can be recognized by the network, gain access to the network, be provided with a service profile, be associated with a service account and/or be associated with a service plan. As shown in FIG. 1, the activation server 160 is connected to the central provider core network 110. In this configuration, the activation server 160 acts as an over the network or over the air activation function. In some embodiments, the activation server 160, or variations of the activation server 160 as described below, is connected to apparatus in the manufacturing or distribution channel, or over the Internet 120, or as part of the service controller 122 to service provisioning or activation functions. In some embodiments, the activation server 160 is connected to the central provider core network 110. In some embodiments, the activation server 160 is connected to other network extensions such as an MVNO network or the Internet 120 if, for example, the routers in the service gateways or base stations have the capability to direct traffic from devices that are not fully activated or provisioned to an Internet destination, or if the service processor 115 is used for such direction. In some embodiments, the activation server 160 is included in the service controller 122.

Figure 6:
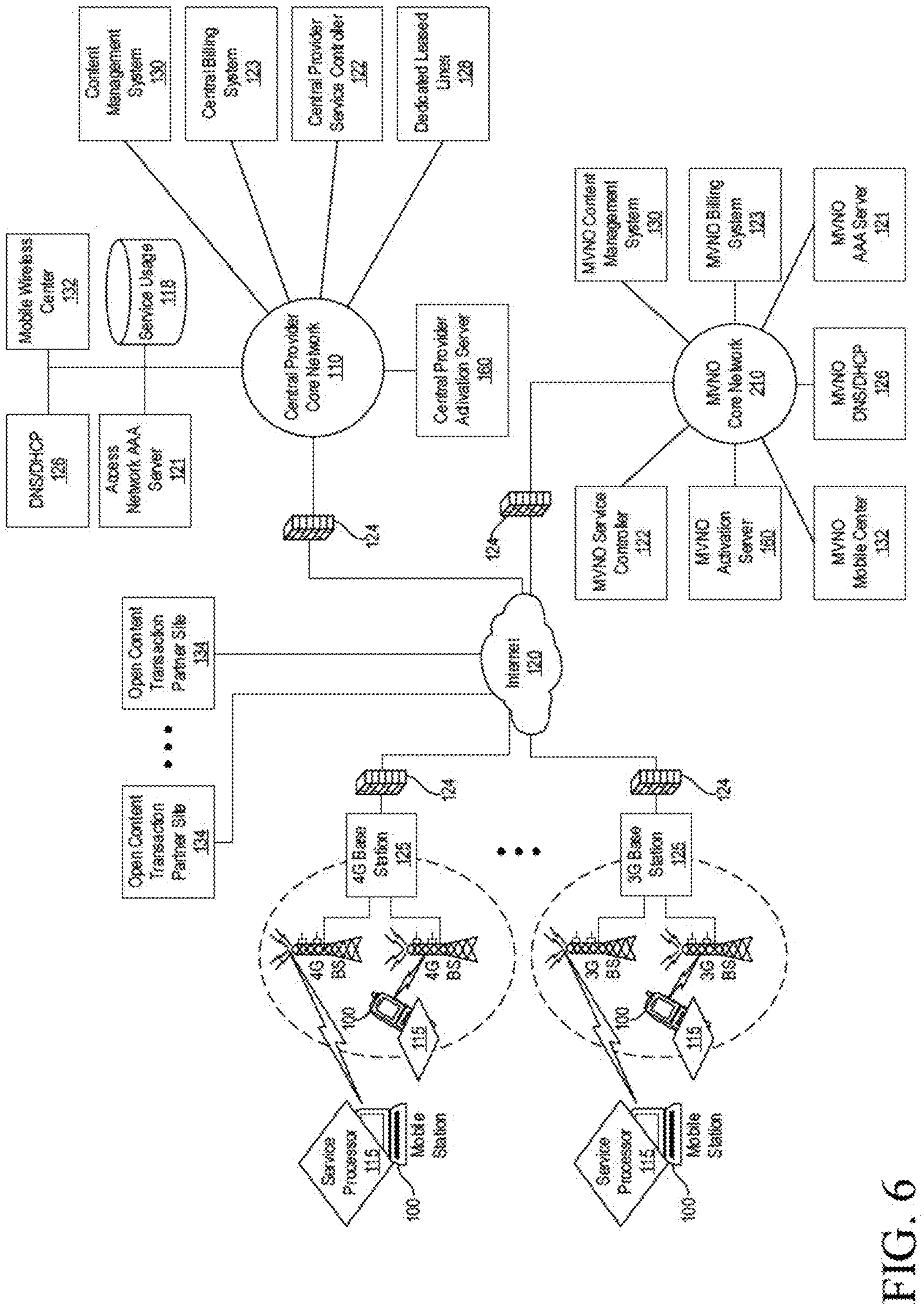
FIG. 6 illustrates another simplified (e.g., "flattened") network architecture including an MVNO (Mobile Virtual Network Operator) relationship in accordance with some embodiments.

FIG. 6 illustrates another simplified (e.g., "flattened") network architecture including an MVNO (Mobile Virtual Network Operator) relationship in accordance with some embodiments. As shown, an open MVNO configuration is provided in a simplified network as similarly described above with respect to FIG. 1. In some embodiments, the service provider (e.g., service owner) is defined by the entity that maintains and/or manages the service controller 122 associated with and controlling the service processors 115 that are inside the devices 100 using the service. In some embodiments, the service controller 122 requires only a non-real time relatively low data rate secure control plane communication link to the service processors 115. Accordingly, in some embodiments, the service controller 122 servers can reside in any network that can connect to (e.g., be in network communication with) the Internet 120. For example, this approach provides for a more efficient provisioning of the equipment used to set up an MVNO partnership between the central provider and the service provider, and as shown in FIG. 6, an MVNO network 210 is in network communication with the Internet 120 just as with the central provider network 110 is in network communication with the Internet 120. As shown, the following are connected to (e.g., in network communication with) the MVNO core network 210: MVNO billing system 123, MVNO service controller 122, MVNO content management system 130, MVNO DNS/DHCP server 126, MVNO AAA server 121, and MVNO mobile wireless center 132.

By showing two service controllers 122, one connected to (e.g., in network communication with) the MVNO network 210 and one connected to the central provider network 110, FIG. 6 also illustrates that some embodiments allow two entities on the same access network to each use the service controller 122 and service processor 115 to control different devices and offer different or similar services. As described below, the unique secure communication link pairing that exists between the two ends of the service control link, 1691 and 1638 (as shown in FIG. 24), ensure that the two service controllers 122 can only control the devices associated with the correct service provider service profiles.

Figure 7:
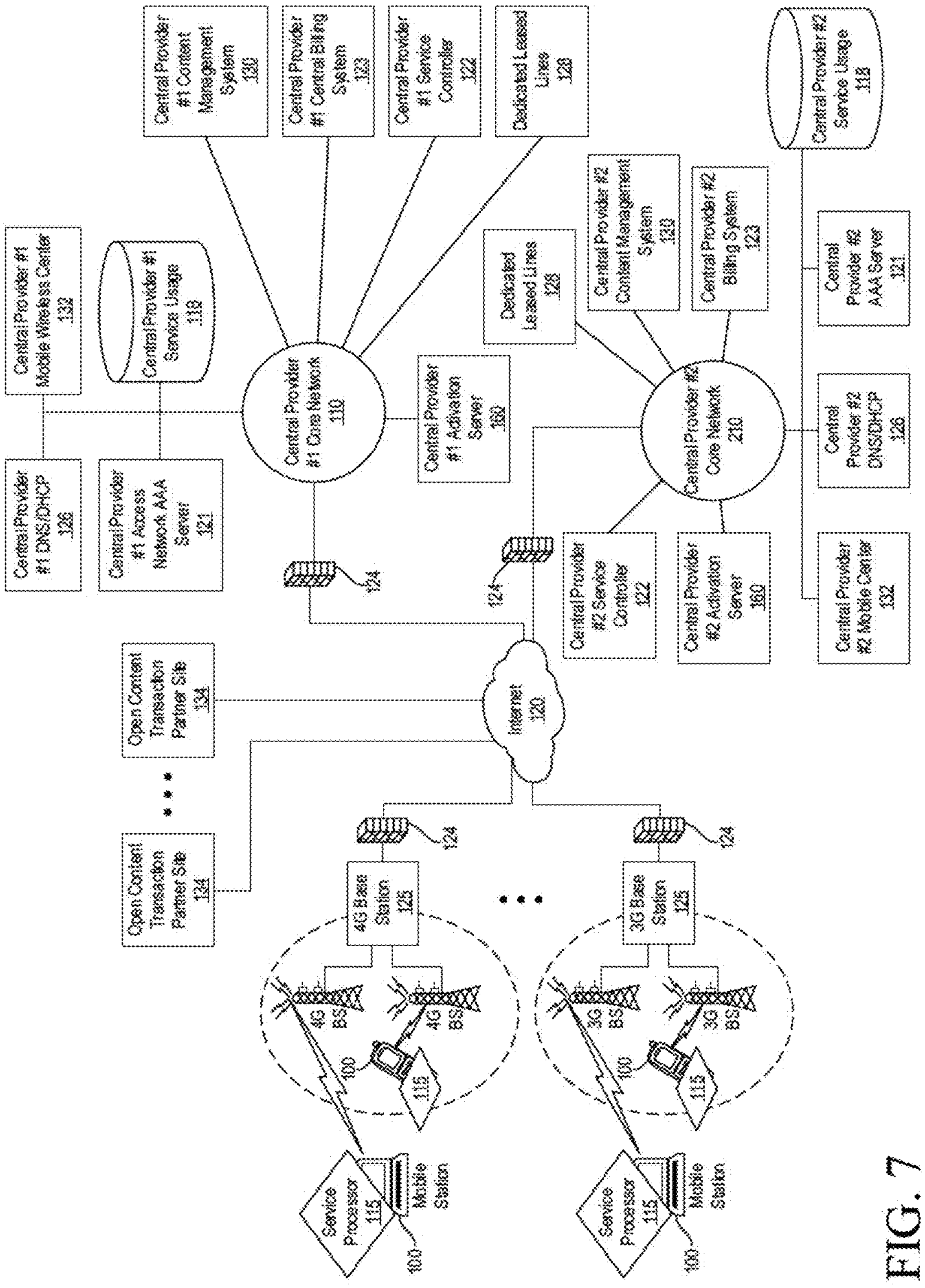
FIG. 7 illustrates another simplified (e.g., "flattened") network architecture including two central providers in accordance with some embodiments.

FIG. 7 illustrates another simplified (e.g., "flattened") network architecture including two central providers in accordance with some embodiments. For example, this provides for roaming agreements while maintaining rich services across different networks with completely different access layers. As shown, the mobile devices 100 are assumed to have a dual mode wireless modem that will operate on both a 4G network, for example, LTE or WiMAX, and a 3G network, for example, HSPA or EVDO. One example roaming condition would be both Central Provider #1 and Central Provider #2 providing 3G and 4G network resources. In this example, the mobile devices 100 can connect to both 3G and 4G base stations 125 owned and operated by the central provider with whom they have signed up for service, or when neither is available from the central provider the user signed up with the device can roam onto the other central provider access network and still potentially offer the same rich service set using the same service profiles provided, for example, the roaming service costs are reasonable. In some embodiments, if roaming service costs are significantly more expensive than home network service costs, then the service processor 115 is configured with a roaming service profile that reduces or tailors service usage or service activity through a combination of one or more of user notification, user preference feedback regarding traffic shaping or service policy management preference collected and acted on by service processor 115, adaptive policy control in service processor 115 that tracks increasing roaming service costs and scales back service, or recognition of the change in network that causes the service controller 122 to configure service processor 115 of device 100 with a roaming service profile. In some embodiments, in roaming situations, network selection can be based on an automatic network selection with network selection being determined, for example, by a combination of user service profile preferences, service provider roaming deals and/or available roaming network capabilities and cost, as discussed further below.

In some embodiments, the devices 100 are again assumed to be multimode 3G and 4G devices (e.g., the mobile devices 100 are assumed to have a dual mode wireless modem that will operate on both a 4G network, for example, LTE, and a 3G network, for example, HSPA or EVDO), with the devices 100 being billed for service by Central Provider #1 being, for example, EVDO and LTE capable, and the devices 100 being billed for service by Central Provider #2 being, for example, HSPA and LTE capable. For example, the devices 100 can roam using the 4G LTE network of the roaming central provider when neither the 3G nor 4G networks are available with the home central provider. As similarly discussed above with respect to the above-described roaming embodiments, the service processors 115 and service controllers 122 are capable of providing similar services on the 4G roaming network and the 3G home network as on the 4G home network, however, the varying costs and available network capacity and speed differences of 3G home, 4G roaming and 4G home may also encourage the use of different, such as three different, service profiles to allow for the most effective and efficient selection and control of services based on the current network.

Figure 8:
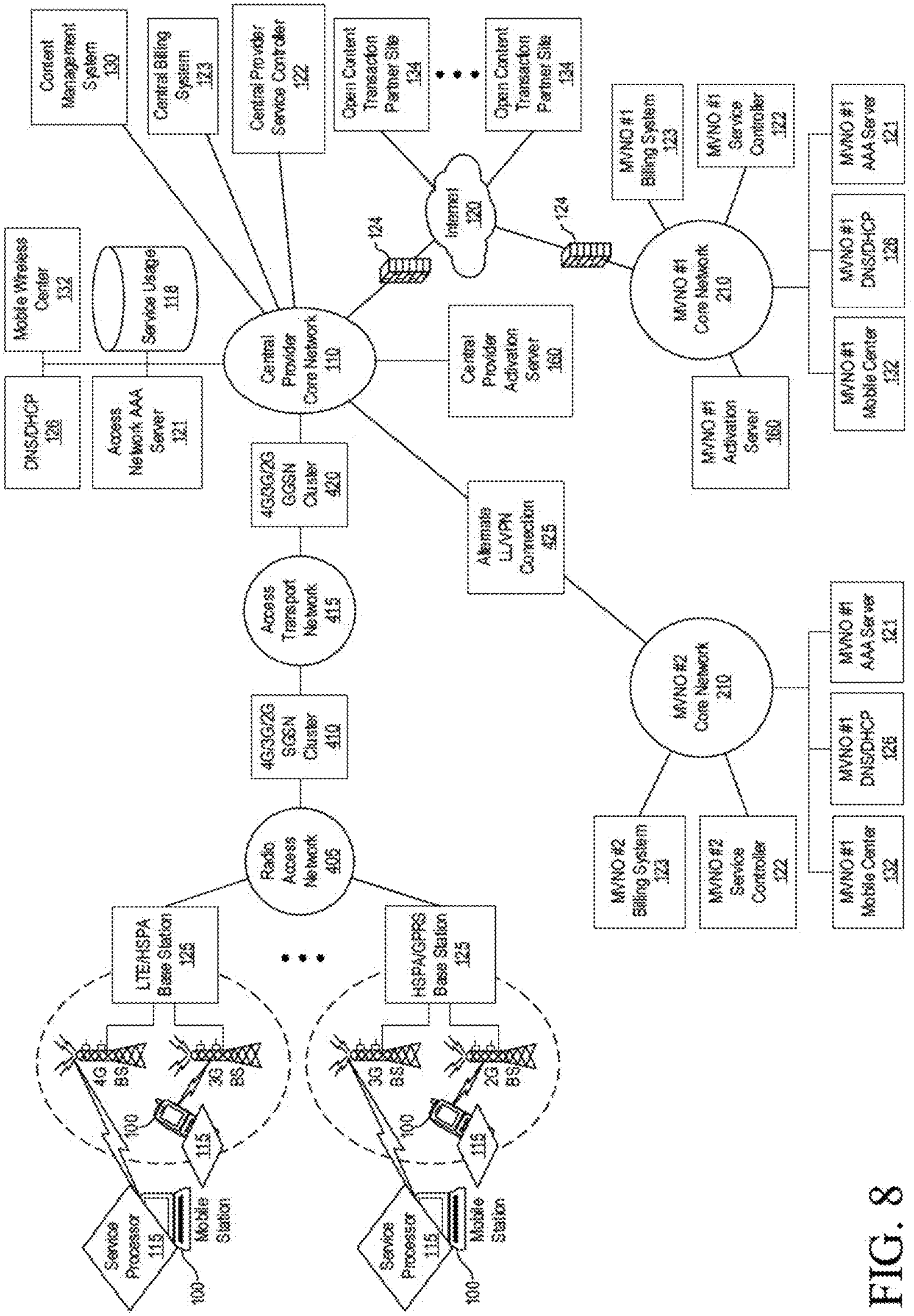
FIG. 8 illustrates a network architecture including a Universal Mobile Telecommunications System (UMTS) overlay configuration in accordance with some embodiments.

FIG. 8 illustrates a network architecture including a Universal Mobile Telecommunications System (UMTS) overlay configuration in accordance with some embodiments. As shown, FIG. 8 includes a 4G/3G/2G HSPA/Transport access network operated by a central provider and two MVNO networks 210 operated by two MVNO partners. In some embodiments, the central provider can offer improved service capabilities using a conventional UMTS network. As shown, the base stations 125 do not connect directly to the Internet 120, and instead the base stations 125 connect to the conventional UMTS network. However, as in various previous embodiments, the service processor 115 still connects through the secure control plane link to service controller 122. In some embodiments, the data plane traffic is backhauled across the various UMTS network routers and gateways as is the control plane traffic, and the IPDRs are obtained from the access network AAA server 121. Referring now to the 4G/3G/2G HSPA/Transport access network as shown in FIG. 8, the LTE/HSPA and HSPA/GPRS base stations/nodes 125 are in communication with 4G/3G/2G Service/Serving GPRS Support Nodes (SGSNs) cluster 410 via a radio access network 405, which are in communication with 4G/3G/2G Gateway GPRS Support Nodes (GGSNs) cluster 420 via an access transport network 415 (e.g., a GPRS-IP network), which are then in communication with central provider core network 110.

As shown in FIG. 8, as discussed elsewhere, service usage data store 118 is a functional descriptor for a network level service usage information collection and reporting function located in one or more of the networking equipment boxes attached to one or more of the sub-networks in the figure (e.g., RAN, transport and/or core networks). As shown in FIG. 8, service usage 118 is shown as an isolated function connected to the central provider core network 110 and the intention of this depiction is to facilitate all the possible embodiments for locating the service usage 118 function. In some UMTS network embodiments, the service usage 118 function is located or partially located in the GGSN gateway (or gateway cluster) 420. In some embodiments, service usage 118 functionality is located or partially located in the SGSN gateway (or gateway cluster) 410. In some embodiments, service usage 118 functionality is located or partially located in the equipment cluster that includes the AAA 121 and/or the mobile wireless center 132. In some embodiments, service usage 118 functionality is located or partially located in the base station, base station controller and/or base station aggregator, collectively referred to as base station 125 in FIG. 8 and many other figures described herein. In some embodiments, service usage 118 functionality is located or partially located in a networking component in the transport network 415, a networking component in the core network 110, the billing system 123 and/or in another network component or function. This discussion on the possible locations for the network-based service usage history logging and reporting function can be easily generalized to all the other figures described herein by one of ordinary skill in the art (e.g., RAN Gateway 410 and/or Transport Gateway 420), and this background will be assumed even if not directly stated in all discussion above and below.

In some embodiments, a central provider provides open development services to MVNO, Master Value Added Reseller (MVAR) and/or Original Equipment Manufacturer (OEM) partners. In some embodiments, all three service providers, central provider service provider, MVNO #1 service provider and MVNO #2 service provider have service control and billing control of their own respective devices 100 through the unique pairing of the service processors 115 and service controllers 122. For example, MVNO #1 and MVNO #2 can each have open development billing agreements with the central provider and each can own their respective billing systems 123. As shown in FIG. 8, MVNO #1 core network 210 is in communication with the central provider core network 110 via the Internet 120, and MVNO #2 core network 210 is in communication with the central provider core network 110 via an alternate landline (LL)/VPN connection 425. In some embodiments, the two MVNOs each offer completely different devices and/or services, and the devices and/or services also differ significantly from those offered by the central provider, and the service profiles are adapted as required to service the different devices and respective service offerings. In addition, the central billing system 123 allows all three service provider user populations to access ecommerce experiences from transaction provider partners operating transaction servers 134, to choose central provider billing options that combine their third-party transaction bills on their service provider bill, and each subscriber population can experience a service provider specified look and feel that is unique to the respective service provider even though the different user populations are interfacing to the same transaction servers and the transaction partners do not need to require significant custom development to provide the unique central billing and unique consistent user experience look and feel.

In some embodiments, a central provider offers open network device and service developer services using one service controller server 122 (e.g., a service controller server farm) and allows the open development partners to lease server time and server tools to build their own service profiles. The central provider also provides service billing on behalf of services to the open development partners. For example, this reduces costs associated with setting up an MVNO network for the open development partners and does not require the partners to give up significant control or flexibility in device and/or service control.

Figure 9:
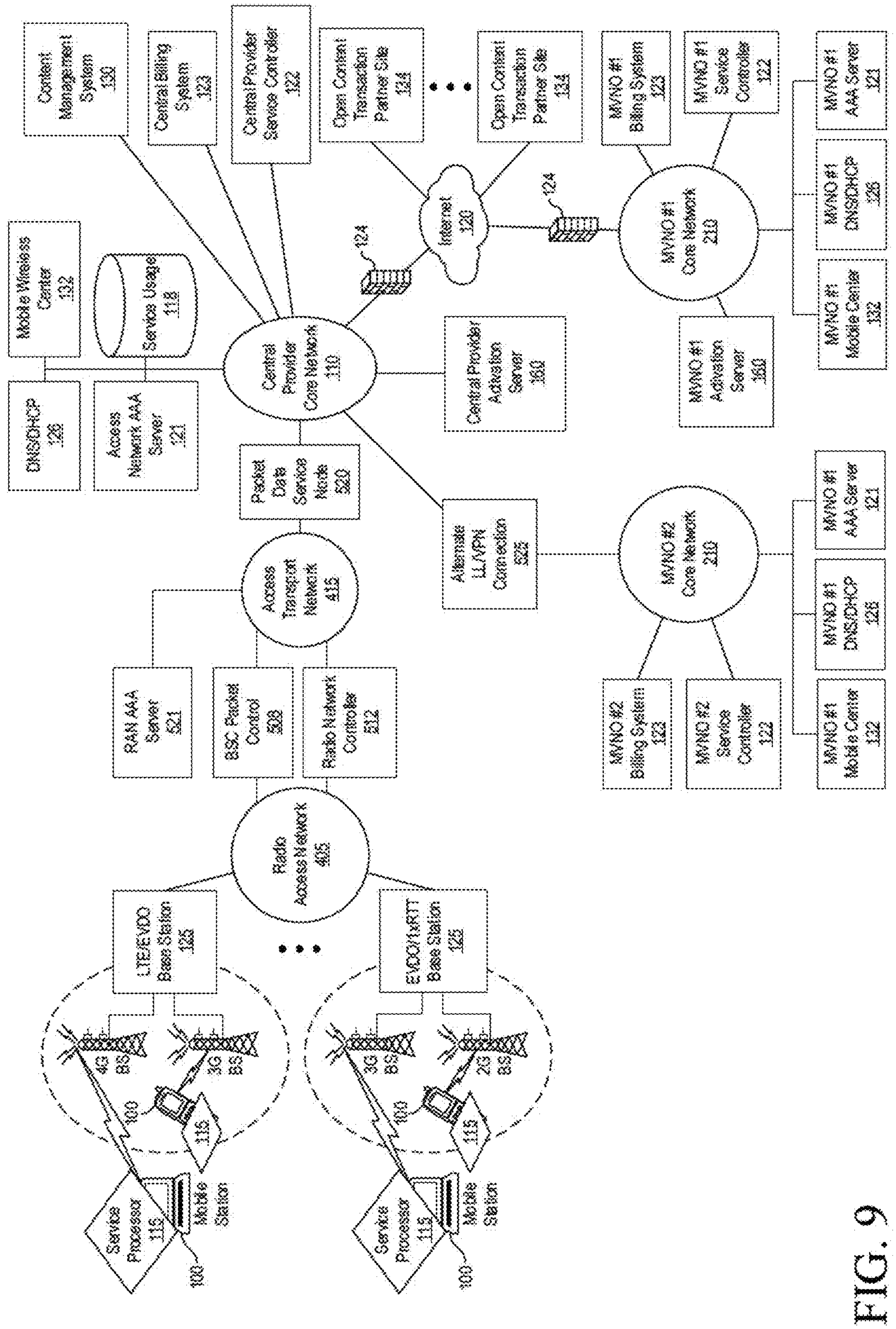
FIG. 9 illustrates a network architecture including an Evolution Data Optimized (EVDO) overlay configuration in accordance with some embodiments.

FIG. 9 illustrates a network architecture including an Evolution Data Optimized (EVDO) overlay configuration in accordance with some embodiments. This figure is similar to FIG. 8 except for the various particular variations of the EVDO network architecture as compared to the HSPA/GPRS wireless access network architecture as will be apparent to one of ordinary skill in the art. As shown, FIG. 9 includes an EVDO access network operated by a central provider and two MVNO networks 210 operated by two MVNO partners. The EVDO access network includes LTE/EVDO and EVDO/1×RTT base stations 125 in communication with Base Station Controller (BSC) packet control 508 and radio network controller 512 via a radio access network (RAN) 405, which are in communication with packet data service node 520 via an access transport network 415, which is in communication with central provider core network 110. As shown, a RAN AAA server 521 is also in communication with the access transport network 415.

In some embodiments, the central provider can offer improved service capabilities using a wireless access network. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 10:
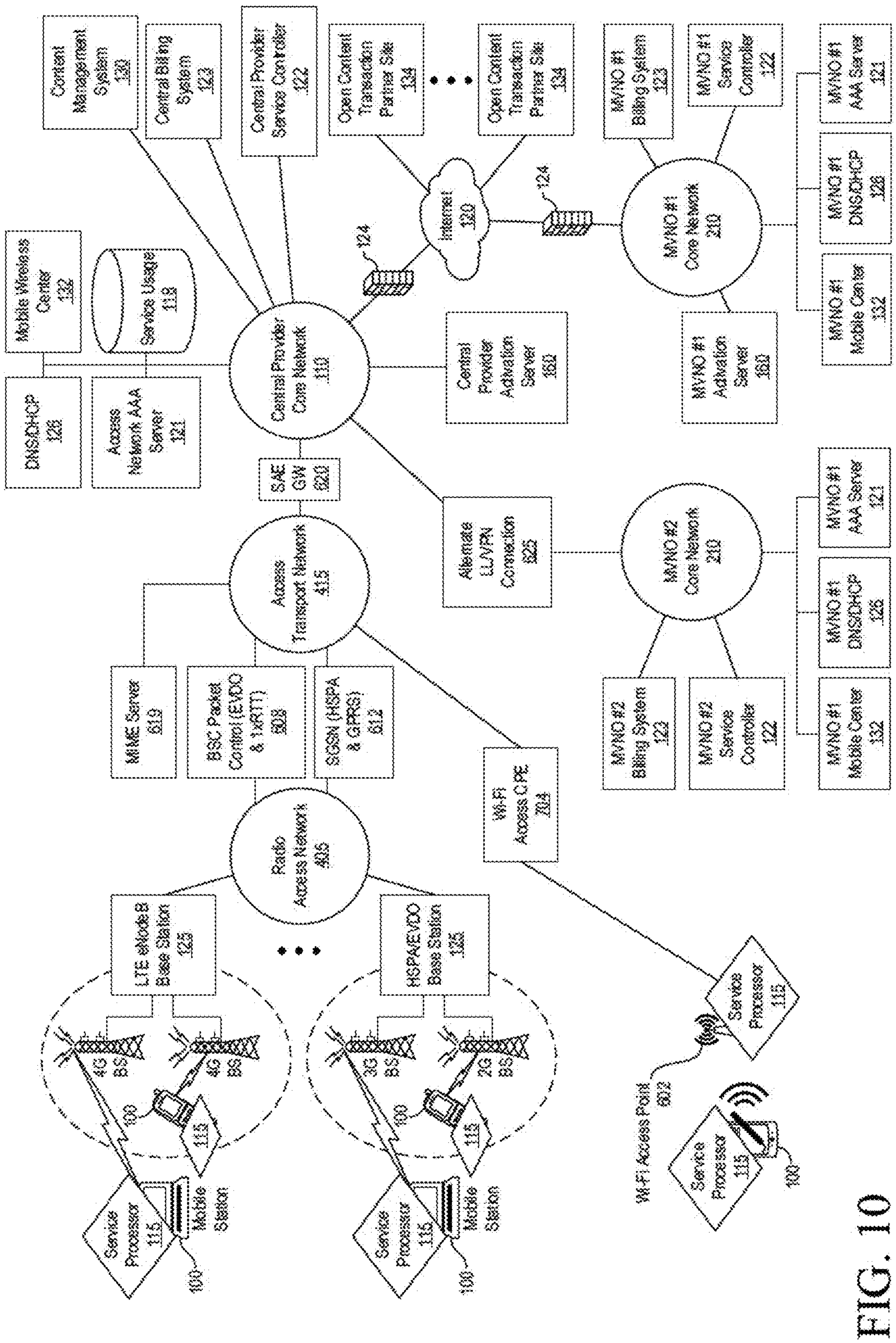
FIG. 10 illustrates a network architecture including a 4G LTE and Wi-Fi overlay configuration in accordance with some embodiments.

FIG. 10 illustrates a network architecture including a 4G LTE and Wi-Fi overlay configuration in accordance with some embodiments. This figure is also similar to FIG. 8 except for the various particular variations of the 4G LTE/Wi-Fi network architecture as compared to the HSPA/GPRS wireless access network architecture as will be apparent to one of ordinary skill. As shown, FIG. 10 includes a 4G LTE and Wi-Fi access network operated by a central provider and two MVNO networks 210 operated by two MVNO partners. The 4G LTE/Wi-Fi access network as shown includes LTE eNodeB and HSPA/EVDO base stations 125 in communication with Base Station Controller (BSC) packet control (EVDO & 1×RTT) 608 and SGSN (HSPA & GPRS) 612 via a radio access network (RAN) 405, which are in communication with System Architecture Evolution (SAE) Gateway (GW) 620 via an access transport network 415, which is then in communication with central provider (core) network 110. As shown, a Mobile Management Entity (MME) server 619 is also in communication with the access transport network 415. Also as shown, a Wi-Fi Access Point (AP) 602 is also in communication with the access transport network 415 via Wi-Fi Access Customer Premises Equipment (CPE) 704. As will be apparent to those of ordinary skill in the art, the embodiments of network architectures shown, for example, in FIGS. 1-12 are exemplary network architecture embodiments in which one or more of the shown network elements may not be required or included, alternative network elements included, and/or additional network elements included based on network design choices, network standards and/or other functional/design considerations and choices.

In some embodiments, the central provider can offer improved service capabilities using the wireless access network as depicted in FIG. 10. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121. Accordingly, as shown in FIGS. 8 through 10, various embodiments can be implemented independent of the wireless access network technology, and for example, can be implemented in 3G, 4G and any other wireless access network technology.

Figure 11:
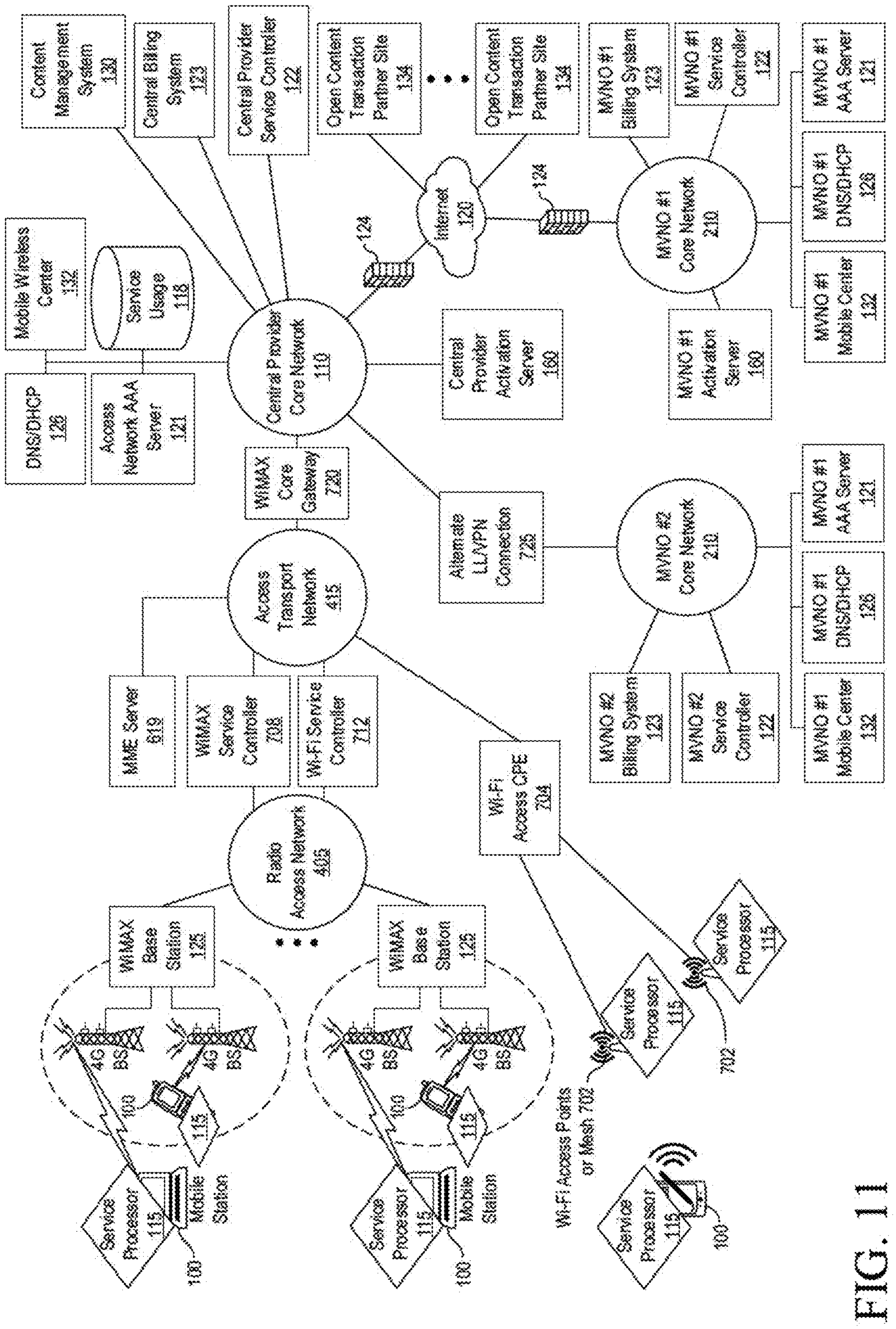
FIG. 11 illustrates a network architecture including a WiMAX and Wi-Fi overlay configuration in accordance with some embodiments.

FIG. 11 illustrates a network architecture including a WiMAX and Wi-Fi overlay configuration in accordance with some embodiments. This figure is also similar to FIG. 8 except for the various particular variations of a combined WiMAX/Wi-Fi network as compared to the HSPA/GPRS wireless access network architecture as will be apparent to one of ordinary skill in the art. As shown, FIG. 11 includes both a WiMAX and Wi-Fi network (e.g., a combined WiMAX/Wi-Fi network) operated by a central provider and two MVNO networks 210 operated by two MVNO partners. Although the Wi-Fi and WiMAX access technologies are different wireless access networking technologies, with WiMAX providing a wide area networking technology and Wi-Fi providing a local area networking technology, which efficiently operates using the two wireless access networking capabilities. As similarly discussed above with respect to the switching between 3G and 4G networks, some embodiments employ the automatic network selection capability as described above to choose the best available network service profile, and, for example, the user can force the decision or the service controller can make the decision. For example, if free Wi-Fi services have adequate coverage, in most cases, the decision criteria programmed into the automatic network selection algorithm will select Wi-Fi as long as the Wi-Fi access points are associated with a known and trusted provider. In some embodiments, transaction billing from central provider billing system 123 or MVNO #1 or MVNO #2 billing systems 123 will work with the transaction servers when connected over Wi-Fi just as when connected over any other access technology (including wire line based connections). The WiMAX/Wi-Fi access network as shown includes WiMAX base stations 125, Wi-Fi access points/hotspots 702 and/or Wi-Fi mesh access networks 702 (in some embodiments, femtocells can be used in addition to and/or as an alternative to Wi-Fi), and Wi-Fi access customer-premises equipment (CPE) 704 in communication with WiMAX service controller 708 and Wi-Fi service controller 712 via a radio access network 405, which are in communication with WiMAX core gateway 720 via an access transport network 415, which is then in communication with central provider (core) network 110.

In some embodiments, the central provider can offer improved service capabilities using the wireless access network as depicted in FIG. 11. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 19A:
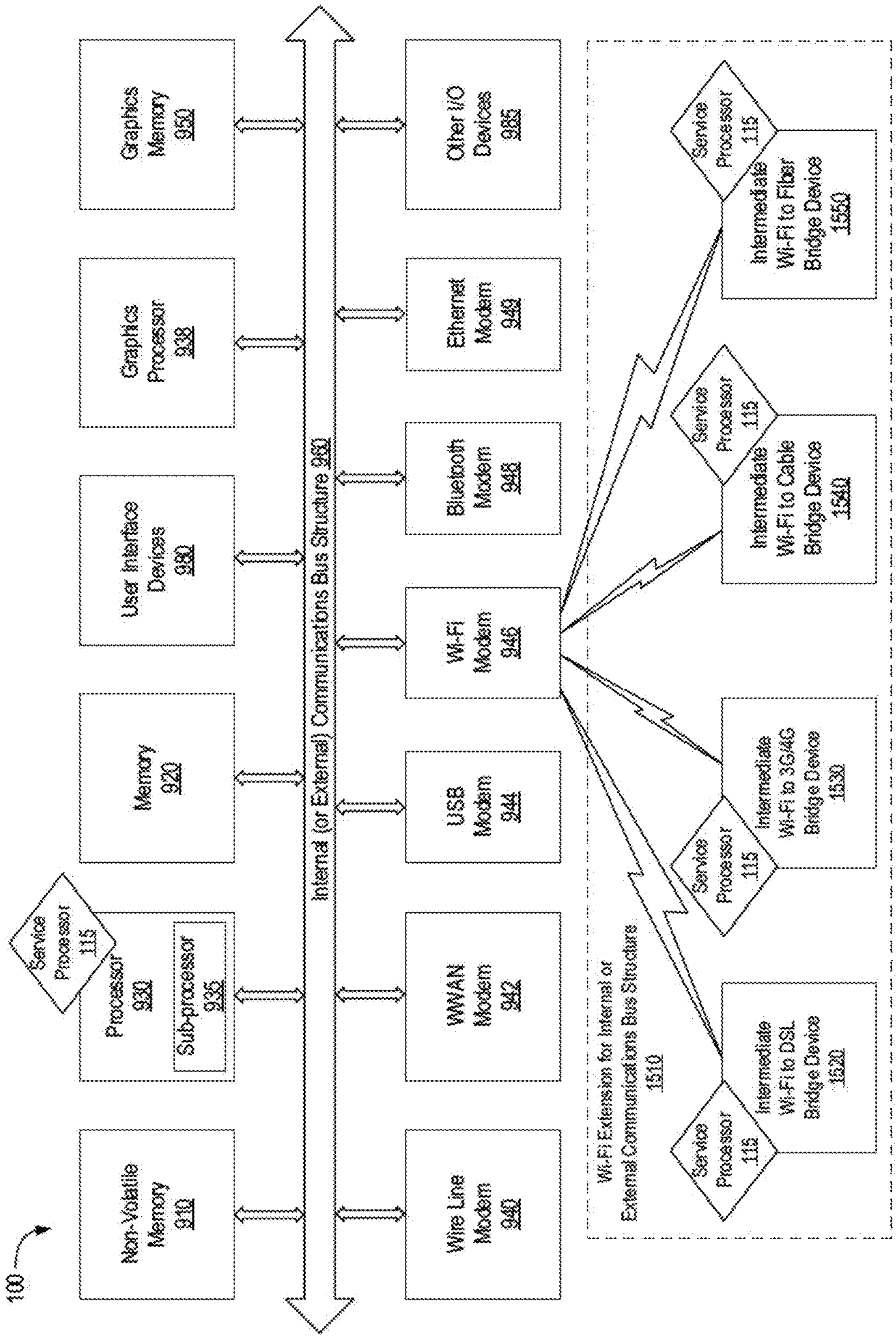
FIGS. 19A through 19F illustrate hardware diagrams of a device that include a service processor and a bus structure extension using intermediate modem or networking device combinations in accordance with various embodiments.
Figure 19B:
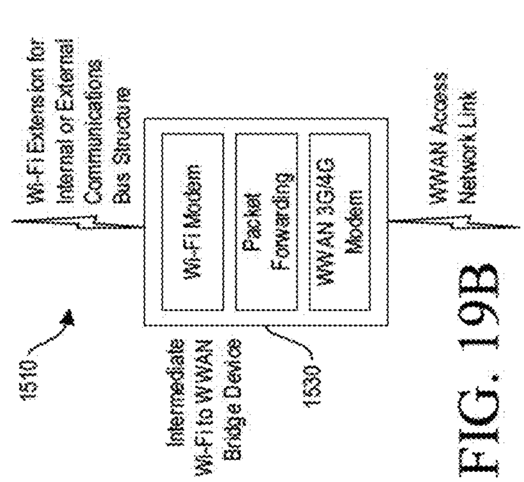
Figure 19C:
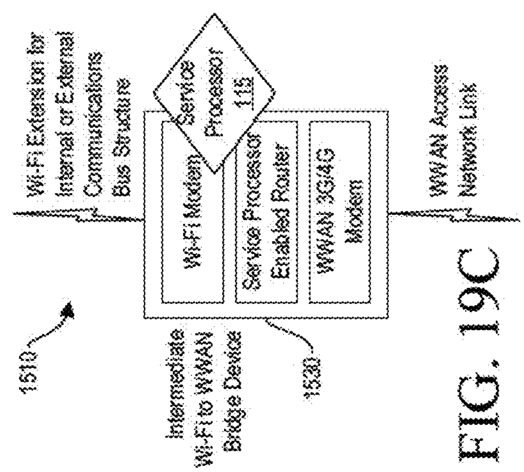
Figure 19D:
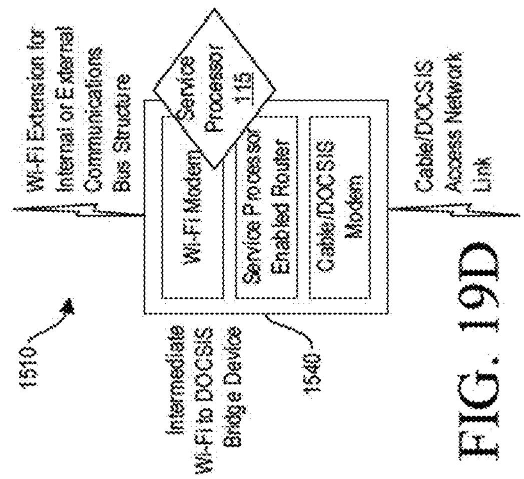
Figure 19E:
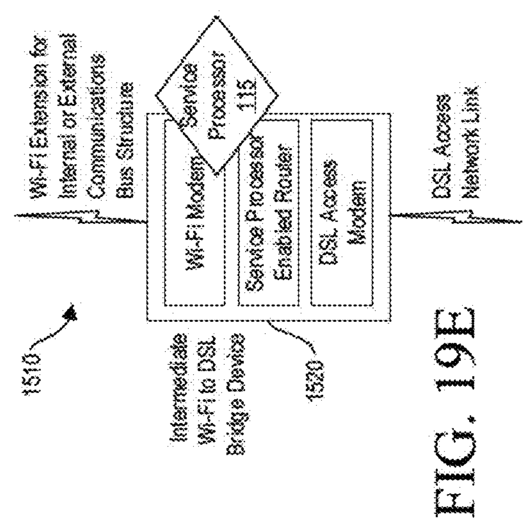

Referring to FIG. 11, the Wi-Fi connection can be replaced with a femtocell (and the Wi-Fi modem shown in FIGS. 19D and 19E can be replaced with a femtocell modem (base station side functionality)). In some embodiments, the service processor 115 is provided on the femtocell to control subscriber access in a verifiable manner as similarly described herein with respect to various embodiments (e.g., the Wi-Fi related embodiments). For example, the femtocell service provider (e.g., the entity that owns the spectrum the femtocell is using) can operate the femtocell as a local access mechanism for the home subscriber (or other who purchased or installed the femtocell), and then also use it to provide pay-for-service or additional free services, with controlled access and/or traffic control and/or service control and/or billing control performed locally or in combination with network equipment as described herein. In some embodiments, the WWAN devices being used at home or work with the femtocell include a portion of the service processor functionality. For example, this allows the service provider for femtocells to provide service and monetize service in a controlled way even though the femtocell is not connected to the service provider network the way conventional base stations are connected to the service provider network, but is connected through the Internet 120. For example, the secure heartbeat function can be extended to include data traffic so that it is encrypted and secured along with the control plane traffic. The decision of whether or not to admit a device onto the femtocell can be made through the service processor 115 connection to the service controller 122 and subsequent look up of the credentials for the device and the associated service plan and service profile that is then programmed into the service processor on the femtocell and/or the device itself. The femtocell can also offer a landing page to devices through the service processor so that devices that do not belong to the network can gain access to the network by signing up over the femtocell. For example, the intermediate device embodiments for Wi-Fi on one end and WWAN on the other can be accomplished by using the Wi-Fi connection in the cell phone in AP mode so that it becomes the intermediate device. The service processor 115 on the cell phone can then act in the same manner as described for the intermediate device as described herein.

Figure 12:
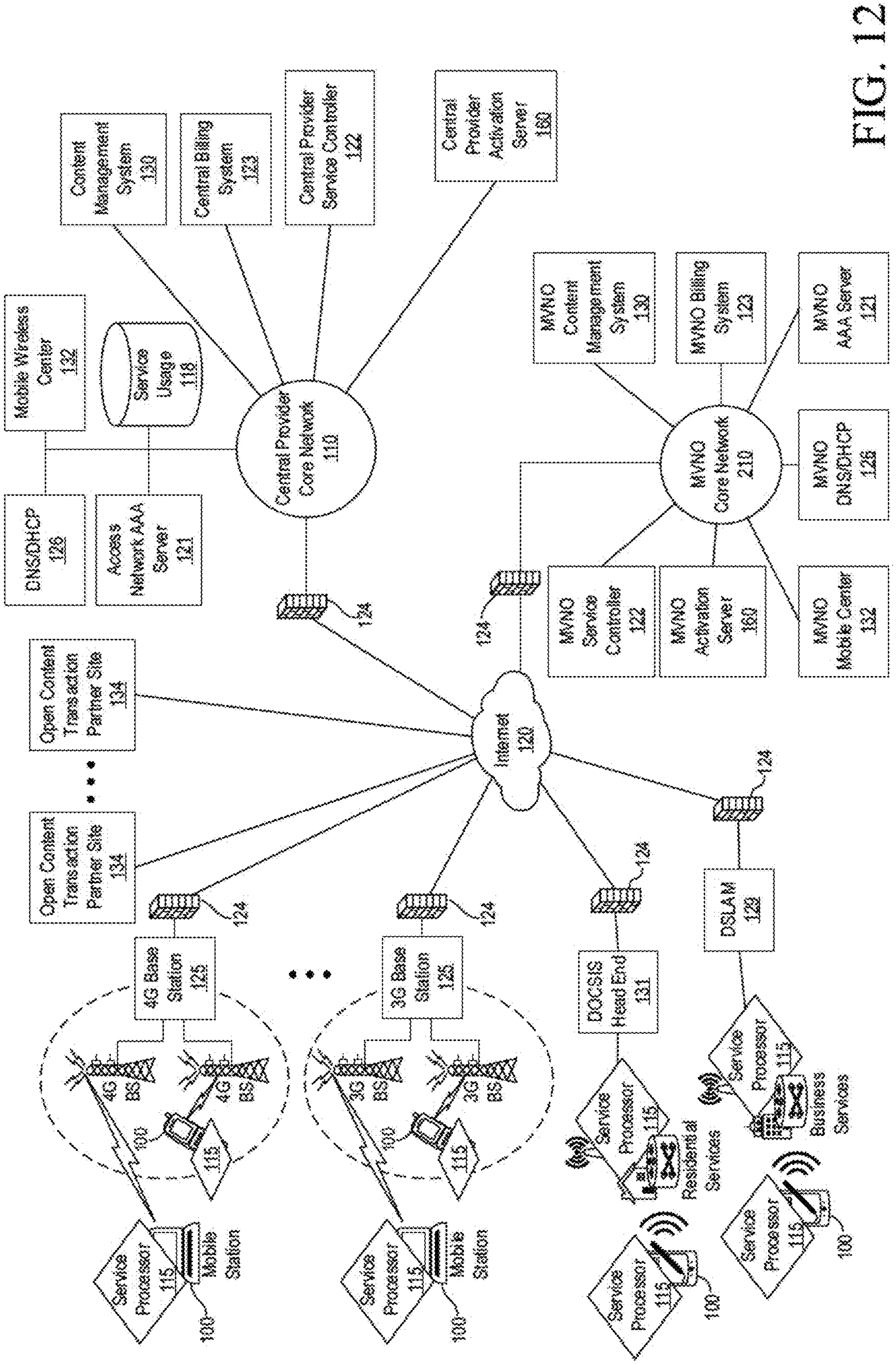
FIG. 12 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments.

FIG. 12 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments. It is a common network architecture for multi-access central providers to have one or more wired access networks and one or more wireless access networks. As shown, FIG. 12 includes both 3G and 4G wireless access networks, including a 4G base station 125 and a 3G base station 125, and both DOCSIS and DSLAM wire line networks (e.g., a combined WWAN/wire line network), including DOCSIS Head End 131 and DSLAM 129, operated by a central provider via central provider (core) network 110 and an MVNO partner via MVNO network 210 via the Internet 120.

As shown, the service processor 115 can reside on a number of different types of devices 100 that work on 3G or 4G wireless, DSL or DOCSIS, and the service controller 122 is capable of controlling each of these types of devices with a consistent service experience, for example, using different service profiles, service capabilities and service profile cost options depending on which network the device is connected to and/or other criteria. For example, a download of a High Definition (HD) movie can be allowed when the service controller 122 is managing service profile policies for a service processor 115 residing on a DOCSIS device 100 (e.g., a computer or laptop connected to a cable modem), but not when the same service controller 122 is managing service profile policies for a service processor 115 residing on a 3G device 100 (e.g., a smart phone connected to a mobile 3G network).

As will now be apparent to one of ordinary skill in the art in view of the above description of FIGS. 1 through 12, the present invention can be provided across any access network and a set of service profiles can be defined in a variety of ways including, for example, to user preference feedback, access network performance, access network cost, access network central provider partnership status with the service provider central provider and roaming deals and costs. For example, as discussed below, various embodiments allow for users to have superior service experiences based on the ability to control certain of their service settings, and service providers can also more efficiently deploy a greater variety of services/service plans to users.

Figure 63:
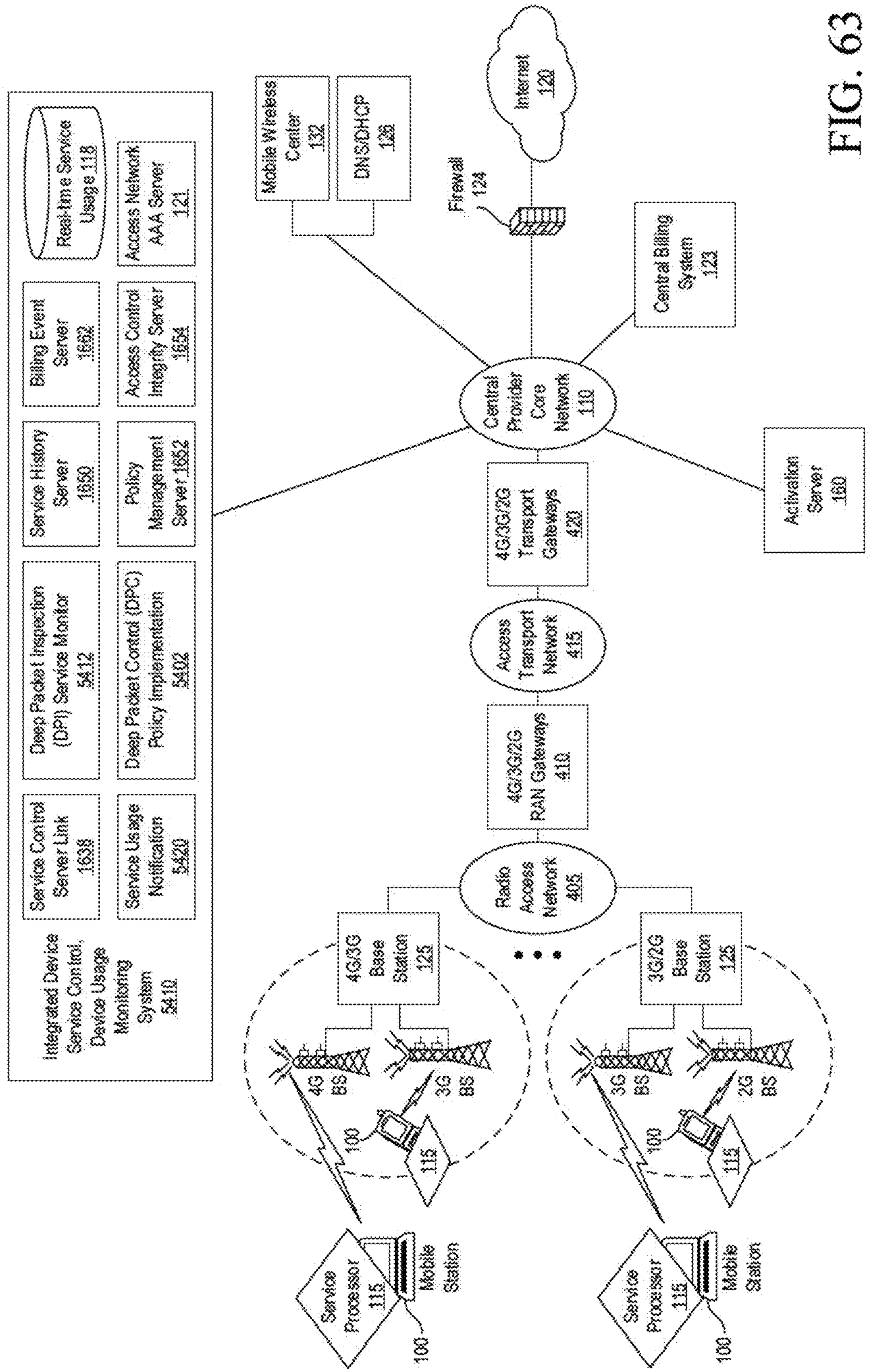
FIG. 63 illustrates a network architecture for locating service controller device control functions with AAA and network service usage including deep packet inspection functions in accordance with some embodiments.

In some embodiments, the service processor 115 and the service controller 122 provide an overlay for existing networks without significantly changing the billing system 123, gateways/routers or other network components/elements, and also provide verifiable service monitoring to control services and/or service usage/costs without involving, for example, a service provider or MVNO (e.g., for smart phone devices and/or laptops or netbooks (or any other network accessible device) with an unlimited data plan or any other service plan). For example, applications that are deployed by device owners or service subscribers (e.g., an IT manager) and do not involve a service provider include roaming services provided as an after-market product without carrier/service provider involvement. In this example, device activity is recorded by the service processor 115 and transmitted to the service controller 122 (e.g., the IT manager controls the service controller 122). In another example, a third-party after-market product is provided in which the service controller 122 is hosted by the third-party and the device management entity (e.g., the IT manager or parents of the device user for parental controls) uses a secure Virtual Service Provider (VSP) website to control the devices that belong to that management entity's device partition (e.g., VSP partitions and techniques are described below with respect to FIG. 57). The VSP secure website techniques described herein can also be applied to service provider owned servers with device partitions for the purpose of controlling, for example, Deep Packet Inspection (DPI) controllers (e.g., DPC policy implementation 5402 as shown in FIG. 63) to provide similar or substantially equivalent service usage/control capabilities using network-based service control techniques, as similarly described in detail below with respect to FIGS. 57 and 63 (e.g., IT manager VSP control of a group partition and/or MVNO VSP control of a group partition).

Service Processor Configurations for Devices

Figure 13:
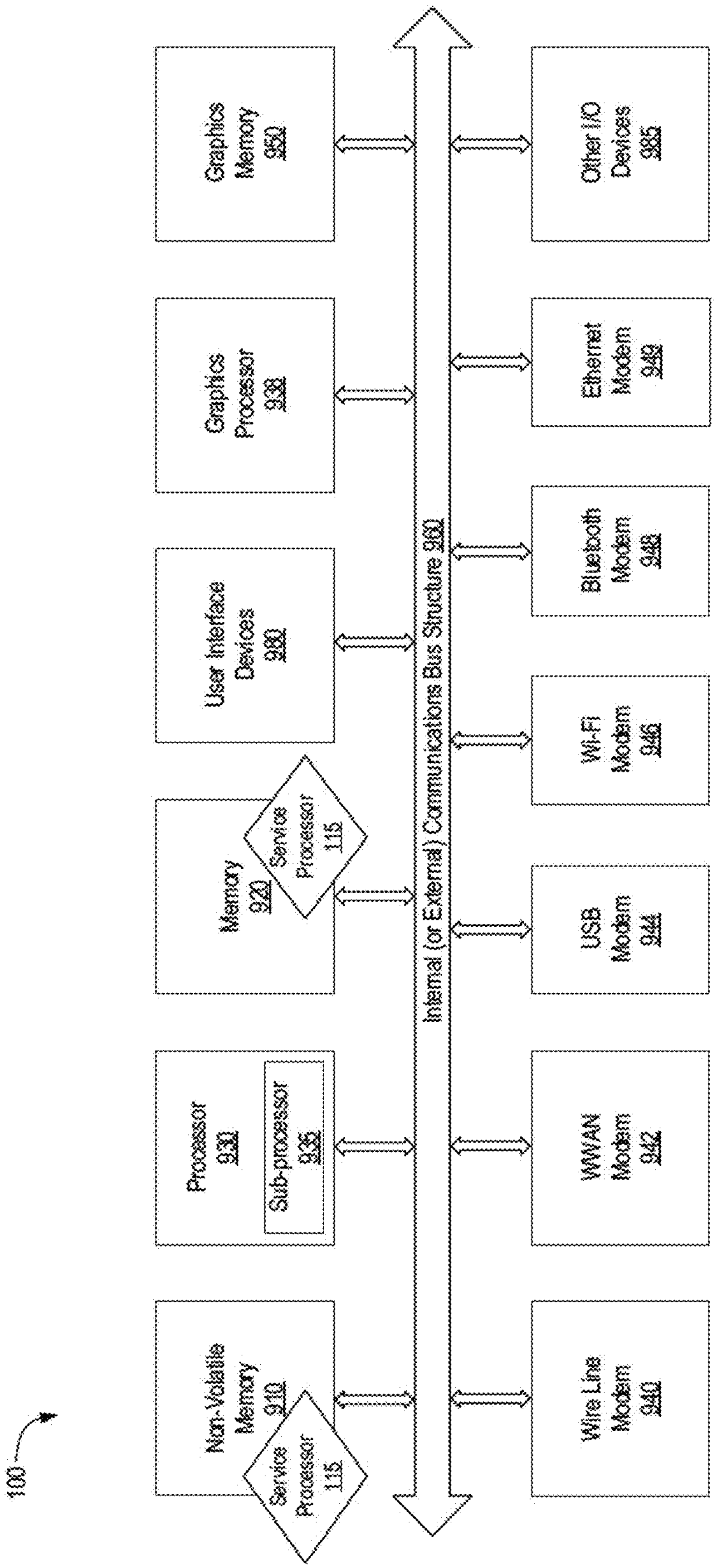
FIG. 13 illustrates a hardware diagram of a device that includes a service processor in accordance with some embodiments.

FIG. 13 illustrates a hardware diagram of a device 100 that includes a service processor 115 in accordance with some embodiments. As shown in FIG. 13, the service processor 115 is stored in a non-volatile memory 910 and a memory 920 of the device 100. As will be appreciated by those of ordinary skill in the art, the present invention can operate with virtually any device architecture, and the device architectures discussed herein (e.g., with respect to FIGS. 13-18 and 19A-19F) are examples of various implementations on certain devices (e.g., of different representations of device 100).

As shown in FIG. 13, device 100 also includes a processor 930, sometimes referred to as a CPU or central processor unit, an APU or application processor unit, a core processor, a computing device, or many other well known terms. In some embodiments, device 100 includes one or more processors and/or a multicore processor. As shown, processor 930 includes a sub-processor 935. In some embodiments, processor 930 and/or sub-processor 935 are based on an architecture sometimes referred to as a complex instruction set computer or CISC, a reduced instruction set computer or RISC, a parallel processor, a combination of two or more architectures or any other processor architecture. In some embodiments, processor 930 has a design that is based on logic and circuitry from one or more standard design library or published architecture, or includes specialized logic and circuitry designed for a given device 100 or collection of such devices. In some embodiments, a device includes more than one processor and/or sub-processor, and in such a device, one processor and/or sub-processor can have one architecture while another may have a somewhat different or completely different architecture. In some embodiments, one or more of the processors and/or sub-processors can have a general purpose architecture or instruction set, can have an architecture or instruction set that is partially general or partially specialized, or can have an instruction set or architecture that is entirely specialized. In some embodiments, a device includes more than one processor and/or sub-processor, and in such a device, there can be a division of the functionality for one or more processors and/or sub-processors. For example, one or more processors and/or sub-processors can perform general operating system or application program execution functions, while one or more others can perform communication modem functions, input/output functions, user interface functions, graphics or multimedia functions, communication stack functions, security functions, memory management or direct memory access functions, computing functions, and/or can share in these or other specialized or partially specialized functions. In some embodiments, any processor 930 and/or any sub-processor 935 can run a low level operating system, a high level operating system, a combination of low level and high level operating systems, or can include logic implemented in hardware and/or software that does not depend on the divisions of functionality or hierarchy of processing functionality common to operating systems.

As shown in FIG. 13, device 100 also includes non-volatile memory 910, memory 920, graphics memory 950 and/or other memory used for general and/or specialized purposes. As shown, device 100 also includes a graphics processor 938 (e.g., for graphics processing functions). In some embodiments, graphics processing functions are performed by processor 930 and/or sub-processor 935, and a separate graphics processor 938 is not included in device 100. As shown in FIG. 13, device 100 includes the following modems: wire line modem 940, WWAN modem 942, USB modem 944, Wi-Fi modem 946, Bluetooth modem 948, and Ethernet modem 949. In some embodiments, device 100 includes one or more of these modems and/or other modems (e.g., for other networking/access technologies). In some embodiments, some or all of the functions performed by one or more of these modems are performed by the processor 930 and/or sub processor 935. For example, processor 930 can implement some or all of certain WWAN functional aspects, such as the modem management, modem physical layer and/or MAC layer DSP, modem I/O, modem radio circuit interface, or other aspects of modem operation. In some embodiments, processor 930 as functionality discussed above is provided in a separate specialized processor as similarly shown with respect to the graphics and/or multimedia processor 938.

As also shown in FIG. 13, device 100 includes an internal (or external) communication bus structure 960. The internal communication bus structure 960 generally connects the components in the device 100 to one another (e.g., allows for intercommunication). In some embodiments, the internal communication bus structure 960 is based on one or more general purpose buses, such as AMBA, AHP, USB, PCIe, GPIO, UART, SPI, I2C, Fire wire, DisplayPort, Ethernet, Wi-Fi, Bluetooth, ZigBee, IRDA, and/or any other bus and/or I/O standards (open or proprietary). In some embodiments, the bus structure is constructed with one or more custom serial or parallel interconnect logic or protocol schemes. As will be apparent to one of ordinary skill in the art, any of these or other bus schemes can be used in isolation and/or in combination for various interconnections between device 100 components.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (as discussed herein) is implemented and stored in software that can be performed on (e.g., executed by) various components in device 100. FIG. 13 illustrates an embodiment in which service processor 115 is stored in device memory, as shown, in memory 920 and/or non-volatile memory 910, or a combination of both. In some embodiments, it is advantageous to store or implement certain portions or all of service processor 115 in protected or secure memory so that other undesired programs (and/or unauthorized users) have difficulty accessing the functions or software in service processor 115. In some embodiments, service processor 115, at least in part, is implemented in and/or stored on secure non-volatile memory (e.g., non-volatile memory 930 can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as discussed below (and as shown in FIG. 24). In some embodiments, a secure software download embodiment also uses a secure non-volatile memory. Those of ordinary skill in the art will also appreciate that all memory can be on-chip, off-chip, on-board and/or off-board. In some embodiments, the service processor 115 which as shown in FIG. 13 is stored or implemented in non-volatile memory 910 and memory 920, can be implemented in part on other components in device 100.

As shown, device 100 also includes a user interfaces device component 980 for communicating with user interface devices (e.g., keyboards, displays and/or other interface devices) and other I/O devices component 985 for communicating with other I/O devices. User interface devices, such as keyboards, display screens, touch screens, specialized buttons or switches, speakers, and/or other user interface devices provide various interfaces for allowing one or more users to use the device 100.

Figure 14:
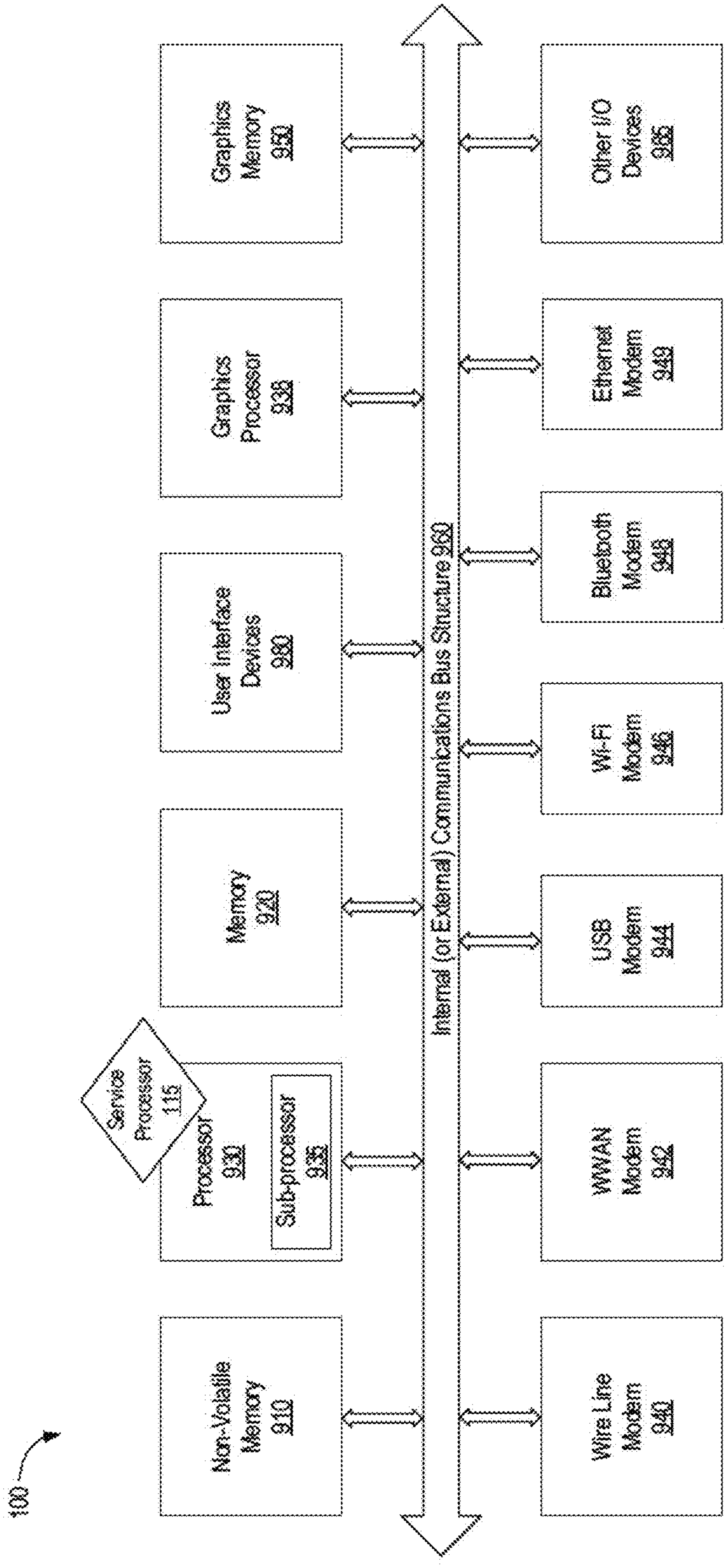
FIG. 14 illustrates another hardware diagram of a device that includes a service processor in accordance with some embodiments.

FIG. 14 illustrates another hardware diagram of a device 100 that includes a service processor 115 in accordance with some embodiments. As shown in FIG. 14, the service processor 115 is implemented on the processor 930 of the device 100. In some embodiments, this implementation can be in part or whole accomplished in software stored, implemented and/or executed on the processor 930. In some embodiments, the implementation and/or execution can be in part or whole accomplished in hardware that is on the processor 930. While the service processor 115 is shown in FIG. 14 as stored, implemented and/or executed on the processor 930, in other embodiments, the service processor 115 is implemented in part on other components in device 100, for example, as discussed below.

Service Processor Implemented on a Communications Modem

Figure 15:
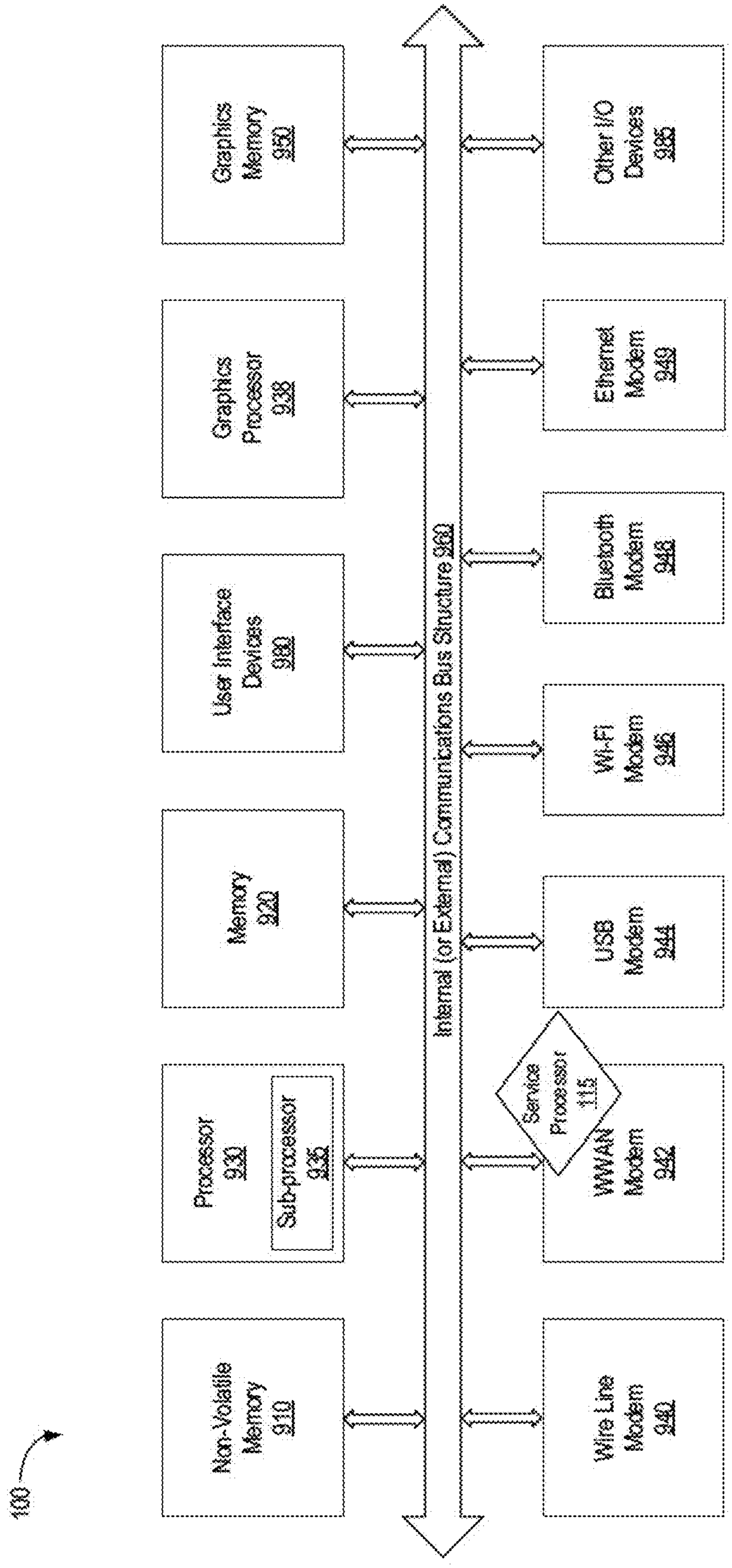
FIG. 15 illustrates another hardware diagram of a device that includes a service processor in accordance with some embodiments.

FIG. 15 illustrates another hardware diagram of a device 100 that includes a service processor 115 in accordance with some embodiments. As shown in FIG. 15, the service processor 115 is implemented on the WWAN modem 942 of the device 100. In some embodiments, this implementation can be in part or whole accomplished in software stored, implemented and/or executed on the WWAN modem 942. In some embodiments, the implementation and/or execution can be in part or whole accomplished in hardware that is on the WWAN modem 942. In some embodiments, service processor 115 is implemented on another modem component of device 100 and/or one or more of the modem components of device 100.

In some embodiments, the service processor 115 is implemented on a modem processor (e.g., WWAN modem 942 or WWAN/Wi-Fi modem), and the service processor 115 can be installed and/or executed in protected and/or secure memory or processor hardware on the modem. The modem memory can be made robust to hacking or tampering and, in some embodiments, is only accessible from a secure network management channel or secure device management port and not by most end users. In some embodiments, a portion of the service processor 115 is implemented on a modem processor (e.g., WWAN modem 942 hardware or software), and a portion of the service processor 115 is implemented on another device 100 processor 930. For example, the device service monitor agent 1696 and one or more service usage measurement points (see discussion associated with FIG. 29) can be implemented on a modem processor, and other service processor 115 elements can be implemented in the main device operating system processor 930. As another example, a second (or first) service monitor agent 1696 and one or more service usage measurement points can be implemented on a modem processor, and a first (or second) service monitor 1696 with one or more service measurement points can be implemented on the main operating system processor 930 for device 100. For example, such embodiments can be configured to provide a service usage measurement and reporting system that offers a diversified countermeasure to protect against hacking, tampering or other errors for device-based service usage measurements that can be made harder to hack or tamper with than certain software embodiments on the processor 930. For example, such embodiments can be employed when one or more of the following capabilities are not available: network-based service usage measures, network-based service profile or policy implementation verification measures, and network-based service usage verification error response action capabilities.

In some embodiments, certain portions of the service processor 115 that deal with application layer service monitoring or traffic flow identification (e.g., tagging or traffic flow shaping as disclosed elsewhere) are implemented on a main processor 930, and other portions of the service processor 115 are implemented on a modem processor (e.g., WWAN modem 942).

In some embodiments, the WWAN modem is a wide area access technology modem such as 2G, 2.5G, 3G or 4G. As discussed above and below, the connection to the WWAN modem 942 can be a connection internal to device 100, for example, a USB, GPIO, AMBA or other bus, or can be a connection that extends external to the device such as for example, a USB, Ethernet, Wi-Fi, Bluetooth or other LAN or PAN connection. Three example embodiments in which the bus is internal to the device are as follows: a PCIe modem card running over USB or PCIe, a GPIO connection running from a processor 930 chipset to a modem chipset inside a mobile device, or a Wi-Fi connection running from a Wi-Fi modem inside of device 100 to an intermediate modem or networking device combination that forwards the access network traffic between the access network connection and the device via the Wi-Fi connection. In some embodiments, in addition to the service processor 115 being implemented on the WWAN modem 942 either internal or external to the device 100, similarly service processor 115 can be implemented on a wire line modem 940, such as DSL, Cable or fiber, another wireless LAN or PAN modem, such as Wi-Fi, ZigBee, Bluetooth modem 948, White Space, or some other modem, connected internal to device 100 or external to device 100 via a LAN or PAN extension of internal or external communications bus structure 960.

In some embodiments, a complete turn-key reference design product for the device modem (one or more of 942, 946, 948, 949, 944, 940) combined with a built-in service processor 115, possibly with a well defined and documented application interface and a well defined and documented service processor developers kit (SPDK) provides for a powerful product embodiment for the purpose of achieving mass market distribution and usage for the modem with service processor 115 and associated service controller 122 features. For example, embodiments that include the WWAN modem 942, possibly in combination with one or more additional modems including Wi-Fi modem 946, Bluetooth modem 948, USB modem 944 and Ethernet modem 949, can be combined with a pre-tested or pre-certified integrated embodiment of the service processor 115, possibly in combination with a well defined API for writing software applications that interface to, reside on or communicate with this turn-key modem embodiment. As disclosed herein, the advantageous capabilities of the service processor 115, possibly in conjunction with the service controller 122, to assist in monitoring, control, billing and verification for services is made more available for device 100 manufacturers in such a form, because the manufacturers do not need to spend as much time and resources to develop a custom modem only for a subset of devices that the turn-key modem can be used to support. In some embodiments, the service processor 115, as discussed herein, can be configured to provide device-assisted service monitoring, control, billing and/or verification across not just when connected to the WWAN network via the WWAN modem, but also when connected to the other networks corresponding to the other access modems included in the turn-key combined module plus service processor 115 (or SPDK or chipset plus service processor 115) design. The pre-integrated service processor 115 and API possibly in combination with testing and certification can be packaged in a small form factor that may have standardized interfaces such as USB, PCIe, FireWire, DisplayPort, GPIO, or other interface. The form factor may be miniaturized into standard configurations such as Mini Card, Half Mini Card, or even smaller form factors, or it can be designed into a non-standard or proprietary form factor. The module form factor can be well documented to simplify integration into various device 100 designs. The SPDK embodiments can be designed to contain one or more of the following: hardware integration and use documentation, software integration documentation, software programming documentation, application interface documentation, service controller documentation, overall testing guidelines and overall use guidelines. In some embodiments, the modem module can be integrated with the service processor 115 functionality as a combined chipset, firmware and/or software product, with other SPDK features very similar to those listed above. The service controller programming guide for these turn-key embodiments can also be documented for the SPDK service processor 115 software, turn-key module with service processor 115 or integrated chipset with service processor 115. Accordingly, these embodiments provide various solutions to simplify the OEM task of integrating, developing, testing and shipping device 100 products (or integrated networking device products) with any of the device-assisted service monitoring, control, billing or verification capabilities disclosed herein.

Figure 16:
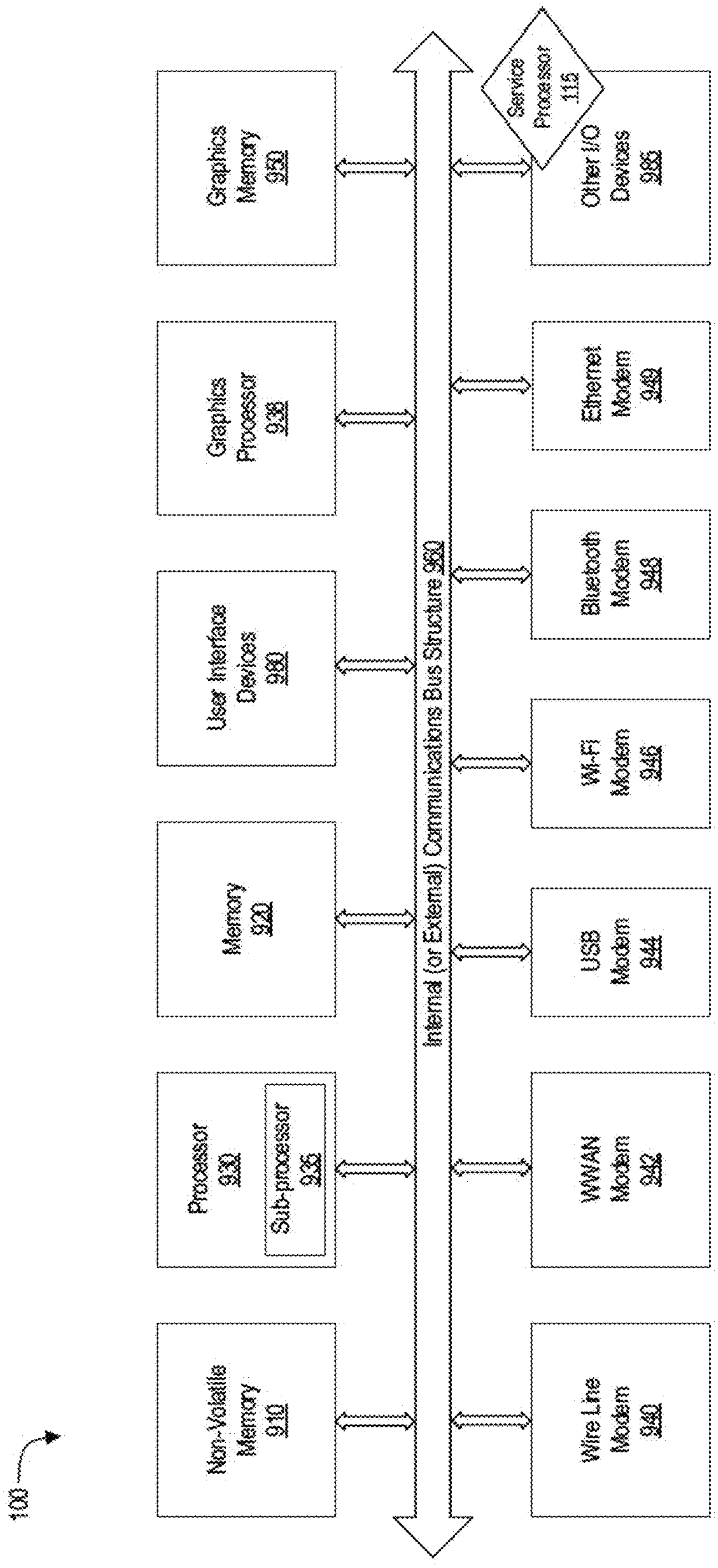
FIG. 16 illustrates another hardware diagram of a device that includes a service processor in accordance with some embodiments.

FIG. 16 illustrates another hardware diagram of a device 100 that includes a service processor 115 in accordance with some embodiments. As shown in FIG. 16, the service processor 115 is implemented on the other I/O devices component 980 of the device 100. In some embodiments, this implementation can be in part or whole accomplished in software stored, implemented and/or executed on the other I/O devices component 980 (e.g., a SIM/USIM card or other secure hardware I/O device). In some embodiments, the implementation and/or execution can be in part or whole accomplished in hardware that is on the other I/O devices component 980.

As discussed above, various embodiments include product designs in which the service processor 115 resides on device volatile or non-volatile memory (see FIG. 13), the device application processor or CPU (see FIG. 14), the wireless access modem (see FIG. 15) (or any other modem), or another I/O device (see FIG. 16). While these are just a few of the example service processor 115 placement embodiments, these embodiments show that the placement of where the software or hardware for implementing the service processor 115 can reside in the device 100 is very flexible and can be implemented in a myriad of places and ways depending on the device and/or other technical design choices.

Figure 17:
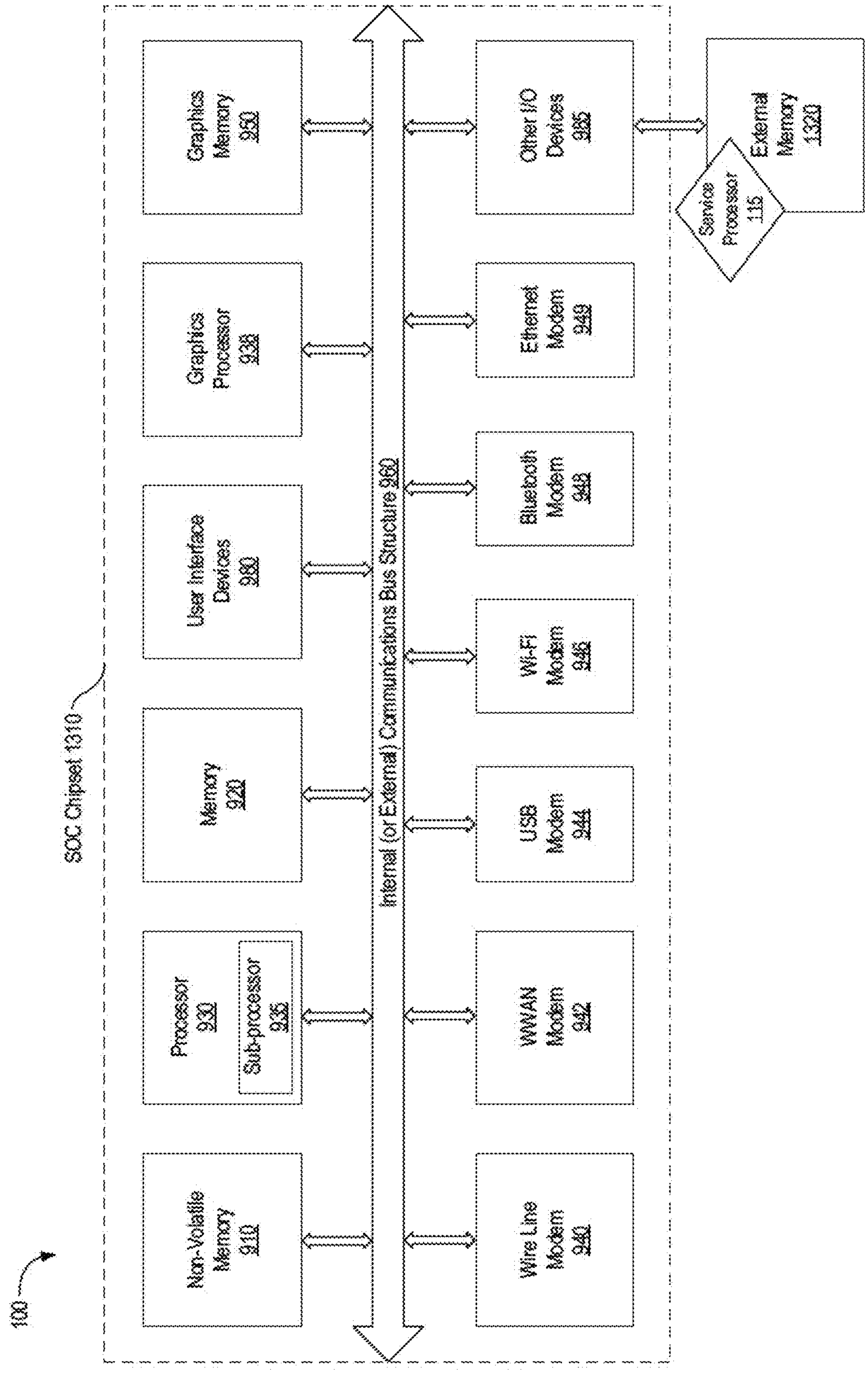
FIG. 17 illustrates another hardware diagram of a device that includes a service processor implemented in external memory of a System On Chip (SOC) in accordance with some embodiments.

FIG. 17 illustrates another hardware diagram of a device 100 that includes a service processor 115 implemented in external memory of a System On Chip (SOC) 1310 in accordance with some embodiments. As shown in FIG. 17, the service processor 115 is implemented on the external memory 1320 of the device 100. In some embodiments, this implementation can be in part or whole accomplished in software stored, implemented and/or executed on the external memory 1320. In some embodiments, the implementation and/or execution can be in part or whole accomplished in hardware that is on the external memory 1320. In some embodiments, SOC chipset 1310 and external memory 1320 provide a portion or all of the hardware of device 100.

Figure 18:
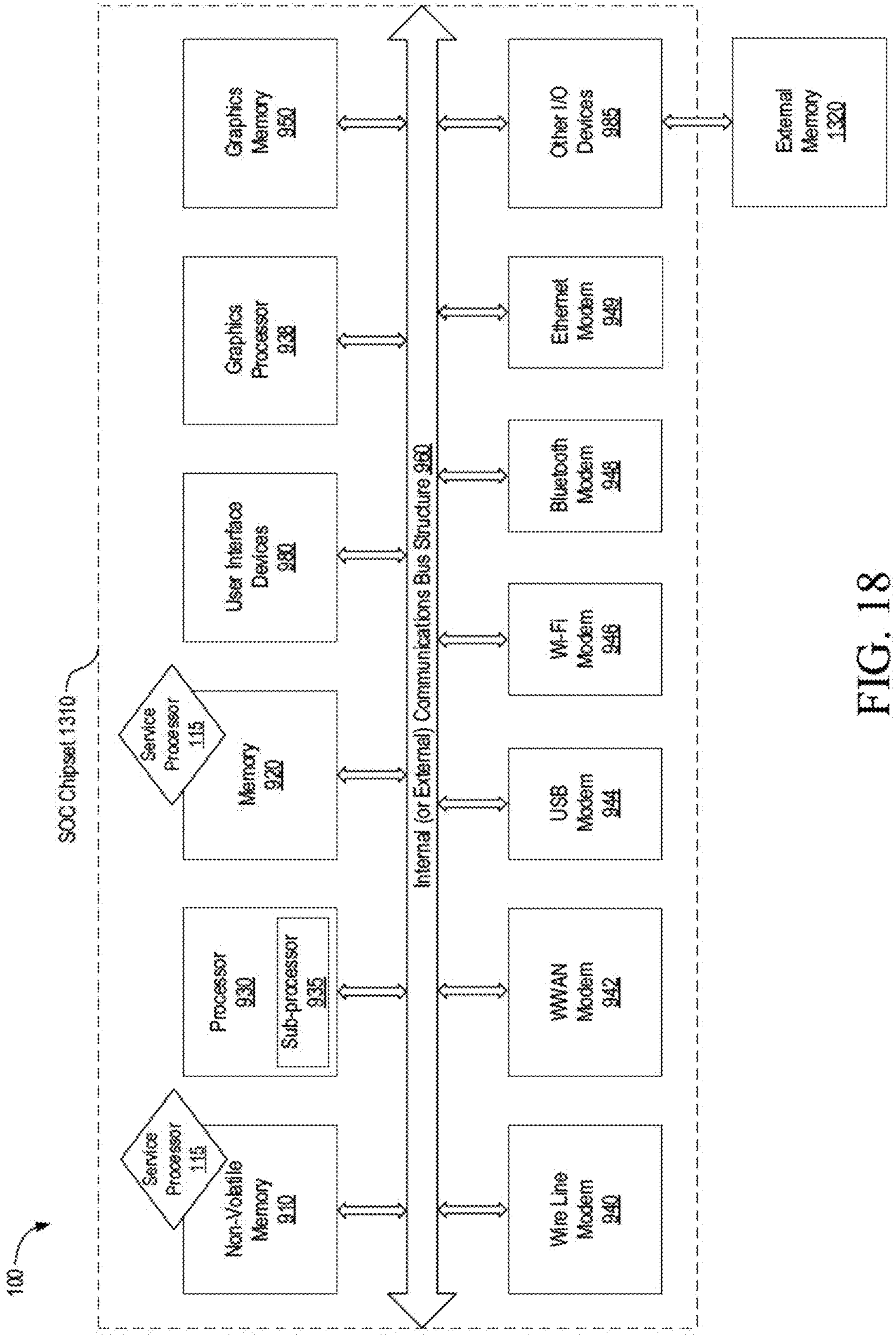
FIG. 18 illustrates another hardware diagram of a device that includes a service processor implemented in external memory of a System On Chip (SOC) in accordance with some embodiments.

FIG. 18 illustrates another hardware diagram of a device 100 that includes a service processor 115 implemented in external memory of a System On Chip (SOC) 1310 in accordance with some embodiments. As shown, the service processor 115 is stored in a non-volatile memory 910 and a memory 920 of the SOC chipset 1310, as similarly discussed above with respect to FIG. 13. In some embodiments, SOC chipset 1310 and external memory 1320 provide a portion or all of the hardware of device 100.

As similarly discussed above with respect to FIGS. 13 through 16, various embodiments include product designs including the SOC chipset 1310 in which the service processor 115 resides on internal volatile or non-volatile memory 910 of the SOC chipset 1310 (see FIG. 18), the device application processor or CPU 930 and/or sub processor 935, the modems 940, 942, 944, 946, 948, and/or 949 (or any other modem), another I/O device 985, and/or external memory 1320 (see FIG. 17) (and/or any combinations thereof). While these are just a few of the example service processor 115 placement embodiments, these embodiments show that the placement of where the software or hardware for implementing the service processor 115 can reside in the SOC chipset 1310 and/or the external memory 1320 of the device 100 is very flexible and can be implemented in a myriad of places and ways depending on the device and/or other technical design choices.

The above discussion with respect to FIGS. 13 through 18 illustrating various internal hardware embodiments for device 100 applies equally to this partitioning of device functionality or any other partitioning of how the components in device 100 are configured, whether they are all separate components, some of the components are combined into a single chipset but there are still multiple chipsets, or all of the components are combined into a chipset. For example, FIGS. 13 through 18 illustrating various internal hardware embodiments for device 100 show several access modem components including the wire line modem 940, wireless wide area network (WWAN) modem 942, USB modem 944, Wi-Fi modem 946, Bluetooth modem 948, and Ethernet modem 949. In some embodiments, wire line modem 940 is a DSL or cable modem such as DOCSIS, or some other modem with a hard connection such as fiber. In some embodiments, as discussed above and below, connection to the wire line or wireless access network is accomplished through an extension of the internal or external communications bus structure 960. For example, such an extension is accomplished using one or the other modems, such as Wi-Fi modem 946 or Ethernet modem 949, connecting to a local area network that in turn connects to the access network via a device that bridges the local area network to the access network. One of ordinary skill in the art will appreciate that when discussing device connection to any access network the connection can be via a direct connection to the network, such as a 3G or 4G WWAN modem 942 connection to a 3G or 4G WWAN network, or can be a connection to the access network through an intermediate connection, such as a Wi-Fi modem 946 connection to a modem or networking device combination that has a Wi-Fi LAN connection and a 3G or 4G network access network connection. Another example of an extended modem connection embodiment includes a Wi-Fi modem 946 device connection to a modem or networking device combination that includes a Wi-Fi LAN connection and a DOCSIS or DSL network access connection. Other examples of such combinations will be readily apparent to one of ordinary skill in the art.

Service Processor Configurations for Intermediate Networking Devices

FIGS. 19A through 19F illustrate various embodiments of intermediate networking devices that include a service processor. For example, FIGS. 19A through 19E illustrate various extended modem alternatives for access network connection through an intermediate modem or networking device combination that has a connection (e.g., LAN connection) to one or more devices 100.

In some embodiments, device 100 includes a 3G and/or 4G network access connection in combination with the Wi-Fi LAN connection to the device 100. For example, the intermediate device or networking device combination can be a device that simply translates the Wi-Fi data to the WWAN access network without implementing any portion of the service processor 115 as shown in FIG. 19B. In some embodiments, an intermediate device or networking device combination includes a more sophisticated implementation including a networking stack and some embodiments a processor, as is the case, for example, if the intermediate networking device or networking device combination includes a router function, in which case the service processor 115 can be implemented in part or entirely on the intermediate modem or networking device combination. The intermediate modem or networking device combination can also be a multi-user device in which more than one user is gaining access to the 3G or 4G access network via the Wi-Fi LAN connection. In the case of such a multi-user network, the access network connection can include several managed service links using multiple instantiations of service processor 115, each instantiation, for example, being implemented in whole or in part on device 100 with the intermediate modem or networking device combination only providing the translation services from the Wi-Fi LAN to the WWAN access network.

Referring now to FIGS. 19A, 19C, 19D, and 19E, in some embodiments, the service processors 115 are implemented in part or in whole on the intermediate modem or networking device combination. In the case where the service processor 115 is implemented in part or in whole on the intermediate modem or networking device combination, the service processor 115 can be implemented for each device or each user in the network so that there are multiple managed service provider accounts all gaining access through the same intermediate modem or networking device combination. In some embodiments, the functions of service processor 115 are implemented on an aggregate account that includes the WWAN access network traffic for all of the users or devices connected to the Wi-Fi LAN serviced by the intermediate modem or networking device combination. In some embodiments, the central provider can also provide an aggregated account service plan, such as a family plan, a corporate user group plan and/or an instant hotspot plan. In the case where there is one account for the intermediate modem or networking device combination, the intermediate modem or networking device combination can implement a local division of services to one or more devices 100 or users in which the services are controlled or managed by the intermediate modem or networking device combination or the device 100, but the management is not subject to service provider control and is auxiliary to the service management or service policy implementation performed by service processors 115. In some embodiments, another service model can also be supported in which there is an aggregate service provider plan associated with one intermediate modem or networking device combination, or a group of intermediate modems or networking device combinations but where each user or device still has its own service plan that is a sub-plan under the aggregate plan so that each user or device has independent service policy implementation with a unique instantiation of service processor 115 rather than aggregate service policy implementation across multiple users in the group with a single instantiation of service processor 115.

As shown in FIGS. 19A and 19C, in some embodiments, device 100 includes a Wi-Fi modem 946, a Wi-Fi modem 946 combined with a 3G and/or 4G WWAN modem 1530 on intermediate modem or networking device combination 1510, and the intermediate modem or networking device combination forwards WWAN access network traffic to and from device 100 via the Wi-Fi link. For example, the service processor 115 can be implemented in its entirety on device 100 and the service provider account can be associated exclusively with one device. This is an embodiment associated with one or more of FIG. 37, 39, 40 or 42 discussed below, in which the modem bus represents the Wi-Fi LAN connection via the Wi-Fi modem 946. Similarly, as shown in FIGS. 19A and 19D, such an implementation can be provided using a different access modem and access network, such as a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use DSL as shown in FIGS. 19A and 19E, USB, Ethernet, Bluetooth, or another LAN or point to point connection from device 100 to the intermediate modem or networking device combination 1510, or a femtocell modem and DSL/cable/T1/other combination as shown in FIGS. 19D and 19E.

In some embodiments, a portion of the service processor 115 is implemented on the device 100, such as the application interface agent 1693 and other supporting agents (see FIG. 24), and another portion of the service provider 115 is implemented on the intermediate modem or networking device combination, such as policy implementation agent 1690 or possibly modem firewall 1655 as well as other agents (see FIG. 24). This is an embodiment associated with one or more of FIG. 38 or 44 discussed below, in which the modem bus in the figure represents the Wi-Fi LAN connection via the Wi-Fi modem 946. In this example, the service provider 115 can still offer individual service plans associated exclusively with one device, or can offer an aggregate plan in which the portion of the service processor 115 located on the intermediate modem or networking device combination 1510 aggregates service plans into one WWAN connection but each individual device 100 has a unique service interface via the application interface agents and associated agents located on device 100. Similarly, such an implementation can be provided using a different access modem and access network, for example, a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, all of the service processor 115 is implemented on the intermediate modem or networking device combination 1510 and the aggregate device or user traffic demand from the LAN port is serviced through one service provider service plan account. This is an embodiment associated with FIG. 43 in which as discussed below the modem bus in the figure represents the Wi-Fi LAN connection via the Wi-Fi modem 946. Similarly, such an implementation can be provided using a different access modem and access network, for example, a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, the device 100 uses the on-board WWAN modem 942 when it is outside of Wi-Fi LAN coverage area for one or more trusted access networks for the device, and when the device comes within range of a Wi-Fi network associated with a intermediate modem or networking device combination connected to a trusted wire line access network, the device can switch to the Wi-Fi link service to connect service processor 115 to the trusted wire line access network. In some embodiments, the decision to switch to the Wi-Fi LAN associated with a trusted wire line access network can be made automatically by the device based on the policy implementation rules settings for the modem selection and control 1811 and/or the policy control agent 1692, can be made by the user, or can be made by the service controller 122 (see FIG. 26). In addition, various other embodiments similarly use USB, Ethernet, Bluetooth, or another LAN or point to point connection from device 100 to the intermediate modem or networking device combination 1510.

Figure 19F:
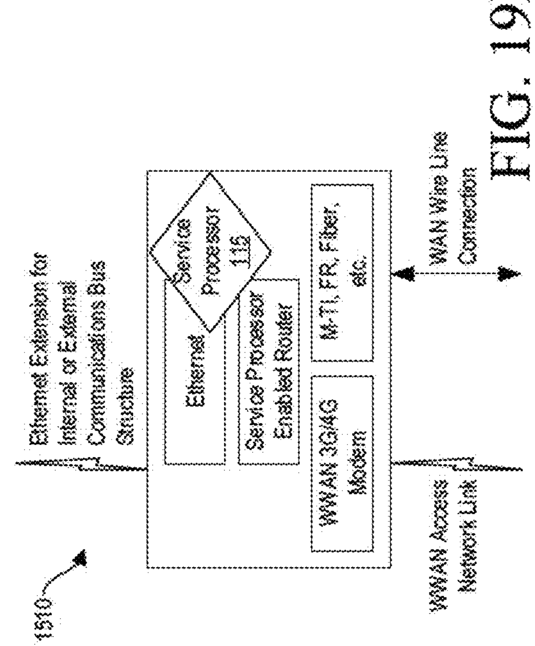

FIG. 19F illustrates another hardware diagram of a device 100 that includes a service processor 115 and a bus structure extension 1510 using intermediate modem or networking device combinations in accordance with various embodiments. In some embodiments, more than one access network connection is implemented in the intermediate modem or networking device combination 1510. This allows the device 100 to potentially connect through the intermediate modem or networking device combination with a choice of access network services. An example of such an embodiment is illustrated in FIG. 19F in which an access network router (e.g., an enterprise router) connected to a LAN with a wire line primary backhaul connection and a back up WWAN connection, for example, 3G or 4G, to provide access services when the primary wire line connection fails. As discussed above, the service provider service profile for service processor 115 and the service plan account can be set up as an aggregate account with multiple users connected to the LAN. The service provider can elect to use an embodiment that includes a portion of the service processor 115 on each device 100 so that the account can be managed for each user or each device, or the service provider can elect to implement all of the necessary features in the service processor 115 on the intermediate modem or networking device combination so that there is no visibility to the individual devices 100 or users.

As described herein, various embodiments provide many service policy implementation options that can enhance the service provider control of the service experience and cost, or enhance the user control of the service experience and cost by providing a verifiable or compromise resistant solutions to manage service policy implementation on the intermediate modem or networking device combination, for one or both of the WWAN or wire line access networks, when the WWAN access network is active, or when the WWAN access network is inactive. The level of service control, user preference feedback and service policy implementation verification or compromise resistance enabled by these embodiments improves the offered back up services and primary wire line services. One of ordinary skill in the art will also now appreciate that any number of wire line and/or wireless network access connections can be supported by the various embodiments as described herein, with any number of device architectures and architectures for intermediate modem or networking device combinations bridging the device to the access network of choice. Accordingly, various embodiments provide a verifiable managed service architecture, design and implementation for any number of single access and/or multi-access networks in which the service account can be consistent across multiple networks, and the service policies can be changed from network to network as deemed appropriate by the service provider with service notification, service cost control and privacy preference inputs from the user.

In various embodiments, the verification embodiments discussed herein for service policy implementation verification or service policy implementation compromise protection can be applied. In some embodiments, rather than attaching a service provider service plan account to a single device, it is attached to (e.g., associated with) a user. For example, when the user logs onto an access network with a service controller controlled by a service provider, regardless of what device the user logs onto with the user's service plan profile can be automatically looked up in the central billing system 123 and dynamically loaded (e.g., downloaded) onto the device 100 from the service controller 122 (e.g., a service profile provided on demand based on the user's identity). In some embodiments, in addition to dynamically loading the user's service policy implementation and control settings, one or more of the user's preferences including notification, service control, traffic monitor reporting privacy and Customer Relationship Management (CRM) reporting privacy are also dynamically loaded. For example, this allows the user to have the same service settings, performance and experience regardless of the device the user is logged into and using on the network. In addition, as discussed herein, in the various embodiments that call for roaming from one type of access network to another, the user service plan profile, that includes all of the above in addition to the service plan profile changes that take effect between different types of access network, can be used on any device and on any network, providing the user with a verifiable or compromise resistant, consistent service experience regardless of network or device.

Many of the embodiments described herein refer to a user using device 100. It is understood that there are also applications for these various embodiments that do not involve user interfaces. Examples of such applications include equipment, apparatus or devices for automation, telemetry, sensors, security or surveillance, appliance control, remote machine to machine data connections, certain remote access configurations, two way power metering or control, asset tracking, people tracking or other applications in which a human user interface is not required for device 100.

Various embodiments of the device 100 described above include other I/O devices 985. In some embodiments, these other devices include other modems, other special purpose hardware components, and/or other I/O devices or drivers or modems to connect to other I/O devices. In some embodiments, these other devices include a Subscriber Identity Module (SIM) or Universal Subscriber Identity Module (USIM) device. In some embodiments, it is advantageous to implement some or all of the service processor 115 functions on an embodiment of device 100 that includes a SIM and/or a USIM. In some embodiments, the other I/O devices 985 include a hardware device designed to implement a portion or all of the service processor 115 functions. For example, this is advantageous in cases in which the original device 100 was not manufactured with the service processor 115; in cases in which dedicated hardware is desired to improve one or more aspects of service processor 115 performance; allowing users, for example, to have the same service settings, performance and experience regardless of the device the user is using on the network by using such a SIM and/or USIM (e.g., or implemented as a type of dongle); and/or in cases in which a separate component is desired to assist in compromise protection for one or more aspects of service processor 115.

As discussed above, some embodiments described herein provide for billing of certain access services. In some embodiments, various applications do not require or involve billing of certain services. For example, applications like enterprise IT (Information Technology) group management of enterprise workforce access policy implementation or access cost control or access security policy, privacy control, parental control, network quality of service control or enhancement, private network services, free access services, publicly funded access services, flat rate no-options service and other services, or other examples that will be apparent to one of ordinary skill in the art do not require billing functionality but benefit from many other aspects of various embodiments.

Device-Assisted Services Install

Figure 20:
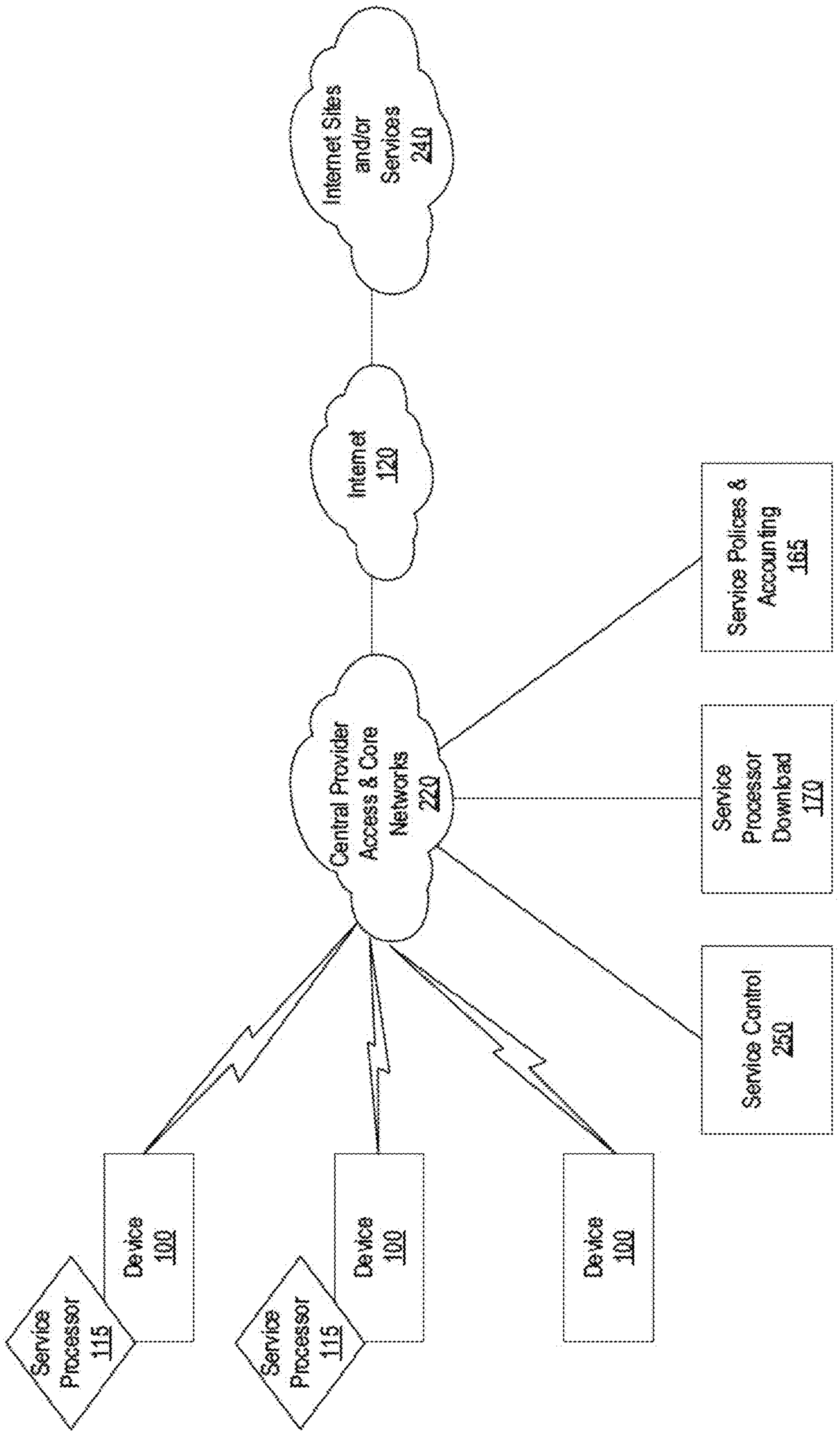
FIG. 20 illustrates a wireless network architecture for providing device-assisted services (DAS) install techniques in accordance with some embodiments.

FIG. 20 illustrates a wireless network architecture for providing device-assisted services (DAS) install techniques in accordance with some embodiments. As shown, FIG. 20 includes various wireless communications devices 100 (e.g., a mobile wireless device or an intermediate networking device) in wireless communication with central provider access and core networks 220. As shown, some of the devices 100 include service processors 115. For example, devices 100 can include various types of mobile phones, PDAs, computing devices, laptops, netbooks, tablets, cameras, music/media players, GPS devices, networked appliances, and any other networked device, including various types of intermediate networking devices, as described herein. Devices 100 can communicate via the central provider access and core networks 220 to the Internet 120 for access to various Internet sites/services 240 (e.g., Google sites/services, Yahoo sites/services, Blackberry services, Apple iTunes and App Store, Amazon.com, Facebook, and/or any other Internet service or other network facilitated service).

In some embodiments, intermediate networking devices, as described herein, include a service processor or assist in the downloading of a service processor for one or more devices 100 to facilitate network access as described herein with respect to various embodiments. In some embodiments, a device 100 does not initially include a service processor (as shown in FIG. 20). In some embodiments, a service processor 115 is previously installed (e.g., during manufacture or distribution), or is downloaded and installed on a device 100 (as also shown in FIG. 20).

In some embodiments, the wireless communications device is a mobile communications device, and the service includes one or more Internet-based services, and the mobile communications device includes one or more of the following: a mobile phone, a PDA, an eBook reader, a music device, an entertainment/gaming device, a computer, laptop, a netbook, a tablet, and a home networking system. In some embodiments, the wireless communications device includes a modem, and the processor is located in the modem. In some embodiments, an intermediate networking device includes any type of networking device capable of communicating with a device and a network, including a wireless network, example intermediate networking devices include a femtocell, or any network communication device that translates the wireless data received from the device to a network, such as an access network. In some embodiments, intermediate networking devices include 3G/4G WWAN to WLAN bridges/routers/gateways, femtocells, DOCSIS modems, DSL modems, remote access/backup routers, and other intermediate network devices.

In some embodiments, there are at least two versions of a service processor. For example, a first version service processor can be a generic version of a service processor version that can be pre-installed during manufacture or distribution and used for downloading a second version service processor. For example, the first version service processor can be a generic version that is not specific to a device group while the second version is specific to a device group. As another example, the first version service processor installed during time of manufacture or during device distribution may not contain all of the functions that are available for a permanent second version service processor that is installed when the device first connects to a network. As another example, service processors can be regularly updated to change the security parameters of the software, such as software signatures, encryption, obfuscation, secure query response sequence information, and/or other parameters, so that it becomes more difficult to hack or otherwise modify the software. As another example, the second version service processor can be uniquely associated with the device 100 (e.g., wireless communications device or an intermediate networking device) and the associated service plan and/or service provider. In some embodiments, a first version service processor is installed on a device 100 (e.g., service processor 115 installed on the device 100 can be a first version service processor that was previously installed during manufacture or distribution, or downloaded and installed during initial network access, as shown in FIG. 20). In some embodiments, a second version service processor is installed on a mobile device (e.g., service processor 115 can be a second version service processor that was previously installed during manufacture or distribution, or downloaded and installed during initial network access, as shown in FIG. 20).

In some embodiments, a new and/or updated version service processor 115 can be downloaded from, for example, a service processor download 170, as described herein. In some embodiments, the service processor download 170 provides a function or service that is located elsewhere in the network or partially located in elsewhere or integrated with/as part of other network elements (e.g., the service processor download 170 can be a function/service of service control 250 and/or service policies and accounting 165). In some embodiments, the devices 100 are in service control communication with service control 250 via central provider access and core networks 220 as shown in FIG. 20. Service policies and accounting functions 165 are also provided in communication with the central provider access and core networks 220 as shown in FIG. 20. In some embodiments, the service policies and accounting functions 165 provides a function or service that is located elsewhere in the network or partially located in elsewhere or integrated with/as part of other network elements (e.g., the service policies and accounting functions 165 can be a function/service of service control 250).

In some embodiments, DAS install clients (e.g., bootstrappers for devices 100) are provided. In some embodiments, a first version service processor provides DAS install client function that facilitates a bootstrapping function for downloading and installing a second version service processor. In some embodiments, DAS install clients are provided for creating/downloading and installing a verifiable service processor for each device (e.g., a network capable device, such as a mobile wireless communications device or intermediate networking device). In some embodiments, a DAS install client downloads a uniquely secured service processor for device 100 (e.g., hashed/encrypted, such as based on device credentials, to prevent, for example, mass hacking or other security vulnerabilities, and/or a signed interface between the service processor and modem). In some embodiments, a non-advertised IP address allocated for each device group is rotated (e.g., to counter denial of service (DoS), distributed denial of service (DDS), and/or other types of attacks and/or vulnerabilities or exploits), and service processors are configured with multiple IP addresses for service control access (e.g., for secured network communication with service control 150 and/or service policies and accounting 165).

In some embodiments, the various techniques and embodiments described herein can be readily applied to intermediate networking devices (e.g., an intermediate modem or networking device combination). In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femtocells, back up cards for wired access routers, and/or other intermediate networking devices. In some embodiments, an intermediate networking device (e.g., an intermediate modem or networking device combination) downloads and sends a service processor to one or more devices communicating via the intermediate networking device. In some embodiments, an appropriate and validated service processor is securely downloaded to the intermediate networking device, and the intermediate networking device performs the service processor functions for various wireless communication devices (e.g., mobile wireless communication devices) in communication with the intermediate networking device. In some embodiments, in which one or more wireless communication devices are in wireless communication via an intermediate networking device, some of the service processor functions are performed on the intermediate networking device (e.g., an appropriate and validated service processor is installed or securely downloaded and installed on the intermediate networking device), and some of the service processor functions are performed on the one or more wireless communication devices (e.g., an appropriate and validated service processor is installed or securely downloaded and installed on the mobile device) (e.g., stack controls can be performed on the mobile device and various other controls can be performed on the intermediate networking device). In some embodiments, the one or more wireless communication devices cannot access the network via the intermediate networking device (e.g., the devices are quarantined) unless the one or more wireless communication devices each have an installed and functioning verified service processor (e.g., using CDRs from intermediate networking device and/or network).

In some embodiments, a USB WLAN stick or other similar networking device is provided (e.g., including a modem) with DAS install client software that loads onto the device 100 and installs a service processor 115 on the device 100. In some embodiments, software on the device 100 instructs the user to insert a properly configured memory device (e.g., a secured USB memory stick, dongle, or other secured device that can provide a DAS install client software, a service processor image, and/or device credentials for network access). In some embodiments, the USB WLAN installed software assumes control over, for example, the network stack of the device (e.g., for managing network access) and sets various service policies based on whether the service is communicated via the USB WLAN stick or via the Wi-Fi/other (e.g., including requiring no policies, such that access is open). In some embodiments, the DAS install client software on the USB WLAN stick provides a secure client that installs itself/certain software on the device that provides a DAS install client (e.g., bootstrapper) for the device, and the DAS install client downloads an appropriate service processor onto the device and/or the USB WLAN stick (e.g., the stack can also be located and managed on the USB WLAN stick).

In some embodiments, a network-based charging data record (CDR) feed, as described herein with respect to various embodiments, is provided for monitoring service usage by managed devices. In some embodiments, the CDR feed includes device generated CDRs or micro-CDRs generated by the service processor (e.g., service processor 115 can generate CDRs for monitored service usage on the device, which can, for at least some CDRs, include unique transaction codes for uniquely identifying the monitored service usage based on service or other categorizations/criteria) on the device (e.g., a mobile device or an intermediate networking device for that mobile device). In some embodiments, the CDR feed is a real-time (e.g., near real-time) network-based CDR feed provided for determining whether any devices have been compromised (e.g., a hack of a first version or second version service processor providing for unrestricted service usage for such devices, and/or any other mass or security attack or vulnerability or exploit). For example, such a CDR feed can be used to determine abnormal or unusual traffic patterns and/or service level usage activities, which, for example, can be used to identify and/or protect against a DoS/DDS attack or other types of security attacks.

Figure 21:
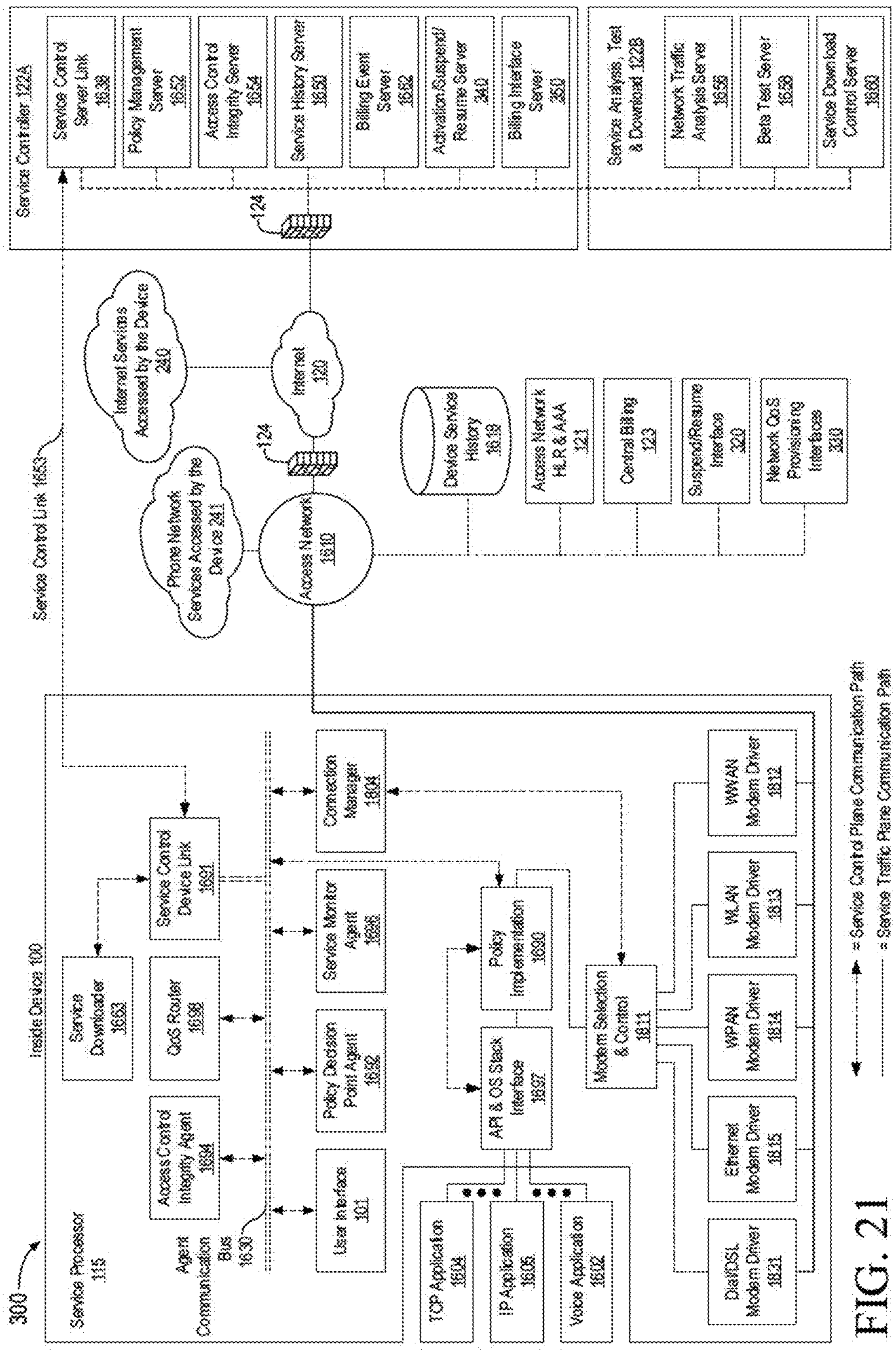
FIG. 21 illustrates a functional diagram of another network architecture for quality of service (QoS) for device-assisted services (DAS) in accordance with some embodiments.

FIG. 21 illustrates a functional diagram of a QoS for DAS architecture 300 including a device-based service processor 115 and a service controller 122 for providing quality of service (QoS) for device assisted services (DAS) in accordance with some embodiments. In some embodiments, QoS for DAS techniques described herein are implemented using the functions/elements shown in FIG. 21. As shown in FIG. 21, service processor 115 includes a QoS API and OS stack interface 1697. In some embodiments, QoS API and OS stack interface 1697 provides the QoS API functionality as similarly described herein with respect to various embodiments. In some embodiments, the QoS API is used to report back QoS availability to applications. As shown, service processor 115 also includes a QoS router 1698 (e.g., QoS router agent/function) and a policy decision point (PDP) agent 1692. In some embodiments, QoS router 1698 provides the QoS router functionality as similarly described herein with respect to various embodiments. In some embodiments, the QoS router 1698 supports multiple QoS channels (e.g., one or more provisioned/allocated QoS links forming a QoS channel between the device and the desired end point, such as an access point/BTS/gateway/network for a single ended QoS channel or other communication device for an end to end QoS channel, depending on the QoS connection/network support/availability/etc.). In some embodiments, the QoS router 1698 supports multiple QoS channels, which can each have different QoS classes/levels. In some embodiments, the QoS router 1698 routes application/service usage traffic to an appropriate QoS channel. In some embodiments, the QoS router 1698 determines the routing/mapping based on, for example, one or more of the following: a QoS API request, a QoS activity map, a user request, a service plan, a service profile, service policy settings, network capacity, service controller or other intermediate QoS network element/function/device, and/or any other criteria/measure, as similarly described herein with respect to various embodiments. In some embodiments, multiple different applications/services are routed to a particular QoS channel using various techniques described herein. In some embodiments, different applications/services are routed to different QoS channels using various techniques described herein. In some embodiments, the QoS router 1698 assists in managing and/or optimizing QoS usage for the communications device. In some embodiments, the QoS router 1698 assists in managing and/or optimizing QoS usage across multiple communications devices (e.g., based on network capacity for a given cell area/base station or other access point). In some embodiments, PDP agent 1692 provides the PDP agent functionality as similarly described herein with respect to various embodiments. As shown, QoS for DAS architecture 300 also includes a suspend resume interface 320, network QoS provisioning interfaces 330 in the device service processor 115; an activation/suspend resume server 340 and billing event server 1662 in the service controller 122; and a suspend/resume interface 320 and network QoS provisioning interfaces 330 for providing the various QoS techniques described herein.

Protecting Network Capacity

Figure 22:
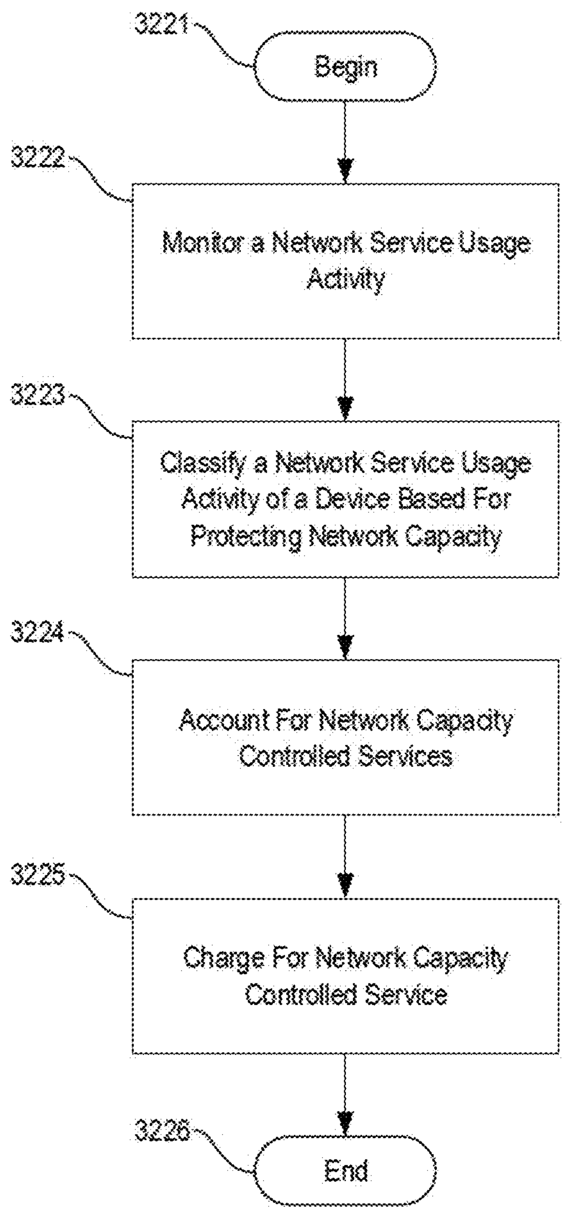
FIG. 22 illustrates a flow diagram for device-assisted services (DAS) for protecting network capacity in accordance with some embodiments.

There is also a need for intelligent network monitoring to provide real-time traffic monitoring network service usage (e.g., at the packet level/layer, network stack application interface level/layer, and/or application level/layer) of the wireless network (e.g., radio access networks and/or core networks) and to effectively manage the network service usage for protecting network capacity (e.g., while still maintaining an acceptable user experience). Using Device-Assisted Services (DAS) techniques, and in some cases, network assisted/based techniques, to provide for network service usage monitoring of devices, network carriers/operators would be provided greater insight into what devices, which users and what applications, and when and where network congestion problems occur, enabling operators to intelligently add additional resources to certain areas when necessary (e.g., offloading data traffic onto femtocells or Wi-Fi hotspots and adding more network resources), to differentially control network service usage, and/or to differentially charge for network service usage based on, for example, a network busy state, for protecting network capacity FIG. 22 illustrates a flow diagram for device-assisted services (DAS) for protecting network capacity in accordance with some embodiments. At 3221, the process begins. At 3222, monitoring a network service usage activity of a device in network communication is performed. At 3223, classifying the network service usage activity (e.g., based on a classification of the network service usage activity for protecting network capacity, for example, as a network capacity controlled service) for protecting network capacity is performed. At 3224, accounting for network capacity controlled services (e.g., accounting for the network service usage activity based on a classification of the network service usage activity for protecting network capacity) is performed. At 3225, charging for network capacity controlled services is performed. At 3226, the process is completed. In some embodiments, DAS for protecting network capacity further includes classifying the network service usage activity as a network capacity controlled service. In some embodiments, DAS for protecting network capacity includes differentially accounting and/or differentially charging for network capacity controlled services and foreground services. In some embodiments, the network service usage control policy includes policies for differentially controlling, accounting, and/or charging for network capacity controlled services (e.g., based on a network busy state, a time based criteria, a service plan, network to which the device or network service usage activity is gaining access from, and/or other criteria/measures). In some embodiments, accounting for network capacity controlled services includes differentially collecting service usage for one or more network capacity controlled service classes in which the accounting is modified/varies (e.g., dynamically) based on one or more of the following: network busy state (e.g., modify/credit accounting during network congestion not satisfying the user preference), network service activity, access network (e.g., the network to which the device/service activity is currently connected), user preference selection, time based criteria (e.g., current time of day/day of week/month), associated service plan, option to time window. In some embodiments, charging for network capacity controlled services includes mapping an accounting to a charging report. In some embodiments, charging for network capacity controlled services includes sending the charging report to a network element (e.g., a service controller, a service cloud, a billing interface/server, and/or another network element/function). In some embodiments, charging for network capacity controlled services includes mediating or arbitrating CDRs/IPDRs for network capacity controlled service(s) vs. other network service usage activities or bulk network service usage activities. In some embodiments, charging for network capacity controlled services includes converting a charging report to a billing record or billing action. In some embodiments, charging for network capacity controlled services includes generating a user notification of network capacity controlled service charges upon request or based a criteria/measure (e.g., a threshold charging level and/or a threshold network service usage level). In some embodiments, charging for network capacity controlled services includes charge by application based on a charging policy (e.g., bill by application according to billing policy rules, such as for billing to a user or to a sponsored service provider, carrier, and/or other entity).

In some embodiments, differential network access control for protecting network capacity includes controlling network services traffic generated by the device (e.g., network capacity controlled services based on a network service usage control policy (e.g., a network capacity controlled services policy). In some embodiments, differential network access control for protecting network capacity includes providing assistance in control of the distribution of bandwidth among devices, network capacity controlled services (e.g., applications, OS operations/functions, and various other network services usage activities classified as network capacity controlled services), a differentiated QoS service offering, a fair sharing of capacity, a high user load network performance, and/or preventing one or more devices from consuming so much network capacity that other devices cannot receive adequate performance or performance in accordance with various threshold and/or guaranteed service levels. In some embodiments, differential network access control for protecting network capacity includes applying policies to determine which network the service activity should be connected to (e.g., 2G, 3G, 4G, home or roaming, Wi-Fi, cable, DSL, fiber, wired WAN, and/or another wired or wireless or access network), and applying differential network access control rules (e.g., traffic control rules) depending on which network to which the service activity is connected. In some embodiments, differential network access control for protecting network capacity includes differentially controlling network service usage activities based on the service usage control policy and a user input (e.g., a user selection or user preference). In some embodiments, differential network access control for protecting network capacity includes differentially controlling network service usage activities based on the service usage control policy and the network the device or network service activity is gaining access from.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/other such messages). As another example, an emulated network API can modify, swap, and/or inject network socket application interface messages (socket( ), connect( ), read( ), write( ), close( ), and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

Figure 23:
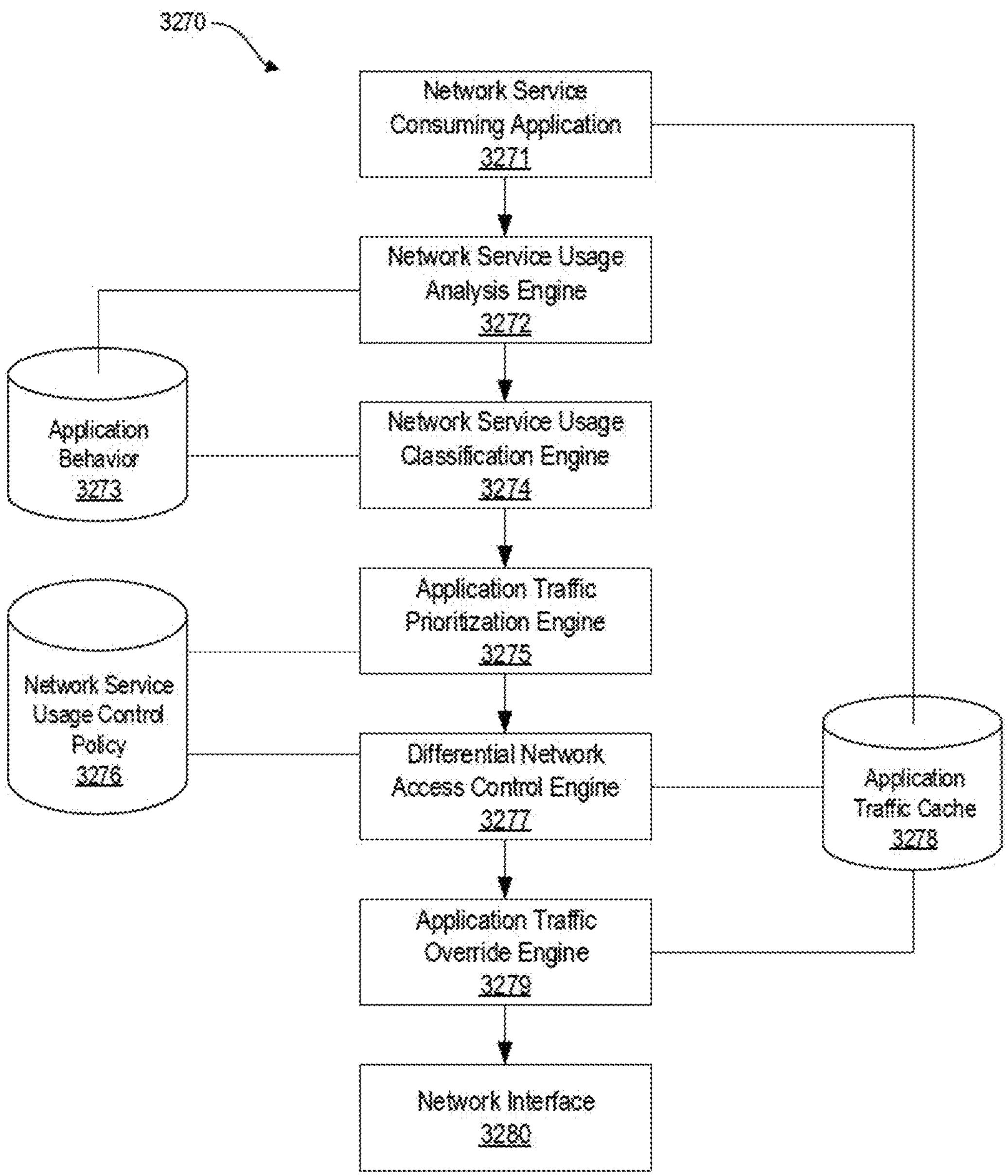
FIG. 23 illustrates an example of a system for application-specific differential network access control in accordance with some embodiments.

FIG. 23 depicts a diagram of an example of a system 3270 for application-specific differential network access control. In the example of FIG. 23, the system 3270 includes a network service consuming application 3271, a network service usage analysis engine 3272, an application behavior datastore 3273, a network service usage classification engine 3274, an application traffic prioritization engine 3275, a network service usage control policy datastore 3276, a differential network access control engine 3277, an application traffic cache 3278, an application traffic override engine 3279, and a network interface 3280. The system 3270 is intended to represent a specific implementation of techniques described previously in this paper for illustrative purposes. The techniques may be applicable to an applicable known or convenient (wired or wireless) device for which there is a motivation to control network service usage.

In the example of FIG. 23, the network service consuming application 3271 is an application that is implemented on a device. In an expected use, the application 3271 is a software application stored at least in part in memory on a wireless device, though kernel-level instructions could be implemented as firmware or even hardware. The application 3271 can be referred to as "running" on the device or as being "executed" by the device in accordance with known uses of those terms. Wireless media are known to have more bandwidth constraints, which is why a wireless device is an expected use, though the technique may be applicable to wired devices in certain situations.

In the example of FIG. 23, the network service usage analysis engine 3272 is coupled to the network service consuming application 3271. The network service usage analysis engine 3272 analyzes traffic from the network service consuming application 3271 and stores relevant data in the application behavior datastore 3273. The data can include all traffic that is sent by the application, or a subset of the traffic (e.g., that which has a certain QoS classification or priority, that which has high resource consumption due to frequent transmission from the application, that which is sent to a particular destination, etc.) The data can also include traffic that is received for the application. The application behavior datastore 3273 can alternatively or in addition be implemented as a traffic source/destination datastore, which can be valuable if differential access control is based upon the source and/or destination of traffic. The application behavior datastore 3273 includes data structures (e.g., records) representative of data that is organized with implementation-specific granularity. For example, the data structures could be representative of frames (L2), packets (L3), or messages. (It may be noted that the term "packets" is often used to mean collections of data that are not limited to L3.) The desired granularity may depend upon where the network service usage analysis engine 3272 is located. Whether the data structures are changed over time (e.g., to change data associated with a record), replaced as records age, or maintained as historical data is also implementation-specific.

In the example of FIG. 23, the network service usage classification engine 3274 is coupled to the network service usage analysis engine 3272 and the application behavior datastore 3273. The network service usage classification engine 3274 can categorize the traffic stored in the application behavior datastore 3273 based on, e.g., network type, time of day, connection cost, whether home or roaming, network busy state, QoS, and whether the particular service usage activity is in foreground of user interaction or in the background of user interaction, or other characteristics that are obtained from network service usage analysis or through other means. Classification rules can include, for example, examining if one or more of the following has taken place within a specified period of time: user has interacted with the device, user has interacted with the service usage activity, user has picked up the device, service usage activity UI content is in the foreground of the device UI, audio or video information is being played by the service usage activity, a certain amount of data has been communicated by the service usage activity, service usage activity is or is not on a foreground or background service list. Rules that define which service usage activities to classify as, e.g., background service usage activities can be user-selected, set by a service provider, or through some other applicable means.

Advantageously, the network service usage analysis engine 3272 can examine a particular service usage activity and the network service usage classification engine 3274 can determine if the particular service usage activity fits a set of one or more classification rules that define the particular service usage activity as, e.g., a background service usage activity.

In the example of FIG. 23, the application traffic prioritization engine 3275 uses a policy stored in the network service usage control policy datastore 3276 to determine an appropriate prioritization for traffic to and/or from the network service consuming application 3271. Prioritization can enable the system 3270 to fine-tune the amount of network resources consumed by the network service consuming application 3271, or the rate of network resource consumption. The control policy can require applications to throttle network resource consumption, prohibit the use of network resources by certain applications, etc.

Advantageously, the application traffic prioritization engine 3275 can determine a particular service usage activity has a particular characteristic, such as being a background service usage activity. This can involve checking whether a condition is satisfied.

In the example of FIG. 23, the differential network access control engine 3277 is coupled to the application traffic prioritization engine 3275 and the network service usage control policy datastore 3276. The differential network access control engine 3277 causes the network service consuming application 3271 traffic to be queued in the application traffic cache 3278. (If no throttling is required to follow the control policy, of course, the traffic need not be cached anywhere other than is typical, such as in an output buffer.) The application traffic cache 3278 is intended to represent a cache that is implemented on top of an output buffer or other standard caching device, and is used by the differential network access control engine 3277 to facilitate control over "rogue" applications, applications having anomalous behavior, or applications that must otherwise be controlled to conform with the control policy.

Advantageously, the differential network access control engine can restrict network access of a particular service usage activity when a condition is satisfied, such as when the service usage activity is a background activity.

In the example of FIG. 23, the application traffic override engine 3279 is coupled to the differential network access control engine 3277 and the application traffic cache 3278. The application traffic override engine 3279 enables a user or device to deviate from the control policy. Such deviation can be prompted by, for example, an incentive offer or a notification of cost.

In an illustrative example, the device 3270 blocks chatter for an application running in the background that is attempting to report device or user behavior. The application traffic prioritization engine 3275 determines that the chatter has zero priority, such that the network service consuming application 3271 is prevented from consuming any resources. The user can be sent a notification by the application traffic override engine 3279 that their control policy prohibits the application from consuming network resources, but that the user can opt to deviate from the control policy if they are willing to pay for the consumed resources. If the user is willing to pay for the resources, traffic can be sent at a certain rate from the application traffic cache 3278 through the network interface 3280, or perhaps sent without using the application traffic cache 3278.

Service Processor and Service Controller for Verifiable Service Monitoring, Notification and Control FIG. 24 is a functional diagram illustrating a device-based service processor 115 and a service controller 122 in accordance with some embodiments. For example, this provides relatively full featured device-based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As previously discussed, it is understood that the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, as discussed below in some embodiments, one or more of the policy implementation or service monitoring functions can be placed on one of the access modems located below the modem driver and modem bus in the communication stack as illustrated in certain figures and described herein. As discussed below, some simplified embodiment figures illustrate that not all the functions illustrated in all the figures are necessary for many designs, so a product/service designer can choose to implement those functions believed to be most advantageous or sufficient for the desired purposes and/or environment. The functional elements shown in FIG. 24 are described below.

As shown, service processor 115 includes a service control device link 1691. For example, as device-based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

In some embodiments, the service control device link 1691 agent messages are transmitted asynchronously as they are generated by one or more of the service agents. In some embodiments, the service control device link 1691 performs collection or buffering of agent messages between transmissions. In some embodiments, the service control device link 1691 determines when to transmit based potentially on several parameters including, for example, one or more of the following parameters: periodic timer trigger, waiting until a certain amount of service usage or traffic usage has occurred, responding to a service controller message, responding to a service controller request, initiated by one or more agents, initiated by a verification error condition, initiated by some other error or status condition. In some embodiments, once a transmission trigger has occurred, the service control device link 1691 assembles all buffered agent communications and frames the communications.

In some embodiments, the transmission trigger is controlled by waiting for an amount of service usage, such as waiting until a certain amount of data traffic has passed, which reduces the control plane communication channel traffic usage to a fraction of the data plane traffic. For example, this approach preserves network capacity and reduces service cost even in traffic scenarios in which data traffic is light.

In some embodiments, the transmission trigger is based on waiting for an amount of service usage, and also including a minimum transmission rate that triggers a transmission according to one or more of the following parameters: a maximum time between transmissions clock to keep the service processor 115 in communication with the service controller 122 when little or no service usage is occurring, a polling request of some kind from the service controller 122, a response to a service controller heartbeat, a transmission generated by a service verification error event, or a transmission generated by some other asynchronous event with time critical service processor 115 (or service controller 122) messaging needs, such as a transaction or service billing event or a user request. For example, service control plane traffic down is reduced to a relatively inexpensive and capacity conserving trickle when device 100 data traffic is not significant. At the same time, this approach also provides an effective flow of real time or near real-time service control plane traffic that is both cost and capacity efficient, because the service control plane traffic is a relatively small percentage of the data plane traffic when data plane traffic usage is heavy. For example, when data plane traffic usage is heavy is generally the time when close monitoring of service policy implementation verification or compromise prevention can be particularly important and by keeping the control plane overhead to a fraction of data plane traffic close monitoring and control of services are maintained at a reasonable cost in terms of percentage of both bandwidth used and network capacity. In some embodiments, the service usage or service activity trigger occurs based on some other measure than traffic usage, such as a number of messages transacted, one or more billing events, number of files downloaded, number of applications run or time that an application has been running, usage of one or more specified applications, GPS coordinate changes, roaming event, an event related to another network connection to the device and/or other service related measures.

In some embodiments, the service control device link 1691 provides for securing, signing, encrypting or otherwise protecting communications before sending. For example, the service control device link 1691 can send to the transport layer or directly to the link layer for transmission. In some embodiments, the communications are further secured with transport layer encryption, such as TCP TLS (Transport Control Protocol Transport Layer Security) or another secure transport layer protocol. In some embodiments, communications are encrypted at the link layer, such as IPSEC (Internet Protocol Security), various VPN (Virtual Private Network) services, other forms of IP layer encryption and/or another link layer encryption technique.

In some embodiments, the service control link 1691 includes the above discussed agent heartbeat function in which the agents provide certain required reports to the service controller 122 for the purpose of service policy implementation verification (e.g., verification related reports on certain aspects of the service processor 115) or for other purposes. For example, such agent heartbeat messages can be in the open/clear (unencrypted) or encrypted, signed and/or otherwise secured. In some embodiments, these messages include one or more of the below described types of messages: an agent information message, an agent check-in message and/or agent cross check message.

In some embodiments, an agent information message is included in the agent heartbeat service policy implementation verification message, which includes, for example, any information the agent needs to communicate to the service controller 122 as part of the operation of the service policy implementation system. For example, an agent response to a service controller challenge, as described below, can be included in the agent heartbeat service policy implementation verification message.

In some embodiments, an agent check-in message is included in an agent heartbeat service policy implementation verification message, which includes, for example, a transmission of a unique agent identifier, secure unique identifier, and/or hashed encrypted and signed message beginning with some shared secret or state variable for the hash. For example, an agent self-check can be included in the agent heartbeat service policy implementation verification message, which includes reporting on agent configuration, agent operation, agent code status, agent communication log, agent error flags, and/or other agent associated information potentially hashed, encrypted, signed or otherwise secured in the message (e.g., using a shared secret unique to that agent).

In some embodiments, an agent cross-check message is included in the agent heartbeat service policy implementation verification message, which includes, for example, reports on the status, configuration, operation observations, communication log or other aspects of another agent. For example, agent environment reports can be included in the agent heartbeat service policy implementation verification message, which includes, for example, reports on certain aspects of the service processor 115 operating environment, such as software presence (e.g., installation status of certain operating system and/or application software and/or components thereof), observed communication with agents or communication attempts, memory accesses or access attempts, network accesses or access attempts, software downloads or attempted downloads, software removal or download blocking, service policy implementation verification or compromise event error conditions with respect to the operating environment for the service processor 115, and/or other messages regarding the verification or possibility of compromise associated with the service processor 115 operating environment or agents.

In some embodiments, the agent heartbeat function also provides regular updates for information important to user service notification services. For example, the network-based elements can provide regular synchronization updates for the device-based service usage or service activity counters in which service usage or service activity measures available from one or more network service history elements is transmitted to the device 100. This allows the service usage counter errors between the device service counter and the counters used for central billing to be minimized. A common service usage or service activity measure is total traffic usage measured to date within a time frame over which a service limit is applicable. Other service usage or service activity measures can also be tracked and reconciled in a similar manner.

In some embodiments, for the heartbeat function, the service controller 122 verifies that the scheduled agent reports are being received and that the reports are within expected parameters. In some embodiments, the access control integrity server 1654 issues signed challenge/response sequences to the policy implementation agent 1690. For example, the challenges can be asynchronous, issued when an event or error condition occurs, issued on a schedule or issued when a certain amount of data has passed. This approach, for example, provides a second layer of service policy implementation verification that strengthens the service usage or service activity measurement verification. For example, a challenge/response can be sent over the heartbeat link for the purpose of verifying device agent integrity. Various challenge/response related verification embodiments are described below.

In some embodiments, the challenge/response heartbeat message can include sending any kind of command or query, secure or transmitted in the open, receiving a response from the agent and then evaluating the response to determine if the response is within a range of parameters expected for a correctly configured agent, an agent that is operating properly, an agent that is not partially compromised or an agent that is not entirely compromised. In some embodiments, the agent is only required to respond with a simple acknowledgement of the challenge. In some embodiments, the agent is required to respond with a message or piece of information that is known by the agent. In some embodiments, the agent is required to respond with a message or piece of information that is difficult for the agent to respond correctly with if it were to be partially or entirely compromised. In some embodiments, the agent is required to respond back with information regarding the operation or configuration of the agent that is difficult for the agent to respond properly with if the agent is not properly configured, not operating properly, is partially compromised or is entirely compromised. In some embodiments, the first agent is required to respond back with information regarding the operation, configuration, status or behavior of a second agent that is difficult for the first or second agent to respond properly with if the first or second agent is not properly configured, not operating properly, is partially compromised or is entirely compromised. In some embodiments, the agent is required to respond with a response that includes a shared secret. In some embodiments, the agent is required to respond with information regarding the presence, configuration, operating characteristics or other information regarding other programs in the operating environment of the agent. In some embodiments, the agent is required to respond with hashed information to be portions of code or a code sample (e.g., the code portion or code sample can be specified by the service controller 122).

In some embodiments, the information the agent responds with is a response to a signed or encrypted message from the service controller 122 in which the agent must know how to decode the encrypted controller message in order to respond correctly or it would be difficult for the agent to respond properly if the agent is not configured properly, is not operating within appropriate limits, is partially compromised or is entirely compromised. In some embodiments, the agent signs or encrypts information in such a manner that it is difficult to respond correctly when the message is decoded by the service controller 122 unless the agent is configured properly, is operating within appropriate limits, is not partially compromised and is not entirely compromised. In some embodiments, the agent is required to respond with a signed or encrypted hash of information that is difficult for the agent to generate unless the agent is configured properly, is operating within appropriate limits, is not partially compromised and is not entirely compromised. For example, the hashed information can be local device configuration information, portions of code or all of the code, and/or the code portion to be used in the response can be specified by the service controller. In another example, the hashed information the agent responds with can include a shared secret, and/or the hashed information can be information regarding the presence, configuration, operating characteristics or other information regarding other programs in the operating environment of the agent.

Accordingly, as described above, the agent heartbeat function provides an important and efficient system in some embodiments for verifying the service policy implementation or protecting against compromise events. For example, there are many other functions the agent heartbeat service can perform and some are described herein while others will be apparent to one of ordinary skill in the art given the principles, design background and various embodiments provided herein.

In some embodiments, the service control device link 1691 facilitates another important function, which is the download of new service processor software elements, revisions of service processor software elements, and/or dynamic refreshes of service processor software elements.

There are many embodiments for such operations. In some embodiments, the software is received as a single file over the service control device link 1691. For example, the file can have encryption or signed encryption beyond any provided by the communication link protocol itself. In some embodiments, the software files are segmented into smaller packets that are communicated in multiple messages sent over the service control device link 1691. In some embodiments, once the file(s) are received, or the segmented portions of the file(s) are received, they are communicated to a service downloader 1663 for file aggregation and installation, which, in some embodiments, is performed after further measures to verify the service processor software are completed. In some embodiments, the files are sent using other delivery means, such a direct TCP socket connection to the service downloader 1663 or some other software installer, which can also involve secure transport and additional levels of encryption.

As shown in FIG. 24, an agent communication bus 1630 represents a functional description for providing communication for the various service processor 115 agents and functions. In some embodiments, as represented in the functional diagram illustrated in FIG. 24, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned and/or otherwise protected from unauthorized monitoring or usage.

In some embodiments, as described below, there are multiple layers of security applied to the agent communication bus 1630 communication protocols, such as including one or more of the following: point to point message exchange encryption using one or more keys that are partially shared or shared within the service processor 115 agent group and/or the service controller 122, point to point message exchange that using one or more keys that are private to the two endpoints of the communication, a bus-level message exchange encryption that can be in place of or in addition to other encryption or security, or using one or more keys that are partially shared or shared within the service processor 115 agent group and/or the service controller 122, a set of secure messages that can only be decoded or observed by the agents they are intended for, a set of secure messages that allow communication between certain agents or service processor functions and entities outside of the service processor operating environment. In some embodiments, and as described herein, the service control device link 1691 is assumed to be equivalent to an agent for communication purposes, and, in the case of the service control device link 1691, the communication is not restricted to the agent communication bus 1630 but also extends to the service control communications link 1653. In some embodiments, the system has the capability to replace keys or signatures on occasion or on a regular basis to further secure against monitoring, eavesdropping or compromise of the agent communication system.

For example, various forms of message encryption and security framework techniques can be applied to encrypt and/or secure the agent communication bus 1630, including one or more of the following: agent bus encryption using shared key for all agents provided and updated by the secure server; agent bus encryption using point to point keys in which the secure server informs the bus and agents of keys and updates as appropriate; agent level encryption using agent to agent shared keys in which the secure server informs agents of the key and updates the key as appropriate; agent level encryption using agent to agent point to point key in which the secure server informs agent of the point to point keys that are required and updates the keys as appropriate; agent level access authorization, which only allows access to the agents that are on the secure authorization list and in which the list is provided by the secure server and signatures are provided by the secure server; UI messages are only analyzed and passed, in which the UI cannot have access to configuration information and cannot issue challenges; agent level heartbeat encryption, which can be point to point or shared key for that agent; control link level heartbeat encryption; TLS (Transport Layer Security) communication protocols; server level heartbeat encryption, which can be point to point or shared key for that secure server; and/or the access control integrity agent 1694 or heartbeat function can become point to multipoint secure communications hubs.

In some embodiments of the agent communication bus 1630, the design of the agent communication bus depends on the nature of the design embodiments for the agents and/or other functions. For example, if the agents are implemented largely or entirely in software, then the agent communication bus can be implemented as an inter-process software communication bus. In some embodiments, such an inter-process software communication bus is a variant of D-bus (e.g., a message bus system for inter-process software communication that, for example, helps applications/agents to talk to one another), or another inter-process communication protocol or system, running a session bus in which all communications over the session bus can be secured, signed, encrypted or otherwise protected. For example, the session bus can be further protected by storing all software (e.g., software components, applications and/or agents) in secure memory, storing all software in encrypted form in secure memory, and/or executing all software and communications within a secure execution environment, hardware environment and/or protected memory space. In some embodiments, if the agents and other functions are designed with a mixture of software and hardware, or primarily with hardware, then the implementation of the bus design will vary, and the principles and embodiments described herein will enable one of ordinary skill in the art to design the specifics of the agent communication bus 1630 to meet a particular set of product and desired functional requirements.

As shown in FIG. 24, an access control integrity agent 1694 collects device information on service policy, service usage or service activity, agent configuration and agent behavior. In some embodiments, the access control integrity agent 1694 also cross checks this information to identify integrity breaches in the service policy implementation and control system. In some embodiments, the access control integrity agent 1694 also initiates action when a service policy violation or a system integrity breach is suspected. In some embodiments, the access control integrity agent 1694 also performs asynchronous or periodic agent checks to verify presence, configuration or proper operation of other agents. In some embodiments, the access control integrity agent 1694 also performs challenge-response sequence verification of other agents.

Figure 29:
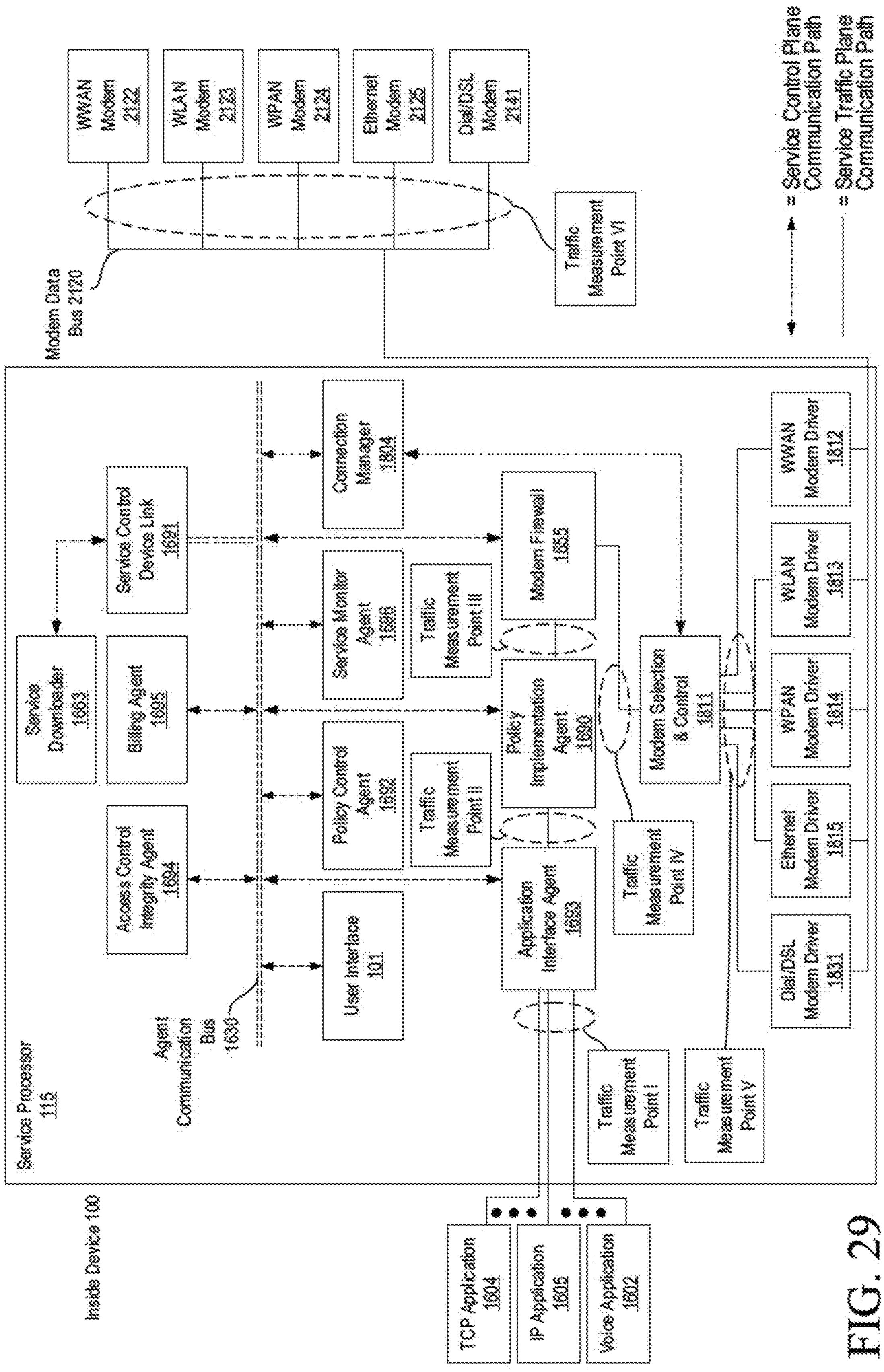
FIG. 29 is another functional diagram illustrating the service processor and the service controller in accordance with some embodiments.

In some embodiments, the access control integrity agent 1694 obtains service usage or service activity measures from a service monitor agent 1696 and compares one or more first service usage measurement points against one or more second service usage measurement points to verify service policy implementation. For example, as shown in FIG. 29, if the service usage at measurement point IV is inconsistent with measurement point III, which, for example, can indicate, for example, that an unauthorized or unmonitored usage of the access modem (e.g., modems 2122, 2123, 2124, 2125 or 2141) is taking place. As another example, as also shown in FIG. 29, if one or more aspects of upstream traffic usage measurement point II, which represents the upstream demand side of policy implementation agent 1690, is inconsistent with upstream traffic measurement point III, which represents delivered traffic from the policy implementation agent 1690, then the policy implementation agent 1690 may not be operating properly. As another example, as also shown in FIG. 29, if service measurement point III and IV indicate that firewall agent 1655 is passing traffic to URLs or IP addresses that are in the blocked policy settings, then a verification error condition can be set for the access control policy. As another example, if the policy controller reports traffic usage statistics that are inconsistent with traffic usage policy settings, then a traffic usage policy verification error may have occurred. As another example, if the service usage counter synchronization information received from the service controller 122, the device service history 1618 and/or the central billing system 123, is compared to the service usage history reported by the service monitor agent and the two are found to be outside of acceptable tolerance limits for the comparison, then there may be a verification error in the service monitor service usage or service activity accounting. There are numerous additional embodiments of such comparisons as described herein and others as will be readily apparent to one of ordinary skill in the art given the principles, design background and specific examples and various embodiments described herein.

In some embodiments, device service policy implementations are verified by comparing various service usage measures used at the device against expected service usage or service activity behavior given the policies (e.g., one or more service policy settings, service profile or service profile settings for network-based access/services, and/or service plan or service plan for network-based access/services). For example, verification is performed based on a measure of total data passed at the device as compared to the service policy for total data usage. For example, verification is performed based on a measure of data passed in a period of time at the device as compared to the service policy for data passed in such a period of time. For example, verification is performed based on a monitoring of communications from the device based on IP addresses as compared to the policy for permissible IP addresses. For example, verification is performed based on a measure of total data passed from the device per IP address as compared to the policy for total data usage per IP address. Other examples include such actual versus policy comparisons based on other measures at/from/to the device, such as location, downloads, email accessed, URLs, and/or any other data, location, application, time or other criteria or any combination of criteria that can be measured for comparing with various policy settings and/or restrictions.

In some embodiments, the access control integrity agent 1694 monitors agent self-check reports to verify that agents are properly configured. In some embodiments, the access control integrity agent 1694 reports the agent self check reports to the service controller 122. In some embodiments, the access control integrity agent 1694 performs a role in service usage test transmission, reception and/or monitoring, with the usage test being tailored to test monitoring or control aspects for any subset of service activities. In some embodiments, the access control integrity agent 1694 performs a role in billing test event generation and/or monitoring. In some embodiments, the access control integrity agent 1694 checks and reports the result of service usage monitoring verification tests, service usage billing verification tests and/or transaction billing verification tests.

In some embodiments, the access control integrity agent 1694 receives agent access attempt reports to determine if unauthorized agent access attempts are occurring. In some embodiments, the access control integrity agent 1694 acts as a central secure communications hub for agent to agent or service controller 122 to agent communication. For example, the access control integrity agent 1694 can be used so that no other software or function can access other agents or so that agents cannot access other agents except through the secure point to multipoint communications hub. In some embodiments, this approach further enhances compromise resistance for the agents. In some embodiments, some or all of the agent communications, including agent to agent or service controller 122 to agent communications, and possibly including unauthorized attempts to communication with agents, are monitored and logged so that a trace log of some or all agent communications can be maintained. For example, the agent communication trace log can be summarized and/or compressed for transmission efficiency or regularly reported, such as through the heartbeat function, or the agent communication trace log can be reported only when the service controller 122 requests the agent communication trace log or when there is a verification error event. As similarly described above, the partitioning of agent functions and server functions is provided herein mainly to aid in disclosing various embodiments but those of ordinary skill in the art will appreciate that other partitioning of agent functions and server functions can be used based on different design choices. For example, the central agent communication hub function is performed in some embodiments by the access control integrity agent 1694, however, in other embodiments that function is performed by the service control device link 1691. For example, when the central agent communication hub function is located in the service control device link 1691, then architecturally the device link can be a single point to multipoint secure communications hub for all agent to agent and service controller 122 to agent communications. In some embodiments, this approach has certain advantages from a service policy implementation verification or compromise protection robustness perspective, or has certain advantages from a communications protocol efficiency perspective, or simply can be more efficient to implement. It should be noted that in other embodiments described herein the agent to agent and agent to service controller 122 communications can be multipoint to multipoint, with each agent having the capability to communicate with other agents or the service controller, this communication can be secure, signed or otherwise encrypted or protected in some embodiments and in the open/clear in others. Also, as discussed in some embodiments, the agents can maintain their own communications or attempted communications log, which can then be reported to the service controller 122. In some embodiments, the agents implement restrictions on which device components or agents the agents will conduct communications with so that only agents that need to communicate with one another can do so.

In some embodiments, the service control device link 1691 reviews local billing event history and compares such history to billing event reports to verify that a billing agent 1695 is functioning properly (e.g., has not been tampered with or compromised). In some embodiments, the service control device link 1691 cross-checks service usage or service activity against billing event reports from the billing agent 1695 to verify that billing events are properly billing for service usage or service activity. In some embodiments, the service control device link 1691 cross-checks transaction billing process or records against transaction billing reports to ensure that transaction billing events are being properly reported by the billing agent 1695. In some embodiments, the service control device link 1691 determines if one or more agents have been compromised, and if so, initiates a dynamic agent download process to replace any such potentially compromised agent.

In some embodiments, the access control integrity agent 1694 verifies that the service usage counter is reporting service usage or service cost to the user within acceptable limits of accuracy when compared to the service usage reports obtained from the service monitor agent 1696, the service controller 122, the device service history 1618 and/or the central billing system 123. In some embodiments, the access control integrity agent 1694 checks to verify that user privacy filter preferences are being properly implemented. In some embodiments, the access control integrity agent 1694 checks to verify that the user is properly receiving UI warnings regarding service usage or roaming service usage conditions.

In some embodiments, the access control integrity agent 1694 checks to verify that the device is not beginning service usage until it has been authenticated, authorized or granted access to the network. In some embodiments, access control integrity agent 1694 checks with the service controller 122 or the billing system 123 to verify that the user or device has a valid service standing and should be admitted to access on the network.

In some embodiments, an Activation Tracking Service (ATS) is provided in which the service monitoring function (e.g., performed by the service monitor agent 1696 and/or some other agent/component or combinations thereof on the device) is used in part to determine which access networks are being connected to and to record and/or report this information. In some embodiments, the ATS is only enabled if the device user approves reporting of access networks connected to by the user device. In some embodiments, the ATS is protected from tampering. For example, the ATS can be hardened, that is, to be more tamper resistant, using a variety of techniques, including any of the following: the ATS can be located (e.g., stored) in secure memory and/or secure hardware; the ATS can be implemented in the system BIOS, the access modem and/or another hard to access portion of the device; a second device agent can confirm the presence of the ATS with a report to a network-based server; the second agent or the network server can initiate a reinstall of the ATS if it is missing or is found to be operating improperly; and/or the ATS can be placed in a secure area of the OS so that it cannot be removed or if removed must be replaced for proper device operation to resume. A variety of other tamper resistance techniques can also be used to protect the ATS from tampering as similarly described herein with respect to other device-based functions/software components/agents.

In some embodiments, the access control integrity agent 1694 verifies that ATS software or hardware is present, properly configured or operating properly. In some embodiments, the access control integrity agent 1694 reviews network connection or activity history and compares such to ATS reports to verify activation tracking service reports are occurring properly. In some embodiments, the access control integrity agent 1694 replaces ATS software if it has been removed. In some embodiments, the access control integrity agent 1694 monitors access or compromise of ATS software to determine if it may have been compromised. In some embodiments, the access control integrity agent 1694 reports status of ATS functions.

In some embodiments, the access control integrity agent 1694 scans the local agent execution environment to determine if there are unauthorized accesses to service processor functions, settings or code. In some embodiments, the access control integrity agent 1694 monitors software loading activity, protected memory access or communication with service processor 115 agents to detect unauthorized changes to service processor software or configuration. For example, the access control integrity agent 1694 can have a local database of potentially malicious elements and compare entries in the database against the elements detected locally. As another example, the access control integrity agent 1694 can communicate a list of some or all of the elements detected locally to the service controller 122 to augment or take the place of the database comparison function that may be performed locally. In some embodiments, the access control integrity agent 1694 detects new software downloads, installs or invocations and immediately issues an error flag report when potentially malicious software is downloaded, installed or invoked. In some embodiments, the access control integrity agent 1694 scans the local software loading and invocation activity along with a log of other software runtime events and regularly reports this trace so that when an error or compromise event occurs the trace preceding the event can be analyzed to determine the offending software or activity trace that took place to cause the compromise or error. Once the software or activity that caused the compromise is known, it can be entered into a refreshed version of the database that the device and other devices use to detect potentially malicious pre-cursor conditions. Examples of such pre-cursor events include software invocations, software downloads, attempts to uninstall certain agent and/or application software/components or OS components, a sequence of memory I/O events, a sequence of software access events, a sequence of network address or URL communications or downloads or a sequence of access modem I/O activity. In various other embodiments of the access control integrity agent 1694, the agent performs or (securely) communicates with other software/hardware device/network components that perform other well known signature, behavior blocking and/or intrusion detection identification/detection and/or blocking techniques based on the presence of potentially unwanted and/or potentially or known malicious software and/or intrusion attempts by unauthorized software and/or unauthorized users, using, for example, real-time, on access, periodic, and/or on demand scanning.

In some embodiments, the access control integrity agent 1694 detects or blocks potentially compromising behavior of other software programs/users attempting unauthorized behavior in the service processor 115 operating environment. In some embodiments, the access control integrity agent 1694 detects software that is being loaded that has the same or similar name, identification, memory location or function as one or more of the service processor 115 agents. In some embodiments, the access control integrity agent 1694 blocks operation or loading of such software. In some embodiments, the access control integrity agent 1694 detects or blocks unauthorized access of service processor 115 protected memory. In some embodiments, the access control integrity agent 1694 verifies configuration and operation of secure service downloader 1663. In some embodiments, the access control integrity agent 1694 monitors network and I/O activity to detect potentially compromising events, such as a program that is downloaded from known detrimental or potentially suspect IP addresses or URLs or a program that accesses certain IP addresses or URLs. In some embodiments, the access control integrity agent 1694 scans of the service processor operating environment are recorded and kept for a period of time, and if a service policy verification error occurs, then the scans immediately prior to the error are analyzed or reported to the service controller 122 for analysis. In some embodiments, such scans are regularly reported to the service controller 122 without the presence of service policy verification error conditions.

In some embodiments, the access control integrity agent 1694 requests a dynamic agent download of certain critical service processor functions, including in some cases the access control integrity agent 1694 on a periodic basis, or on a periodic basis when network access activity is not required or minimal.

In some embodiments, the access control integrity agent 1694 determines if a threshold has been surpassed for a max usage trigger for ambient and/or other services that should not be using significant amounts of data (e.g., based on the type of device and/or service profile settings).

In some embodiments, the access control integrity agent 1694 determines if verification errors exist in one or more of the verification process embodiments and, in some embodiments, reports errors immediately or in the next agent heartbeat to the service controller 122. In some embodiments, any number of results from the above checks, monitoring activities, reports or tests are reported to the service controller 122.

In some embodiments, a policy control agent 1692 receives policy instructions from the service controller 122 and/or the user via the billing agent 1695 and adapts device service policy settings (e.g., instantaneous device service policy settings) in one or more of the following agents/components: a policy implementation agent 1690, the modem firewall 1655 and/or an application interface agent 1693. As shown in FIG. 24, the modem firewall 1655 is in communication with a modem driver 1640, which is in communication with the agent communication bus 1630 and access network 1610. As shown with respect to access network 1610, a central billing server 123, an access network AAA server 121 and device server history 1618 are also provided. As shown, the Internet 120 is accessible via the access network 1610 and firewall 124, from which device 100 can then access various Internet services 240.

In some embodiments, the policy control agent 1692 adapts low level service policy rules/settings to perform one or more of the following objectives: achieve higher level service usage or cost objectives, reduce network control channel capacity drain, reduce network control plane server processing bandwidth, and/or provide a higher level of user privacy or network neutrality while satisfying service usage or service activity objectives. In some embodiments, the policy control agent 1692 performs a policy control function to adapt instantaneous service policies to achieve a service usage objective. In some embodiments, the policy control agent 1692 receives service usage information from the service monitor agent 1696 to evaluate service usage history as compared to service usage goals. In some embodiments, the policy control agent 1692 uses service monitor 1696 service usage or service activity history and various possible algorithm embodiments to create an estimate of the future projected service usage. In some embodiments, the policy control agent 1692 uses a future projection of service usage to determine what service usage or service activity controls need to be changed to maintain service usage goals. In some embodiments, the policy control agent 1692 uses service usage history to perform a service usage or service activity analysis to determine the distribution of service usage across service usage elements within categories, such as usage by application, usage by URL, usage by address, usage by content type, usage by time of day, usage by access network, usage by location, and/or any other categories for classifying service usage. In some embodiments, the policy control agent 1692 uses the service usage distribution analysis to determine which service usage elements or service activities are creating the largest service usage (e.g., if e-mail, social networking, or multimedia/online video application categories are creating the largest service usage).

In some embodiments, the policy control agent 1692 is instructed, for example, by the user, through billing agent 1695 to perform a service control algorithm, such as traffic shaping or download management, to manage service usage or service activities to assist the user in controlling service costs. As a basic example of such a traffic shaping algorithm, the traffic shaping algorithm can simply reduce traffic speed for all applications and traffic types successively until the service usage projections are within service usage limits for the present service billing period. To illustrate an algorithm that is more sophisticated and provides the advantage of leaving many service usage elements or service activities unaffected while only controlling down usage on the most aggressive service usage elements or service activities, the traffic shaping algorithm can identify the highest traffic usage applications and/or websites and successively reduce traffic speed just for the highest usage applications and/or websites until the service usage projections are within service usage limits for the present service billing period. These examples thereby reduce network traffic for the user in accordance with the user's service usage objectives while maintaining overall satisfactory service usage experience for the user in a manner that satisfies various net neutrality requirements (e.g., the traffic throttling of certain applications/websites based on user input in which categories based on service usage history are selected by the user, for example, a certain application may be using 90% of the aggregate traffic usage). For example, adaptive throttling algorithms can be used to throttle application traffic that the user requests throttling, such as recursively throttling of the specified application traffic (e.g., to denigrate the traffic usage associated with that application and thereby reduce overall service data usage).

In some embodiments, the policy control agent 1692 adjusts service policy based on time of day. In some embodiments, the policy control agent 1692 obtains a measure of network availability and adjusts traffic shaping policy settings based on available network capacity. In some embodiments, the policy control agent 1692 automatically and dynamically adjusts service policy based on one or more other service policy settings, the service profile and/or the service plan associated with the device and/or user of the device.

In some embodiments, various lower level service policy implementation embodiments are combined with a higher level set of service policy supervision functions to provide device-assisted verifiable network access control, authentication and authorization services.

In some embodiments, device-based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using IPDRs (e.g., using the device ID/device number for the device 100 to determine if the device has been used in a manner that is out of plan for the service plan associated with the device 100, such as based on the amount of data usage exceeding the service plan's service data usage limits, out of plan/unauthorized access to certain websites, and/or out of plan/unauthorized transactions). In some embodiments, service data usage of the ambient activated device is verified by setting a maximum data rate in the policy control agent 1692 and if/when it is determined that the device is exceeding a specified data rate/data usage, then the service data usage is throttled accordingly. In some embodiments, various other verification approaches are used for ambient activation purposes.

In some embodiments, the policy control agent 1692 (and/or another agent/component of the service processor 115 and/or service controller 122) performs a service control algorithm to assist in managing overall network capacity or application QoS (Quality of Service). In some embodiments, the policy control agent 1692 (and/or another agent/component of the service processor 115) performs an access network selection algorithm to determine which access network to connect to based on connection options and determined strengths of available wireless networks, network preference or security settings, service usage cost based network preferences, and/or any other criteria.

Accordingly, as described herein with respect to various embodiments, service usage or service activities can be measured by various agents at various different measurement points, which provides for a more robust verification and integrity of device-based services communication. For example, it is much less likely and more difficult to compromise and/or spoof multiple agents. As described herein, various verification and integrity checks are performed, including, for example, network-based service usage measurement (e.g., using IPDRs); heartbeat monitoring; agent based heartbeat (e.g., challenge/response queries); agent operating environment protection; monitoring agent communications; agent cross-checks; comparing device-based and network-based measures (e.g., service usage measures); dynamic software/agent download; and/or any combination of these and various other verification/integrity check techniques described herein and/or apparent from the various embodiments described herein.

In some embodiments, the device 100 is capable of connecting to more than one network and device service policies are potentially changed based on which network the device is connected to at the time. In some embodiments, the network control plane servers detect a network connection change and initiate the service policy implementation established for the second network. In some embodiments, the device-based adaptive policy control agent, as described herein (e.g., policy control agent 1692), detects network connection changes and implements the service policies established for the second network.

In some embodiments, when more than one access network is available, the network is chosen based on which network is most preferred according to a network preference list or according to which network that optimizes a network cost function. For example, the network preference list can be pre-established by the service provide and/or the user and/or later modified/adjusted by either the service provider and/or the user. For example, the cost function can be based on determining a minimum service cost, maximum network performance, whether or not the user or device has access to the network, maximizing service provider connection benefit, reducing connections to alternative paid service providers, and/or any other cost related criteria for network selection purposes.

In some embodiments, the device 100 detects when one or more preferred networks are not available, implements a network selection function or intercepts other network selection functions, and offers a connection to the available service network that is highest on a preference list. For example, the preference list can be set by the service provider, the user and/or the service subscriber. In some embodiments, a notification is provided to the device/user when the device is not connected to a network (e.g., indicating in a pop-up/bubble or other UI based display a notification, such as "You are not connected to the network. Click here to learn more, get free trial, use a session, sign-up for service"). In some embodiments, the notification content can be determined based on usage service patterns, locally stored and/or programmable logic on the device and/or a server (e.g., device reports that user is not connected and WWAN is available). Decisions on what bubble to present when may be in pre-stored logic on device.

In some embodiments, service policies are automatically adapted based on the network to which device 100 is connected. For example, the device can be a cellular communication based device connected to a macrocell, a microcell, a picocell, or a femtocell (e.g., femtocells generally provide a low power, small area cellular network used, for example, in homes or offices, which, for example, can be used as an alternative to Wi-Fi access). In some embodiments, service monitoring agent 1696 and/or billing agent 1695 modify service usage counting and/or billing based on whether the device is connected to a macrocell, microcell, picocell or femtocell. In some embodiments, the device recognizes which type of network it is currently connecting to (e.g., looking up in a local or network table for the current base station connected to, and/or the information is broadcast to the device upon the connection with the base station), that is, whether it is a macrocell, microcell, picocell or femtocell. In other embodiments, the device does not recognize which type of network it is currently connected to, but reports its current base station, and the network uses a network lookup function to determine which type of network it is connected to. In some embodiments, the device adjusts the billing based on the type of network it is connected to, or in other embodiments, the device calculates an offset to such billing based on the type of network it is connected to, and/or in other embodiments, the device records such service usage associated with the type of network it is connected to and the network billing can adjust the billing accordingly. For example, the billing can be lower for service data usage over a femtocell versus a macrocell. In some embodiments, service policies are adjusted based on the type of network that the device is connected, such as billing, user notification, data usage/bandwidth, throttling, time of day, who owns the cellular network connection (e.g., user's home femtocell, or user's work femtocell, or a commercial business's femtocell like a coffee shop or any other common area like an airport) and/or any other service policy can be different for a femtocell connection (or for any other type of connection, such as a macrocell, microcell, or picocell). In some embodiments, the local service usage counter is adjusted based on the type of network (and/or based on the time of day of such service activity) that the device is connected, such as billing, user notification, data usage/bandwidth, and/or any other service policy can be different for a femtocell connection (or for any other type of connection, such as a macrocell, microcell, or picocell). In some embodiments, the service policies and/or billing policies are adjusted based on network congestion.

In some embodiments, if adaptive service policy control is not required, then the policy control agent 1692 can simply pass instantaneous service policy settings directly to the agents responsible for implementing instantaneous service policies.

In some embodiments, a policy implementation agent 1690 implements traffic shaping and QoS policy rules for the device 100. In some embodiments, the policy implementation agent 1690 provides a firewall function. In some embodiments, the policy implementation agent 1690 performs traffic inspection and characterization. In some embodiments, packet inspection is aided by literal or virtual application layer tagging while in other embodiments packet inspection is performed entirely in/by the policy implementation agent 1690. In some embodiments, the policy implementation agent 1690 accepts service policy implementation settings from the policy control agent 1692 or directly from the service controller 122. More detail on specific embodiments for the policy implementation agent 1690 is provided below with respect to the figures associated with communication stack and communication protocol flow.

In some embodiments, the burst size, buffer delay, acknowledgement delay and drop rate used in upstream and downstream traffic shaping are optimized with the goal of reducing access network traffic overhead, and excess capacity usage that can result from mismatches in traffic transmission parameters with the access network MAC and PHY or from excess network level packet delivery protocol re-transmissions. In some embodiments, the application interface agent 1693 is used to literally tag or virtually tag application layer traffic so that the policy implementation agent(s) 1690 has the necessary information to implement selected traffic shaping solutions. As shown in FIG. 24, the application interface agent 1693 is in communication with various applications, including a TCP application 1604, an IP application 1605, and a voice application 1602.

In some embodiments, downstream literal or virtual application tagging are delayed until a traffic flow passes through the service policy implementation functions and to the application interface function where the service flow is then identified and associated with the underlying traffic and application parameters, and the literal or virtual tag is then communicated to the first policy implementation function or service monitoring function in the downstream traffic processing stack. In some embodiments, prior to being associated with a literal or virtual tag, the traffic flow is allowed to pass with no traffic shaping, and once the traffic flow is identified and tagged, the appropriate traffic shaping is applied. In some embodiments, a set of traffic shaping policy parameters are applied to the unidentified traffic flow before the flow is identified, and then the traffic shaping policy for the flow is updated when the flow is tagged. In some embodiments, the traffic flow can be blocked at the application interface agent even before the tag is passed to the policy implementation functions if it is found to be associated with traffic parameters that are blocked by policy once packet processing, framing and encryption are removed.

In some embodiments, a service monitor agent 1696 records and reports device service usage or service activities of device 100. In some embodiments, service usage history is verified by a number of techniques including verifying against network-based service usage history (e.g., device service history 1618) and the various service policy implementation techniques as described herein.

In some embodiments, the service monitor agent 1696 includes the capability to filter service usage history reporting with the decision on which aspects of service history to report being determined by policies including possibly privacy policies defined by the device user or control plane servers in the network. In some embodiments, the service monitor agent 1696 monitors and possibly records or reports Customer Resource Management (CRM) information such as websites visited, time spent per website, interest indications based on website viewing, advertisements served to the device, advertisements opened by the user, location of the user, searches conducted by the user, application usage profile, device user interface usage history, electronic commerce transactions, music or video files played, applications on device, and/or when the user is actively working or playing or inactive. In some embodiments, to protect the privacy of this user CRM information, the user is provided with options on how much of the information to share and the user's response to the options are recorded and used to determine the filtering policy for how much of the CRM data to report (e.g., CRM filter level options selected by the user via the device UI and/or via various service plan or service profile or service policy options) and how much to suppress or to not even monitor/record/store in the first place. In some embodiments, to protect the privacy of this user's GPS/location tracking related information, the user is provided with options on how much of the information to share and the user's response to the options are recorded and used to determine the filtering policy for how much of the GPS/location tracking related data to report (e.g., GPS/location tracking filter level options) and how much to suppress or to not even monitor/record/store in the first place. In some embodiments, the service processor 115 allows the user to provide feedback on the user's preferences, such as for privacy/CRM data to report. In some embodiments, the user can also specify their preference(s) for notification (e.g., related to service usage/cost, traffic reporting and other service usage/monitored information) and/or service controls. In some embodiments, the service monitor agent 1696 observes and possibly records or reports service usage categorized by network possibly including roaming networks, paid service networks or free service networks. In some embodiments, the service monitor agent 1696 observes and possibly records or reports service usage categorized by sub-accounts for various types of traffic or various types of network.

For example, service monitor reports can be provided to the service controller 122. Service is monitored through various embodiments that can involve service usage logging or traffic inspection and usage logging at the application level, various levels in the networking communication stack or the access modem. Some embodiments involve multiple levels of service or traffic measurement at various levels in the communications stack as described further below.

In some embodiments, service or traffic monitoring includes monitoring one or more of the following: traffic associated with one or more users; traffic downstream and/or upstream data rate; total traffic received and/or transmitted over a period of time; traffic transmitted and/or received by IP addresses, domain names, URLs or other network address identifiers; traffic transmitted and/or received by email downloads or uploads; traffic transmitted and/or received by an application; traffic transmitted and/or received by network file transfers; traffic transmitted and/or received by file download or upload content types; traffic transmitted and/or received by mobile commerce transactions; traffic transmitted and/or received by one or more time periods; traffic transmitted and/or received by differing levels of network activity and network capacity availability; traffic transmitted and/or received by one or more delivered levels of quality of service; traffic transmitted and/or received by software downloads; traffic transmitted and/or received by application downloads; traffic transmitted and/or received by one or more activities associated with the service control plane link or other network related functions, or traffic that may not directly result in service usage or service activity that the user values or desires; traffic transmitted and/or received to support one or more service provider third-party service partner offerings; software usage history; application usage history; device discovery history for UI components, applications, settings, tutorials; ads served history; ads visited history; and/or device location history.

In some embodiments, some or all of the service usage monitoring occurs at the application layer. In some embodiments, the service monitor agent 1696 implements traffic inspection points between the applications and the networking stack application interface, such as the sockets API. In other embodiments, the application interface agent 1693 performs traffic inspection and reports the results to the service monitor agent 1696. Traffic inspection can be accomplished in several ways, including, for example, implementing a T-buffer at each socket connection and feeding the side traffic into a traffic flow analyzer, which in combination with a mapping of application to socket provides much of the information listed above. In cases in which it is necessary to obtain traffic information from the application itself, some embodiments call for the application to be adapted to provide the information to either the application interface agent 1693 or the service monitor agent 1696. As an example, the application interface agent 1693 or the service monitor agent 1696 can monitor and decode advertisements downloaded via HTTP, but if the browser and HTTP server employ security above the sockets protocol stack layer then the application interface agent can communicate with the browser via a java applet or some other inter-process communication method. In some embodiments, the service monitor agent 1696, the billing agent 1695 and/or the policy control agent 1692 (or some other software or hardware function on the device) can monitor and/or control (e.g., allow, block and/or replace) advertisement traffic flow into the device. In some embodiments, the monitoring and control of advertisement traffic flow into the device is also used for bill by account purposes (e.g., charges, such as service charges, billed to the advertiser, sponsor, and/or service or transactional service provider).

In some embodiments, some or all of the service usage monitoring occurs below the application interface for the networking stack. In this case, some portion of the information listed above may not always be available due to encryption applied at the higher layers and/or the computational costs associated with performing deep packet inspection on mobile devices.

In some embodiments, the service monitor agent 1696 is also monitors the operating software install or loading systems, and/or otherwise monitors software installs or loads and/or software uninstalls/deinstallations.

Some of the information above may be considered by some users, advocacy groups or agencies as customer sensitive personal information. Simply sending the above information to the network for unspecified purposes may not, therefore, be acceptable for some service providers. However, if the user provides specific approval (e.g., informed consent) for the device, network or service provider to use some or all of the information that may be sensitive for specified purposes, then the user can control the level of information that is used and the purpose the information is used for. Accordingly, various embodiments described herein provide the user with control of what information is used and the purposes it is used for thereby allowing the user adequate control of any such sensitive information. In some embodiments, information that is thought to perhaps be sensitive and is reported to the network must first receive user approval for the reporting. Some basic information is generally not considered sensitive and is necessary for certain basic service provider needs. For example, total data transmitted and/or received, traffic downstream and/or upstream speed, overall traffic usage by time of day are generally not considered private from the service provider's perspective and are necessary in many basic service policy implementations. As additional examples, perhaps other service usage history, such as total traffic email downloads and uploads but not the type of files or any specifics about the email traffic, the total web browsing traffic but nothing specific about the sites visited or content viewed, total file transfer traffic but not the type of files transferred or the addresses involved in the transfer, and other examples may not be viewed as private and, in some embodiments, provide valuable information for the service provider to manage services. Conversely, information such as websites visited, content viewed, mobile commerce transactions completed, advertisements visited, GPS location history and other service usage history the service monitor is capable of recording may be sensitive or private for some users and would thereby benefit from the various embodiments that provide enhanced user control of the reporting of such potentially sensitive or private data. It should also be appreciated that there is an inherent advantage to implementing traffic monitoring, traffic, service monitoring or service control on a device, because it is not necessary to report sensitive information to the network to accomplish many of these service policy implementation objectives.

In some embodiments, the service monitor agent 1696 assists in virtual application tagging of traffic flows through the networking stack policy implementation by tracking the virtually tagged packets through the stack processing and communicating the flow tags to the service policy implementation agent(s) 1690. In some embodiments, the service monitor agent 1696 maintains a history and provides reports or summary reports of which networks in addition to the networks controlled by the service controller 122 to which the device has connected. In some embodiments, this network activity summary includes a summary of the networks accessed, activity versus time per connection, and/or traffic versus time per connection. In some embodiments, the traffic reports that go to the network, possibly to service controller 122, billing system 123 and/or device service history 1618, are first filtered according to rules defined by user preference selection at the time of service activation (e.g., service plan/service plan option selection), time of first device use, at a time the user selected the option on the service UI or at a time the user chose to change the option on the service UI or some other time/mechanism allowing for user preference selection.

In some embodiments, the service monitor agent 1696 monitors application usage (e.g., which application the user executes on the device 100, such as e-mail applications, web browsing applications and/or media content streaming applications). In some embodiments, the service monitor agent 1696 monitors multimedia file usage (e.g., based on multimedia file type and/or based on specific multimedia files, such as specific movies and/or songs). In some embodiments, the service monitor agent 1696 monitors the device user interface, application, and content discovery history (e.g., monitoring which applications/content the user accesses from the device, including monitoring the pattern by which the user accesses such applications/content, such as how the user navigates the user interface on the device to access such applications/content and maintaining such patterns and history, such as which icons the user access on a home page, secondary or other portion/mechanism on the device for accessing various applications/content). In some embodiments, the service monitor agent 1696 monitors advertisements provided to the user on the device 100. In some embodiments, the service monitor agent 1696 monitors advertisements viewed (e.g., accessed, such as by clicking on a web advertisement) by the user on the device 100. In some embodiments, the service monitor agent 1696 monitors GPS/location information for the device 100. As will be appreciated by those of ordinary skill in the art, the service monitor agent 1696 can monitor a wide variety of activities performed by the device/user of the device and/or based on other information related to the device 100 such as GPS/location information. As described herein, in some embodiments, the user of the device 100 can also specify which activities that the user authorizes for such monitoring (e.g., the user may prefer to not allow for such GPS/location monitoring).

In some embodiments, the application interface agent 1693 provides an interface for device application programs. In some embodiments, the application interface agent 1693 identifies application level traffic, reports virtual service identification tags or appends literal service identification tags to assist service policy implementation, such as access control, traffic shaping QoS control, service type dependent billing or other service control or implementation functions. In some embodiments, the application interface agent 1693 assists with application layer service usage monitoring by, for example, passively inspecting and logging traffic or service characteristics at a point in the software stack between the applications and the standard networking stack application interface, such as the sockets API. In some embodiments, the application interface agent 1693 intercepts traffic between the applications and the standard network stack interface API in order to more deeply inspect the traffic, modify the traffic or shape the traffic (e.g., thereby not requiring any modification of the device networking/communication stack of the device OS). In some embodiments, the application interface agent 1693 implements certain aspects of service policies, such as application level access control, application associated billing, application layer service monitoring or reporting, application layer based traffic shaping, service type dependent billing, or other service control or implementation functions.

In some embodiments, application layer based traffic monitoring and shaping can be performed as described below. The traffic from each application can be divided into one or more traffic flows that each flow through a traffic queue, with each queue being associated with one or more additional classifications for that application (e.g., the application can be a browser that is associated with multiple queues representing different destinations or groups of destinations it is connected to, with each destination or group of destinations having potentially different access control or traffic control policies, or the application can be associated with different content types or groups of content types with each content type having different queues, the application might be an email program with email text traffic going to one queue and downloads going to another with different policies for each). In some embodiments, queues are formed for all applications or groups of applications that are associated with one or more traffic parameters such as destination, content type, time of day or groups of applications can be similarly assigned to different queues. The functions performed by the application layer queues can be similar to the functions described for the policy implementation agent, such as pass, block, buffer, delay, burst in order to control the traffic or network access associated with the queue. The drop function can also be implemented, such as for application layer protocols that include reliable transmission methods, but if the application layer protocol does not involve reliable retransmission of lost information this can result in lost data or unreliable communication which may be acceptable in some cases. The manner in which the queues are controlled can be constructed to result in a similar approach for controlling services or implementing service activity control similar to the other embodiments described herein, including, for example, the policy control agent 1692 implementing an higher layer of service control to achieve a higher level objective as discussed herein.

In some embodiments, the application interface agent 1693 interacts with application programs to arrange application settings to aid in implementing application level service policy implementation or billing, such as email file transfer options, peer to peer networking file transfer options, media content resolution or compression settings and/or inserting or modifying browser headers. In some embodiments, the application interface agent 1693 intercepts certain application traffic to modify traffic application layer parameters, such as email file transfer options or browser headers. In some embodiments, the application interface agent 1693 transmits or receives a service usage test element to aid in verifying service policy implementation, service monitoring or service billing. In some embodiments, the application interface agent 1693 performs a transaction billing intercept function to aid the billing agent 1695 in transaction billing. In some embodiments, the application interface agent 1693 transmits or receives a billing test element to aid in verifying transaction billing or service billing.

In some embodiments, a modem firewall 1655 blocks or passes traffic based on service policies and traffic attributes.

In some embodiments, the modem firewall 1655 assists in virtual or literal upstream traffic flow tagging. Although not shown in FIG. 24, in some embodiments, the modem firewall 1655 is located on either side of the modem bus and in some embodiments it is advantageous to locate it on the modem itself.

In some embodiments, the billing agent 1695 detects and reports service billing events. In some embodiments, the billing agent 1695 plays a key role in transaction billing. In some embodiments, the billing agent 1695 performs one or more of the following functions: provides the user with service plan options, accepts service plan selections, provides options on service usage notification policies, accepts user preference specifications on service usage notification policies, provides notification on service usage levels, provides alerts when service usage threatens to go over plan limits or to generate excess cost, provides options on service usage control policy, accepts choices on service usage control policy, informs policy control agent 1692 of user preference on service usage control policy, provides billing transaction options and/or accepts billing transaction choices. In some embodiments, the billing agent 1695 interacts with transaction servers (e.g., open content transaction partner sites 134) to conduct ecommerce transactions with central billing 123.

In some embodiments, service processor 115 includes one or more service usage or service activity counters. For example, the service monitor agent 1696, billing agent 1695 or a combination of these agents and/or other agents/components of service processor 115 can include such a local service usage counter(s) for the device 100. In some embodiments, a service usage counter monitors service usage including data usage to/from the device 100 with the access network 1610. In some embodiments, the service usage counter periodically, in response to a user request, in response to a service processor 115 agent's request (e.g., the billing agent 1695, the policy control agent 1692, or another agent of service processor 115), in response to the service controller 122, and/or in response to the central billing 123 (e.g., for billing purposes and/or for storing in the device service history 1618), provides a service usage report, including monitored service usage for the device 100. In some embodiments, the service usage counter periodically, or in response to a request, synchronizes the service usage counter on the device 100 with a network (and/or billing) service usage counter, such as that maintained potentially at central billing 123. In some embodiments, service processor 115 utilizes the service usage counter to provide a service usage projection. In some embodiments, service processor 115 utilizes the service usage counter to provide a service usage cost estimate. In some embodiments, service usage projections from policy control agent 1692 are used to estimate the projected future service usage if user service usage behavior remains consistent. In some embodiments, service processor 115 utilizes the service usage counter to provide a cost of service usage, and the service processor 115 then periodically, or in response to a request, synchronizes the cost of service usage with, for example, the central billing 123. In some embodiments, the service processor 115 utilizes the service usage counter to determine whether the user is exceeding and/or is projected to exceed their current service plan for data usage, and then various actions can be performed as similarly described herein to allow the user to modify their service plan and/or modify (e.g., throttle) their network data usage. In some embodiments, the service usage counter can support providing to the user the following service usage related data/reports: service usage, known usage and estimated usage, projected usage, present costs, projected costs, cost to roam, cost to roam options, and/or projected roaming costs. For example, including a local service data usage counter on the device 100 allows the service processor 115 to more accurately monitor service data usage, because, for example, network (and/or billing) service usage counters may not accurately also include, for example, control plane data traffic sent to/from the device 100 in their monitored service data usage count.

In some embodiments, verifiable device-based service billing solutions are provided. For example, as described herein, various device-based service billing solutions can include a wide range of verification techniques to ensure that the device is properly reporting service billing events (e.g., to verify/ensure that the service billing is not malfunctioning and/or has not been tampered with/compromised such that it is not accurately or timely providing service billing information). As described herein, service billing generally refers the billing for one or more services for a device, such as device 100 (e.g., email service billing for data usage associated with received/sent email related data over the access network 1610, web browsing service billing for data usage associated with received/sent web browsing related data over the access network 1610 and/or any other network-based service, and/or any transactional based services, such as for multimedia content purchases or other transactions).

In some embodiments, verifiable device-based service billing is provided by sending dummy (/test) billing events, such as having an access control integrity server 1654 of the service controller 122 instruct the access control integrity agent 1694 to send a dummy (/test) billing event to the billing agent 1695. If the billing agent does not then send the expected report, which should reflect the dummy (/test) (or fails to timely send any report), then the system can verify whether the billing process is working properly. In addition, a dummy (/test) transaction can be used to verify transaction based billing through a variety of approaches (e.g., the access control integrity agent 1694 can similarly send a dummy (/test) transactional billing event to the billing agent 1695 as a test to determine whether the billing agent 1695 then provides the expected report reflecting that dummy (/test) transaction). For example, the test billing events can be trapped by a device-assisted billing mediation server and removed from the user account billing.

In some embodiments, verifiable device-based service billing is provided by sending one or more data bursts to the device to confirm that data was received and to confirm that the service monitor agent 1696 properly logged the data burst(s) in the local service usage or service activity counter. In some embodiments, data bursts can be used to verify data throttling (e.g., if the device has exceeded service data usage limits and/or is approaching such limits such that service data usage should be throttled, then sending data bursts can be used to verify whether the expected throttling is properly being performed on the device). In some embodiments, verifiable device-based service billing is provided by submitting requests to connect to an unauthorized service/website to verify if that unauthorized service usage is properly blocked. In some embodiments, verifiable device-based service billing is provided by submitting requests to perform an unauthorized transaction to verify if that unauthorized transaction is properly blocked.

In some embodiments, verifiable device-based service billing is provided by verifying device service activities relative to IPDRs for the device. In some embodiments, the IPDRs for the device (possibly in a modified format) are periodically and/or upon request sent to the device, as described herein. For example, IPDRs for the device can be compared to the device's local service data usage counter and/or to the service plan for the device to determine if the overall service data usage limit has been exceeded, whether out of plan/unauthorized/unrecorded websites/other services have been performed by the device, whether service plan/profile bandwidth limits have been exceeded, whether out of plan/unauthorized/unrecorded transactions have been performed (e.g., verifying IPDR transaction logs, assuming such are included in the IPDRs, with the local transaction logs of the device to determine, for example, whether the local device records indicate that fewer than the network recorded number of content downloads, such as downloaded songs, were purchased), and/or whether any other activities verifiable based on a comparison of IPDRs indicate that the device has been used in any manner that is out of or exceeds the service plan/profile for the device.

In some embodiments, device-based service billing includes recording billing option response history. For example, this approach can be particularly important for service plan overage conditions (e.g., when the use of the device is exceeding the service plan associated with the device in some manner, such as service data usage, bandwidth, service or transaction access and/or in some other manner). In some embodiments, in a service plan overage condition, the user is requested to confirm that user has acknowledged notification of service plan overage, such as via the user interface 1697. In some embodiments, such service plan overage acknowledgements require that the user enter a unique identification to validate authorization by the user identity associated with the device (e.g., another type of verification mechanism, in the event a device is stolen or being used by someone other than the authorized user of the device, then that unauthorized user would not be able to confirm the service plan overage acknowledgement, and appropriate actions can then be taken, such as throttling, quarantining or (temporarily) suspending service/network access). In some embodiments, if the device is compromised/hacked (e.g., by the user of the device), and the device is used in a manner that results in a service usage overage (e.g., determined based on device-assisted service usage monitoring, and/or network-based service usage monitoring using IPDRs/CDRs), then the billing system determines billing for such service usage overage costs. This overage billing can be initiated by the device 100 (e.g., service processor 115), the service controller 122, the billing system 123, the AAA 121, or some other network function. In some embodiments, if the device is compromised/hacked (e.g., by a user of the device), and the device is used in a manner that results in a service usage overage, one or more of the following actions is taken: the user is notified, the user is required to acknowledge the notification, the device traffic is sent to SPAN (or similar traffic sampling and analysis function), and/or the device is flagged for further analysis.

In some embodiments, device-based service billing includes an option to bill by account, such as to bill different service activities and/or transactions to a specified account (e.g., other than the user's account associated with the general service plan for the device). For example, bill by account can provide for billing according to application, content type, website, transaction, network chatter (e.g., heartbeat communications and/or other network traffic that is used by, for example, the central/service provider to generally maintain network access for the device), and/or transaction partner sponsored activities and then report such bill by account information for billing mediation/reconciliation. For example, a bill by account report can be sent by billing agent 1695 from the device to central billing 123 (e.g., as a billing event); or alternatively, sent to an intermediate server/aggregator, which can then reformat and send the reformatted report to central billing 123 (e.g., providing the billing report in a format required by central billing 123); or alternatively, sent to a mediation server, which can re-compute the billing based on the bill by account report (e.g., offset the bill based on network chatter, transaction based billing, transaction partner sponsored activities, content providers, website providers and/or advertising providers) and then send the recomputed (and potentially reformatted) report to central billing 123.

In some embodiments, one or more of the mediation/reconciliation functions for device-assisted billing, device generated billing events, device generated bill by account events and device generated open transaction billing events can be implemented in the service controller 122 (e.g., the billing event server 1662) or in another function located in the billing system 123 or elsewhere. This billing mediation server function accepts the device-based billing events discussed immediately above, reformats the billing events into a format accepted and recognized by the billing system, mediates the billing event information to remove service usage billing from the user account and place it in other bill by account categories as appropriate according to the bill by account mediation rules, adds other billing events for service usage or transactions to the user account as appropriate according to the device-based billing rules, and then applies the information to the billing information the user account to correct or update the account.

For example, a bill by account can allow for a website provider, such as Google or Yahoo, to pay for or offset certain account usage for web browsing, web based searching, web based email, or any other web based or other service usage activities, which may also be based (in whole or in part) on the activities performed by the user on such transactional services (e.g., based on advertisement viewing/accessing or click-through activities by the user, by which an advertisement business model used by such website providers directly or indirectly supports such service account subsidies). As another example, a bill by account can allow for an advertiser to pay for or offset certain account usage for viewing and/or accessing (e.g., clicking through) a web placed advertisement or other advertisement sent via the network to the device. As yet another example, various network chatter (e.g., heartbeat related network and other network chatter related service data usage) can be assigned to a dummy account and such can be used to offset the bill and/or used for tracking the data usage for such activities for the device. In another example, service data usage for access to a transactional service, such as a multimedia content download service (e.g., music, eBook, music/video streaming, and/or movie or other multimedia content download service), or an online shopping site (e.g., Amazon, eBay or another online shopping site), can be billed to a transactional service account assigned to a transactional service partner that sponsors access to that sponsor's transactional service, thereby allowing that transactional service partner to pays for or offset (e.g., subsidize) the account usage for such activities, which may also be based (in whole or in part) on the transactions actually performed by the user on such transactional services (e.g., based on the volume/cost of the multimedia service download purchases by the user and/or online activities).

In some embodiments, device-based service billing includes recording billing events on the device and then reporting such billing to the network (e.g., central billing 123). In some embodiments, device-based service billing includes reporting service usage events and/or applying cost look-up and logging/reporting service billing updates. For example, this allows for reporting not only service usage but also cost of such service usage to the user via the user interface of device 100. Also, for example, the cost of such service usage can also be reported to the billing server. In some embodiments, device-based service billing includes reporting service usage to the network, and the network determines the cost for such service usage.

In some embodiments, billing information for roaming partners is provided. For example, a roaming server can include a roaming service cost data table for roaming service partners. In this example, when the device (e.g., device 100) connects to a roaming network provided by a roaming service partner, then the device can also receive the roaming service data rate based on the roaming service cost data table provided by the roaming server. Alternatively, the roaming server can send the roaming service cost data table (or a modified format of the same) to the device thereby allowing the device to determine the costs for such roaming network service usage or service activity. As described herein, the device can also automatically use a roaming service profile when connecting to the roaming network service and/or the user can be notified of the roaming service profile options based on the roaming service data costs and then select the desired roaming service profile accordingly.

In some embodiments, the user is provided with a list of service costs based on locally stored roaming table and a search of available roaming partners that the device 100 detects and can connect to. In some embodiments, the user is provided with a projected cost per day for one or more roaming service provider options based on typical service usage history and the cost for each service provider. In some embodiments, the user is provided with a set of options for service usage notification, controlling or throttling service usage and/or cost while roaming (e.g., using the service notification and cost control techniques as similarly discussed herein but applied to the roaming network). In some embodiments, these controls are set by a VSP (or, e.g., an IT manager using VSP functions). In some embodiments, roaming tables are updated periodically in the background while on a home network (or other low cost network) and cached. In some embodiments, cache updates occur based on fixed time period (e.g., late at night when updates are less expensive due to network inactivity). In some embodiments, the roaming partner cost table cache updates are done whenever connected to a desirable network that is not as expensive or bandwidth constrained (e.g., at home, work, or off the WWAN). In some embodiments, updates occur at time of day that network is not busy. In some embodiments, updates occur based on network push when roaming table is changed (e.g., one or more of the roaming partners changes the rate). In some embodiments, the service cost to update the roaming service cost table is charged to bill by account and possibly not charged to end user. In some embodiments, the roaming service center is provided as a service that is paid for (e.g., potentially bill by account tracks all related costs). For example, this type of roaming cost control can be provided as a service through central provider, MVNO, roaming partner provider, VSP or as a third-party application not associated with any service provider (e.g., IT manager). For example, the controls for how to update cache, set service control policies, and other controls can be defined by any number of VSP entities including the user through a website service.

In some embodiments, a roaming service center is provided as a service in which, for example, the user is provided with a list of service costs based on a locally stored (or remotely accessed) roaming table. In some embodiments, the roaming service center provides the user with a projected cost per day for one or more roaming service provider options based on typical service usage history and the cost for each service provider. In some embodiments, the roaming service center provides the user with a set of options for controlling/throttling usage and/or cost while roaming. In some embodiments, these controls are set by a VSP (e.g., an IT manager using VSP functions). For example, roaming tables can be updated periodically in the background while on a home network and cached. In some embodiments, cache updates occur based on a fixed time period. In some embodiments, the roaming partner cost table cache updates are done whenever the device is connected to a desirable network that is not as expensive or bandwidth constrained (e.g., at home, work and/or off the WWAN). In some embodiments, updates occur at time of day that network is not busy. In some embodiments, updates occur based on a network push when a roaming table is changed (e.g., one or more of the roaming partners changes the rate). In some embodiments, the service cost to update the roaming service cost table is charged to bill by account and possibly not charged to the user. In some embodiments, the roaming service center is provided as a service that is paid for by the user and/or part of a service plan. In some embodiments, a bill by account function tracks all related costs. For example, the roaming service center can be provided as a service through central provider, MVNO, roaming partner provider, VSP or as a third-party application not associated with any service provider (e.g., IT manager).

In some embodiments, a synchronized local service usage counter based on time stamped central billing information is provided. For example, the local service usage counter, as similarly described above, can also be synchronized to past service usage records (e.g., time stamped central billing records of service usage for the device) and use local estimates for current/present service usage estimates for the device. In this example, the central billing system (e.g., central billing 123) can push the time stamped central billing information to the device (e.g., device 100), the device can pull the time stamped central billing information, and/or an intermediate server can provide a mediated push or pull process. In some embodiments, synchronization is performing periodically based on service usage levels with free-running estimates between synchronizations.

In some embodiments, service usage is projected based on calculated estimates of service usage based on synchronized service usage and local service usage count information. For example, projected service usage can be calculated on the device or calculated on a server (e.g., a billing server or an intermediate billing server), which provides the calculated projected service usage information to the device, such as using various adaptive algorithms for service usage projections. For example, an adaptive algorithm can use historical/past synchronized network service usage information (e.g., synchronized with local service usage data based on time stamps associated with IPDRs) to assist in service usage projections, based on, for example, total service usage count, service usage count by certain service related criteria (e.g., application, content, service type, website and/or time of day). In another example, an adaptive algorithm synchronizes to past service usage data (e.g., the local estimate of past service usage data is updated to be synchronized up through the point in time associated with the latest IPDR time stamp that has been received) and current local estimates of service usage collected since the latest time stamp are then added to the time stamped IPDR service usage counter to minimize the service usage counter offset so that it is no greater than the difference between the network service usage measure and the local service usage measure since the latest IPDR time stamp. In some embodiments, these adaptive algorithm techniques are performed on the device and/or performed on the network (e.g., on a network server) for processing. In some embodiments, if there is an offset in the local device-based service usage count between IPDR synchronization events and the IPDR service usage count between IPDR synchronization events, then an algorithm can be employed to estimate any systematic sources for the offset and correct the local service usage count to minimize the offsets. As an example, if the IPDR service usage count is typically off by a fixed percentage, either high or low, then an algorithm can be employed to estimate a multiplier that is applied to the local service usage count to minimize the offset between IPDR service usage synchronization events. In another example, there can be a consistent constant offset and a multiplier offset, both of which can be estimated and corrected for. Those of ordinary skill in the art will appreciate that more sophisticated algorithms can be employed to estimate the nature of any systematic offsets, including, for example, offsets that occur due to specific service usage activities or network chatter to manage the device, and such offsets can then be minimized between IPDR service synchronization events. In some embodiments, synchronized service usage data is used to create an improved analysis of the statistical patterns of service usage to provide more accurate service usage projections. Those of ordinary skill in the art will also appreciate that a variety of additional adaptive algorithm techniques can be used including those that provide for various statistical analysis techniques and/or other techniques.

In some embodiments, service usage is projected for the end of a billing/service period for a service plan versus the service usage allowed under the service plan for that billing/service period. A display of excess charges is also provided for the projected rate of service usage based on the monitored service usage behavior through the end of the billing/service period (e.g., this can be zero if the service usage is projected to be less than that allowed under the service plan and a positive cost number if it is projected to be more than the service plan). For example, this can be implemented in numerous ways, such as on a server in the network, on a gateway/router/switch in the network, and/or on the device, as discussed below and generally described herein with respect to other service/cost usage monitoring and notification embodiments. If implemented in the network server or gateway/router/switch, then the service/cost usage projections and related information can be pushed to the device, or the device can be notified that such information is available to pull and/or periodically pushed/pulled. The service usage information/estimates can be collected from the device, the network or both (e.g., reconciled and/or synchronized) as similarly described herein. The service usage information/estimates are then analyzed to determine service usage/cost projects as similarly described herein and compared to the service plan for the device to determine the projected service/cost usage overage (if any). In some embodiments, one or more of the following are determined by, reported to and/or displayed on the device: service usage value, projected service usage value, service usage plan limit, projected service usage overage, projected service cost overage, service plan period time duration, service plan time remaining before end of period and/or other pertinent information.

In some embodiments, the device also determines service costs based on the synchronized service usage count thereby allowing the device to also report the service cost information to the user. For example, the device can locally store a service cost look-up table(s), locally store different service cost look-up tables for different networks and/or for roaming networks, and/or request such information from a billing or intermediate billing server (and/or a roaming server) on the network. As another example, the device can obtain the calculated service costs based on the synchronized local service usage count and/or network service usage count from an intermediate server (e.g., a billing or intermediate billing server) thereby offloading the computational costs associated with calculated these projections and the data storage for service cost lookup tables onto the intermediate server on the network using the network service usage counter with or, alternatively, without the synchronized local service usage counter.

In some embodiments, service usage count categorization by network (e.g., a home network (such as a Wi-Fi, WAN, femtocell or other home network) versus a roaming network) is provided. Similarly, the synchronized local service usage counter can be synchronized by network. Also, a synchronized local service usage count for networks controlled by a central provider, for networks controlled by other providers (e.g., MVNO), and/or free networks can similarly be provided.

In some embodiments, a service notification and billing interface is provided. For example, service usage and projected service usage, such as described herein, can be displayed to the user of the device (e.g., via user interface 1697). Similarly, expected/projected service or cost overrun/overage, such as described herein, can also be displayed to the user. As another example, a most cost effective plan can be determined/projected based on historical and/or projected service usage, and this determined/projected most cost effective plan can be displayed to the user. In yet another example, a list of available networks accessible by the device can be displayed to the user. In this example, one or more undesired available networks can also be blocked from display thereby only displaying to the user desired and/or preferred available networks. In this example, service usage plans and/or service usage plan option comparison for one or more alternative networks or roaming networks can also be displayed to the user. Similarly, service cost plans and/or service/cost plan option comparison for one or more alternative networks or roaming networks can also be displayed to the user. In addition, roaming service usage, projected roaming service usage, estimated roaming service cost, and/or projected estimated roaming service cost can also be displayed to the user. These roaming service usage/costs can also be displayed to the user so that the user can utilize this information for selecting various roaming service billing options. In another example, alternative and/or least cost networks are determined and displayed to the user. In another example, alternative warnings are displayed to the user for any or specified roaming networks.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to the billing server (e.g., central billing 123). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

In some embodiments, an online portal or web server is provided for allowing the user to select and/or update policy settings. For example, user input provided via the online portal/web server can be recorded and reported to the billing server (e.g., central billing 123). In another example, the online portal/web server can display transaction billing information and/or accept input for a transaction billing request, which can then be reported to the billing server accordingly.

As shown in FIG. 24, the service processor 115 includes a service interface or user interface 1697. In some embodiments, the user interface 1697 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 1697 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 123 can be used to synchronize local service usage counters and service monitor agent 1696 information to perform real-time updating of local service usage counters between billing system 123 synchronizations. As another example, the user interface 1697 can display options and accept user preference feedback, such as similarly discussed above with respect to user privacy/CRM/GPS filtering, traffic monitoring and service controls. For example, the user interface 1697 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 1697 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO, VSP, service provider partner, and/or other "entity" in a manner specified or influenced by the user to maintain the user's desired level of information privacy.

As shown in FIG. 24, the service processor 115 includes the service downloader 1663. In some embodiments, the service downloader 1663 provides a download function to install or update service software elements on the device. In some embodiments, the service downloader 1663 requires a secure signed version of software before a download is accepted. For example, the download can require a unique key for a particular service downloader 1663. As another example, the service downloader 1663 can be stored or execute in secure memory or execute a secure memory partition in the CPU memory space. Those of ordinary skill in the art will appreciate that there are a variety of other security techniques that can be used to ensure the integrity of the service downloader 1663.

Figure 26:
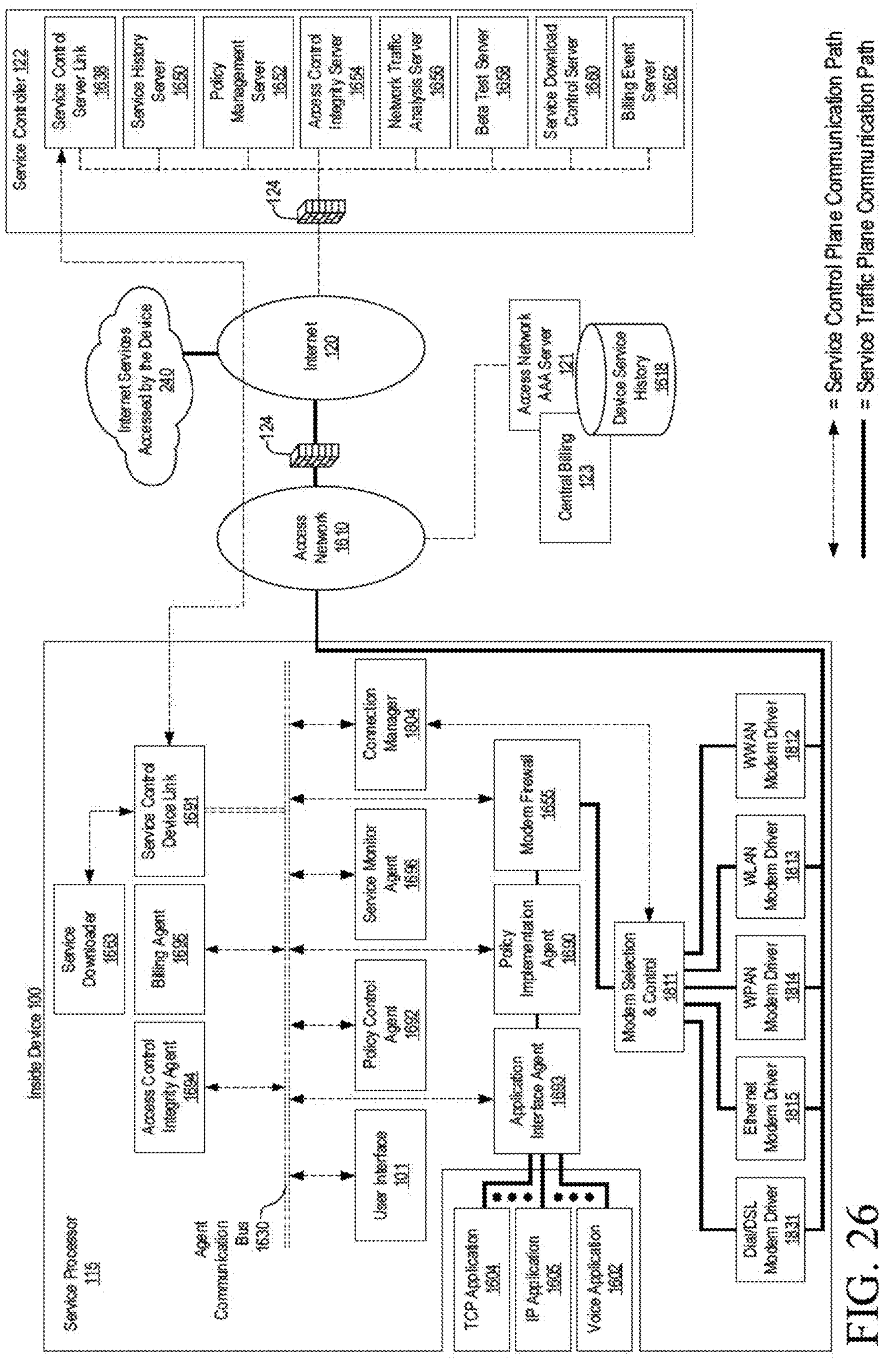
FIG. 26 is another functional diagram illustrating the device-based service processor and the service controller in which the service processor controls the policy implementation for multiple access network modems and technologies in accordance with some embodiments.

As shown in FIG. 24, the service processor 115 includes a modem driver 1640. In some embodiments, the modem driver 1640 converts data traffic into modem bus (not shown) traffic for one or more modems via the modem firewall 1655. As shown in FIG. 26, in some embodiments, modem selection and control 1811 selects the access network connection and is in communication with the modem firewall 1655, and modem drivers 1831, 1815, 1814, 1813, 1812 convert data traffic into modem bus traffic for one or more modems and are in communication with the modem selection and control 1811. As shown in FIG. 29, in some embodiments, modems 2141, 2125, 2124, 2123, 2122, which are in communication with the modem bus 2120, connect the device to one or more networks. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider (e.g., as described herein with respect to FIG. 57) or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (potentially for higher service payments) than other users). As another example, ambient services (as similarly described herein) can be provided for the hotspot for verified service processors.

Figure 110:
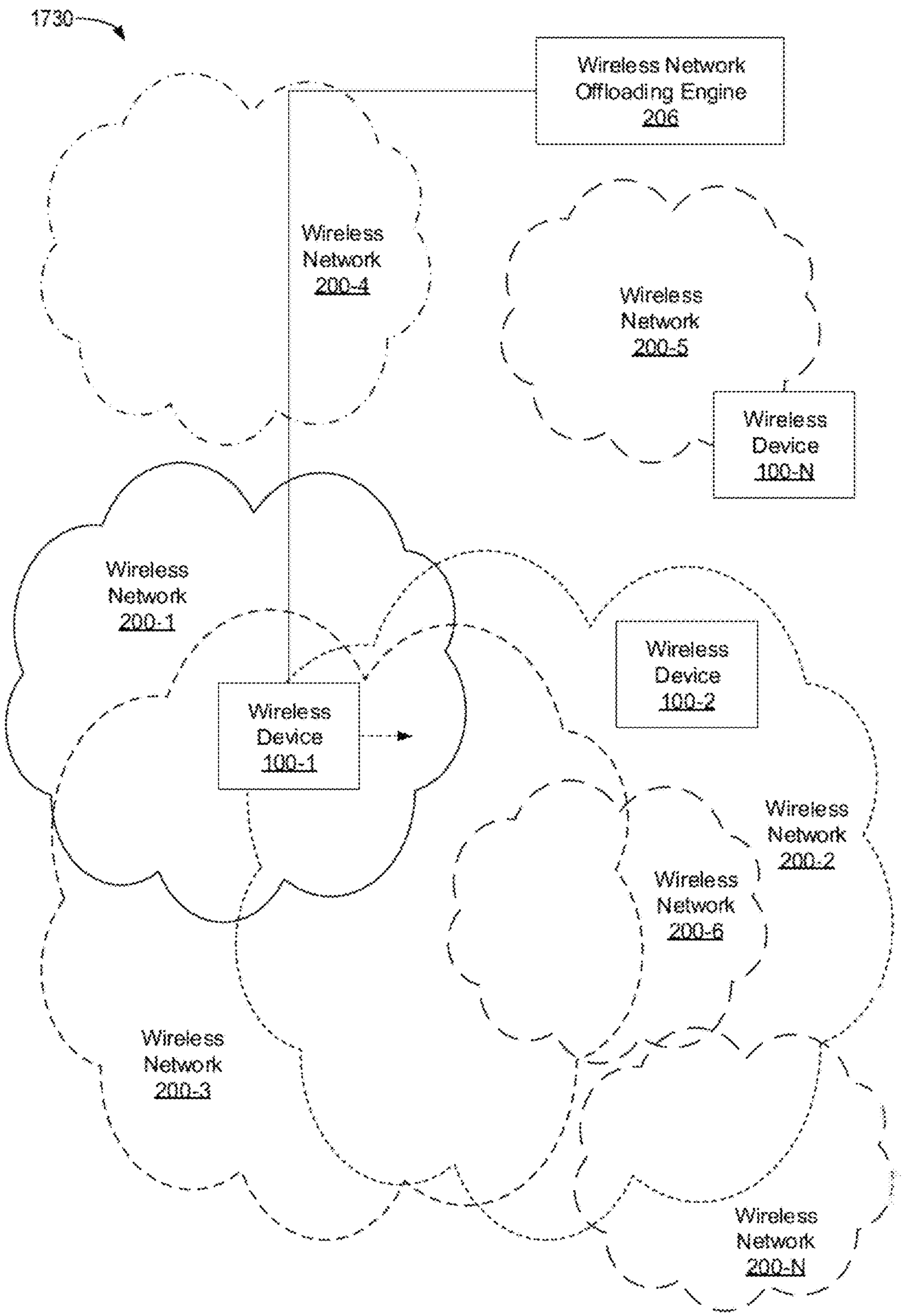
FIG. 110 illustrates a diagram of an example of a system including a wireless network offloading engine.

FIG. 110 depicts a diagram of a system 1730 including a wireless network offloading engine 206. The system 1730 includes wireless devices 100-1 to 100-N (referred to collectively as the wireless devices 100), wireless networks 200-1 to 200-N (referred to collectively as the wireless networks 200), and a wireless network offloading engine 206.

The wireless devices 100 can be implemented as stations. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit (i.e., a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made.

In alternative embodiments, one or more of the wireless devices 100 may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

The wireless networks 200 will typically include an internetworking unit (IWU) that interconnects wireless devices on the relevant one of the wireless networks 200 with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station.

The wireless networks 200 can be implemented using any applicable technology, which can differ by network type or in other ways. The wireless networks 200 can be of any appropriate size (e.g., metropolitan area network (MAN), personal area network (PAN), etc.). Broadband wireless MANs may or may not be compliant with IEEE 802.16. Wireless PANs may or may not be compliant with IEEE 802.15. The wireless networks 200 can be identifiable by network type (e.g., 2G, 3G, 4G, and Wi-Fi), service provider, WAP/base station identifier (e.g., Wi-Fi SSID, base station and sector ID), geographic location, or other identification criteria.

The wireless networks 200 may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 110, the wireless network offloading engine 206 is coupled to the wireless device 100-1. In a specific implementation, the wireless network offloading engine 206 is implemented on a server and is coupled to the wireless device 100-1 through the Internet. However, at least a portion of the wireless network offloading engine 206 can alternatively be implemented on the wireless device 100-1, with or without a connection to a server that includes another portion (e.g., a server portion) of the wireless network offloading engine 206.

In an example of operation, periodically, occasionally, or when instructed, the wireless device 100-1 performs an available network characterization scan (ANCS) on one or more of the wireless networks 200. Other devices, such as the wireless device 100-2 or some other station, may or may not also perform an ANCS. The ANCS can be used to characterize available performance for each network (e.g., data rate, bit rate variability, latency, latency jitter, quality of service (QoS), response time, etc.).

Some objective criteria for measuring performance exist (e.g., throughput). Intelligent network monitoring can enable real-time monitoring of network service usage (e.g., at the packet level/layer, network stack application interface level/layer, and/or application level/layer) of the wireless network (e.g., radio access networks and/or core networks)

and to effectively manage the network service usage for protecting network capacity (e.g., while still maintaining an acceptable user experience). Using Device Assisted Services (DAS) techniques, and in some cases, network assisted/based techniques, to provide for network service usage monitoring of devices, network carriers/operators would be provided greater insight into what devices, which users and what applications, and when and where network congestion problems occur, enabling operators to intelligently add additional resources to certain areas when necessary (e.g., offloading data traffic onto femto cells or WiFi hotspots and adding more network resources), to differentially control network service usage, and/or to differentially charge for network service usage based on, for example, a network busy state, for protecting network capacity.

Performance need not be based on network performance alone. For example, a subscriber may be interested in economic performance (e.g., price). Accordingly, in this paper, performance is sometimes characterized using a cost function that can include various parameters, including network performance, economic performance, reliability, and/or other parameters that are indicative of preferences of a user or service provider. Where a particular type of performance is applicable, the meaning can be made explicit (e.g., by making reference to "network performance" as opposed to simply "performance") or can be derived from context.

The wireless device 100-1 generates an ANCS report using results of the ANCS in order to characterize available performance for each scanned network of the wireless networks 200. The ANCS report can also include an identification of currently available networks for the wireless device 100-1, location, time, and potentially some performance characterization. The wireless device 100-1 makes the ANCS report available to the wireless network offloading engine 206. The wireless device 100-1 can also make device-specific information available, such as location, performance thresholds, a motion trace, knowledge about other devices or interference, a performance history, applications (e.g., a VoIP or streaming media application), device-specific rules related to when the device will link to a network or offload (e.g., based on reliability, performance state, congestion state, QoS, incentive state, et al.), or a cost function (e.g., based on signal strength, channel strength, basic radio bit rate, network speed, network throughput, speed jitter, throughput jitter, network delay, delay jitter, network availability, network reliability in access grant percentage, network reliability in delay in access grant, variation in performance as a function of position, et al.). Alternatively, some device-specific information may or may not be shared with the wireless network offloading engine 206, and used to customize a priority list or multi-dimensional network map that is generated or received at the wireless device 100-1.

The wireless network offloading engine 206 generates a multi-dimensional network map from the ANCS report and/or other data that is known to the wireless network offloading engine 206. The wireless network offloading engine 206 can provide the multi-dimensional network map to the wireless device 100-1, from which the wireless device 100-1 can generate or modify a wireless operation instruction set. Alternatively, the wireless network offloading engine 206 can generate an instruction set from the multi-dimensional map, which it makes available to the wireless device 100. The instruction set can be an implementation of a general algorithm that is customized by the wireless device 100-1 after it is received, or the instruction set can be generated specifically for the wireless device 100-1 or a set of devices that includes the wireless device 100-1, to be executed on-device in accordance with device-specific parameters (e.g., power saving settings, location, time of day, etc.). Advantageously, the wireless device 100-1 is able to use the instruction set to enable intelligent offloading of the wireless device 100-1 from one of the wireless networks 200 to another. In some embodiments, the wireless device 100-1 is capable of modifying the multi-dimensional network map before making a network selection decision. The wireless network offloading engine may provide one or more parameters and/or algorithms to the wireless device 100-1 for making the network selection decision.

Differential network access control for protecting network capacity includes applying policies to determine which network a service activity should be connected to (e.g., 2G, 3G, 4G, home or roaming, WiFi, cable, DSL, fiber, wired WAN, and/or another wired or wireless or access network), and applying differential network access control rules (e.g., traffic control rules) depending on which network to which the service activity is connected. In some embodiments, differential network access control for protecting network capacity includes differentially controlling network service usage activities based on the service usage control policy and a user input (e.g., a user selection or user preference). Depending upon the implementation, network service usage control policy can consider availability of alternative networks, policy rules for selecting alternative networks, network busy state or availability state for alternative networks, specific network selection or preference policies for a given network service activity or set of network service activities, to name several.

In a specific implementation, the wireless device 100 aides in determining (e.g., measuring and/or characterizing) a network busy state experienced by the device (e.g., which can be used to determine the network access control policy for one or more network capacity controlled services). For example, the network busy state experienced by the device can be recorded by the device and included in a network busy state report that is sent to a network element/function (e.g., a wireless network offloading engine 206 as described herein). The network busy state report can include, for example, data rate, average throughput, minimum throughput, throughput jitter, latency, latency jitter, bit error rate, data error rate, packet error rate, packet drop rate, number of access attempts, number of access successes, number of access failures, QoS level availability, QoS level performance, variability in any of the preceding parameters, and/or the historic statistics of any of the preceding parameters, to name several by way of example. The network busy state report can include, for example, 2G, 3G, 4G or WiFi base station ID, SSID, cell sector ID, CDMA ID, FDMA channel ID, TDMA channel ID, GPS location, and/or physical location to identify the edge network element that is associated with the network busy state report to a network element, to name several by way of example. In a specific implementation, the network busy state is monitored by one or more network elements that can measure and/or report network busy state (e.g., wireless network offloading engine 206, BTS, BTSC, access point, base station monitor, and/or airwave monitor).

As a clarifying example embodiment, the wireless device 100 (e.g. a network performance characterization software or hardware agent on the device) acts in conjunction with a network element (e.g. a wireless network offloading engine 206) to characterize the network busy state of an alternative network access point or base station resource. In such embodiments the device can sense an available alternative network, connect to a network element (e.g. a wireless network offloading engine 206) through the alternative network, conduct a download and/or upload sequence during which the network performance is monitored, and then cause the performance to be characterized and recorded. The performance can be characterized by the network element (e.g. a wireless network offloading engine 206), by the wireless device 100 (e.g. a network performance characterization software or hardware agent) or by both.

As another clarifying embodiment, the wireless device 100 (e.g. a network performance characterization software or hardware agent on the device) can sense an available alternative network, connect to the alternative network, allow the user to use the network connection services, monitor the resulting network performance and record the performance results.

In a specific implementation, one or more of the wireless devices that use wireless services on the one or more main networks and/or alternative networks are used as described herein to collect alternative network performance, busy state and/or QoS state information.

In a specific implementation, the main networks and/or alternative networks can be monitored and characterized by devices that are permanently located in the vicinity of one or more alternative network base stations or access points and configured to communicate with a wireless network offloading engine 206. A permanently located mobile terminal can provide network monitors for reporting, for example, network busy state, to a central network element, such as the wireless network offloading engine 206, which can, for example, aggregate such network busy state information to determine network busy state for one or more network coverage areas.

For example, airwave monitors and/or base station monitors can be provided to facilitate a reliable characterization of network busy state in a coverage area of one or more base stations and/or base station sectors and/or WiFi access points, such as affixed mobile terminals (e.g., trusted terminals that can include additional network busy state monitoring and/or reporting functionality) installed (e.g., temporarily or permanently) in the coverage area of one or more base stations and/or base station sectors (e.g., in which a sector is the combination of a directional antenna and a frequency channel) so that the mobile terminals perform network busy state monitoring and reporting to the wireless network offloading engine 206, the local base station, and/or other network element(s)/function(s). In some embodiments, the permanently affixed mobile terminals provide network monitors for reporting, for example, network busy state (or performance, reliability or QoS), to a central network element, such as the wireless network offloading engine 206, which can, for example, aggregate such network busy state information to determine network busy state for one or more network coverage areas. In some embodiments, the mobile terminals are always present in these locations where installed and always on (e.g., performing network monitoring), and can be trusted (e.g., the mobile terminals can be loaded with various hardware and/or software credentials). For example, using the mobile terminals, a reliable characterization of network busy state can be provided, which can then be reported to a central network element and aggregated for performing various network busy state related techniques as described herein with respect to various embodiments.

In a specific implementation, the wireless network offloading engine 206 uses the network busy state reports (or performance reports or QoS reports) from user devices and/or permanent mobile terminals connected to the same alternative network to determine the network busy state for an alternative network edge element connected to the device.

In some embodiments, network element/function (e.g. a wireless access point or base station) sends a busy state report for the network edge element to the device (e.g., and to other devices connected to the same network edge element), which the device can then use to implement differential network access control policies (e.g., for network capacity controlled services) based on the network busy state. In some embodiments, a network busy state is provided by a network element (e.g., wireless network offloading engine 206 or service cloud) and broadcast to the device (e.g., securely communicated to the wireless device 100).

In some embodiments, the wireless device 100 (e.g., a network performance characterization software or hardware agent) selects the access network connection in accordance with a network service profile setting that determines which network the device should choose between available alternative WWAN, WLAN, WPAN, Ethernet and/or DSL network connections. This choice can be based on the performance, reliability, busy state or QoS capability of one or more alternative networks. The characterization of the alternative networks can be based on end-to-end performance, and not just the over the air or radio frequency performance. For example, service profile settings can be based on the performance of the actual access network (e.g., home DSL/cable, coffee shop, shopping center, public Wi-Fi hot spot or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the wireless network offloading engine 206 can sit in a service provider cloud or an MVNO cloud, the service controls can be provided by a VSP capability offered by the service provider or the wireless network offloading engine 206 can be owned by the hotspot service provider that uses the wireless network offloading engine 206 on their own without any association with an access network service provider.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased form the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network-based billing (or in some embodiments the service controller 122 billing event server 1622 in the case of device-based billing) the billing plan code for the new Internet, email and SMS service. In some embodiments, this code is cross-referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 24, the service controller 122 includes a service control server link 1638. In some embodiments, device-based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 24, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function. As discussed below, various embodiments described herein for the service control server link 1638 provide an efficient and secure mechanism for transmitting and receiving service policy implementation, control, monitoring and verification information between the device agents (e.g., service processor agents/components) and other network elements (e.g., service controller agents/components).

In some embodiments, the service control server link 1638 can employ the counterpart service control plane secure transmission methods discussed above with respect to the service control device link 1691. For example, one or more layers of security can be used to secure the communications link, including, for example, basic IP layer security, TCP layer security, service control link layer security, and/or security specific from service controller servers to service processor agents.

In some embodiments, the service control server link 1638 reduces network chatter by efficiently transmitting service control related communications over the link. For example, the service control server link 1638 can transmit server messages asynchronously as they arrive. As another example, the service control server link 1638 can perform collection or buffering of server messages between transmissions. As another example, the service control server link 1638 can determine when to transmit based potentially on several parameters, such as one or more of: periodic timer trigger, waiting until a certain amount of service usage or traffic usage has occurred, responding to a service agent message, responding to a service agent request, initiated by one or more servers, initiated by a verification error condition, and/or initiated by some other error condition. For example, once a transmission trigger has occurred, the service control server link 1638 can take all buffered agent communications and frame the communications. In addition, the service control server link 1638 can provide for an efficient communication link based on various embodiments related to the timing of transmissions over the service control link, as similarly discussed above with respect to the service control device link 1691 description. For example, the timing functions, such as asynchronous messages or polling for messages, constant frequency transmission, transmission based on how much service usage or data traffic usage has taken place, transmission in response to device side control link message, service verification error events, other error events, and/or other message transmission trigger criteria can be determined, controlled and/or initiated by either the device side or the network side depending on the embodiment.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

In some embodiments, the service control server link 1638 includes the agent heartbeat function in which the agents provide certain required reports to the service processor for the purpose of service policy implementation verification or for other purposes. For example, the heartbeat function can also be used to issue queries or challenges, messages, service settings, service control objectives, information requests or polling, error checks and/or other communications to the agents. As another example, agent heartbeat messages can be in the open or encrypted, signed and/or otherwise secured. Additional heartbeat function and the content of heartbeat messages can be provided as similarly described herein, such as described above with respect to the service control device link 1691 and the access control integrity agent 1694 and other sections. In some embodiments, the service controller 122 and/or agents of the service controller 122 are programmed to periodically provide reports, such as upon a heartbeat response (e.g., an agent can repeatedly send necessary reports each heartbeat), and appropriate actions can then be taken based upon such received reports. Accordingly, the heartbeat function provides an important and efficient system in various embodiments described herein for verifying the service policy implementation and/or protecting against compromise events. There are many other functions the agent heartbeat service can perform many of which are discussed herein, while many others will be apparent to one of ordinary skill in the art given the principles, design background and various embodiments provided herein.

In some embodiments, the service control server link 1638 also provides a service control software download function for various embodiments, which, for example, can include a download of new service software elements, revisions of service software elements, and/or dynamic refreshes of service software elements of the service processor 115 on the device. In some embodiments, this function is performed by the service control server link 1638 transmitting the service control software as a single file over the service control link. For example, the file can have encryption or signed encryption beyond any provided by the communication link protocol itself for service control link 1653. In another example, the service control software files can be segmented/divided into smaller packets that are transmitted in multiple messages sent over the service control link 1653. In yet another example, the service control software files can be transmitted using other delivery mechanism, such as a direct TCP socket connection from a service download control server 1660, which can also involve secure transport and additional levels of encryption. In some embodiments, the service control server link 1638 and/or service download control server 1660 use(s) an agent serial number and/or a security key look up when agents are updated and/or when a dynamic agent download occurs.

As shown in FIG. 24, the service controller 122 includes an access control integrity server 1654. In some embodiments, the access control integrity server 1654 collects device information on service policy, service usage, agent configuration and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122) verifies device service policy, and the verification error conditions that can indicate a mismatch in service measure and service policy include one or more of the following: unauthorized network access (e.g., access beyond ambient service policy limits); unauthorized network speed (e.g., average speed beyond service policy limit); network data amount does not match policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy.

In some embodiments, the access control integrity server 1654 (and/or some other agent of service controller 122) verifies device service policy based at least in part on, for example, various error conditions that indicate a mismatch in service measure and service policy. For example, various verification error conditions that can indicate a mismatch in service measure and service policy include one or more of the following: mismatch in one service measure and another service measure; agent failure to report in; agent failure to respond to queries (e.g., challenge-response sequence and/or expected periodic agent reporting); agent failure to respond correctly to challenge/response sequence; agent improperly configured; agent failure in self checks; agent failure in cross-checks; unauthorized agent communication or attempted unauthorized communication; failure in service policy implementation test; failure in service usage reporting test; failure in service usage billing test; failure in transaction billing test; failure in download sequence; environment compromise event, such as unauthorized software load or execution (or attempt), unauthorized memory access (or attempt), unauthorized agent access (or attempt), known harmful software, and/or known harmful communications signature; and/or failure to respond to various messages, such as send message and suspend and/or send message and quarantine. In some embodiments, the access control integrity server 1654 (and/or some other agent of service controller 122) verifies device service policy by performing automated queries and analysis, which are then reported (e.g., anomalous/suspicious report results can be reported for further analysis by a person responsible for determining whether such activities indicate out of policy activities or to provide information to the user to inform the user of such anomalous/suspicious report results that may indicate out of policy activities). For example, the user can review the report to authorize whether such activities were performed by the user (e.g., website access requests, specific transactions, and/or phone calls) and/or indicate that such activities were not authorized by the user (e.g., indicate a potential compromise of the device, such as by malware or other unauthorized software/user use of the device). In another example, the user can also be connected to communicate with service support of the service provider regarding such reported activities (e.g., by text/chat, voice/phone, and/or video conference to a service support). Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

In some embodiments, upon detection of one or more service verification errors, such as the various service verification errors discussed above, the device is directed to a quarantine network status in which the device can, for example, only access network control plane functions, billing functions, and other functions generally controlled by the access network service provider or the central service provider. For example, quarantine network access restrictions and routing can be accomplished with the access network AAA and routing system (e.g., access network AAA server 121 and one or more of the gateways 410, 420, 508, 512, 520, 608, 612, 620, 708, 712, 720) or can be accomplished with device-based access control or traffic control policy implementation. Quarantine network equipment or servers can, for example, be located within the access network or within another network with access to the access network. Communication with the quarantine network infrastructure can be accomplished, for example, with a secure link with one or more encryption levels or a dedicated private link. In some embodiments, quarantining a device includes, for example, a two step process for routing quarantine network device traffic, first, to a quarantine traffic handling router or server and, second, from there to the actual quarantine network infrastructure, with the route being determined by device parameters, user parameters, access service provider parameters or other parameters associated with the quarantine network routing. In some embodiments, the device is completely suspended from the network in which, for example, the device can first issue a user interface message to the user or issuing another form of a message to the user or service subscriber, such as via email, hard copy message and/or voice message. In some embodiments, the device network access, service capabilities and/or traffic shaping are limited, partially restricted or completely restricted, service capabilities. For example, these limitations and/or restrictions can be implemented in the device and/or in the network. For example, implementing a device quarantine (e.g., using a RADIUS server to quarantine the device) can involve assigning the device to a different billing profile.

In some embodiments, upon detection of one or more service verification errors, such as the various service verification errors discussed above, switch-based port analysis is performed to further monitor the device (e.g., referred to as Switched Port Analyzer (SPAN) on Cisco switches, and various other vendors have different names for it, such as Roving Analysis Port (RAP) on 3Com switches). In some embodiments, the device service policy implementation behavior is monitored at a deeper level in the network by copying device traffic in the switch so that it goes to both an intended data path destination and to a specified port for switch-based port analysis (e.g., the traffic content can be analyzed and recorded using deep packet inspection (DPI) techniques, which can provide a finer level of detail than the typical IPDR). For example, an advantage of performing a switch-based port analysis function is that the traffic need not be analyzed in real time, and a sample subset of the devices on the network can be selected for such analysis based on, for example, either identifying devices that have suspect service policy implementation behavior and/or a regular sampling algorithm that eventually samples all devices, or some other selection approaches. As another example, a scheduled switch-based port analysis sampling can be applied that eventually rotates through all devices and designates a higher priority in the sampling queue for devices that are suspect.

In some embodiments, switch-based port analysis allows for off-line sampled or non-real-time DPI, as described above, as a verification measure for the device-based service control measures that are implemented. In some embodiments, sophisticated DPI techniques are used to enhance the content of the IPDRs so that they provide detailed information that can be made available in the network. For example, some of the DPI packet analysis may be redundant between the device and the network, but this approach provides for a much finer grain validation for the device-based service and less reliance on the device for some of the service traffic analysis that service providers need. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that the network level traffic inspection is accomplished in, or in one or more servers integrated to operate in a coordinated manner with the DPI boxes. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that provides deep service control capability (e.g., using DPI techniques) for devices that have some or all of the service processor functions installed and, in some embodiments, also providing coarser network control of the basics for devices that do not have a service processor installed in the device (e.g., such coarser network control functions include max data rate and/or max total data).

In some embodiments, the SPAN function is used in a revolving periodic manner as well to augment CDR data with deeper packet information for the purpose of spot-checking device-based service usage measures. Examples of where this can be beneficial include spot checking network address access policies, spot checking ambient access policies, spot checking billing event reports, spot checking intermediate networking device/end-point device count (via checking network source or destination addresses, token, cookies or other credentials, etc.). For example, the periodic SPAN can be scheduled for all devices equally, for certain devices or users with higher priority, frequency or depth of SPAN than others, higher priority, higher frequency or immediate priority for devices with higher usage patterns or unusual usage patterns, immediate or very high priority for devices with a policy violation status.

In some embodiments, a combination traffic inspection and service control approach implements traffic and service control functions in the network that are conducive for a network-based implementation and implements traffic and service control functions in the device that are either more conducive for performing in the device or can only be performed in the device (e.g., activities involving inspection of traffic that is encrypted once it is transmitted to the network). For example, using this approach, activities that can be done in the network are generally performed in the network and/or are more efficiently performed in the network than the device, and activities that are more efficiently performed in the device or can only be performed in the device are performed in the device (e.g., depending on device processing/storage capabilities and/or other design/ security considerations). For example, the following are various traffic and service control functions that, in some embodiments, are preferably or can only be performed in the device: network-based packet processing capability limitations (e.g., encrypted traffic, application layer information unavailable once the traffic goes into the networking stack, other application/usage context information available on the device but not in the network); information that is generally/preferably maintained and processed locally in the device for network neutrality reasons (e.g., network neutrality issues can generally be efficiently implemented by keeping all, substantially all or at least some aspect of decisions on how to implement algorithms to control traffic local to the device and under user decision control, and/or by providing the user with a set of pre-packaged choices on how to manage service usage or service activity usage or manage service usage versus service cost or price); information that is generally/preferably maintained and processed locally in the device for user privacy reasons (e.g., deeper levels of traffic monitoring and service usage monitoring data where it is available for assisting the user in achieving the best, lowest cost experience and implementing a CRM filter function to the user so that the user can control the level of CRM the network is allowed to receive, such as with the higher levels of information being exchanged for something of value to the user, and/or user location information); information that is generally/preferably maintained and processed locally in the device for the purpose of informing the user of service control settings or service activity usage or to adjust service activity control settings or receive user feedback to choices regarding service usage policies or billing options (e.g., providing the user with a UI for the purpose of monitoring an estimate of service usage and/or notifying the user of at least some aspect of estimated service usage or projected service usage, providing the user with a UI for the purpose of monitoring an estimate of service cost and/or notifying the user of at least some aspect of estimated service cost or projected service cost, providing the user with a UI for the purpose of providing the user with one or more service usage and/or service cost notification messages that require user acknowledgement and/or a user decision and obtaining or reporting the user acknowledgements and/or decisions, providing the user with a UI for the purpose of providing the user with service options and/or service payment options, providing the user with a UI for the purpose of obtaining user choice for such options when service usage or cost estimates are about to run over limits or have run over limits or are projected to run over limits, providing the user with a UI for the purpose of monitoring or conducting open central billing transactions or other transactions, providing the user with a UI for the purpose of selecting the service control techniques and/or policies and/or algorithms and/or pre-packaged configurations that can be used to define or partially define the service activity usage control policies implemented in the device service processor or the network service control equipment/billing system or a combination of both); service control for roaming on different networks that typically do not have compatible DPI-type techniques with the home network; certain service notification and traffic control algorithms (e.g., stack-ranked activity statistical analysis and control of only the high usage activities); and/or a function for assigning a device to a service experience or ambient activation experience or virtual service provider (VSP) at various times from manufacturing to device distribution to a user of the device. In some embodiments, certain activities are implemented in the device as a solution for networks in which a new centralized DPI approach is not possible, not economically feasible, or for any number of reasons not an option or not a preferred option.

In some embodiments, a network-based solution is provided for a more basic set of services for all devices that do not have service control capabilities, and a super-set of services and/or additional services are provided for devices that include a service processor. As described herein, a service controller function can be located in various places in the network in accordance with various embodiments. It should also be noted that various other embodiments described herein also employ a hybrid service control function performing certain service control functions in the network (e.g., collecting network service usage information, such as IPDRs, and/or performing DPI related functions in the network for collecting network service usage information and/or throttling/shaping traffic) and service control functions in the device (e.g., service processor 115, which, for example, monitors service usage in the device and/or performs throttling or traffic shaping in the device and/or performs certain billing event recording and reporting functions that are aptly performed on the device).

In some embodiments, lower level service policy implementation embodiments are combined with a higher level set of service policy supervision functions to provide device-assisted verifiable network access control, authentication and authorization services.

In some embodiments, device-based access control services are extended and combined with other policy design techniques to create a simplified device activation process and connected user experience referred to herein as ambient activation. As similarly discussed above, ambient activation can be provided by setting access control to a fixed destination, verifying access with IPDRs, verifying access by setting a max data rate and triggering off in the network if it exceeds the max data rate, and/or by various other techniques.

As shown in FIG. 24, service controller 122 includes a service history server 1650. In some embodiments, the service history server 1650 collects and records service usage or service activity reports from the Access Network AAA Server 121 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network-based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618. In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 24, service controller 122 includes a policy management server 1652. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device-based policy management (e.g., service processor 115) for some or all of the policy adaptation. This approach can require less interaction with the device thereby reducing network chatter on service control link 1653 for purposes of device policy management (e.g., network chatter is reduced relative to various server/network-based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

In some embodiments, the policy management server 1652 performs a service control algorithm to assist in managing overall network capacity or application QoS. In some embodiments, the policy management server 1652 performs an algorithm to determine which access network is best to connect to, such as based on network capacity or application QoS, service usage costs, and/or any other criteria. In some embodiments, the device is capable of connecting to more than one network, and accordingly, device service policies can be selected/modified based on which network the device is connected to. In some embodiments, the network control plane servers detect a network connection change from a first network to a second network and initiate the service policy implementation established for the second network. In other embodiments, the device-based adaptive policy control agent (e.g., policy control agent 1692 described herein) detects network connection changes from the first network to the second network and implements the service policies established for the second network.

In some embodiments, when more than one access network is available, the network is chosen based on which network is most preferred according to a network preference list or according to the network that optimizes a network cost function. For example, the preference list can be pre-established by the service provide and/or the user. For example, the network cost function can be based on a minimum service cost, maximum network performance, determining whether or not the user or device has access to the network, maximizing service provider connection benefit, reducing connections to alternative paid service providers, and/or a variety of other network preference criteria. In other embodiments, the device detects when one or more preferred networks are not available, implements a network selection function or intercepts other network selection functions, and offers a connection to the available service network that is highest on a preference list. For example, the preference list can be set by the service provider, the user and/or the service subscriber.

As shown in FIG. 24, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In other embodiments, the network traffic analysis server 1656 estimates the service quality and/or service usage for the network under variable settings on potential service policy. In other embodiments, the network traffic analysis server 1656 identifies actual or potential service behaviors by one or more devices that are causing problems for overall network service quality or service cost.

As shown in FIG. 24, service controller 122 includes a beta test server 1658. In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 24, service controller 122 includes a service download control server 1660. In some embodiments, the service download control server 1660 provides a download function to install and/or update service software elements (e.g., the service processor 115 and/or agents/components of the service processor 115) on the device, as described herein.

As shown in FIG. 24, service controller 122 includes a billing event server 1662. In some embodiments, the billing event server 1662 collects billing events, provides service plan information to the service processor 115, provides service usage updates to the service processor 115, serves as interface between device and central billing server 123, and/or provides trusted third-party function for certain ecommerce billing transactions.

As shown in FIG. 24, the Access Network AAA server 121 is in network communication with the access network 1610. In some embodiments, the Access Network AAA server 121 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 121 also provides the ability to suspend service for a device and resume service for a device based on communications received from the service controller 122. In some embodiments, the Access Network AAA server 121 also provides the ability to direct routing for device traffic to a quarantine network or to restrict or limit network access when a device quarantine condition is invoked. In some embodiments, the Access Network AAA server 121 also records and reports device network service usage (e.g., device network service usage can be reported to device service history 1618).

As shown in FIG. 24, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 24, the central provider billing server 123 is in network communication with the access network 1610. In some embodiments, the central provider billing server 123 provides a mediation function for central provider billing events. For example, the central provider billing server 123 can accept service plan changes. In some embodiments, the central provider billing server 123 provides updates on device service usage, service plan limits and/or service policies. In some embodiments, the central provider billing server 123 collects billing events, formulates bills, bills service users, provides certain billing event data and service plan information to the service controller 122 and/or device 100.

Establishing Coordinated Service and Verification Policies for Service Processor, Service Controller and Network Functions In some embodiments, device and network apparatus coordinate one or more of the following: network service policy implementation settings, device service policy implementation settings, network service profile implementation settings, device service profile implementation settings, network service usage measures used for the purpose of verifying service policy implementation, device service usage measures used for the purpose of verifying service policy implementation, network actions taken upon detection of service usage policy violation and device actions taken upon detection of service usage policy violation. In some embodiments, local device settings for the service monitoring, usage and/or billing profile or policy settings used, for example, by a device service processor 115, are associated with corresponding records for the various network apparatus that also rely upon the service policy and profile settings to monitor, control and/or bill for services or to respond to out of policy service usage conditions. For example, such network apparatus include the service controller 122 or similar functions, the billing system 123 or similar functions, the network AAA 121, gateways 410, 420, 508, 512, 520, 608, 612, 620, 708, 712, 720, or other networking equipment. In some embodiments, the service profile or policy settings are associated between the device and network in a manner that allows for effective and coordinated operation between the device service processor 115 and the network apparatus, but does not require an explicit function that simultaneously controls/coordinates the service policy or profile implementation and/or verification actions taken by the device 100 (e.g., the service processor 115) and the network apparatus. As an example, such embodiments can be applied in overlay applications as discussed below.

In some embodiments, a network function (e.g., the service controller 122, and/or more specifically the policy management server 1652 function, or other similar function) obtain, derive or otherwise determine the association of the service profile or policy settings to program a device service processor 115 and the various network apparatus functions (e.g., possibly including but not limited to the service controller 122 or similar functions, the billing system 123 or similar functions, the network AAA 121, gateways 410, 420, 508, 512, 520, 608, 612, 620, 708, 712, 720, or other networking equipment) by reading, receiving, querying, pulling or otherwise obtaining the settings from one or more of the network apparatus functions or from a data base that stores the service policy or profile settings for one or more of the network apparatus functions. After obtaining one or more of the network apparatus settings, a mapping (e.g., an association) of the network apparatus settings to the appropriate device 100 (service processor 115) settings can be determined to advantageously support the service usage monitoring, service usage control, service usage billing or service usage verification objectives being addressed. The policy or profile settings for the device can be a direct translation of the policy or profile settings used for the network apparatus, or the device policy or profile settings can be less directly derived from the network apparatus policy or profile settings. For example, service usage limits contained in the billing system 123 service plan can be either directly mapped to usage limit settings on the device service processor 115 (e.g., service usage stops when the limit is hit or the user is notified or the user is billed), or the usage limits can be mapped to a number of service profiles the user may select from (e.g., as discussed herein, the user can select from options involving various actual usage versus usage limit notification policies and/or service usage control, limitations or throttling policies).

For example, the service usage policy or profile limits or allowances maintained for the network apparatus functions (e.g., the service profile or service plan usage limits stored in the billing system 123 or AAA 121) can be read or queried by a network function (e.g., the service controller 122 or the service controller 122 through a second intermediary server connected to the billing system 123 and/or the AAA system 121), and the service usage limits stored in these networking apparatus can be either directly translated to the settings for the service processor 115 or may need to be interpreted, expanded or otherwise modified to obtain the required service processor 115 policy and/or profile settings.

In some embodiments, the service usage limits set in the billing system 123 service plan record, and/or the service profile record stored in the AAA system 121 can be acquired (e.g., from the apparatus or from a database storing the settings for the apparatus) by the service controller (or another network function) and directly translated and used to program the settings in the service processor 115. In some embodiments, the service usage limits are determined or obtained by the activation server apparatus embodiments, other apparatus embodiments associated with service activation, or the virtual service provider embodiments, as described herein. In this manner, once the association of the service usage profile or policy settings used by a device service processor 115 and the profile or policy settings used by the various network apparatus functions is established, then the service policy or profile for service monitoring, control, billing, verification and/or actions taken on verification error can be coordinated between device and network even if some of the network functions act independent of some of the device functions.

For example, associating the service usage policies and/or profiles between the device service processor 115 and the various network apparatus functions, and then allowing for independent operation or action by the various functions in a manner that results in a coordinated outcome, facilitates an overlay of the device-assisted services technology onto existing network equipment in a manner that results in reliable and verifiable service enhancements while minimizing the need for major existing network equipment upgrades.

In some embodiments, the association of the service profile or policy settings used by a device service processor 115 and the service profile or policy settings used by the various network apparatus functions can be provided by a centralized network function that determines the appropriate settings for the network apparatus and the service processor 115 and sets one or more settings to each function. In some embodiments, this networking function is provided by a centralized network management function or service account activation function (e.g., the activation server apparatus embodiments, one of the other disclosed apparatus embodiments associated with service activation or the virtual service provider apparatus embodiments, as described herein).

In some embodiments, the association of the service profile or policy settings used by a device service processor 115 and the service profile or policy settings used by the various network apparatus functions can be provided by a network function that by reads, receives, queries, pulls or otherwise obtains the setting used by the service controller 122 or the service processor 115. The network function can then determine the association of the service profile or policy settings used by a device service processor 115 and the service profile or policy settings required by the various network apparatus functions before writing, transmitting, pushing, or otherwise recording the appropriate settings required by each of the other network apparatus functions. In some embodiments, this functionality can be implemented in the service controller (e.g., the policy management server, possibly acting in coordination with another network function or server), which then links into the databases used for storing the policy or profile settings for the other network apparatus.

In some embodiments, once the association is established between service policy or profile settings in the network apparatus and the service policy or profile settings in the service processor 115, then the network-based service usage measures (e.g., IPDRs communicated to the billing system 123, the AAA 121, service controller 122 or other network functions used to verify service usage and/or take actions) used for verification of device 100 service usage versus service policy or profile can be monitored by the network apparatus (e.g., billing system 123 and AAA 121) independent of coordination with the service processor 115 and/or independent of the service controller 122. In some embodiments, in addition to independent monitoring and verification of service usage versus policy, independent service profile or policy verification error response actions can be taken by the network apparatus (e.g., suspend, quarantine, SPAN or flag device 100, notify the user and possibly require acknowledgement, or bill the user account for service usage overage) without direct involvement by the service processor 115 and/or the service controller 122.

Accordingly, the association between service profile and/or service policy that is implemented on the device 100 (e.g., service processor 115) and the service profile and/or policy usage limits recorded in network apparatus can be associated with one another by one or more of the following: (A) implementing a function to read from the network database (e.g., the billing 123 data base, AAA 121 data base, service controller 122 data base, etc.) and mapping the network profiles and/or policies to device 100 (e.g., service processor 115) profiles and/or policies; (B) implementing a function that simultaneously sets the device profile and/or policy and the network equipment profile and/or policy recorded in the appropriate data base records; and (C) implementing a function that reads the profile and/or policy on the device 100 (e.g., service processor 115) or the service controller 122 and then sets the network equipment profile and/or policy recorded in the appropriate data base records. This allows for a simplified but coordinated response to monitoring, controlling and billing for service usage, for verifying service usage versus service usage profile or policy, and/or initiating or carrying out network actions in response to service usage versus profile or policy verification errors and/or device actions in response to service usage versus profile or policy verification errors.

Figure 25:
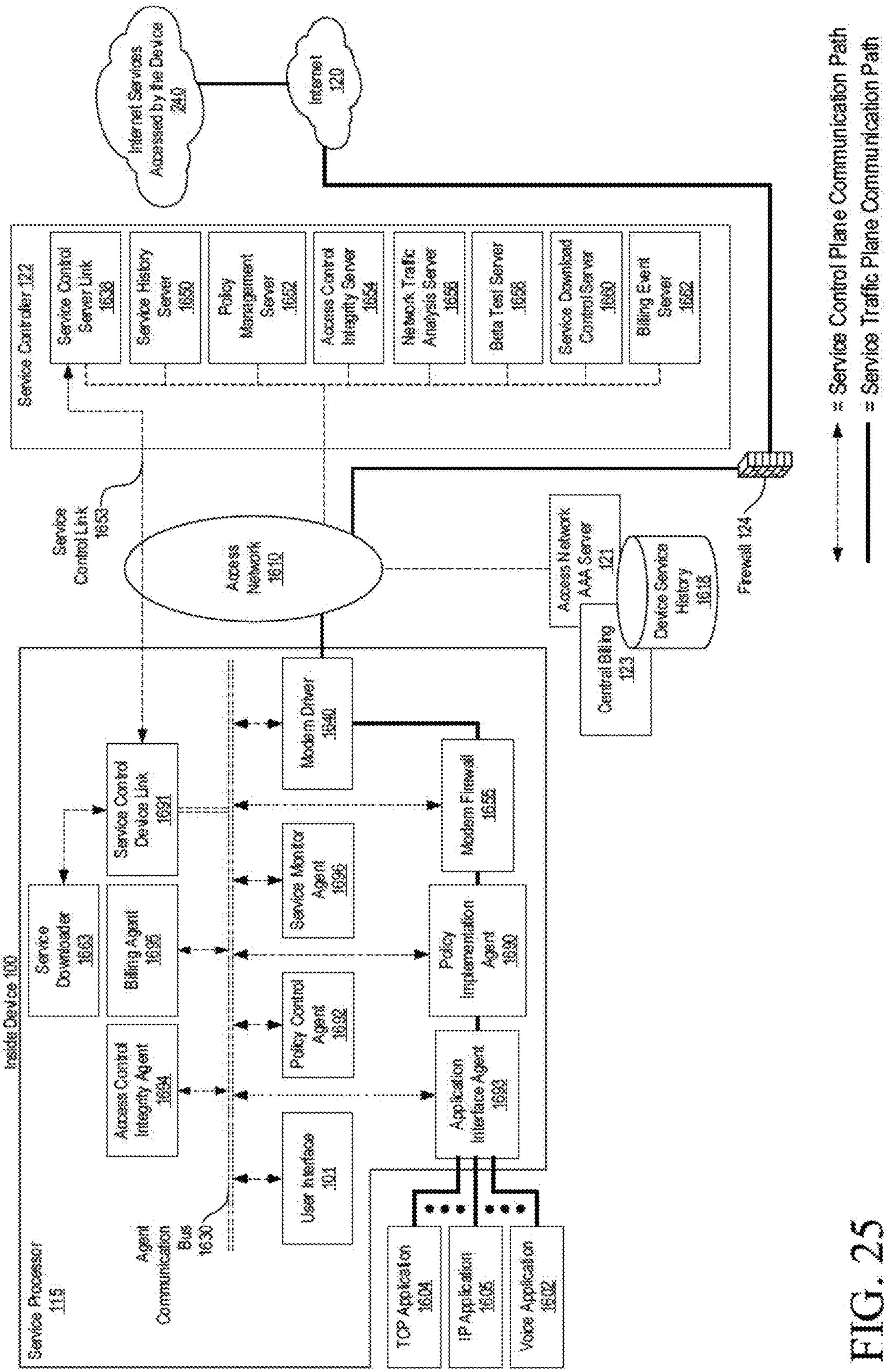
FIG. 25 is another functional diagram illustrating the device-based service processor and the service controller in accordance with some embodiments.

FIG. 25 is another functional diagram illustrating the device-based service processor 115 and the service controller 122 in accordance with some embodiments. FIG. 25 provides for various embodiments as similarly described above with respect to the various embodiments described above with respect to FIG. 24, with one of the differences being that the service controller 122 as shown in FIG. 25 is connected to the access network and not (directly) connected to the Internet. Accordingly, as shown in FIG. 25, in some embodiments, the service control link 1653 is a communications link between the service controller 122 and the service processor 115 over the access network 1610.

FIG. 26 is another functional diagram illustrating the device-based service processor 115 and the service controller 122 in which the service processor controls the policy implementation for multiple access network modems and technologies in accordance with some embodiments. As shown, FIG. 26 provides for various embodiments as similarly described above with respect to the various embodiments described above with respect to FIG. 24, with one of the differences being that the service processor controls the policy implementation for multiple access network modems and technologies. Accordingly, as shown in FIG. 26, in some embodiments, a connection manager 1804, which as shown is in control plane communication with a modem selection and control 1811, provides a control and supervision function for one or more modem drivers or modems that connect to an access network. In some embodiments, the modem selection and control 1811 selects the access network connection and is in communication with the modem firewall 1655, and modem drivers, which as shown include Dial/DSL modem driver 1831, Ethernet modem driver 1815, WPAN modem driver 1814, WLAN modem driver 1813, and WWAN modem driver 1812, convert data traffic into modem bus traffic for one or more modems and are in communication with the modem selection and control 1811.

Figure 27:
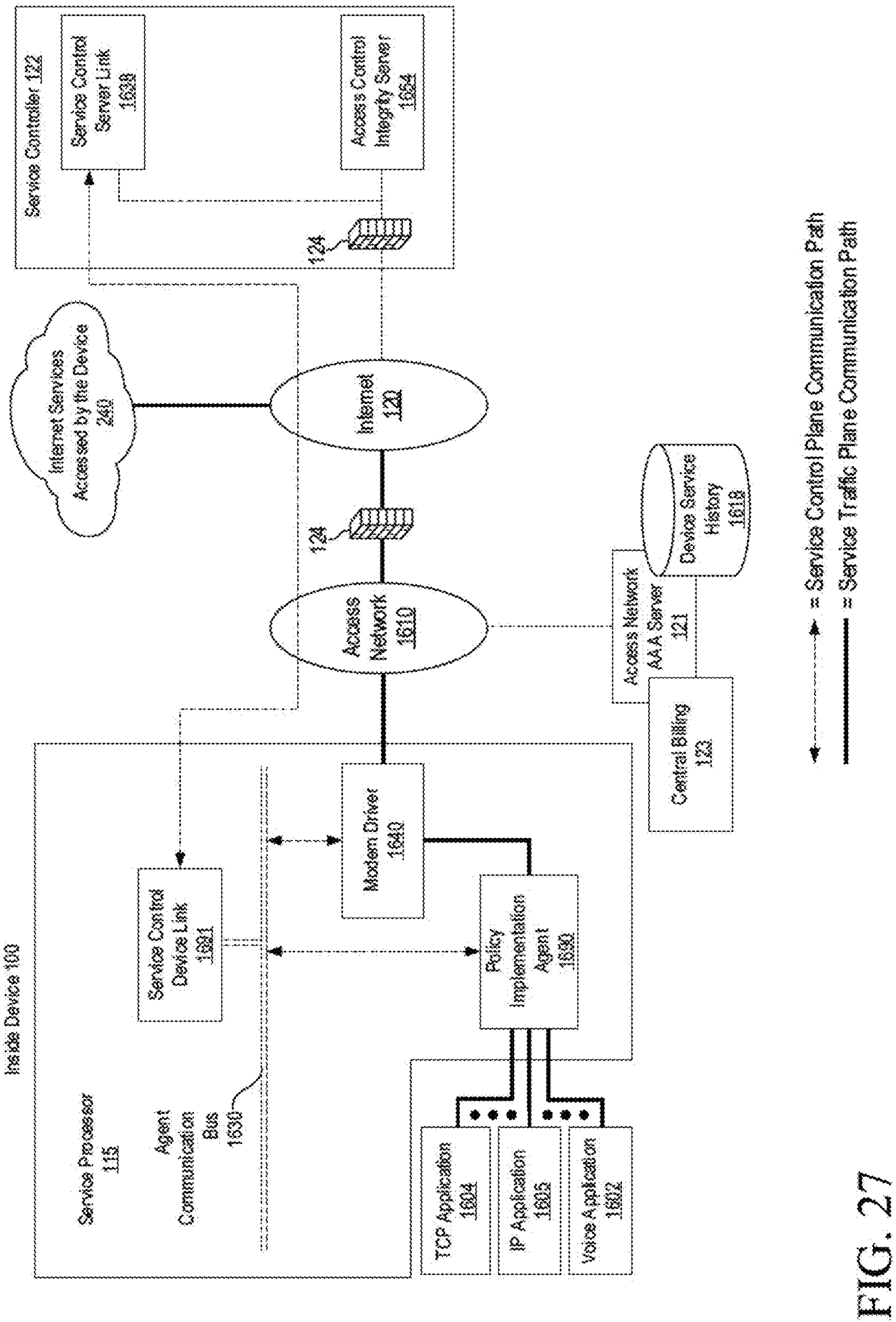
FIG. 27 is another functional diagram illustrating the service processor and the service controller in accordance with some embodiments.

FIG. 27 is another functional diagram illustrating the service processor 115 and the service controller 122 in accordance with some embodiments. As shown in FIG. 27, a stripped down (e.g., reduced set of agents/components/functionality) embodiment of the service processor 115 and the service controller 122 are provided in which service policy is not adaptive but rather is set by the service controller 122. In this example, the agent within the service processor 115 that implements service policy is the policy implementation agent 1690. Also, in this example, the service controller 122 is similarly stripped down to a simplified configuration (e.g., reduced set of agents/components/functionality).

Referring to FIG. 27, in some embodiments, many of the service policy implementation verification and compromise protection techniques are similarly provided using these simplified configurations of the service processor 115 and the service controller 122, as described above with respect to, for example, FIG. 24. For example, the service control device link 1691 and service control server link 1638 can be used for downloading service policies to the policy implementation agent 1690 (but, in some embodiments, cannot perform the heartbeat or authentication function).

For example, a basic service profile or service policy implementation verification technique for this reduced configuration calls for the access control integrity server 1654 to obtain IPDRs from access network AAA server 121 (e.g., or other network functions as described herein) and compare the service usage exhibited by device 100 with a range of expected service usage that would be expected if the intended service policies were in place on the device. In some embodiments, the access control integrity server 1654 initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

In some embodiments, a service profile or service policy implementation verification technique for this reduced configuration calls for the billing system 123 to obtain IPDRs from access network AAA server 121 (or other network functions as discussed herein) and compare the service usage exhibited by device 100 with a range of expected service usage that would be expected if the intended service policies were in place on the device. In some embodiments, the billing system 123 initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

In some embodiments, a service profile or service policy implementation verification technique for this reduced configuration calls for the AAA server 121 itself to compare the service usage exhibited by device 100 with a range of expected service usage that would be expected if the intended service policies were in place on the device. In some embodiments, the AAA server 121 initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

Accordingly, this approach provides a basic first layer of service policy implementation verification that does not depend on device-based agent behavior for the verification. If the service policy is in error in a way that violates the expected service policy usage limits, then the access control integrity server 1654 will detect this condition and appropriate action can be taken. In some embodiments, if one or more service policy integrity verification tests fail, the appropriate responsive actions can include routing the device to quarantine status, sending an error message to the device or device user interface and then suspend access for the device, and/or limiting access in some way without completely suspending access, as similarly described above. In some embodiments, if one or more service policy integrity verification tests fail, the appropriate responsive actions can include logging excess service usage above the intended service policy limits and billing the user for some or all of the excess usage, sending the user a notification and/or acknowledgement response request (possibly including a simple keystroke acknowledgement, or a password, a biometric signature or other secure response), and/or limiting access in some way without completely suspending access, as similarly described above.

In some embodiments, a billing system technique provides another verification overlay. For example, the service processor 115 can have a set of service policy implementations (or service profile) that calls for maintaining service usage within a certain limit, or assisting the user or network to maintain service usage to that limit. The billing system 123 can be implemented in a way to provide a "back stop" to the service usage controls or limits provided for by the service processor 115, so that even if the service processor 115 is compromised, hacked, spoofed or is otherwise in error, the billing system 123 protects the service provider, "service owner", carrier, VSP or network operator from unpaid access beyond the service limits. This can be accomplished, for example, by assigning a service usage limit within the billing system 123 so that if the service processor 115 is compromised and the service usage runs over the desired limit, the billing system 123 automatically charges the user account for the overage. The billing system 123 can receive service usage information from the IPDRs that are aggregated in the network as in the case of a conventional billing system, and because these network-based measures are independent from the device agent operation, they cannot be spoofed by merely spoofing something on the device or service processor 115. In this manner, defeating the service processor 115 service agent control mechanisms described herein simply results in a billing charge and not free service. In some embodiments, if the service usage runs over the service usage limit specified in the service profile, the user can be notified as discussed herein, and the user can be required to acknowledge the overage and approve a billing charge for the overage as also discussed herein, with the acknowledgement being communicated back to the network in some embodiments. This positive acknowledgement also provides a layer of protection and verification of the service control and usage limit control for the device service processor 115. In some embodiment also discussed herein, the user is requested to input a password, biometric or other secure response to the usage overage notification, providing yet another layer of protection to verify that the user intends to pay for the service usage overage. In these embodiments taken individually or in combination, the service processor 115 assistance for service usage control can be verified and/or protected from compromise.

In some embodiments, the service control device link 1691 and service control server link 1638 are used to implement the service processor 115 heartbeat authentication and communication functions to strengthen the verification of a proper service policy implementation of the embodiments of FIG. 27. For example, the heartbeat function can be used as authentication for service monitoring versus network reports. In addition, the heartbeat function can be used as authentication for challenge/response queries of agents. Also, the heartbeat function can be used as authentication for access control. In some embodiments, to strengthen verification of the basic system illustrated in FIG. 27, the communication access to the policy implementation agent 1690 is restricted so that software or hardware on device 100 and/or on a network cannot have authorized access to the policy implementation agent 1690. For example, authorized access to the policy implementation agent 1690 can be restricted to include only the service controller 122 through the service control device link 1691 and the service control server link 1638. For example, the agent control bus 1630 can be secured with encryption and/or other security techniques so that only the service control device link 1691 can have authorized access to the policy implementation agent 1690. As another example, the agent level message encryption can be used as described herein.

In some embodiments, the service policy implementation agent 1690 of the embodiments of FIG. 27 can be further strengthened against errors, intrusion, tampering, hacking and/or other inadvertent or intentional integrity degradation by using various other techniques. For example, the dynamic agent download feature of the service controller 122 can download a new version of the policy implementation agent 1690. In this example, the new agent code can be identical in functionality and also hashed, obfuscated or ordered differently before signing and encryption so that any hacking attempt must be reinitiated, and this process can be periodically repeated or repeated upon a triggering event. Additionally, once the new dynamically loaded agent is in place, it can be required to perform an environment scan to determine if the system configuration or operation are as expected, and/or it can seek to detect elements in the execution environment that can be harmful or threatening to the integrity of the policy implementation. The agent can also be required to report back on the scan within a relatively short period of time so that any attempt to compromise the agent does not have sufficient time to be effective.

In some embodiments, the service policy implementation agent 1690 of the embodiments of FIG. 27 can be further strengthened to protect the policy implementation from compromise attempts by locating the software and/or hardware used onto an access modem associated with the service. For example, the modem can make it difficult to get access to the policy implementation agent 1690 by employing one or more security elements on one or more access ports into the modem, such as the device bus, an I/O port, a network connection or the debug port. The modem can also store and/or execute the policy implementation agent in secure memory. The modem can also require a secure download key or a secure software signature to accept any updates to the agent software.

In some embodiments, the service policy implementation agent 1690 of the embodiments of FIG. 27 can be further strengthened against compromise attempts by performing scans of the device 100 code execution environment and/or code storage environment to identify potentially malicious and/or unwanted/untrusted software or hardware. For example, this function can be performed by the policy implementation agent 1690. The agent can have a local database of potentially malicious elements and compare the entries in the database against the elements detected locally using various malicious code, behavior blocking, intrusion detection, and/or other well known techniques for security analysis. Alternatively or in addition, the agent can communicate a list of some or all of the elements detected locally to the service controller 122 to augment or take the place of the database comparison function that can be performed locally, thereby performing such or further such security analysis on the network (e.g., by the service controller 122), and, in some embodiments, if not automatically detected, such elements detected locally (e.g., and/or samples of such detected potentially malicious code or logs of potentially malicious/suspicious behavior/intrusions) forwarded to security analysts for the service provider for further security analysis (e.g., service provider security analysts and/or an outside security vendor engaged to protect the service provider's network and supported devices). In some embodiments, the agent detects new software downloads, installs and/or invocations and immediately issues an error flag report when potentially malicious software is downloaded, installed or invoked (e.g., file and network based on access security detection techniques). In some embodiments, the agent scans the local software loading and invocation activity along with a log of other software runtime events and regularly reports this trace so that when an error or compromise event occurs the trace preceding the event can be analyzed to determine the offending software or activity trace that took place to cause the compromise or error. For example, once the software or activity that caused the compromise is known or otherwise detected, it can be entered into a refreshed version of the database that the device and other devices use to detect potentially malicious precursor conditions. Examples of such precursor events can include software invocations, software downloads, a sequence of memory I/O events, a sequence of software access events, a sequence of network address or URL communications or downloads, or a sequence of access modem I/O activity.

Figure 28:
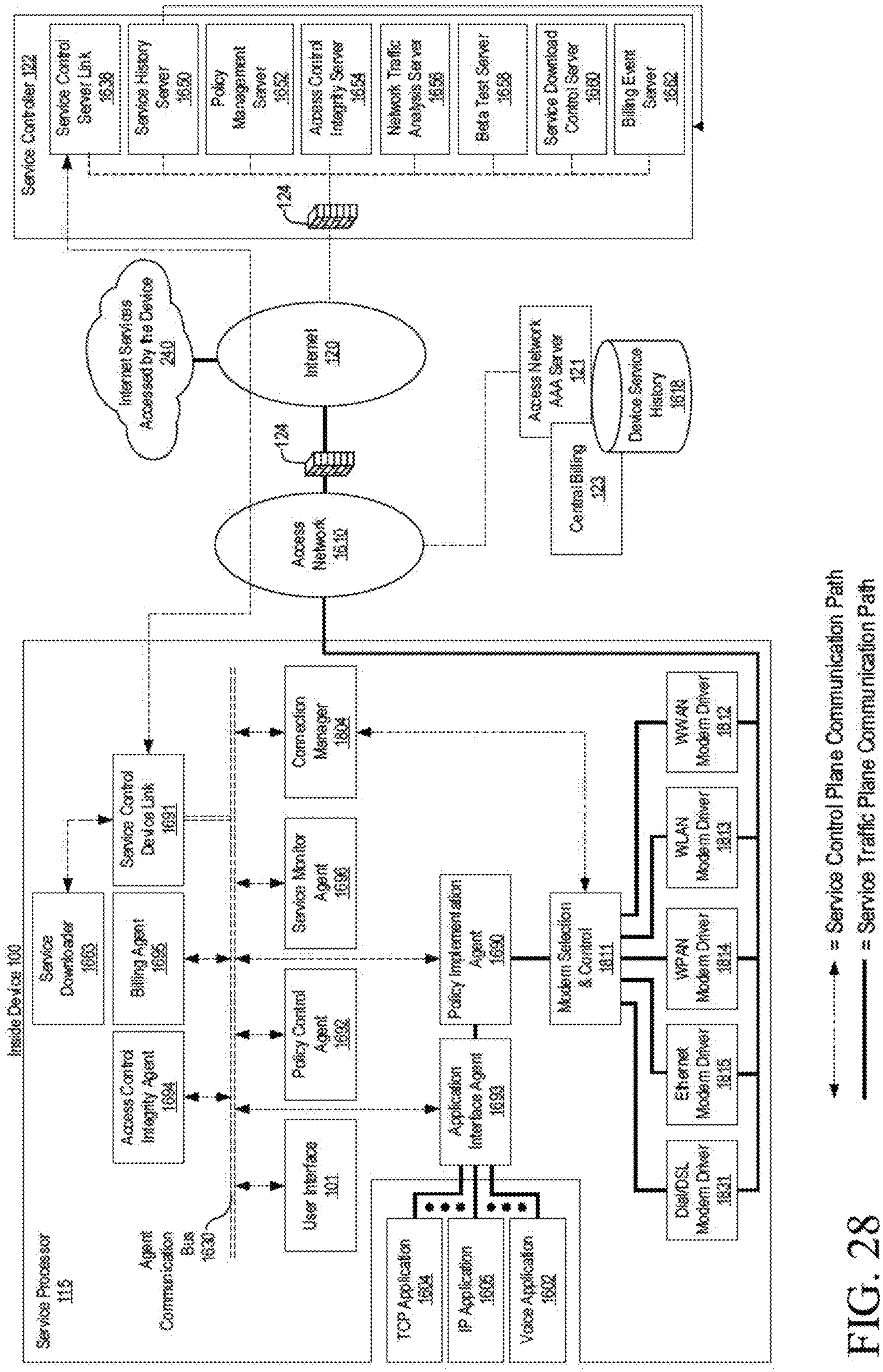
FIG. 28 is another functional diagram illustrating the service processor and the service controller in accordance with some embodiments.

FIG. 28 is another functional diagram illustrating the service processor 115 and the service controller 122 in accordance with some embodiments. As shown in FIG. 28, the modem firewall 1655 has been removed, and firewall and access control and traffic shaping functions are performed in these embodiments by the policy implementation agent 1690 and application interface agent 1693.

FIG. 29 is another functional diagram illustrating the service processor 115 and the service controller 122 in accordance with some embodiments. FIG. 29 illustrates the various modem drivers and modems 2122 through 2125 and 2141. In some embodiments, the modems, which include WWAN modem 2122, WLAN modem 2123, WPAN modem 2124, Ethernet modem 2125, and Dial/DSL modem 2141, which are in communication with the modem bus 2120, connect the device to one or more networks. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or, in some embodiments, the modem firewall agent 1655 or the application interface agent 1693, in making a determination regarding the traffic parameters or type once the traffic is farther down in the communication stack where it is sometimes difficult or impossible to make a complete determination of traffic parameters. It should be noted that although the present invention does not need to implement any or all of the measurement points illustrated in FIG. 29 to have an effective implementation as was similarly shown with respect to FIG. 27, various embodiments benefit from these and/or similar measurement points. It should also be noted that the exact measurement points can be moved to different locations in the traffic processing stack, just as the various embodiments described herein can have the agents affecting policy implementation moved to different points in the traffic processing stack while still maintaining effective operation.

As shown in FIG. 29, measurement point I occurs at the application interface agent 1693 interface to the applications. At this measurement point, the application traffic can be monitored before it is framed, packetized or encrypted by the lower layers of the networking stack. For example, this allows inspection, characterization, tagging (literal or virtual) and, in some embodiments, shaping or control of services or traffic. At this measurement point, traffic can be more readily associated with applications, URLs or IP addresses, content type, service type, and other higher level parameters. For example, at this level email traffic and downloads, web browser applications and end points, media file transfers, application traffic demand, URL traffic demand and other such service monitoring parameters are more readily observed (e.g., accessible in the clear without the need for deep packet inspection and/or decryption), recorded and possibly shaped or controlled. As described herein, it is also possible to monitor upstream traffic demand at this point and compare it to the other measurement points to determine if the traffic policies in place are meeting overall traffic control policy objectives or to determine if traffic policy implementation is operating properly. For example, the downstream delivered traffic can be optimally observed at this measurement point.

As shown in FIG. 29, traffic measurement points II and III are situated on the upstream and downstream sides of policy implementation agent 1690. As described herein, these two locations allow potential tracking of upstream and downstream traffic through the stack portions associated with the policy implementation agent 1690. These two locations also provide for potential cross-checking of how the policy implementation agent 1690 is impacting the demand and delivery of traffic. In a similar manner, measurement point III in connection with measurement point IV provide an opportunity for packet tracing through the stack components associated with the modem firewall 1655 and provide for the opportunity to observe the demand and delivery sides of the modem firewall 1655. Traffic measurement point V provides the potential for observing the traffic at the modem bus drivers for each of the modems.

As shown in FIG. 29, traffic measurement point VI provides, in some embodiments, the ultimate measure of access traffic, for example, the traffic that actually transacts over the access network through the modem. As shown, measurement point VI is at the modem side of the internal or external communications bus 1630, and it will be appreciated that, in some embodiments, this measurement point can be further down the modem stack closer to the MAC or physical layer (e.g., at the designer's discretion). An advantage of having a measurement point deep in the modem is, for example, that if the software or hardware that implements the measurement and reporting is well secured against compromise, then this measure can be almost as strong from a verification perspective as the measure that comes from the network (e.g., from the network elements). Accordingly, this makes it possible to compare this measure against the other measures to determine if there is a traffic path that is leaking past the other measurement point or one or more policy implementation points.

FIGS. 30A and 30B provide tables summarizing various service processor 115 agents (and/or components/functions implemented in software and/or hardware) in accordance with some embodiments. Many of these agents are similarly described above, and the tables shown in FIGS. 30A and 30B are not intended to be an exhaustive summary of these agents, nor an exhaustive description of all functions that the agents perform or are described herein, but rather FIGS. 30A and 30B are provided as a summary aid in understanding the basic functions of each agent in accordance with some embodiments and how the agents interact with one another, with the service controller server elements, and/or with other network functions in certain embodiments to form a reliable device-based service delivery solution and/or platform.

FIG. 31 provides a table summarizing various service controller 122 server elements (and/or components/functions implemented in software and/or hardware) in accordance with some embodiments. Many of these agents are similarly described above, and the table shown in FIG. 31 is not intended to be an exhaustive summary of these server elements, nor an exhaustive description of all functions that the elements perform or are described herein, but rather FIG. 31 is provided as a summary aid in understanding the basic functions of each element in accordance with some embodiments and how the elements interact with one another, certain network elements, and/or the service processor agents in certain embodiments to form a reliable device-based service delivery solution and/or platform.

In some embodiments, it is desirable to provide a control plane between the service processor and the service controller using a flexible connection or communication path that, for example, will work between virtually any two network connection endpoints, one being the service controller and one being the device, in a secure yet scalable manner. In view of the embodiments described herein, one of ordinary skill in the art will recognize that it is possible to achieve such features with a variety of different embodiments that share similar core features to the embodiments described herein.

Service Control Device Link and Continuous Heartbeat Authentication

As described herein, there are numerous ways to implement the control plane communication channel between the service processor 115 and the service controller 122. Various embodiments described herein disclose a secure and bandwidth efficient control plane that is compatible with any IP based network (including the ability to locate the service controller 122 over the Internet); provides for consistent device-assisted service monitoring, control, verification and/or billing while roaming across multiple networks with different access technologies; and allows continuous device-assisted service control verification and/or authentication with a variety of mechanisms for setting the transmission heartbeat frequency. Other techniques that could be used for this function include, for example, encapsulating the control plane in the access network control plane channel, encapsulating the control plane in IP or data packet framing mechanisms (e.g., IPV6), running a more conventional VPN or IPSEC channel, and/or using an independent access network connection.

Figure 32:
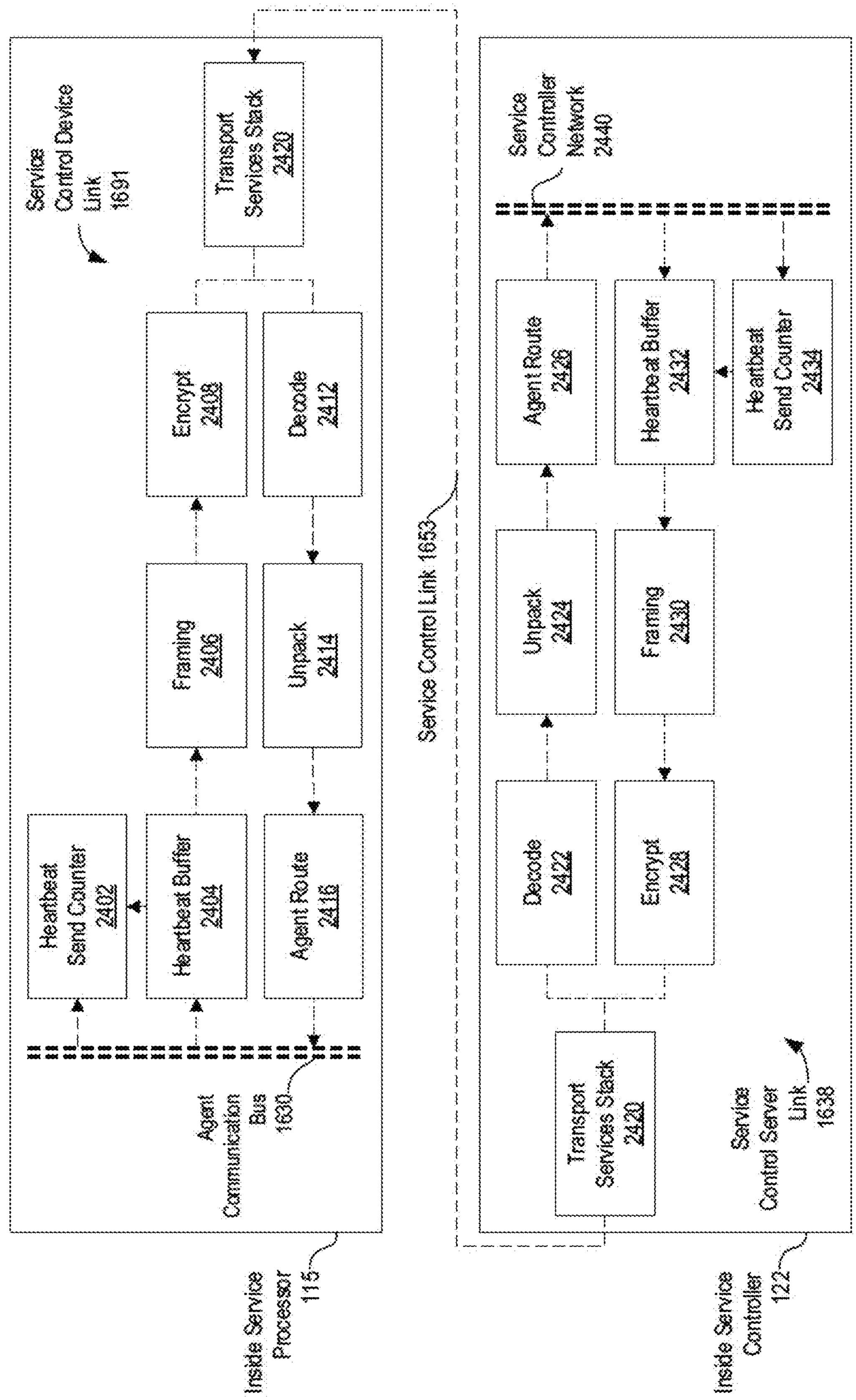
FIG. 32 is a functional diagram illustrating the service control device link of the service processor and the service control service link of the service controller in accordance with some embodiments.

FIG. 32 is a functional diagram illustrating the service control device link 1691 of the service processor 115 and the service control service link 1638 of the service controller 122 in accordance with some embodiments. In particular, the service control device link 1691 of the service processor 115 and the service control service link 1638 of the service controller 122 as shown in FIG. 32 provide for secure control plane communication over the service control link 1653 between the service processor 115 and the service controller 122 in accordance with some embodiments. Various embodiments include two or three layers of encryption in the service control link, with one embodiment or layer being implemented in the encrypt functions (2408, 2428) and decode functions (2412, 2422), and another embodiment or layer implemented in the transport services stack (2410, 2420). An optional third embodiment or layer of encryption is implemented below the transport services stack, for example, with IPSEC or another IP layer encryption, VPN or tunneling scheme. For example, various known security encryption techniques can be implemented in the encrypt functions (2408, 2428), with public/private or completely private keys and/or signatures so that very strong levels of security for service processor control plane traffic can be achieved even through the basic transport services (2410, 2420) implemented with standard secure or open Internet networking protocols, such as TLS or TCP. For example, the service processor agent communications local to the device can be conducted to and from the service controller elements via the service control device link 1691 connection to the agent communication bus 1630. The combination of the service control device link 1691 and the agent communication bus 1630, which in some embodiments is also securely encrypted or signed, provides a seamless, highly secure, asynchronous control plane connection between the service processor and service controller server elements and the service controller and service controller agents that works over a wide range of access networks, such as any access network that has the capability to connect IP or TCP traffic to another TCP or IP endpoint on the access network, another private network or over the Internet 120. As described herein, in some embodiments, the agent communication bus 1630 also provides a fourth level of encrypted or signed communication to form a secure closed system on the device for agent to agent communication, for example, making it very difficult or practically impossible for software or applications to gain access to one or more of the a service processor agents on the device in any way other than the service control device link 1691. In this way, in some embodiments, the agent communication bus 1630 and the service processor agents can only be accessed by one another as necessary or permitted by agent communication policies, or by the service controller or other authorized network function with proper security credentials communicating over the service control device link 1691. Additionally, in some embodiments, communications between a subset of two or more agents, or between one or more agents and one or more service controller server elements are encrypted with unique keys or signatures in such a way that a fourth level of security providing private point to point, point to multipoint, or multipoint to multipoint secure communication lines is provided.

In some embodiments, all of the service control device link 1691 communications are transformed into a continuous control plane connection, with a frequency based on the rate of service usage, a minimum set period between connections, and/or other methods for establishing communication frequency. In some embodiments, this heartbeat function provides a continuous verification link by which the service controller verifies that the service processor and/or device are operating properly with the correct service policies being implemented. In view of the following heartbeat function embodiments described herein, it will be apparent to one of ordinary skill in the art that different approaches for implementing the various heartbeat embodiments are possible, and it will be clear that there are many ways to achieve the essential features enabling a reliable, sometimes continuous control link and verification function for the purpose of assisting control of service usage in a verifiable manner. As shown, inside the service processor 115, the service control device link 1691 includes a heartbeat send counter 2402 in communication with the agent communication bus 1630. For example, the heartbeat send counter 2402 can provide a count for triggering when a service processor 115 communication (e.g., periodic communication based on a heartbeat mechanism) should be sent to the service controller 122, and a heartbeat buffer 2404, also in communication with the agent communication bus 1630, buffers any such information for the next service processor 115 communication, in accordance with various heartbeat based embodiments, as similarly described herein. The heartbeat buffer 2404 is in communication with a framing element 2406 and an encrypt element 2408 for framing and encrypting any service processor 115 communications transmitted to the service controller 122 by a transport services stack 2410 over the service control link 1653. Similarly, as shown inside the service controller 122, the service control server link 1638 includes a heartbeat send counter 2434 in communication with a service controller network 2440, a heartbeat buffer 2432, also in communication with the service controller network 2440, buffers any such information for the next service controller 122 communication, in accordance with various heartbeat based embodiments, as similarly described herein. The heartbeat buffer 2432 is in communication with a framing element 2430 and an encrypt element 2428 for framing and encrypting any such service controller 122 communications transmitted to the service processor 115 by a transport services stack 2420 over the service control link 1653.

As also shown inside the service processor 115 of FIG. 32, the service control device link 1691 includes a decode element 2412 for decoding any received service controller 122 communications (e.g., decrypting encrypted communications), an unpack element 2414 for unpacking the received service controller 122 communications (e.g., assembling packetized communications), and an agent route 2416 for routing the received service controller 122 communications (e.g., commands, instructions, heartbeat related information or status reports, policy related information or configuration settings and/or updates, challenge/response queries, agent refreshes and/or new software for installation) to the appropriate agent of the service processor 115. Similarly, as shown inside the service controller 122, the service control server link 1638 also includes a decode element 2422 for decoding any received service processor 115 communications (e.g., decrypting encrypted communications), an unpack element 2424 for unpacking the received service processor 115 communications (e.g., assembling packetized communications), and an agent route 2426 for routing the received service processor 115 communications (e.g., responses to instructions and/or commands, heartbeat related information or status reports, policy related information or configuration settings and/or updates, challenge/response queries, agent status information, network service/cost usage and/or any other reporting related information) to the appropriate agent of the service controller 122. Accordingly, as described herein with respect to various embodiments, the various secure communications between the service controller 122 and the service processor 115 can be performed using the embodiment as shown in FIG. 32, and those of ordinary skill in the art will also appreciate that a variety of other embodiments can be used to similarly provide the various secure communications between the service controller 122 and the service processor 115 (e.g., using different software and/or hardware architectures to provide secure communications, such as using additional and/or fewer elements/functions or other design choices for providing such secure communications).

In some embodiments, an efficient and effective communication framing structure between the service processor and service controller is provided, and the following embodiments (e.g., as shown and described with respect to FIG. 33) teach such a structure that packs the various service processor agent control plane communications and the various service controller element control plane connections into a format that does not consume excessive bandwidth to enable a continuous control plane connection between the device and service controller. In some embodiments, an efficient and effective communication framing structure between the service processor and service controller is provided to buffer such communication messages for some period of time before framing and transmitting, such as in a heartbeat frequency that is based on rate of service usage. In some embodiments, an efficient and effective communication framing structure between the service processor and service controller is provided to allow for the frame to be easily packed, encrypted, decoded, unpacked and the messages distributed. In view of the various embodiments described herein, it will be apparent to one of ordinary skill in the art that many framing structures will work for the intended purpose of organizing or framing agent communications and the uniqueness and importance of combining such a system element with the device service controller functions, the service processor functions, the service control verification functions and/or the other purposes.

Figure 33:
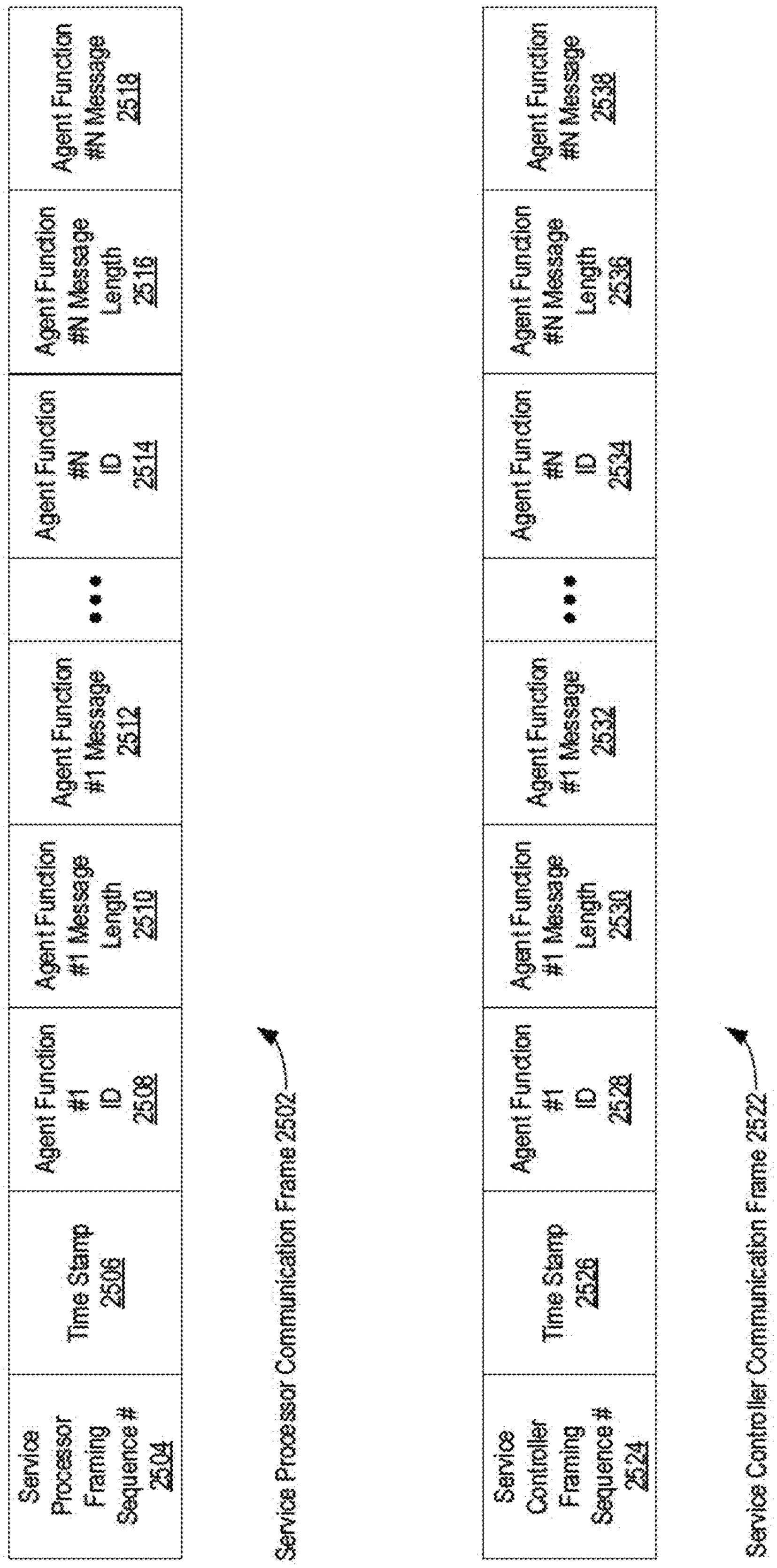
FIG. 33 is a functional diagram illustrating framing structure of a service processor communication frame and a service controller communication frame in accordance with some embodiments.

FIG. 33 is a functional diagram illustrating a framing structure of a service processor communication frame 2502 and a service controller communication frame 2522 in accordance with some embodiments. In particular, the service control device link 1691 of the service processor 115 and the service control service link 1638 of the service controller 122 (e.g., as shown in FIG. 32) provide for secure control plane communication over the service control link 1653 between the service processor 115 and the service controller 122 using communication frames in the format of the service processor communication frame 2502 and the service controller communication frame 2522 as shown in FIG. 33 in accordance with some embodiments. As shown, the service processor communication frame 2502 includes a service processor framing sequence number 2504, a time stamp 2506, an agent first function ID 2508, an agent first function message length 2510, an agent first function message 2512, and assuming more than one message is being transmitted in this frame, an agent Nth function ID 2514, an agent Nth function message length 2516, and an agent Nth function message 2518. Accordingly, the service processor communication frame 2502 can include one or more messages as shown in FIG. 33, which can depend on networking frame length requirements and/or other design choices. Similarly, as shown, the service controller communication frame 2522 includes a service controller framing sequence number 2524, a time stamp 2526, an agent first function ID 2528, an agent first function message length 2530, an agent first function message 2532, and assuming more than one message is being transmitted in this frame, an agent Nth function ID 2534, an agent Nth function message length 2536, and an agent Nth function message 2538. Accordingly, the service controller communication frame 2522 can include one or more messages as shown in FIG. 33, which can depend on networking frame length requirements and/or other design choices.

FIGS. 34A through 34H provide tables summarizing various service processor heartbeat functions and parameters (e.g., implemented by various agents, components, and/or functions implemented in software and/or hardware) in accordance with some embodiments. Many of these heartbeat functions and parameters are similarly described above, and the tables shown in FIGS. 34A-34H are not intended to be an exhaustive summary of these heartbeat functions and parameters, but rather are provided as an aid in understanding these functions and parameters in accordance with some heartbeat based embodiments described herein.

FIGS. 35A through 35M provide tables summarizing various device-based service policy implementation verification techniques in accordance with some embodiments. Many of these device-based service policy implementation verification techniques are similarly described above, and the tables shown in FIGS. 35A through 35M are not intended to be an exhaustive summary of these device-based service policy implementation verification techniques, but rather are provided as an aid in understanding these techniques in accordance with some device-based service policy embodiments described herein.

FIGS. 36A through 36D provide tables summarizing various techniques for protecting the device-based service policy from compromise in accordance with some embodiments. Many of these techniques for protecting the device-based service policy from compromise are similarly described above, and the tables shown in FIGS. 36A through 36D are not intended to be an exhaustive summary of these techniques for protecting the device-based service policy from compromise, but rather are provided as an aid in understanding these techniques in accordance with some device-based service policy embodiments described herein.

Device Assisted Service Control and Traffic Control

As described below, various techniques are disclosed for implementing device-assisted traffic shaping and service control at the lower levels of service usage policy implementation.

Figure 37:
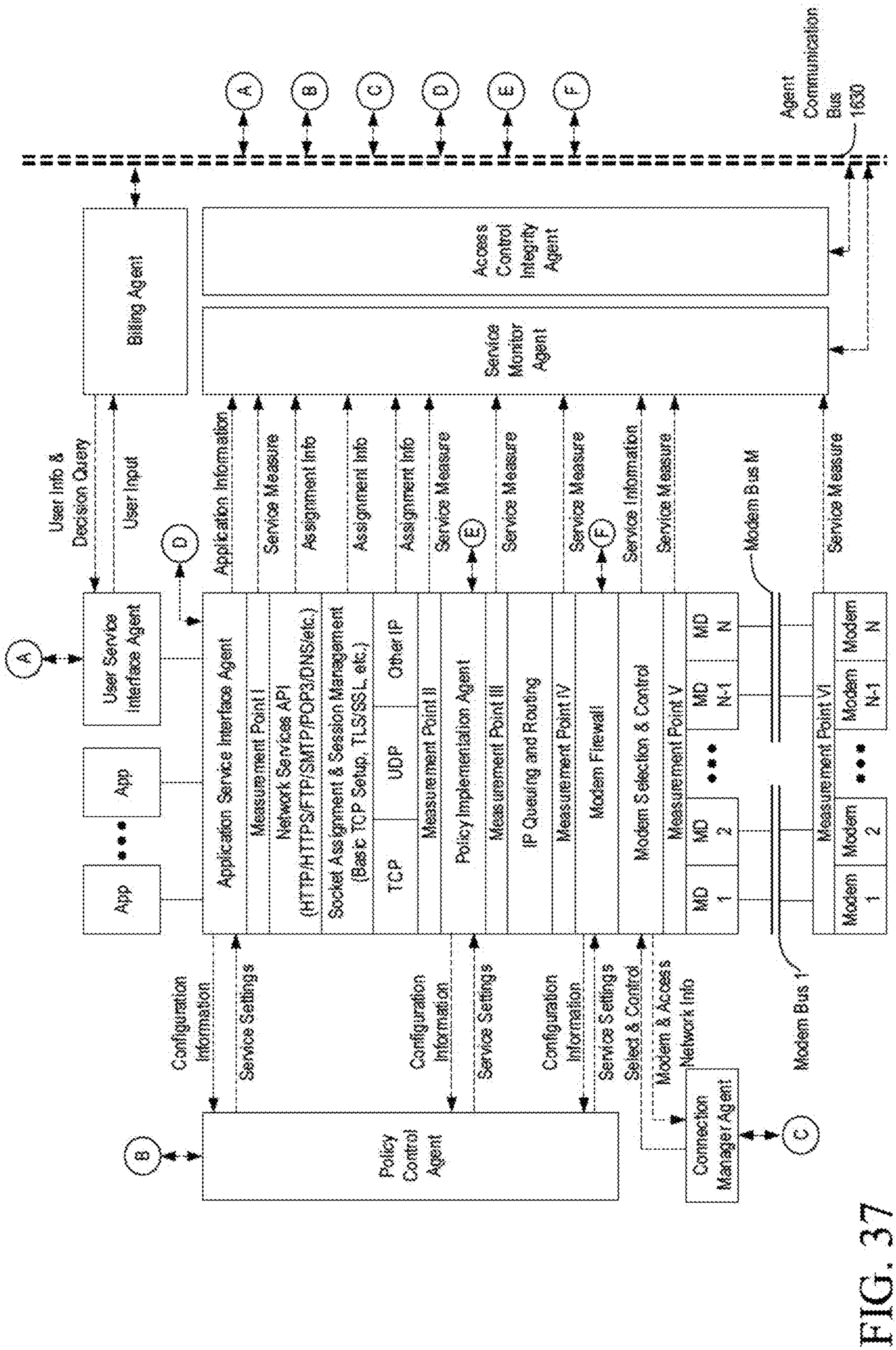
FIG. 37 is a functional diagram illustrating a device communications stack that allows for implementing verifiable traffic shaping policy, access control policy and/or service monitoring policy in accordance with some embodiments.

FIG. 37 is a functional diagram illustrating a device communications stack that allows for implementing verifiable traffic shaping policy, access control policy and/or service monitoring policy in accordance with some embodiments. As shown, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or in some embodiments the modem firewall agent 1655 or the application interface agent 1693, in making a determination regarding the traffic parameters or type once the traffic is farther down in the communication stack where it is sometimes difficult or impossible to make a complete determination of traffic parameters. For example, a detailed set of embodiments describing how the various measurement points can be used to help strengthen the verification of the service control implementation are described herein, including, for example, the embodiments described with respect to FIG. 24 and FIG. 29. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

It will be appreciated that although the implementation/use of any or all of the measurement points illustrated in FIG. 37 is not required to have an effective implementation, such as was similarly shown with respect to various embodiments described herein, such as with respect to FIGS. 27 and 29, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack (e.g., such as for embodiments similarly described herein with respect to FIGS. 43 and 44) where, for example, it is more difficult to circumvent and can be more difficult to access for tampering purposes if the modem is designed with the proper software and/or hardware security to protect the integrity of the modem stack and measurement point(s).

Referring to FIG. 37, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multi-mode device-based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent tampering of the service controls. In some embodiments, the modem firewall is implemented farther up the stack, possibly in combination with other layers as indicated in other figures. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer. As shown, an IP queuing and routing layer is separate from the policy implementation layer where the policy implementation agent implements a portion of the traffic control and/or service usage control policies. As described herein, in some embodiments, these functions are separated so that a standard network stack function can be used for IP queuing and routing, and the modifications necessary to implement the policy implementation agent functions can be provided in a new layer inserted into the standard stack. In some embodiments, the IP queuing and routing layer is combined with the traffic or service usage control layer. Examples of this combined functionality are shown and described with respect to FIGS. 39, 40, and 41. For example, a combined routing and policy implementation layer embodiment can also be used with the other embodiments, such as shown in FIG. 37. Various detailed embodiments describing how the policy implementation layer can control traffic or other service usage activities are described with respect to FIG. 46. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 37.

As shown, the application service interface layer is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

Various applications and/or a user service interface agent communicate via this communications stack, as shown (illustrating such communications with a reference (A)). Also, the billing agent, which is in communication with the agent communication bus 1630, communicates user information and decision query and/or user input to the user service interface agent, as shown. The policy control agent communicates service settings and/or configuration information via this communications bus 1630, as shown (illustrating such communications with a reference (B) via the application layer, policy implementation agent layer, which is lower in the communications stack as shown, and/or the modem firewall layer). The connection manager agent communicates select and control commands and/or modem and access network information via this communications stack, as shown (illustrating such communications with a reference (C) via the modem selection and control layer). Various other communications (e.g., service processor and/or service controller related communications, such as service usage measure information and/or application information) are provided at various levels of this communications stack, as shown (illustrating such communications with references (D) at the application layer, (E) at the policy implementation agent layer, and (F) at the modem firewall layer).

As shown in FIG. 37, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

In some embodiments, one or more of the networking stack modifications described herein in combination one or more of the service verification and tamper prevention techniques described herein is provided. As similarly described with respect to FIG. 37, the various example embodiments for assisting service control verification described herein and as summarized in the example tables provided in FIGS. 34, 35, and 36 can be employed individually or in combination to create increasingly secure cross-functional service control verification embodiments. In FIG. 37, the presence of the access control integrity agent, policy control agent, service monitor agent and the other agents that perform verification and/or tamper prevention functions illustrates verifiable service control aspects in accordance with some embodiments. Furthermore, the presence of the billing agent combined with the service verification and/or tamper prevention agents and techniques described herein provides for a set of verifiable billing embodiments for service billing, service billing offset corrections, bill by account, transaction billing and other billing functions. In addition, the presence of the user service interface agent in combination with the service control agent functions in the modified networking stack provide for embodiments involving a combination of service control with user preferences, which as described herein, provides the user with the capability to optimize service versus service cost in a network neutral manner. In some embodiments, the user control of service control policy is provided along with the service control verification and/or tamper prevention. The presence of the policy control agent that in some embodiments implements a higher than most basic level of policy decision and control with the policy implementation agents in the modified networking stack allows for, for example, the device to possess the capability to implement a higher level of service control for the purpose of obtaining a higher level service usage or service activity objective. In some embodiments, the application layer tagging in combination with other embodiments described herein provides for deep service activity control that is verifiable.

In some embodiments, verifiable traffic shaping as described herein can be performed using the device communications stack in a variety of embodiments for the combination of service control within the networking stack and service control verification and/or tamper prevention, with various embodiments depicted in FIGS. 37 through 45. Additional levels of detail regarding how such embodiments can be used to implement verifiable traffic shaping are provided in and described with respect to FIGS. 46 through 48 which depict example functional diagrams of packet processing flows for verifiable traffic shaping or service activity control in a device service processor for both upstream and downstream flows. Along with several other interesting features embodied in FIGS. 46 through 48, application traffic layer tagging is depicted in additional detail in accordance with some embodiments. For example, the application interface agent can determine service data usage at the application layer using measurement point I and a local service usage counter, and can, for example, pass this information to the service monitor agent. If service usage exceeds a threshold, or if using a service usage prediction algorithm results in predicted service usage that will exceed a threshold, then the user can be notified of which applications are causing the service usage overrun or potential service usage overrun, via the user service interface agent. The user can then identify which application service (e.g., traffic associated with a specified high service use or non-critical application, such as, for example, a high bandwidth consumption social networking website or service, media streaming website or service, or any other high bandwidth website or service transmitting and/or receiving data with the service network) that the user prefers to throttle. As another example, the user could select a service policy that allows for video chat services until those services threaten to cause cost over-runs on the user's service plan, and at that time the service policy could switch the chat service to voice only and not transmit or receive the video. The traffic associated with the user specified application can then be throttled according to user preference input. For example, for downstream traffic, packets (e.g., packets that are virtually or literally tagged and/or otherwise associated with the application traffic to be throttled) from the access network can be buffered, delayed and/or dropped to throttle the identified application traffic. For upstream traffic, packets (e.g., packets that are virtually or literally tagged and/or otherwise associated with the application traffic to be throttled) can be buffered, delayed and/or dropped before being transmitted to the access network to throttle the identified application traffic. As similarly described above, traffic shaping as described herein can be verified, such as by the service monitor agent via the various measurement points and/or using other agents.

Figure 38:
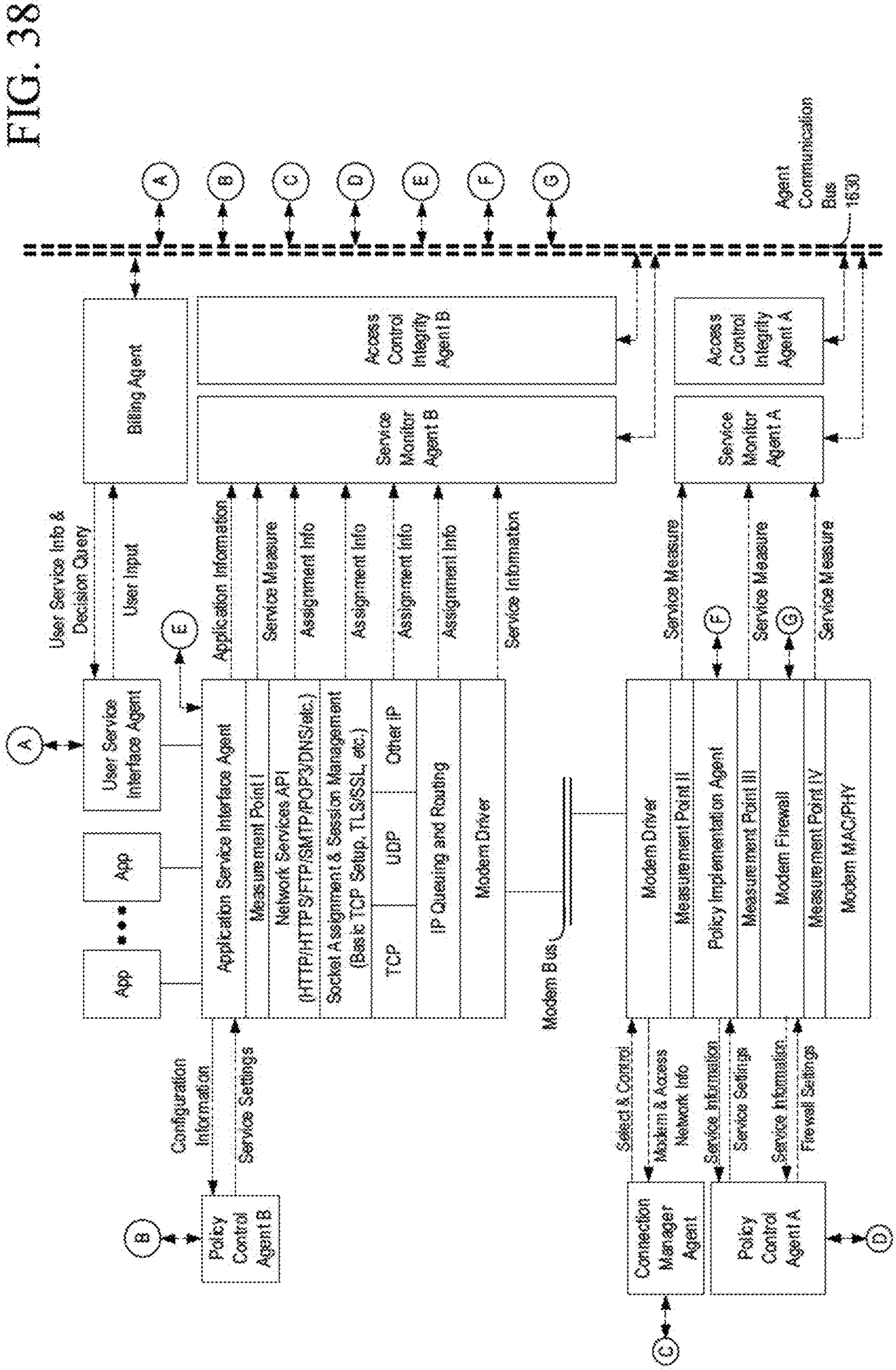
FIG. 38 is another functional diagram illustrating the device communications stack that allows for implementing traffic shaping policy, access control policy and/or service monitoring policy in accordance with some embodiments.

The embodiments depicted in FIG. 38 and other figures generally require enhancements to conventional device networking communication stack processing. For example, these enhancements can be implemented in whole or in part in the kernel space for the device OS, in whole or in part in the application space for the device, or partially in kernel space and partially in application space. As described herein, the networking stack enhancements and the other elements of the service processor can be packaged into a set of software that is pre-tested or documented to enable device manufacturers to quickly implement and bring to market the service processor functionality in a manner that is compatible with the service controller and the applicable access network(s). For example, the service processor software can also be specified in an interoperability standard so that various manufacturers and software developers can develop service processor implementations or enhancements, or service controller implementations or enhancements that are compatible with one another.

FIG. 38 is another functional diagram illustrating the device communications stack that allows for implementing traffic shaping policy, access control policy and/or service monitoring policy in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 38 are possible where more or less of the service processor functionality is moved onto the modem subsystem or onto the device application processor subsystem. For example, such embodiments similar to that depicted in FIG. 38 can be motivated by the advantages of containing some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 38, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 38.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent B communicates service settings and/or configuration information via this communications stack, as shown (illustrating such communications with a reference (B)) via the application layer. The policy control agent A communicates service settings and/or configuration information via this communications stack, as shown (illustrating such communications with a reference (D)) via the policy implementation agent layer and/or the modem firewall layer. The connection manager agent communicates select & control commands and/or modem and access network information via this communications stack, as shown (illustrating such communications with a reference (C)) via the modem driver layer. Various other communications (e.g., service processor and/or service controller related communications, such as service usage measure information, and/or application information) are provided at various levels of this communications stack, as shown (illustrating such communications with references (E)) at the application layer through the modem driver layer with the service monitor agent B as shown (and an access control integrity agent B is also shown), and communications with references (F) at the policy implementation agent layer and (G) at the modem firewall layer with the service monitor agent A as shown (and an access control integrity agent A is also shown). In some embodiments, the service usage policy verification or tamper prevention embodiments described herein can be applied, in isolation or in combination, in the context of FIG. 39 to provide for embodiments with increasing levels of service usage policy control verification certainty, such as provided with FIGS. 34A-34H, 35A-35M and 36A-36D.

Figure 39:
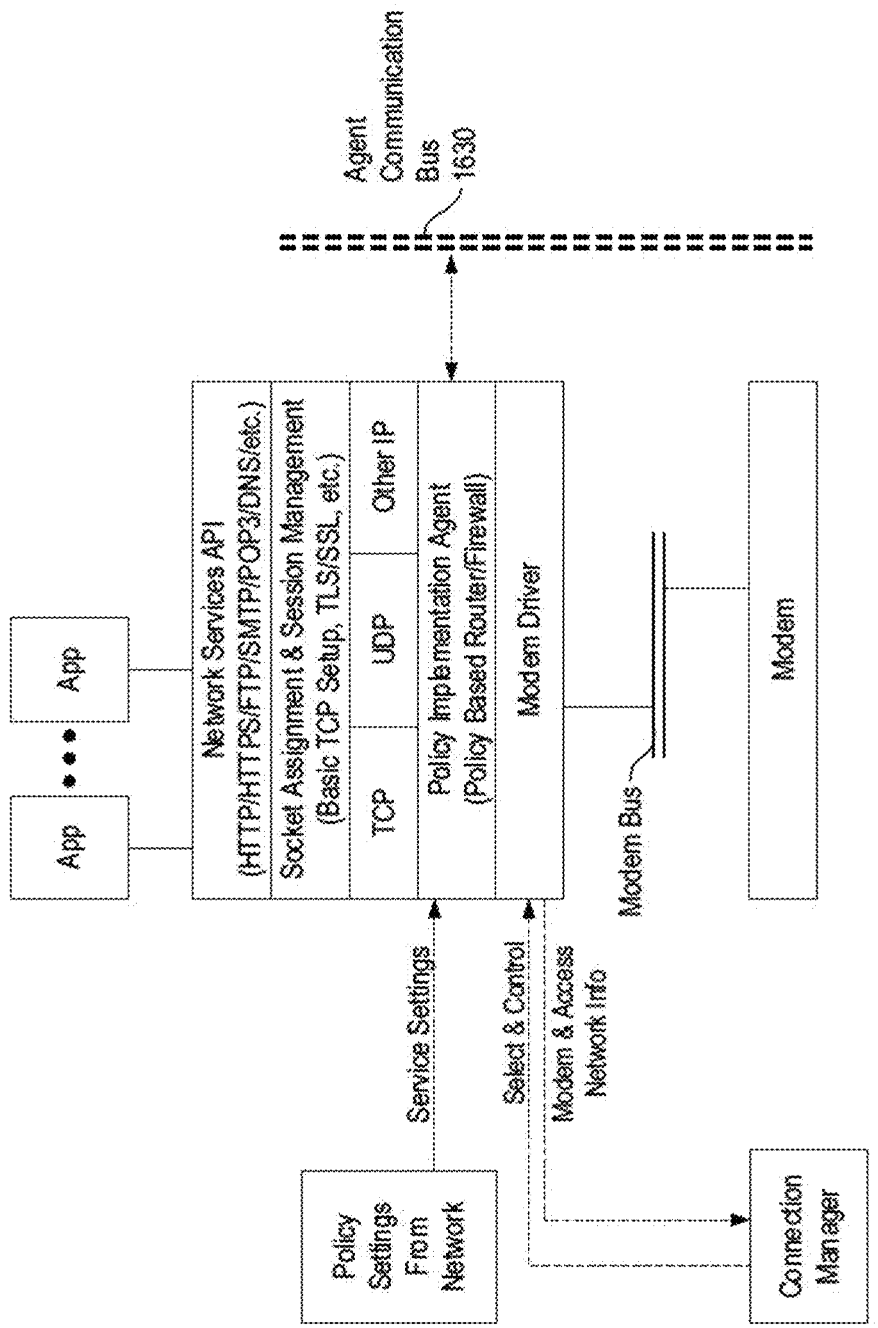
FIG. 39 is another functional diagram illustrating the device communications stack that allows for implementing traffic shaping policy, access control policy and/or service monitoring policy in accordance with some embodiments.

FIG. 39 is another functional diagram illustrating the device communications stack that allows for implementing traffic shaping policy, access control policy and/or service monitoring policy in accordance with some embodiments. In some embodiments, the service processor is a simplified implementation. For example, this approach can be used for applications with less capable device application processors, rapid time to market needs, fewer service usage control needs, and/or other reasons that lead to a need for a lower complexity implementation.

Referring to FIG. 39, describing the device communications stack from the bottom to the top of the stack as shown, the device communications stack provides a communication layer for the modem layer at the bottom of the device communications stack. The modem driver layer resides above the modem bus layer as shown. In the next higher layer, the policy implementation agent is provided, and the policy implementation agent is also in communication with the agent communication bus 1630 as shown. The next higher layer is shown as the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem driver as shown. Although FIG. 39 does not depict all of the service usage control verification functions provided by certain embodiments calling for additional service verification or control agents, a high level of service policy implementation verification certainty can be achieved within the context of the embodiments depicted in FIG. 39 by applying a subset of the service usage policy verification or tamper prevention embodiments described herein. For example, the embodiments depicted in FIG. 39 can be combined with the service controller embodiments that utilize IPDRs to verify service usage is in accordance with the desired service policy. There are also many other service usage control embodiments described herein that can be applied in isolation or in combination to the embodiments depicted in FIG. 39 to provide increasing levels of service usage control verification certainty, as will be apparent to one of ordinary skill in the art in view of FIGS. 34A-34H, 35A-35M and 36A-36D and the various embodiments described herein.

Figure 40:
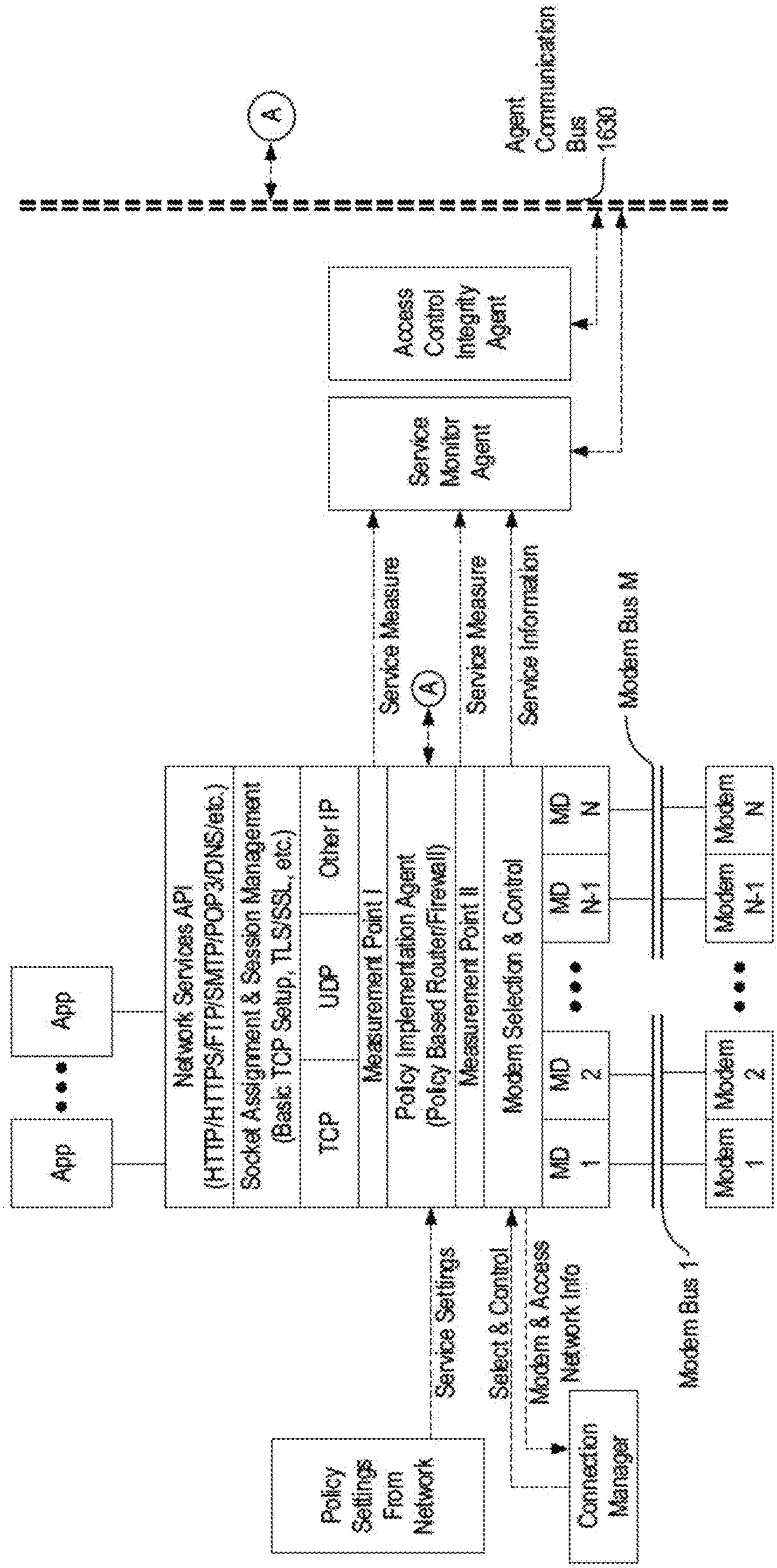
FIG. 40 is another functional diagram illustrating the device communications stack that allows for implementing traffic shaping policy, access control policy and/or service monitoring policy in accordance with some embodiments.

FIG. 40 is another functional diagram illustrating the device communications stack that allows for implementing traffic shaping policy, access control policy and/or service monitoring policy in accordance with some embodiments. In some embodiments, the service processor is a simplified implementation embodiment with device-based monitoring and integrity control. For example, FIG. 40 provides for somewhat higher complexity (e.g., relative to the embodiments depicted in FIG. 38) in exchange for the enhanced service monitoring, control or verification that are possible by implement additional agent embodiments, such as the service monitor agent and the access control integrity agent functions.

Referring to FIG. 40, describing the device communications stack from the bottom to the top of the stack as shown, the device communications stack provides a communication layer for each of the modems of the device at the bottom of the device communications stack. Measurement point II resides above the modem selection & control layer, which resides above the modem buses for each modem. Measurement point I resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem selection and control layer as shown. The service monitor agent, which is also in communication with the agent communication bus 1630, communicates with various layers of the device communications stack. For example, the service monitor agent, performs monitoring at each of measurement points I and II, receiving information including application information, service usage and other service related information, and assignment information. An access control integrity agent is in communication with the service monitor agent via the agent communications bus 1630, as also shown. As similarly described with respect to FIGS. 38 and 39, many of the service usage control verification embodiments described herein can be applied in isolation or in combination in the context of FIG. 40.

Figure 41:
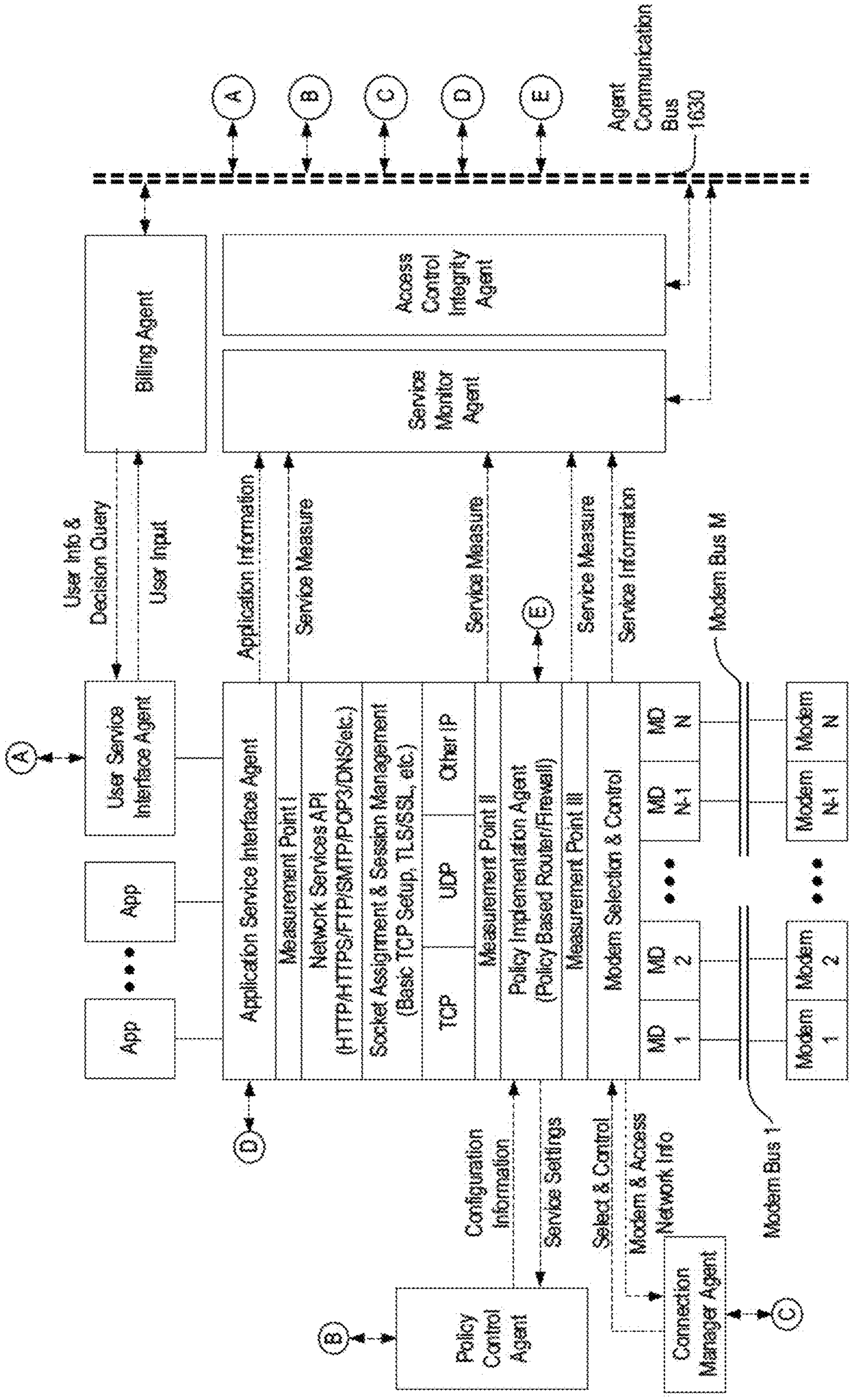
FIG. 41 is another functional diagram illustrating the device communications stack that allows for implementing traffic shaping policy, access control policy and/or service monitoring policy in accordance with some embodiments.

FIG. 41 is another functional diagram illustrating the device communications stack that allows for implementing traffic shaping policy, access control policy and/or service monitoring policy in accordance with some embodiments. Referring to FIG. 41, describing the device communications stack from the bottom to the top of the stack as shown, the device communications stack provides a communication layer for each of the modems of the device at the bottom of the device communications stack. Measurement point III resides above the modem selection & control layer, which resides above the respective modem buses for each modem. Measurement point II resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 41.

Applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. The connection manager agent communicates select & control commands and/or modem and access network information via this communications stack, as shown (illustrating such communications with a reference (C)) via the modem selection and control layer. Various other communications (e.g., service processor and/or service controller related communications, such as service usage measure information, application information) are provided at various levels of this communications stack, as shown (illustrating such communications with references (D)) at the application layer and (E) at the policy implementation agent layer.

As shown in FIG. 41, a service monitor agent, which is also in communication with the agent communication bus 1630, communicates with various layers of the device communications stack. For example, the service monitor agent, performs monitoring at each of measurement points I through III, receiving information including application information, service usage and other service related information, and assignment information. An access control integrity agent is in communication with the service monitor agent via the agent communications bus 1630, as also shown. As similarly described with respect to FIGS. 38, 39 and 40, many of the service usage control verification embodiments disclosed herein can be applied in isolation or in combination in the context of FIG. 41.

Figure 42:
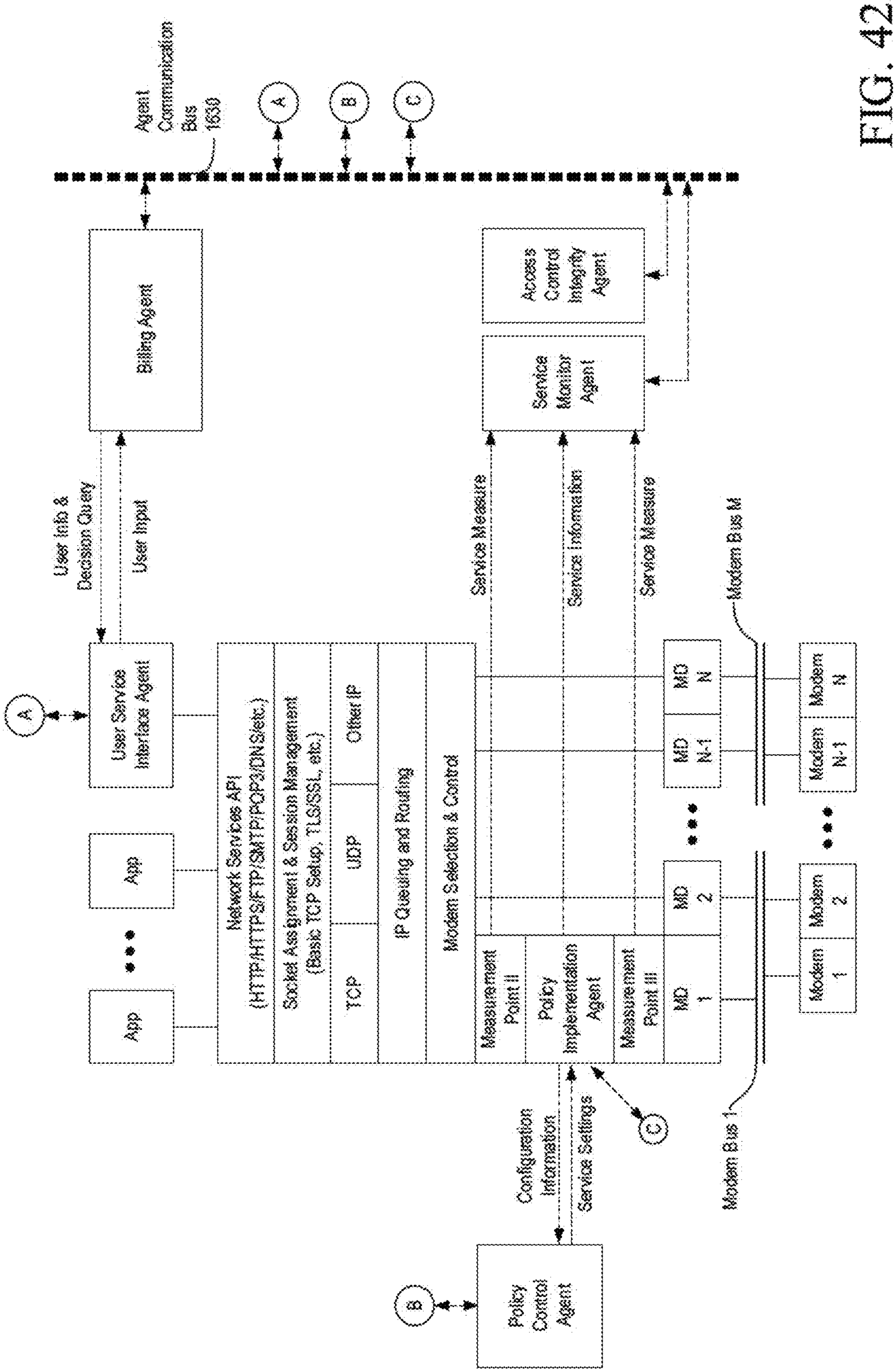
FIG. 42 is another functional diagram illustrating the device communications stack that allows for implementing traffic shaping policy, access control policy and/or service monitoring policy in accordance with some embodiments.

FIG. 42 is another functional diagram illustrating the device communications stack that allows for implementing traffic shaping policy, access control policy and/or service monitoring policy in accordance with some embodiments. In some embodiments, the data path processing for the service processor is provided in conjunction with a single modem driver as shown. As shown, the service processor communication stack processing is provided below the standard network communication stack and in combination with a modem driver (e.g., and this approach can be extended to more than one modem).

Referring to FIG. 42, describing the device communications stack from the bottom to the top of the stack as shown, the device communications stack provides a communication layer for each of the modems of the device at the bottom of the device communications stack. Measurement point II resides above the modem driver 1 layer. Measurement point I resides between the policy implementation agent (policy based router/firewall) layer and the modem selection and control layer, for the modem driver 1 stack in this single modem driver embodiment. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 42, applications communicate with the device communications stack via the network services API as shown (illustrating such communications with a reference (A)). Policy settings from the network (e.g., service settings)

are communicated with the policy implementation agent as shown (illustrating such communications with a reference (B)). The service monitor agent, which is also in communication with the agent communication bus 1630, communicates with policy implementation agent layer of the device communications stack. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information, application information) are provided at various levels of this communications stack, as shown (illustrating such communications with references (C)) at the policy implementation agent layer. Also, the billing agent, which is in communication with the agent communication bus 1630 communications user information and decision query and/or user input to the user service interface agent, as shown. As similarly described with respect to FIGS. 38, 39, 40 and 41, many of the service usage control verification embodiments disclosed herein can be applied in isolation or in combination in the context of FIG. 42.

Figure 43:
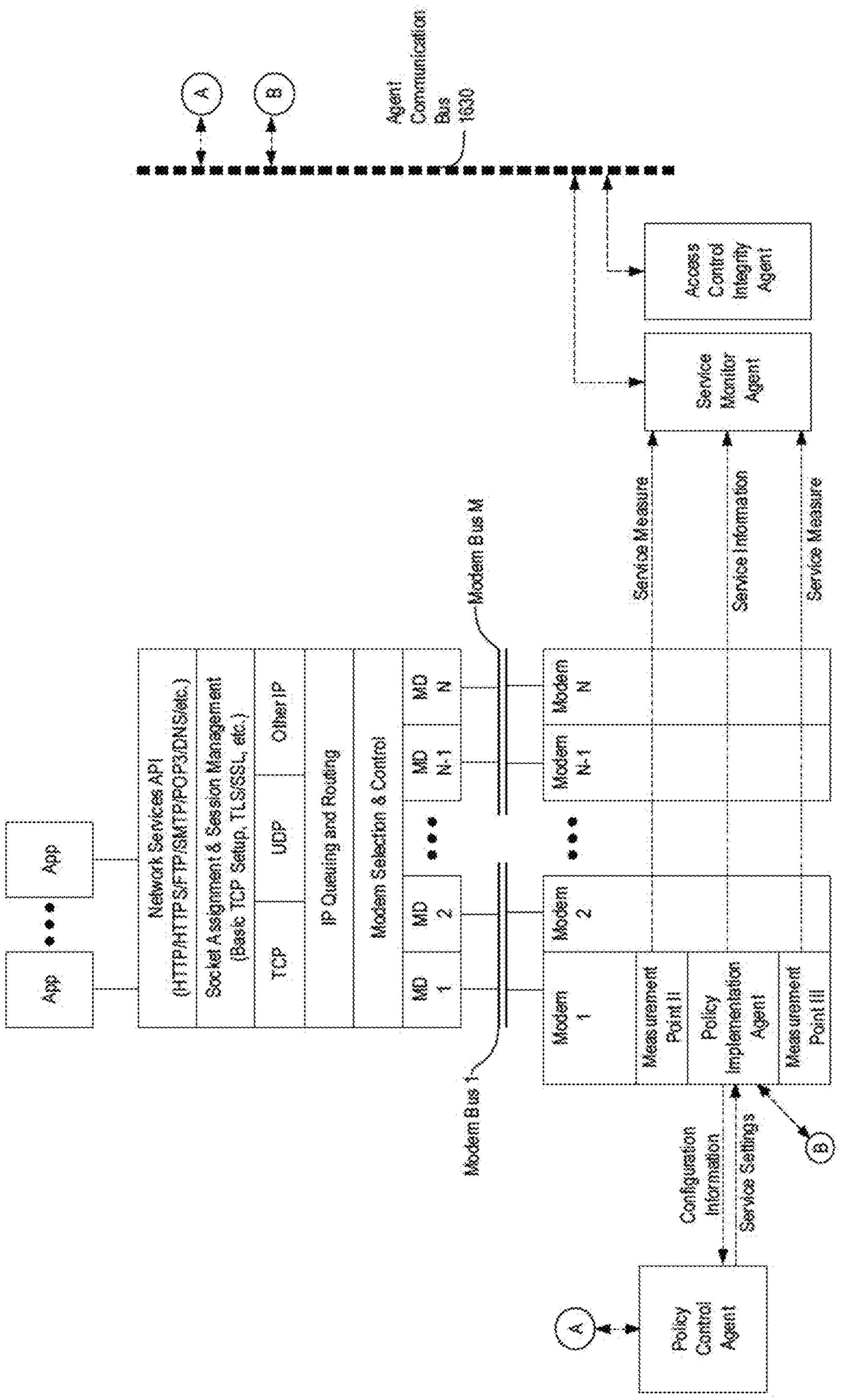
FIG. 43 is another functional diagram illustrating the device communications stack that allows for implementing traffic shaping policy, access control policy and/or service monitoring policy in accordance with some embodiments.

FIG. 43 is another functional diagram illustrating the device communications stack that allows for implementing traffic shaping policy, access control policy and/or service monitoring policy in accordance with some embodiments. In particular, FIG. 43 illustrates a single modem hardware embodiment as shown. As shown, the service processor network communication stack processing is provided on the modem hardware (e.g., and this approach can be extended to more than one modem). This approach allows for the service processor to be distributed as a standard feature set contained in a modem chipset hardware of software package or modem module hardware or software package, which, for example, can provide for easier adoption or development by device OEMs, a higher level of differentiation for the chipset or modem module manufacturer, higher levels of performance or service usage control implementation integrity, or other benefits.

Referring to FIG. 43, describing the device communications stack from the bottom to the top of the stack as shown, the device communications stack provides a communication layer for each of the modems of the device at the bottom of the device communications stack. As shown, measurement points I and II and the policy implementation agent reside on the modem 1 (e.g., implemented as hardware and/or software on modem 1). Measurement point I resides above the policy implementation agent (policy based router/firewall) layer, and measurement point II resides below the policy implementation agent later. The modem selection and control layer resides above the modem drivers layer, as shown. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 43, applications communicate with the device communications stack via the network services API as shown. Policy settings from the network (e.g., service settings) are communicated with the policy implementation agent as shown (illustrating such communications with a reference (A)). The service monitor agent, which is also in communication with the agent communication bus 1630, communicates with policy implementation agent layer of the modem 1. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information and/or application information) are provided at various levels of this communications stack, as shown (illustrating such communications with references (B)) at the policy implementation agent layer. As similarly described with respect to FIGS. 38, 39, 40, 41 and 42, many of the service usage control verification embodiments disclosed herein can be applied in isolation or in combination in the context of FIG. 43.

Figure 44:
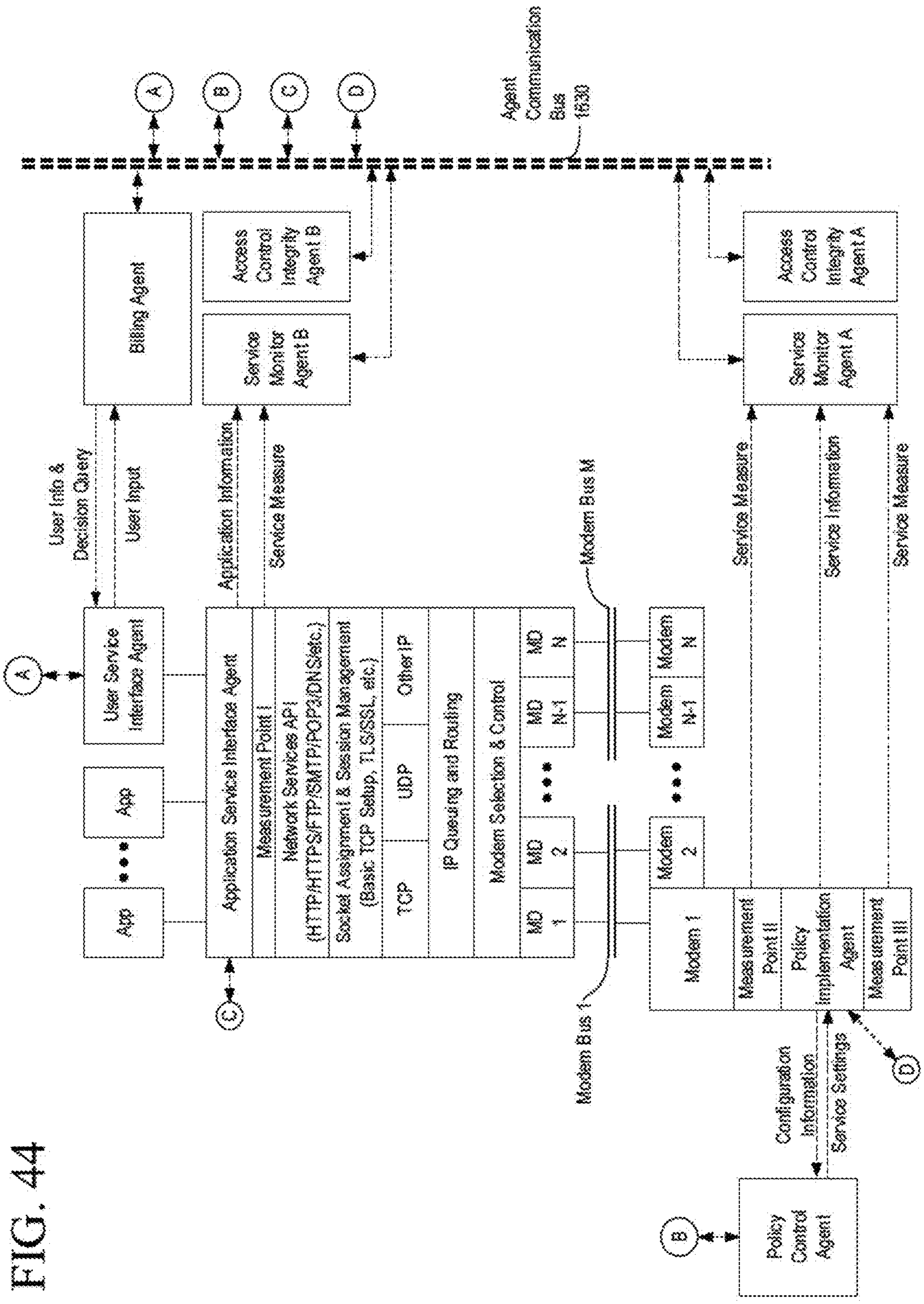
FIG. 44 is another functional diagram illustrating the device communications stack that allows for implementing traffic shaping policy, access control policy and/or service monitoring policy in accordance with some embodiments.

FIG. 44 is another functional diagram illustrating the device communications stack that allows for implementing traffic shaping policy, access control policy and/or service monitoring policy in accordance with some embodiments. In particular, FIG. 44 illustrates a single modem hardware embodiment, in which modem 1 includes a portion of the service processor networking communication stack processing and measurement points II and III and the policy implementation agent, as similarly shown in FIG. 43, and the higher levels of the device communications stack above the modem 1 layer, such as the application service interface layer, are implemented on the device application processor or in the device application processor memory as similarly described above, for example, with respect to FIG. 41, in which a measurement point I is shown between the application service interface agent layer and the network services API layer. For example, this approach allows for the application service interface agent to be provided on the device application processor or memory so that application layer service usage monitoring or control can be implemented. For example, the differences between the embodiments depicted in FIG. 44 and those of FIG. 38 include a simplified implementation and a policy control agent that is entirely implemented on the modem and not partially implemented in the application processor memory.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. Various other communications (e.g., service processor and/or service controller related communications, such as service usage measure information and/or application information) are provided at various levels of this communications stack, as shown (illustrating such communications with reference (C) at the application layer and communications with reference (D) at the policy implementation agent layer). As shown, the service monitor agent B communicates with the application service interface agent and measurement point I, and the service monitor agent A communicates with the policy implementation agent layer and measurement points II and III of the modem 1. As similarly described with respect to FIGS. 38, 39, 40, 41, 42 and 43, many of the service usage control verification embodiments disclosed herein can be applied in isolation or in combination in the context of FIG. 44.

Figure 45:
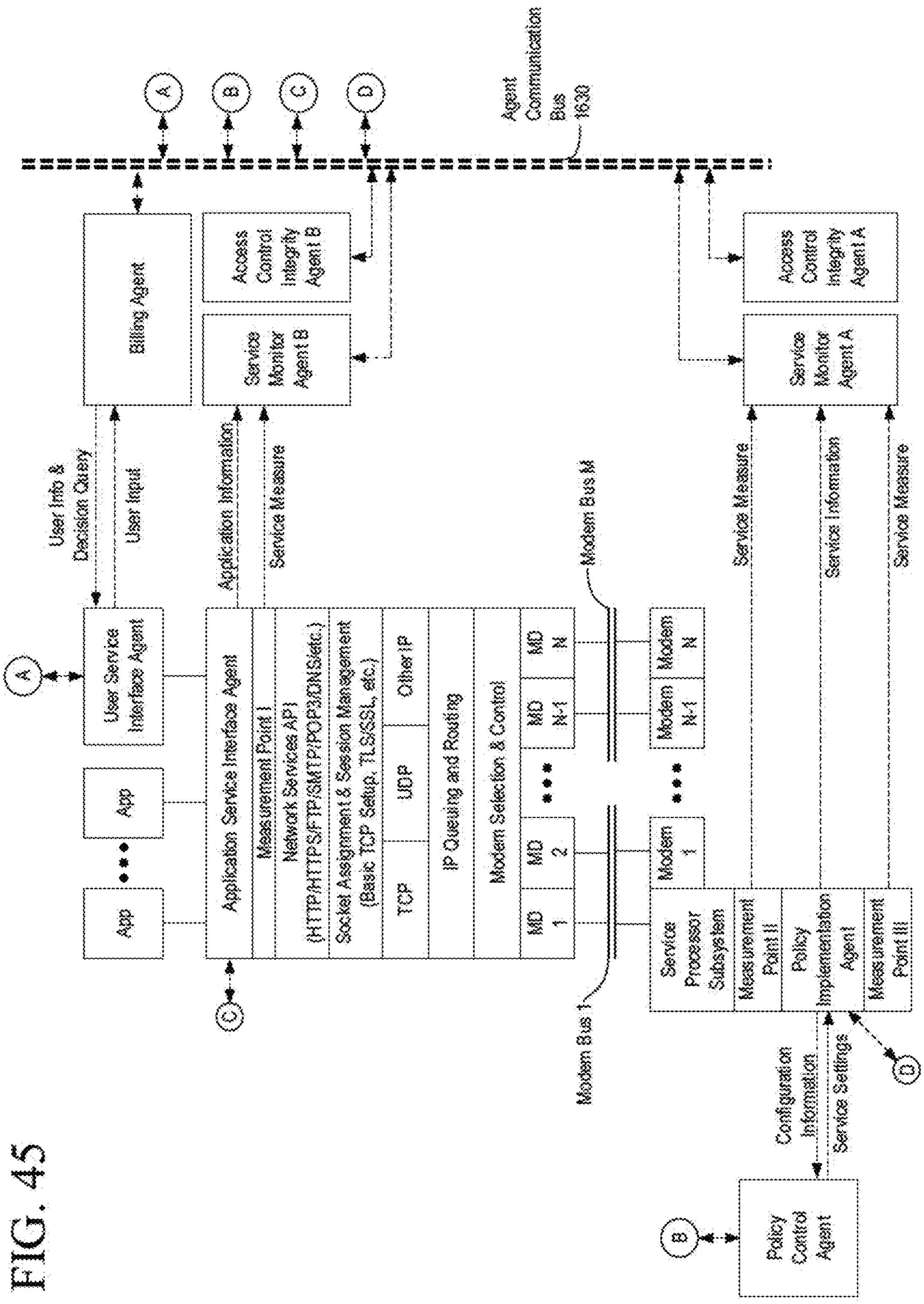
FIG. 45 is another functional diagram illustrating the device communications stack that allows for implementing traffic shaping policy, access control policy and/or service monitoring policy in accordance with some embodiments.

FIG. 45 is another functional diagram illustrating the device communications stack that allows for implementing traffic shaping policy, access control policy and/or service monitoring policy in accordance with some embodiments. In particular, FIG. 45 illustrates a device communications stack as similarly shown in FIG. 44, with the difference being that the service processor subsystem networking communication stack processing is implemented on a hardware function that is separate from the application processor and the modem. For example, this approach provides security advantages with a dedicated hardware system to protect some or all of the service usage control system from tampering. For example, some or all of the service processor can be implemented on a SIM card module. As another example, some or all of the service processor can be encapsulated on a self-contained hardware module that can be added to a device without the need to modify the networking communication stack software or hardware.

Figure 46:
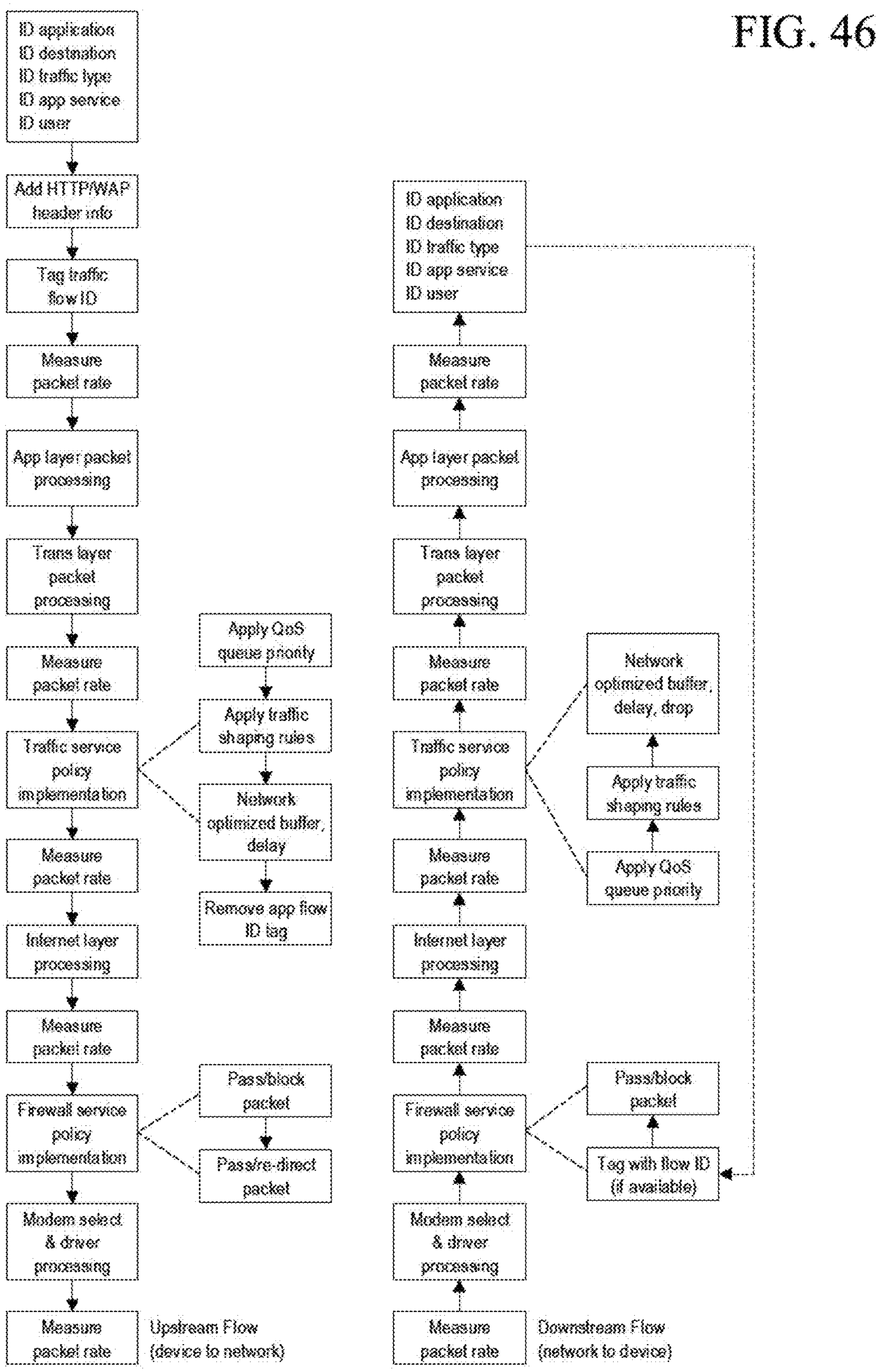
FIG. 46 is a functional diagram illustrating a device service processor packet processing flow in accordance with some embodiments.

FIG. 46 is a functional diagram illustrating a device service processor packet processing flow in accordance with some embodiments. In particular, both an example upstream service processor packet processing flow (device to the network) and an example downstream service processor packet processing flow (network to the device) are shown in FIG. 46. For example, the service processor packet processing flow can be performed by the device communications stack, such as described above with respect to FIG. 37. The various embodiments for packet processing flow depicted in FIGS. 46 through 48 are self-explanatory to one of ordinary skill in the art and not all the processing steps and flow sequences are described herein.

In some embodiments, the burst size, buffer delay, acknowledgement delay and drop rate used in upstream and downstream traffic shaping are optimized with the goal of reducing access network traffic overhead, and excess capacity usage that can result from mismatches in traffic transmission parameters with the access network MAC and PHY or from excess network level packet delivery protocol re-transmissions. In some embodiments, an application interface agent 1693 is used to literally tag or virtually tag application layer traffic so that the policy implementation agent(s) 1690 has the necessary information to implement selected traffic shaping solutions. As shown in FIG. 24, the application interface agent 1693 is in communication with various applications, including a TCP application 1604, an IP application 1605, and a voice application 1602.

Figure 47:
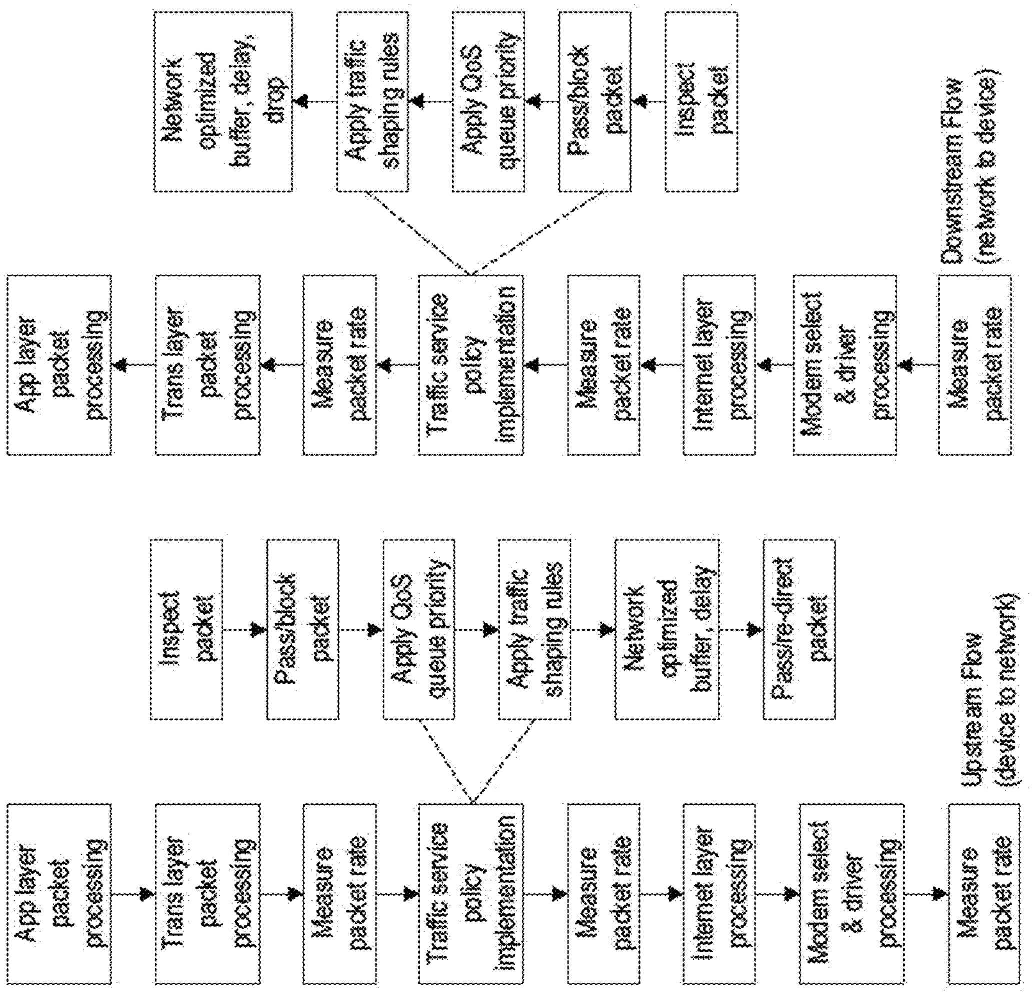
FIG. 47 is another functional diagram illustrating the device service processor packet processing flow in accordance with some embodiments.
Figure 48:
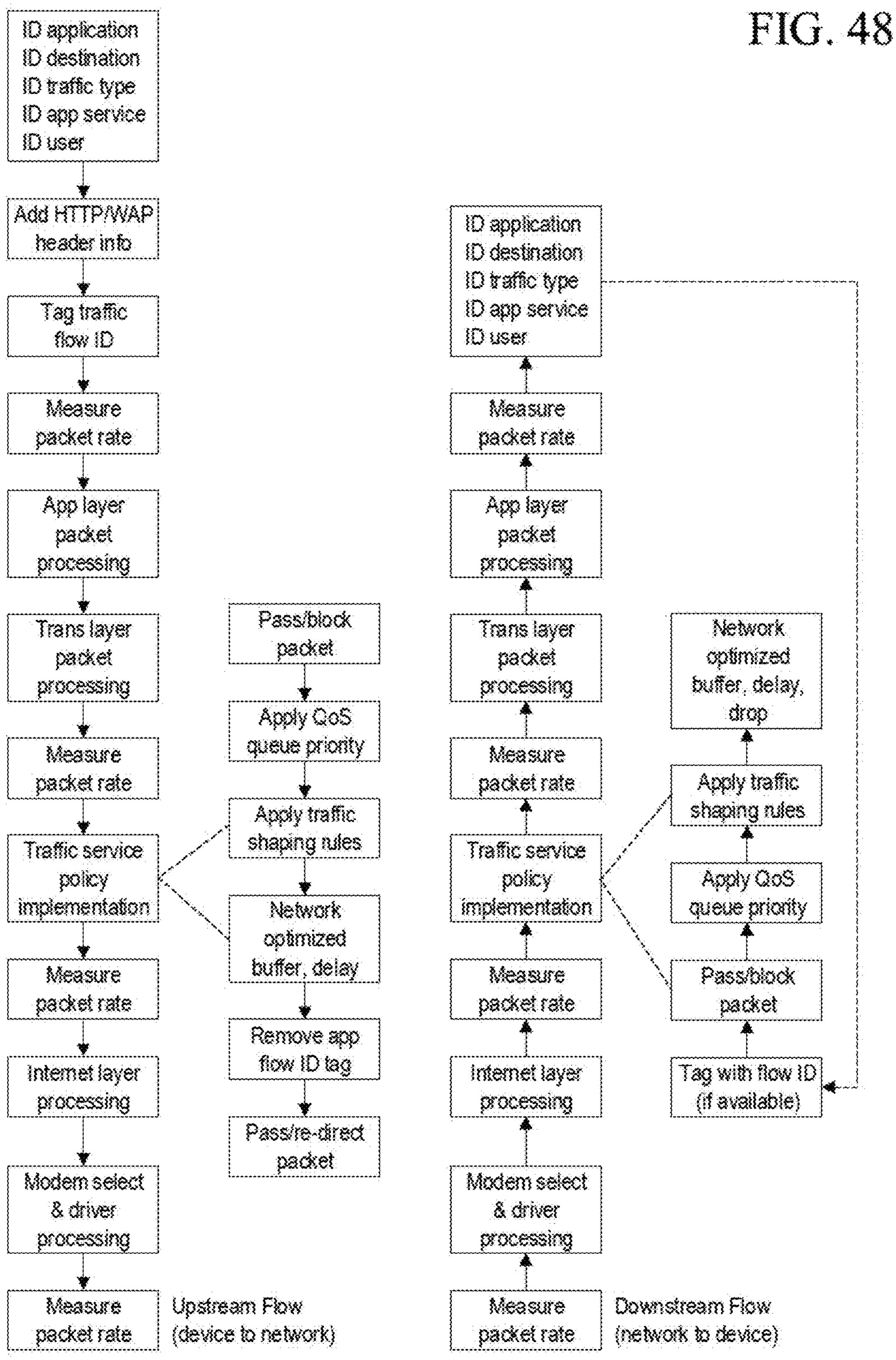
FIG. 48 is another functional diagram illustrating the device service processor packet processing flow in accordance with some embodiments.

Referring to FIGS. 46 through 48, in some embodiments, the upstream traffic service policy implementation step corresponds to the traffic shaping step described herein. Referring to FIG. 46, this step is depicted as shown as an alternate exploded view including four upstream sub-steps of apply QoS queue priority, apply traffic shaping rules, network optimized buffer/delay and remove application ID tag. An additional approach shown in FIG. 46 involves two exploded view sub-steps associated with the firewall service policy implementation step and these sub-steps are pass/block packet and pass/redirect packet. For example, the functions performed by these six sub-steps can be depicted in any number of sub-steps, the order of the steps can be appropriately performed in various different orders to provide for upstream traffic shaping within the network communication stack. For example, FIGS. 47 and 48 show the two steps of policy implementation and firewall as one step and the six exploded view sub-steps are included under the same policy implementation step and are performed in a different order than in FIG. 46. It should also be noted that a number of embodiments are possible in which the access control, traffic control or firewall functions are moved to the application service interface layer or another layer.

Referring now to the downstream portion of FIG. 46, there are two steps again termed traffic service policy implementation and firewall service policy implementation in this traffic shaping, access control and firewall example. These two packet flow processing steps are depicted as shown in the exploded view as the five sub-steps of tag with flow ID, pass/block packet, apply QoS, apply traffic shaping rules and network optimized buffer, delay, and drop. As with the upstream packet processing flow, the number of sub-steps, the order of sub-steps and the location of the sub-steps in the downstream networking stack processing can be depicted in any number of sub-steps, order and/or location, and various other embodiments will be apparent to one of ordinary skill in the art, including embodiments which locate some or all of the steps in the application service interface layer or other layers as depicted in FIGS. 47 and 48. The details of the packet flow processing design for the downstream can be somewhat more complex in certain embodiments as compared to the upstream processing in two ways. First, as described herein, in some embodiments, the packet tagging that requires application level information can require the initial portion of the packet flow burst to pass through the upstream networking communication stack until the application service interface layer can associate the packet flow with the appropriate information visible at the application level at which time the packet flow tag is communicated to the other service processor agent functions so that they can properly monitor or control the traffic associated with the flow.

Independently, another complication arises when upper layer reliable communication protocols, such as TCP, are employed in the networking stack in which the downstream transmitting end repeats the packet transmission if the receiving TCP protocol stack does not send a packet receipt acknowledge (ACK) within a certain period of time. If packets are arbitrarily delayed or dropped, then the TCP re-transmission traffic can reduce, completely eliminate or even reverse the network capacity advantage gained by reducing the average traffic speed or other transmission quality measure for one or more service activities. To solve this problem, in some embodiments, the packet traffic control parameters (e.g., downstream delay, drops, burst length, burst frequency and/or burst jitter) are optimized for TCP re-transmission efficiency so that changes in traffic control access bandwidth or speed for one or more service activities are implemented in such a manner that the TCP re-transmission delay at the network transmitting end adapts to be long enough so that wasted packet re-transmission bandwidth is reduced. In addition, and either in combination or in isolation, in some embodiments, the packet traffic control parameters (e.g., downstream delay, drops, burst length, burst frequency and/or burst jitter) can be adjusted so that the access network downstream MAC and/or PHY efficiencies are optimized.

Numerous other embodiments for the detailed implementation of packet flow processing in both downstream and upstream will be apparent to one of ordinary skill in the art in view of the various embodiments described herein. In some embodiments, as described herein, the following are provided: (A) traffic shaping is performed in a verifiable manner, (B) traffic shaping is performed in a manner that results in improved network capacity by taking into account to some degree the manner in which the access network PHY layer and/or MAC layer responds to packet parameters (e.g. burst delay, burst drops, burst length, burst frequency and/or burst jitter), (C) traffic shaping is performed in a manner that results in improved network capacity by taking into account how the packet parameters (e.g., burst delay, burst drops, burst length, burst frequency and/or burst jitter) impact layer 3 and higher ACK protocol or other network protocol network capacity efficiencies, (D) packet shaping is performed in a manner that is aware of and optimized for the particular type of communication protocol or packets being sent (e.g., TCP packets can be dropped to slow the application rate of transfer whereas UDP packets are never dropped, because there is no re-transmission), (E) a virtual or literal packet tagging system is used in a verifiable traffic shaping service control system to provide a deeper level of service monitoring and control or to simplify the processing of the packets, and/or (F) starting with these low level packet processing, traffic control or access control building blocks one or more additional layers of higher level policy control can be added on the device or in the network to create service profiles for the service provider network that define complete services, such as ambient services and many other variations of service profile settings that each define a device or user service experience and can be associated with a billing plan. For example, the use of higher layers of service profile control to form more complete service solutions starting with these relatively simple low-level traffic control, access control or firewall processing steps or functions is also described herein.

FIG. 47 is another functional diagram illustrating the device service processor packet processing flow in accordance with some embodiments. In particular, both an example upstream service processor packet processing flow (device to the network) and an example downstream service processor packet processing flow (network to the device) are shown in FIG. 47 (e.g., of a less feature rich device service processor embodiment, such as one similar to that depicted in FIG. 40).

FIG. 48 is another functional diagram illustrating the device service processor packet processing flow in accordance with some embodiments. In particular, both an example upstream service processor packet processing flow (device to the network) and an example downstream service processor packet processing flow (network to the device) are shown in FIG. 48 (e.g., of a mid-featured embodiment of a device service processor, such as one similar to that depicted in FIG. 41).

FIG. 49 provides a table summarizing various privacy levels for service history reporting in accordance with some embodiments. Many of these privacy levels are similarly described above, and the table shown in FIG. 49 is not intended to be an exhaustive summary of these privacy levels, but rather is provided as an aid in understanding these privacy levels in accordance with user privacy related embodiments described herein. For example, there are many other parameters that can be associated with privacy filtering, and as will be apparent to one of ordinary skill in the art in view of the various embodiments described herein, the unique feature of user defined or user influenced privacy filtering for service usage, service activity or CRM reports can be implemented with a variety of embodiments that are variations of those described herein.

FIGS. 50A through 50J provide tables summarizing various service policy control commands in accordance with some embodiments. Many of these service policy control commands are similarly described above, and the tables shown in FIG. 50A through J are not intended to be an exhaustive summary of these service policy control commands and do not include summaries of all the embodiments described herein, but rather are provided as a summary aid in understanding these service policy control commands in accordance with various embodiments described herein.

In some embodiments, QoS is employed for devices with a service processor 115. For example, QoS can be employed in a crowded hot spot where the service processor 115 profile has been changed from WWAN to WLAN, but the WLAN is backed up as too many users are trying to use it. The service processor 115 can have a hierarchical access to the hotspot at that point; or the service processor 115 that pays less can be throttled while those that pay more are opened up; or the service processor 115 can initiate a policy that slows down transmissions to improve trunking efficiency.

Figure 51A:
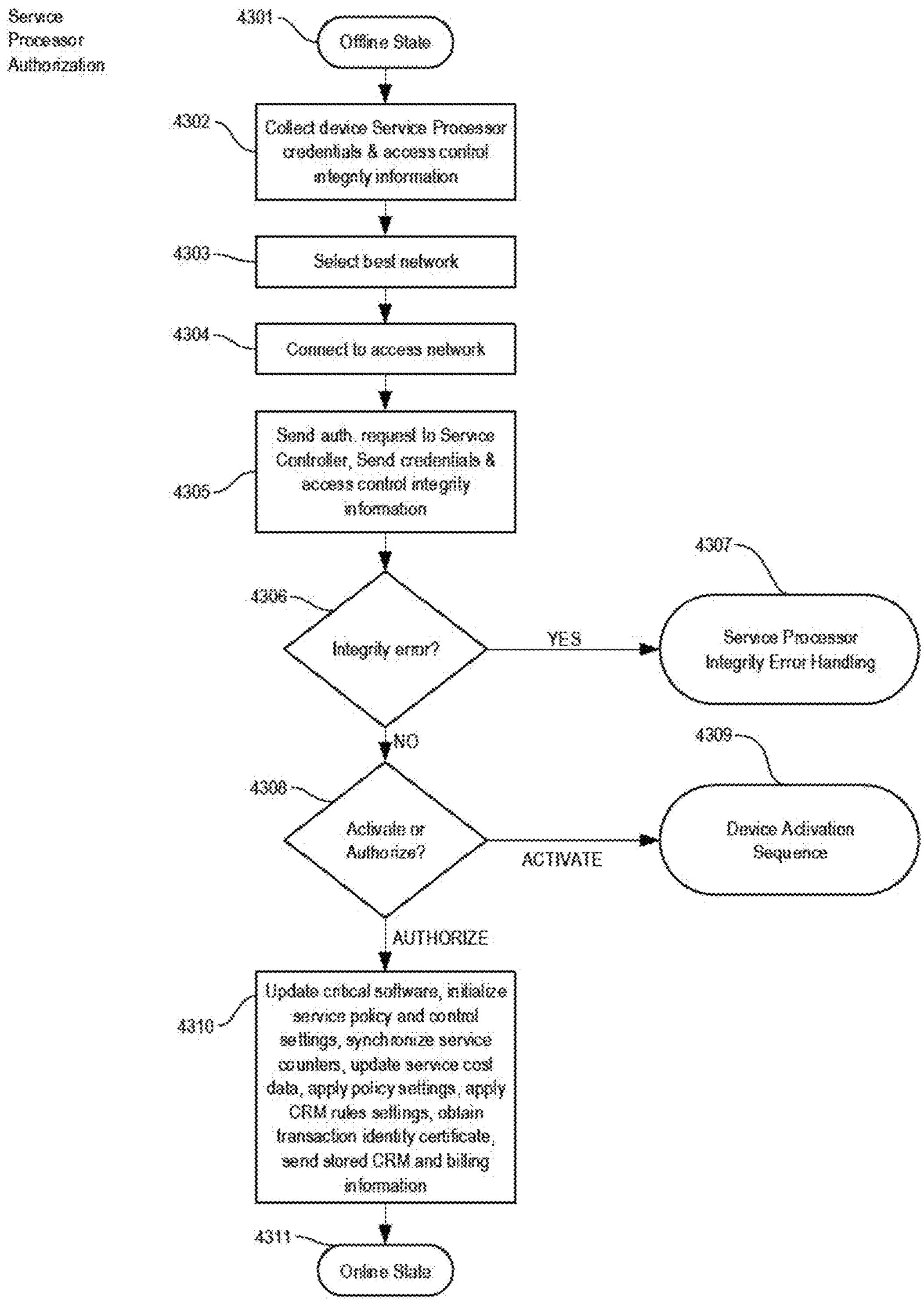
FIGS. 51A through 51B are flow diagrams illustrating a flow diagram for a service processor authorization sequence as shown in FIG. 51A and a flow diagram for a service controller authorization sequence as shown in FIG. 51B in accordance with some embodiments.
Figure 51B:
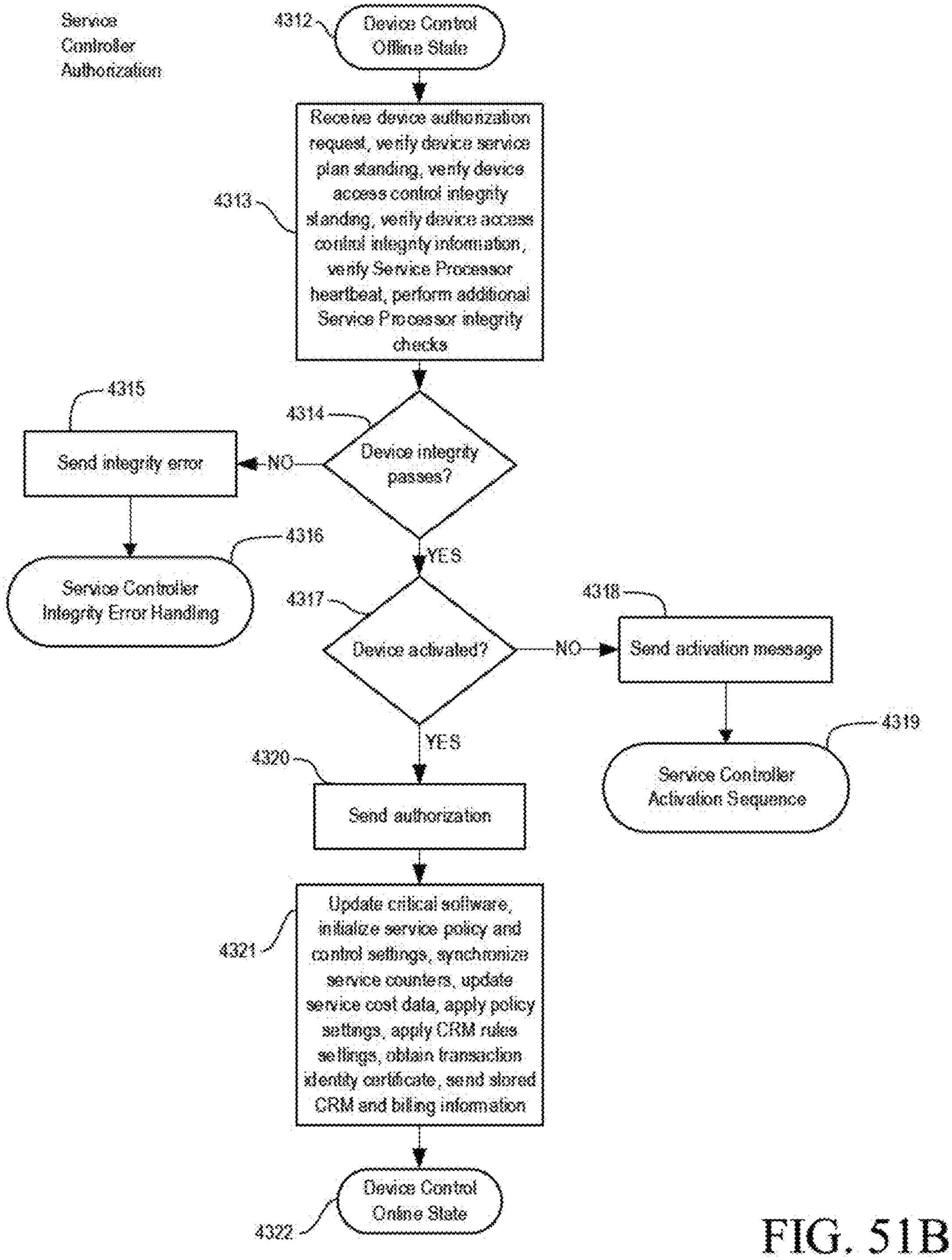

FIGS. 51A through 51B are flow diagrams illustrating a flow diagram for a service processor authorization sequence as shown in FIG. 51A and a flow diagram for a service controller authorization sequence as shown in FIG. 51B in accordance with some embodiments.

Referring to FIG. 51A, at 4301, the device is in an offline state. At 4302, the service processor (e.g., service processor 115) of the device collects device service processor credentials and access control integrity information. At 4303, the service processor of the device selects a best network. At 4304, the device connects to an access network. At 4305, the service processor of the device sends an authorization request to the service controller (e.g., service controller 122) and also sends the credentials and access control integrity information. At 4306, the service processor determines whether an integrity error has occurred. If so, then the service processor performs integrity error handling at 4307. Otherwise, the service processor determines whether the device is activated and/or authorized for network access at 4308. If not, then the service processor performs a device activation sequence at 4309. At 4310, the service processor performs the following: updates critical software, initializes service policy and control settings, synchronizes service counters, updates service cost data, applies policy settings, applies CRM rules settings, obtains transaction identity certificate, and sends stored CRM and billing information. At 4311, the device is in an online state.

Referring to FIG. 51B, at 4312, device control is in an offline state. At 4313, the service controller (e.g., service controller 122) receives a device authorization request, verifies device service plan standing, verifies device access control integrity standing, verifies device access control integrity information, verifies service processor heartbeat, and performs various additional service processor integrity checks (e.g., as similarly described herein). At 4314, the service controller determines whether the device integrity checks have all passed. If not, then the service controller sends an integrity error to the service processor (e.g., service processor 115) at 4315. At 4316, the service controller performs integrity error handling. Otherwise (the device integrity checks have all passed), the service controller determines whether the device is activated at 4317. If not, then the service controller sends an activation message to the service processor at 4318. At 4319, the service controller performs a service activation sequence. Otherwise (the device is activated), the service controller sends an authorization at 4320. At 4321, the service controller performs the following: updates critical software on the service processor, initializes service policy and control settings, synchronizes service counters, updates service cost data, applies policy settings, applies CRM rules settings, obtains transaction identity certificate, sends stored CRM and billing information. At 4322, the service controller is in a device online state.

Figure 52A:
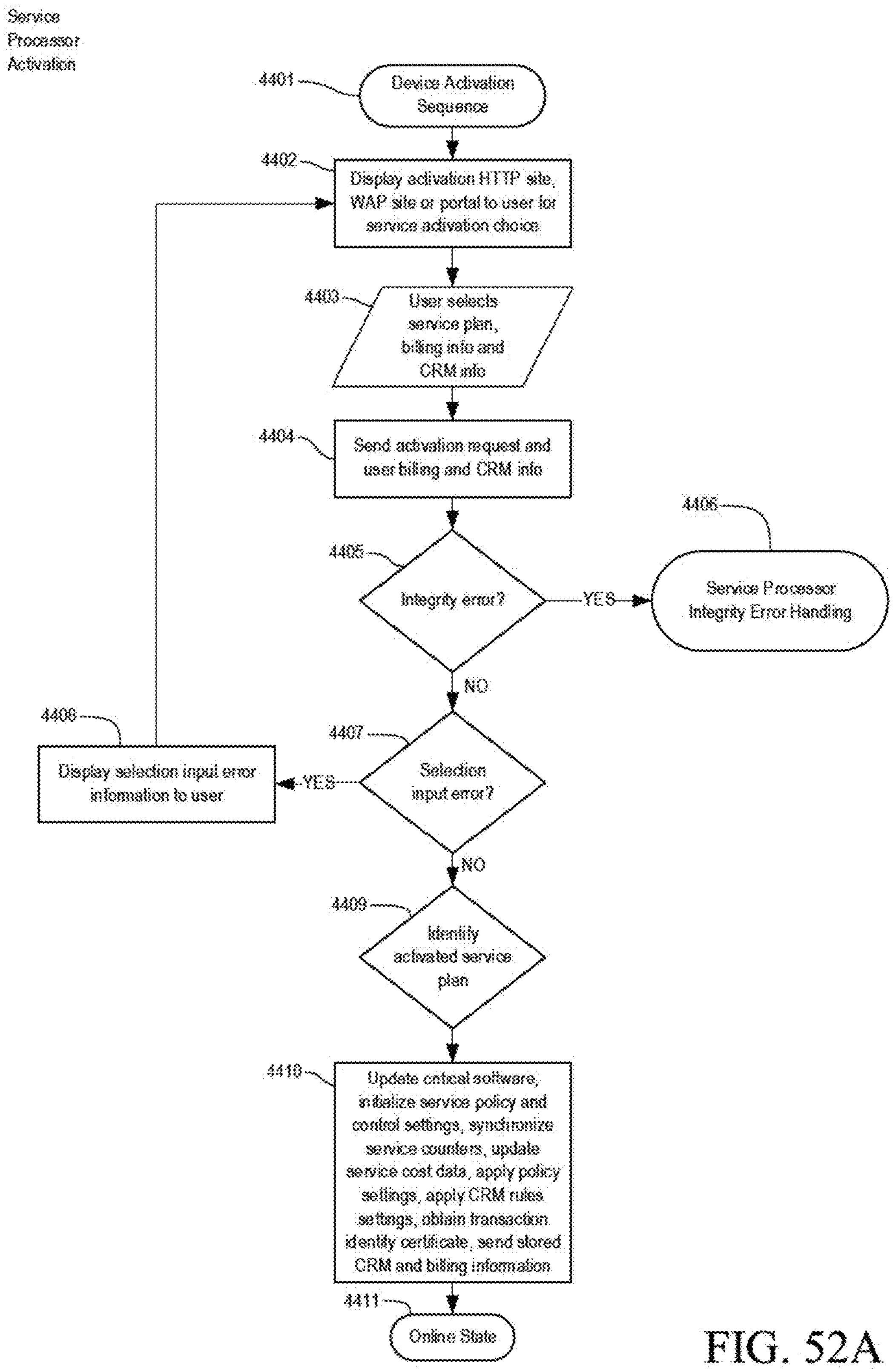
FIGS. 52A through 52B are flow diagrams illustrating a flow diagram for a service processor activation sequence as shown in FIG. 52A and a flow diagram for a service controller activation sequence as shown in FIG. 52B in accordance with some embodiments.
Figure 52B:
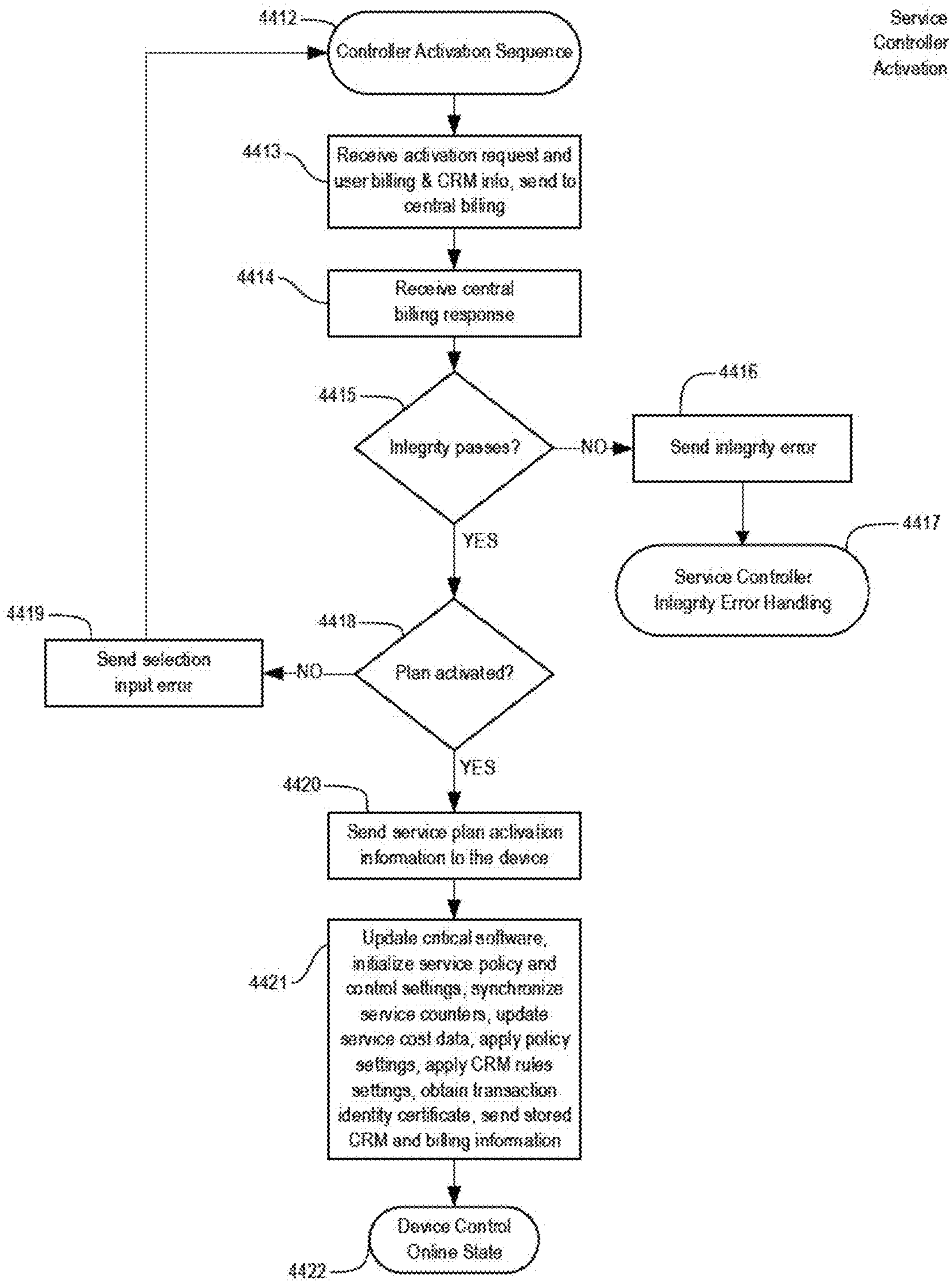

FIGS. 52A through 52B are flow diagrams illustrating a flow diagram for a service processor activation sequence as shown in FIG. 52A and a flow diagram for a service controller activation sequence as shown in FIG. 52B in accordance with some embodiments.

Referring to FIG. 52A, at 4401, a service processor activation sequence is initiated. At 4402, the service processor (e.g., service processor 115) of the device displays an activation site (e.g., HTTP site, WAP site or portal) to the user for the user's service activation choice. At 4403, the user selects service plan, billing information and CRM information. At 4404, the service processor sends an activation request and user billing and CRM information to, for example, the service controller. At 4405, the service processor determines whether there is an integrity error. If so, then the service processor performs integrity error handling at 4406. Otherwise, the service processor determines whether there has been a selection input error at 4407. If so, the service processor displays the selection input error to the user at 4408 and returns to the activation site/portal at 4402. Otherwise, the service processor identifies the activated service plan at 4409. At 4410, the service processor performs the following: updates critical software, initializes service policy and control settings, synchronizes service counters, updates service cost data, applies policy settings, applies CRM rules settings, obtains transaction identity certificate, and sends stored CRM and billing information. At 4411, the device is in an online and activated state.

Referring to FIG. 52B, at 4412, a service controller activation sequence is initiated. At 4413, the service controller (e.g., service controller 122) receives an activation request, including user billing and CRM information, and sends such to central billing. At 4414, the service controller receives a response from central billing. At 4415, the service controller verifies the integrity of the service processor. If an integrity error is detected, then an integrity error is sent at 4416. At 4417, the service controller performs integrity error handling. At 4418, the service controller determines whether the service plan has been activated. If not, then the service controller sends a selection input error to the device at 4419 and returns to 4412. Otherwise (device has been activated), the service controller sends the service plan activation information to the device at 4420. At 4421, the service controller performs the following: updates critical software, initializes service policy and control settings, synchronizes service counters, updates service cost data, applies policy settings, applies CRM rules settings, obtains transaction identity certificate, and sends stored CRM and billing information. At 4422, the service controller is in a device online and activated state.

Figure 53A:
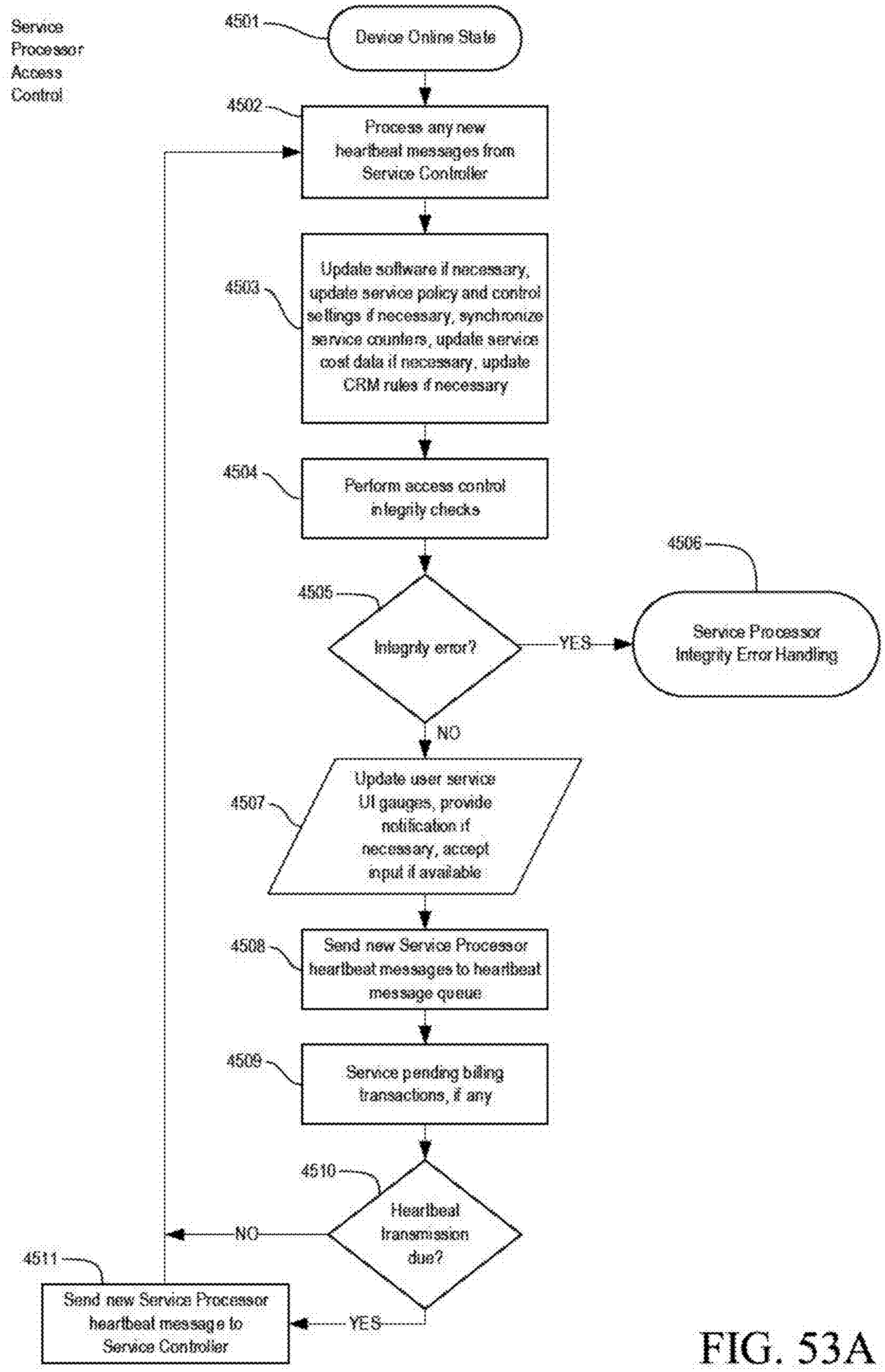
FIGS. 53A through 53B are flow diagrams illustrating a flow diagram for a service processor access control sequence as shown in FIG. 53A and a flow diagram for a service controller access control sequence as shown in FIG. 53B in accordance with some embodiments.
Figure 53B:
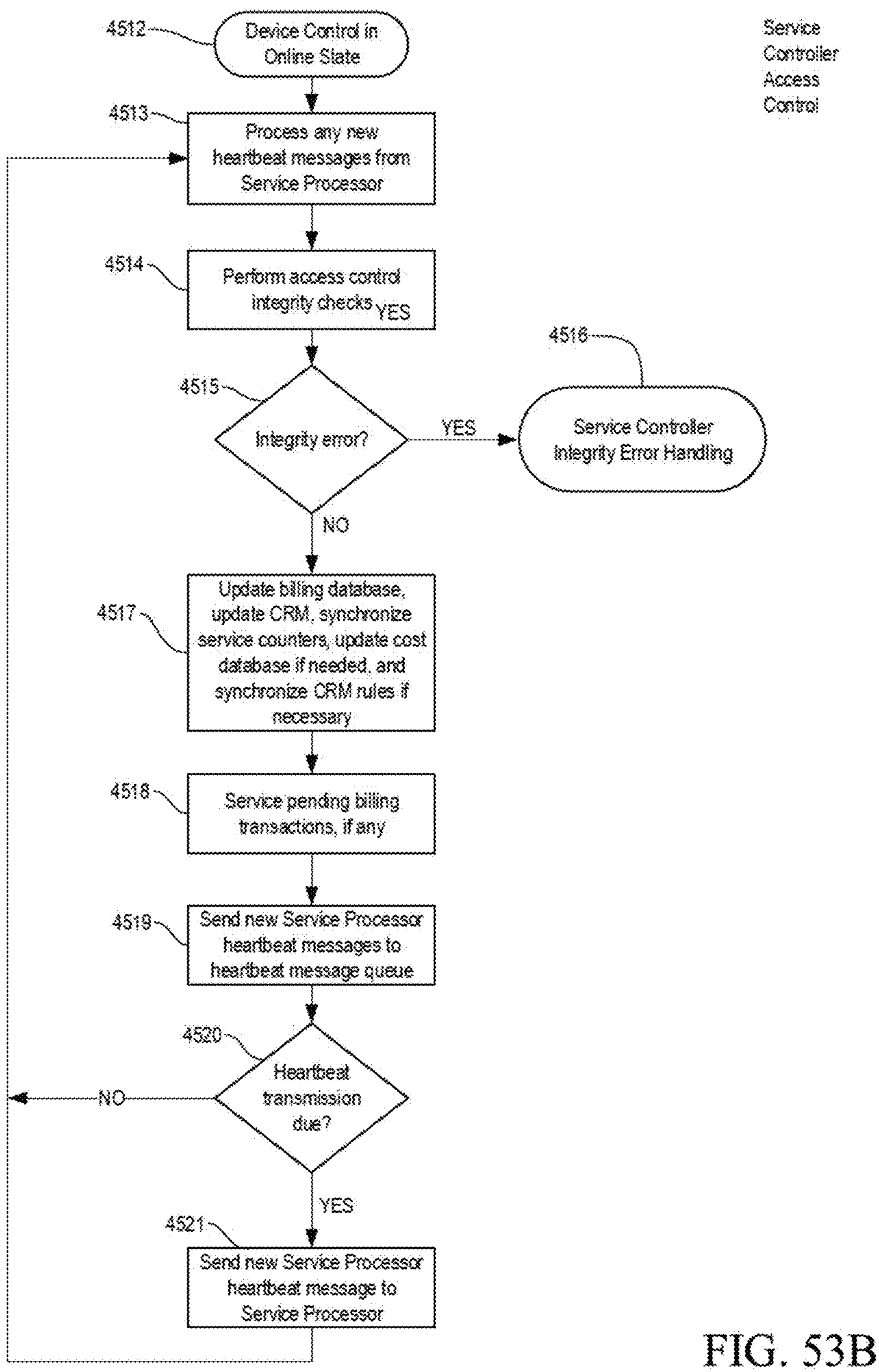

FIGS. 53A through 53B are flow diagrams illustrating a flow diagram for a service processor access control sequence as shown in FIG. 53A and a flow diagram for a service controller access control sequence as shown in FIG. 53B in accordance with some embodiments.

Referring to FIG. 53A, at 4501, the device is in an online state. At 4502, the service processor (e.g., service processor 115) of the device processes any new heartbeat messages received from the service controller (e.g., service controller 122). At 4503, the service processor updates software if necessary, updates service policy and control settings if necessary, synchronizes service counters, updates service cost data if necessary, and updates CRM rules if necessary. At 4504, the service processor performs access control integrity checks. At 4505, the service processor determines whether there are any access control integrity errors. If so, then the service processor performs integrity error handling at 4506. Otherwise, the service processor updates user service UI gauges, provides notification if necessary, and accepts input if available at 4507. At 4508, the service processor sends new service processor heartbeat messages to the heartbeat message queue. At 4509, the service processor processes any pending billing transactions. At 4510, the service processor determines if a heartbeat transmission is due, and if not, returns to 4502 for processing any received heartbeat messages. If so, at 4511, the service processor sends the new service processor heartbeat message to the service controller.

Referring to FIG. 53B, at 4512, the device is in an online state. At 4513, the service controller (e.g., service controller 122) processes any new heartbeat messages received from the service processor. At 4514, the service controller performs access control integrity checks. At 4515, the service controller determines whether there are any access control integrity errors. If so, then the service controller performs integrity error handling at 4516. At 4517, the service controller updates the billing database, updates the CRM information, synchronizes service counters, updates cost database if needed, and synchronizes CRM rules if necessary. At 4518, the service controller processes any pending billing transactions. At 4519, the service controller sends new service processor heartbeat messages to the heartbeat message queue. At 4520, the service controller determines if a heartbeat transmission is due, and if not, returns to 4513 for processing any received heartbeat messages. If so, at 4521, the service controller sends new service processor heartbeat message to the service processor.

Open Content Distribution and Transaction System

Figure 54:
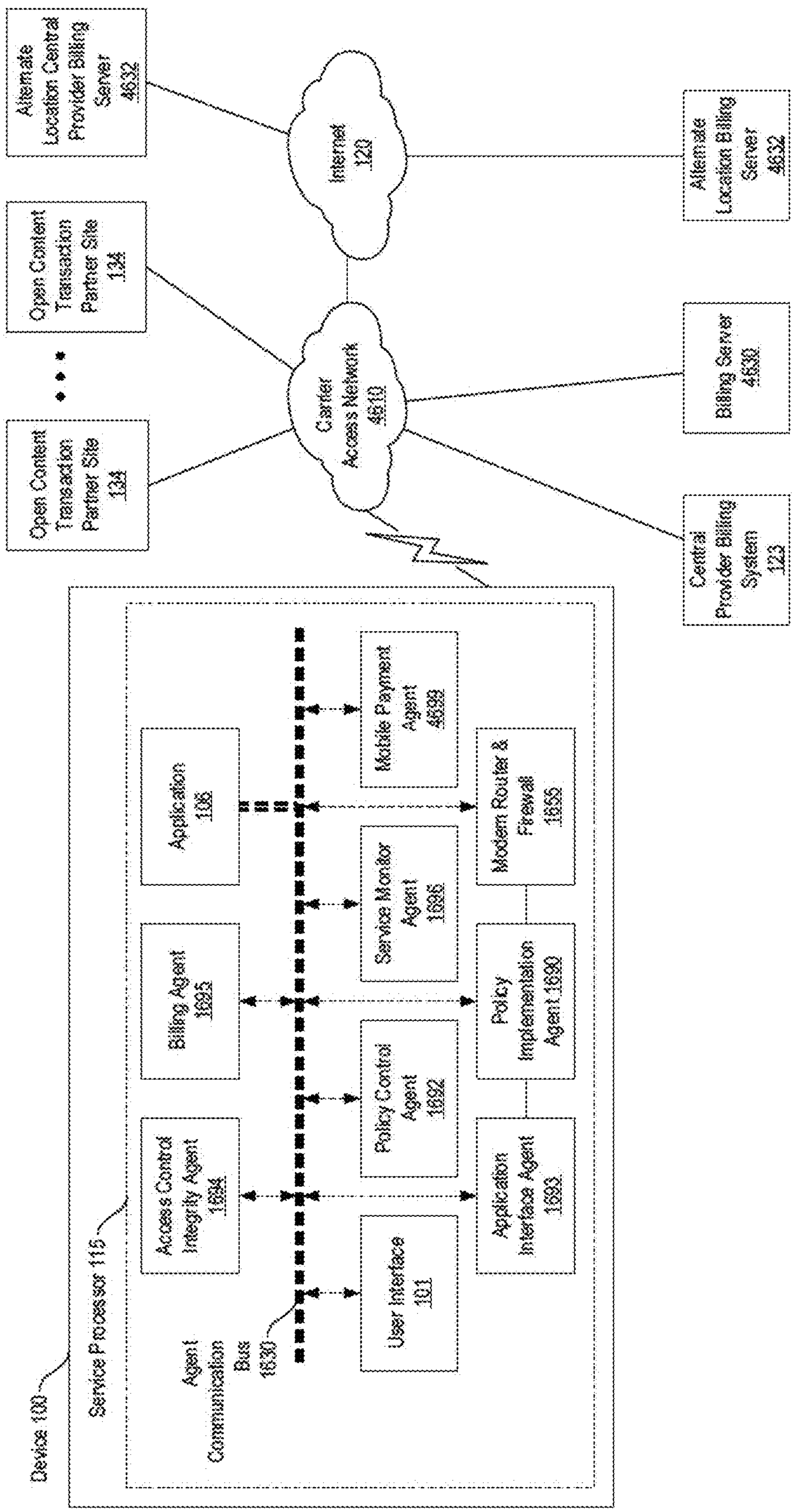
FIG. 54 is a functional diagram illustrating open, decentralized, device-based mobile commerce transactions in accordance with some embodiments.
Figure 55A:
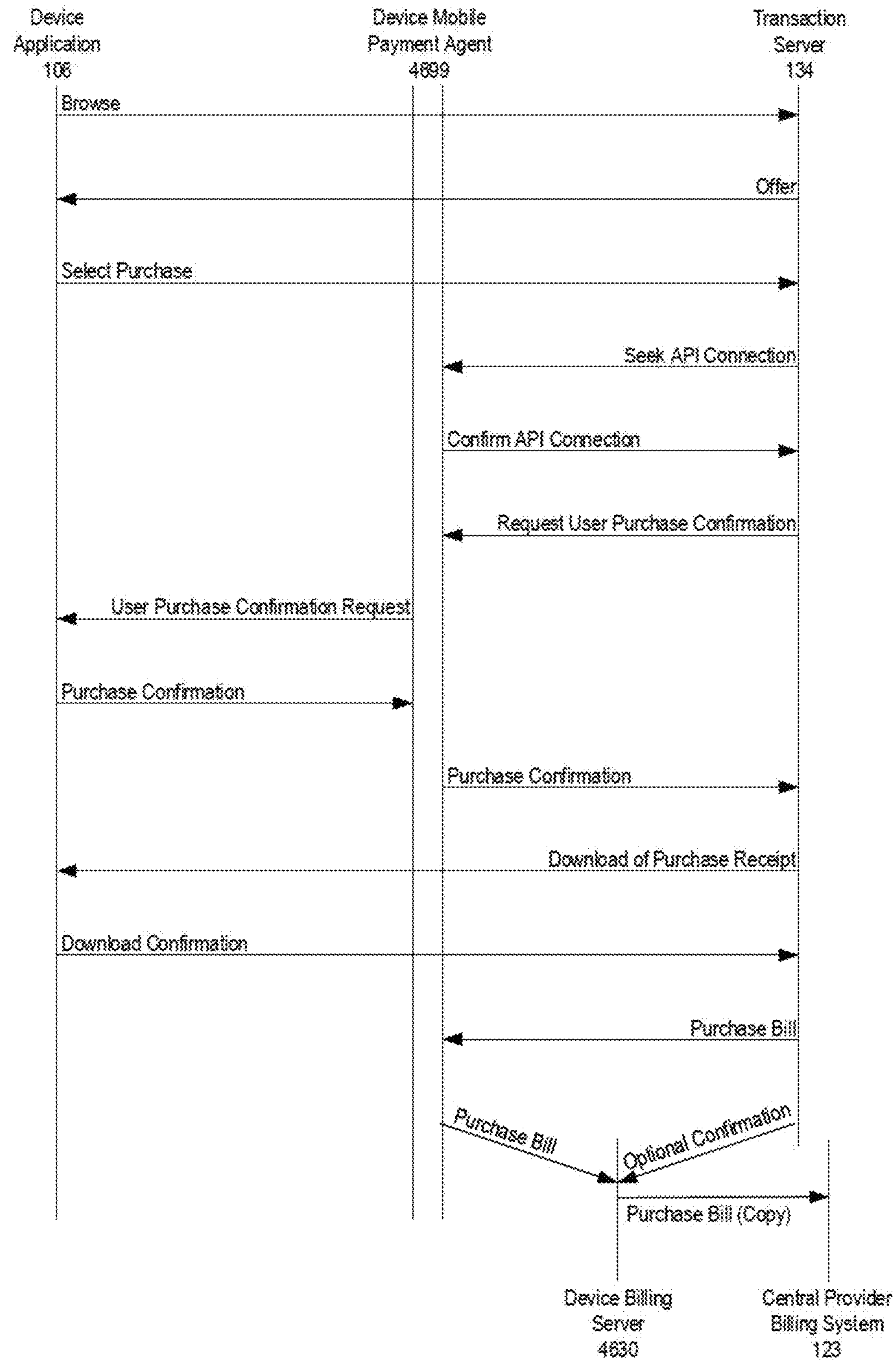
FIGS. 55A through 55B are transactional diagrams illustrating open, decentralized, device-based mobile commerce transactions in accordance with some embodiments.
Figure 55B:
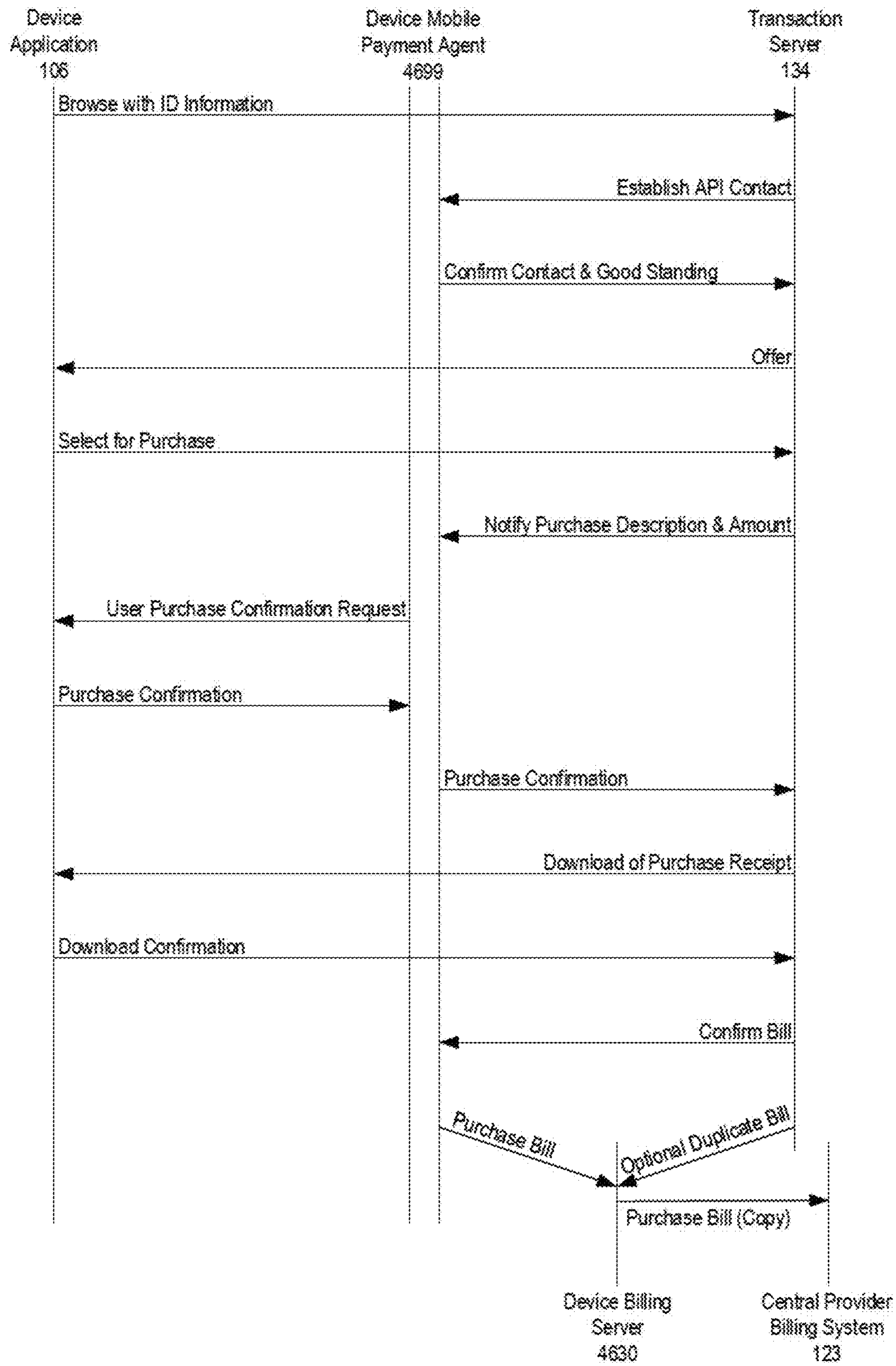

Referring now to FIGS. 54 and 55A-55B, in another set of embodiments an open, decentralized, device-based system for enabling central billing for third-party electronic commerce transactions for mobile commerce is provided as shown. For example, in these embodiments, device information can be embedded in HTTP, WAP or other portal browser/network header request information that indicates a central billing option is available to a compatible third-party transaction server, as further described below with respect to FIGS. 54 and 55A-55B.

FIG. 54 is a functional diagram illustrating open, decentralized, device-based mobile commerce transactions in accordance with some embodiments. As shown, a service processor 115 of the device 100 (e.g., any mobile device capable of storing and executing the service processor 115) includes access control integrity agent 1694, billing agent 1695, agent communication bus 1630, user interface 1697, policy control agent 1692, service monitor agent 1696, application interface agent 1693, policy implementation agent 1690, and modem router and firewall 1655, as similarly described herein with respect to various other service processor embodiments. In some embodiments, an application 106 (e.g., an HTML/WAP web browser) and a mobile payment agent 4699 are also included in the device, such as part of the service processor 115 as shown. In some embodiments, the application 106 is not integrated as part of the service processor 115, but is executing and/or stored on the device. In some embodiments, the mobile payment agent 4699 includes billing agent 1695, user interface 1697 and/or application interface agent 1693, and/or various other functional components/agents. As shown, the service processor

115 is in communication with a carrier access network 4610, which is in network communication with the Internet 120.

In some embodiments, device information can be embedded in HTTP, WAP or other portal browser/network header request information that indicates a central billing option is available to a compatible third-party transaction server, such as the open content transaction partner site(s) 134. For example, the compatible transaction server can then send a signed confirmation request over a pre-assigned control socket channel to the billing agent 1695 with the billing agent 1695 confirming the signed confirmation request by either performing the signature check locally based on a stored and synchronized list of approved transaction servers or by passing the signed request onto a billing server 4630 for confirmation. Optionally, in another example, a triangle confirmation can be set up in which the billing server 4630 can confirm the transaction set up with the transaction server 134 or the transaction server 134 can confirm the transaction set up with the billing server 4630. Once the device confirms the compatible and approved status of the transaction server 134, the device/transaction server pair can then optionally further exchange keys for the remainder of the transaction for enhanced security. In another example, the transaction server 134 can also redirect the user browsing experience to one tailored to one or more of device type, service provider, device manufacturer or user. When the user selects a transaction, the transaction server sends the billing agent 1695 a transaction bill that describes the transaction and the amount. The billing agent 1695 can optionally confirm that the user account has sufficient credit limit to make the purchase by either confirming the stored credit limit on the device or querying the billing server 4630. The billing agent 1695 then invokes the device UI 1697 to display the transaction description and amount and request user approval for the billing to be conducted through the central billing option. User approval can be acquired, for example, by a simple click operation or require a secure password, key and/or biometric response from the user. Upon user approval, the billing agent 1695 generates a billing approval and sends it to the transaction server 134, the transaction server 134 completes the transaction and then sends a bill to the billing agent 1695. The billing agent 1695 optionally sends a confirmation to the transaction server 134 and sends the bill to the billing server 4630. Again, optionally a triangle confirmation can be formed by the billing server sending a confirmation to the transaction server 134, or the transaction server 134 can send the bill to the billing server 4630. In some embodiments, the billing server 4630 can also communication such billed transactions to a central provider billing system 123 via the carrier access network 4610. Also, in some embodiments, an alternate location billing server 4632 is in communication via the Internet 120, and an alternate location central provider billing system 4625 is also in communication via the Internet 120.

FIGS. 55A through 55B are transactional diagrams illustrating open, decentralized, device-based mobile commerce transactions in accordance with some embodiments. Referring to FIG. 55A, the device application 106 browses (e.g., based on the user submitting a browse request using a browser application) to transaction server 134 (e.g., a transaction web server, such as the open content transaction partner site 134). The transaction server 134 provides an offer to the device application 106. The device application 106 selects a purchase (e.g., based on the user's selection input). In response, the transaction server 134 seeks an API connection with the device mobile payment agent 4699, which then confirms the API connection. The transaction server 134 requests user purchase confirmation (mediated by the device mobile agent 4699 as shown), and the purchase is confirmed by the device application 106 (e.g., based on the user's acknowledgement as similarly described above with respect to FIG. 54). The transaction server 134 then transmits a purchase receipt, and the device application 106 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 54. The device billing server sends a copy of the purchase bill to the central provider billing system (e.g., central provider billing system 123).

Referring now to FIG. 55B, the device application 106 browses (e.g., based on the user submitting a browse request using a browser application) to transaction server 134 (e.g., a transaction web server, such as the open content transaction partner site 134), in which the browse request includes device ID information, such as similarly described above with respect to FIG. 54. The transaction server 134 establishes API contact with the device mobile agent 4699, which then confirms contact and good standing for transactional purchases from the device. The transaction server 134 provides an offer to the device application 106. The device application 106 selects a purchase (e.g., based on the user's selection input). The transaction server 134 notifies the device mobile payment agent 4699 of the purchase description and amount, and the device mobile payment agent 4699 then requests user purchase confirmation. The purchase is confirmed by the device application 106 (e.g., based on the user's acknowledgement as similarly described above with respect to FIG. 54), and the device mobile payment agent 4699 then transmits a purchase confirmation to the transaction server 134. The transaction server 134 then transmits a purchase receipt, and the device application 106 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 54. The device billing server sends the purchase bill to the central provider billing system (e.g., central provider billing system 123). In some embodiments, the communications described above with respect to FIGS. 55A-55B with the billing server and the central provider billing system are with the alternate location billing server 4632 and/or alternate location central provider billing system 4625 via the Internet 120. Similarly, in some embodiments, the transaction servers 134 are connected to the Internet 120.

Accordingly, these transaction billing embodiments do not require centralized content storage or content and transaction exchange infrastructure. For example, the transactions can be conducted over the Internet, and the user experience and content can be tailored versions of the transaction server/content provider's normal experience and content. This approach provides for a much wider array of content and transaction partners with minimal or no need to accommodate proprietary specialized systems. Moreover, the compatibility between the device billing agent transaction system and the transaction provider server is easily established, for example, by writing specifications for the header information transmitted by the device and for the secure handshake and signed message transactions that take place between the device billing agent, the transaction server and optionally the transaction server and the billing server. Once a transaction partner shows compatibility test results and concludes a business relationship with the service provider, the service provider can place the transaction partner on the compatible and approved list and exchange security keys and/or certificates. If a common user experience is desired by the service provider across multiple transaction partners, then the experience specifications for the browser redirects can also be specified in the compatibility specification and tested before the transaction partner gains approval.

Design and Testing for Service Control

Figure 56:
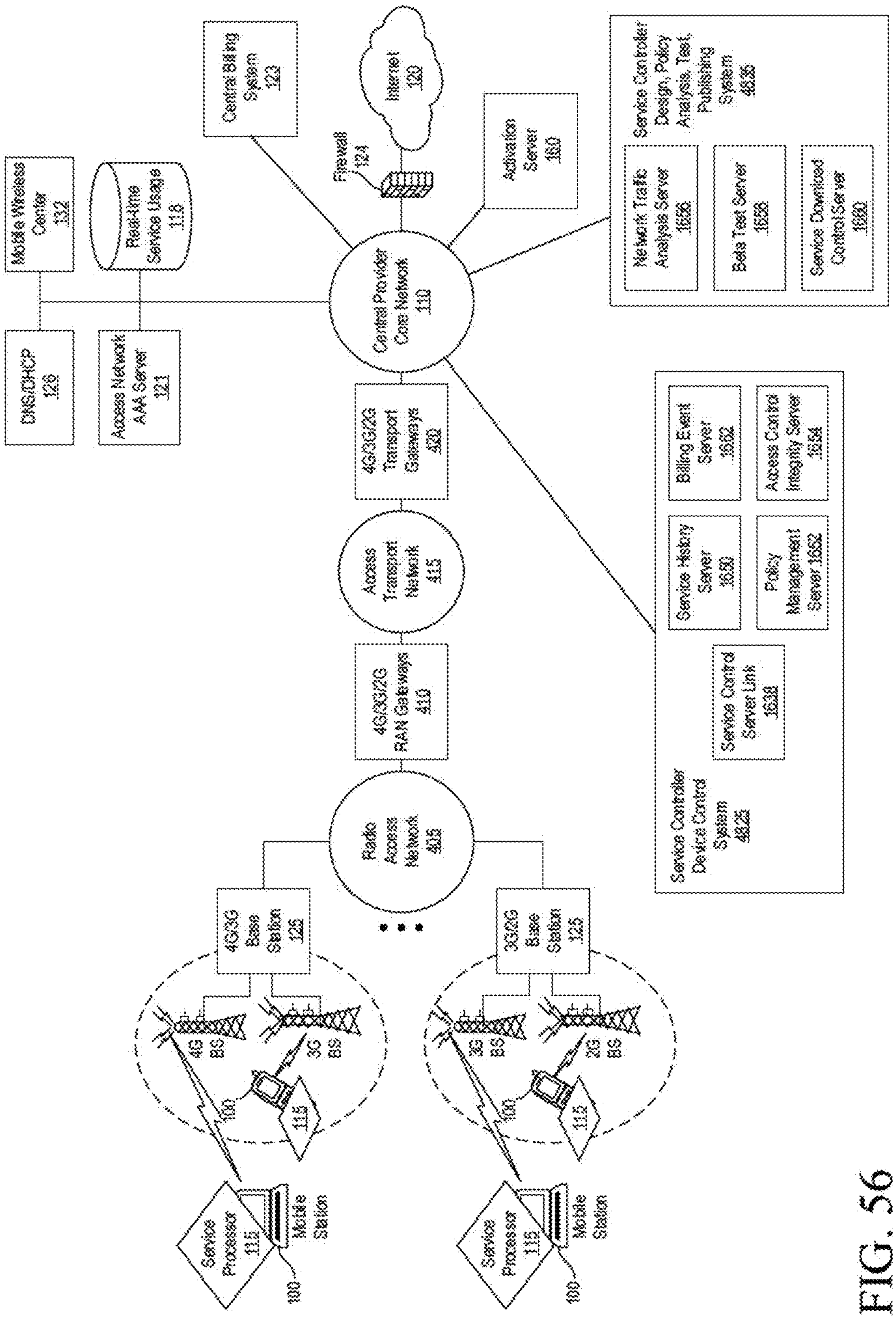
FIG. 56 illustrates a network architecture including a service controller device control system and a service controller analysis and management system in accordance with some embodiments.

FIG. 56 illustrates a network architecture including a service controller device control system and a service controller analysis and management system in accordance with some embodiments. As described herein, the RAN gateway 410 generally represents the functionality of the various specific RAN gateway functional elements shown and/or discussed herein. For example, these RAN gateway 410 functional elements represent the gateways used to aggregate the radio access network traffic, control, charging and roaming functions and/or other functions and are shown and/or discussed herein using other terminology specific to certain industry standards, including SGSN gateway 410 and gateways 508, 512, 608, 612, 708 and 712. Although the same reference numerals are used for SGSN gateway 410 and RAN gateway 410, it will be appreciated that the RAN gateway 410 represents any or all of the RAN gateway functional elements 410, 508, 512, 608, 612, 708, 712 or any other similar industry equipment or functions depending on the embodiment. Similarly, transport gateway 420 represents the next higher level of gateway aggregation for the transport layer that is used in many networks, and this term transport gateway 420 can be interchanged with any or all of the gateways 420, 520, 620, 720 or any other similar industry equipment or functions depending on the embodiment. Those of ordinary skill in the art will appreciate which gateway description applies to a respective embodiment in which the terms RAN gateway 410, gateway 410, transport gateway 420 or gateway 420 are referenced herein.

While the embodiments described below with respect to FIGS. 56 through 61 and 63 through 72 are depicted in the context of a conventional multi-tier access network, one of ordinary skill in the art will appreciate that such embodiments can also be generalized to other network topologies including the various flattened network topologies described herein. As shown, the service controller is divided into two main functions (e.g., as compared with the embodiments of service controller 122 depicted in FIG. 24): (1) a service controller device control system 4825 and (2) a service controller design, policy analysis, definition, test, publishing system 4835. The service controller device control system 4825 performs the device service control channel functions as previously described herein with respect to various embodiments.

The service controller design, policy analysis, definition, test, publishing system 4835 separates out the service analysis, control policy design and publishing from the device service control channel functions. The service controller design, policy analysis, definition, test, publishing system 4835 performs a variety of functions as described below. In some embodiments, the service controller design, policy analysis, definition, test, publishing system 4835 provides service usage statistical analysis, notification policy or procedure response analysis and/or billing policy or procedure response analysis for single devices, groups of devices, types of devices, groups of users, classes of users, or an entire set of devices and users that subscribe to a given service. In some embodiments, the service controller design, policy analysis, definition, test, publishing system 4835 detects, singles out and reports device service usage, notification responses or billing behavior that is outside of expected limits but may or may not be violating policy. In some embodiments, the service controller design, policy analysis, definition, test, publishing system 4835 provides service cost and profitability analysis for single devices, groups of devices, types of devices, groups of users, classes of users, or an entire set of devices and users that subscribe to a given service. In some embodiments, the service controller design, policy analysis, definition, test, publishing system 4835 provides user service control policy, notification policy or billing policy statistical satisfaction analysis for single devices, groups of devices, types of devices, groups of users, classes of users, or an entire set of devices and users that subscribe to a given service. In some embodiments, the service controller design, policy analysis, definition, test, publishing system 4835 provides statistical take rate analysis for transaction offers and billing offers for single devices, groups of devices, types of devices, groups of users, classes of users, or an entire set of devices and users that subscribe to a given service.

Figure 57:
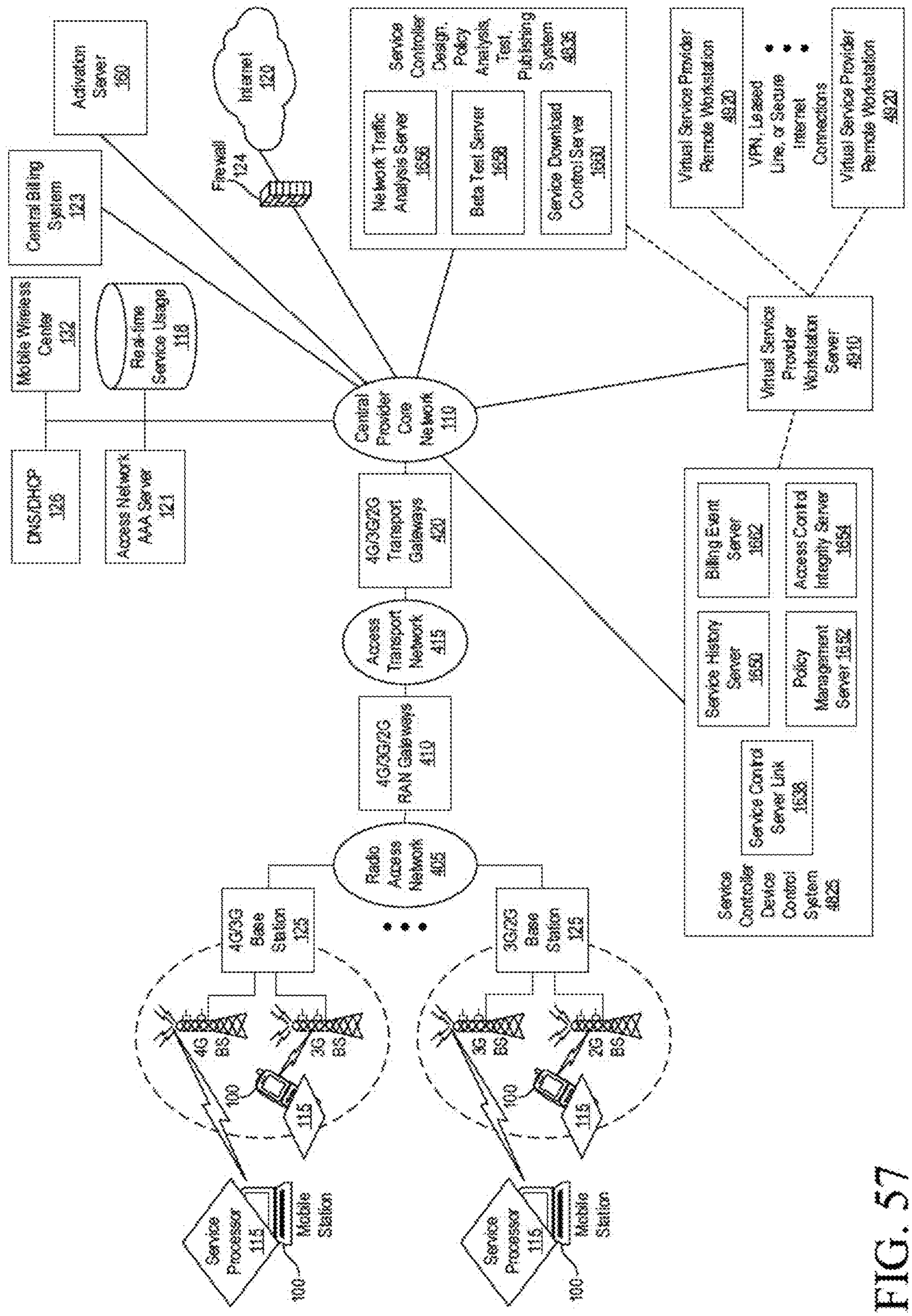
FIG. 57 illustrates a network architecture for an open developer platform for virtual service provider (VSP) partitioning in accordance with some embodiments.

In some embodiments, the service controller design, policy analysis, definition, test, publishing system 4835 provides service control policy definition work screens and "dry-lab" (pre-beta) testing against usage database for single devices, groups of devices, types of devices, groups of users, classes of users, or an entire set of devices and users that subscribe to a given service. In some embodiments, the service controller design, policy analysis, definition, test, publishing system 4835 provides service control policy, notification policy and/or billing policy beta testing (e.g., using beta test server 1658) in which the beta test profile is published to a subset of users or devices. In some embodiments, beta devices/users may or may not know that the service policy is being tested with them. In some embodiments, if they do know, then beta test apparatus includes offering system that provides user options to accept beta test and provide feedback in exchange for an offer (e.g., show them an offer page that comes up with their existing subscription service or ambient service—offer a free trial, a discount to something and/or reward zone points (or other incentives/rewards) if they accept the trial). In some embodiments, a beta test workstation (e.g., in communication with the beta test server 1658, such as VSP remote workstation 4920 as shown in FIG. 57) allows the beta test manager to define one or more beta test service policy, notification policy and/or billing policy control profiles. In some embodiments, the beta test workstation publishes each profile to specific individual (single) devices, groups of devices, types of devices, groups of users, classes of users, or an entire set of devices and users that subscribe to a given service. In some embodiments, the beta test workstation allows the beta test manager to analyze usage statistics, notification response statistics and/or billing/transaction offer response statistics for devices, users, groups of devices or groups of users and compare actual real-time usage versus beta test usage goals. In some embodiments, the beta test workstation allows the beta test manager to fine tune service, notification and/or billing/transaction policies and re-publish to observe changes to actual service usage until the service policy and/or notification control policies achieve the desired result. In some embodiments, the beta test workstation also allows the beta test manager to collect direct user feedback to a set of pre-designed user satisfaction or other questions regarding service usage. For example, questions can be presented through a pre-designed beta test portal or through a series of brief pop-ups that come up when the user initiates a particular action or at a particular time. In some embodiments, the beta test workstation also collects details of service and device usage (e.g., CRM data) that the beta test users have approved for collection. In some embodiments, the beta test workstation can decompose this data to determine if the users are using the service in the manner intended by the beta test goals. In some embodiments, the beta test workstation also allows for publishing multiple variants of the service and/or notification policy control settings and compare the service usage for each group with convenient screens with information displays (e.g., statistical usage versus time of day, usage of particular activities, billing activity, device discovery activity, user response to notification message and options, user satisfaction with a particular notification policy or billing policy or traffic control policy). In some embodiments, the screens can be designed by the beta test manager.

In some embodiments, once a service is completely tested and approved for production publication, the service download control server 1660 has a workstation screen that allows the service manager to specify which group of devices are to receive the new service policy configuration. In some embodiments, the service download control server 1660 allows the service manager to define specific individual (single) devices, groups of devices, types of devices, groups of users, classes of users, or an entire set of devices and users that subscribe to a given service.

In some embodiments, a service (e.g., a newly created or new version of an existing service) is tested and/or enhanced using a new service testing model. For example, a new service (or a new version of an existing service) is loaded onto a server for testing, the new service is (optionally) tested against existing device usage statistics, a new service control definition (e.g., implemented as service processor 115 for publishing to devices 100 and a corresponding new service controller 122 for the service provider, such as a central provider or an MVNO partner, and, for example, the new service processor and service controller can be implemented using the below described SDK) for the new service is developed and possibly adjusted based on the testing against existing device usage statistics, the new service control definition is then published to beta devices (e.g., various devices 100 used for beta testing the new service), which then use the new service, service usage statistics and/or user feedback statistics are then collected (e.g., to ensure that the service is functioning properly and so that the service control definition can be tuned to ensure adequate service, user experience and for service pricing/profitability purposes), the service/service control definition is then fine tuned based on the service usage/user feedback statistics. Upon completion of the above testing and refinement of the service/service control definition, the service control definition can be published to specified groups of devices for using the new service. In some embodiments, this service control testing model for groups of devices and service partners is provided by a virtual MVNO or VSP. For example, this allows for new services to be more efficiently and more effectively developed, tested and proliferated.

In some embodiments, service history IPDRs come from within a networking component connected to the central provider core network 110 as depicted by (e.g., real-time) service usage 118 (which as discussed elsewhere is a general purpose descriptor for a function located in one or more of the networking equipment boxes). In some embodiments, service history IPDRs are collected/aggregated (in part) from the central billing system 123. In some embodiments, service history IPDRs are collected/aggregated (in part) from the transport gateways 420. In some embodiments, service history IPDRs are collected/aggregated (in part) from the RAN gateways 410. In some embodiments, service history IPDRs are collected/aggregated (in part) from the base station(s) 125 or a networking component co-located with the base station(s) 125, a networking component in the transport network 415, a networking component in the core network 110 or from another source.

Virtual Service Provider for Service Control

In some embodiments, virtual service provider (VSP) capabilities include making available to a third-party service partner one or more of the following: (1) device group definition, control and security, (2) provisioning definition and execution, (3) ATS activation owner, (4) service profile definitions, (5) activation and ambient service definition, (6) billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

FIG. 57 illustrates a network architecture for an open developer platform for virtual service provider (VSP) partitioning in accordance with some embodiments. As shown, the service controller design, policy analysis, definition, test, publishing system 4835 is configured so that multiple "service group owners" (e.g., the service provider for certain smart phones) or "device group owners" (e.g., eReader devices for the eReader service provider(s)) or "user group owners" (e.g., IT for Company X for their employees' corporate mobile devices), collectively referred to as the "Virtual Service Provider" (VSP), are serviced with the same service controller infrastructure and the same (or substantially similar) service processor design from virtual service provider workstation server 4910 and/or virtual service provider remote workstation(s) 4920. As shown, the virtual service provider remote workstation(s) 4920 communicates with the virtual service provider workstation server 4910 via VPN, leased line or secure Internet connections. The dashed lines shown in FIG. 57 are depicted to represent that, in some embodiments, the virtual service provider workstation server 4910 is networked with the service controller device control system 4825 and/or, in some embodiments, the service controller design, policy analysis, definition, test, publishing system 4835. Based on the discussion herein, it will be apparent to one of ordinary skill in the art that the VSP workstation server 4910 can also be networked in various embodiments with billing system 123, AAA server 121, gateways 410 or 420, or other network components to perform, for example, various network provisioning and activation related functions discussed herein for the device group assigned to one or more VSPs, or for other reasons as will be apparent to a given VSP embodiment.

In some embodiments, the service controller functionality is partitioned for a VSP by setting up one or more secure workstations, secure portals, secure websites, secure remote software terminals and/or other similar techniques to allow the service managers who work for the VSP to analyze, fine tune, control or define the services they decide to publish to one or more groups of devices or groups of users that the VSP "owns." In some embodiments, the VSP "owns" such groups by virtue of a relationship with the central provider in which the VSP is responsible for the service design and profitability. In some embodiments, the central provider receives payment from the VSP for wholesale access services. In some embodiments, the VSP workstations 4910 and 4920 only have access to the service analysis, design, beta testing and publishing functions for the devices or users "owned" by the VSP. In some embodiments, the user or device base serviced by the central provider network is securely partitioned into those owned by the central provider, those owned by the VSP, and those owned by any other VSPs.

In some embodiments, the VSP manages their devices from the VSP workstations 4910 and 4920 using device-based service control techniques as described herein. In some embodiments, the VSP manages their devices from the VSP workstations 4910 and 4920 using device-assisted and network-based service control techniques as described herein. In some embodiments, the VSP manages their devices from the VSP workstations 4910 and 4920 using network-based service control techniques (e.g., DPI techniques) as described herein.

For example, this approach is particularly well suited for "open developer programs" offered by the central providers in which the central provider brings in VSPs who offer special value in the devices or service plans, and using this approach, neither the central provider nor the VSP needs to do as much work as would be required to set up a conventional MVNO or MVNE system, which often requires some degree of customization in the network solution, the billing solution or the device solution for each new device application and/or service application that is developed and deployed. In some embodiments, the service customization is simplified by implementing custom policy settings on the service processor and service controller, and the custom device is quickly brought onto the network using the SDK and test/certification process. In some embodiments, the VSP functionality is also offered by an entity other than the central provider. For example, an MVNE entity can develop a wholesale relationship with one or more carriers, use the service controller to create the VSP capabilities, and then offer VSP services for one network or for a group of networks. In some embodiments, the service customization is simplified by implementing custom policy settings through the VSP embodiments on the network equipment, including, in some embodiments, service aware or DPI based network equipment that has a relatively deep level of service activity control capability. For example, using the embodiments described herein, and possibly also including some of the activation and provisioning embodiments, it is possible to efficiently design and implement custom ambient service plans that are different for different types of devices, different OEMs, different VSPs, different distributors, or different user groups all using the same general infrastructure, whether the service control policy implementation is accomplished primarily (or exclusively) with networking equipment (network) based service control, primarily (or exclusively) with device-based service control or with a combination of both (e.g., hybrid device and network-based service control).

As discussed herein, various VSP embodiments for performing one or more of analyzing traffic usage and defining, managing service profiles or plans, dry lab testing service profiles or plans, beta testing service profiles or plans, fine tuning service profiles or plans, publishing service profiles or plans, or other policy related settings can involve programming settings in the network equipment and/or programming settings or software on the device. For example, as discussed herein, the service processor settings are controlled by the service controller, which can be partitioned to allow groups of devices to be controlled. As another example, equipment in the network involved with network-based service control, such as DPI based gateways, routers or switches, can similarly be programmed to utilize various VSP embodiments to implement that portion of the service profile (or service activity usage control) that is controlled by network level functions, and it will be appreciated that substantially all or all of the service activity control for certain embodiments can be accomplished with the network functions instead of the device. Continuing this example, just as the device service processor settings control functions of the service processor can have a group of devices that are partitioned off and placed under the control of a VSP, various VSP control embodiments can partition off a group of devices that have service usage activity controlled by the networking equipment, including, in some embodiments, sophisticated service aware DPI based service control equipment, to achieve similar objectives. It will be appreciated that the discussion herein regarding service controller design, policy analysis, test, publishing 4835, and the discussion regarding device group, user group and other VSP related embodiments, should be understood as applicable to various embodiments described in view of device-based services control, control assistance and/or monitoring, or network-based services control, control assistance and/or monitoring, or a combination of device-based services control, control assistance and/or monitoring and network-based services control, control assistance and/or monitoring. The various embodiments described herein related to service activation and provisioning also make apparent how the programming of network equipment service control, service control assistance and/or monitoring can be implemented prior to and following activation of the device. It will also be appreciated that the VSP capabilities described herein can also be applied to those devices that have services controlled by, provided by and/or billed by the central provider, so these techniques can be applied to central provider service embodiments, MVNO embodiments and other embodiments.

Open Development System for Access Services—SDK

In some embodiments, a software development kit (SDK) is provided that allows developers, such as device manufacturers, service providers, MVNO, MVNE and/or VSPs, to develop various service processors (e.g., different versions of the service processor 115) for various devices (e.g., various types of devices 100) and corresponding service controllers (e.g., different versions of the service controller 122) for various types of services and network environments. For example, a device manufacturer can use the SDK to develop a new service processor for their new device (e.g., mobile phone, PDA, eBook reader, portable music device, computer, laptop, netbook, or any other network accessible device). The device manufacturer can also preload/preinstall their new service processor on their new devices. In this example, users of the new device would then be able to utilize the new device to access network-based services using the new service processor, which communicates with the deployed new service controller, as similarly discussed herein in various embodiments. For example, the device can be preinstalled with the new service processor to provide ambient services, as similarly discussed herein in various embodiments. For example, the SDK can allow for substantially similar service processors to be installed on similar and/or different devices thereby minimizing any unnecessary differences between service processor elements for device-assisted services. In some embodiments, for ambient services for a group of devices, or devices associated with a certain service provider, a set of numbers (e.g., dummy numbers) can be assigned for use for attempting access via the access network using a new device that is not yet otherwise subscribed for service. In some embodiments, the set of (dummy) numbers used for ambient access by the device can also be used for associate of the device with a service provider or a type of device (e.g., eReader or some other type of network accessible device), and upon activation, the service provider assigns a real number for the activated device (e.g., which can be provided at the time of manufacture of the device, point of sale of the device, or after the point of sale of the device, such as upon activation of the device). For example, ambient access of the device can use the device ID, SIM ID, assigned phone (real or dummy) number, and/or other information associated with the device for assigning appropriate service control and service policy/profile for the device.

In some embodiments, the service processor 115 is distributed as an SDK to any device that the central provider or the VSP desires to offer services with so that the service processor 115 can be efficiently designed or adapted by the device OEM, ODM or manufacturer for operation on the service network. In some embodiments, the SDK includes either a complete set of service processor 115 agent software designed for and/or tested for the OS (Operating System) and processor set being used on the device, or a mature reference design for the OS and processor set being used on the device, or a less mature reference design (potentially for the same OS and/or processor set or a different OS and/or processor set being used on the device) that the OEM (Original Equipment Manufacturer) ports to the desired OS or processor set, or a basic set of example software programs that the OEM or ODM (Original Design Manufacturer) can use to develop software compatible with the service, or a set of specifications and descriptions (possibly forming an interoperability standard) of how to design the software to be compatible with the service. In some embodiments, the SDK includes a set of OEM lab test procedures and/or test criteria to ensure that the implementation of the service SDK is compatible with the service and will operate properly. In some embodiments, the SDK includes a set of network certification test procedures and/or test criteria to ensure that the implementation of the service SDK is compatible with the service and will operate properly. In some embodiments, the certification procedures are approved for testing by the OEM, the central provider, the VSP and/or a trusted third-party. For example, the central provider is typically in control of the SDK and the test procedures, but others can be in control. In some embodiments, the test procedures are at least in part common across multiple central provider networks. In some embodiments, the SDK concept is extended to include one or more modem modules where one or more of the SDK embodiments described above is combined with a standard reference design or a standard hardware sales package for one or more modems so that the entire package forms a turn-key product that allows a device manufacturer, central provider, VSP or other entity bring new devices or device applications onto the central provider network possibly in combination with other networks in a manner that requires less engineering time and resources and less network certification time and resources than would be required in some designs that do not use this standard SDK plus module approach. For example, the standard SDK plus module product embodiments can be pre-certified and tested with one or more central providers to further reduce development time and expense. The standard SDK plus module embodiments can also use a multi-mode modem (e.g., modems based on a multimode CDMA, EVDO, UMTS, HSPA chipset as in the Gobi global multimode chipset product or modems based on other recently announced LTE plus HSPA chipsets, WiMAX plus Wi-Fi chipsets or LTE plus EVDO chipsets) and a multi-mode connection manager agent so that the same SDK plus modem embodiment may satisfy a wide range of applications for many service providers around the world.

In some embodiments, at the time of manufacture, the device is associated with an MVNO. For example, the MVNO can provide an ambient service that provides a service provider clearing house, in which the device can access a network in ambient access mode (e.g., a wholesale MVNO connection through the access network) for purposes of selecting a service provider (e.g., a VSP, MVNO or carrier). Based on the service provider selection, the device credentials and/or service processor are reprogrammed and/or new software is downloaded/installed to activate the device with the selected service provider, as described herein for provisioning the device and the account on that service provider network (e.g., the ATS can track such activation, for example, for revenue sharing purposes, as an activation incentive fee).

In some embodiments, ATS is implemented entirely in the network as described below. At the time of manufacture or at sometime during device distribution, the device master agent programs a unique credential in the device that cannot be re-programmed or removed (or is difficult to re-program or remove) and that can be recognized and recorded by the network at the time of activation or at some other time. In this manner, even if other, possibly primary, device credentials are reprogrammed or removed, there will still be a credential that is associated with the device master agent. The ATS process can then be implemented by using a database search function to scan through the database of activated devices to form a list of devices that have been activated for the purpose of master agent reconciliation. Example credentials that can suffice are MEID, hardware MAC address, and/or serial number, that are picked up and recorded by the service provider or other service entity at time of activation or before or after activation.

Interface Server Overlay for Billing/IPDR Feed Mediation

Figure 58:
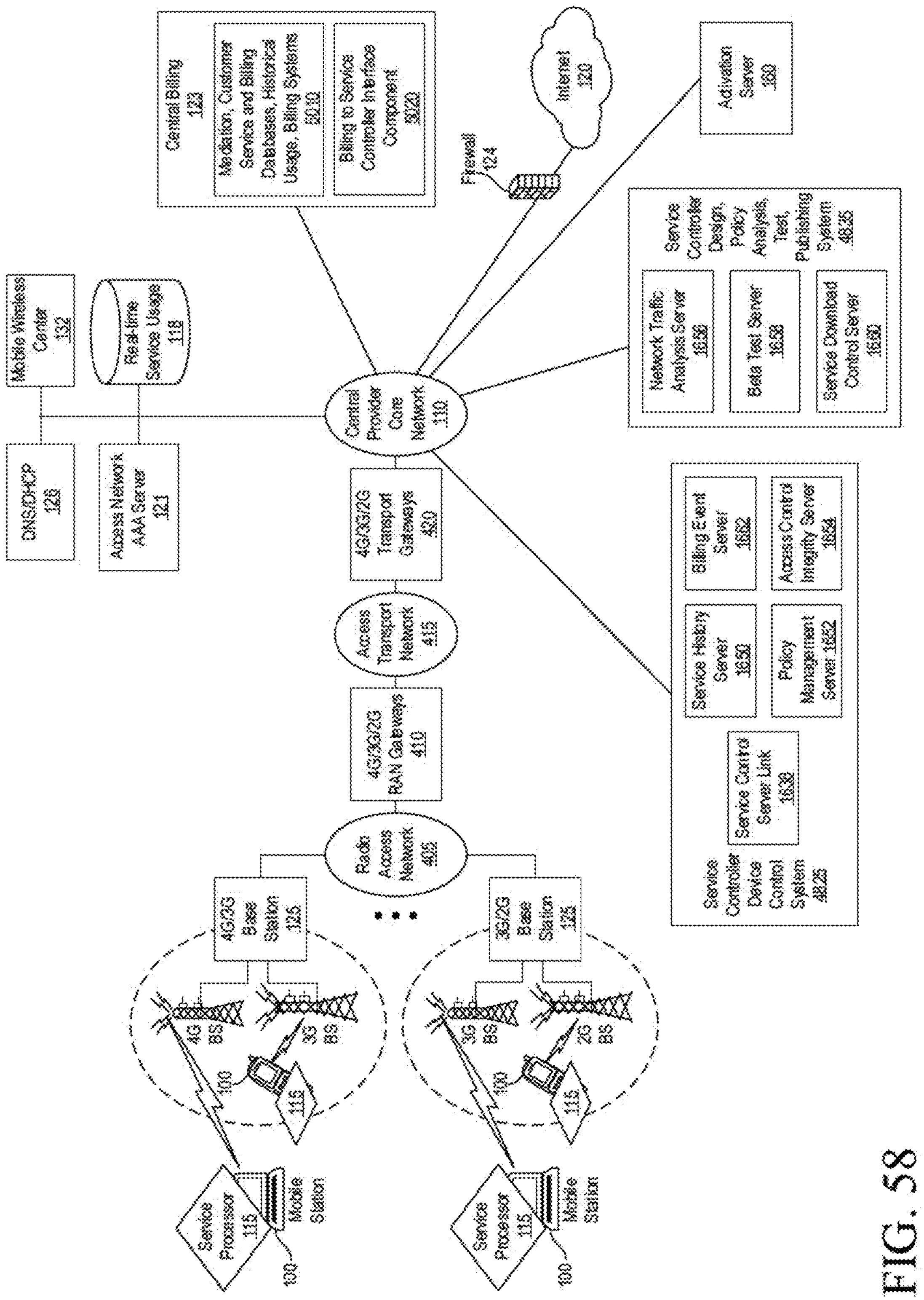
FIG. 58 illustrates a network architecture including a billing to service controller interface for accommodating minimum changes in existing central billing, AAA and/or other network components in accordance with some embodiments.

FIG. 58 illustrates a network architecture including a billing to service controller interface for accommodating minimum changes in existing central billing, AAA and/or other network components in accordance with some embodiments. As shown, the central billing system 123 includes a mediation, customer service and billing databases, historical usage, billing systems component 5010 and a billing to service controller interface component 5020. For example, the billing to service controller interface component 5020 allows for the central billing system 123 to efficiently communicate with the service controller (e.g., service controller device control system 4825).

In some embodiments, an interface server (e.g., the billing databases, historical usage, billing systems component 5010 and/or the billing to service controller interface component 5020) is provided that reads the IPDRs, service profile and/or service plan information stored in the billing and/or service record database(s). In some embodiments, the interface server performs these functions in a manner that is compatible with communication formats of the billing and/or service record database(s) so that little or no changes are required in the configuration, communication formats or software of the existing central billing, AAA and/or other network components. In some embodiments, the interface server (e.g., including the billing databases, historical usage, billing systems component 5010 and the billing to service controller interface component 5020) is co-located with the central billing system components as shown, or in other embodiments, the interface server is located elsewhere. For example, the interface server can be located close to or within the components that comprise the service controller or anywhere else in the network.

In some embodiments, the interface server performs certain communication protocol translation or data format translation required to interface the information stored in the billing and/or service record database(s) to the service controller functions so that the central billing system 123 and other existing components in the network do not need to change much (if at all) to enable the service controller and service processor to implement device-based/assisted service control. In some embodiments, the central billing system 123 or other network components are not required to be aware of the service control functions being implemented by the service controller or service processor, because the interface server acquires the network-based information needed by the service controller and/or service processor while requiring little or no specialized awareness, communication, data formatting, user interfacing, service profile processing or service plan processing on the part of existing billing, database or networking components. In this type of overlay approach, various embodiments described herein can be used to quickly upgrade the capabilities of existing networks for new devices while minimizing the required changes to the existing network that supports legacy devices.

For example, a new ambient service plan can be implemented within the central billing system 123 that is associated with a zero or low cost billing plan and a usage limit (e.g., ambient service) that may be difficult or impossible to support in a manner that would result in high user satisfaction and a high level of control for service cost and service policy definition. Even if the central billing system 123 is not highly involved in the process, the zero or low cost plan can be implemented in a manner that results in high user satisfaction and a cost controlled service by using the service controller and/or service processor and the interface server to implement the ambient services access control, service usage control, user interface, service usage notification, transaction billing or bill by account functionality. For example, this approach can be implemented by reading the service plan and/or service policy settings for a device in the central billing database using the interface server, looking up the corresponding service policy, user notification policy, transaction billing policy and bill by account policy associated with the particular service profile or service plan, and then implementing the policies with the assistance of the service controller and/or service processor. Similarly, in another definition, multiple tiers of service control and user notification policies can be added to any number of new service profiles or service plans that would not otherwise be supported with the central billing system 123 and other network components, all with minimal or no modifications to the pre-existing network and billing system.

Another embodiment calls for receiving a standard IPDR feed from central billing 123 or another network component just like an MVNO would. For example, the interface server function can be located in the central billing system, service processor or elsewhere in the network. This provides the IPDR records for service usage policy verification and service usage notification synchronization with little or no need to modify existing billing or network apparatus.

In some embodiments, duplicate IPDRs are sent from the network equipment to the billing system and/or network management system that are currently used for generating service billing or are used for device management or network management. In some embodiments, duplicate records are filtered to send only those records for devices controlled by the service controller and/or service processor. For example, this approach can provide for the same level of reporting, lower level of reporting, and/or higher level of reporting as compared to the reporting required by the central billing system.

In some embodiments, a bill-by-account billing offset is provided using the interface server. For example, bill-by-account billing offset information is informed to the billing system through an existing data feed and by updating the billing database using the interface server. In some embodiments, transaction billing is provided using the interface server. For example, transaction billing log information is provided to the billing system through an existing data feed and by updating the billing database using the interface server.

In some embodiments, existing/new service plan choice screens are displayed to the user, a user choice or decision/input is confirmed for a selected service plan, and then the service is implemented upon confirmation of the billing system update for the new service plan. In some embodiments, the service is implemented upon the user selection of a new service plan and then retracted if not confirmed as updated by the billing system within a certain period of time. In some embodiments, the new service plan information is updated in the billing system through an existing data feed or by updating the database using the interface server.

Integrated Service Control

Figure 59:
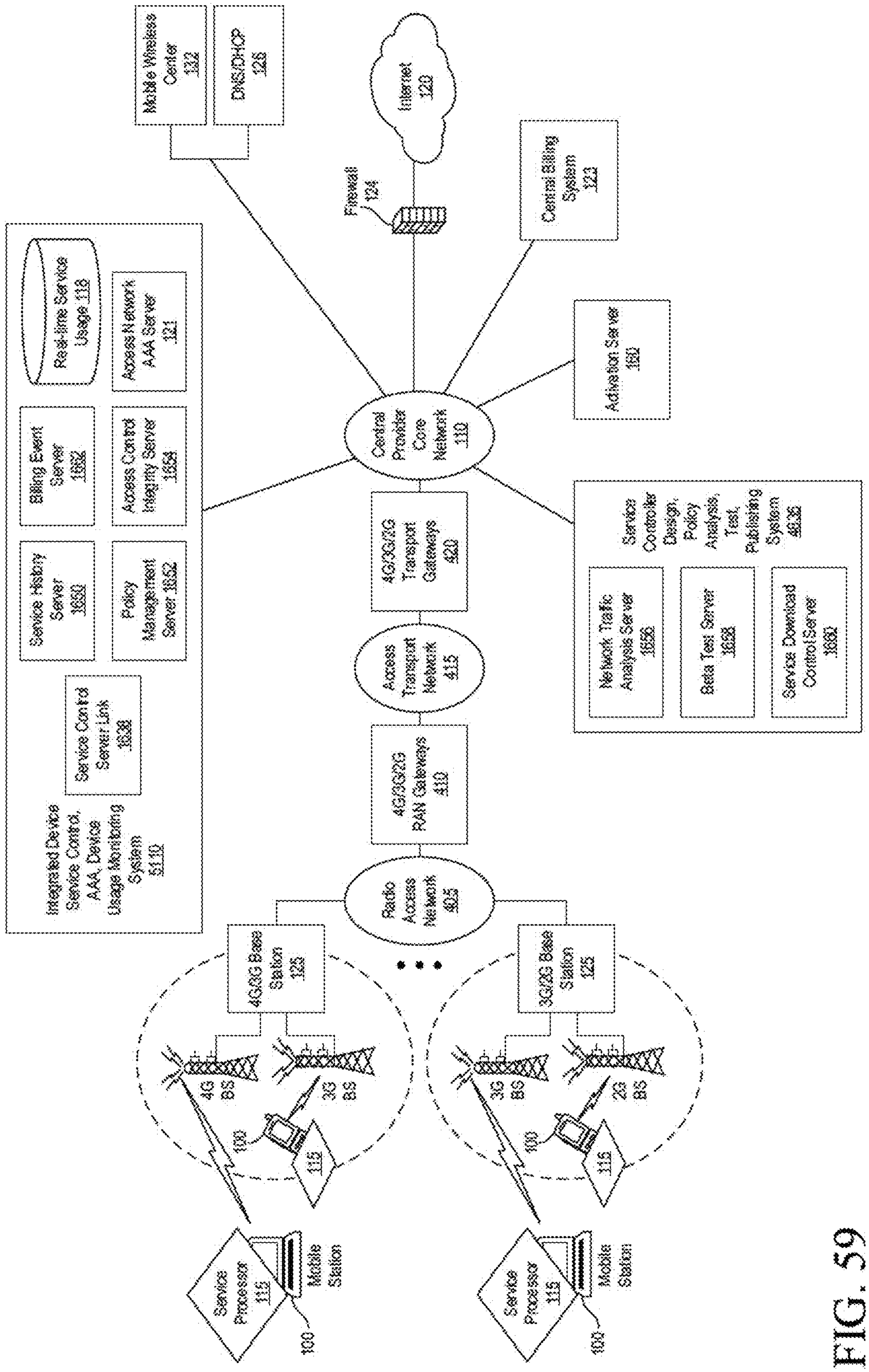
FIG. 59 illustrates a network architecture for locating service controller device control functions with AAA and network service usage functions in accordance with some embodiments.

FIG. 59 illustrates a network architecture for locating service controller device control functions with AAA and network service usage functions in accordance with some embodiments. As shown, an integrated device service control, AAA, device usage monitoring system 5110 is provided that integrates service controller functions (e.g., service controller device control system functions 4825 of FIG. 56) with access network AAA server 121 functions and network (e.g., real-time) service usage 118 functions.

Figure 60:
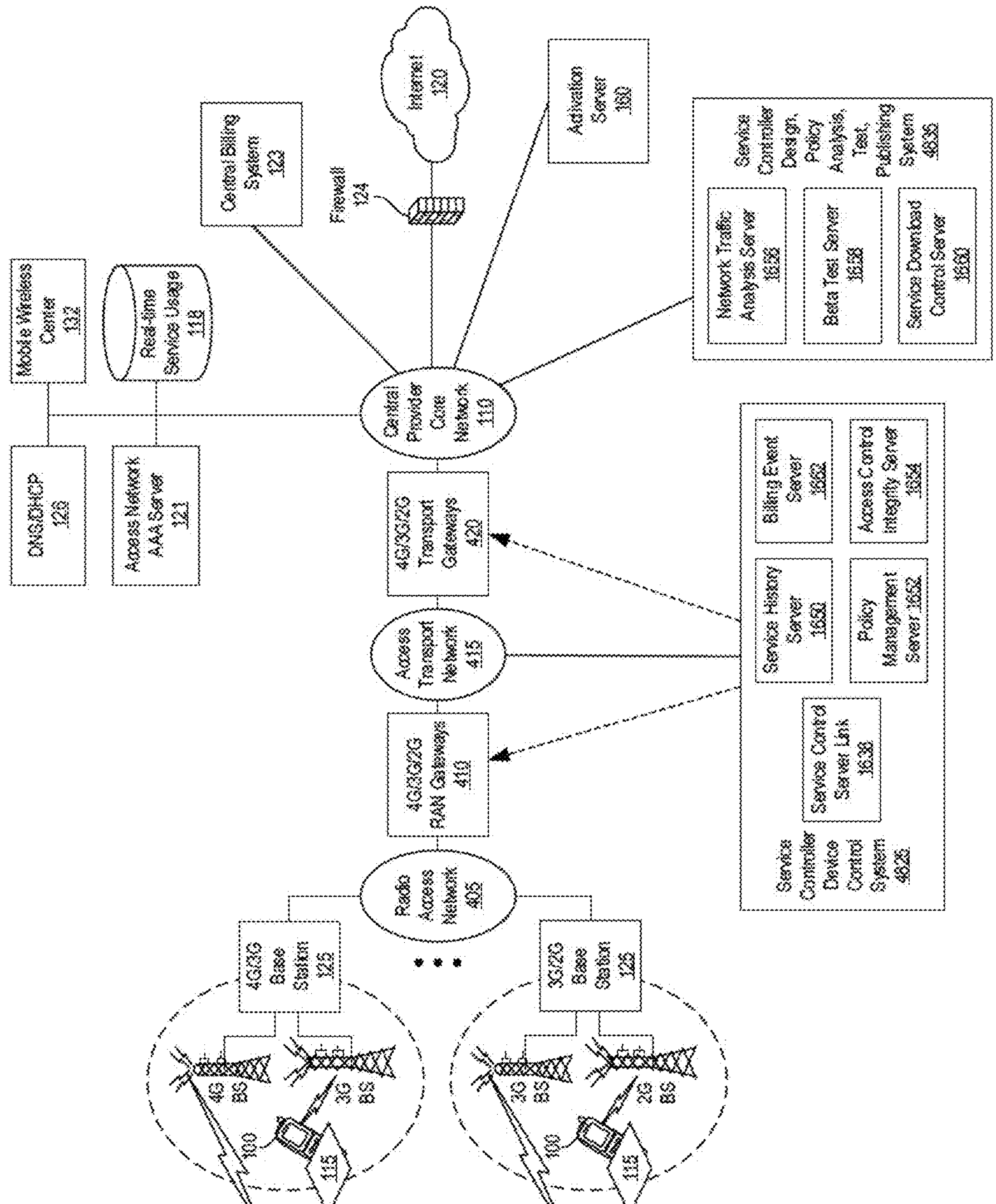
FIG. 60 illustrates a network architecture for locating service controller device control functions in the access transport network in accordance with some embodiments.

FIG. 60 illustrates a network architecture for locating service controller device control functions in the access transport network in accordance with some embodiments. As shown, the service controller device control system 4825 is located in the access transport network 415, or in some embodiments, in the 4G/3G/2G RAN gateways 410 (as indicated by the dashed line with the arrow), or alternatively, in the 4G/3G/2G transport gateways 420 (as indicated by the dashed line with the arrow).

Figure 61:
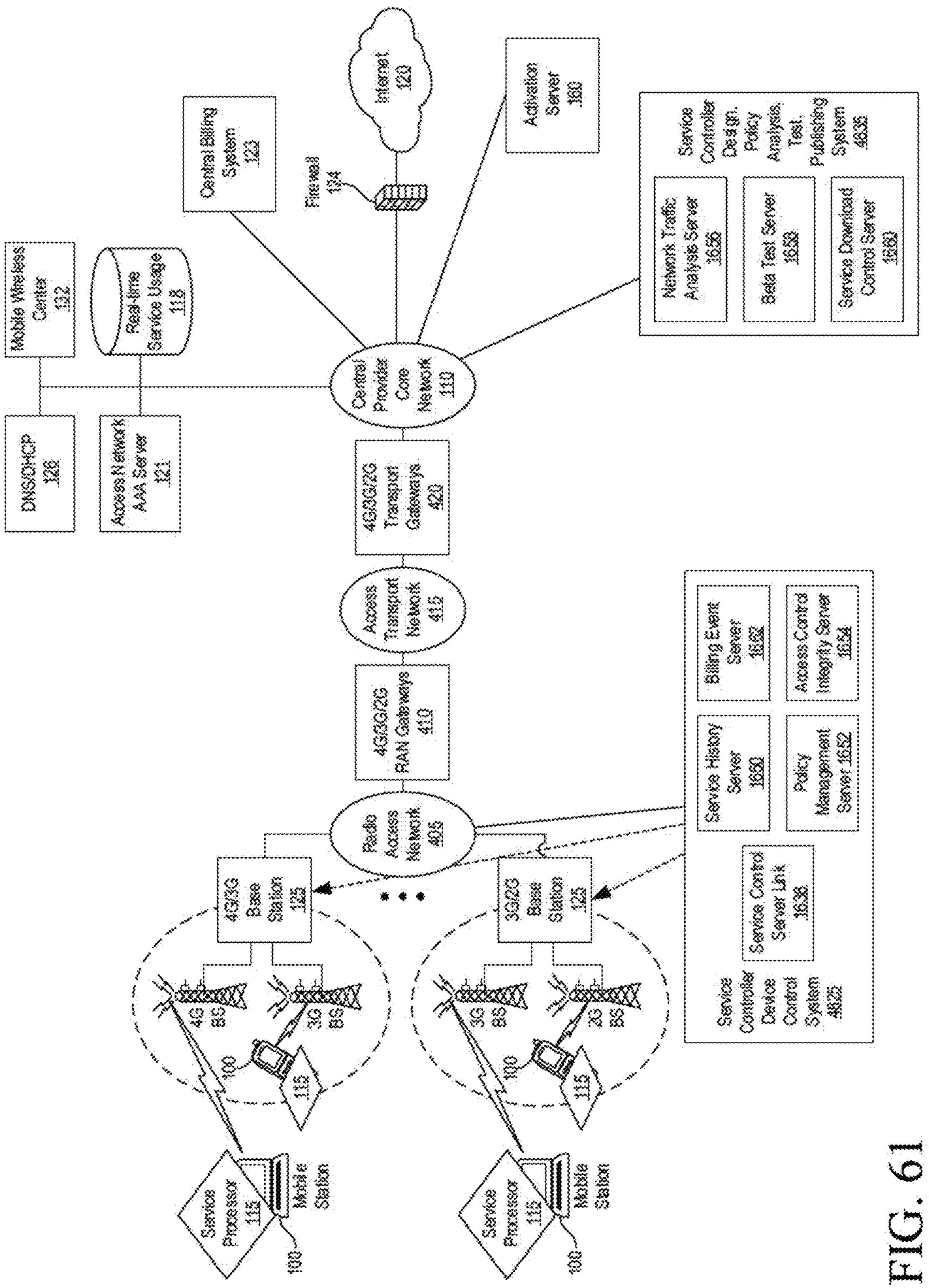
FIG. 61 illustrates a network architecture for locating service controller device control functions in the radio access network in accordance with some embodiments.

FIG. 61 illustrates a network architecture for locating service controller device control functions in the radio access network in accordance with some embodiments. As shown, the service controller device control system 4825 is located in the radio access network 405, or in some embodiments, in the 4G/3G base station(s) 125 (as indicated by the dashed line with the arrow), or alternatively, in the 3G/2G base stations 125 (as indicated by the dashed line with the arrow).

Ambient Services

In some embodiments, improved and simplified processes for provisioning a device or user for service on a central provider network, an MVNO network or a virtual service provider (VSP) on the central provider network are provided. In some embodiments, provisioning includes one or more of the following: a process or result of assigning, programming, storing or embedding into the device and/or network a set of credentials, or otherwise providing the credentials to the user; the credentials being at least in part carried on the device or with the user; and/or at least a portion of or a counterpart to the credentials being stored or recognized by the network so that the various network elements responsible for admitting the device access to the appropriate service activities do so once the device or user service is active.

As an example, as discussed herein, the credentials can include one or more of the following: phone number, device identification number, MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider, OEM, master agent (service distributor), VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user.

In some embodiments, provisioning includes assigning, programming or embedding into the device and/or network the information to define the level of service activity, referred to as a service profile, that the device is authorized to receive. In some embodiments, provisioning also includes establishing the device settings and/or network settings to define an ambient activation experience in which the device user receives a set of services after (e.g., within a short period of time after) purchasing or otherwise obtaining or installing the device whether the device has or has not been registered and activated with the device user or device owner.

In some embodiments, ambient services or adaptive ambient services for a device (e.g., any type of device capable of communicating with a wireless network, including an intermediate networking device) or use of a service on a wireless network are provided. In some embodiments, the ambient experience is the user experience that is available at the time the device is sold in the event the user has not yet signed up for a service plan, or the device is not sold with a prepaid service plan or other required service plan. In some embodiments, an ambient service generally refers to a set of application access, network destinations, sources, and/or traffic control rules to enable an ambient service experience, and, in some embodiments, also includes a set of billing rules to keep an accounting of service usage for different service usages (e.g., various bill by account rules or service usage accounts). For example, the ambient experience is defined by an ambient service profile, an ambient service plan, the other service usage activity control policies, and/or the ambient service or ambient experience bill-by-account usage accounting and/or billing policies in effect in the network, on the device, on an intermediate networking device, or any combination thereof.

For example, if the device service processor (e.g., on the device, the intermediate networking device, or both) is used in large part to define the ambient service profile, then the initial provisioning and activation settings in the service processor, and possibly the service controller, can define the user service upgrade offering choices, network destination access control possibilities, traffic control policies, mobile commerce transaction capabilities (e.g., which transaction websites, WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet-based text services have access but email downloads do not), or other example service capabilities. Examples of the type of useful services that can be enabled with the ambient service techniques disclosed herein include the following embodiments. In some embodiments, a content purchasing service (e.g., books, news, magazines, music, video, games, and mobile applications) is facilitated in which the device access is partially, largely, or entirely limited to the device or network-based applications, source/destination addresses, and/or content transfers required to properly implement the service, in which other applications, source/destination addresses and/or content types are partly, largely, or entirely blocked. In some embodiments, such ambient services can have service usage monitoring and accounting that is reported for one or more individual ambient services. For example, the service usage for a book storefront browsing and download service can be separately accounted for while other services such as a general Internet shopping or auction service, a music service, a picture upload and store/print service, a search and/or advertisement service can also each have individual service usage accounting, or in some cases, groups of services can have aggregate service usage accounting. In some embodiments, an ambient service is provided for the device prior to the time a user has paid for permanent or full time access services, which, for example, can include a service selection platform for allowing the device user to access certain limited network functions and/or resources, and to access those network resources necessary to choose a pay-for-service plan option. In some embodiments, the individual and/or group ambient service usage accounting can be transformed into one or more billing records in which the service usage for each ambient service is billed to an entity, which can be the business entity that provides the ambient service experience and/or transaction platform, or the end user, or the central service provider, or an MVNO service provider, or a distribution partner, or an OEM, or another entity interested in paying for one or more ambient services.

It will be apparent to one of ordinary skill in the art that allowing all of these services, and blocking other ambient user service attempts (e.g., unpaid large file size Internet downloads or uploads, movie viewing, or other access that would consume bandwidth and cause the ambient service to be a potential source of losses for the service provider) is made possible by the service profile control capabilities of the service processor and/or the service controller. The bill by account embodiments, as discussed herein, in which each service activity can, for example, be separately tracked with the service monitor and other agents and server functions to produce a billing offset that allows categorization and mediation of different billing entities (accounts) provides the capability for the service provider to individually account for the costs of each ambient service element. This allows business models wherein the free access to the end user is paid for or partially paid for by one or more service provider partners who are billed for service access using the bill by account capabilities (e.g., the transaction partners pay for user access to their transaction experience and perhaps pay a revenue share for transaction billing, the advertising sponsored website partners pay for their access service share).

While the service control capabilities of the service processor and the bill by account service cost sharing and transaction revenue sharing in some cases can create a profitable ambient business model, in other cases, the ambient services can be a potential source of losses for the service provider. Accordingly, in some embodiments, the ambient service capabilities can be modified over time to reduce service cost to the service provider or VSP based on a variety of decision factors. For example, the user can have one level of traffic control for a period of time, and if the user has not signed up for service by the end of the period or if the user is no longer in good standing (e.g., based on various service usage criteria) for use of the service, the ambient service access is reduced (e.g., the transmission speed can be reduced or throttled, and/or the total volume of data transmitted can be reduced or throttled, possibly additionally according to time of day parameters and/or network busy state parameters) by changing the service control policy settings in the service processor, and the service level can be further reduced over time if the user continues to not sign up for service or the user does not create much transaction revenue. In some embodiments, this can limit or prevent users from "camping" on free ambient services without generating any meaningful revenue to fund the service, or viewing any advertising to fund the service. In some embodiments, a user can be throttled in such a manner until the user executes a "useful activity" or a "preferred activity" (e.g., a purchase, viewing advertising, answering a questionnaire, signing up for a service, accepting a beta trial, and/or earning valued customer points), and after a useful or preferred activity occurs, then the access capabilities of the device are increased. As another example, the recursive throttling algorithms discussed herein can be utilized to one or more of the service activities offered in ambient service mode so that the user experiences what full speed service is like, and if the user continues consuming appreciable bandwidth with the service activity, then the activity is throttled back to reduce costs until or unless the user selects a pay-for-service plan (or accumulates sufficient service access points as described herein). In these examples, the service processor or service controller can issue the user a notification explaining that their service is currently free so their usage is being throttled, and if they desire to receive better service, service plan upgrade offers can be delivered to the user interface (UI). In some embodiments, the level of access (e.g., ambient service bandwidth and/or transfer limits, reachable addresses beyond the ambient service, and/or bandwidth or transfer limits for open Internet usage and/or email usage, text usage) is increased as the user increases the number of useful or preferred activities (e.g., the user accumulates "service access points," which are then spent on access activities). It will now be apparent to one of ordinary skill in the art that the various ambient service parameters including various provisioning and activation processes used to provide an ambient service, can also be managed by various virtual service provider (VSP) techniques. For example, this allows the same service controllers and service processor solutions to be used to define a wide range of ambient experiences for various device groups or user groups that are controlled by different VSPs.

Similarly, rather than controlling ambient service profile settings using the device-assisted services functions and/or VSP functions to control the service controller, service processor, provisioning and activation settings, various other embodiments call for the ambient service profile settings to be controlled by various network-based service activity control equipment as similarly described herein and/or by various intermediate networking devices. For example, depending on the level of service control and service monitoring sophistication (e.g., advanced DPI (Deep Packet Inspection), TCP (Transmission Control Protocol) session aware techniques, or other service aware techniques), some, much, most or all of the above-described ambient services functionality can be implemented using network-based service controls and various VSP management and control techniques. Similarly, in some embodiments, service processor, provisioning and activation settings, and the ambient service profile settings can also be (at least in part) controlled by various intermediate networking devices. In some embodiments, network equipment that can provide ambient service controls include, for example, service gateways, routers, charging functions, HLRs, home agents, proxy servers, and other network equipment as would be apparent to one of ordinary skill in the art.

Whether the ambient service monitoring and control apparatus is implemented with device-assisted service techniques, network-based techniques, or a combination of both, various embodiments described herein provide for adaptive ambient service embodiments that address the dynamic (e.g., non-static) nature of Internet service access needs (e.g., allowable source/destination and/or application lists, blocked source/destination and/or application lists, traffic control policies for each source/destination and/or application).

Providing an ambient service profile for an ambient service can be complicated by the variable nature of network addresses and offered services such as, for example, the Internet. For example, a central service provider, MVNO provider or VSP may desire to provide ambient service access to a given web site partner's web service, in exchange for a business deal with the website partner that motivates the service provider to provide the ambient access. In this example, the ambient access is intended to enable access (either wide open or throttled) to the website partner's collection of URLs (and possibly one or more applications) associated with the service, while blocking or differentially throttling access to other network destinations and/or applications not associated with the web site partner services. A problem can arise in this example whenever the website partner changes the addresses and/or domains associated with the website services, because any static access list and access list policies generally makes a static list impractical. In such cases, the adaptive ambient service embodiments described herein provide a solution to these and other problems, whether the adaptive ambient access controls and/or traffic controls are implemented with device-assisted service apparatus, network-based apparatus, or a combination of both.

As another example, an ambient service profile for a transaction service provider can include that service provider's domain or web site as an allowed destination. However, there are often inline advertisements provided by ad servers and/or partner sites that should also be included in the set of allowed destinations in the ambient service profile, and these are often dynamic or frequently changing. As another example, an ambient service provider may not want to allow access to sites that typically involve relatively high data usage (e.g., streaming and/or downloading of video content), while allowing other sites that result in less bandwidth intensive service usage activities. As another example, during a session a user may attempt to surf out of the ambient service, such as when the user attempts to access a website or service that is not an allowed or pre-approved destination in the ambient service profile (e.g., a search site can be the pre-approved ambient service, but the ambient service partner paying for the search service access may desire to also allow and pay for user click-through to search results and/or advertising offers, or, for example, an ambient shopping service sponsor may desire to also pay for click-through to vendor partners sites to provide a purchase transaction opportunity to the user). Moreover, the defined ambient service profile quickly stagnates as various applications and destinations, for example, change over time or on each request/usage (e.g., new applications become available and/or web site content and link changes occur daily if not hourly and/or are dynamically generated using well known web site techniques). Thus, what is needed are adaptive techniques for providing an adaptive ambient service.

Accordingly, in some embodiments, adaptive ambient services using an adaptive ambient service profile are provided. In some embodiments, a flexible and efficient adaptive ambient service control is provided by using an intelligent element in the network that performs one or more of the following functions: (1) beginning with an initial list of allowable ambient service device access behaviors (e.g., addresses/URLs, applications and/or content types, in some cases, with a set of traffic control policies that are differentiated as discussed above), (2) as the user accesses the ambient service, determine if the access behavior of the device is within or outside of the desired ambient service access and/or traffic control policies (e.g., determine if the access behavior is properly associated with the desired ambient services and/or service policies), (3) for those access behaviors that are within the desired ambient service policies, expand the list of allowable ambient service device access behaviors to include the new behaviors that are desired and/or preferred (e.g., new sub-domains, advertising content sources, transaction partner addresses, and/or desired surf-outs), (4) for those device access behaviors that are outside of the desired/preferred ambient service policies (e.g., are not associated or beneficially associated with the desired/preferred ambient service), expand the list of blocked or differentially throttled ambient service device access behaviors to include the new behaviors that are undesired or less desired (e.g., not preferred). In some embodiments, the intelligent network element used to adapt the ambient service control is included in one or more network equipment functions (e.g., service gateways, routers, charging gateways, HLRs, AAA, base station, service controller, and/or other network equipment functions). In some embodiments, the intelligent network element used to adapt the ambient service control is included in the device and/or intermediate networking device service processor. In some embodiments, the intelligent network element used to adapt the ambient service control is included in a combination of the device (and/or intermediate networking device) and one or more network equipment functions.

In some embodiments, a flexible and efficient adaptive ambient service is provided using a baseline (e.g., a basic starting point) of an adaptive ambient service profile that includes default or previously defined (e.g., by an ambient service provider, network provider, VSP, or another entity) allowable access list and disallowed access list for the ambient service, such as to various applications, destinations, sources, traffic control rules, and/or bill by account rules or a combination thereof. In some embodiments, the ambient service profile is an automated and a self-evolving service profile using various techniques, such as those described herein.

In some embodiments, an adaptive ambient service includes providing an ambient service profile. In some embodiments, the ambient service profile includes ambient service allowed access rules and ambient service disallowed access rules. In some embodiments, the ambient service profile further includes ambient service monitored access rules, in which access to, for example, certain applications or destinations is allowed but is considered suspect or unknown, and thus, such access is monitored (e.g., until that application or destination is reclassified under an ambient service allowed access rule or ambient service disallowed access rule). In some embodiments, the ambient service allowed/disallowed/monitored access rules include IP addresses, domains (e.g., URLs for web sites), or any other unique network destination or application or source identifiers. In some embodiments, the ambient service rules provide differentiated traffic control rules. In some embodiments, the differentiated traffic control rules provide differentiated bandwidth and/or total data transfer limits according to traffic control policy elements, such as activities associated with the main ambient service functions (e.g., the main partner website or a transaction service), activities associated with secondary ambient service functions (e.g., a secondary surf-out website or a less desired service activity), activities transferring different content types, activities associated with different applications, activities based on time of day, activities based on network busy state, activities that require higher or lower QoS (Quality of Service), and/or other activities.

In some embodiments, the ambient service allowed access rules and/or ambient service disallowed access rules are pushed to (e.g., published, at predefined times, during low service usage times or periods of low service usage activities, or upon request) the device or the intermediate networking device (e.g., any type of networking device capable of communicating with a device and a network, including a wireless network, example intermediate networking devices include a femtocell, or any network communication device that translates the wireless data received from the device to a network, such as an access network) from the network (e.g., an element in the network that securely provides such data, such as a service controller for the ambient service). In some embodiments, the ambient service allowed access rules and/or ambient service disallowed access rules are pulled by (e.g., at predefined times, during low service usage times or periods of low service usage activities, or upon request) the device or the intermediate networking device from the network (e.g., an element in the network that securely provides such data, such as a service controller for the ambient service).

In some embodiments, the device or intermediate networking device includes techniques for automatically adapting the service profile based on ambient service usage and thereby updates the ambient service allowed access rules, the ambient service monitored access rules, and/or ambient service disallowed access rules locally. Device access activities that fall into the monitored access rules are those activities that are determined not to be disallowed (as of that point in time) and are allowed to take place while the intelligent adaptive service element tests the activities on the monitored access rules list to determine if they should be moved to the allowed access rules list, should be moved to the disallowed access rules list, or should remain on the monitored access rules list for further testing and/or observation. In this way, a useful and friendly user experience can be maintained as the adaptive ambient service rules undergo "training" to accommodate dynamic changes to the ambient service sites/applications. The device or intermediate networking device can then periodically provide the updated ambient service allowed access rules, ambient service monitored access rules, and/or ambient service disallowed access rules with the network using various network communication techniques, such as those described herein. In some embodiments, the device periodically synchronizes its locally stored ambient service allowed access rules, ambient service monitored access rules, and/or ambient service disallowed access rules with the network using various network communication techniques, such as those described herein. In some embodiments, the training for one or more of the three lists occurs on the device. In some embodiments, the training for one or more of the three lists occurs in the network. In some embodiments, the training for one or more of the three lists occurs partly on the device and partly in the network (e.g., depending, in some cases, on the device (such as the computing/memory capacity of the device), network bandwidth, and/or any other architecture criteria).

It will now be apparent to one of ordinary skill in the art that the various ambient service parameters, including the provisioning and activation processes used to create the ambient service activation, can also be managed by the VSP apparatus and processes described herein. For example, this allows the same service controllers and service processor solutions to be used to define a wide range of ambient experiences for various device groups or user groups that are controlled by different VSPs.

Similarly, rather than controlling the ambient service profile settings using the VSP functions to control the service controller, service processor, provisioning and activation settings, other embodiments call for the ambient service profile settings to be controlled by the network-based service activity control equipment as similarly discussed herein. Depending on the level of service control and service monitoring sophistication (e.g., highly advanced DPI or service aware techniques), some, much, most or all of the above-described ambient services functionality can be implemented using network-based service controls and the VSP management and control embodiments described herein.

In some embodiments, an adaptive ambient service includes implementing an ambient service profile for assisting control of a communications device use of an ambient service on a wireless network, in which the ambient service profile includes various service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service. In some embodiments, these techniques are performed by the communications device (e.g., using a service processor), a network element/function (e.g., using a service controller, proxy server, and/or other network elements/functions/devices), and/or an intermediate networking communications device and, in some embodiments in various combinations with each other and/or with other functions/elements on the network/in communication with the network. In some embodiments, the service policy settings include one or more of the following: access control settings, traffic control settings, billing system settings, user notification with acknowledgement settings, user notification with synchronized service usage information, user privacy settings, user preference settings, authentication settings, admission control settings, application access settings, content access settings, transaction settings, and network or device management communication settings.

In some embodiments, the ambient service profile is implemented at least in part by a proxy server, in which the monitored use of the ambient service based on the ambient service profile is performed at least in part by the proxy server, and in which the proxy server communicates the ambient service traffic to the communications device. In some embodiments, the ambient service plan allows for access to the ambient service with limited service capabilities that are limited based on one or more of the following: period of time, network address, service type, content type, application type, QoS class, time of day, network capacity (e.g., network busy state), bandwidth, and data usage. In some embodiments, the ambient service plan is a low cost or free trial service plan that is bundled or provided as an option for purchase at a point of sale of the communications device. In some embodiments, the communications device is activated prior to a point of sale of the communications device, and the ambient service plan is associated with the communications device during activation. In some embodiments, the ambient service plan is associated with the communications device during one or more of the following: a manufacture of the communications device, a distribution of the communications device, or a point of sale of the communications device. In some embodiments, the ambient service plan includes an option to purchase a new service plan for the communications device, in which the new service plan includes additional service capabilities. In some embodiments, the ambient service profile is programmable by one or more of the following: a manufacturer, a service provider, a distributor, a virtual service provider, and a device manager.

In some embodiments, the ambient service is a transaction based service, in which service usage for the ambient service by the communications device is not billed, and in which electronic commerce based transactions performed using the communications device are billed as transaction based charges. In some embodiments, the ambient service is a transaction based service, in which electronic commerce based transactions performed using the communications device are billed as transaction based charges, and in which at least a portion of service usage costs are billed to one or more of the following: an advertiser, a transaction provider, a mobile virtual network operator, a virtual service provider, and an ambient service provider.

In some embodiments, the communications device is a mobile communications device or an intermediate networking device, and the ambient service includes one or more Internet-based services. In some embodiments, the communications device is a mobile communications device, and the ambient service includes one or more Internet-based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem.

In some embodiments, the various techniques for adaptive ambient services are performed (e.g., at least in part) on the device (e.g., device 100) and/or on an intermediate networking device (e.g., using a service processor 115 and an ambient service profile). For example, the various techniques for adaptive ambient services can be performed on a processor of the device, and the ambient service profile can be securely stored locally on the device using various techniques for secure execution and storage.

In some embodiments, the various techniques for adaptive ambient services are performed on the device or on the intermediate networking device with assistance or verification from the network (e.g., a service controller 122 executed on any network element, in which the service controller 122 is in secure communication with the device/intermediate networking device, including the service processor 115 executed on the device/intermediate networking device). In some embodiments, adaptive ambient services are performed on the device or on the intermediate networking device with assistance or verification from the network (e.g., using a service controller for maintaining a centralized set of ambient service allowed access rules and/or ambient service disallowed access rules, and a superset of all ambient service monitored access rules, working cross device population). In some embodiments, the service controller 122 or other network element(s) assist the device for implementing these techniques for adaptive ambient services (e.g., cross device, cross URL/domain usage patterns/monitoring, publishing centralized set of ambient service allowed access rules, ambient service monitored access rules, and/or ambient service disallowed access rules, including, for example, compromised and/or hacked URLs). In some embodiments, the service controller 122 or other network element(s) assist the device for implementing these techniques for adaptive ambient services by verifying the device maintained set of ambient service allowed access rules, ambient service monitored access rules, and/or ambient service disallowed access rules. In some embodiments, the service controller 122 or other network element(s) assist the device for implementing these techniques for adaptive ambient services by verifying the device monitored service usage with CDR service usage using various techniques, for example, such as those described herein. In some embodiments, the service controller 122 or other network element(s) assist the device for implementing these techniques for adaptive ambient services by verifying the device monitored service usage by IP address (e.g., using CDR by traffic destination).

In some embodiments, the various techniques for adaptive ambient services are performed on the network (e.g., a gateway, router or any other network element using, for example, deep packet inspection (DPI) on the monitored (non-encrypted) network traffic).

In some embodiments, a device is suspended based on inactivity, or the device is placed in a suspended service state or suspended account state, so that the network does not get bogged down with a significant number of devices and credentials that are inactive. For example, this can also result in a portion of the device credentials being assigned back to an available pool rather than reserved for that particular device (e.g., phone numbers if phone numbers are scarce). The device account and/or activation state can be re-activated when the device comes back online. For example, the suspend state can be a simple suspension of services without changing the account status, in which case the re-activation process can be automatically completed as a subset or entire set of the activation sequence that occurs when the device is initially used as described herein. The suspend state can also involve changing the account status to inactive, in which case the re-activation process can automatically reconfigure the account status back to an active state when the device re-accesses the network. For example, the suspend state can involve de-assigning or possibly re-claiming a portion of the device credentials. If a portion of the credentials are de-assigned, then when the device re-accesses the network credentials can be automatically re-assigned as described in various embodiments described herein.

Figure 62:
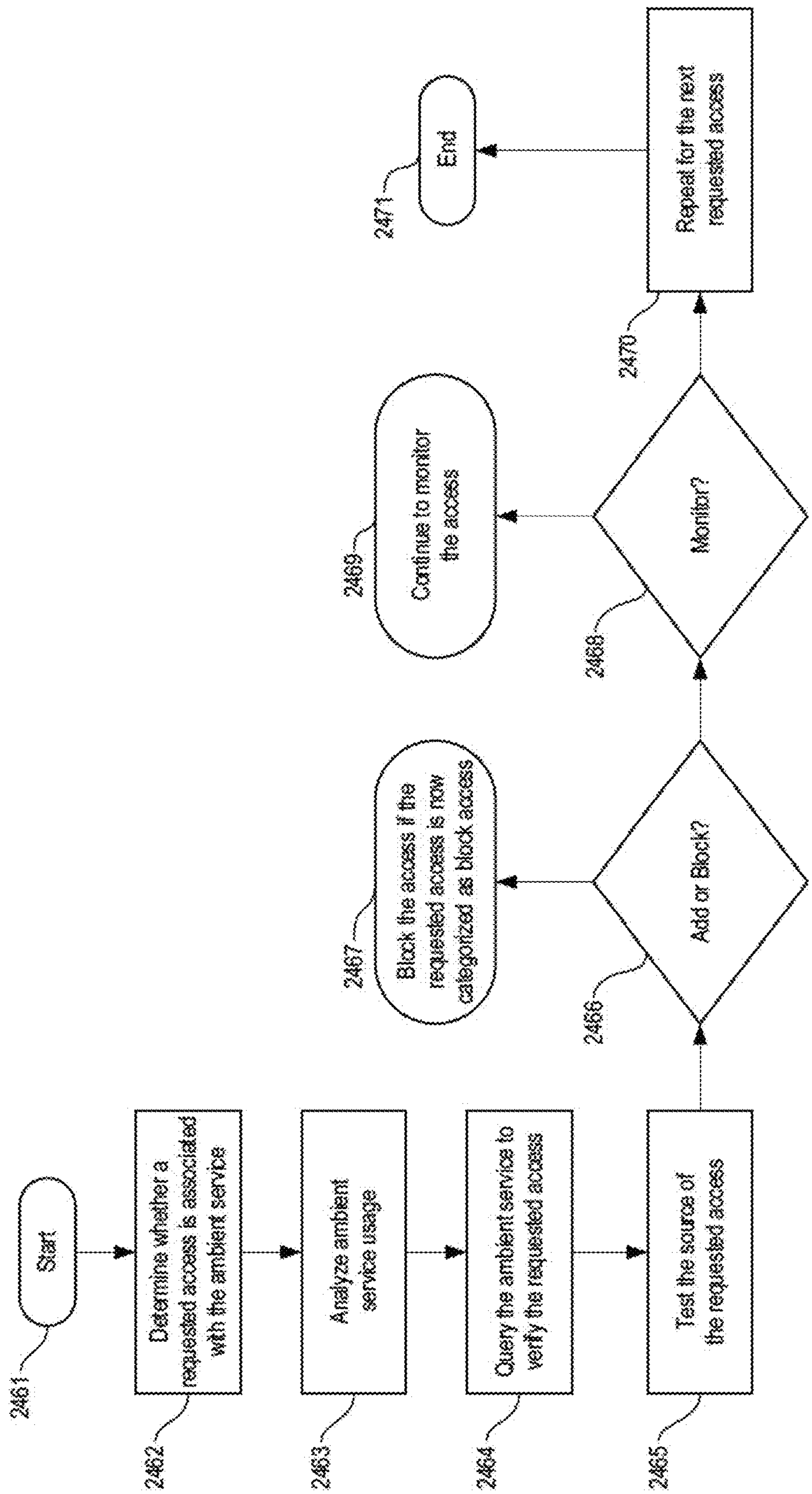
FIG. 62 illustrates a flow diagram for providing adaptive ambient service in accordance with some embodiments.

FIG. 62 illustrates a flow diagram for providing adaptive ambient service in accordance with some embodiments. In some embodiments, a combination of various techniques are used for providing adaptive ambient services, such as those described below with respect to FIG. 62. In some embodiments, a subset of these various techniques are employed using various combinations of such techniques or individual techniques. At 2461, the process for an adaptive ambient service begins. At 2462, whether a requested access is associated with the ambient service is determined. At 2463, the ambient service usage is analyzed. At 2464, the ambient service is queried to verify the requested access (e.g., if the requested access is not in the ambient service profile or otherwise suspicious or covered by a monitored access rule, then the ambient service can be queried for more information as to whether this requested access is associated with the ambient service usage or should otherwise be allowed). In some embodiments, various requested accesses can be allowed for certain users or for certain requests to allow for monitoring or testing but denied for other users/requests. In some embodiments, the device or intermediate networking device based ambient service profile settings (e.g., local ambient service profile rules, categorizations, settings, and/or other data) are provided to the ambient service provider for further analysis and to correlate various access requests with the ambient service (e.g., monitored access requests can be confirmed as approved or not, that is associated with the ambient service or otherwise permissible, or not, as deemed by the ambient service provider using various techniques). At 2465, the source of the requested access is analyzed. In some embodiments, the source of the requested access is itself tested using various techniques (e.g., search engine/web crawler techniques or Document Object Model (DOM) techniques to determine whether certain web based requests are associated with the ambient service; or to verify with a secondary source such as an ad server; or to verify ownership of certain network domains by the ambient service provider or associated advertiser).

Various other techniques can also be employed for providing adaptive ambient services as will now be apparent to one of ordinary skill in the art in view of the embodiments and examples described herein. At 2466, based on the above testing of the association of the requested access with the ambient service, determine whether the requested access can now be added or blocked based on the monitored access. At 2467, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 2468, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 2469. At 2470, the process is repeated for the next requested access. At 2471, the process is completed.

Network-Based Service Monitoring, Notification and Control

In some embodiments, as described herein, it is desirable to implement some or all of the deep service usage monitoring, service control or control assistance, or service notification or notification assistance associated with a service profile in network apparatus rather than in the device, or to implement some of the deep service monitoring, control, control assistance, notification or notification assistance in the device and others in the network. This is the case, for example, in a mixed network in which some devices have some, or at least one, or all of the service processor capabilities discussed herein, but other devices do not have as much or any of the service processor capabilities. Another example is for networks or devices that do not have any service processor capabilities or where it is desirable to do all of the service monitoring, control and notification in the network rather than the device. As described below, FIGS. 63 through 72 depict various embodiments for combinations of device-based service monitoring, control or control assistance, usage notification or usage notification assistance and/or network-based service monitoring, control or control assistance, usage notification or usage notification assistance.

FIG. 63 illustrates a network architecture for locating service controller device control functions with AAA and network service usage including deep packet inspection functions in accordance with some embodiments. As shown, an integrated device service control, device usage monitoring system 5410 is provided that integrates service controller functions including a deep packet control (DPC) policy implementation function 5402 with access network AAA server 121 functions and network real-time service usage 118 functions. In the following discussion, it is understood that the AAA server 121 function can be re-located to another point in the network or network equipment partitioning with no loss in generality. It is also understood that many of the functional partitions described for the various embodiments within integrated device service control, device usage monitoring system 5410 can be re-drawn with no loss in applicability, function or generality. Finally, it is understood that one or more of the functional elements described within the integrated device service control, device usage monitoring system 5410 can be removed for simplified embodiments and that not all the functionality described herein is necessary in some embodiments.

In some embodiments, the integrated device service control, device usage monitoring system 5410 provides for network-based service monitoring or control that satisfies various network neutrality and/or privacy requirements based on indication(s) received from the device or user (e.g., user input provided using the device UI using the service processor 115; user input provided through another website, WAP site or portal; or user input provided through the service contract where the user agrees to the monitoring and/or service control levels) and network-based service control using a DPI service monitor 5412 and/or the DPC policy implementation 5402.

In some embodiments, the integrated device service control, device usage monitoring system 5410 provides for network-based service monitoring or service control that satisfies various privacy requirements using indication(s) received from the device or user (e.g., user input provided using the device UI using the service processor 115; user input provided through another website, WAP site or portal; or user input provided through the service contract where the user agrees to the monitoring and/or service control levels) and network-based DPI service usage monitoring or DPC policy implementation using the DPI service monitor 5412 or DPC policy implementation 5402 as described below. In some embodiments, the DPI service monitor 5412 and/or DPC policy implementation 5402 include a secure database for storing service monitoring and CRM information for each device/device user. In some embodiments, the DPI service monitor 5412 and/or DPC policy implementation 5402 can be integrated with the integrated device service control, device usage monitoring system 5410 (as shown) or provided within a separate router, server, and/or software/hardware implemented function that is in secure communication with the integrated device service control, device usage monitoring system 5410 and/or other network elements based on the network architecture. In some embodiments, a secure data store, such as a secure database, is not integrated with the DPI service monitor 5412 or DPC policy implementation 5402 but is in secure communication with the DPI service monitor 5412 or DPC policy implementation 5402, the integrated device service control, device usage monitoring system 5410 and/or other network elements depending on the architecture (e.g., a billing server or any other network element). In some embodiments, the user selects limits and/or restrictions on who can access remotely stored service usage history and/or other CRM/privacy related data (e.g., CRM/privacy gatekeeper settings), and, for example, other network elements and/or network administrators access to such data can be limited and/or restricted accordingly. For example, access to such stored service monitoring and CRM information can require certain security credentials and/or using various other well known secure data storage techniques, such as the various secure storage techniques described herein.

In some embodiments, the secure database possessing user service usage information that is considered sensitive and has not been approved for distribution by the user can be made unavailable to the credentials possessed by network managers or network functions except, for example, for emergency service situations of government mandated monitoring needs where special credentials are brought out of secure storage that are not normally available. In some embodiments, rather than the user selecting limits, a certain set of restrictions are assumed unless the user selects information filtering settings that allow more information to be shared with the network functions, network administrators or service provider partners. In some embodiments, the information is filtered to remove information thought to be sensitive but still transmits service usage information needed for monitoring network services or other important parameters. For example, the website destinations a user is visiting can be classified with generic identifiers that are not decodable or the individual website information can be completely removed. Many other examples will be apparent to one of ordinary skill in the art.

For example, the stored service monitoring and CRM information can also be organized into groups to define group CRM profiles to store service monitoring information for every user indexed by the user credentials (e.g., such groups can also be used for various VSP related functions, as described herein). The DPI service monitor 5412 or DPC policy implementation 5402 also uses the secure storage to store service monitoring information for each user indexed by the user credentials or another aspect of the device identifier or address assignment (e.g., IP address or MAC address). In some embodiments, a CRM information manager (e.g., a supervisor program executing on the integrated device service control, device usage monitoring system 5410) communicates with the other network functions and provides filtered service usage and CRM information according to CRM filtering rules for each user or for groups of users. In some embodiments, the filtered CRM data can be made available using secure communications with other networking equipment by the integrated device service control, usage monitoring system 5410. In some embodiments, the filter settings for some users allow more information to be shared from the secure service usage information than others due to the differences in user preference settings and/or service plan agreements.

In some embodiments, user privacy preference information is used to determine the privacy filter settings, which are securely implemented by the integrated device service control, device usage monitoring system 5410. For example, service CRM filter settings can be received at the time of service contract sign up (e.g., service plan selection) and/or allow the user to log into service preferences web page to change settings (e.g., without involving any interaction with local software on the device). As another example, software on the device (e.g., including the service processor 115) can be used for selecting user CRM/privacy preferences, which are securely communicated to the integrated device service control, device usage monitoring system 5410 (e.g., the device can include credentials that can be verified to allow for selection/modification of CRM/privacy preferences or other user based preferences securely maintained in a network server, such as the integrated device service control, device usage monitoring system 5410 or another network element, such as shown in various other embodiments described herein). In these examples, the filtered CRM data is available from the integrated device service control, device usage monitoring system 5410 for other network components over a secure or open communication link. In another example, user CRM/privacy preferences are input using a web server hosted by the integrated device service control, device usage monitoring system 5410 or the central billing system 123. In another example, software on the device (e.g., including the service processor 115) can be used for securely communicating user preference decisions to an intermediate server that acts as a device manager and intermediate server for devices or device groups and the integrated device service control, device usage monitoring system 5410.

In some embodiments, the integrated device service control, device usage monitoring system 5410 provides for network-based service control as described below. In some embodiments, and similar to the above-described network-based CRM filtering embodiments, the DPI service monitor 5412 or DPC policy implementation 5402 includes secure storage (e.g., a secure database) for storing service monitoring information (e.g., based on user selections/preferences), and the DPC policy implementation 5402 performs traffic shaping/throttling algorithms for each user based on the stored service monitoring information from DPI service monitor 5412. For example, network-based DPI traffic inspection by the DPI service monitor 5412 can use the secure storage to save service monitoring information for each user indexed by the user credentials or other parameters, such as IP address or other network tag. As another example, the DPC policy implementation 5402, for example, which can be supervised by policy management server 1652 as described herein with respect to various other embodiments, can implement service usage history statistical analysis inside the secure storage and maintain a service usage history analysis for each device/user and/or perform various traffic shaping and/or throttling algorithms based on various device, user selected and/or service plan related settings (e.g., for network neutrality purposes) allowing for various higher level service usage goals for one or more users, as similarly described herein with respect to various device-based service usage monitoring embodiments (e.g., except for certain encrypted network traffic flows or application related flows for which traffic control generally needs information from the application level and/or content specific traffic control).

In some embodiments, input is collected on how to implement service control (e.g., from the user of the device). For example, such input can be determined based on one or more of the following: a service plan choice for the device; input provided by a user via a website (e.g., web based portal) for indicating changes to service control policies, as similarly described above; input provided by a user via the device (e.g., including the service processor 115), which securely communicates the input to the DPC policy implementation 5402, for example, which can be supervised by the policy management server 1652; and input provided by a user via the device (e.g., including the service processor 115), which securely communicates the input to an intermediate server for the DPC policy implementation 5402, as similarly described above. In some embodiments, such service control is based on various algorithms as described herein that identify the heaviest usage service activities and recursively control the speed for those activities while leaving certain others unaffected, and in a manner that is specified or selected by the user to ensure network neutrality. In some embodiments, the user is offered a choice for controlling service usage and/or selects an algorithm that controls all activities equally/neutrally (e.g., based on selected user preferences). For example, by implementing service control algorithms that are network neutral (e.g., throttling all activities equally or throttling the highest usage algorithms without singling out certain activities for throttling unless they satisfy certain network neutral usage history or usage statistics criteria), or that are approved, selected or otherwise specified by the user, network neutral traffic control or service usage control can be maintained.

In some embodiments, the DPI service monitor 5412, possibly in conjunction with the service usage notification 5420 and/or service history server 1650, provides service usage/service cost (e.g., a real-time service usage counter) related notifications to the device based on user preferences, as similarly described above with respect to various device-based service usage/service related notification embodiments. For example, the DPI service monitor 5412, for example, in conjunction with the service usage notification 5420 and/or service history server 1650, can perform service usage/service related notification algorithms based on one or more of the following: service plans, device settings, and/or user selected preferences (e.g., such notification messages can be securely communicated to the device and/or to the device via an intermediate server). For example, the policies that govern how the user is notified of service usage or service cost can be determined by the policy management server 1652 and/or the service usage notification 5420. As another example, user acknowledgements of important notification messages and/or user choices related to important service usage decisions can be requested, as similarly discussed above with respect to device-based service usage/control embodiments, which can then be communicated to the central billing system 123 as confirmation for any such important notification messages (e.g., related to service usage overage charges and/or confirmation of service upgrades). In some embodiments, various other service usage algorithms related to service usage and/or service cost forward projections described herein with respect to device-based service usage forward projection embodiments are performed in the network, such as by the integrated device service control, device usage monitoring system 5410, and such forward projections can then be communicated to each respective device as service usage notification messages (e.g., using a push based approach (initiated in the network) and/or pull based approach (initiated by a request from the device)). For example, these embodiments for projected service usage methods, as described herein, can be helpful for determining when the user is using services in a manner that will cause the user to run over a service limit so that the user can be notified, or the service can be controlled or throttled if the user has selected a control or throttling option.

In some embodiments, one or more intermediate servers are provided for workload balancing and/or off-loading the integrated device service control, device usage monitoring system 5410 and perform one or more of the functions described above with respect to various embodiments of the integrated device service control, device usage monitoring system 5410. In some embodiments, service plans, device settings, and/or user selected preferences are used to associate each device/user with a preprogrammed profile to more efficiently associate such devices/users with their selected service plans, device settings, and/or user preferences. For example, the process of setting a service profile for a given device can be determined by assigning the device to a service flow that has the pre-defined service profile and is shared with other devices within the integrated device service control, device usage monitoring system 5410 rather than individually processing the service flow manipulations for each device. In some embodiments, the act of provisioning and activating a service profile for a given devices involves setting up the service flow definition and identifier within the integrated device service control, device usage monitoring system 5410 (if it is not already set up) and then assigning the routing of the device credentials to that service flow identifier. User preferences can, for example, be accounted for by assigning the device service flow to one of several pre-defined profiles based on user preferences that are all supported under the same service plan. For example, one service flow profile can call for service usage notification but no control under the same service plan as another service flow profile that calls for less notification but active service usage control to maintain user costs to a monthly post-pay limit.

In some embodiments, the bill by account function is implemented in the context of the integrated device service control, device usage monitoring system 5410 or other network-based system embodiments described herein. For example, the DPI service monitor 5412, in some cases in conjunction with service history server 1650, can operate in conjunction with bill by account policy settings stored in the billing event server 1662 so that service activities are divided into the account classifications defined by the service profile settings. The bill by account feeds can then be sent to the billing system or to an intermediate billing event aggregation server that collects this type of deep packet inspection generated information from one or more integrated device service control, device usage monitoring system 5410 units to aggregate and format the information in a manner that may be used by the central billing system 123. In some embodiments, the bill by account information collected in a network box like the integrated device service control, device usage monitoring system 5410 is augmented by bill by account information collected on the device as described herein, and any intermediate server that can be used to aggregate and format these bill by account feeds for the central billing system deals with both types of data, from the network and from the devices.

As shown in FIG. 63, in some embodiments, integrated device service control, device usage monitoring system 5410 includes the service control server link 1638, which, for example, can be used as described above (e.g., with respect to FIG. 24 and other embodiments described herein) to communicate with device service processors 115. In some embodiments, billing server 1662 within integrated device service control, device usage monitoring system 5410 detects service usage events reported by DPI service monitor 5412, in some cases in conjunction with service history server 1650, generates a billing event that can be recorded or transmitted to the central billing system 123. In some embodiments, billing server 1662 receives information from device billing agent 1695 and/or device service monitor agent 1696 and transmits the device service usage billing events to the central billing system 123. In some embodiments, certain billing events that are advantageously collected in the network (e.g., DPI service monitor 5412 and/or billing event server 1662) are combined with certain billing events that are advantageously collected on the device (e.g., service monitor agent 1696 and/or billing agent 1695), and both sources of billing information are transmitted to the billing system 123. Similarly, in some embodiments, certain service usage information is collected with service usage monitor agent 1696, and that information is combined with service usage information collected from DPI service monitor 5412 and/or service history server 1650 and/or service usage 118. In some embodiments, certain service aspects are controlled using network-based DPC policy implementation 5402, in some cases in conjunction with or supervised by network-based policy management server 1652, and other service aspects are controlled using device-based policy implementation agent 1690, in some cases in conjunction with or supervised by policy control agent 1692. As will now be apparent to one of ordinary skill in the art in view of the numerous embodiments described herein, many hybrid approaches to service usage monitoring, service control, service notification or service billing can be accomplished with some aspects of the policy, notification, control, monitoring or billing being implemented/performed on the device apparatus described herein and others implemented/performed on the network apparatus described herein. The presence of access control integrity server 1662 and many other service control verification embodiments described herein make it apparent that the integrated device service control, device usage monitoring system 5410 embodiments also provide for affirmative verification of whatever functions are implemented on the device. It will also be apparent that all of the above combinations of device and network functions, and many others, can be accomplished in ways that are network neutral and/or protect user privacy preferences by implementing the service control algorithms in a network neutral manner and/or receiving user preference input on how to implement service control, and by maintaining service usage and CRM information security and filtering on both the device 100 and the network-based integrated device service control, device usage monitoring system 5410.

In some embodiments, the integrated device service control, device usage monitoring system 5410 facilitates or plays a part in automated provisioning and activation of the devices as similarly described above with respect to various device-based automated provisioning and activation embodiments. In some embodiments, the activation server 160 is integrated into or partially integrated into device service control, device usage monitoring system 5410.

In some embodiments, the integrated device service control, device usage monitoring system 5410 facilitates ambient services as similarly described above with respect to various device-based ambient services embodiments.

In some embodiments, the integrated device service control, device usage monitoring system 5410 facilitates VSP and ODI solutions as similarly described above with respect to various device-based VSP and ODI embodiments.

Various other network architectures for network-based service control including deep packet inspection functions can similarly be used as will be apparent to one of ordinary skill in the art in view of the various embodiments described herein.

Figure 64:
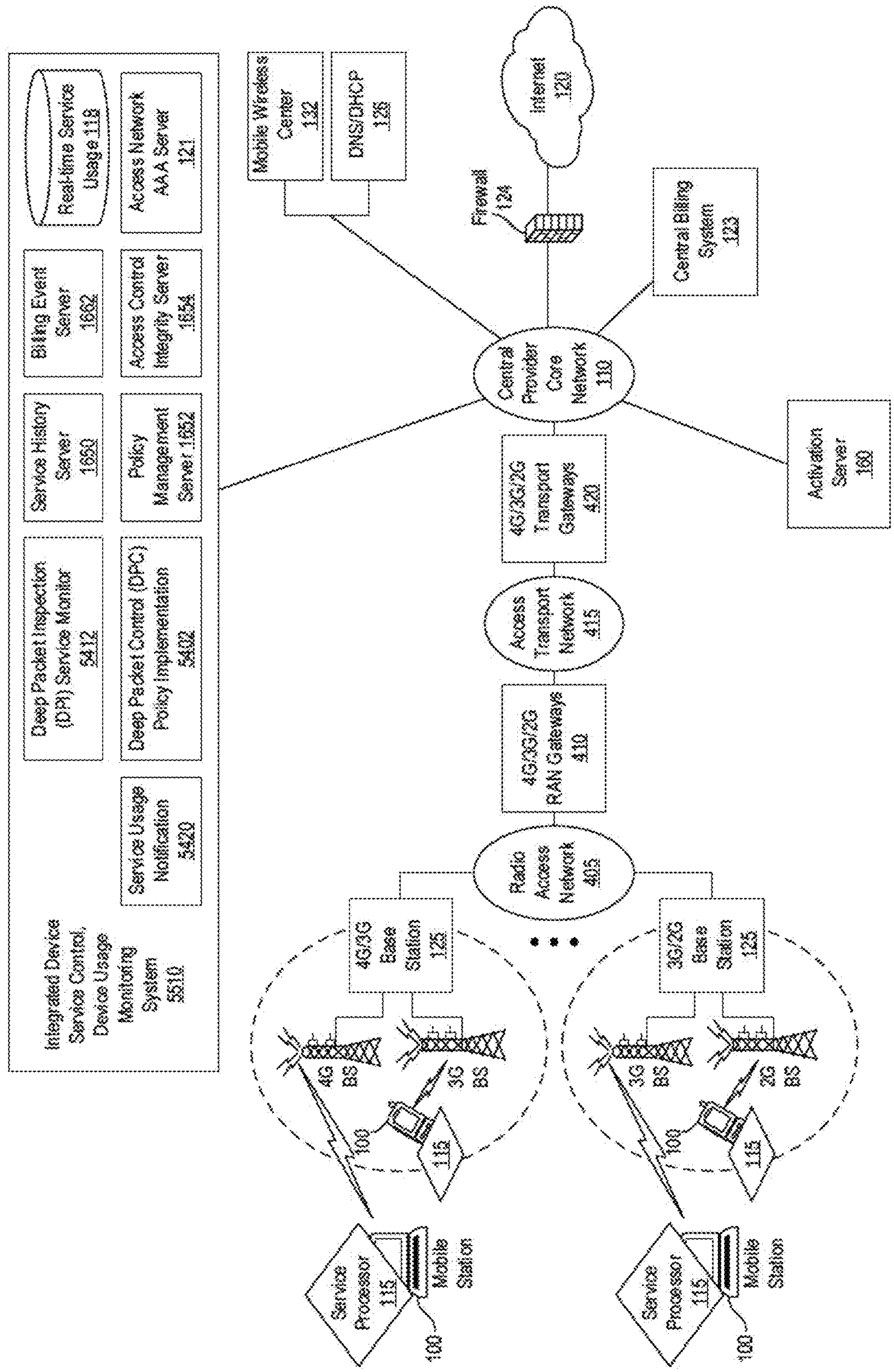
FIG. 64 illustrates another network architecture for locating service controller device control functions with AAA and network service usage including deep packet inspection functions in accordance with some embodiments.

FIG. 64 illustrates another network architecture for locating service controller device control functions with AAA and network service usage including deep packet inspection functions in accordance with some embodiments. As shown, the service processor 115 is not present on the devices 100, and the integrated device service control, device usage monitoring system 5510 performs all service monitoring, service control, billing, and notification functions.

Figure 65:
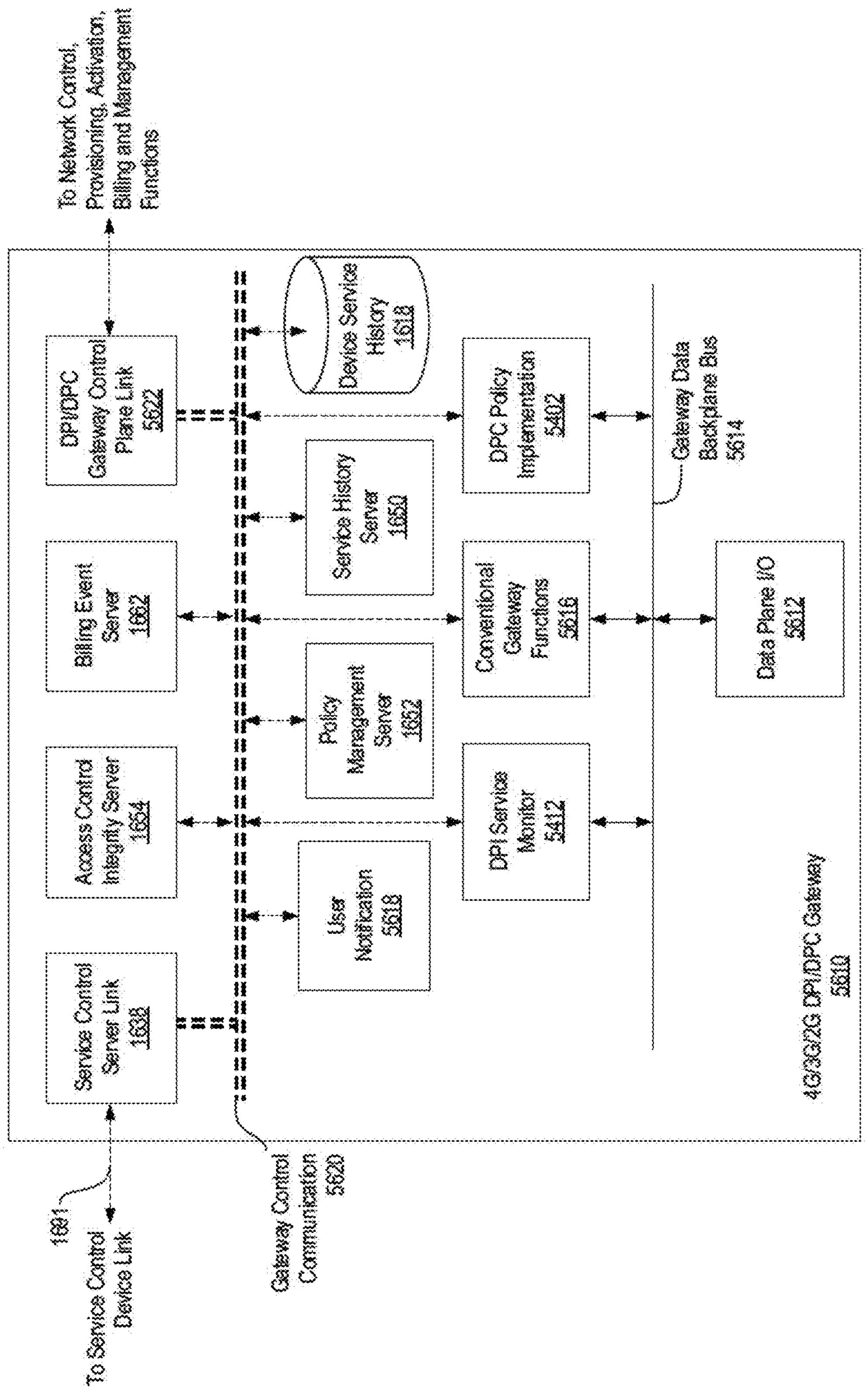
FIG. 65 illustrates a 4G/3G/2G DPI/DPC enabled gateway in accordance with some embodiments.

FIG. 65 illustrates a 4G/3G/2G DPI/DPC enabled gateway in accordance with some embodiments. As shown, a 4G/3G/2G DPI/DPC enabled gateway 5610 (e.g., implemented in either gateway 420 or gateway 410 or a combination of both) where the conventional service gateway functions 5616 (e.g., routing, switching, protocol translation/tunneling, charging data function (CDF), charging gateway function (GCF), mobility management, and/or suspend/resume) are combined with one or more of the following embodiments and integrated into one or a combination of the service gateways (e.g., RAN and/or transport gateways): DPI service monitor 5412, service history server 1650, device service history 1618, DPC policy implementation 5402, policy management server 1652, user notification 5618, billing event server 1662, access control integrity server 1654, service control service link 1638, data plane I/O 5612 (e.g., used to represent the I/O port(s) for the gateway), and/or DPI/DPC gateway control plane link 5622 (e.g., used to represent the control plane network channel connecting the above elements to other network equipment and in communication with gateway control communication 5620). The packet processing architecture shown in this figure calls for a multi-point to multi-point backplane bus scheme, but it will apparent that other data path configurations are possible including serial. As will also be apparent, the above-described configuration can also be applied to either the transport gateway 420 and/or the RAN gateway 410. As mentioned above, it is possible to maintain a secure storage on the 4G/3G/2G DPI/DPC gateway 420 or 410 that requires secure credentials to get into so that user privacy is protected and service usage information or CRM information is filtered according to user preferences prior to sending to another network function or network manager, and the same allowances can also be applied for emergency or government monitoring purposes. Network neutrality can also be maintained in this configuration by maintaining network neutrality in the service control algorithm and/or soliciting user input on how to control service usage just as discussed above for other network service control implementations or as discussed in the device-based service control descriptions.

In some embodiments, the bill by account function is implemented in the context of the 4G/3G/2G DPI/DPC gateway 5610 embodiment or other network-based system embodiments described herein. For example, the bill by account information can be completely derived from the network box (e.g., 4G/3G/2G DPI/DPC gateway 5610) without assistance from device-based service monitoring or billing capabilities, or none may exist on the device. In this example, the DPI service monitor 5412, in some cases in conjunction with service history server 1650, can operate in conjunction with bill by account policy settings stored in the billing event server 1662 so that service activities are divided into the account classifications defined by the service profile settings. The bill by account feeds can then be sent to the billing system or to an intermediate billing event aggregation server that collects this type of deep packet inspection generated information from one or 4G/3G/2G DPI/DPC gateway 5610 units to aggregate and format the information in a manner that can be used by the central billing system 123. In some embodiments, the bill by account information collected in a network box, such as the 4G/3G/2G DPI/DPC gateway 5610, is augmented, refined or otherwise added to by bill by account information collected on the device as described herein and any intermediate server that can be used to aggregate and format these bill by account feeds for the central billing system deals with both types of data, from the network and from the devices.

Figure 66:
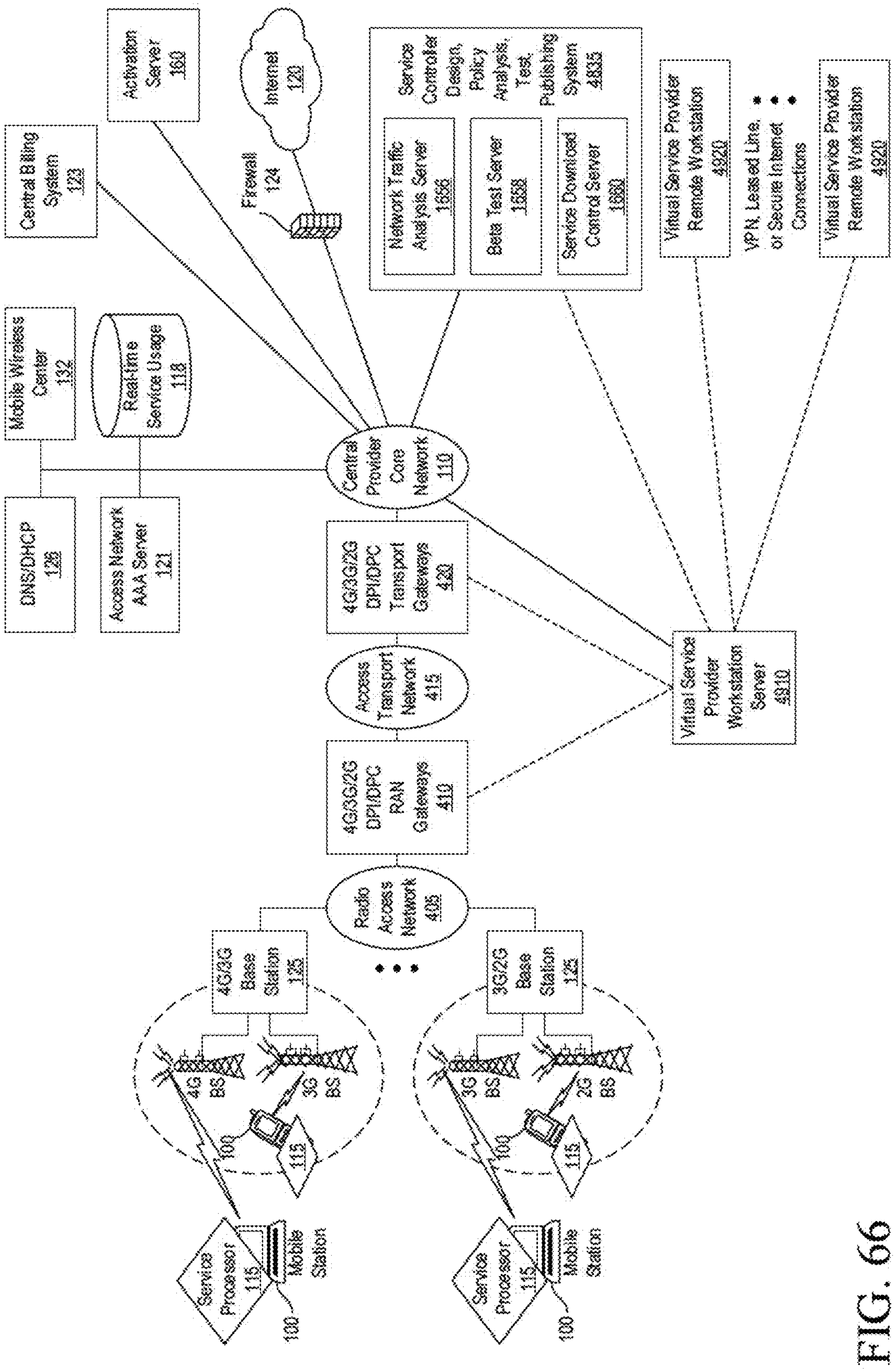
FIG. 66 illustrates a network architecture including the VSP workstation server in communication with the 4G/3G/2G DPI/DPC gateways in accordance with some embodiments.

FIG. 66 illustrates a network architecture including the VSP workstation server 4910 in communication with the 4G/3G/2G DPI/DPC gateways 410 and 420 in accordance with some embodiments. As shown, the VSP workstation server 4910 is in communication with the 4G/3G/2G DPI/DPC gateways 410 and/or 420, the Service Controller Design, Policy Analysis, Test, Publishing System 4835, and/or other networking elements including possibly the central billing system 123, the mobile wireless center 132 (HLR) and/or the AAA server 121 for the purpose of provisioning and/or controlling settings in the 4G/3G/2G DPI/DPC gateways 410 and/or 420, the mobile wireless center 132 and possibly other equipment for the purpose of implementing a portion of the VSP open partner functionality discussed herein. In FIG. 66, the 4G/3G/2G DPI/DPC gateway 5610 functionality as shown in FIG. 65 is implemented in the 4G/3G/2G DPI/DPC RAN gateway 410 and/or the 4G/3G/2G DPI/DPC transport gateway 420 as similarly described above. For example, the VSP functionality can also be used to set higher level policies associated with the 4G/3G/2G DPI/DPC gateway 420 or 410, such as provisioning or activation profiles or policies, ambient service profiles or policies, and/or bill by account service profiles or the other higher level service profile or service plan embodiments discussed herein. In some embodiments, the provisioning and/or activation steps described herein involve setting service policies in the 4G/3G/2G DPI/DPC gateway 420 or 410. In some embodiments, ambient services or ambient activation involve setting up service profiles within the 4G/3G/2G DPI/DPC gateway 420 or 410 that allow the desired activities and block the undesired activities. For example, these settings can be included as part of the open service provider partner programming capabilities of the VSP workstation server 4910 embodiments.

Figure 67:
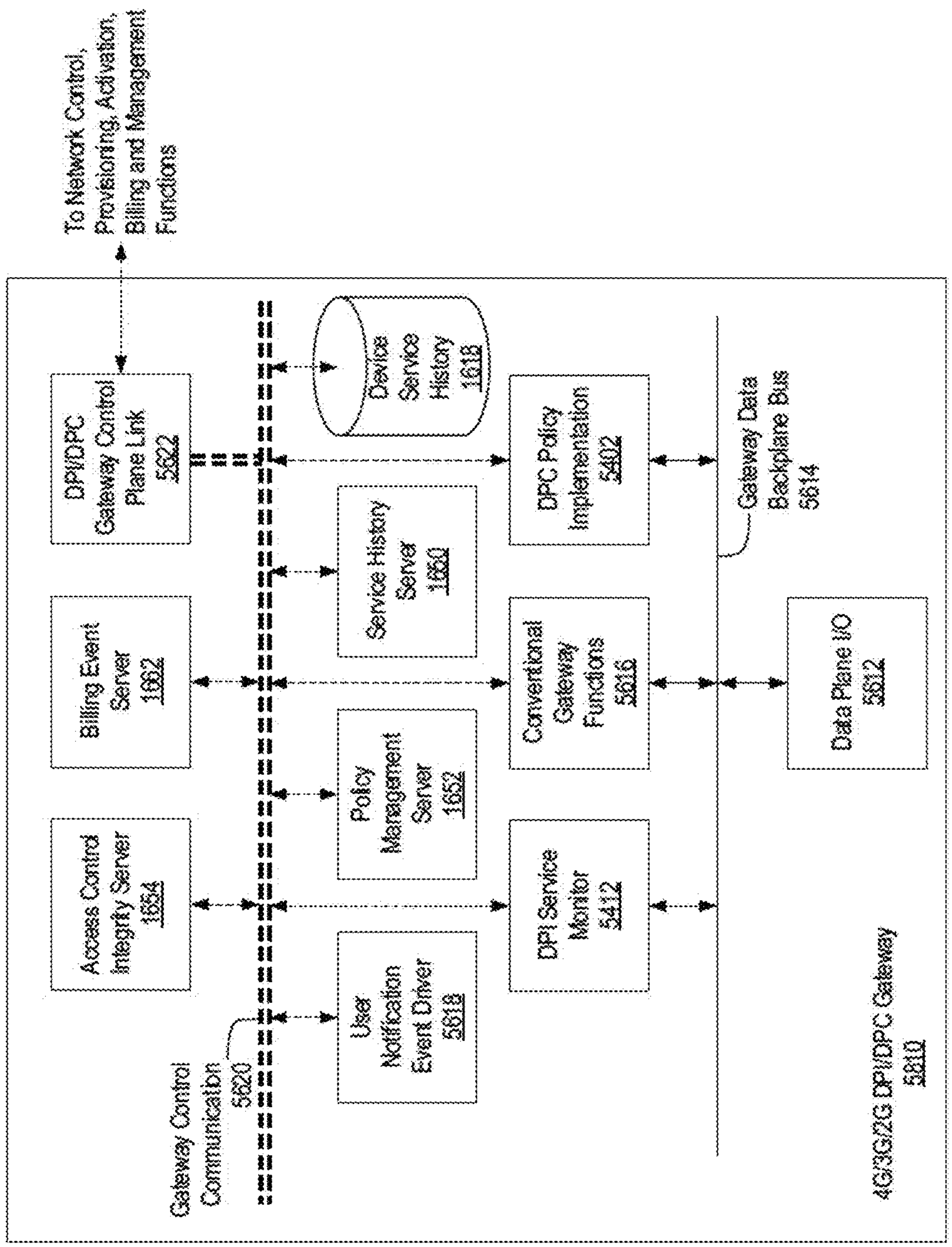
FIG. 67 illustrates another 4G/3G/2G DPI/DPC enabled gateway in accordance with some embodiments.

FIG. 67 illustrates another 4G/3G/2G DPI/DPC enabled gateway in accordance with some embodiments. As shown, a 4G/3G/2G DPI/DPC gateway 5810 (e.g., implemented in either gateway 420 and/or gateway 410) is provided in which the service processor connection (e.g., via service control server link 1638 as shown in FIG. 65) is not present so that all service monitoring, control, billing event collection and transmission, and notification are performed by the 4G/3G/2G DPI/DPC gateway 5610 (e.g., gateways 410 and/or 420).

Figure 68:
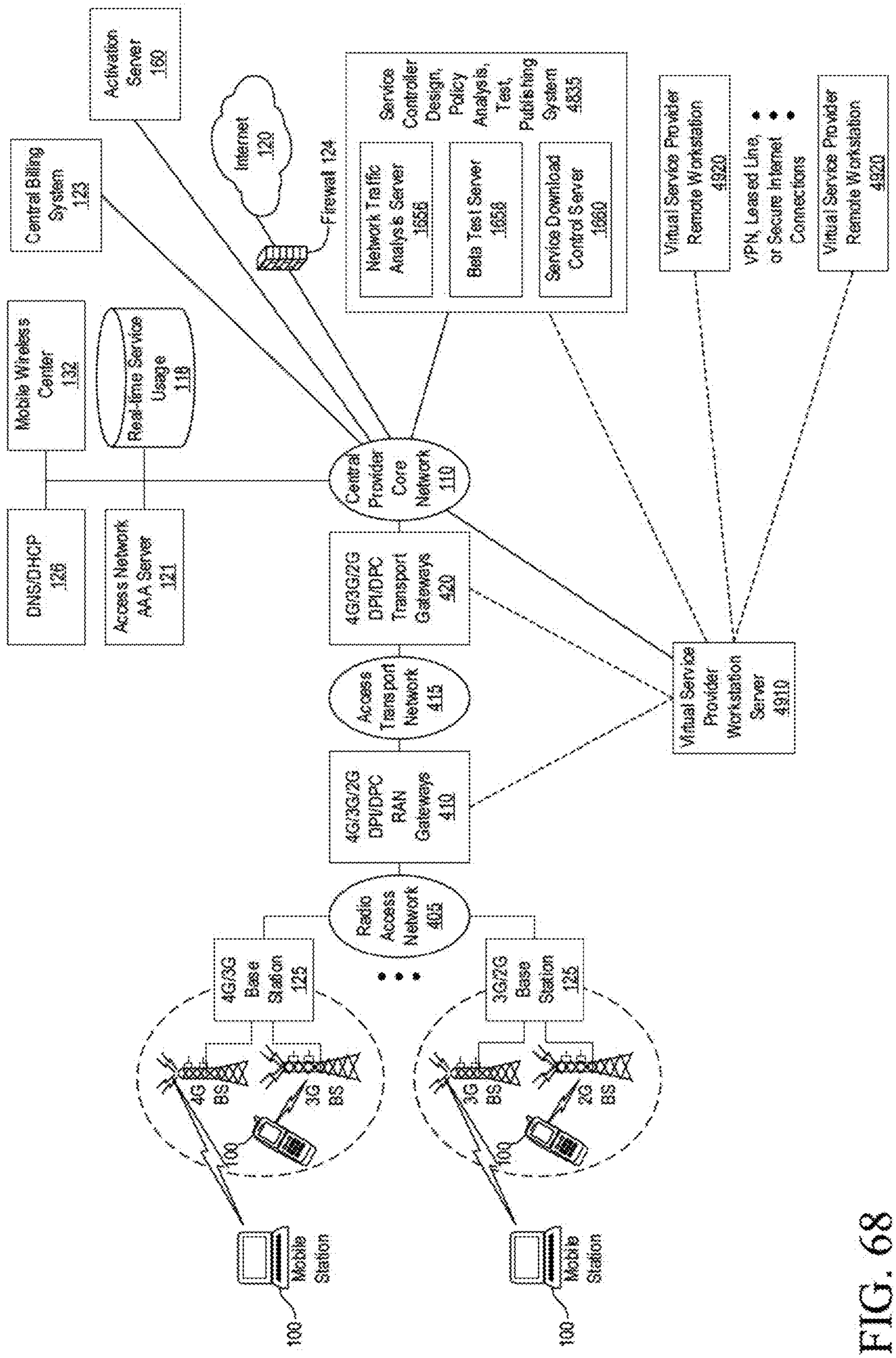
FIG. 68 illustrates another network architecture including the VSP workstation server in communication with the 4G/3G/2G DPI/DPC gateways in accordance with some embodiments.

FIG. 68 illustrates another network architecture including the VSP workstation server 4910 in communication with the 4G/3G/2G DPI/DPC gateways 410 and 420, the AAA 121 and the mobile wireless center 132 in accordance with some embodiments. As shown, FIG. 68 provides a network diagram corresponding to FIG. 67, with similar functionality to the embodiment shown in FIG. 66, in which the service processors 115 are not present on the devices 100. In FIG. 68, the 4G/3G/2G DPI/DPC gateway 5810 functionality as shown in FIG. 67 is implemented in the 4G/3G/2G DPI/DPC RAN gateway 410 and/or the 4G/3G/2G DPI/DPC transport gateway 420 as similarly described above.

Figure 69:
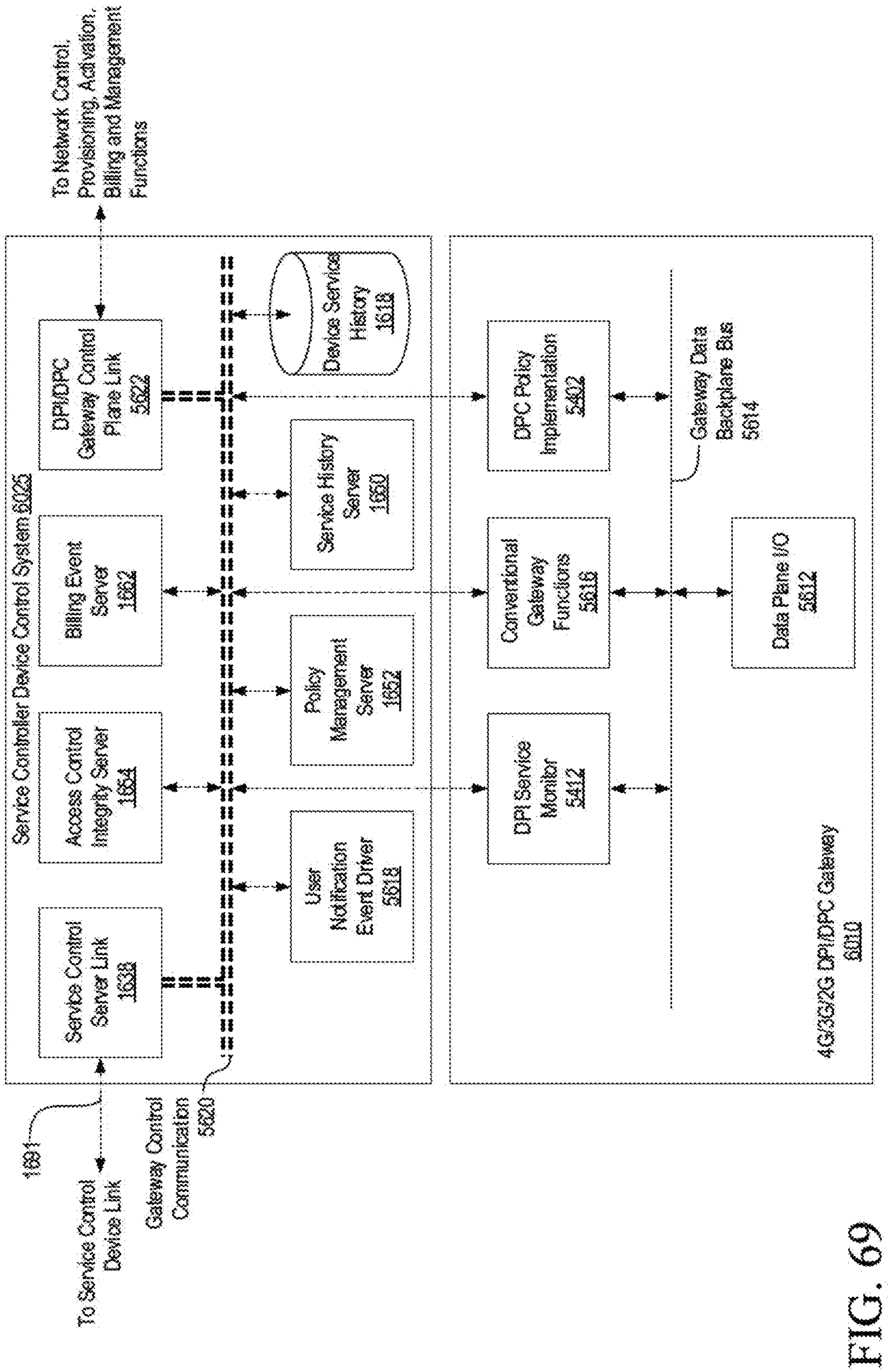
FIG. 69 illustrates a 4G/3G/2G DPI/DPC enabled gateway and service controller device control system in accordance with some embodiments.

FIG. 69 illustrates a 4G/3G/2G DPI/DPC enabled gateway and service controller device control system in accordance with some embodiments. In some embodiments, enhanced network-based service monitoring, control, billing and notification as discussed above is implemented using a 4G/3G/2G DPI/DPC enabled gateway 6010 and service controller device control system 6025 as shown. In some embodiments, the functions shown in the figure to be inside of the service controller device control system 6025 have been moved from the 4G/3G/2G DPI/DPC gateway 5610 of FIG. 65 (e.g., or from gateways 410 and/or 420) so that they reside in a separate server embodiment or other network equipment function separate from the 4G/3G/2G DPI/DPC gateway 6010. For example, this architecture can be used when the network equipment manufacturer desires to separate these functions or has an existing product that it is desirable to upgrade by adding a separate box. As another example, this architecture can be used when the 4G/3G/2G DPI/DPC gateway 6010 is not capable of keeping up with large numbers of individual user profiles so it is desirable to go to a scalable server configuration in which load balancing can be applied with a potentially more flexible programming environment for implementing service policy management functions, statistical service history analysis algorithms, service usage projection, and/or service control (or throttling) algorithms. In some embodiments, a secure storage is provided on the 4G/3G/2G DPI/DPC gateway 6010 and/or the service controller device control system 6025 that requires secure credentials to get into so that, for example, user privacy can be protected and service usage information or CRM information can be filtered according to user preferences prior to sending to another network function or network manager, and the same allowances can also be applied, for example, for emergency or government monitoring purposes. For example, network neutrality can also be maintained in this configuration by maintaining network neutrality in the service control algorithm construction and/or soliciting user input on how to control service usage just as discussed above for other network service control implementations or as discussed in the device-based service control descriptions.

Figure 70:
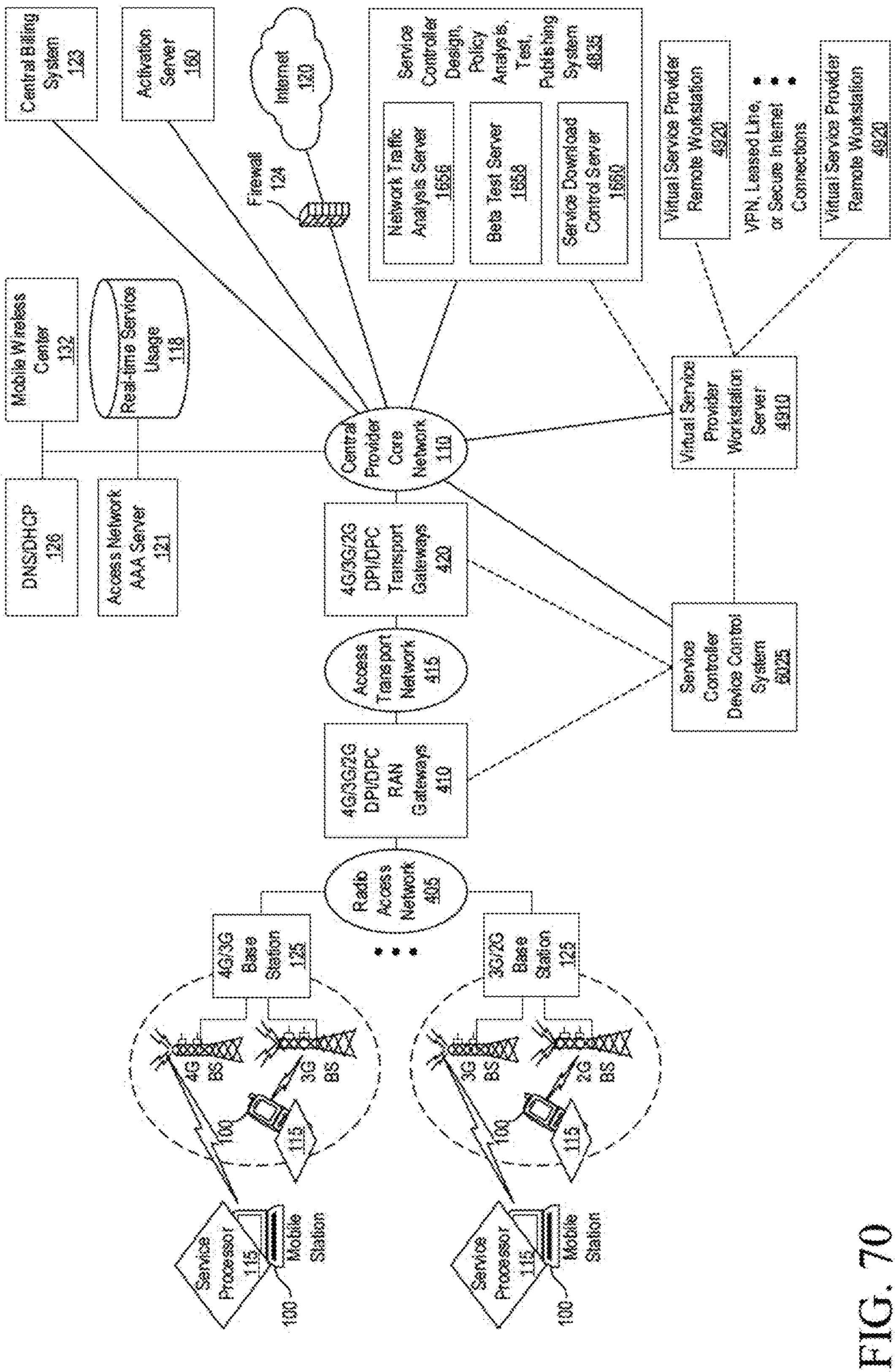
FIG. 70 illustrates another network architecture including the VSP workstation server in communication with the 4G/3G/2G DPI/DPC gateways in accordance with some embodiments.

FIG. 70 illustrates another network architecture including the VSP workstation server 4910 in communication with the 4G/3G/2G DPI/DPC gateways 410 and 420, AAA 121 and mobile wireless center 132 in accordance with some embodiments. In FIG. 70, the 4G/3G/2G DPI/DPC gateway 6010 functionality as shown in FIG. 69 is implemented in the 4G/3G/2G DPI/DPC RAN gateway 410 and/or the 4G/3G/2G DPI/DPC transport gateway 420, as similarly described above, and which are in communication with the service controller device control system 6025 as shown.

Figure 71:
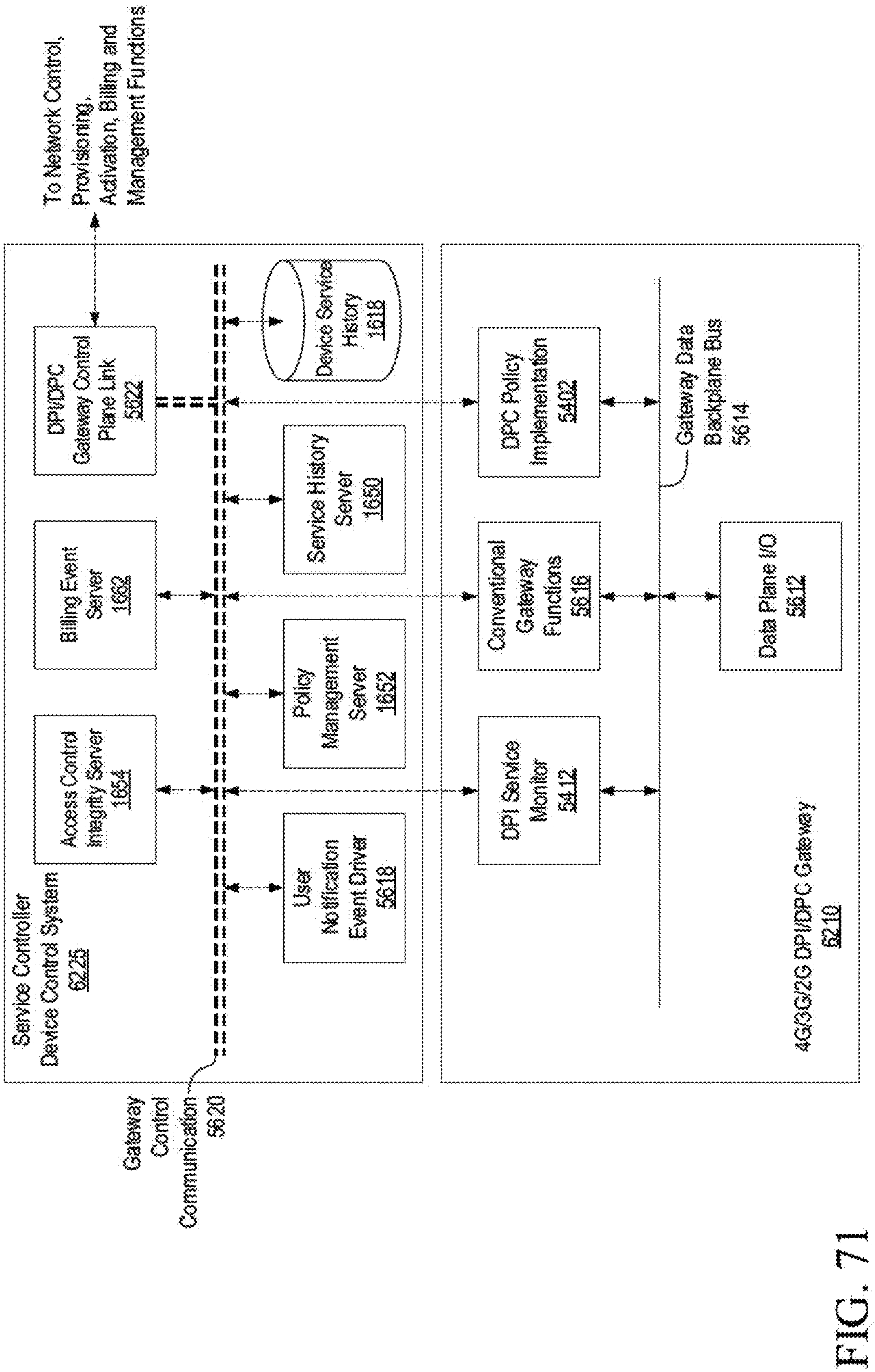
FIG. 71 illustrates another 4G/3G/2G DPI/DPC enabled gateway and service controller device control system in accordance with some embodiments.

FIG. 71 illustrates another 4G/3G/2G DPI/DPC enabled gateway and service controller device control system in accordance with some embodiments. As shown, the capability to communicate with the service processor 115 has been removed so that all service monitoring, control, billing event collection and transmission, and notification are performed by the 4G/3G/2G DPI/DPC gateways 6210 (e.g., implemented in gateways 410 and/or 420) in conjunction with the service controller device control system 6225 without assistance from the service processors 115.

Figure 72:
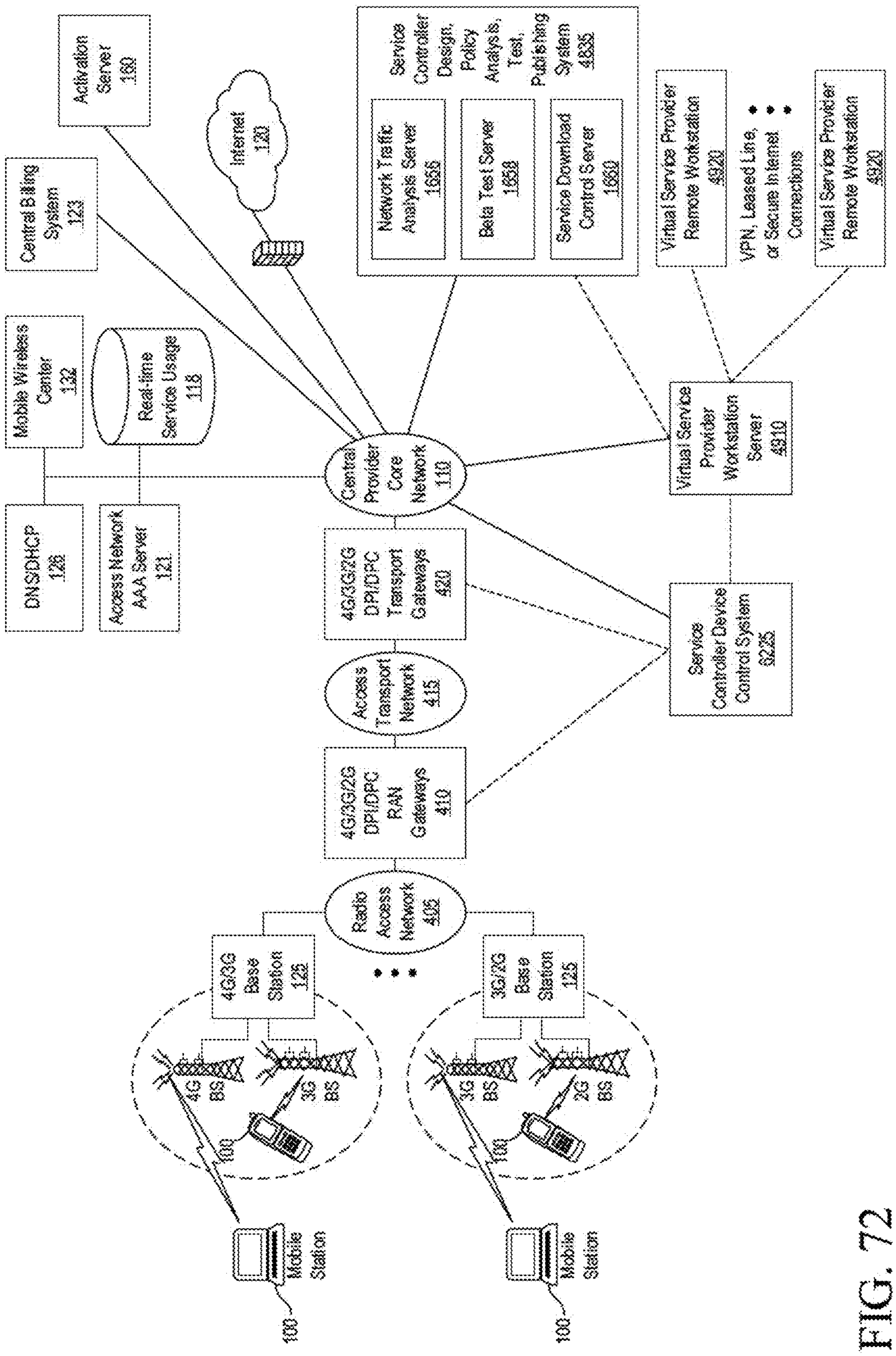
FIG. 72 illustrates another network architecture including the VSP workstation server in communication with the 4G/3G/2G DPI/DPC gateways in accordance with some embodiments.

FIG. 72 illustrates another network architecture including the VSP workstation server 4910 in communication with the 4G/3G/2G DPI/DPC gateways 410 and 420, AAA 121 and mobile wireless center 132 in accordance with some embodiments. In FIG. 70, the 4G/3G/2G DPI/DPC gateway 6210 functionality as shown in FIG. 71 is implemented in the 4G/3G/2G DPI/DPC RAN gateway 410 and/or the 4G/3G/2G DPI/DPC transport gateway 420, as similarly described above, and which are in communication with the service controller device control system 6225 as shown.

As will be apparent to one of ordinary skill in the art, the above-described embodiments can be extended to include some or all of the functions depicted in the 4G/3G/2G DPI/DPC service gateways of FIG. 65 in the base station or base station controller 125.

Automated Provisioning and Activation

In some embodiments, automated provisioning and activation includes automation of one or more of the following functions: (1) programming device credentials or partial credentials and recording them in a database (or providing same when they are programmed into the device), (2) associating these credentials with the proper provisioning and/or activation actions to be taken on the device and in the network, (3) directing the device to the proper activation function (e.g., activation server) sequence when it attempts to connect to the network, (4) completing provisioning of the device, (5) programming the AAA, billing system, gateways, mobile wireless center and other network equipment to the proper initial device service control settings, and (6) establishing a service account for the device.

In some embodiments, improved processes for activating service for a device or user with a network service provided by a central provider network, an MVNO network or a VSP on the central provider network are provided. In some embodiments, activation includes one or more of the following: a process or result of associating a service account with device or user credentials; with the service account potentially further being associated with a service profile defining the service activities that the device is authorized to access; creating or updating a service usage or billing record and associating it with the service account to create a service plan; and/or initiating service to the device or user in which the network equipment allows access to the appropriate level of service activities. In some embodiments, VSP embodiments include the provisioning and activation apparatus embodiments of any or all forms.

In conventional mobile device provisioning systems, the provisioning and activation process required to create a user service account and enable the device to access the desired level of service activities can limit mass market, low cost or user friendly applications of the device or service, because the process can often be cumbersome, time consuming and/or expensive for the service provider, service owner, master agent (service distributor), MVNO, VSP and/or user. Accordingly, the various embodiments for provisioning and activation described herein simplify the provisioning and activation process for mobile devices. In some embodiments, provisioning and activation for the device and/or the network accommodates a wide variety of device types and service profile types, with the capability to perform the provisioning and activation at a number of points in the manufacturing, distribution, sales and usage progression for the device, and the ability to either pre-activate before first device use or very quickly activate during first device use (or during some later use of the device).

In some embodiments, as described herein, the term provisioning generally refers to those actions/processes associated with programming the device with credentials or other device settings or software installations used to later activate the device, as well as, in some embodiments, creating database entries and other credential associations in the network so that the network and/or device have the information used to recognize the device or credentials and implement the service policies in the service profile and/or service plan once the service profile and/or service plan are activated. In some embodiments, as described herein, the term activation generally refers to the process of creating or selecting the service plan and/or service profile, programming the settings that are used in each (e.g., required) network function and/or each (e.g., required) device function so that the system can properly associate the device credentials with the appropriate service activity policies, and then admitting the device onto the network. The term activation can also refer in some embodiments to the creation of a user or device service account, in some cases, with user or device owner information or billing information. In some embodiments, the process of provisioning amounts to assigning credentials to the device and programming a portion or all of the credentials on the device, entering a portion or all of the credentials in the various necessary network equipment databases so that the network components are capable of identifying the device and associating it with the network-based portion of the admission, traffic processing, service monitoring, billing, service limits and other policies that are eventually defined by the service profile and service plan.

Further examples of the network-based service profile policies include network access level, traffic routing, service monitoring, service limits and actions taken upon reaching service limits. Once the service profile is created and activated during the activation process, the device credentials and the associated service profile are communicated throughout the necessary network elements so that each element can implement its part of the network portion of the service profile policies. This process of propagating the service profile settings to all the required network equipment components is a portion of what is referred to herein as activation in accordance with some embodiments. In some embodiments, the activation process includes associating the credentials with the proper service plan and/or service profile, and possibly completing the process of programming the device functions and/or network functions so that the device can be admitted to the appropriate level of network services. In some embodiments, activation also includes the service processor software settings, configurations or installs for each function or agent in the service processor to implement its part of the service profile, service plan, service billing or transaction billing policies. In some embodiments, activation also includes the creation of entries in the various service account databases and/or billing databases to create a user account or device owner account for the purpose of managing the user choices for service plan and other account information storage and management aspects, such as maintaining status information, maintaining the central service profile configuration, conducting reconciliation and billing exchanges, service usage history, and/or account history.

In some embodiments, the term credentials generally refers to the set of information parameters that the network and/or device uses (e.g., requires) to admit the device onto the network and associate it with the appropriate service profile and/or service plan. For example, the credentials can include one or more of the following: phone number, device identification number, MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider, OEM, master agent (service distributor), VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user. In some embodiments, at least some of the credentials are unique to the device, and, in some embodiments, groups of devices share one or more aspects of the credentials. In some embodiments, the term permanent credentials generally refers to the set of credentials that include at least a subset that are intended to be assigned to a device or user on a permanent basis. In some embodiments, the term temporary credentials generally refers to the set of credentials that include at least a subset that are intended to be assigned to a device or user on a temporary basis. In some embodiments, temporary credentials are eventually replaced by permanent credentials. In some embodiments, at least some elements in the temporary credentials (e.g., phone number and/or access or authorization security credential) are used for more than one device. In some embodiments, the temporary credentials are recycled from one or more devices and used for one or more other devices, for example, when they remain unused for a period of time or when they are replaced with permanent credentials on one or more devices. It should not be inferred from the term permanent credentials that permanent credentials are never recycled, for example, when the user discontinues service or use of the credentials. Also, the term temporary credentials does not imply that temporary credentials are always temporary. In some embodiments, partial credentials or pre-activation credentials generally refer to a subset of credentials that are to gain access to limited network services for the purpose of provisioning of credentials and/or activation of a service plan or service profile. For example, prior to a phone number being assigned, a device can gain access to a limited set of network server destinations in which embedded information contained in the device (e.g., the partial credentials) is provided to the server, the server associates that information with the proper additional credentials (including the phone number) to assign to the device and/or associates the information with the proper service profile to activate service. In this example, partial credentials can include device type, OEM, service provider, VSP, device identification number, SIM, service processor configuration or some other information used by the server to determine what the credentials should be and the proper service profile.

In some embodiments, a permanent service account generally refers to the service account that is permanently associated with the user and/or device. For example, this account includes an association with the device or user credentials, user information or billing information, service profile, billing profile, network authorization status and other aspects that define the device or user service policies and billing policies. In some embodiments, the term temporary service account generally refers to a service account that is temporarily set up and associated with the device before some or all of the required permanent account information is available or entered for a device or user. For example, this account can be set up with an association with an actual user, or can be set up with a mock user or unassigned user association so that the network and billing system can recognize the credentials, authenticate the device, admit the device, provide the proper level of service activity control according to the service profile associated with the temporary service account, or collect the service activity usage information for various network and billing system accounting needs before actual user information or billing information has been entered into the network systems. For example, a temporary service account can make it possible or easier to use existing billing systems or other network systems to provide simplified provisioning, simplified activation or ambient services. A temporary service account can also become a permanent service account by replacing mock user or unassigned user information with actual user information, or a temporary service account may need to be replaced by a permanent service account when actual user information needs to be entered into the network systems, possibly including the billing or service profile databases.

In some embodiments, temporary or permanent device credentials and other information used/required for provisioning the device are generated with apparatus located at the manufacturer or in the distribution channel as discussed below. In some embodiments, the apparatus includes a local onsite server that typically shares some aspects of the provisioning information (e.g., phone number, phone number range, MEID or MEID range, SIM number or SIM number range, IP address or IP address range, MAC address or MAC address range, other secure device credential elements) with a network provisioning database. In some embodiments, the apparatus includes a server terminal, and the aforementioned portion of the credentials is generated by the network and shared with the local provisioning apparatus. In some embodiments, as will be discussed below, the provisioning credentials are in part generated in the network and shared with the device while it is connected online to an activation server (e.g., activation server 160) that is connected to the access network. Similarly, there can be activation servers connected to apparatus in the manufacturing or distribution channel that service device activation, or over the air or over the network apparatus connected to an activation server, which in turn connects to the device, can be used to accomplish activation programming of the network and device as further discussed below.

In some embodiments, when a device is provisioned and entered into the network provisioning database, it is associated with the automatic provisioning and/or activation sequence the device is intended to go through once it connects to the network or to the apparatus that will complete the process. In some embodiments, one or more device parameters (e.g., service owner, device type, OEM, plan type, IP address, security credential and/or software version) are used to determine what the appropriate network provisioning steps and/or settings are for completing the provisioning and/or activation process, and this association information is stored in the network provisioning database for propagation of the provisioning profiles or activation profiles to the various network equipment elements. In some embodiments, the network provisioning database is provided (e.g., in the network) that associates the pre-activation provisioning information (e.g., generated, as described herein, at time of manufacture, sometime during distribution, by the user on a website by a sales associate or other activation assistant, or by the network when a new device enters the automatic activation process). For example, the pre-activation provisioning information informs the network whether or not to let the device onto an activation sequence when the device attempts access, and in some cases, also instructs the network to direct the device to a specific activation sequence including, for example, an activation server (or other activation sequencing apparatus) sequence as described herein. In some embodiments, a central database is queried by other network equipment or the central database is included in one or more of the network elements (e.g., the AAA server and/or billing system, mobile wireless center 132), or the database is copied in part or in whole in various network elements (e.g., the central database, AAA server, mobile wireless center, billing system and/or gateways).

In some embodiments, propagating the network equipment provisioning information for a given device or group of devices is accomplished with a network provisioning system that has access to the network provisioning database and is capable of programming the appropriate network equipment. In some embodiments, this network equipment is referred to as "network management" equipment or "network provisioning" equipment. In some embodiments, there are several functions that take part individually or in concert, including, for example, the AAA server 121, service controller 122 (either with device-based/assisted services through the service processor related embodiments or with network only embodiments as described herein), the mobile wireless center 132 (e.g., including the home location register (HLR) or other similar function referred to by other industry terms), the activation server(s) 160, other network provisioning or management equipment attached to or associated with the billing database system, and/or some other equipment apparatus. In some embodiments, the local database on the device, database in the AAA server and/or database elsewhere in network is provisioned to inform the gateway of the process for handling the pre-provisioned device according to, for example, the credentials. For example, if the device is not recognized or not authenticated onto the access network as an activated device with associated active service profile and/or service plan, the device connection or communication can be directed (or routed) to a generic activation server that provides an activation sequence that is not necessarily determined by one or more of the specific device credential elements, partial credential elements, device profile or partial device profile that define something specific about the activation sequence for the device. In another example, in which the device is not recognized or authenticated as an activated device with associated service profile and/or service plan, the device can be directed (or routed) to an activation service (or other activation sequencing apparatus) that uses some part of the credentials or range of partial credentials or a portion of a partial or complete device profile to determine a desired pre-determined device specific or device group specific activation sequence that is implemented by a specific activation service sequence or other activation sequence apparatus. In another example, in which the device is not recognized or authenticated as an activated device with associated active service profile and/or service plan, a portion of the device credentials or partial credentials can be used as a look-up index into a database that determines what the specific device activation sequence should be, and the device can be directed (or routed) to a specific activation server sequence or other activation sequencing apparatus.

In some embodiments, a database in the AAA server or database elsewhere in network is provisioned to inform the gateway what to do with a pre-provisioned device according to the credentials. For example, devices can be authenticated (for activated devices), routed to activation servers (or other activation sequencing apparatus) or denied access. In some embodiments, the AAA server (and/or other network elements) provide the above discussed look-up function for the above gateway description in which a lookup database, locally stored or stored in a central database, is queried to provide secondary routing information to the specific or generic activation servers.

In some embodiments, the pre-provisioned database is located in the billing system. In some embodiments, the billing system accesses the pre-provisioned database (e.g., stored on the billing system or another network element) for the purpose of setting up temporary accounts or permanent accounts and associating those accounts with pre-activation status, activated free ambient or activated paying customer.

In some embodiments, for zero activation, all the required pre-provisioning or programming of the above network elements, or others, is coordinated by the network provisioning system at some point after the partial or full device credentials have been associated with the device or reserved for a particular device type or service type. In some embodiments, the network provisioning system also coordinates the information to or from the device provisioning apparatus that is described elsewhere.

In view of the various embodiments described herein, it will be appreciated that many of the automated or background provisioning, activation and ambient embodiments described herein can be accomplished with network-based approaches, device-based approaches, or network/device combination/hybrid based approaches. For example, when the access control for the provisioning process is accomplished in the device (e.g., a device-based approach), the activation server can be located anywhere on the Internet, and the device will ensure that the activation process is conducted with the activation server while blocking other traffic from occurring. As another example, some or all of the ambient provisioning programming steps become steps to program the access control, traffic control, application control, bill by account rules, and/or other aspects in the service processor or service controller as described herein.

In some embodiments, the provisioning apparatus described herein can be a computer located in the user's home or business, and the user or an IT manager has access to a website that provides the provisioning information, in which the computer serves as the provisioning or software programming apparatus. In some embodiments, the network itself, possibly through an activation server 160, website or other interface to the device, becomes the provisioning apparatus, in some cases, with the assistance of software on the device to affect the programming of provisioning information from the network or the communication of device credentials or other information to the network. For example, this software can be a background process that runs without user interaction, a portal/widget program, a web browser based program, a WAP browser based program, and/or any other program that provides a counterpart function to the network functions effecting the provisioning (e.g., activation server). In some embodiments, the activation server either initiates a specific provisioning sequence if device software is present to assist or routes to a website for manual entry if there is no software present.

Figure 73:
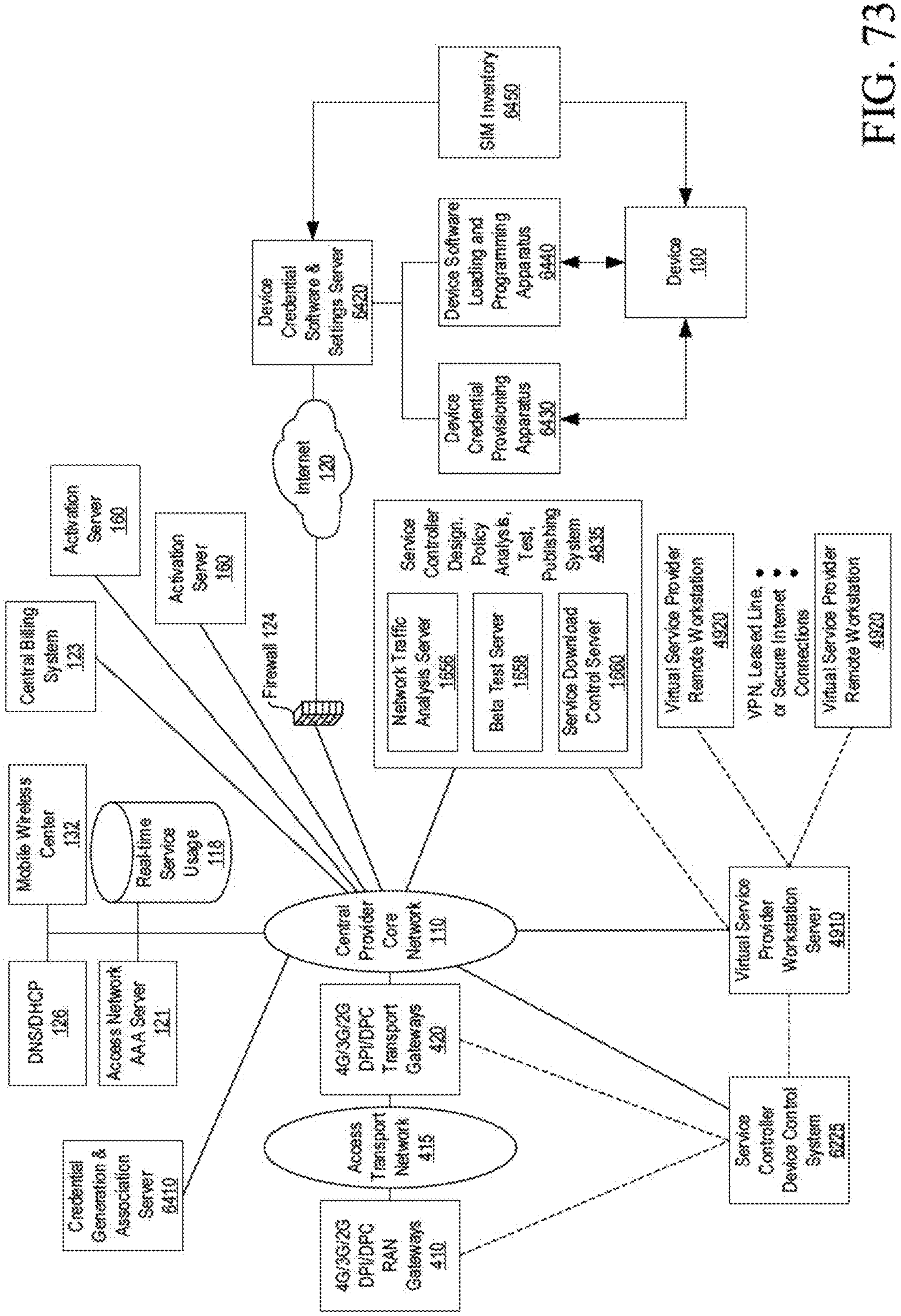
FIG. 73 illustrates another network architecture including a system located in the manufacturing or distribution chain for the device that provides the device provisioning or partial provisioning, and any pre-activation required for the device to later activate on the network in accordance with some embodiments.

FIG. 73 illustrates another network architecture including a system located in the manufacturing or distribution chain for the device that provides the device provisioning or partial provisioning, and any pre-activation required for the device to later activate on the network in accordance with some embodiments. Device credential, software and settings server 6420 provides a link to the network functions that generate or provide device credentials, and/or associate device credentials with activation profiles or pre-activation profiles in the network equipment (e.g., the billing system 123, service controller device control system 6225, gateways 410, 420, base station 125, credential generation and association server 6410, activation server 160, service download control server 1660 and/or other network apparatus). For example, the link between the device credential, software and settings server 6420 to the central provider core network equipment can be over the Internet 120 (e.g., a secure link over the Internet) as shown or over another connection such as a leased line. The device credential, software and settings server 6420 obtains credentials or partial credentials from the network apparatus that generates them, illustrated by the credential generation & association server 6410. Credential generation & association server 6410 need not be directly connected to the central provider core network 110 as shown, but can be located elsewhere (e.g., in another location connected by a secure Internet link). Credential generation & association server 6410 assigns credentials, or partial credentials, for use by device credential, software and settings server 6420. When these credentials are assigned to a device, they are programmed, loaded or otherwise associated with the device by device credential provisioning apparatus 6430, which is connected to the device wirelessly or via a wire line connection.

In some embodiments, a device software loading and programming apparatus 6440 provides software loading or device settings functions that form a portion or all of the provisioning or pre-provisioning device configuration, or form a portion or all of the device activation profile configuration, or form the device service owner, master agent or VSP device assignment or signature, and in some embodiments, using an activation tracking service (ATS) system. As discussed herein, the ATS monitors network connections and aspects of traffic that provide insight into which networks the device 100 is gaining access to, in some embodiments, for the purpose of ensuring that an OEM, master agent, device service owner or VSP is being compensated for devices that activate on a service provider network. In some embodiments, the ATS agent connects to a server counterpart that records and, in some embodiments, also analyzes the service or network connection information to make a determination of the type of access service the device is receiving and, in some cases, determine which networks the device is activated on. In some embodiments, the ATS is installed on the device in a manner that makes it difficult to tamper with or remove so that the entity that is intended to get credit for device service activation does get credit (e.g., the ATS agent can be loaded into secure memory, it can be installed with software that makes it difficult to de-install, it can be installed on the modem possibly in secure memory, it can be installed in the BIOS, it can be installed deep in the OS kernel, it can be installed with one or more additional device agents that monitor the ATS agent and alert a network function or re-install it if tampered with). The SIM inventory 6450 is provided to illustrate that, in some embodiments, hardware elements (e.g., a SIM security module as shown) or hardware configurations are also installed or manipulated in device 100 and these operations and the recording of the resulting associations form a portion of the provisioning or pre-provisioning process.

In some embodiments, at the time the credentials or partial credentials are loaded, programmed, set, installed, read from the device or otherwise recorded, they are, in some cases, all associated together in a database that allows for later identification of the device and its appropriate provisioning and/or activation process through such associations. For example, this can involve reading device parameters such as MEID, MAC address, device type, or other information that is associated with the information being loaded or configured on the device. As discussed herein, this credential configuration and association information is stored in the network equipment responsible using it to configure the network to activate the device in one of the various embodiments disclosed herein.

Some embodiments include tying some or all of the activation provisioning steps and information settings together into a database that defines a higher level activation profile for a group of users (/devices), and a server is used to perform device and equipment programming for the devices in the group, including, for example, associating the following device information into the group definition: credentials, service owner or master agent, provisioning information and/or activation profile. Some embodiments further provide for this device group information being distributed to the various network equipment components required to activate the devices as discussed elsewhere. In some embodiments, this programming and device group association is accomplished using the VSP workstation server 4910. For example, a device can be manufactured and distributed in a manner that provides flexible assignment of the device to a group that is assigned to an activation profile or a service owner.

In some embodiments, multiple activation servers 160 are provided (as shown), which illustrates that there can be multiple device activation servers 160 each with a different device activation experience and potentially controlled by a different VSP, service owner, service provider, OEM or master agent. As discussed herein, there are several ways that a device 100 can be routed to the proper activation server 160 so that the device provisioning and activation process can be completed. In some embodiments, all devices that are not activated are re-directed (or routed) to an activation server that reads one or more parameters in the device credentials. The device credential information can be determined either through the device identification information associated with the access network connection itself (e.g., MEID, IP address, phone number, security credentials, or other credentials identified for a device that gains access with the network), or with the aid of the device in a pre-arranged query-response sequence. The device can then be re-directed (or routed) to the appropriate activation server for that device, device group, device service owner or VSP. In some embodiments, the same process described above can be accomplished with a single re-direction from a service gateway 420 or 410, or another router enable network element. In some embodiments, the gateway or network element itself decodes the device credential information as described herein and performs the correct re-direct (or route) to the appropriate activation server 160 for that device. In some embodiments, the activation server 160 can be incorporated directly into the gateway 420 or 410, the base station 125 or other network component. In some embodiments, the activation server 160 can be incorporated into the service controller 122 or the service controller device control system 6225.

In some embodiments, apparatus other than the activation server are used to facilitate provisioning of credentials or partial credentials, or activation, during manufacturing or device distribution, and, for example, these apparatus can augment, supplement, compliment or replace the activation server function. Such apparatus include, for example, device programming equipment (e.g., device credential provisioning apparatus 6430, device software loading and programming apparatus 6440 or SIM inventory 6450), equipment that is networked into a central provider, MVNO or VSP database (e.g., device credential, software and settings server 6420) to gain access to provisioning information or activation information that is programmed into a device or group of devices, or to place device credential or partial credential information in a network database for later recognition, or to receive or communicate security information such as certificates for devices or SIM modules that will later be used to complete provisioning or complete activation or gain access to a network. For example, these apparatus, or any other apparatus including the activation server, can be networked into a service provider network or device database, an MVNO network or device database or a VSP network or device database. In some embodiments, programming of the device credentials or other information associated with the service processor or device is provided, so that, for example, the device can be recognized by an activation server or similar network function at a later point in time so that provisioning or activation can be completed in an automated manner, potentially with reduced or no user involvement, that provides a provisioning or activation configuration that is in some way unique for the service provider or service provider partner, device type, user group, VSP, MVNO, master agent or other entity. In some embodiments, this programming is provided in a manner that is difficult to change without the proper authorization so that the device is properly associated with the proper "service owner" or master agent (e.g., for the purpose of activation incentive payments). For example, as discussed herein, various approaches can be applied to the device credential or other settings or software provisioning so that the settings or software are secure or protected, or so that if the software is removed, replaced or modified it is reported or replace or restored. In some embodiments, VSP control of the provisioning, partial provisioning or activation of devices is provided during manufacture or at different points in the distribution channel. As discussed herein, some of these embodiments allow the central provider to offer to service partners (e.g., VSPs, MVNOs, master agents, and/or OEMs) similar types of control for device activation experience design or device service assignment control (e.g., sometimes referred to as service provider device locking so that other service providers cannot provide primary access to the device) during the manufacturing or distribution process that are possible with devices manufactured and distributed for the central service provider.

In some embodiments, the device is provisioned before the user obtains the device with permanent credentials, temporary credentials or partial credentials. In this case, the necessary credential programming of the device occurs during manufacture, at some point in the device distribution, such as at a distribution depot or in a store, or at the point of sale or point of shipment. In some embodiments, provisioning of network information as discussed above is used, and the network information is provisioned at the same time, before or after the device information is provisioned. In some embodiments, the device provisioning information is programmed with dedicated apparatus that connects to the device either with wires or wirelessly. For example, the dedicated apparatus can be local to the location where the device is being provisioned, or it can be partially or entirely networked into a database or provisioning solution located elsewhere and operated by the central provider, a VSP, OEM or other entity. For example, the apparatus to program the network portions of the provisioning information can also be networked and the operators who set up the required network programming for a device or group of devices may be in the vicinity of the servers that host the provisioning and management tools or they may network into the servers. In some embodiments, provisioning system operators have full or partial control of any device provisioning equipment associated with the entity they work for (e.g., OEM, VSP or master agent) but only have remote access via secure terminal, secure website or other techniques to network into a central provider or VSP server farm in which they control or partially control the network portion of provisioning capabilities for that subset of devices that are assigned to the entity they work for with (e.g. OEM, VSP or master agent).

In some embodiments, provisioning is accomplished over the air on the mobile access network for mobile devices, or over the wired access network or WLAN connection for wired access networks, either before the user receives the device or after the user receives the device. In some cases, the device can be connected to general purpose equipment, such as a computer to perform the programming required to complete provisioning. In the cases in which the device is provisioned at point of sale or after point of sale, the device provisioning can be triggered by a user initiated sequence, or can be initiated by an automated background sequence at any time after the device is powered on. In such cases, in some embodiments, partial credentials that include information such as device type, OEM or service provider are used to assist in determining how to complete the provisioning, and the information can also include secure information, certificate or signature programmed into the partial credentials that is required for the network to perform the provisioning of the remaining credential information in the device and possibly the network. In some embodiments, any network information used/required to provision the device or service is generated at the time the partial credentials are determined rather than beforehand.

In some embodiments, the device is activated for service before the user obtains the device with permanent credentials, temporary credentials or partial credentials, or with a permanent service account or a temporary service account. For example, in this case, the necessary steps of provisioning and activating service for the device can occur during manufacture, at some point in the device distribution, such as at a distribution depot or in a store, or at the point of sale or point of shipment. In some embodiments, the steps for activating service include one or more of the following: provision the device (e.g., with permanent, temporary or partial credentials), provision the necessary network databases and equipment to prepare them to recognize the device and associate it with the service profile and/or service plan, create or select the service account (e.g., permanent or temporary service account), select or create the service profile and/or service plan, program any elements in the device required to activate service (e.g., account ID, device aspects of the service profile and/or service plan), and program the necessary network databases and equipment with the required associations of device credentials and service profile and/or service plan policy settings. In some embodiments, the device-oriented programming portions of the service activation steps occur at the same time, before or after the network oriented programming portions of the service activation steps.

In some embodiments, the device activation information is programmed with dedicated apparatus that connects to the device via a wireless or wire line connection. For example, the dedicated apparatus can be local to the location where the device is being provisioned, or the dedicated apparatus can be partially or entirely networked into a database or service activation solution located elsewhere and operated by the central provider, a VSP, OEM or other entity. For example, the apparatus to program the network portions of the activation information can also be networked and the operators who set up the required network programming for a device or group of devices can be in the vicinity of the servers that host the service activation and management tools or they can network into the servers. In some embodiments, activation server tools operators have full or partial control of any device activation apparatus associated with the entity they work for (e.g., OEM, VSP or master agent) but only have remote and partial access via secure terminal, secure website or other techniques to network into the network portion of the activation tools that are controlled by the central provider or VSP. The server tools operators can be restricted in some embodiments to providing network activation information or settings only for those devices or device groups that are assigned to the entity they work for with (e.g., OEM, VSP or master agent). For example, the device control group restriction can be accomplished with a secure database that has secure sub-partitions for one or more entities so that they cannot impact the control of one another's network activation settings but can control their own devices. In this way, a centralized set of activation tools resources controlled by a central provider, VSP or other entity can be partitioned so that different entities can have partial or full control of the activation service definition for devices or groups of devices without impact or risk to others who share the network and activation tools resources.

In some embodiments, activation is accomplished with an over the air interface to a mobile device, or over the wired access network or WLAN connection for wired access networks, either before the user receives the device or after the user receives the device. In some cases, the device can be connected to general purpose equipment such as a computer to perform the programming required to complete activation. In the cases in which the device is activated at point of sale or after point of sale, the final device activation process can be triggered by a user initiated sequence, or can be initiated by an automated background sequence at any time after the device is powered on. In such cases, some embodiments call for a temporary service account that is used to bring the device onto the network before the user has input the information necessary to create a permanent service account. In some embodiments, a temporary or permanent service account can be applied to the device at the time the device reaches the network, and the type of account, service profile and/or service plan can be influenced (e.g., partially determined or informed) or determined by information embedded in the device credentials or partial credentials, such as device type, device ID, SIM, OEM or service provider. For example, the device credentials can also include secure information, certificate or signature that can be required by the network to perform the activation steps for temporary or permanent service account status. In some embodiments, in which the device is activated in this manner before the user information is available, or before the user has selected a pay for service plan, the service profile and service plan are set up for ambient services as described herein.

In some embodiments, the device is activated during the manufacturing or distribution process, and then the activated device status is suspended. Once the temporary or permanent service account is set up, with appropriate service profile and/or service plan and temporary or permanent credentials, in some networks and billing systems the service can often be more easily resumed once suspended as compared to provisioning and activating the device from scratch. The device is then later resumed (or re-activated) when some event triggers the resume process, such as when it ships to the end user or when the end user attempts to use it. This process prevents the network from needing to manage credentials and accounts for devices that have been activated but are not yet on the network.

In some embodiments, provisioning is accomplished at least in part with temporary credentials in a manner that is automated and convenient for the user or device owner. In some embodiments, at least some subset of the temporary credential elements replaced at a later point in time by permanent credential elements in a manner that is also automated and convenient for the user or device owner. In some embodiments, the temporary credential set is pre-programmed into the device along with a temporary or permanent service account including service profile during the manufacturing or distribution process so that the device is activated with temporary credentials when it ships. In some embodiments, the aforementioned pre-programming is performed for the network via a secure set of server access equipment that networks into the network databases used to define the service profile and/or the service plan. In some embodiments, a subset of the temporary credentials is recycled once it is replaced, if a temporary service account is not activated or used after some period of time, if a permanent account is not activated or used after some period of time, or if the credentials subset is revoked from the device for some other reason.

In some embodiments, more than one device is assigned one or more elements of the temporary credentials, such as the phone number, which may be limited in supply. In some embodiments, a network will accept more than one set of temporary credentials, one or more redundant elements, for two or more different devices. In some embodiments, a device that has two or more temporary credential sets, in which at least a subset of the credential elements are different for the sets, so that if one set of credentials has elements that are already being used to access the network, then one or more reserve sets can be drawn upon to gain access to the network.

In some embodiments, the temporary credentials are used to log onto the network to conduct an over the air or over the network activation process in which an activation server reads at least a portion the device credentials to determine some aspect of how the device service profile. In some embodiments, the aforementioned over the air activation process is accomplished in the background without user intervention. In some embodiments, the over the air activation process is initiated when the user first attempts to use the device or when the user first attempts to access the network or upon user request or approval. In some embodiments, the over the air activation process is initiated using a temporary service account for the device and/or network to gain access to the network. In some embodiments, the over the air activation process is initiated after the user has entered the information required to create a permanent user account into the device or into the network. In some embodiments, the user is required to enter the aforementioned user information before using the device or using some aspect of the device. In some embodiments, the temporary service account is replaced by a permanent service account some time after the user has entered the necessary information to create a permanent account into the device or network. In some embodiments, the over the air activation process is initiated using a permanent service account assignment for the device and/or network to gain access to the network.

In some embodiments, the service profile is assigned to the device and/or network during the aforementioned over the air activation to be a pay for service profile with a free trial period. In some embodiments, the service profile assigned to the device and/or network during the aforementioned over the air activation includes pre-pay, post-pay, session based pay or pay as you go options for service. As will be apparent to one of ordinary skill in the art, various embodiments disclosed herein are particularly well suited for control or pre-pay services. In some embodiments, the service profile that is assigned to the device and/or network during the aforementioned over the air activation is an ambient service profile providing service access before all the user information is available to assign a permanent account. In some embodiments, the service profile that is assigned to the device and/or network during the aforementioned activation is an ambient service profile providing a service upgrade selection option interface to the user. In some embodiments, the service profile that is assigned to the device and/or network during the aforementioned activation is an ambient service profile providing transaction services to the user. In some embodiments, the service profile that is assigned to the device and/or network during the aforementioned activation is an ambient service profile providing bill by account functionality for the network. In some embodiments, the service profile that is assigned to the device and/or network during the aforementioned activation is an ambient service profile providing some amount of free networking or information service to entice the user to use the other ambient services. In some embodiments, the aforementioned ambient service is at least partially implemented with device-based service activity control or control assistance. In some embodiments, the aforementioned ambient service is at least partially implemented by gateways, routers or switches in the network that are programmed according to the ambient access profile for the device to implement the ambient policies for network access control, routing control, traffic control or service monitoring and reporting for bill by account.

In some embodiments, activation is accomplished at least in part with a temporary service account in a manner that is automated and convenient for the user or device owner. In some embodiments, at least some subset of the temporary service account is replaced at a later point in time by permanent service account subset in a manner that is also automated and convenient for the user or device owner. In some embodiments, the temporary service account settings (e.g., including the service profile settings and/or the service plan settings) are pre-programmed into the device along with a temporary or permanent credentials set during the manufacturing or distribution process so that the device is activated with temporary credentials when it ships. In some embodiments, the aforementioned pre-programming for the network is performed via a secure set of server access equipment that networks into the network databases used to define the service profile and/or the service plan. In some embodiments, the device is suspended once it is activated but before the user is using it, and then resumed before or commensurate with the point in time that the user begins to use it. In some embodiments, some subset of the temporary service account is recycled once it is replaced, if the temporary service account is not used after some period of time, if the temporary service account is not upgraded to a permanent service account after some period of time, or if the activation is revoked from the device for some other reason. In some embodiments, more than one device is assigned to the same temporary service account. In some embodiments, a network accepts more than one device on the same temporary service account. In some embodiments, a device includes or is associated with two or more temporary service accounts, in which at least a subset of the temporary service account elements are different, so that if one account is already being used to access the network then one or more reserve accounts can be drawn upon to gain access to the network. In some embodiments, the temporary service account is associated with a temporary credentials set. In some embodiments, the temporary service account is associated with a permanent credentials set.

In some embodiments, un-activated devices are detected by the network routing equipment (e.g., service gateways or routers in hierarchical networks or base stations with embedded gateways in flat networks) and the device routing is programmed to re-direct un-activated devices to an activation server network destination. For example, the activation server can first inspect the information associated with the device to determine if the device belongs to the list of devices, device types or device groups that the network is programmed to provide access to. For example, the information used to determine this can include device type, service provider, phone number, device ID, SIM ID or configuration, secure information used to qualify the device, IP address, MAC address, user, user group, VSP, OEM, device distributor, service distributor (master agent), service processor presence or configuration, presence or configuration of other software or hardware. There can also be some activation definition information embedded in the credentials, or associated with some portion of the credentials, or programmed additionally on the device that informs the activation server as to the service profile and/or service plan and/or service account that should be established for the device. If activation information (the service profile, service plan and/or service account information) is found through association with the device credentials (e.g., device ID, phone number, IP address, MAC address, SIM or other security credentials) rather than being read directly from information embedded in the device or device credentials, then the pertinent aspects of the credentials can be used as a cross reference to look up the service plan and/or service profile information stored in a database networked to or within the activation server. The activation information can include information to define a wide variety of service plans and service profiles that when properly implemented on the network functions, and perhaps device if necessary, can provide for a wide range of service activity policies, service billing policies, transaction billing policies and service account types that can be associated with the device over the air or over the network.

In some embodiments, once the activation server has determined the activation information from the device or from a look up based on some aspect of the device credentials, then the activation server initiates the necessary network settings and billing database entries to be programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. The provisioning can be with permanent credentials or temporary credentials, and the service account that is set up may be permanent or temporary. In some embodiments, the activation process described above is completed perhaps before the user has entered some or all of the user information necessary to set up a permanent service account, and, in these cases, a temporary service account can be set up. In some cases, the activation process can be completed in the background before the user has completed an attempt to access the network and the service profile can be set up to provide ambient services to a temporary service account. In some embodiments, the user is required to enter the information required to establish a permanent service account prior to gaining full use of the device, either on the device, on a computer or in the store, so that by the time the user begins using the device the above activation embodiments can provide for ambient services activation with permanent account status so that the user can purchase a service upgrade or any transaction without entering any more account information.

In some embodiments, a device status is changed from a temporary service account to a permanent service account. If the device is activated with a temporary service account, and the user information is available to set up a permanent account, then if the billing system rules and interfaces allow for such, the user information can be changed from the mock information to the actual user information while maintaining the same account identifiers in the billing system. If the billing system will not allow for such, then the user information can be used to establish a new account, the device credentials can be re-associated with the new account, in some cases, after modifying one or more of the device credential parameters, and the network functions can be re-programmed as required, and, in some cases, the device can be re-programmed as required to accommodate the new permanent account.

In some embodiments, code on the device pulls a temporary or permanent set of credentials. When the credentials are pulled, the network associates the device with an ambient service profile according to one or more of the following: embedded device information identifying device type, service owner (e.g., VSP), user group, or user, or device ID is cross referenced to a database that is populated some time from manufacturing time to post sale where the database provides information identifying device type, service owner (e.g., VSP), user group, or user. The device is then re-directed accordingly (e.g., for device-based this is a matter of setting the policies or loading the software for the service processor, for the network-based approach this is a matter of populating the routing tables and service profile). For example, credentials can be re-cycled after a period of time, and/or some portion of the credentials can be redundant with other devices. For example, this is essentially a dynamic service for (temporarily) assigning device credentials, and the duration of the temporary credential validity for that device ID can be time limited to give the user time to activate a real account or a free trial, session limited, or a longer duration of time that is perhaps refreshed each time the device logs on. For example, the device could also already have permanent or temporary credentials but not have a service account. The above process can be used to assign a temporary or permanent service account as well. Once the service account is assigned and the appropriate service profile is propagated to the network elements, the device can then be directed to or use the appropriate activation profile service activities or the appropriate ambient service activities.

In some embodiments, the device is activated in the background in a manner that is virtually transparent to the user. For example, at some point in the distribution channel, the device is programmed to seek the activation server system described above as soon as it is turned on, or as soon as some other event occurs like the user using the device or the user attempting to gain access. When the pre-programmed event is triggered, the device connects to the network and the gateways or routers re-direct the device to an activation server, as discussed above. As also described herein, the activation server either derives information from the device that informs the server what service the device should be activated with, or the server derives that information from a database look up with a portion of the device credentials as the cross reference parameter. Once the activation server has determined the activation information from the device or from a look up based on some aspect of the device credentials, then the activation server causes all the necessary network settings and billing database entries to be configured/programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. For example, the provisioning can be with permanent credentials or temporary credentials, and the service account that is set up can be permanent or temporary.

In some embodiments, background activation is performed using the aforementioned activate/suspend process. At some point in the distribution channel, the device is programmed to seek to resume service as soon as it is turned on, or as soon as some other event occurs like the user using the device or the user attempting to gain access. When the pre-programmed event is triggered, the device attempts to connect to the network and the gateways or routers re-direct the device to an activation server as described herein. As also described herein, the activation server either derives information from the device that informs the server that the device is ready to resume service, or the server derives that information from a database look up with a portion of the device credentials as the cross reference parameter. Once the server is aware of this information, it sends a message to resume service to the billing system, or other network function that controls the suspend/resume function, and the service is resumed.

In some embodiments, background activation is performed as described below. The service processor and the credentials are pre-programmed during the manufacturing or distribution process to provide the desired service profile support and/or billing profile support for the desired initial ambient service. As described herein, this programming can be accomplished with dedicated apparatus at the manufacturer or distribution depot. Furthermore, the party responsible for defining the service (e.g., typically the central provider, OEM, VSP, distributor or master agent) can network into the service processor programming apparatus to control service processor and/or credential programming for all or a subset or group of the devices or device types locally available. The service processor enabled device is programmed to seek the activation server system described above as soon as it is turned on, or as soon as some other event occurs like the user using the device or the user attempting to gain access. In some embodiments, the activation server is the access control server previously discussed or the access control server can act in concert with another server that performs the activation function. When the pre-programmed event is triggered, the device connects to the network and the gateways or routers re-direct the device to the activation server. As also described herein, the activation server can communicate with the service processor to verify the service processor security credentials, agents and configuration.

In some embodiments, if the activation server determines that the pre-programmed settings stored in the service processor need to be modified to provide the latest version of the desired service, or if the service processor agent software needs to be updated, then this can be accomplished prior to completing the activation process. Once the service processor configuration and settings are confirmed, the activation server causes the necessary network settings and billing database entries to be programmed by sending the service profile instructions to the network provisioning and activation apparatus and the service plan instructions to the billing system. Given that the service processor can perform some or much of the service activity control or control assistance, the service control options are generally larger than without the service processor, and there can be less configuration to perform for other networking equipment to complete the provisioning and activation process. The provisioning can be with permanent credentials or temporary credentials, and the service account that is set up can be permanent or temporary.

In some embodiments, pre-programming and pre-activation of devices with temporary credentials and a temporary service account are used to ship devices that are pre-activated. Given that the credentials are temporary and can be recycled when the permanent credentials are assigned, concerns about using up too many pre-assigned credentials are reduced. In embodiments in which a portion of credentials elements can be used for multiple devices, this concern is further reduced. If there is a concern about too many activated devices being assigned that are not actually active and generating service revenue, then the suspend/resume process discussed herein can be employed. In some embodiments, the temporary credentials and/or temporary account can be replaced with permanent credentials and/or account assignments at any time as follows. When a pre-programmed event in the device is triggered, then the device initiates a program that seeks the aforementioned activation server or another server that has the capability of fulfilling the device request to exchange the temporary credentials for permanent credentials and/or exchange the temporary account for a permanent account. The event that triggers the credential exchange can be the same or different than the event that triggers the service account exchange. The service account exchange can typically be triggered by the point in time that the user enters account information.

In some embodiments, the aforementioned ambient service is partly implemented with a combination of the techniques for pre-provisioning during manufacturing or distribution and at least partially implementing the service activity control (e.g., access control, routing policy, traffic control, usage limits, and/or policy for usage limit overage) required for implementing ambient using the service policy provisioning capabilities in the data path gateways, routers or switches in the network. The gateways, router or switches are pre-programmed as discussed herein according to the ambient access profile for the device to implement the ambient policies for network access control, routing control, traffic control or service monitoring and reporting for bill by account. In some embodiments, the provisioning credential elements are not all pre-programmed before the device ships, but a subset of the credential elements are programmed using the activation server technique discussed herein. This over the air automated provisioning is combined with the activation server reading the device credentials to derive the service activity control settings for the gateways, routers or switches that will result in the desired ambient services activity controls.

In some embodiments, the aforementioned ambient service is implemented with a combination of the techniques for pre-activation during manufacturing or distribution and at least partially implementing the service activity control (e.g., access control, routing policy, traffic control, usage limits, and/or policy for usage limit overage) required for implementing ambient using the service policy control capabilities in the data path gateways, routers or switches in the network. The gateways, router or switches are programmed to recognize the pre-activated device credentials as discussed herein according to the ambient access profile for the device to implement the ambient policies for network access control, routing control, traffic control or service monitoring and reporting for bill by account. In some embodiments, the device activation profile and/or service account are not pre-programmed in the network and/or the device before the device ships but the activation profile and/or service account are programmed using the activation server technique discussed herein. This over the air automated provisioning is combined with the activation server reading the device credentials to derive the service profile activity control settings for the gateways, routers or switches that results in the desired ambient services activity controls.

In some embodiments, a VSP capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and the network billing system database. By providing server tools that enable all these settings to be controlled (or perhaps only observed in the case of the billing system) by a secure workstation or secure website interface that networks into the equipment that programs the settings, and providing for a secure partitioning of the devices that can be controlled by a given secure workstation or secure website interface, a central provider can provide VSP services to multiple entities who all have different device and service plan combinations that they desire different flavors of ambient services for. These techniques can also be extended beyond ambient to any device/service profile/service plan combo the VSP desires to create. In some embodiments, the networking equipment is implemented to secure device service group domains in which the service policies for a group of devices can be controlled. In some embodiments, the pre-provisioning and pre-activation techniques are substituted with the over the air activation server techniques discussed herein, and a secure device group partition capability is provided in the activation server as well so that the activation server device group partition control capabilities can be added to the secure device group partition control capabilities of the network gateways, routers and/or switches, the device programming tools and the billing system to form a VSP partition solution for over the air activation of various device/service plan combinations. In some embodiments, the device groups are relatively small so that beta trials of arbitrarily large or small size can be designed and implemented by defining a service control group as described above, and after fine tuning and perfecting the beta trial settings the device group can be expanded to publish the automated provisioning and activation service settings to a larger user or device group for production services.

In some embodiments, device-based service activity control assistance (e.g., based on the various service processor embodiments described herein) is combined with simplified provisioning techniques described herein so that service processor enabled devices can be shipped with pre-provisioned credentials (temporary or permanent) or can obtain credentials in an automated manner that is convenient and efficient for the user or device owner. In some embodiments, the service processor embodiments in combination with the manufacturing and supply chain credentials and provisioning apparatus described elsewhere provide various approaches for provisioning pre-provisioned service processor enabled devices. In some embodiments, the service processor embodiments in combination with the activation server variants discussed above provide various approaches for over the air or over the network simplified post-sale provisioning for service processor enabled devices. For example, these embodiments can also be used for ambient services given that as discussed herein the service processor has capability to implement service profile policies for deep control of ambient service activity control.

In some embodiments, provisioning includes provisioning partial device credentials that include, for example, a secure certificate that is used to authorize full credential provisioning and/or activation by performing a process for a later look-up/validation of the full device credentials. For example, the look-up/validation of the full device credentials can be performed by a gateway, router or similar network device that re-directs to a provisioning server and/or activation server or other network components that either: (1) recognizes the partial credentials that serve as a reference to direct the device communication to a specific provisioning/activation server determined from the partial credentials; or (2) does not recognize the partial credentials, and directs the device communication to a less specific provisioning/activation server that is not necessarily associated with a reference to the partial credentials.

In some embodiments, if the partial device credentials (e.g., temporary or permanent credentials) are being used for provisioning, then the partial credentials are read (e.g., and/or other credentials can be looked up based on the partial credentials as described above). The device is authorized if the proper credentials and/or secure certificate is present. The device credential provisioning is then completed (e.g., using activation server commands or settings to a device-based software and/or hardware element), and the credentials are, in some cases, also communicated to the various network equipment elements.

In some embodiments, if the partial device credentials are being used for activation, then partial or full device credential provisioning is performed, such as described above. A service account (e.g., temporary or permanent service account) is created or looked up based on the partial device credentials (e.g., a user account associated with the device through embedded partial or full credentials or a look up process, or based on a dynamically created/assigned temporary account associated with the device through embedded partial or full credentials). An initial service profile and, in some cases, an initial service plan (e.g., service control policy settings including a billing profile) are determined from embedded information and/or using a look up process (e.g., based on the device type and/or partial or full device credentials). The device is then programmed to enable access with the service profile and plan, and, in some cases, the various network components/elements are programmed to enable the service profile and plan, and, in some cases, proper entries in the billing system are made or confirmed, and the device credentials are, thus, activated for service.

In some embodiments, the above-described provisioning and/or activation processes are performed with the provisioning server(s) and/or activation server(s) in the background with reduced, minimal or no user input required, for example, after the device is sold to the user and the user turns on the device so that by the time the user attempts to access the service using the device, the provisioning and/or activation process is already completed.

In some embodiments, device-based service activity control assistance (e.g., based on the service processor embodiments) is combined with simplified activation techniques described herein so that service processor enabled devices can be shipped with pre-activated accounts (temporary or permanent), or can obtain activated account status in an automated manner that is convenient and efficient for the user or device owner. In some embodiments, the service processor embodiments in combination with the manufacturing and supply chain activation and provisioning apparatus described elsewhere provide various approaches for pre-activated service processor enabled devices. In some embodiments, the service processor embodiments in combination with the activation server variants discussed above provide various approaches for over the air or over the network simplified post-sale account activation for service processor enabled devices. These embodiments can also be used for ambient services given that as discussed herein the service processor has capability to implement service profile policies for deep control of ambient service activity control.

As discussed herein, in some embodiments for activation, the network AAA (or other network function) either recognizes one or more aspects of a pre-activated device credentials and routes the pre-activated device communication to an activation server that is appropriate for that device (routing information either derived through look up of the credential aspect or by obtaining the required information directly from the credential itself), or the AAA (or other network function) does not recognize the credentials and routes the device communication to an activation server for unrecognized device credentials. In either case, in some embodiments, one or more of the credential aspects can then be used to perform a secondary determination of what provisioning and/or activation sequence to perform in association with the device, or which activation server sequence the device should be directed to. For example, one or more device credential aspects can be read and used as a cross-reference to determine a routing for the device communication (or the information required for routing can be in the device credential information itself) so that the device can be routed to the appropriate activation server sequence.

In some embodiments, an activation server sequence can be determined at least in part by using a browser server or a portal (e.g., http server, https server, WAP server or another standard or custom protocol server for a browser, embedded or automated browser or a portal client in the device). In some embodiments, the browser server is an http or https server. The pre-activated device communication can be routed to the https server in a manner similar to that described above, and the server can read the information embedded in the https communication to determine the device credential information required to initiate the correct provisioning completion and/or activation sequences. For example, the https header information, tokens, cookies or other secure information communicated over https from a secure embedded client on the device (or user) can either provide the activation server with the information required to perform the cross-reference to an appropriate provisioning and/or activation sequence, or the https embedded information or the embedded client (or user) information can instruct the activation server on which services the device is to be provisioned and/or activated on and any necessary device or user information (e.g., device owner and/or billing information) can be exchanged, or the device might be provisioned and/or activated first on a free ambient service with temporary or permanent credentials or account.

In some embodiments, the service processor can be combined with the pre-provisioning and pre-activation techniques described above to create an ambient service solution that will work on roaming networks in which the central provider or VSP has no control or minimal control over the network elements. For example, the device includes a service processor pre-programmed for ambient service activity control as discussed herein, and the device credentials and other settings are pre-provisioned and pre-activated for the central provider network, all of which is described in numerous embodiments disclosed herein. Provided that the service provider has a roaming agreement with other service providers, or provided that the device may gain access to the roaming network, when the device is roaming it will be capable of ambient connectivity with bill by account functionality and all the other features of ambient. Furthermore, as also discussed herein, the ambient service activity control policies can be different for different roaming networks to accommodate the varying network costs and performance. Also, for example, it would be permissible to sign up for initial services or additional upgrade services with the central provider while roaming on the roaming partner network. One of ordinary skill in the art will appreciate that this also allows for creating a VSP or MVNO for the purpose of creating a clearing house for central provider service activations according to geography or user choice. By using a global multi-mode modem module, and maintaining service agreements with a multitude of carriers, the MVNO or VSP can provide consistent ambient services across multiple carriers and multiple geographies while still maintaining a good degree of cost control. Using bill by account capabilities, it is also possible to have an activation agreement where a roaming service provider agrees to refund the cost of ambient roaming. From the ambient service platform, the VSP or MVNO can then provide service purchase options to the user based on the carrier networks available to the device, or the VSP or MVNO can broker the user off to any of the carriers by activating the device onto the carriers' main central provider service.

Accordingly, these embodiments provide flexible capabilities for activating a device or group of devices with a broad range of service profiles and service plans by simply programming the device with the proper credentials at some time during manufacturing or distribution, or simply programming a database associated with the network so that a portion of the device credentials can be used to look up the desired service profile and service plan. For example, various activation embodiments described herein are highly convenient for the end user and need not, in many cases, involve any human intervention.

The service processor 115, service controller 122, policy implementation and/or profile implementation and various embodiments disclosed herein are applicable to conventional communication products as well as machine to machine applications. For example, if the machine to machine device includes a service processor 115 with an activated account, then the service profile settings can be optimized for machine communications to provide only the limited access required to support the particular machine to machine application. This allows for cost optimized access services and prevents the machine to machine device or access modem from being misappropriated and used for some other service access than that intended. For example, by programming the machine to machine communications device at time of manufacture or during distribution with credentials or partial credentials that provide for automated provisioning and activation as described herein, the device can be automatically provisioned and activated on the service network with a service account when deployed, thus eliminating the need for costly or time consuming human intervention. The various embodiments that make it simpler to design, manufacture, test and deploy devices may also be equally applied to machine-to-machine devices. These embodiments include the service processor 115 developers kit and the automated provisioning and activation management tools among others. Also, the service analysis and test tools and the virtual service provider embodiments can also be applied to machine-to-machine applications.

Verifiable Device-Assisted Services for Intermediate Networking Devices

It should be appreciated that the various service monitoring, notification, control and billing embodiments disclosed herein can also be applied to intermediate networking device applications.

In some embodiments, an intermediate networking device is a communications device in which the service processor 115 is configured at least in part to allow the intermediate networking device to act as a service intermediary or intermediate connection between the network and one or more end-point devices (e.g., communications devices). In addition, a service controller 122 or other suitable network functions can be employed to assist with the verifiable service usage monitoring, control and verification as disclosed in numerous embodiments described herein. In some embodiments, an intermediate networking device does this by implementing the service policies required for assisting service usage control of the intermediate networking device and connecting the network to provide services to one or more end-point devices that are connected to the intermediate networking device. In some embodiments, the intermediate networking device also monitors the service use activities of the intermediate networking device and/or the end-point devices connected to the intermediate networking device. In some embodiments, the intermediate networking device and/or end-point device service usage is verified to ensure that the service usage is within the expected ranges for the policies that are implemented. In some embodiments, the intermediate networking device connects with the network using one modem technology and connects with the end-point devices using one or more additional technologies. In some embodiments, an intermediate networking device connects the end-point devices to the network by passing, bridging, forwarding, routing, traffic shaping or otherwise allowing the end-point devices to communicate with the network. Example intermediate networking device embodiments include a Wi-Fi to WWAN (e.g., 2G, 3G, 4G or other wireless wide area networking access technology) bridge or router device, a Wi-Fi to DSL, cable or fiber gateway device, a WWAN to DSL or Cable femtocell device, a WWAN and Wi-Fi to DSL, Cable or fiber backhauled femtocell device, a WWAN to WWAN router device, a WWAN to WLAN, WPAN or LAN bridge, router or gateway device, or a WWAN back up connection device for an enterprise router.

An intermediate networking device can also be provided in some embodiments by including a bridging, forwarding or routing function between two modems in a communications enabled device that connects to the network. For example, an intermediate networking device configuration can be a cell phone, smart phone, mobile internet device or any other mobile device that includes a WWAN modem and a Wi-Fi, WLAN, WPAN or LAN connection that can be used to connect to other end-point devices. For example, the mobile device WWAN modem can connect to the network, a service processor 115 can be included on the device processor to assist monitoring, controlling and billing for services between the WWAN network and end-point devices connected to a Wi-Fi modem. In addition, a service controller 122 or other suitable network functions can be employed to assist with verifiable service usage monitoring, control and verification as disclosed in numerous embodiments disclosed throughout herein. In some embodiments, the Wi-Fi modem can be configured in access point mode or in ad hoc mode to communicate with other end-point devices in the area covered by the mobile device WLAN modem. In this manner, a service processor 115 and a service controller 122 or other suitable network functions can be employed to enable the verifiable service usage monitoring, control and verification as disclosed in numerous embodiments described herein.

Another example embodiment is a notebook or sub-notebook computer with a WWAN modem and a Wi-Fi, Ethernet, FireWire, Bluetooth, near field or ZigBee modem in which the notebook processor has a service processor 115 running on the notebook processor and the service processor 115 is used to assist monitoring, control and billing for services communicated between the WWAN network and end-point devices connected to the notebook or sub-notebook WLAN, LAN or WPAN. Another example embodiment is a Wi-Fi hot spot with a service processor 115 capability. Another example embodiment is a WWAN back up modem in an access network router where the back up modem connection to the WWAN network is used when the main wired network connection goes down, and a router processor or a WWAN back up modem processor runs a service processor 115 to assist monitoring, controlling and billing for services between the WWAN network and the access router (e.g., the service provider may only wish to enable a connection when the main wired network is down to ensure that the WWAN modem is not used for everyday access). In this manner, a service processor 115 and a service controller 122 or other suitable network functions can be employed to enable the verifiable service usage monitoring, control and verification as disclosed in numerous embodiments described herein.

Another example embodiment is a two-way home gateway configured to perform various functions such as reading power consumption of the home and/or components in the home, providing WLAN, WPAN or LAN connectivity for such components or to the power meters/controllers attached to such components, providing a WWAN or WAN connection to a network that reads, records, monitors and/or controls the home and/or component power consumption, and possibly to provide other wide area network services for other devices in the home such as computers or entertainment electronics in a similar manner to the WWAN, DSL, cable and fiber gateway embodiments. The WLAN, WPAN connections can be made with one or more of Wi-Fi, ZigBee, Bluetooth, NFC or any other suitable wireless modem technology, and any desired wired LAN connections may be made with one or more of Ethernet, USB, FireWire, data over cable, data over power line or any other suitable wired modem technology. The WWAN connections can be made with one or more of 2G (e.g. CDMA 1×RT, GPRS), 3G (e.g. WCDMA UMTS/HSPA/non-MIMO HSPA+, CDMA EVDOrA/B, 802.16d/e WiMAX), 4G (e.g. LTE, MIMO HSPA+, MIMO 802.16m WiMAX) or any other suitable modem technologies and the wired WAN connections may be made with one or more of DSL, Cable, fiber or any other wired modem technology. A service processor 115 and a service controller 122 or other suitable network functions can be employed to enable the verifiable service usage monitoring, control and verification as disclosed in numerous embodiments disclosed throughout herein.

In some embodiments, an intermediate networking device can be used to connect one end-point device to a network and assist in implementing service policies, or an intermediate networking device can connect multiple end-point devices to one or more networks and assist in implementing service policies. In some embodiments, an intermediate networking device can be associated with one service profile, one service plan or one service account, or an intermediate networking device can be associated with multiple service profiles, multiple service plans or multiple service accounts. In some embodiments, end-point devices connected to an intermediate networking device can have service usage policies implemented in aggregate for all end-point devices, or service policies can be implemented differentially for different end-point devices.

In some embodiments, an intermediate networking device can have a network connection associated with a single account and manage QoS between end-point devices under one umbrella service profile or collection of profiles. In some embodiments, an intermediate networking device can treat all connected end-point devices equally from a service sharing or QoS perspective so that, for example, service usage is based on end-point device demand and/or contention. In some embodiments, an intermediate networking device differentiates service QoS between different end-point devices based on end-point device service demand or service usage patterns, EDP device type or device group, end-point device user or user group, end-point device service account status or service plan status, or end-point device application type, and/or traffic type or service type.

As discussed herein, the service processor 115 function assisting intermediate networking device implementation can be included on the intermediate networking device, can be included in part on the intermediate networking device and one or more end-point devices, or can be implemented mainly or entirely on one or more end-point devices.

In some embodiments, an intermediate networking device can be constructed in which end-point devices connect to the intermediate networking device and gain access services to a WWAN network through a WWAN/Wi-Fi enabled intermediate networking device that is supplied with services associated with a single account and service profile. The intermediate networking device service processor 115 can assist in monitoring, control and billing for WWAN service usage for all end-point devices in the area covered by the intermediate networking device Wi-Fi link. In some embodiments, end-point devices receive service on first come first serve basis with no differentiation. In some embodiments, end-point devices receive fair distribution of services so that if one end-point device is using more significantly more service than the other end-point devices, or is demanding more service than the intermediate networking device service profile settings provide for a single end-point device (e.g., "bandwidth hogging"), then the high demand end-point device is throttled and the other end-point devices are not. In some embodiments, end-point devices receive hierarchical distribution of services based on one or more of service type, device type, user type, and/or account status. In some embodiments, an intermediate networking device can provide for a large or unlimited number of end-point devices to connect to the network and simply control aggregate service usage parameters for the intermediate networking device WWAN connection. In some embodiments, the intermediate networking device limits the number of end-point devices that are allowed to connect to the WWAN network according the end-point device count limits programmed in the service processor 115 service profile settings in the intermediate networking device. In some embodiments, end-point device traffic can be identified by various end-point device credential aspects including, for example, by Wi-Fi ID, MAC ID, IP address, user ID, LAN tag, end-point device agent credentials, and/or browser token or cookie. In some embodiments, the intermediate networking device service account can be billed for overall service usage and/or by number of end-point device connections allowed or experienced. In some embodiments, as the intermediate networking device user or owner signs up for a higher end-point device connection count, one ore more aspects of the service usage policy implementation and/or profile implementations in the service processor 115 profile settings can be increased.

The various verification techniques described herein can also be applied to the intermediate networking device and extended to multiple end-point devices. For example, network-based service usage measures for verification can be applied to the intermediate networking device just as if the intermediate networking device were an end-point device. For example, network-based service usage measures (e.g., IPDR information) can be used to perform network verification checks to ensure that intermediate networking device service usage is within acceptable ranges based on intermediate networking device policy settings as similarly described with respect to various device embodiments. In some embodiments, in the event intermediate networking device service usage is outside the policy limits set for the intermediate networking device service processor 115, a notification can be sent to the intermediate networking device main account owner. The main intermediate networking device account owner can also be required to acknowledge the notification. The notification can also be sent to one or more other users of the intermediate networking device connection, including possibly all users. Other actions that can be taken if the network-based intermediate networking device service usage measure does not match the policy limits set on the service processor 115 include notify the user, notify the user and require acknowledgement, bill the user for service overage, suspend the end-point device, quarantine the end-point device, SPAN the end-point device, and/or alert network manager or alert an automated network troubleshooting function. In some embodiments, a device-based usage measure can be verified against a network-based service usage measure. It will now be apparent that the various service processor 115 verification embodiments, service controller 122 verification embodiments, network verification embodiments, authentication embodiments, and tamper prevention or detection embodiments, such as those shown in and described with respect to FIGS. 30A, 30B, 31, 34A-34H, 35A-35M and 36A-36D, can be applied to intermediate networking device applications and embodiments.

In some embodiments, it is desirable to match up individual end-point device or user intermediate networking device service usage with other service usage measures. For example, the individual end-point device service usage measures logged or reported from the end-point devices and/or the intermediate networking device can be aggregated to form a total intermediate networking device usage measure that is compared to an aggregate intermediate networking device usage measure logged or reported in the network. In some embodiments, if these measures do not match, then an error condition results and an action is taken. In some embodiments, the aggregate intermediate networking device service usage measure is compared to the aggregate network-based service usage measure and as long as these two measures are within an acceptable tolerance, then the intermediate networking device service usage measures are trusted and can be used for deeper intermediate networking device and end-point device usage measures for service control and/or billing than may be possible in the network. In such embodiments, the individual end-point device service usage measures gained from the intermediate networking device or end-point device can be used to verify end-point device service usage versus service policy allowances. In some embodiments, end-point device service usage measures are compared with intermediate networking device measures for the same end-point devices.

In some embodiments, the IPDR records for one or more networks can include individual end-point device service usage information. This is the case, for example, when the IPDRs include information broken down by end-point device credential, such as IP address or other end-point device credential. In such cases, intermediate networking device embodiments can be employed in which the individual end-point device service usage information measured in the network can be compared with the service usage policy allowances or limits for the end-point device. Also, in some embodiments, the individual end-point device service usage measures from an end-point device service usage monitor and/or an intermediate networking device service usage monitor can be compared with the network-based service usage information to verify an end-point device and/or an intermediate networking device service usage monitor is operating properly.

As similarly described with respect to end-point device embodiments with no intermediate networking device between the end-point device and the network, in some intermediate networking device embodiments, service usage and service usage monitor reports can be periodically verified by performing a SPAN function on the traffic for an intermediate networking device. The SPAN traffic can be analyzed in a real-time manner or in a non-real-time manner in the network and the results can be compared with the intermediate networking device or end-point device service policies or service usage measures.

The synchronized device notification and acknowledgement embodiments can also be employed in the case in which one service account is applied to the intermediate networking device. The service usage counters in the intermediate networking device can be synchronized or updated with the network-based measures and the differences between the two may be minimized. The service usage notification can be sent to one or more of the end-point devices connected to the intermediate networking device. For example, the notification can be sent to the intermediate networking device manager or service owner, all end-point devices or the most active end-point devices.

Similarly, user preference feedback can be collected from one or more of the service users connected to the intermediate networking device. In some embodiments, user preferences or user service selections or service settings are collected from one user or a subset of end-point devices used by the service subscriber. In some embodiments, more than one service user can provide preference information or service settings even if there is only one user account. In some embodiments, there are multiple service subscribers each providing preferences. In some embodiments, as similarly described with respect to various device embodiments, user preferences can be used set service control policies that provide the user with their selected balance of cost and service capability in a manner that meets network neutrality requirements. Similarly, in some embodiments, the service monitoring and customer resource management information collected on the intermediate networking device or end-point devices can be filtered according to user privacy preferences to maintain the level of user privacy selected by the user.

Adaptive intermediate networking device policy implementation can also be performed in the intermediate networking device service processor 115 embodiments, as similarly described with respect to various device embodiments. In some embodiments, the service policy implementation for the intermediate networking device can be adapted by the service processor 115 agents (e.g., policy control agent 1692 working to control the settings in policy implementation agent 1690, and/or another service processor agent or function) to achieve a higher level service usage goal. In some embodiments, the usage goals or adaptation can be based on aggregate end-point device usage for the intermediate networking device network services, and in some embodiments, the higher level usage goals or adaptation can apply to one or more individual end-point devices.

In some embodiments, even though there is one intermediate networking device account, there can be multiple options for multi-end-point device or multi-user operation in which the number of end-point devices, number of users or service capabilities for some of the end-point devices or users are selectable. These parameters are accommodated by an intermediate networking device service profile that includes the service capabilities that are to be delivered to a multitude of end-point devices or users. In some cases, some end-point devices or users have a different profile within the intermediate networking device service processor 115 with differentiated capabilities as compared to the intermediate networking device service processor 115 profile for other end-point devices or users. This is the case for some of the examples provided herein. These multi-end-point device or multi-user service profiles in the intermediate networking device service processor 115 can share services equally or can allow more capable access services to some end-point devices or users than others. In some embodiments, a service profile implemented by the intermediate networking device service processor 115 for one end-point device or user is different than that in the service profile implemented by the service processor 115 for another end-point device or user (e.g., providing differentiated service profile implementations by end-point devices and/or users). End-point devices can be uniquely identified for purposes involving implementation of different service profiles in the intermediate networking device service processor 115 agents (e.g., depending on the embodiment, service monitor agent 1696, policy implementation agent 1690, policy control agent 1692, application interface agent 1693 and/or other service processor agents or functions) based on a number of parameters, such as IP address, local area network address (e.g., Wi-Fi address), MAC address end-point device ID, user ID, and/or end-point device application layer tag. This allows for independent service usage monitoring and control for different end-point devices or users.

In some embodiments, an intermediate networking device also bridges services to end-point devices or users that have individually managed service profiles, service plans or service accounts. As discussed herein, individual end-point device service policy implementation and/or service profile implementation can be accomplished by classifying end-point device service usage according to an end-point device identifier so that service monitoring, control assistance and reporting may be differentiated between one or more end-point devices. These end-point device identifiers can then be associated with a different service plan or account in the service processor 115 and/or billing system 123. The end-point device or user specific service usage monitoring, reporting, notification and control assistance can be accomplished by running one or more profiles for each end-point device or each user.

It will now be apparent that billing can also be implemented with a single account encompassing service usage for all users or end-point devices connected to an intermediate networking device, or for individual users, end-point devices, user groups or end-point device groups connected to an intermediate networking device. As similarly described with respect to the service profile, this is accomplished by associating service usage events and associated billing events with a end-point device identifier, user identifier, end-point device group identifier, and/or user group identifier.

In some embodiments, end-point devices or users connect to more than one intermediate networking device with the same service account, service plan or service profile. In some embodiments, the intermediate networking device requires an authentication sequence for the end-point device or user before allowing connection to the network through the intermediate networking device. This authentication sequence can involve the end-point device communicating an active account or admission credential with the intermediate networking device. The intermediate networking device can compare the credential with a local database or may query a database in the network to admit the end-point device to the intermediate networking device network connection. In either case, provided the user credential or network authorization process is passed, the service processor 115 service profile settings for the end-point device are applied and service is then established as discussed herein. In these cases, the verification can be accomplished as described herein. In some embodiments, even if the end-point device does not have a service processor 115, provided that the intermediate networking device service policy implementations and/or service profile implementations are verified as described herein, then the intermediate networking device will accurately assist in control and reporting of service usage for the different end-point devices or users, and the appropriate service policy controls and/or billing can be maintained.

In some embodiments, when the end-point device attempts connection to the intermediate networking device, if the user or end-point device does not already have an active account or logon credential that the intermediate networking device recognizes, then the intermediate networking device can offer the end-point device or user a service sign up experience. This experience can be implemented in a number of ways, including a website, WAP site, portal, download of agent software, and other methods. For example, an automated recognition of new devices can redirect unauthorized end-point devices to browse into a website, WAP site, or portal site located on the intermediate networking device or in the network. If the site is located on the intermediate networking device, it can be cached and refreshed at a time of day when the network is not overly busy. Once on the site, the user or end-point device selects the plan choice they desire, inputs account information and, in some embodiments, downloads device agent software to aid in network service policy implementation and/or profile implementation with the intermediate networking device.

Once the user signs up, the information is logged into the network data base, the service account is established and the intermediate networking device service profile for that user or end-point device is activated and the user can begin using the service.

In some embodiments, a website, WAP site, or portal site located in the intermediate networking device can be used to provide the end-point device user with a service usage monitor interface and a service purchase interface for cases in which the end-point device does not posses any special software to allow it to display a more specialized service usage monitor function for information received from the intermediate networking device or network service usage counters. The service usage monitor for the intermediate networking device can be synchronized, as similarly described with respect to various device embodiments. In some embodiments, the service usage notification system can also display cost data from a usage to cost look-up function. In some embodiments, the service usage notification system can display projected service usage or projected cost, as similarly described with respect to various device embodiments. The service usage monitor to drive these service notification embodiments can be located on one or more of the end-point device, the intermediate networking device or the network.

In some embodiments, if multiple accounts are serviced by one or more intermediate networking devices, verification can be performed on the service controls for the end-point device or user service usage. As will now be apparent, just as with the intermediate networking device, the end-point device or user service usage comparison with usage policy settings can be verified in the ways described herein. If the usage is found to be out of policy, then any of the out of policy actions described herein can be performed, including, for example, notify the end user, notify and require acknowledgement, bill for overage, suspend, quarantine, SPAN, and/or flag to network manager or network error handling function. For example, the verification methods shown in and described with respect to FIGS. 30A, 30B, 31, 34A-34H, 35A-35M, and 36A-36D can be applied for the embodiments where intermediate networking devices have multiple account, multiple service plan, multiple service profile, multiple end-point device, and/or multiple user capabilities.

It will be apparent that the various embodiments described herein for automated provisioning and activation also can similarly be applied to the intermediate networking device embodiments. It will also be apparent that the various virtual service provider embodiments can similarly be applied to the intermediate networking device embodiments.

Ambient services can be employed on the intermediate networking device and the ambient services can thus be provided to the end-point devices. It will be apparent that the ambient service profile embodiments disclosed herein can similarly be applied to the intermediate networking device, and then the intermediate networking device can supply those ambient services to end-point devices connected to the intermediate networking device. It will also be apparent that the intermediate networking device can provide an ambient service profile as described herein to end-point devices or users that have not yet signed up for service, while providing other paid for service profiles to end-point devices or users that have signed up for service.

Bill by account embodiments can similarly be applied to the intermediate networking device embodiments. For example, bill by account can be used in embodiments in which all end-point devices or users are connected to the intermediate networking device under one account, or to embodiments in which some end-point devices or users are accounted for separately with different service accounts, service plans or service profiles. In either case, it will be apparent that using one or more of the end-point device or user identification credential aspects discussed herein can be used in a bill by account profile to account for any end-point device or service activity. In such embodiments, billing event reports for those activities that include the end-point device or user identifiers can also be provided for billing mediation and reconciliation down to the individual end-point device or user level. For example, this allows for very deep service monitoring and billing capabilities with intermediate networking devices.

The intermediate networking device embodiments described above also have uses in machine-to-machine applications. It will be apparent that if the end-point device includes the correct credentials to gain access to an existing account, or to allow an automated provisioning and activation account to be established, then the end-point device can be connected to the network through the intermediate networking device without human intervention. Furthermore, the service profile that is established with the end-point device for machine to machine communications can be set up to provide the access required to support the machine to machine application allowing for low cost access services and preventing the end-point device from being misused for some service other than that intended. For example, the verification techniques and embodiments disclosed herein can similarly be applied to such machine-to-machine applications.

It will be apparent that the identifiers discussed above for bill by account mediation with accounting down to the individual end-point device or user level can be combined with a billing mediation server in the network that accepts intermediate networking device billing events with end-point device identification or user identification indexed billing, performs the necessary bill by account mediation functions, formats the billing events into the format used by the billing system, and transmits the mediated billing information to the billing system 123.

In some embodiments, the intermediate networking device service processor 115 functionality can be split. The division ranges from some or all of the service processor 115 on the device to some or all of the service processor 115 on the intermediate networking device.

In some embodiments, all of the service processor 115 is on the intermediate networking device. The end-point device does not participate in service processor 115 functions and has no service processor 115 interface software. In some embodiments, the end-point device has small subset of service processor 115 capabilities, including, for example, a service notification UI or a logon client with credentials. In some embodiments, service monitoring is implemented on the end-point device or on both the end-point device and in the intermediate networking device. In some embodiments, the end-point device has additional service processor 115 capabilities including, for example, application layer tagging that associates application layer activity with service processor 115 service monitoring or service policy implementation and/or service profile implementation information. This can be accomplished by a range of techniques, for example, transmitting the application tagging information disclosed elsewhere to the intermediate networking device service processor 115 so that the policy implementation may be accomplished with knowledge of the application layer information. Another example involves assigning IP addresses in the intermediate networking device networking stack to the end-point devices so that different types of end-point device traffic can be routed into service processor 115 traffic shaping queues, each queue having a policy profile implementation engine, and application layer tagging information or similar traffic identifying information is used to determine which policy implementation engine the traffic should be routed to in order to accomplish the desired traffic shaping for the traffic type, application type, service type, and/or content type. In some embodiments, the traffic control policy is implemented on the end-point device either with an application layer traffic controller, or by implementing more of the service processor 115 functionality, as similarly described with respect to various device embodiments. In the end-point device service functionality example, most or all of the service processor 115 functionality is implemented on the end-point device and the intermediate networking device functionality can be reduced to a bridging, forwarding or routing function between the end-point devices and the network that performs little or no service control, monitoring and/or billing functions. For example, the service usage monitoring agents can also be provided on the end-point device to aid in verification.

In embodiments in which the end-point device requires agent software, the software can be loaded at time of manufacture or during distribution, loaded later, and/or made available for download through the intermediate networking device. In the case in which the end-point device agent SW is downloaded through the end-point device, there can be locally cached copies of the SW for one or more OS variants stored in a cache on the intermediate networking device, with the cache being updated over the network at convenient or conducive times, or the software can be downloaded live over the network when it is needed by the end-point device. Logging the service usage to download this software is another example in which bill by account functionality can be used to track network traffic that may not be desirable to bill to a end-point device owner or user, and bill by account functionality can be used to log and mediate such usage out of the user or end-point device owner's bill.

Any end-point device agent software required to connect to the intermediate networking device can also be implemented as a service processor 115 developer's kit as described herein and distributed to aid manufacturers, service provider and virtual service providers in bringing new devices onto networks with intermediate networking device capability.

In the case of a femtocell intermediate networking device, in some embodiments, it is desirable to facilitate handover from the WWAN network to the femtocell. In some embodiments, this provided in the intermediate networking device service processor 115 in a variety of ways. In some embodiments, the voice and data traffic is routed through a VPN tunnel controlled by the service processor 115 and connected to a network element, such as the transport gateway or another specified traffic concentration destination for the femtocell. In some embodiments, the voice traffic, the data traffic or both can be routed in secure or open Internet channels to different destinations, or the data can be routed directly to the Internet destination specified by the packets. In some embodiments, the femtocell intermediate networking device controls the femtocell frequencies or local frequency channel strength surveys over the intermediate networking device control channel. In some embodiments, the service processor 115 has a VPN connection to a network base station hand off controller to assist in handoff to and from the WWAN network and/or has the capability to instruct the end-point device and the base station handoff controller. In some embodiment, whenever an end-point device authenticated for femtocell access is within range of the femtocell, the service provider desires to set up a service processor 115 profile to get the end-point device to connect to the femtocell even if it has a strong signal with one or more WWAN base stations so that the WWAN traffic may be offloaded. In some embodiments, the service processor 115 can form a secure control plane link with network AAA functions to manage authorization and admission of end-point devices the femtocell has not yet admitted, or the network policies can require re-authorization every time a end-point device attempts access. Once an end-point device is connected to the femtocell intermediate networking device, the verifiable traffic monitoring, control and billing functions described herein can be applied to various application embodiments. For example, the intermediate networking device service policy verification techniques disclosed herein, as similarly described with respect to various device embodiments, can similarly be applied to the femtocell intermediate networking device embodiments.

In some embodiments, the service provider desires to keep the number of end-point devices or users that access an intermediate networking device below a certain count specified in the service processor 115 profile. In some embodiments, this is accomplished by controlling the number of IP addresses allowed onto the intermediate networking device local area side connection. In some embodiments, this is facilitated by observing the end-point device identification parameters available in the end-point device traffic. In some embodiments, this is facilitated by observing the traffic patterns to determine the likely number of devices connecting to the network. For example, traffic demand patterns can be examined to determine how many users are likely to be demanding access at one time.

Security Techniques

In some embodiments, security techniques for device-assisted services are provided. In some embodiments, secure service measurement and/or control execution partition techniques for device-assisted services are provided. In some embodiments, a secure execution environment for device-assisted services is provided. In some embodiments, a secure stack for device-assisted services is provided. In some embodiments, a secure memory for device-assisted services is provided. In some embodiments, a secure modem for device-assisted services is provided (e.g., providing a secure communication link between the modem/modem driver and a service processor and/or agent on the device, such as a communications device or an intermediate networking device). In some embodiments, one or more secure monitoring points for device-assisted services are provided. In some embodiments, one or more secure monitoring points with verification for device-assisted services are provided (e.g., a secured monitoring point can be provided in a modem, which communicates securely to a secured execution environment in a CPU/processor, which can then verify such service usage measures). In some embodiments, a secure bus for device-assisted services is provided. In some embodiments, a secure execution environment in the CPU/processor for device-assisted services is provided. In some embodiments, secure access to a secure execution environment(s) for device-assisted services is provided (e.g., securing communication from a bottom of the stack, such as modem drivers, which require credentials to access the bus as controlled by a service processor or secure agent on the device, and in which the traffic on the bus is encrypted). In some embodiments, various secure execution environments for device-assisted services are provided using various hardware partition techniques (e.g., secure memory, secure modems, secure memory partition(s) in the CPU/processor), as described herein.

Figure 74:
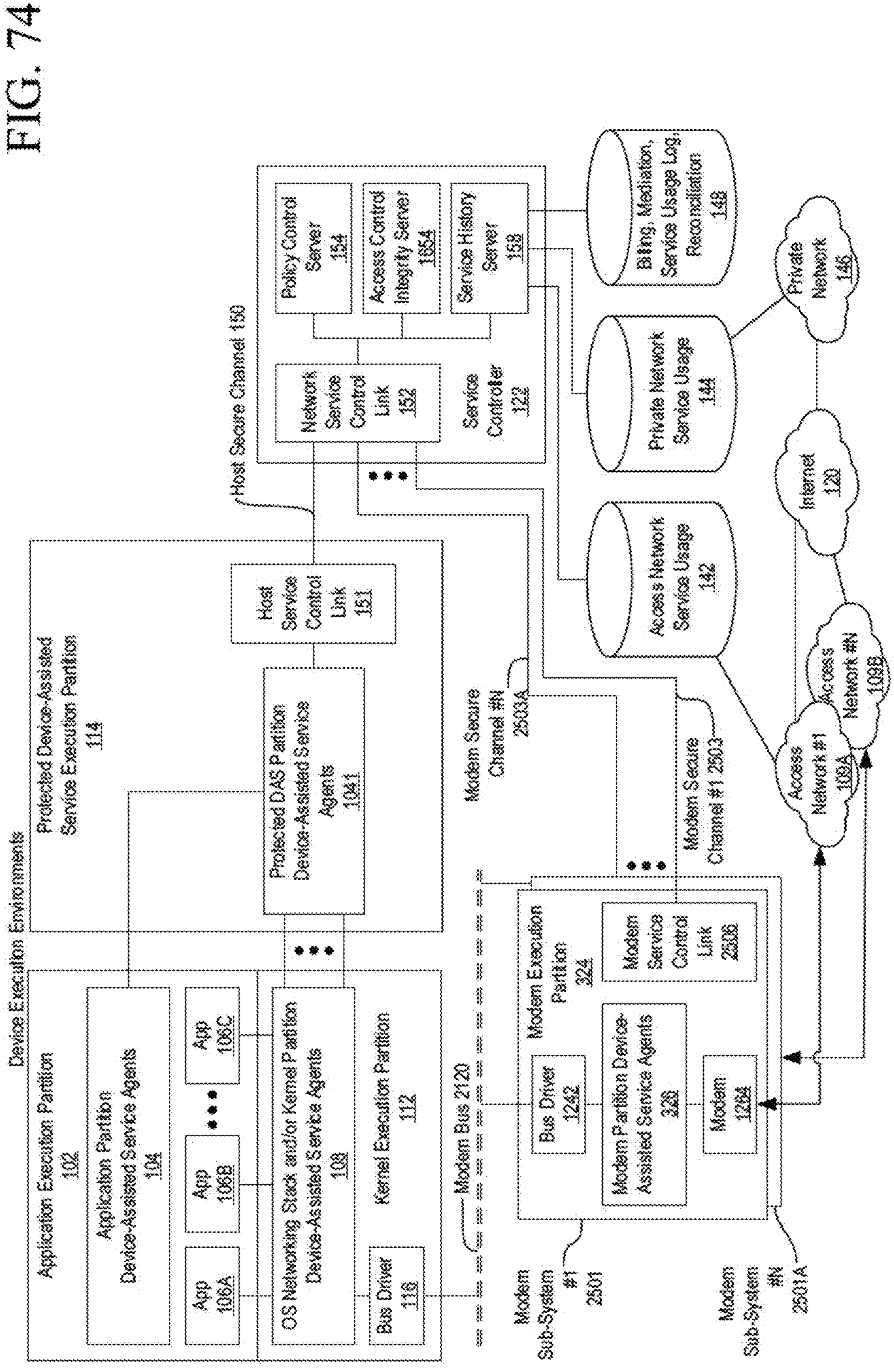
FIG. 74 illustrates a secure execution environment (SEE) for device-assisted services in accordance with some embodiments.

FIG. 74 illustrates a secure execution environment (e.g., for a communications device) for device-assisted services in accordance with some embodiments. As shown in FIG. 74, the device execution environments include program/functional elements for a communications (e.g., a communications device can be an intermediate networking device, such as 3G/4G WWAN to WLAN bridges/routers/gateways, femtocells, DOCSIS modems, DSL modems, remote access/backup routers, and other intermediate network devices, or a mobile communications device, such as a mobile phone, a PDA, an eBook reader, a music device, an entertainment/gaming device, a computer, laptop, a netbook, a tablet, a home networking system, and/or any other mobile communications device) device that utilizes the modem subsystems #1 (2501) through #N (2501A) to connect to one or more of the access networks #1 (109A) through #N (109B). In some embodiments, a communications device includes multiple program execution partitions. As shown in FIG. 74, four execution partitions are provided: an application execution partition 102 in which, for example, application programs execute, a kernel execution partition 112 in which, for example, the lower level drivers and basic low level OS programs execute, a protected device-assisted service (DAS) execution partition 114 (also referred to as protected DAS partition) in which, in some embodiments, some or all of the device-assisted service agents and/or functions execute, and a modem execution partition 324 in which, for example, the modem program elements execute and, in some embodiments, some or all of the device-assisted service agents and/or functions execute. In some embodiments, each of these execution partitions is optimized for different software functions, each providing programs with the basic physical memory, data memory, CPU or APU or modem processor execution resources, high level and/or low level OS, memory management, file storage, I/O device resources (e.g., user interface (UI), peripherals, etc.), network communications stack, other device resources, and/or other resources that are required or used for operation of the programs. The collection of these hardware and software resources for the CPU or APU is sometimes referred to herein with the term host.

As shown, FIG. 74 illustrates an application execution partition 102 and a kernel execution partition 112, which are shown as separate partitions within the device execution environments. For example, this separation is based on the manner in which "kernel programs" (e.g., drivers and network stack, etc.) are commonly supported as compared to "application programs" (e.g., browsers, word processors, user interfaces, etc.) within the context of several different popular operating systems (OS) (e.g., Microsoft Windows, UNIX, Linux, Apple Mac OS, certain mobile device OSs, certain embedded device OSs, etc.). In some embodiments, this functional separation is not required, and, in some embodiments, other functional separations are supported.

As shown in FIG. 74, protected device-assisted service agents, such as the protected DAS partition device-assisted service agents 1041, execute in the protected DAS partition 114 while unprotected device-assisted service agents and/or OS networking stack elements and applications (e.g., applications 106A through 106C) execute outside of the secure device-assisted service execution partition 114, such as the application partition device-assisted service agents 104 and the OS networking stack and/or kernel partition device-assisted service agents 108. For example, the protected DAS partition 114 can make it more difficult for a hacker, malware or system errors to compromise, attack or modify the device-assisted service measurements, service policy implementation or service usage control operations on the device (e.g., communications device). In some embodiments, the protected DAS partition 114 need not support open access to all programs and OS elements so that it can be easier to protect. Also, as shown, a bus driver 116 in the application execution partition 102 provides for communication with a modem bus 2120, which is in communication with a bus driver 1242 in the modem execution partition 324. The protected DAS partition also includes a host service control link 151, which facilitates communication with a host secure channel 150 as shown.

In some embodiments, the protected DAS partition 114 is a protected execution partition on the main device that is supported by certain configurations in the host (e.g., a secure virtual execution environment or a separate hardware security function). For example, this protected execution partition can be used to provide added service measurement integrity and/or service control integrity for a device-assisted service enabled device. In some embodiments, as described herein, the operating system (OS) also performs a role in establishing the protected execution partition for secure operation of device-assisted services, and, in some embodiments, this role is performed by native software or firmware operating on secure hardware elements.

In some embodiments, the DAS agents responsible for maintaining service control integrity execute in the protected DAS partition 114. For example, the protected DAS partition device-assisted service agents 1041 can include one or more of the following: one or more service usage measurement functions; some or all of the device networking stack functions that are monitored and/or controlled by the device-assisted services system; device drivers that interface to an OS networking stack to observe or manipulate stack traffic; access control integrity functions; service policy control functions; service UI functions; application identification functions, and/or functions to classify service usage activities by combinations of application, address/URL and/or traffic type; modem bus driver functions; and/or modem data encryption functions to prevent other unauthorized programs from bypassing the device-assisted service measurements and/or controls by directly accessing the modem around the stack. In some embodiments, the system designer or a given set of design criteria determine which of the various described device-assisted agent functions should be executed in protected DAS partition 114 to strengthen the service control integrity for the system.

In some embodiments, the device operating system provides for the protected DAS partition 114 in addition to conventional security features available in the operating system. In some embodiments, the protected DAS partition 114 provides an execution partition with increased program execution protection in which, for example, service measurement and/or service control programs (agents) can execute in a mode that provides for higher access control integrity (e.g., proper service usage reporting and/or service measurement and/or service control system operation with increased protection from attacks, errors, malware, etc.). In some embodiments, a hardware assisted secure execution partition provides for increased program execution protection for device-assisted service agent functions.

In some embodiments, a service control link (e.g., host service control link 151 via host secure channel 150 to network service control link 152) is used for communication between the device-assisted service agents and a service controller 122. In some embodiments, the service control link is a secure link (e.g., an encrypted communications link). In some embodiments, an encrypted secure control link can be implemented over the higher layers of the network stack (e.g., TCP, HTTP, TLS, etc.), and, in some embodiments, the encrypted link can be implemented over lower layers in the network stack, such as the IP layer or the access network layers (e.g., the WWAN device management channels or signaling layers). In some embodiments, service control link security is provided at least in part by encrypting link traffic between the device and the service controller 122. In some embodiments, service control link security is provided at least in part by running the service control link device side program agents in the protected DAS partition 114. In some embodiments, service control link security is achieved at least in part by restricting access to the service control link to certain device-assisted service agents that are allowed to communicate with the service controller 122. In some embodiments, the agents that are allowed to communicate with the service control link perform such communications using encrypted communications. In some embodiments, the encrypted communications is accomplished with a secure inter-agent communication bus on the device. In some embodiments, the only mechanism for modifying the configuration of the operation, execution code, execution instructions and/or settings of certain device-assisted service processor agents executing in the protected DAS partition 114 is through the service control link. In some embodiments, the only mechanism for modifying any program elements executing inside the protected DAS partition 114 is through the service control link so that only the service controller 122 may modify the operation or service policy settings for the agents located in the service measurement and/or service control execution partition.

Various embodiments can be used to connect to multiple access networks through multiple modems, with each modem potentially being associated with a different set of DAS service policies corresponding to the different types of access networks supported. In some embodiments, such as for 3G/4G modems, WWAN/WLAN modems, and various other multiple modem embodiments, the multiple modems can also be provided on the same multi-mode modem subsystem rather than on different modem subsystems.

In some embodiments, the various techniques and embodiments described herein can be readily applied to intermediate networking devices as will now be apparent to one of ordinary skill in the art. For example, an intermediate networking device can include some or all of the DAS agents for managing, controlling, and/or measuring service usage for one or more devices in communication with a wireless network via the intermediate networking device, in which the DAS agents can be executed in secure execution environments or secure execution partitions using the various techniques described herein. In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femtocells, back up cards for wired access routers, and other forms/types of intermediate networking devices.

In some embodiments, systems and methods are provided for securing device-assisted services (DAS) systems and for detecting and mitigating fraud in such systems. In some embodiments, an end-user device comprises one or more modems to allow communications over a wireless access network, memory configured to store an application-specific network access policy to be applied when a particular application program attempts to communicate or successfully communicates over the wireless access network, and one or more device agents configured to detect attempted or successful activity by the particular application program and to apply the application-specific network access policy to the communication activity.

In some embodiments, the one or more device agents are configured to detect attempted or successful activity by the particular application program by flow-tagging a data flow associated with the particular application program, associating the flow tag with the application identifier, and applying the application-specific network access policy to the flow-tagged data flow.

In some embodiments, an end-user device comprises one or more modems to allow communications over a wireless access network, memory configured to store an application-specific network access policy to be applied when a particular application program attempts to communicate or successfully communicates over the wireless access network, and one or more device agents configured to use an application programming interface (API) to arrange an application setting to assist in implementing the application-specific network access policy.

In some embodiments, the application-specific network access policy comprises a control policy configured to assist in controlling transmissions or receptions over the wireless access network that are associated with the application program. In some embodiments, the application-specific network access policy comprises a charging policy configured to assist in accounting for transmissions or receptions over the wireless access network that are associated with the application program. In some embodiments, the end-user device has a user interface, and the application-specific network access policy comprises a notification policy configured to assist in presenting, through the user interface, a notification message, such as, for example: an offer or an advertisement, information about a network type (e.g., a home network, a roaming network, a cellular network, a wireless wide-area network (WWAN), a wireless local area network (WLAN), a wireless personal area network (WPAN), a 2G network, a 3G network, a 4G network, a WiMAX network, an Ethernet network, a DSL network, a DOCSIS network, a cable network, a Wi-Fi network, etc.), an indication of an amount or cost of data usage associated with the application program, an indication of a projected amount or a projected cost of data usage associated with the application program (e.g., a projection based on a past or historical data usage associated with the application program), an indication of an amount or cost of data usage associated with the application program during a particular period of time (possibly user-configured or user-selected), an indication that an amount or cost of data usage associated with the application satisfies a condition relative to a limit setting (e.g., exceeds a threshold, meets a threshold, is less than a threshold, etc.), an indication of an amount or cost of background data usage by the application program, etc. In some embodiments, the policy is associated with an application identifier (e.g., a credential associated with the application, possibly stored on the end-user device). In some embodiments, the application program is secured by an application credential (which may be the application identifier). In some embodiments, the one or more device agents are further configured to prevent modifications, updates, or replacements of the application program unless software purporting to be a modification, update, or replacement of the application program is associated with a credential that is consistent with (e.g., matches) the application credential.

Figure 111:
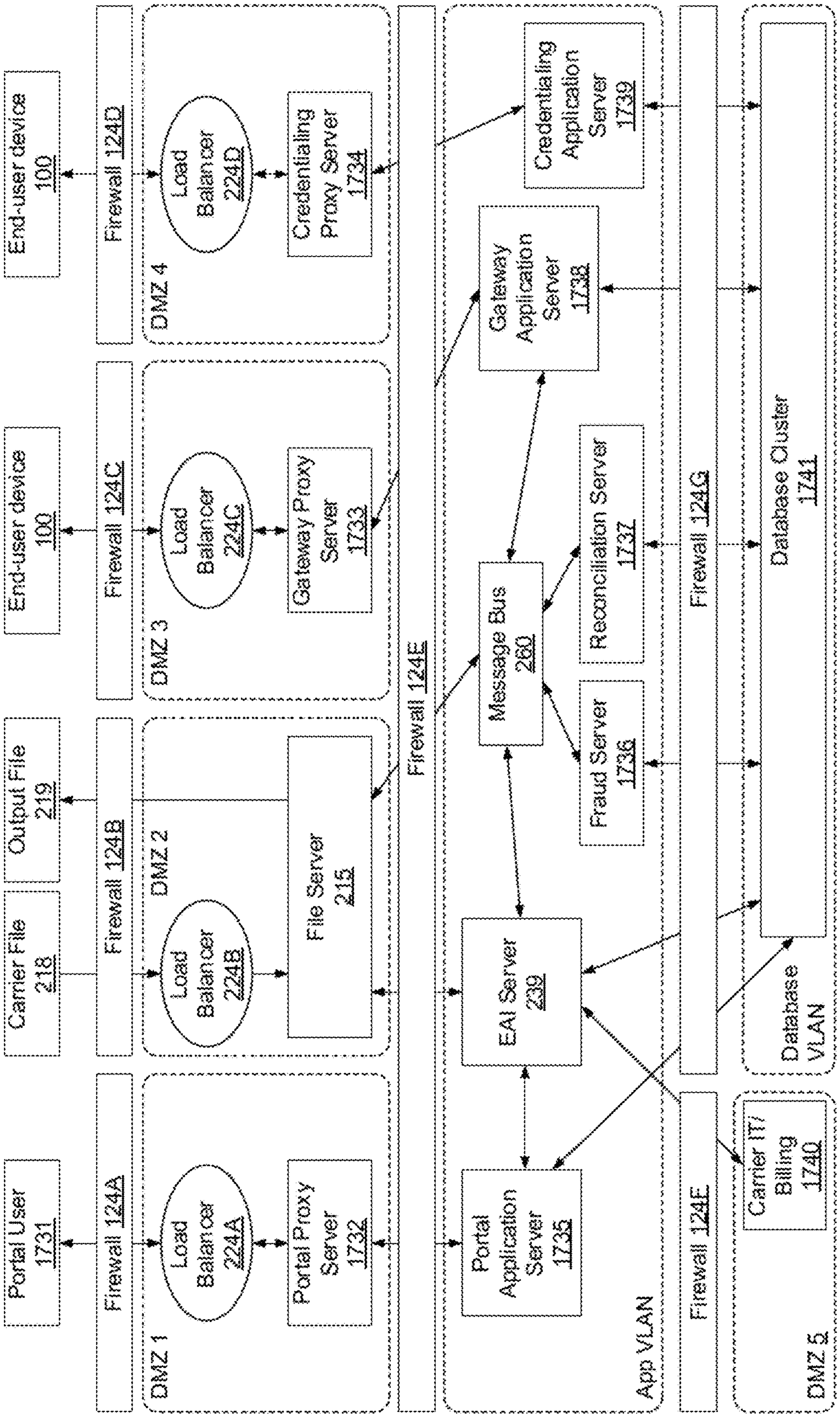
FIG. 111 illustrates an example embodiment of a secure service controller architecture for device-assisted services (DAS) systems.

The elements of service controller 122 described herein can be implemented in various advantageous architectural embodiments to assist in securing device-assisted services (DAS). FIG. 111 illustrates an example embodiment of a secure service controller architecture for DAS systems. FIG. 111 shows several of the functions that may be accomplished by a service controller (e.g., service controller 122) that communicates with one or more end-user devices over access network 10. In particular, FIG. 111 shows four service controller functions: a portal function, a file transfer function, a gateway function, and a credentialing function.

In the embodiment of FIG. 111, the portal function is accomplished by portal user 1731, optional load balancer 224A, optional portal proxy server 1732, portal application server 1735, and database cluster 1741. In some embodiments, the portal function allows a user (e.g., carrier personnel, mobile virtual network operator (MVNO) personnel, virtual service provider (VSP) personnel, etc.) to enter information to configure or manage access network services or end-user devices, such as by using a service design center or an application developer service design center UI. In some embodiments, the portal function allows a portal user to collect information about provisioned end-user devices (e.g., reports containing information about an end-user device's service plan activity, reports containing information about an end-user device's access network usage, etc.).

In some embodiments, the file transfer function allows secure file transfers between a carrier (e.g., a service provider, an MVNO, a VSP, etc.) and the service controller. As illustrated in FIG. 111, carrier file 218 is placed on file server 215 through optional load balancer 224B. EAI server 239 retrieves carrier file 218. In some embodiments, EAI server 239 processes carrier file 218. EAI server 239 configures output file 219. In some embodiments, EAI server 239 configures output file 219 using information in database cluster 1741. EAI server 239 places output file 219 on file server 215.

Figure 112:
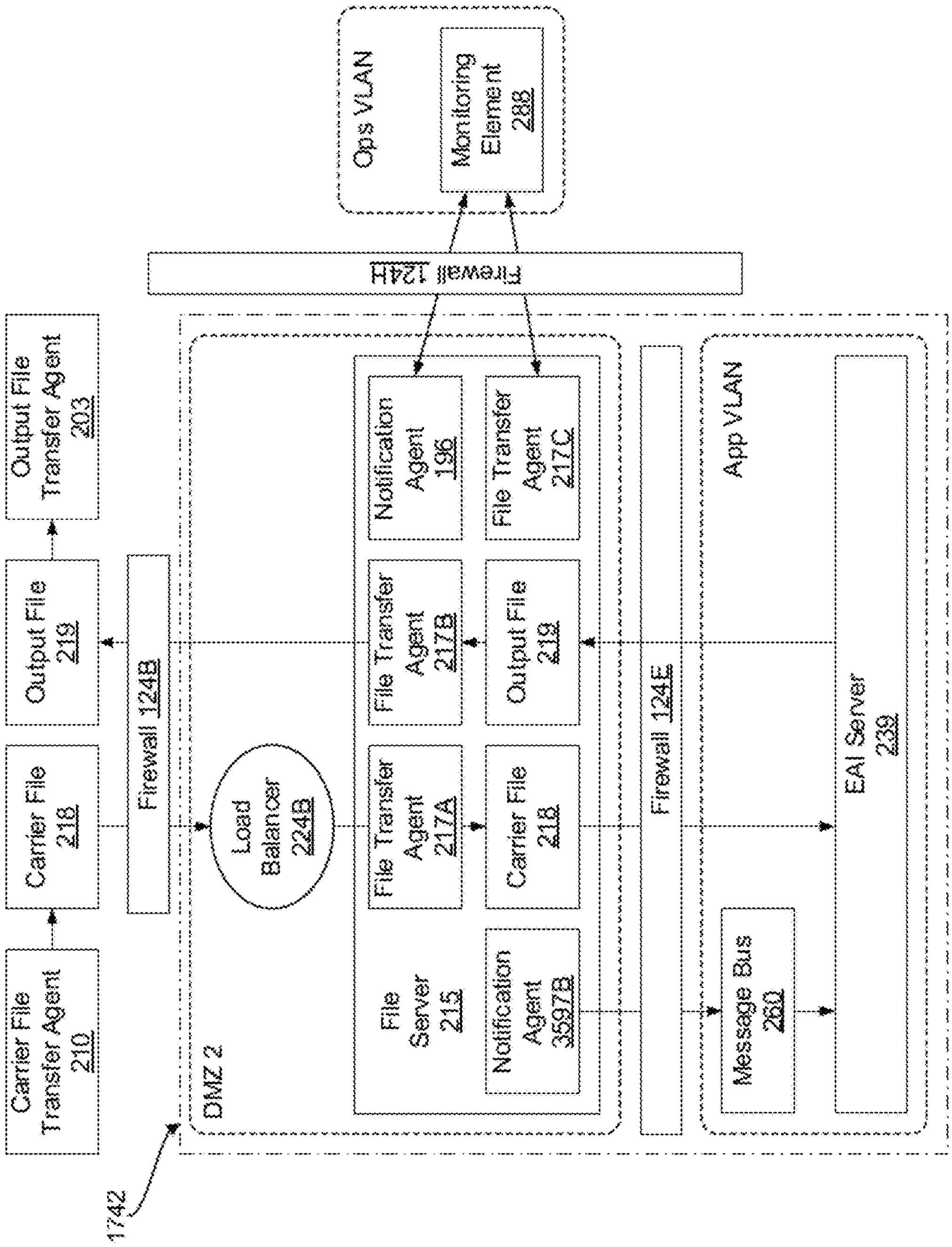
FIG. 112 illustrates an example embodiment of a service controller file transfer function.

FIG. 112 illustrates an example embodiment of the file transfer function. Carrier file transfer agent 210 establishes a connection with file transfer agent 217A on file server 215 through firewall 124B and optional load balancer 224B. The connection enables the transfer of carrier file 218 to file server 215. In some embodiments, carrier file transfer agent 210 establishes a VPN connection over the Internet to communicate with file transfer agent 217A.

Carrier file 218 can contain various information, such as, for example: a measure of an access network usage by end-user device 100; information to provision an access network service for one or more end-user devices, such as end-user device 100; a list of end-user devices or subscribers authorized to use a particular service.

In some embodiments, carrier file 218 comprises a subscriber list. A subscriber list includes one or more subscriber identifiers, where a subscriber identifier is associated with a particular end user. As will be appreciated by a person having ordinary skill in the art, a subscriber identifier may also be associated with a particular end-user device or with a group of end-user devices, or the subscriber identifier may not be associated with any particular end-user device. Examples of subscriber identifiers are: an IMSI, an MSID, a MDN, an MSISDN, an MEID, an ESN, an IPv4/6 MAC or IP address, a key, a certificate, a globally unique identifier (GUID), a unique identifier (UID).

In some embodiments, carrier file 218 includes one or more flow data records (FDRs). A flow data record contains detailed information related to one or more network communications (e.g., source IP, source port, destination IP, destination port, bytes transmitted, bytes received, time flow started, time flow ended, traffic protocol (e.g., TCP/UDP), etc.).

In some embodiments, carrier file 218 includes a plan catalog that includes information about service plans for the access network that are available to one or more end-user devices. Examples of the information that may be included in a plan catalog are: a list of service plans and their characteristics (e.g., notification, charging, and control policies associated with each plan, access network activities qualifying for each plan, etc.); the priorities of the service plans, where the priorities identify the order in which the classification function on the end-user device should evaluate the filters associated with the available service plans; how the service plans are displayed on end-user devices (e.g., the order in which they are displayed, etc.); whether access network costs associated with a plan are paid by a sponsor entity or by a subscriber; whether a plan is an activation plan (e.g., a service plan that governs a device when a subscriber has not selected a plan); promotional messages; upsell offers; subscriber groups; notifications for which no service plan applies.

In some embodiments, carrier file 218 includes a list of end-user devices or subscribers authorized to use a particular service (e.g., a tethering service for sharing an access network connection with other devices through other input/output ports on the end-user device).

In some embodiments, carrier file 218 includes one or more classification rules. A classification rule is any rule that distinguishes between any characteristics of service plans, subscribers, end-user devices, network destinations, or network types. For example, a classification rule may distinguish between sponsor-paid and subscriber-paid service plans, between applications or groups of applications, between groups of subscribers, between end-user devices using valid profiles and those using fraudulent profiles, between authorized network destinations and unauthorized destinations, between network access types (e.g., home, roaming, 2G, 3G, Wi-Fi, etc.), between time-of-day rules, etc.

It may be advantageous in some embodiments to validate particular agents on the end-user device that assist in the provisioning and/or management of device-assisted services. In some embodiments, end-user device 100 includes one or more verification agents that may be used to validate one or more device-assisted services agents. There are many possible device-assisted agents that may be verified, such as, for example: a usage reporting agent (e.g., an agent that reports aggregate or finer (e.g., per-service or classification) measures of access network usage by the end-user device), a usage counting agent (e.g., an agent that reports counts of access network usage by the end-user device), a policy enforcement agent, a notification agent, a policy decision agent, a network state agent, a kernel communication agent, a user interface agent, a persistence agent (e.g., an agent that reads or writes from a data store, such as a local memory), a plan catalog agent, a service controller communication agent, a tethering detection agent, a time-of-day agent (e.g., an agent that manages a policy based on time of day), a kernel agent, or an analytics agent.

Fraudulent or potentially fraudulent activity by end-user device 100 can be detected by examining trusted measures or records of data usage by end-user device 100. In some embodiments, a network element examines the content of usage reports from a trusted source to determine whether end-user device 100 is operating within the policies that should be in place. The usage reports may indicate a variety of information, including, for example, one or more of: a "bulk" measure of aggregate data usage, destinations accessed, network state (e.g., time of day, network busy state, network congestion state, etc.), type of network (e.g., 2G, 3G, 4G, WiFi, home, roaming, etc.), etc. In some embodiments, the trusted records contain information about end-user device 100's data use associated with a class of service activities, where the class is a particular application, a group of applications, a particular network destination, a group of network destinations, a network type, etc. For example, the trusted records may contain one or more of: record start time, record end time, information identifying the class, the amount of data use associated with the class, etc.

In some embodiments, service controller 122 examines the content of device-based usage reports (e.g., reports generated by service processor 115 and sent to service controller 122) to verify that service processor 115 is properly classifying services. In some embodiments, service controller 122 determines whether applications being used or destinations being accessed by end-user device 100 are authorized under a service plan associated with end-user device 100. In some embodiments, service controller 122 examines the content of device-based usage reports to determine whether end-user device 100 imposed a service control that was supposed to be in place (e.g., a cap on usage; a speed of usage (such as a maximum rate); an amount of usage of background or foreground data; state modifiers such as time-of-day, network busy state, network type (e.g., home, roaming, Wi-Fi, cellular, etc.); quality-of-service limits, etc.).

In some embodiments, service controller 122 compares a trusted (e.g., network-based, secure DDR, or third-party) measure of the device's service usage to a device-based (e.g., service-processor-based) measure of the device's service usage. In some embodiments, one or both of the trusted service usage measures and the device-based service usage measures include a classification of service usage based on application. In some embodiments, one or both of the service usage measures include a classification of service usage based on network destination or network service identifier. In some embodiments, one or both of the service usage measures include a classification of service usage based on network type (e.g., roaming, home, cellular, WiFi, etc.). In some embodiments, one or both of the service usage measures include a classification of service usage based on time of day. In some embodiments, one or both of the service usage measures include a classification of service usage based on QoS class. In some embodiments, one or both of the service usage measures include a classification of service usage based on geography. In some embodiments, one or both of the service usage measures include a classification of service usage based on a roaming network.

In some embodiments, the second usage records comprise information from flow data record. In some embodiments, the flow data record (FDR) reports a detailed level of service usage classification that indicates service usage broken down by network source or destination (e.g., domain, URL, IP address, etc.) and possibly one or more ports and protocols. In some embodiments, the FDR reports a detailed level of service usage classification that indicates usage broken down by device user application or OS application. In some embodiments, the FDR reports a detailed level of service usage classification that indicates service usage broken down by time of day, network congestion state or service QoS level. In some embodiments, the FDR reports a detailed level of service usage broken down by network type (e.g., 2G, 3G, 4G, WiFi, home, roaming, etc.). In some embodiments, the FDR reports a detailed level of service usage broken down by home or roaming network.

User Notification

According to various embodiments, systems and methods are provided for storing on an end user device one or more notification actions corresponding to one or more notification requests, the end user device being associated with a service plan having a limit on usage of one or more network services; performing a device action that reflects a past or intended use of the one or more network services; receiving by the end user device one of the one or more notification requests from a network element in response to the device action; performing by the end user device one of the one or more notification actions in response to the one of the one or more notification requests, the one of the one or more notification actions causing the end user device to retrieve at least a portion of a notification message associated with a status of the use, the at least a portion of the notification message being separate from the one of the one or more notification requests; and presenting the notification message on a user interface of the end user device, wherein the one of the one or more notification requests identifies the at least a portion of the notification message in a local notification store.

In some embodiments, the usage limit identifies when at least one of the one or more network services is no longer available, when a billing rate changes, when a service allocation is consumed, or when a service allocation is changed.

In some embodiments, the systems and methods are configured such that at least one of the one or more network services is classified as a first type before the usage limit has been reached, and the at least one of the one or more network services is classified as a second type after the usage limit has been reached.

In some embodiments, the device action is based on the service plan. In various embodiments the device action includes actions such as, for example, a device request by the end user device to access a new network service, exceeding a threshold usage amount of the one or more network services a roaming event, and a tethering request.

The end user device in various embodiments can be configured as an intermediate device, and the device action reflects past or intended use by one or more other end user devices in communication with the one or more network services via the intermediate device.

Figure 75:
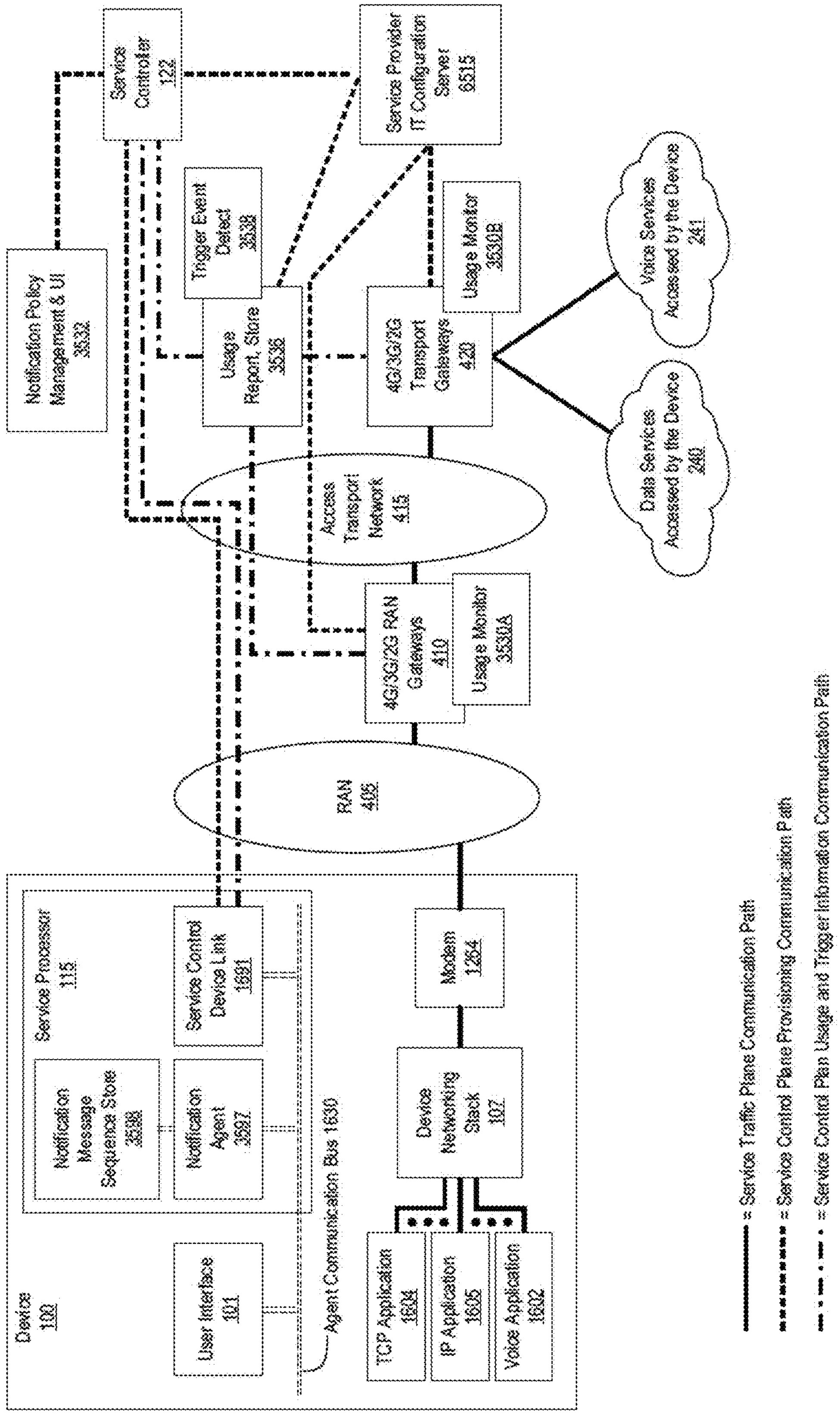
FIG. 75 is a functional diagram illustrating a network architecture for user notifications for device-assisted services (DAS) in accordance with various embodiments of the systems and methods described herein.

FIG. 75 is a functional diagram illustrating an example network architecture for providing user notifications for device-assisted services (DAS) in accordance with some embodiments of the systems and methods described herein. This example embodiment illustrates a device 100; a Radio Access Network (RAN 405) and Access Transport Network (ATN 415) connected by 4G/3G/2G RAN Gateways 410; and Data Services Accessed By Device 240 and Voice Services Accessed By Device 241 connected with the network via 4G/3G/2G Transport Gateways 420. Also shown are Usage Monitors 3530A, 3530B and a Usage Report Store 3536 with a Trigger Event Detect Module 3538.

In some embodiments, Transport Gateway 420 is a home agent, GGSN, PDSN, or another type of gateway or router configured to monitor and report traffic usage to enforce an access control policy that is defined for a given user device identified by a device credential or a user credential. In some embodiments, Transport Gateway 420 is a home agent, GGSN, a or another type of gateway or router that has deep packet inspection (DPI) capabilities to characterize or classify the network access for a given device, monitor and report usage, and enforce access control for a specific classification of network usage. Although Transport Gateway 420 is shown as a single element, in some embodiments Transport Gateway 420 can comprise multiple elements. For example, in some of the embodiments described herein, a network element that has DPI capability to classify traffic usage or attempted usage based on network traffic parameters (e.g., access to a specific website, domain, or application server network, etc.) is enhanced with a classification-specific notification trigger capability that might not be available in an existing GGSN or PDSN. In some such embodiments, the GGSN is augmented with a secondary DPI function that can be used to identify the classification-specific notification triggers. The secondary DPI function can also be used to identify traffic classifications for specific flows and enforce the access control policy, or monitoring and reporting policy, according to the policy rules for the specific classification. The secondary DPI function can also be used to identify traffic classifications for specific flows and then feed this information back to a policy control function (e.g., a PCRF) that then instructs the GGSN (or other gateway) to implement the correct policy for that flow. In some embodiments, device 100 is an end user device such as, for example, a client device for accessing network voice and data services. Examples of such an end user device include a mobile handset, a smart phone, a tablet, a PDA, a personal computing device or other like device that accesses one or more services. In the illustrated example, device 100 includes a service processor 115 in communication with user interface 101 via agent communication bus 1630. The device 100 in various embodiments can be configured as an intermediate device, and the device action reflects past or intended use by one or more other end user devices in communication with the one or more network services via the intermediate device.

In some embodiments, device 100 is in communication with the over the air network via modem 1264. Modem 1264 is in communication via RAN 405 through RAN gateways 410 and ATN 415 through 4G/3G/2G transport gateways 420 to access voice network services 241 and data network services 240. Voice network services 241 and data network services 240 provide various voice and data network services to device 100 via accessed networks such as cellular provider network(s) and/or the Internet as similarly described herein. As shown, modem 1264 is in communication with device networking stack 107 and TCP application 1604, IP application 1605, and voice application 1602, and/or various other applications as would be apparent to one of ordinary skill in the art. As shown, communications device 100, which includes service processor 115, is in network communication via RAN 405 through RAN gateways 410 and ATN 415 through 4G/3G/2G transport gateways 420 to access voice services accessed by the device 241 and data services accessed by the device 240.

As shown in this example, a two tier network embodiment is provided, including a radio access network (RAN 405) and access transport network (ATN 415). As those of ordinary skill in the art will appreciate, FIG. 75 depicts a simplified network functional architecture with a reduced number of network elements to illustrate various embodiments for providing user notifications for DAS.

For ease of description, only one client device 100 is shown, and only one access network (RAN) 405 and one transport network (ATN) 415 are shown. However, after reading this description, one of ordinary skill in the art will appreciate that multiple client devices can be serviced and that multiple network connections to a given device service processor managed by a service controller can also be used in view of the various embodiments described herein. These simplifications are made to facilitate description and aid understanding of the embodiments described herein, and it will be apparent to one of ordinary skill in the art that these and other simplifications herein do not in any way limit the various embodiments for multi-tier networks, multi-technology networks with additional network elements, for additional functionality, or for providing a different architecture and/or allocation of network element functionality.

RAN Gateways 410 conduct and control traffic between RAN 405 networks and ATN 415 networks. In some embodiments, network element 4G/3G/2G transport gateways 420 conduct and control traffic between the ATN 415, the carrier core network, and outside networks voice services accessed by the device 241 and data services accessed by the device 240. As shown, there are two instantiations of a service monitor function, usage monitor 3530A and usage monitor 3530B. One instantiation of service usage monitor elements 3530A, 3530B is shown on each of the two gateway network elements 4G/3G/2G RAN gateways 410 and 4G/3G/2G transport gateways 420. Particularly, transport gateways 420, shown as usage monitor 3530B, and RAN gateways 410, shown as usage monitor 3530A. In some embodiments, the function of the service monitor function 3530A, 3530B is to monitor service usage for the client device(s) 100.

In some embodiments, service usage is monitored at a bulk or aggregate level. In some embodiments, service usage may be monitored at a deeper level such as the various embodiments described herein for service activity usage classification. As shown, the service usage monitor elements 3530A, 3530B in this example are located in their respective 4G/3G/2G RAN gateway 410 and 4G/3G/2G transport gateway 420 but as described herein in various other embodiments, the service monitor function can be included in only on one of the gateways 410, 420, such as service usage monitor 3530A and/or service usage monitor 3530B, on other network elements, and/or on the device 100 (e.g., located in the service processor 115 and/or in a secure execution environment on device 100, such as within modem 1264, a SIM, and/or a hardware/software partition of a processor of device 100).

In some embodiments, monitored service usage provided by the service usage monitor 3530A, 3530B function is classified into various service usage classifications or categories using various techniques as described herein. Such categories can include, for example, browsing, email, music streaming, social networking, video streaming, news, shopping, and/or various other service usage or application categories. In some embodiments, service usage is classified by type, classification, application, usage by destination, usage by time of day or network busy state (e.g., congestion), usage by roaming versus home network, and/or various other categories. In some embodiments, user notifications for DAS includes displaying the classified service usage categories to a user as part of service usage notification sequence that is triggered by user off of option button from a service usage notification message sequence triggered by a service usage trigger event detection criteria or off of the dashboard application.

Also included in the example embodiment of FIG. 75 is a usage report, store element 3536. As illustrated, in this example, usage report, store element 3536 receives usage information from service usage monitor elements 3530A, 3530B. The usage information received from service usage monitor elements 3530A, 3530B can include information regarding the usage of one or more individual services or service classes. For example, service usage monitor elements 3530A, 3530B may be configured to monitor usage parameters for a given service or service class, the parameters including amount of time used or accessed, bandwidth consumed, data volume consumed, data rates, peak and off-peak usage, data type, consumptions, and so on.

In some embodiments, service usage information is communicated from the service usage monitor elements 3530A, 3530B to the usage report, store network element 3536. For example, in the example illustrated in FIG. 75, the usage information is transmitted from service usage monitor elements 3530A, 3530B via their respective 4G/3G/2G RAN gateway 410 and 4G/3G/2G transport gateway 420 to usage report, store element 3536.

Usage report, store element 3536 receives and aggregates the usage information from one or more network elements that have a service monitoring function that contributes to a service usage measurement. For example, 4G/3G/2G RAN gateway 410 and 4G/3G/2G transport gateway 420 and their respective usage monitors 3530A, 3530B can be configured in some embodiments to send usage information to usage report, store element 3536.

In some embodiments, the trigger event detect 3538 function inspects the record of service usage and identifies when a specified event is met or detected. For example, event points can be thresholds or other established values that can be used to detect the occurrence of a reportable or trigger-able event. Event points can be pre-configured (e.g., pre-defined, pre-programmed, pre-stored, or provisioned) and can be defined based in some embodiments on service plan information. For example, where a service plan is defined based on certain limits for certain services, the trigger points can be set to those limits. As further example, consider an example service plan that provides the user with x MB for Exchange ActiveSync email; y MB for social networking access; and z MB for location services on a monthly basis. In such an example, points may be established to trigger, or identify the occurrence of the event, when the user has consumed his or her monthly quota for one or more of the services. In other words, the consumption of the quota for each service may trigger an event. In some embodiments, event points can be established to trigger when the quota is met, as a warning when the quota is being approached (e.g., when 85% of quota is met). In some embodiments, event points can be set to trigger upon the consumption of additional service blocks that may be purchased by the user.

Accordingly, in some embodiments, when trigger event detect 3538 function detects a reportable event, a notification message is triggered. This notification message can be sent to any of a number of network entities for appropriate handling and action. For example, the notification event can be sent to device 100 to inform the user that the event has occurred. In terms of the examples described above, the event notification can be used to inform the user that he or she has used up the maximum amount of data allocated for one of the subscribed services, or that he or she is approaching the maximum amount for one or more of the subscribed services.

For example, various service usage notification trigger event detection criteria and associated notification message sequences can be implemented using various embodiments as described herein. As shown in the illustrated example, the trigger event detect 3538 function is located in the usage report, store 3536 network element, but in other embodiments described herein the trigger event detect 3538 function can be located in other network elements or in the device.

As described immediately above, in some embodiments the notification message may be sent to device 100 for subsequent action. For example, the notification message may trigger a user alert to inform the user of the event occurrence. As a further example, the notification message may trigger an alert to the user informing the user that he or she has used up all of his or her allocated minutes or bandwidth for a particular service or class of services.

In some embodiments, upon such notification, the service for which the allocation has been consumed will be terminated until the next billing cycle or until such other time as the service allocation is renewed. In other embodiments, the notification message may trigger a message allowing the user to acknowledge, respond and purchase, renew or otherwise add additional minutes or additional data volume to the depleted service, or allowing the user to enter a pay-as-you-go mode. In still other embodiments, the renewal or reallocation may be automatic, and the message used to inform the user of the renewal and optionally of the additional charges, if applicable.

As another example, the notification message may be a preemptory message, allowing notification of the user that he or she is approaching the maximum allocation for a particular network service. This can be done so as to allow the user to react in advance of service cutoff. For example, the user may decide to conserve the allocation for important transactions. Additionally, the user may be given the option to purchase, renew or otherwise add additional allocations in advance of the actual depletion event to avoid interruption of service.

In some embodiments, the notification includes sufficient details to enable the user to determine the actual service or the service class for which the maximum allocation is being reached. The notification may also include details or links to additional information such as detailed information about the service, the prior service usage history, alternative services available, and the like.

In the illustrated example, service processor 115 includes a service control device link 1691, a notification agent 3597 and a notification sequence message store 3598. These elements are used for creating, compiling, initiating or managing the communication of the notification and notification sequences for device 100. User Interface (U1) 101 is provided to allow display of the notifications to the user and to accept user input as described more fully below.

Service control device link 1691 is the element that performs the communication interface between device 100 and the network components. Service control device link 1691 may include communications capability to receive data from or transmit data to network elements such as, for example, service controller 122. Service control device link 1691 may also include communication capabilities to communicate with other device agents via, for example, agent communication bus 1630. In some embodiments, service control device link 1691 may also communicate with network elements such as service controller 122 via modem 1264.

Notification agent 3597 initiates user notifications in response to information received from service control device link 1691. Notification messages, including individual messages and message sequences can be stored locally on device 100, or they can be stored on the network (such as, for example, at service controller 122) and communicated to the device upon a notification event. In the illustrated example, notification message sequence store 3598 is used to locally store notification messages for communication to the user via user interface 101. Upon a notification event, notification agent 3597 retrieves the appropriate message (which can include a sequence of messages) from notification message sequence store 3598. In the illustrated example, the notification agent 3597 is in communication with other device agents, the UI 101 and the service control device link 1691 via the agent communication bus 1630.

In some embodiments, an appropriate message is selected based on the type of notification event received. Event specific message sequences tailored to each event can be stored in notification message sequence store 3598. The message sequence can be a single message or a series of messages for the event. Thus, for example, if the notification event is an event indicating that the user has consumed his or her allocation for voice services, the notification event specifies the event type and the message or messages to notify the user about this particular occurrence are retrieved.

In some embodiments, programming the notification message sequence store 3598 includes either updating the notification message sequence information or updating the entire notification agent application (e.g., replacing that agent with a newly updated/updated version of that agent). In some embodiments, similarly update techniques can similarly be applied to various other elements described herein, such as the notification trigger event detection criteria, trigger index, trigger message, and so forth, as will now be apparent to one of ordinary skill in the art in view of the various embodiments described herein.

In some embodiments, user notifications for DAS includes providing a device notification agent 3597; in which the device maintains a service usage record that is classified into various service usage categories, in which a service usage category is based on a service activity type or an individual service activity; and the device also maintains a record of the service plan usage policies; a notification agent analyzes one or more service activity categories to determine the amount of a service usage allowance or service plan usage charge that is consumed by a category, in which the allowance is determined by one or more aspects of the overall service plan policies; and the amount of service plan allowance or usage charge that is due to the category is displayed to a device UI.

In some embodiments, service controller 122 uses notification agent 3597 notification message sequence information or other service processor 115 agent program information from notification policy management & UI 3532 (e.g., or other equivalent network element for notification message provisioning and management) to provision (e.g., program, pre-configure, or download instructions to) the various elements of the notification system.

In some embodiments, the service controller 122 is in secure communication with the service processor notification agent 3598 for providing user notifications for DAS as described herein with respect to various embodiments. In some embodiments, service provider IT/configuration server 6515 is in secure communication with service controller 122 for configuring the service controller 122. For example, service provider IT/configuration server 6515 can provide a service plan and/or service plan update, service policy, and/or service policy update, which can each include notifications for DAS based on service usage.

Service controller 122 is provided in this example to perform a desired level of coordination and control of the network elements associated with embodiments of the invention. Service controller 122 communicates with various network elements and the device service processor 115 to perform functions such as, for example, updating network elements with new or modified policies and removing deleted policies. In some embodiments, service controller 122 can also function as a control element to control the collection of information from network components, to provide network notification to device 100 based on information received, and to receive information from device 100.

For example, in some embodiments, service controller 122 collects information from usage report, store 3536 including usage data or other statistics relating to the usage or consumption of services by one or more devices 100 on the network. This can include, for example, data and information relating to the amount of time a service or service class has been used in a given time period, the amount of bandwidth used for data transfer for a given service or service class, or other service usage metrics. Service controller 122 may be configured to collect this information directly from the appropriate gateways 410, 420 or from usage report, store 3536.

Service controller 122 may be further configured to evaluate the usage information received from the network elements (e.g., gateways 410, 420, or usage report, store 3536) to determine where a given user or device stands with respect to consumptions of its allocations of one or more network services, and to determine whether a notification should be sent to the one or more devices 100 concerning usage of service allocations in accordance with a service policy. Accordingly, as illustrated in the example of FIG. 75, service controller 122 is illustrated as having a communication link via access transport network 415 and radio access network 405 to device 100. It is via these communication links that service controller 122 can provide notifications or other information to the device 100. As will be apparent to one of ordinary skill in the art after reading this description, the dedicated links between service controller 122 and service processor 115 can be provided through alternative means such as, for example, an alternative communication link. For example, instead of providing access through RAN 405, such as communication link could be provided through a Wi-Fi link on the device via the Internet to service controller 122.

In some embodiments, service controller 122 can be used to send programming notification policies and to initiate notification message sequences as described herein.

In addition to providing notifications to devices 100 relating to service allocations and usage, in some embodiments, service controller 122 functions as a programming agent to configure the device service processor 115 and the agents therein. For example, in some embodiments, service controller 122 receives new policies or policy updates or changes from notification policy management and user interface 3532. Service controller 122 may store the policy locally so that policy can be used to determine whether information from usage monitors 3530A, 3530B indicates that a notification should be generated and sent to a device 100 operating under that policy. Service controller 122 may also be configured to communicate that policy to device 100 such as, for example, via service control device link 1691. Accordingly, service controller 122 can be configured to populate a device 100 with one or more policies or policy updates or changes, and can also be configured to remove policies from device 100 as appropriate.

Service controller 122 is also in communication with service provider IT configuration server 6515, which is in communication with the two gateway network elements 4G/3G/2G transport gateways 420 and RAN gateways 410 and other network elements. In some embodiments, service controller 122 facilitates configuring or programming the trigger event detect 3538 function with the service usage notification trigger event detection criteria that is used to trigger a notification message sequence to be sent to the device UI (e.g., device end user UI).

In some embodiments, the notification policy management & UI 3532 (e.g., or other equivalent network element for notification message provisioning and management) is used to provision notification policies and messages. Notification policies and associated messages can be created using notification policy management & UI 3532 and provided to appropriate network devices such as service controller 122 and device 100. notification policy management & UI 3532 provisions (e.g., program, pre-configures, downloads instructions to) the notification agent 3597 and/or the notification message sequence store 3598 to provide notification event and message sequence information.

For example, policies can be created along with their associated notification events and their respective notification messages for use with the systems and methods described herein. Policy events and messages can be pushed or otherwise delivered to device 100 for operation. Likewise, updates such as new policies, policy deletions or policy changes can also be created and communicated to device 100. As illustrated in FIG. 75, this information is provided to device 100 by way of service controller 122. This information could also be provided more directly to the device 100 such as, for example, via ATN 415 and RAN 405.

In some embodiments, the notification policy management & UI 3532 provisions (e.g., programs, pre-configures, or downloads instructions to) the trigger event detect 3538 element (e.g., or trigger event detect 3538 element) to create, update, modify or remove a notification trigger detection criteria. For example, new trigger events can be provided for newly created or modified policies. The trigger information can include trigger values and the associated notification trigger index or notification trigger index message as described herein. The notification trigger index may be a numeric index, an alphanumeric string, a pointer, a GUID, or any other mechanism that identifies the at least a portion of the notification message. In some embodiments, the notification policy management & UI 3532 provisions (e.g., programs, pre-configures, or downloads instructions to) the usage monitor 3530A element and/or usage monitor 3530B element. For example, new service monitor functions can be added identifying services and usages (e.g., minutes, data volumes, etc.) to be monitored to provide information useful for monitoring performance relative to allocations for new or updated service policies.

In some embodiments, provisioning of the network apparatus or device apparatus used to create a service policy using the above notification system embodiments is provided by a service notification system provisioning element, referred to as the notification policy management & UI 3532. In some embodiments, the notification policy management & UI 3532 programs the network service usage monitoring element with the notification trigger event detection criteria. In some embodiments, the notification policy management & UI 3532 programs the network service usage monitoring element with the association between the notification trigger event detection criteria and the notification trigger index or notification trigger message. For example, the programming protocols and programming messages for the service usage monitoring element can be complex and non-intuitive, which can complicate or slow the process of implementing the service usage monitoring element commands, configuration or programming to properly implement a higher level definition of service policy. Accordingly, in some embodiments, notification policy management & UI 3532 element includes a UI that allows an operator to define the notification trigger event detection criteria as higher level service usage trigger event detection criteria, service usage events or service usage patterns. The notification policy management & UI 3532 element may be further configured to convert these higher level definitions for the notification trigger event detection criteria into the appropriate lower level programming messages, instructions, commands or configurations that are recognized by or required by the service usage monitoring element and that implement the intention of the higher level service usage trigger event detection criteria (e.g., higher level trigger event detection criteria, such as application based service usage limits, and lower level trigger event detection criteria, such as bulk service usage limits).

In some embodiments, notification policy management & UI 3532 element includes a UI that allows an operator to define the association between the higher level service usage trigger event detection criteria and the intended corresponding notification trigger index or notification trigger message. Notification policy management & UI 3532 element may further include the intended association between the higher level service usage trigger event detection criteria and the intended corresponding notification trigger index or notification trigger message in the lower level programming of the service usage monitoring element. To further simplify the correct programming of the service usage monitoring element to properly implement service usage notification policy, in some embodiments, the notification policy management & UI 3532 provides a mechanism for a network administrator to simultaneously define the notification triggers as higher level service usage conditions, and to define the association between the notification trigger event detection criteria and the intended corresponding notification trigger index or notification trigger message.

Similar to the difficulties of transforming higher level service usage notification policies into the required programming and provisioning of the network service usage monitoring element, the process of pre-configuring, programming or pre-loading the local device storage of service usage notification message sequences can be complex, time consuming, and prone to error. An operator responsible for creating the proper notification policy definition and enforcement for the device and the network can benefit from a higher level UI tools to manage design of message sequences, associating of message sequences to the corresponding notification trigger event detection criteria and distribution of the correct pre-stored notification message sequence information to devices in a manner that properly associates the pre-stored notification message sequence information with the proper notification trigger index or notification trigger message to be received from the network. Accordingly, in some embodiments, the notification policy management & UI 3532 element programs a local device notification agent storage system with one or more pre-determined notification message sequences that are stored locally on the device, and to associate the notification sequences with a notification trigger index or notification trigger message to be received from the network.

In some embodiments, notification policy management & UI 3532 element is included in the notification system, in which the UI accepts carrier network administrator inputs to define, design, specify or provide a reference to the following notification information: (i) the desired notification trigger event detection criteria, (ii) the notification trigger index or trigger message associated with the notification trigger event detection criteria, (iii) the notification message sequence that is to be associated with the notification trigger event detection criteria; and this notification information defined, designed, specified, or referenced by the administrator UI is passed to the service notification provisioning apparatus, which then (iv) programs the programmable notification trigger event detect element 3538 (e.g., which in the various embodiments described herein can be programmed within network elements or within device agents) with the notification trigger event detection criteria and trigger index or trigger message (e.g., which is the message sent by the notification trigger event detect element 3538 to indicate that the specific notification trigger event has occurred), (v) if required programs the routing of the trigger index or trigger message to the device notification agent 3597, (vi) programs the notification message sequence store 3598, and, in some embodiments, the device notification agent 3597, with (a) an ordered list of notification message sequence actions (e.g., the sequence of actions to display any required notification message sequence information stored on the device and/or actions to display any notification message sequence information obtained from network elements), and (b) any required notification message sequence information that is stored locally on the device to initiate and complete the desired notification message sequence when the trigger index or trigger message is received.

In some embodiments, the notification policy management & UI 3532 pre-configures the device notification agent to maintain a local device storage (e.g., in various embodiments one or more of notification message sequence store 3598 and notification agent 3597) of one or more pre-determined sets of notification sequence information, each set defining at least a portion of the information required to generate a UI notification message sequence; the local storage of notification sequence information is organized so that a specific desired set of notification sequence information is determined by a notification trigger index or notification trigger message; the notification agent receives the notification trigger index or notification trigger message from a notification trigger detection element; and the notification agent creates a complete notification message sequence by performing one or more of the following operations: (a) initiate (e.g., generate, assemble, execute, or manage), a device notification message sequence by using the notification trigger index to look up a pre-stored set of message sequence information (e.g., after adding additional information or additional formatting, such as adding a UI background bitmap that is common to multiple notification message sequences); (b) initiate a device notification message sequence by using the notification trigger message to look up a pre-stored set of message sequence information (e.g., notification information, UI bitmap, and/or UI formatting) and combining the pre-stored information with information included in the notification trigger message (e.g., usage count update, service plan usage condition or status, and/or specific service usage activity information) to form a complete notification message sequence; (c) initiate a device notification message sequence by using the notification trigger index or trigger message information as a reference to initiate a notification message sequence based on information stored on a network element (e.g., pull down a particular set of message sequence information from a server or initiate/redirect a user to a particular portal or website message sequence, such as a series of web pages with options); or (d) perform a combination of two or more of the above operations; and the device notification agent communicates with a device UI to provide the notification message sequence to the device user.

To further simplify the task of programming user notifications for DAS as described herein, it is advantageous for a network administrator to be able to simultaneously configure the network service usage notification policies in coordination with the device service usage notification policies. Accordingly, in some embodiments, a notification policy management & UI 3532 element is included to provide a network administrator with a UI to simultaneously define higher level definitions and coordinated policy distribution through network element configuration and the device notification agent configuration, with the network and device configuration capabilities including one or more of the following network configurations: higher level definition of trigger event detection criteria, association of trigger event detection criteria with trigger index or trigger message, higher level definition of trigger message content; and various device notification agent configurations (e.g., higher level definition of notification message sequence information, trigger event detection criteria programming in monitor, association of trigger event detection criteria with trigger index or trigger message). In some embodiments, the notification policy management & UI 3532 provides a mechanism for a network administrator to simultaneously define the notification triggers as higher level service usage conditions, and to define the association between the notification trigger event detection criteria and the intended corresponding notification trigger index or notification trigger message and the corresponding notification message sequence on the device through a series of related UI screens that organize all of this required provisioning information into a convenient collection of related GUI information display and administrator input interfaces.

In some embodiments, the step of using the notification policy management & UI 3532 to pre-configure the device notification agent 3597 to maintain a local device storage of one or more pre-determined sets of notification sequence information includes one or more of the following: (a) Notification policy management & UI 3532 can provision (e.g., program, pre-configure, or download instructions to) the device notification agent with ordered text and/or graphics image information required in the notification message sequence and associate the information with a notification trigger index or notification trigger message, in which the information is configured and formatted such that a device service notification agent can access the information from device storage or in the notification agent software to initiate (e.g., generate, execute, assemble, or manage) and display a notification message sequence to the device UI. (b) Notification policy management & UI 3532 can provision the device notification agent to execute the ordered steps required to display the notification sequence that include accessing network based information display information or display sequences specified in the notification message sequence steps, and associate the network based notification message sequence information with a notification trigger index or notification trigger message, in which the information is configured and formatted such that a device service notification agent can access the information from the network sources to initiate and display a notification message sequence to the device UI. For example, one or more of the notification message sequence steps can include: initiate a UI sequence that has information downloaded form a network based UI display file or sequence of riles stored on a server, initiate a network based portal page or web view page or sequence of pages, or initiate a network based web site page or sequence of pages. (c) Notification policy management & UI 3532 can provision the notification index message triggered by the notification trigger detection element to include ordered text and/or graphics image information required in the notification message sequence, and can provision the device notification agent to incorporate the notification message sequence information included in the notification trigger index message, along with (i) other information stored locally on the device (e.g., message window graphics, UI interface formatting, other text and/or graphics information), and/or (ii) network based information display information or display sequences, into the ordered notification message sequence initiated by the notification agent for display of the notification message sequence to the device UI. (d) The notification sequence information downloaded from the notification policy management & UI 3532 can include any combination of steps a, b and c listed above. (e) Notification policy management & UI 3532 can update or download the notification agent software to specify a new notification message sequence that can be any combination of steps a, b and c listed above.

In some embodiments, the communication protocol for communication between the device 100 and the associated network elements (e.g., a service controller element 122, a service usage report, store element 3536 or another network element that performs similar functions) can comprise a number of communication protocols, including the protocol embodiments described herein or other protocols, such as TCP, SMS, SS7, and various other protocols as would be apparent to one of ordinary skill in the art. In some embodiments, push techniques, pull techniques, and/or various combinations thereof as described herein are used to provide user notifications for DAS as described herein with respect to various embodiments.

As further shown in FIG. 75, notification policy management and user interface 132 is in communication with the service controller 122, and as described above, in some embodiments, facilitates programming notification policies for the various network elements as described herein. In some embodiments, notification policy management and user interface 3532 is also connected to other network elements, such as the service provider IT configuration server 6515. In some embodiments, notification policy management and user interface 3532 provides a user interface for a carrier network notification policy administrator in which the various programmable settings required for the trigger event detect 3538 function, the notification agent 3597, and other network or device elements is organized for the notification policy administrator in a manner that facilitates more effective notification policy design, provisioning, and/or enforcement as described herein.

In some embodiments, service provider IT/configuration server 6515 provisions trigger event detect 3538 function network element, to trigger or events based on a policy provided by service controller 122. For example, service provider IT configuration server 6515 can be configured to provision trigger event detect 3538 to set the various detection criteria used by trigger event detect 3538 to trigger an event. In other words, service provider IT configuration server 6515 can be used to configure trigger event detect 3538 function to monitor usage is for one or more services for device 100 to detect when a service usage notification trigger detection criteria exists; to associate it with a notification trigger index or notification trigger message; and to communicate the notification trigger index or notification trigger message to the device. In some embodiments, trigger event detect 3536 and/or usage report, store 3536 can be configured to inform service control device link 1691 of the trigger event. Alternatively, as described above, in some embodiments trigger detection events are sent to service controller 122, and service controller 122 communicates the notification to service control device link 1691.

The trigger event in the illustrated example is sent to a notification agent 3597 via agent communication bus 1630. In some embodiments, the trigger event may include a specific index indicator, notification trigger index message, local device notification trigger index processing, and/or local off-line device display of user notifications for DAS as described herein.

Upon receipt of the trigger event, notification agent 3597 causes the appropriate notification to be provided to the user of device 100. For example, in embodiments where prescripted notifications are stored in a notification message sequence store 3598, notification agent 3597 retrieves the appropriate message from notification message sequence store 3598 and causes that message to be delivered to the user such as through user interface 101. For example, where the message is a textual string, the message can be displayed to the user on the user's display screen of device 100. As another example, where the message is an audiophile, the audio file can be delivered to the user via the device's 100 speaker. In various embodiments, the message may be comprised of a single message or may include multiple messages.

Also in various embodiments, the message may be configured to elicit a response from the user of device 100. For example, the user of device 100 may be given the option to purchase additional service allocations as part of the notification transaction. Accordingly, the message can include options that can be followed by the user to purchase such additional allocations, and menu selections or other prompts enabling the user to input information indicating whether a user wishes to purchase such additional allocations. The user response can be communicated via agent communication bus 1630 service control device Link 1691. Service control device link 1691 can afford this information to a network entity such as, for example, service controller 122. Continuing with this example, if the message from the user indicates that the user wishes to purchase additional allocations, service controller 122 can notify relevant network elements regarding the additional allocations.

For example, service controller 122 can notify usage report, store 3536 and/or trigger event detect 3538 to update the threshold for trigger bubbles so that the appropriate notifications can be provided based on the new allocation levels. Similarly, service controller 122 may be configured to provide this information to notification policy management and user interface 3532 such that the policy can be updated based on the new allocations. Still further, service controller 122 may be configured to notify service provider IT configuration server 6515 such that the user or device 100 account records can be updated. This can trigger the appropriate billing events and other administrative sequences as may be appropriate to accommodate the additional allocations purchased. In some embodiments, the additional allocations could be purchased on a one-time basis in which case, service controller 122 can be configured to ensure that only a one-time allocation is made, and that the appropriate network elements such as usage report, store 3536, trigger event detect 3538, notification policy management and user interface 3532, and other network elements are appropriately reset to previous levels on the additional allocations expires. For example, the user of device 100 may have only elected to increase the allocation for a current billing cycle (e.g. for the current month). In such a case, service controller 122 can be configured to reset the network elements to the previous allocation at the end of the current month or current billing cycle.

In some embodiments, if device 100 is associated with a service plan that is a family plan and/or other shared account plan (e.g., a corporate or other shared account plan), account aggregation may performed by an appropriate network element. For example, in some embodiments, usage count or other consumption metrics can be aggregated at a network element, so the actual aggregate usages permitted for a given allocation are tracked to enable detection of when the allocation is reached by the combination of users or devices, and to enable the detection in real-time or near-real-time of the consumption of usages by that combination of users or devices. This aggregation may be done in any of a number of network elements such as, for example, by usage report, store element 3536, trigger event detect 3538 function, or by service controller 122. Event notifications can be pushed to and/or pulled from service processor 115 at any or all of the devices 100 associated with the shared account plan.

In some embodiments, the devices 100 associated with a shared account plan can each be configured with the same or similar permissions and authority, and the system can also be configured such that each of the devices 100 associated with the shared account plan receive the same or similar notifications from the network. In further embodiments, different devices 100 associated with a shared account plan can be configured with different permissions or authorities, and may be provided with different notifications depending on the device 100 status. For example, one of the devices 100 associated with a shared account plan may be designated as a master device that can receive additional information as compared to the other devices 100 associated with that shared account plan. As a further example, the master device may also be configured such that it can take actions that the other devices 100 in the shared account plan are not able to perform. Examples of such actions can include purchasing additional allocations of services or service classes, modifying the policy or plan under which one or more of the devices 100 in the shared account plan operates, and terminating or altering the allocations of services or service classes granted to one or more of the devices 100 in the shared account plan.

In some embodiments, a device 100 designated as a master device in a shared account plan may also be given permission to view additional information pertaining to notifications, policies and usages that is not available to other devices 100 in the shared account plan. For example, the master device may be provided with additional information in a notification such that the master device can view the consumption of resources by one or more other devices 100 in the shared account plan. Additional information such as this made available to the user of master device 100 can allow the user to make informed decisions about purchasing additional allocations, modifying policies under which one or more devices operate, and even terminating or altering permissions of the one or more other devices 100 in the shared account plan to access one or more services or service classes.

As would be apparent to one of ordinary skill in the art after reading this description, other levels of hierarchy can be provided to permit two or more classes of users or devices 100 in a shared account plan. Permissions and authorities can be granted to the devices 100 in the shared account plan based on where each device resides in the hierarchy. As would be apparent to one of ordinary skill in the art after reading this description, a number of alternative architectures can be used to provide the features and functionality associated with the systems and methods described herein.

In some embodiments, a complete user notification message sequence is initiated by using a notification trigger index to look up a pre-stored set of message sequence information. The sequence can optionally be initiated with additional information or additional formatting added by the device, such as by the notification agent 3597. Examples of this include adding a UI background bitmap that is common to multiple notification message sequences, formatting the message for the intended user interface 101, combining the pre-stored information with information included in the notification trigger message (e.g., usage count update, service plan usage condition or status, specific service usage activity information, and/or other service usage/condition/event/other information). The addition of this information, where appropriate, forms a complete notification message sequence. For example, the notification trigger index can include various additional notification information to be included with a notification message. This can include, for example, information such as a warning message, a summary of the service usage that is outside of the service plan (e.g., usage count update, service plan usage condition or status), an offer to purchase additional allocations, and/or an offer for alternative service plan options. As will now be apparent to one of ordinary skill in the art in view of the various embodiments described herein, various user notification message sequences can be initiated by using the notification trigger index to look up a pre-stored set of message sequence information and optionally combining the pre-stored information with information included in or referenced by the notification trigger message.

In some embodiments, a complete user notification message is generated, initiated or managed using the notification trigger index or trigger message information as a reference based on information stored on or gathered from a network element. The trigger can be generated by a network element such as service controller 122, trigger event detect 3538, usage monitors 3530A, 3530B, or other network element. Alternatively, the trigger or threshold information can be maintained locally on device 100, and device 100 can generate the notification trigger index or trigger message information.

For example, a notification can be generated by pulling down a particular set of message sequence information from a server or initiating/redirecting a user to a particular portal or website message sequence, such as a series of web pages with options. As a further example, a local device stored notification message sequence managed by a notification agent can be instructed by a notification trigger index or notification trigger message to branch out and request or pull information from a network element such as a portal, website, and/or download server to add to the notification message.

In some embodiments, the amount of information included in the notification message sequence obtained from the network element is kept to a minimum or minimized to conserve network bandwidth and other resources, and to improve notification response speed. In some embodiments, notification messages do not include any additional information from the network. In still other embodiments, larger amounts of information to be included in the notifications are provided by the network elements. In still further embodiments, the entire notification message is provided by network elements, with no message content coming from a local store on device 100. In each of the above-described embodiments, the notification messages may be triggered by a local event or by a network event.

In some embodiments, the notification message sequence provides the user with one or more of the following notification information set types and/or action option types.

The message sequence may inform the user of a usage amount for bulk (e.g., open access) usage. This usage can be to-date cumulative usage for a billing-cycle, for device lifetime, or for any other defined period. This usage information can also show usage relative to a service plan limit, whether over or under. The message sequence may inform the user of a usage amount for a detailed service usage classification that is other than bulk. Historic usage data can also be tracked and maintained such that message sequences can inform the user of historic usage, including on a service-by-service basis and for a given time period.

The message sequence may inform the user of a usage activity that is either not allowed by the current service plan policy configuration or is traffic controlled under the current service plan policy configuration. The message sequence may inform the user of the reason that a service usage activity is either allowed, not allowed or is traffic controlled under the current service plan policy configuration.

The message sequence may inform the user of the reason that a service usage activity is either allowed, not allowed or is traffic controlled under the current service plan policy configuration including, for example, service policies that are dependent on classification of service usage activity, time of day, network congestion state, network type, roaming versus home network connection, QoS level or QoS availability.

The message sequence may inform the user of the service usage velocity or rate as compared to a service plan limit, and may further provide projections regarding whether usage at current rates will exceed or under-exceed plan limits, and if so, by how much. It may also provide the user with an indication of the relative fit for the service plan for a service usage velocity, rate or pattern.

The message sequence may inform the user of options to extend the service, buy additional allocations, swap under-utilized with over-utilized allocations, reallocate service allocations among users in shared account plans, change service plans or otherwise modify the current allocations. Likewise, the message sequence may inform when network access is being attempted but is not available, and provide the user with an option to select a service plan for an available network or provide the user with other options to modify current allocations.

The message sequence may detect service usage patterns and provide the user with a service plan option that is suited for the service usage pattern. The pattern detection and analysis can be for a current billing cycle, or based on historic data.

The message sequence may indicate when a service plan may be better suited for a given usage rate or service activity type as compared to the current service plan; and may accept user input on reconfiguring a service plan or changing a service plan. The message sequence may also accept user input on selecting an initial service plan.

The message sequence may inform a user of a device that belongs to a user group or device group usage plan (i.e., a shared access group) that a certain aggregate usage amount has been reached for the device group or user group or for one or more users in the group; inform a user of a device that belongs to a user group or device group usage plan that a specific set of service usage activities for a given device or user that belongs to the group service plan have occurred; and provide a group manager with the opportunity to extend the service, buy additional allocations, swap under-utilized with over-utilized allocations, reallocate service allocations among users in the group, change service plans or otherwise modify the current allocations.

The message sequence may accept user input to identify the service usage activities for notification message actions. The message sequence may inform the user regarding or prompt for information regarding various other notification information set types and/or action option types as will now be apparent to one of ordinary skill in the art in view of the various embodiments described herein.

In some embodiments, the notification message sequence provides the user with one or more of the following notification information sets and/or user action options. The message sequence may inform the user that a service usage amount or service usage level has been reached. The usage or level that triggers notification can be the maximum allocation for a given service or it can be an intermediate or threshold level that is less than a service plan service usage limit. This can include, for example, notifying the user when a certain percentage of the allocation has been reached. This can include, as another example, notifying the user when the usage rate is running at a rate higher than average or a rate that, if continued, will consume the allocation before the end of the allocation cycle. As yet another example, this can include notifying a user when one or more users in a shared user group are consuming the allocation at a rate that will consume the allocation before the end of the allocation cycle, or at a rate higher than the average rate for the other users, or otherwise exceeding a nominal consumption rate.

Notifying the user when an intermediate level is reached can allow the system to provide the user with advanced notification such that action can be taken, if desired, to alter the allocation or alter usage before the service is cut off. Accordingly, in some embodiments, the message sequence may further provide the user with options where an intermediate service usage amount or level that is reached and provide user with alternatives to modify service plan policy configuration, purchase additional allocations, or alternatives to change service plans or allocations.

In some embodiments, the message sequence may inform the user that a service usage amount or service usage level that is more than a service plan service usage limit has been reached. This message sequence can also inform the user of (i) an overage acknowledgement message, (ii) alternatives to modify service plan policy configuration, or (iii) alternatives to change service plan.

The message sequence may inform the user that a level of service usage rate has been reached. For example, such a message sequence can inform the user that service usage rate is relatively high or relatively low compared to a service plan usage rate limit. The message sequence may also provide user with (i) a high velocity acknowledgement message, (ii) alternatives to modify service plan policy configuration, or (iii) alternatives to change service plan; inform the user that a service usage activity is attempting to receive or has received service and is not supported by the current service usage plan policies.

The message sequence may inform the user that a service usage activity is attempting to receive or has received service and is not supported by the current service usage plan policies (e.g., associated service plan). This may be accomplished with (i) an acknowledgement message, (ii) alternatives to modify service plan policy configuration, or (iii) alternatives to change service plan; inform the user that a service usage activity that is not supported by the current service usage plan policies has been blocked.

The message sequence may inform the user that a service usage activity that is not supported by the current service usage plan policies has been blocked and may optionally provide user with (i) an acknowledgement message, (ii) alternatives to modify service plan policy configuration, or (iii) alternatives to change service plan in order to allow the service usage by the activity.

The message sequence may inform the user that an application or group of applications are attempting to use service or have reached a pre-determined level of service usage, and optionally provide the user with (i) an acknowledgement message, (ii) alternatives to modify service plan policy configuration, or (iii) alternatives to change service plan.

The message sequence may inform the user that an application or group of applications has been blocked, allowed or placed on traffic controlled access (e.g., throttled, backgrounded, provided with QoS) under the current service plan policies and also inform regarding deviations of such policies by the applications. The message sequence may provide information to the user explaining why the access has been blocked allowed or placed on traffic controlled access. The message sequence may also inform the user with (i) an acknowledgement message, (ii) alternatives to modify service plan policy configuration to over-ride the access controls, or (iii) alternatives to change service plan in order to allow the service usage by the activity.

The message sequence may inform the user that an application or group of applications are attempting to use service or have reached a pre-determined level of service usage or service usage rate. The message sequence may also inform the user that the application or group of applications typically exhibit usage behavior that is relatively high with respect to service plan limits. With regard to these notifications, the message sequence may also provide user with (i) an acknowledgement message, (ii) alternatives to modify service plan policy configuration, or (iii) alternatives to change service plan.

The message sequence may inform the user that a service usage activity is attempting to communicate with, is communicating with or has communicated with a specified network destination or group of specified destinations. The message sequence may also inform the user that a service usage activity is attempting to communicate with, is communicating with or has communicated with a specified network destination or group of specified destinations that have been blocked, allowed, or placed on traffic controlled access. In such embodiments, the message sequence may also provide information to the user explaining why the access has been blocked or placed on traffic controlled access. In such embodiments, the message sequence may also inform provide the user with (i) an acknowledgement message, (ii) alternatives to modify service plan policy configuration to over-ride the access controls, or (iii) alternatives to change service plan in order to allow the service usage by the activity.

The message sequence may inform the user that a service usage activity that communicates with a specified network destination or group of specified network destinations has reached a pre-determined level of service usage or service usage rate. In such embodiments, the message sequence may also inform the user that service usage activities communicating with the specified network destinations typically exhibit usage behavior that is relatively high with respect to service plan limits, or has reached a pre-determined level of service usage or service usage rate. In such embodiments, the message sequence may also inform the user with (i) an acknowledgement message, (ii) alternatives to modify service plan policy configuration, or (iii) alternatives to change service plan.

The message sequence may inform the user that a service usage activity is attempting to communicate with or has communicated with the network, and further inform the user that there is an alternative service plan or network that is better configured to support the activity. Examples of an alternative network can include a 2G, 3G, 4G or Wi-Fi network that is available to support the service activity. The message sequence may also inform the user that a service usage activity is attempting to communicate with or has communicated with the network, and further inform the user that an alternative network is available that is better able to support the activity, and under the current service usage plan policies the service usage activities have been blocked, allowed, or have been placed on traffic controlled access. In such embodiments, the message sequence may also inform the user with (i) an acknowledgement message, (ii) alternatives to modify service plan policy configuration, or (iii) alternatives to change service plan; inform the user that a service usage activity or group of services usage activities are attempting to use service or have used service during a specified time of day, during a time that the network is experiencing a specified level of congestion, or during a time that the network is experiencing a specified level of performance or availability.

The message sequence may inform the user that a service usage activity or group of services usage activities are attempting to use service, are using a service or have used service during or at a specified time. Such a specified time can be, for example, a time of day; a day or other time period in a given cycle; a time during which the network is experiencing a specified level of congestion; or a time during which the network is experiencing a specified level of performance or availability. Such a specified time can occur where, under the current service usage plan policies, the service usage activities have been blocked, allowed or have been placed on traffic controlled access. In such embodiments, the message sequence may also inform the user with (i) an acknowledgement message, (ii) alternatives to modify service plan policy configuration, or (iii) alternatives to change service plan.

The message sequence may inform the user that a service usage activity or group of services usage activities are using, attempting to use or have used a service involving connection to a roaming network, or have reached a specified level of service usage involving a connection to a roaming network. In such embodiments, the message sequence may also inform the user with information about the service usage charges, service access policies or service access performance of one or more of the networks.

The message sequence may inform the user that service usage is possible via one or more roaming networks, and provide the user with an option to connect to a roaming network. In such embodiments, the message sequence may also inform provide the user with (i) an option to accept the roaming option and/or roaming service charges, (ii) alternatives to modify service plan configuration, or (iii) alternatives to change the service plan, for example, to avoid roaming or to allow roaming.

The programmable device user notification agent system described herein offers flexible and comprehensive definitions for notification trigger event detection criteria and associated notification message sequence types and specific notification message sequences for wireless communication devices, such as mobile wireless devices. For example, using various embodiments described herein, a wide variety of notification trigger event detection criteria can be defined and provisioned, and a corresponding wide variety of associated notification message sequences (e.g., also referred to herein as notifications) can be defined and provisioned. In some embodiments, the user notification that is initiated by the notification trigger event (e.g., and subsequent receipt of the notification trigger index or notification trigger message) includes, one or more of the following: a notification that the monitored network service usage activity is out of policy based on the service policy; an option to modify one or more service policy settings of the communications device; a notification describing or offering user selection of a service plan change; a notification acknowledgement in which the user is required to acknowledge that a service usage notification has been received by the user; a notification acknowledgement of a service usage overage condition or service usage present or future cost condition; a notification describing or offering user selection of a service plan upgrade or temporary allowance for a service usage activity (e.g., application (such as a browser, email program or web view, mapping or directions application or web view, audio application or web view, voice application or web view, chat application or web view, streaming music or video application or web view, eReader, gaming application or web view, calendar application or web view, contacts application or web view, social network application or web view, or other application programs or web views), network destination (such as a web site or server address), content type (such as http, web links to audio or video, ads, file downloads, picture files, video files or streaming, audio files, or streaming), traffic type, service type (such as data, video, audio, or voice) carrier sponsored service, third party sponsored service, or user paid service).

In some embodiments, the user notification that is initiated by the notification trigger event (e.g., and subsequent receipt of the notification trigger index or notification trigger message) includes, one or more of the following: a notification describing or offering user selection of a service plan upgrade or temporary allowance for a service usage activity that is not covered or allowed with the current service plan policies; a notification describing or offering user selection of an upgrade to the current service plan (e.g., including possibly no current paid service plan), a downgrade to the current service plan or a modification to the current service plan; a notification describing or offering user selection of an upgrade to the current service plan (e.g., including possibly no current paid service plan), a downgrade to the current service plan or a modification to the current service plan based on a detected pattern of usage that indicates a more suitable service plan as compared to the current service plan is available.

In some embodiments, the user notification that is initiated by the notification trigger event (e.g., and subsequent receipt of the notification trigger index or notification trigger message) includes, one or more of the following: a notification indicating that a user service usage activity (e.g., a service usage activity initiated by a device user) is being limited based on background priority policies or QoS priority policies specified in the current service plan policy set (e.g., in which limited includes one or more of blocked, throttled, aggregated and held, delayed, or otherwise controlled or restricted); a notification that a given service activity is not allowed; a notification that one or more service usage activities are not available or are not allowed for the present service plan at the present time, or for the present active network, or for a roaming network, or for the present network busy state or congestion state, or for the present QoS availability; a notification that one or more service usage activities are not available or is not allowed for the present service plan at the present time, or for the present active network, or for a roaming network, or for the present network busy state or congestion state, or for the present QoS availability, and an associated offer to temporarily or permanently upgrade the service policy (e.g., service plan) capabilities to allow the one or more service usage activities; a notification that one or more service usage activities are available or are allowed for the present service plan at the present time, or for the present active network, or for a roaming network, or for the present network busy state or congestion state, or for the present QoS availability; a notification that one or more service usage activities are available or are allowed with a reduced access network performance (e.g., throttled, background service status, or certain level of QoS) for the present service plan at the present time, or for the present active network, or for a roaming network, or for the present network busy state or congestion state, or for the present QoS availability; a notification that one or more service usage activities are available or are allowed with a reduced access network performance for the present service plan at the present time, or for the present active network, or for a roaming network, or for the present network busy state or congestion state, or for the present QoS availability, and an associated offer to temporarily or permanently upgrade the service policy (e.g., service plan) capabilities to allow the one or more service usage activities with higher access network performance or full access network performance; a notification that one or more service usage activities are available or are allowed for the present service plan at the present time, or for the present active network, or for a roaming network, or for the present network busy state or congestion state, or for the present QoS availability, and the present service cost, price, rate of cost or rate of price for the one or more service usage activities.

In some embodiments, the user notification that is initiated by the notification trigger event (e.g., and subsequent receipt of the notification trigger index or notification trigger message) includes, one or more of the following: a notification that a service usage activity is not allowed on the current active network but is available on an alternative network; a special service offer to provide a discounted, free, limited service allowance or limited time offer to try one or more service usage activities; a notification indicating that a new service plan or new service usage activity is available for the device; a notification indicating that another network with enhanced or potentially enhanced service performance, service usage policy allowances, or service usage pricing is available; an indication of the amount of service used (e.g., bytes, minutes/time, number of usage events (such as a number of videos watched, number of web sites visited, number of URLs, number of songs, or number of transactions), percentage of service plan limit consumed, or cost of service consumed) by the device; an indication of the amount of service used by a user; an indication of the amount of service used by a device group; an indication of the amount of service used by a user group; an indication of the amount of service usage allowance remaining for a device, a service usage activity (e.g., an application, a network destination, or a service type) or a device group.

In some embodiments, the user notification that is initiated by the notification trigger event (e.g., and subsequent receipt of the notification trigger index or notification trigger message) includes, one or more of the following: a notification that a service usage activity may cause a service usage overage; a notification that a service usage activity may cause a service usage overage, with a user option to continue the activity or discontinue the activity; a notification that a service usage activity may cause a service usage overage, with a user option to continue the activity or discontinue the activity, and a user acknowledgement if the user elects to continue the activity; a notification of which service usage activities are contributing to, or contributing most significantly to, service usage; a notification of which service usage activities are contributing to, or contributing most significantly to, service usage, where the service usages are classified by application, network destination or service type; a notification of which service usage activities are contributing to, or contributing most significantly to, a potential service usage overage or a potential service usage overage; an indication of the amount of service used by a service usage activity on the device or by a group of service usage activities on the device; an overage notification of a service usage overage based on the service policy, in which the overage notification includes an indication that the service usage overage is being billed to a service account associated with the communications device or a user of the communications device; an indication of the amount of service used by a group of devices or users.

In some embodiments, the user notification that is initiated by the notification trigger event (e.g., and subsequent receipt of the notification trigger index or notification trigger message) includes, one or more of the following: an indication of the amount of service used by a service usage activity or group of service usage activities common to a group of devices or users; an indication of the amount of service usage consumed by a different device than the device the notification is displayed on; an indication of the amount of service usage consumed by a different device than the device the notification is displayed on where the different device is a member of the device group (e.g., family plan group or corporate group) that the notification display device also belongs to; an overage notification of a service usage overage based on the service policy, in which the overage notification includes an indication that the service usage overage is being billed to a multi-user service account associated with the communications device, in which the multi-user service account includes an enterprise account or a family plan account for a plurality of users; an overage notification of a service usage overage based on the service policy, in which the overage notification includes an indication that the service usage overage is being billed to a service account associated with the communications device or a user of the communications device, and in which the processor of the communications device is further configured to request an acknowledgement of the notification and report the acknowledgement to a network device; a notification to one device in a device group (e.g., a family plan or enterprise user plan) that provides usage breakdown for one or more other devices in the device group; a notification to one device in a device group that provides options to control or modify access policies, performance or limits for one or more service usage activities for the device group or for a subset of the devices in the device group.

In some embodiments, the user notification that is initiated by the notification trigger event (e.g., and subsequent receipt of the notification trigger index or notification trigger message) includes, one or more of the following: a notification that a service usage activity, service plan or service capability was added, updated, upgraded, or changed on the device; a notification that a service usage policy was changed on the device; a notification message providing a user offer to purchase a service plan or other transaction based on a programmable notification trigger event detection criteria (e.g., a pattern of one or more applications and/or network destinations being accessed by the user, an access to a particular network, or access to a network with a particular device geographic location).

In some embodiments, the user notification that is initiated by the notification trigger event (e.g., and subsequent receipt of the notification trigger index or notification trigger message) includes, one or more of the following: a notification message providing a user with the available roaming networks that can be automatically joined; a notification message providing a user with the available roaming networks and their associated usage fees; a notification message providing a user with the available roaming networks and their associated performance, service plan policies, or service policy allowances; a notification message providing a user with the estimated roaming service usage amount; a notification message providing a user with the estimated roaming service usage cost; a notification message providing a user with the estimated roaming service usage velocity or rate of cost accumulation; a notification message providing a user with the estimated roaming service usage amount or cost given current or historical usage behavior; a notification message warning a user that a service usage activity that has been selected may or will result in a high rate of roaming service usage or a high rate of service usage cost accumulation; a notification message warning a user that a roaming service usage activity has been initiated or attempted that has a typical or average service usage velocity or service cost accumulation that is higher than a user specified or a service design administrator specified roaming service usage velocity or cost accumulation limit; a notification message warning a user that a roaming service usage activity has been initiated or attempted that has a typical or average service usage velocity or service cost accumulation that is higher than a user specified or a service design administrator specified roaming service usage velocity or cost accumulation limit, and a user option to discontinue or continue the service usage activity; a notification message provided to one device user regarding the roaming usage behavior of another device or another device user; the aggregate roaming service usage for a device group or a user group.

In some embodiments, the user notification that is initiated by the notification trigger event (e.g., and subsequent receipt of the notification trigger index or notification trigger message) includes, one or more of the following: a notification informing a device user of the present service level that is selected or available but not selected for streaming audio or video services (e.g., available bit rates for audio or video, or audio or video resolutions); a notification message providing a device user with a list of typical, expected, average or actual service activity usage events or usage units that a service plan or service policy set usage limit will provide (e.g., typical number web page downloads or minutes/hours, number of social networking pages or minutes/hours, number of voice calls or minutes/hours at one or more audio quality levels or resolutions, number of video calls or minutes/hours at one or more video quality levels or resolutions, number of streaming audio clips or songs or minutes/hours at one or more audio quality levels, number of video clips or minutes/hours at one or more video quality levels or resolutions, number of email text messages or downloads, number of file downloads, number of games played or gaming minutes/hours, number of books downloaded, number of songs played or downloaded, number of news report or magazine deliveries or hours/minutes, number of web site page downloads or minutes/hours, or number of application usages or hours/minutes).

In some embodiments, the user notification that is initiated by the notification trigger event (e.g., and subsequent receipt of the notification trigger index or notification trigger message) includes, one or more of the following: a notification message providing a user with one or more of: network connection status, network connection throughput (e.g., bit rate and/or packet rate measured at the PPP layer, IP layer, or stream layer), network connection throughput variability, network connection bit error rate or packet error rate, network connection success vs. connection attempt (e.g., percentage of successes, or counts of attempts and successes), or another measure of network connection performance; a notification message requesting permission from the user to upload to the network, access network connection performance history information; a notification message sequence in which the user is provided with the result of an analysis of wireless connection performance, quality or status history information, possibly with recommendations on how to resolve an access service issue; a notification message providing a user with one or more of: network connection signal strength, network connection signal to noise ratio, raw modem bit rate, modem bit error rate, modem channel, base station or base station sector, network busy state or network congestion state, or another measure of wireless connection performance, wireless connection quality, or wireless connection status; a notification message requesting permission from the user to upload to the network, wireless connection performance, or quality or status history information; a notification message sequence in which the user is provided with the result of an analysis of wireless connection performance, quality or status history information, possibly with recommendations on how to resolve an access service issue.

In some embodiments, the processor of the communications device is further configured to: detect that multiple wireless networks are available for wireless communication for network service usage (e.g., 2G, 3G, 4G, Wi-Fi, and/or other types of wireless network access); and generate a user notification including multi-network service plan options (e.g., service plan options and/or differentiated notification policy settings for 2G, 3G, 4G, Wi-Fi, and/or other types of wireless network access).

In some embodiments, the processor of the communications device is further configured to: detect when the communications device is connected to a roaming network; and generate a roaming cost notification including roaming cost information for roaming service usage on the roaming network. In some embodiments, the processor of the communications device is further configured to: detect when the communications device enters and leaves a roaming network; and generate both roaming cost notification based on service usage on a roaming network as well as cost notification associated for when communication device uses services within network so that at all times the device user/owner is aware of the total cost where the cost is a function of the roaming network where the device is currently roaming. In some embodiments, the processor of the communications device is further configured to: generate a cost notification that includes a roaming cost notification including roaming cost information for roaming service usage on the roaming network and an in-network cost notification including in-network cost information for service usage on one or more networks that are in-network for a service plan associated with the communications device. In some embodiments, a communications device can roam across various networks in different international regions (e.g., CDMA, GSM, GPRS, EDGE, HSPA, and LTE roaming capabilities). In some embodiments, a roaming service usage measure is displayed while a communications device is in a roaming mode. In some embodiments, the roaming service usage measure indicates a data usage measure (e.g., the roaming service usage measure can display data usage in kilobytes (KBs), for example, an international meter/gauge, and the non-roaming/in plan service usage measure can display data usage in megabytes (MBs), for example, a domestic usage meter/gauge). In some embodiments, a pay for service usage measure is displayed along with a cost of service usage while a communications device is in a roaming mode that is in a pay for service roaming service mode (e.g., is not within a covered service plan under a roaming service plan). In some embodiments, a differentiated notification policy is provided, in which, for example, the user notification is adapted or customized to provide user notifications based on a service plan, service component, and/or service activity associated with the device. For example, different UI notification triggers and message sequences can be provided for different services. As another example, different gauges or meters can be provided for different services. In some embodiments, thresholds and alerts are different and/or can be configured differently for in plan, roaming, and/or pay for service network service usage. In some embodiments, a service usage measure is a hyperlinked widget that when selected by a user connects to a service plan options portal or web page or other application that allows a user to view the current service plan and select changes, options, and/or upgrades or new service plans.

In some embodiments, a service usage measure and a service plan are associated with a subscriber identity module (SIM), and the SIM can be swapped into another communications device (e.g., into another smart phone or other cellular phone and/or a USB dongle for cellular access via, for example, a laptop or net book) for network service usage under the service plan. In some embodiments, the network based service usage continues to be tracked and associated with the network service usage measure and service plan. In some embodiments, a usage measure (e.g., a usage measure can be based on device assisted service usage monitoring), a device assisted usage measure that is maintained (e.g., stored or cached) on a SIM card and the usage measure is used for updating, synchronizing, and/or initializing device service usage gauge or other UI notifications. In some embodiments, a device-based service-usage measure, a network-based service-usage measure, or a combination of both (e.g., a synchronized device/network based usage measure) updates a service usage measure stored on a SIM card. In some embodiments, the SIM card can be replaced with a variety of storage media (e.g., secured media or not secured) that can be moved from device to device. For example, when a user is using a first device, device service usage UI (e.g., a service usage gauge or meter) can be synchronized with an overall service usage measure storage source (e.g., a network element, a SIM, and/or another source). When the user then uses another device, the device service usage UI can first be initialized with the overall service usage storage measure, and the latest usage information can be stored on SIM card so that user can look it up. In some embodiments, SIM card storage is accessed from the network to update usage. In some embodiments, a service usage measure is obtained from the network (e.g., a network element/function, such as a service controller), and the service usage measure is then updated/stored on the SIM card in the device. In some embodiments, a service usage measure is obtained from a SIM card and communicated to the network (e.g., a network element/function, such as a service controller). In some embodiments, a device-based service-usage measure is stored on the SIM card in the device (e.g., the SIM card storage is accessed to load the current/latest usage and updated with the device based usage measure). In some embodiments, a UI program (e.g., that can be downloaded to the device in one or multiple versions for multiple types of OS and/or devices) downloads usage information and stores the usage information on the SIM card. In some embodiments, SIM service usage information storage is stored in a standardized format (e.g., across SIM cards/media, devices, device OS platforms, and/or carriers). In some embodiments, multiple types of usage information are stored on the SIM card (e.g., including multiple plans and/or multiple plans including with and without separated tethered plans, multiple networks and/or multiple networks including roaming networks, multiple devices, and/or multiple users, such as a family plan, an enterprise plan, or a group plan). In some embodiments, device group information is stored on the SIM card. In some embodiments, the service processor is stored on the SIM (e.g., SIM card) so that it can load into and run on multiple devices it is installed into. In some embodiments, the service processor is executed on the SIM so that it can run on multiple devices the SIM is installed into. In some embodiments, a portion of the service processor is executed on the SIM, and a portion of the service processor is stored on the SIM that is then loaded onto the device so that the service processor can run on multiple devices the SIM is installed into. In some embodiments, a service usage measure and a service plan are associated with a mobile directory number (MDN). In some embodiments, a service usage measure and a service plan are associated with a mobile directory number (MDN), and a user can change MDNs to get a new MDN, and the service usage measure and service plan can be associated with the new MDN.

In some embodiments, a monitored network service usage activity includes a tethered network service usage activity (e.g., network service usage activity via a tethered connection, such as tethering a laptop to a mobile/smart phone for cellular access over a 3G/4G or other cellular network in which the laptop is communicating to the mobile/smart phone through some wireless or wired communication link to access the mobile/smart phone's modem for cellular access), and the tethered network service usage activity counts towards a tethered network service usage count and associated with a tethered network service plan. In some embodiments, a user notification is based on the tethered network service usage count and the tethered network service plan. In some embodiments, tethered network service usage activity counts towards a user's service plan data allowance (e.g., tethered usage and non-tethered usage from the communications device will accrue service usage counts from the same data allowance of the service plan associated with the communications device and/or, for example, associated with the SIM inserted in the communications device).

Secure Device Data Records

In some embodiments, secure device data records (DDRs) are provided. In some embodiments, secure DDRs for device-assisted services are provided. In some embodiments, secure DDRs for device-assisted services are provided for service usage monitoring of a wireless communication device (e.g., firmware based monitoring of network service usage, such as based on a 5-tuple of a source address, port address, destination address, destination port, and protocol). In some embodiments, secure DDRs for device-assisted services are provided for service usage monitoring of a wireless connection and other input/output (I/O) connections or ports of a wireless communication device (e.g., firmware-based monitoring of network service usage, such as based on a 5-tuple of a source address, port address, destination address, destination port, and protocol). In some embodiments, a system for secure DDRs includes a processor of a wireless communication device for wireless communication with a wireless network, in which the processor is configured with a secure execution environment, and in which the secure execution environment is configured to: monitor service usage of the wireless communication device with the wireless network; and generate a plurality of device data records of the monitored service usage of the wireless communication device with the wireless network, in which each device data record is associated with a unique sequence order identifier; and a memory coupled to the processor and configured to provide the processor with instructions. In some embodiments, a system for secure DDRs includes a processor of a wireless communication device for wireless communication with a wireless network, in which the processor is configured with a secure execution environment, the secure execution environment configured to: monitor service usage of the wireless communication device with one or more of the networks and I/O connections for the device including but not limited to a wide area wireless network (e.g., 2G, 3G, 4G, etc.), a Wi-Fi network or connection, a USB network or connection, an Ethernet network or connection, a FireWire connection, a Bluetooth connection, a near field communication (NFC) connection or another I/O connection or port; and generate a plurality of device data records of the monitored service usage of the wireless communication device with the wireless network, in which each device data record is associated with a unique sequence order identifier; and a memory coupled to the processor and configured to provide the processor with instructions. In some embodiments, the secure execution environment including the secure DDR processor is located in an application processor, in a modem processor, and/or in a subscriber identity module (SIM).

In many of the disclosed embodiments, a secure device data record processing system acts on communications that flow over a wide area wireless network connection to the device (e.g., a 2G, 3G, or 4G connection) or a wide area wireless modem (e.g., a 2G, 3G, or 4G modem). As would be understood by one of ordinary skill in the art, the secure device data record processing system can also act on communications that flow over one or more additional I/O networks, connections, ports or modems (e.g., a Wi-Fi network, connection, port, or modem; a USB network, connection, port, or modem; an Ethernet network, connection, port, or modem; a FireWire network, connection, port, or modem; a Bluetooth network, connection, port, or modem; a near field communication (NFC) network, connection, port, or modem; or another I/O connection, port, or modem).

Advanced Wireless Service Platform (AWSP)

In some embodiments, an Advanced Wireless Service Platform (AWSP) is provided. In some embodiments, AWSP provides an enhanced networking technology platform that supports existing services and also provides for various new Internet and data service capabilities for wireless networks (e.g., 4G, 3G, and/or 2G networks), as described herein with respect to various embodiments. In some embodiments, wireless devices, processor(s), firmware (e.g., DDR firmware, as described herein with respect to various embodiments), and software provide an enhanced role in wireless network service policies for charging, access control and service notification to implement AWSP, as described herein with respect to various embodiments.

In some embodiments, AWSP supports a wide range of services, devices, and applications for consumer, enterprise, and machine to machine markets, as described herein with respect to various embodiments. In some embodiments, AWSP supports various device types, including the following: 4G and 3G smart phones, 4G and 3G feature phones, 4G and 3G USB dongles and cards, 4G-to-Wi-Fi and 3G-to-Wi-Fi bridge devices, 4G and 3G notebook and netbook computing devices, 4G and 3G slate computing devices, 4G and 3G consumer electronics devices (e.g., cameras, personal navigation devices, music players, and home power meters), and machine to machine devices (e.g., various types of consumer and industrial devices with minimal user interface (UI) capabilities such as geo-location tracking devices, parking meters, and vending machines).

In some embodiments, AWSP includes a device data record (DDR) processor. In some embodiments, the DDR processor includes firmware that is integrated into a secure hardware execution environment within an AWSP compliant processor (e.g., a processor or set of processors that are compatible with, support, approved for and/or certified for AWSP, such as through a wireless carrier AWSP chipset certification program). In some embodiments, the AWSP compliant processor is certified to qualify the processor for proper services delivery over AWSP, as described herein with respect to various embodiments.

In some embodiments, the DDR processor is implemented within secure firmware embedded in either an applications processor unit (APU) or a modem processor unit (MPU). In some embodiments, the DDR processor is provided as part of the device firmware build installed by an OEM at time of manufacture. In some embodiments, the DDR processor monitors incoming and outgoing IP packets and gathers various statistics (e.g., Device Data Records (DDRs)). In some embodiments, a DDR is, in part, a record of the amount of data transmitted or service usage consumed along an IP flow. In some embodiments, an IP flow is specified by a source address, a destination address, a source port, a destination port, and a protocol type. In some embodiments, the secure device data record can also accompany the corresponding layer-7 classification information (e.g., domain names, application identifier, HTTP information, associative classification, and/or other information as described herein) with an IP flow (e.g., source address, port address, destination address, destination port, and protocol) received from the service processor. In some embodiments, DDRs also include other types of classification for network service usage, as described herein with respect to various embodiments. In some embodiments, DDRs also include various statistics related to or based on network service usage, as described herein with respect to various embodiments. In some embodiments, DDRs are used in 2G, 3G, and 4G wireless networks in both home and roaming network conditions for various service usage accounting, access control, and service policy enforcement verification functions, as described herein with respect to various embodiments.

Figure 113:
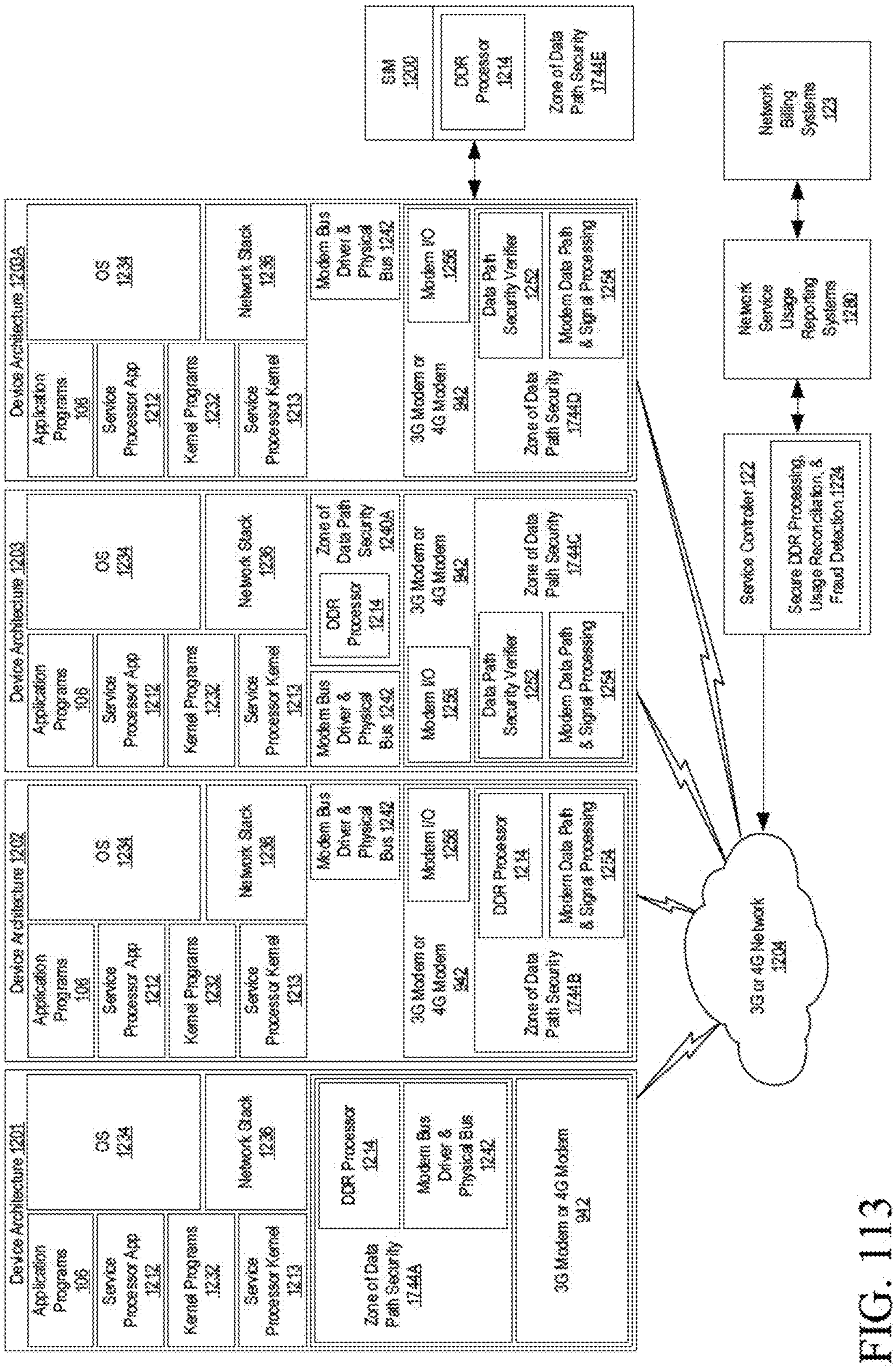
FIG. 113 illustrates a high level diagram of an advanced wireless service platform end-to-end device data record (DDR) reporting and processing system in accordance with some embodiments.

FIG. 113 illustrates a high level diagram of an advanced wireless service platform end-to-end DDR reporting and processing system in accordance with some embodiments. In FIG. 113, four DDR implementation options are shown for securely embedding a DDR processor (e.g., DDR processor firmware and/or functionality) into an APU chipset or an MPU chipset. Each of these three options is described at a high level below and in more detail in following sections.

In some embodiments, a wireless communication device includes a DDR processor 1214 in a secure execution environment. In some embodiments, the DDR processor 1214 includes a DDR generator function (e.g., a function for generating secure DDRs, which can be reported to another element/function in the device and/or to a network element/function, such as a service controller 122) as described herein with respect to various embodiments. Various architectures are provided for implementing the DDR processor in a secure execution environment.

Device architecture 1201 includes the DDR processor 1214 in a zone of data path security 1744A (e.g., located in an application/general processor unit (APU)) as shown. Application programs 106 are monitored (e.g., service usage based monitoring) using a service processor application program 1212. Kernel programs 1232 are monitored using a service processor kernel program 1213. An operating system (OS) 1234 resides above a network stack 136 for network access, which is monitored by the DDR processor 1214 for any network access through a modem bus driver and physical bus 1242. As shown, 3G or 4G wireless network access is provided through a 3G or 4G modem 942 to a 3G or 4G networks 1204, respectively. This device architecture and similar device architectures are described herein in more detail below.

Device architecture 1202 includes the DDR processor 1214 in a zone of data path security 1744B (e.g., located in a modem processor unit (MPU)) as shown. Device architecture 1202 is similar to device architecture 1201 except that in device architecture 1202 the zone of data path security 1744B is located in 3G or 4G modem 942. Network communication via the modem 942 through modem bus driver and physical bus 1242 and modem I/O 1256 is monitored using the DDR processor 1214 for any network access through a modem data path and signal processing 1254. This device architecture and similar device architectures are described herein in more detail below.

Device architecture 1203 includes the DDR processor 1214 in a zone of data path security 1240A (e.g., located in an APU or another processor/memory, such as a SIM card)) as shown. Device architecture 1203 is similar to device architecture 1201 except that in device architecture 1203 the APU's modem bus driver and physical bus does not need to be in a secure zone and instead a data path security verifier 1252 is included in the zone of data path security 1744C in the MPU to restrict network access to only traffic that has been monitored by the DDR processor 1214 within APU. This device architecture and similar device architectures are described herein in more detail below.

Device architecture 1203A includes the DDR processor 1214 in a zone of data path security 1744E (e.g., located SIM 1200) as shown. Device architecture 1203A is similar to device architectures 1201 and 1202, except that in device architecture 1203A, as in device architecture 1203, there are two zones of data path security. Zone of data path security 1744D is located in 3G or 4G modem 942, and zone of data path security 1744E is located on SIM 1200. In device architecture 1203A, modem bus driver and physical bus 1242 does not need to be in a secure zone, and instead data path security verifier 1252 is included in zone of data path security 1744D in the MPU to restrict network access to only traffic that has been monitored by the DDR processor 1214 within SIM 1200. This device architecture and similar device architectures are described herein in more detail below. Device architecture 1203A enables a carrier to have complete control of the DDR processor functionalities, because the SIM considered in the industry to be a "carrier-owned" entity on the device.

As would be appreciated by a person having ordinary skill in the art, DDR processor 1214 may be embedded in a secure zone of any other functional processor with a companion MPU to enforce network access. Such functional processors in which DDR processor 1214 may be embedded include, for example, video processors, audio processors, display processors, location (e.g., GPS) processors, and other special-purpose processors as well as general-purpose processors such as digital signal processors (DSPs), microprocessors, etc.

In some embodiments, a service controller 122 is provided as shown. In some embodiments, service controller 122 is provided as an AWSP network server cloud system. In some embodiments, service controller 122 is provided as an AWSP network server cloud system that is used to perform one or more of the following: collect device service usage reports; manage certain aspects of device based network service policy; ascertain the Network Busy State (NBS) for various base stations on the network (e.g., wireless network(s)); manage the user notification and service plan selection UI processes configured on the device(s) (e.g., wireless communication device(s)); and manage certain aspects of service fraud detection. In some embodiments, the service controller 122 includes a secure DDR processing, usage reconciliation, and fraud detection function 1224 as shown. In some embodiments, the service controller 122 communicates monitored service usage (e.g., reconciled service usage based on processed and reconciled secure DDRs) to network service usage reporting systems 1280. In some embodiments, the reported service usage is aggregated and communicated to network billing systems 123 (e.g., for billing for the reported service usage).

In some embodiments, the service controller 122 communicates with various device-based elements of the AWSP system. In some embodiments, the service controller 122 communicates with various device-based elements of the AWSP system, including the following: the DDR processor 1214 and a service processor 115. In some embodiments, the service processor 115 includes an application service processor 1212 (e.g., an application space or framework space program) and a kernel service processor 1213 (e.g., a kernel space or driver space program). In some embodiments, the application service processor 1212 and the kernel service processor 1213 execute or perform in an OS partition on an application processor unit (APU) of a device (e.g., a wireless communication device). In some embodiments, the service processor is not generally in a secure execution area.

In some embodiments, the service processor performs various functions for the carrier network including collecting Network Busy State (NBS) information, service usage classification and reporting, certain network service policy enforcement functions, and/or certain user notification functions and roaming access policy enforcement functions, as described herein with respect to various embodiments. In some embodiments, the service processor also logs and reports device service usage information that assists a carrier (e.g., a service provider for a wireless network service or other services) in determining how to provide users with optimized services, information, and/or content.

In some embodiments, the DDR processor 1214 communicates DDRs to the service controller 122. In some embodiments, the DDR processor 1214 communicates DDRs to the service controller 122 via the Internet, a carrier network, and/or other network. In some embodiments, the DDR processor 1214 does not send DDRs directly to the service controller 122, but instead the DDR processor 1214 forwards the DDRs to the service processor. The service processor then forwards or relays the DDRs to the service controller 122 and, in some embodiments, along with additional service usage reports and/or other service policy management and user notification communications generated by or received by the service processor.

For example, the APU OS execution environment is generally not considered secure or trusted even though the service processor can be protected by the OS and/or other security elements within the system. In addition, the network data path between the DDR processor 1214 to the service processor is generally not considered to be secure or trusted and neither is the data path between the service processor and the service controller 122. Accordingly, in some embodiments, the DDR processor 1214 and the service controller 122 use cryptographic techniques to provide a secure link from the DDR processor 1214 to the service controller 122. In some embodiments, the DDR processor 1214 is considered secure and trusted based on various implementations and techniques as described herein with respect to various embodiments. In some embodiments, various techniques for securing the service usage monitoring and control performed by the DDR processor 1214 on a network data path, and securing the DDR reporting channel from the DDR processor 1214 to the service controller 122 are described herein with respect to various embodiments.

In some embodiments, a secure access controller function within the DDR processor 1214 is employed as described below to ensure that if the DDR flow is tampered with or blocked, then the device network access data path connection managed by the DDR processor 1214 is restricted to only those network destinations required to manage the DDR processor 1214 communication with the service controller 122. In some embodiments, the access controller function within the DDR processor 1214 receives feedback from the service controller 122 to restrict access or allow full access. For example, the restricted access list (e.g., a list of host names, IP addresses, and/or other identifiers for an access list) can either be pre-provisioned within the DDR processor SEE or configured through the secure path as described in more detail herein.

In some embodiments, a secure, reliable, and trusted transmission of DDRs from the DDR processor 1214 is provided by DDR reporting techniques, including the following: (1) the DDR processor firmware is securely loaded and executed in a Secure Execution Environment (SEE); (2) the data path between the DDR processor to the wireless modem antenna connection (e.g., a 3G or 4G network modem antenna connection) is secured to prevent fraudulent software or firmware from forming data paths that circumvent the DDR processor data path processing; (3) the DDRs transmitted from the DDR processor 1214 to the service controller 122 are integrity checked in a manner that protects them from being tampered with or replayed; and (4) an authentication process between the DDR processor 1214 and the service controller 122 combined with a set of unique DDR report sequence identifiers and authentication session keep alive timers are used to maintain and verify the secure connection between the DDR processor 1214 and the service controller 122. For example, if the secure session or the flow of DDR records between the DDR processor 1214 and the service controller 122 are interrupted, then the secure access control function in the DDR processor 1214 can restrict access to the modem data path to the network destinations necessary to re-establish a securely authenticated session between the DDR processor 1214 and the service controller 122.

In some embodiments, the DDR processor 1214 also includes a secure network busy state monitor function (e.g., NBS monitor) as similarly described herein with respect to various embodiments. In some embodiments, the NBS monitor logs and reports various network and modem performance parameters and also computes and reports a measure of network congestion referred to herein as the network busy state (NBS). In some embodiments, the NBS is a measure that indicates the level of network congestion at a give base station sector over a given measurement time interval. In some embodiments, all of this information is included in a network busy state report (NBSR) that is part of the DDR message reports sent to the service controller 122 via the service processor 115.

In some embodiments, embedding the DDR processor in an Application Processor Unit (APU) (e.g., smart phone APU or other wireless communication device APU) provides a single secure DDR processor location in the wireless network data path (e.g., 2G/3G/4G wireless network data path or other device I/O connection or port) that provides for service usage monitoring and access control for multiple wireless modems. Also, the APU implementation approach can allow APU chipset suppliers who may not necessarily have WAN modem components or technology to implement solutions compliant with the various AWSP techniques described herein. Further, the APU implementation approach generally more easily allows for OTA and OTN firmware updates for APU implementations as described herein (e.g., which can be more complicated to provide in certain MPU implementations). Many disclosed embodiments describe DDR APU implementations where the DDR acts on communications flows through one or more wide area network networks, connections, or modems. As would be appreciated by one of ordinary skill in the art, the APU embodiments for a secure device data record processing system can also act on communications that flow over one or more additional I/O networks, connections, ports, or modems (e.g., a Wi-Fi network, connection, port, or modem; a USB network, connection, port, or modem; an Ethernet network, connection, port, or modem; a FireWire network, connection, port, or modem; a Bluetooth network, connection, port, or modem; a near field communication (NFC) network, connection, port, or modem; or another I/O connection, port, or modem).

Referring to device architecture 1201 as shown in FIG. 113, the DDR processor is embedded into the APU chipset SEE and nonvolatile memory as similarly described above. Along with the DDR processor SEE, the secure data path environment, shown as the Zone of Data Path Security 1744A, includes the DDR processor 1214 and the modem bus driver and physical bus 1242. For example, provided that the modem bus driver and the physical bus to the modem are secured against (e.g., or otherwise inaccessible to) fraudulent software or firmware attempting to circumvent the DDR processor 1214, the modem itself (e.g., 3G modem or 4G modem 942) need not be secured. In particular, the DDR processor 1214 is securely implemented on the 2G, 3G or 4G modem data path directly below the modem driver data path processing function and above the modem bus driver data path processing function (e.g., typically USB driver, SDIO driver or similar bus driver function). In some embodiments, the entire data path below the DDR processor 1214 through the modem bus driver and through the 2G, 3G or 4G modem is secured to prevent data paths that circumvent the DDR processor data path processing. In some embodiments, all information communicated from the device over device network connection or I/O port via the data path processing function (e.g., typically a USB driver, an SDIO driver, an Ethernet driver, a FireWire driver, a Wi-Fi driver, a Bluetooth driver, or a near field communication driver) is observed (and possibly processed to apply policy), classified, or reported on as it passes through the DDR processor block. Accordingly, in some embodiments, the modem bus driver is either secured in the DDR SEE or in its own SEE, or the modem bus driver code and data path must be inaccessible to software or firmware on the APU that could circumvent the DDR processor 1214.

In some embodiments, the DDR processor and USB driver execute in a secure environment on the application processor chipset, such as DDR secure execution memory. In some embodiments, the secure environment ensures no unauthorized ability to replace or modify the DDR processor code or modem bus driver/controller code (e.g., a USB driver/controller or another device I/O driver/controller, such as a 2G/3G/4G modem driver/controller, an SDIO driver/controller, an Ethernet driver/controller, a FireWire driver/controller, a Wi-Fi driver/controller, a Bluetooth driver/controller, or a near field communication driver/controller). In some embodiments, the secure environment also ensures that the data path from the DDR processor to the physical modem bus driver (e.g., USB port, Ethernet port, FireWire port, Wi-Fi port, Bluetooth port, NFC port, or another I/O bus port) is isolated from firmware outside the secure environment. That is, no firmware outside the secure environment has the ability to affect the accurate gathering of statistics by the DDR processor. In some embodiments, the secure environment further ensures that there is no ability for code other than the DDR processor to access sensitive crypto storage, such as keys. For example, this can include shielding sensitive storage from debug monitors and/or other monitoring/access activities or techniques. As would also be apparent to one of ordinary skill in the art, APU firmware, not just the DDR processor, must be secured and not include bugs or vulnerabilities that can be exploited to allow for unauthorized access. For example, a common attack is buffer overflow, in which an attacker chooses inputs that cause an unchecked buffer to exceed its bounds, resulting in unintended behavior that the attacker can exploit.

There are various examples of APU chipset SEE Implementation techniques that can be used to meet these requirements as described above. For example, a conventional CPU with upgradeable firmware (e.g., including the DDR processor) can be provided. The firmware can be stored in nonvolatile (NV) memory, or can be stored in flash memory in which the flash memory can be reprogrammed/updated with new or upgraded firmware. The firmware can be installed at time of manufacture and by design provides a compliant secure environment. Rigorous quality-assurance testing is required to ensure that bugs are unlikely to provide a means for compromising the secure environment. A new firmware image can be accepted for installation only if it has a valid digital signature. Version control checking can be included to prevent rollback to older versions. The firmware that validates the signature and version resides in firmware that can also be upgradeable. As another example, a security partitioned CPU can be provided, such as an ARM Trustzone or Intel Smart & Secure (e.g., or another suitable substitute including potentially supplier custom security environment CPU partitioning techniques). The DDR processor, modem bus driver (e.g., a USB driver/controller or another device I/O driver/controller such as a 2G/3G/4G modem driver/controller, an SDIO driver/controller, an Ethernet driver/controller, a FireWire driver/controller, a Wi-Fi driver/controller, a Bluetooth driver/controller, or a near field communication driver/controller), and any intervening code can execute in the secure partition, such as Trustzone's (e.g., or Smart & Secure's) secure mode. A secure boot procedure enforces the requirement that the DDR processor, modem bus driver (e.g., a USB driver/controller or another device I/O driver/controller such as a 2G/3G/4G modem driver/controller, an SDIO driver/controller, an Ethernet driver/controller, a FireWire driver/controller, a Wi-Fi driver/controller, a Bluetooth driver/controller, or a near field communication driver/controller), and intervening code can be included in a digitally signed, version-controlled code image. In such approaches, hardware firewalls can shield sensitive crypto storage from normal mode firmware. Also, the hardware firewalls ensure that normal mode firmware cannot tamper with the data path between the DDR processor and the physical modem bus driver (e.g., USB port), thus, preventing interference with the gathering of service usage measure data and/or statistics as described herein.

In some embodiments, in an MPU implementation, the DDR processor resides in the modem processor with other secure modem data path processing code and hardware functions. For example, in an MPU-based secure DDR processor implementation, once the data path below the modem bus driver interface is secured, it is relatively difficult to hack the device to create a data path that reaches the network by circumventing the DDR processor. Also, for some MPU chipset families, it can be more straightforward to implement a secure execution environment, secure boot loader, and secure nonvolatile memory as compared to implementing the same functions in some APU families that do not have standard hardware security partition features, such as ARM Trust Zone and Intel Smart & Secure. Further, an MPU implementation can have less interaction with the OS kernel builds than in the case of an APU implementation. In some embodiments with an MPU implementation, DDR processor 1214 resides in a wireless wide area network modem such as a 2G, 3G or 4G modem, or in a local area or personal area modem such as a USB modem, an Ethernet modem, a FireWire modem, a Wi-Fi modem, a Bluetooth modem, an NFC modem, or another I/O modem. Many of the described embodiments are for MPU implementations with wireless wide area network modem, but, as would be appreciated by one of ordinary skill in the art, other variations involving other I/O device modems are possible without departing from the scope of the disclosure.

Figure 76:
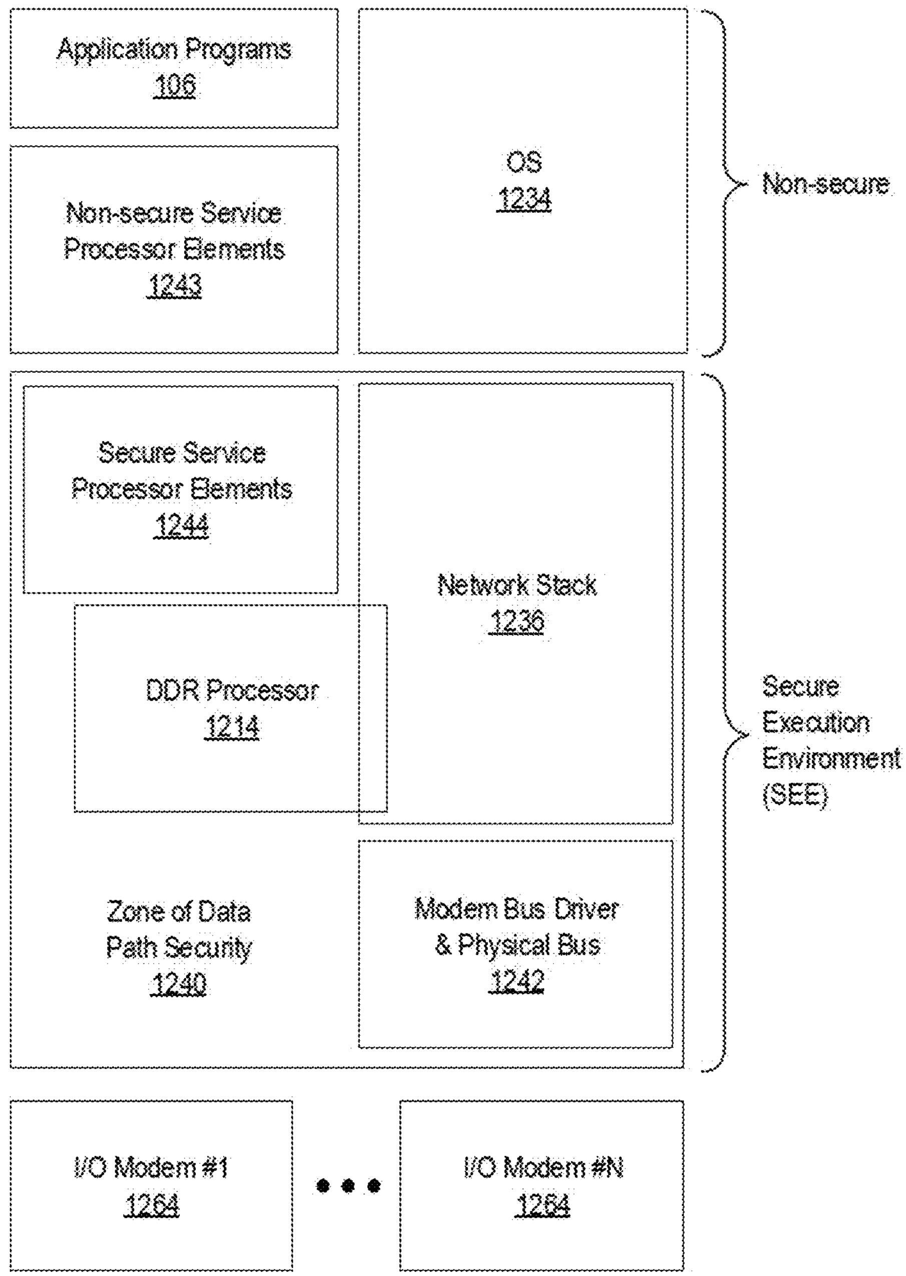
FIG. 76 illustrates an advanced wireless service platform end-to-end DDR reporting and processing system in accordance with some embodiments.

FIG. 76 illustrates an embodiment in which the secure execution environment (referred to in FIG. 76 as zone of data path security 1240 or SEE) includes secure service processor elements 1244. FIG. 76 illustrates a number of I/O modems 1264 for various device I/O ports numbered #1 through #N (e.g., possibly including but not limited to 2G, 3G, 4G, Wi-Fi, Ethernet, USB, FireWire, Bluetooth, and NFC). Modem bus driver and physical layer bus 1242 are located in the secure execution environment (zone of data path security 1240), and thus the secure execution environment protects secure service processor elements 1244 and the data path between secure service processor elements 1244 and the device I/O ports. In some embodiments, secure service processor elements 1244 include the portions of the service processor that are desired to be protected from malware or unauthorized user tampering or configuration changes, including but not limited to the secure service processor elements responsible for policy enforcement, I/O port communication activity monitoring and reporting, I/O port communication control or traffic control, application activity monitoring, application control, application access control or traffic control, network destination monitoring and reporting, network destination access control or traffic control, and device environment monitoring and integrity verification. Network stack 1236 is also shown in FIG. 76 in the secure execution environment, but in general not all of the network stack functions need to be implemented in the secure execution environment, provided that the data path below the monitoring point in secure service processor elements 1244 and I/O modems 1264 is secured (e.g., unauthorized data path access is not available or allowed). In the embodiment shown in FIG. 76, secure service processor elements 1244 interact with network stack 1236 to implement the various I/O port activity monitoring and control functions described herein. Non-secure service processor elements 1244 are also included but not limited to user interface elements.

In some embodiments, using secure execution environment partitioning technology, large portions or the entire service processor functionality are implemented in hardware secured execution environments in the APU or MPU. In some embodiments, using secure CPU partitioning technology, large portions or the entire service processor functionality are implemented in hardware secured execution environments in the APU or MPU. As an example embodiment, service processor functions that can be executed within a secure execution environment include policy enforcement actions in accordance with a set of policy instructions stored in the secure execution environment such as: managing policy for one or more of 2G, 3G or 4G network (and/or other I/O ports such as Ethernet, Wi-Fi, USB, FireWire, Bluetooth, or NFC), wherein the policy management can include application access management, application traffic processing, application access monitoring and reporting, or application access service accounting and reporting. As another example embodiment, secure service processor element functions that can be executed within a secure execution environment include managing policy for one or more applications wherein the policy specifies whether to block, allow, or throttle the applications in accordance with a set of policy instructions stored in the secure execution environment. As another example embodiment, secure service processor element functions that can be executed within a secure execution environment include managing policy for one or more applications wherein the policy includes application activity monitoring and reporting or operating environment monitoring and reporting (e.g., monitoring the security status or presence of malware in the device operating environment). As another example embodiment, secure service processor element functions that can be executed within a secure execution environment include managing policy for one or more network destinations or resources that can include websites, domains, URLs, IP and/or TCP addresses, server names, other devices, or content sources, wherein the policy includes access management, traffic control, access monitoring or access service accounting. As another example embodiment, secure service processor element functions that can be executed within a secure execution environment include managing policy for one or more roaming access networks. As another example embodiment, secure service processor element functions that can be executed within a secure execution environment include monitoring and reporting communication activity on one or more device I/O connections including one or more of a 2G, 3G, 4G and/or other I/O port. In some embodiments, secure service processor element functions that can be executed within a secure execution environment include monitoring, classifying (e.g., identifying application and/or network destination associated with the I/O port activity) and reporting communication activity on one or more device I/O connections, including one or more of a 2G, 3G, 4G and/or other I/O port. In some embodiments, a service controller located in the network provides the set of policy instructions stored in the secure execution environment by communicating them to the secure service processor element via a secure communication link as described herein. In some embodiments, these policy enforcement actions involving reporting can include sending the reports to a service controller located in the network via a secure communication link into the secure execution environment as described herein for further processing of the reports. In some embodiments, sending the reports to a service controller located in the network via a secure communication link into the secure execution environment can include the authenticated secure sequencing and receipt protocols described herein.

As another example embodiment, secure service processor element functions that can be executed within a secure execution environment can include one or more of: (i) a secure application manager that identifies traffic associated with a specific application or group of applications to differentially manage one or more of 2G, 3G and 4G application access policies (e.g., allow, block, throttle, defer for later transmission, apply a given QoS level) or service usage accounting (and/or accounting for application access by one or more other I/O ports, such as Ethernet, Wi-Fi, USB, FireWire, Bluetooth, or NFC), (ii) a secure application manager that identifies when an application is attempting to run and determines whether to permit the application to run or to not allow the application to run based on a set of application policies, (iii) a secure application manager that differentially manages 3G and 4G application access (and/or application access or service usage accounting for one or more other I/O ports) according to network access policy set by the service controller and network busy state determined on the device, and (iv) 3G and 4G network traffic that is classified and processed according to application identifier, layer 7 destination as well as layer 3/4 destination and network busy state. In some embodiments, securing such service processor functions can be augmented by: (i) configuring the secure execution environment with the various operating environment techniques disclosed herein so that the service processor achieves a similar degree of protection from hacking and malware described for lower levels of stack processing (e.g., the DDR processor SEE embodiments described herein), (ii) protecting or securing the data path between the DDR processor (e.g., and/or elements of the service processor) and the modem antenna connection from circumvention or tampering by device malware, and (iii) providing sufficient secure or protected memory and sufficient secure execution environment CPU cycles to execute the more sophisticated data path processing functions.

In some embodiments, a secure communication between a network-based service controller and a device-based secure service processor element operating in a secure execution environment on a device connected to a wide area access network is used for secure (or trusted) delivery of secure service processor element I/O activity monitor records for one or more I/O ports (e.g., an I/O port including but not limited to 2G, 3G, 4G, Ethernet, Wi-Fi, USB, FireWire, Bluetooth, or NFC), wherein the secure communication includes a secure message receipt feedback loop. In some embodiments, if the secure message feedback loop is interrupted, a secure service processor element secure communication channel error condition is detected and acted on. In some embodiments, an ordered sequence of secure service processor element I/O activity reports is communicated to a service controller using a signed or encrypted communication channel, and if the ordered sequence is interrupted or tampered with, a device secure service processor element secure communication channel error condition is detected and acted on. In some embodiments, the service controller observes the integrity of the ordered sequence of secure service processor element I/O activity reports to determine if device data records have been tampered with or omitted. In some embodiments, if the secure service processor element determines that the I/O activity monitor records have not been tampered with or omitted, the service controller sends back a signed or encrypted I/O activity monitor record receipt message. In some embodiments, if the secure service processor element determines that an I/O activity monitor record has been tampered with or omitted, the service controller sends back an error message or does not send back a signed or encrypted I/O activity monitor record receipt message. In some embodiments, if the secure service processor element receives an error message from the service controller, or does not receive a signed or encrypted I/O activity monitor record receipt message within a certain period of time or within a certain number of transmitted I/O activity monitor records or within a certain amount of communication information processed, then (i) a device configuration error message is generated for delivery to a security administrator or server, and/or (ii) one or more of the wireless network connections or other I/O connections or ports of the wireless communication device are either blocked or restricted to a pre-determined set of safe destinations. In this manner, if a device secure service processor element, the device operating environment, device operating system, or device software is tampered with in a manner that produces wireless network or other I/O port access service usage characteristics that are not compliant with expected policy or allowed policy, a device configuration error message can be generated, or device wireless network access or other I/O connection accesses can be restricted or blocked. Such embodiments can be helpful in securing device-based network access (or I/O control) policies and can also be helpful in identifying device software that has been tampered with or any malware that is present on the device. In some embodiments, the restriction on wireless network accesses or other I/O accesses results in access to a limited number of network destinations or resources sufficient to allow further analysis or troubleshooting of the device configuration error condition.

Device Service Plans and Service Plan Bundles

To date, service providers have provided a limited variety of different service plans and service plan bundles (multiple service plan elements bundled together) to which a user of the mobile wireless communication device may subscribe. With the increasing proliferation of a broad spectrum of mobile wireless communication devices having diverse communication and processing capabilities, it may be desirable to provide methods for an increased array of service plans that may be easily accessed, reviewed, and selected by the subscriber of the mobile wireless communication device. In addition, customizable service plan bundles may be provided that permit the subscriber to select among a range of constituent service plan elements, thereby building their own custom service plan bundle that best fits their particular communication service requirements. Service plan bundles may be customized based on numerous different criteria, including but not limited to, service type (e.g., voice, messaging, data), applicable time period, geographic location, access network type, and application/service specific content. In addition, promotional service plans, subsidized service plans, and special service plan bundles that include multiple constituent service plan elements may be offered to the subscriber to increase their exposure to featured service plans and service plan bundles. Through an easily navigable interface, e.g., using a flexible user interface of the mobile wireless communication device itself, or through access to a website/portal interface, the subscriber may learn about, test out and subscribe to one or more service plans that include a combination of service plan elements best suited for the subscriber's own needs. In some embodiments, a user or administrator also reviews, subscribes, shares, assigns or otherwise manages service plans and service plan bundles for devices in a device group. In some embodiments, the user or administrator manages service plans and service plan bundles for devices in a device group through an interface of one of the devices, or through a separate system that can interface with a service management system in the wireless network.

A mobile wireless communication device may need to be associated with a service account in order to allow a user or owner of the mobile wireless communication device (herein referred to as a subscriber) to use the mobile wireless communication device to communicate over a particular wireless communication network in a manner that is meaningful to the subscriber (e.g., to access content or a service offered by a service provider). Moreover, the mobile wireless communication device may need to be associated with one or more service plans that allow it to access services offered by a service provider. A service plan may, in general, allow for a quantity of communication that may be permitted during a time period of communication (e.g., 100 MB of data per month, 24 hours of network access, 100 minutes of phone calls, etc.). Some examples of services that may be offered by a service provider include the non-mutually-exclusive categories of voice services (e.g., phone calls, etc.), messaging services (e.g., text messages, multimedia messages, etc.), data services (e.g., Internet access, etc.), and hybrid services (e.g., voice over IP (VOIP), video chat, etc.). A service provider may be an operator of a wireless communication network, or may be another entity, such as a mobile virtual network operator (MVNO), a retail partner, a mobile wireless communication device original equipment manufacturer (OEM), a mobile wireless communication device operating system (OS) provider or a third party service partner. There are many other examples of services, service plans, and service providers, and the examples provided herein are not intended to be limiting.

In some embodiments, a user of a mobile wireless communication device configures service plans and service plan bundles, including individual constituent service plan elements thereof, permissions associated therewith, and restrictions applied thereto through a flexible user interface of the mobile wireless communication device. In some embodiments, a user is presented a selection of content for service plans and service plan bundles through the user interface of the mobile wireless communication device. In some embodiments, service providers or third parties supply applications to the mobile wireless communication device through which service plan and service plan bundle selection, customization, and management are effected. In some embodiments, customization and selection of service plans and service plan bundles occurs through the user interface of the mobile wireless communication device. In some embodiments, service plan and service plan bundle customization and selection occurs through a web browser application on the mobile wireless communication device. In some embodiments, customization and selection of service plans and service plan bundles uses one or more specific applications provided by a service provider or by a third party and installed on the mobile wireless communication device. In some embodiments, service plan and service plan bundle customization and selection uses applications provided by an operating system for the mobile wireless communication device. In some embodiments, the user selects and customizes service plans and service plan bundles for one mobile wireless communication device through another mobile wireless communication device. In some embodiments, selection and customization of service plans and service plan bundles occurs through a web browser communicating with a server or a website or a web portal. In some embodiments, selection and customization of service plans and service plan bundles occurs through an application communicating with an application portal or server, e.g., an application on the mobile wireless communication device or an application on another computing system. In some embodiments, a server communicatively coupled to a wireless network provides information for service plan and service plan bundle selection and customization. In some embodiments, information displayed for service plan and service plan bundle selection and customization originates from storage in the mobile wireless communication device. In some embodiments, the user selects and customizes individual constituent service plan elements included within a service plan bundle. In some embodiments, the user selects and customizes features of a service plan, service plan element or service plan bundle.

In some embodiments, notification messages, e.g., marketing interceptors, provide service plan offers to a user of the mobile wireless communication device. In some embodiments, the notification messages are presented directly through the user interface of the mobile wireless communication device. In some embodiments, multiple service plan options are presented to the user of the mobile wireless communication device for service plan selection. In some embodiments, a set of service plan selection options (and/or customization options) is presented in response to a user action. In some embodiments, the content of the set of service plan selection options depends on the particular action of the user. In some embodiments, the user interface provides for sharing, assigning and controlling permissions for service plans among multiple mobile wireless communication devices. In some embodiments, the user interface provides for managing service plans of devices in a device group. In some embodiments, the user interface provides for restricting usage of specific service plans that are assigned or shared with one or more devices in a device group.

In some embodiments, an offer for subscription to a service plan is presented through the user interface directly to the user of the mobile wireless communication device. In some embodiments, notification messages, e.g., "try this app," are presented to highlight an available service plan to the user of the mobile wireless communication device. In some embodiments, a service plan is offered by placing an overlay message (e.g., within a callout box). In some embodiments, marketing features of a service plan, e.g., sponsorship and/or "paid for" time periods, are presented to the user of the mobile wireless communication device. In some embodiments, one or more device agents resident in the mobile wireless communication device obtain indications or information related to available service plans from a network element, e.g., a server in a wireless network. In some embodiments, a flexible user interface presents offers to purchase service plans, including a "bundle" of service plan elements grouped together, e.g., voice, messaging, and data service plan elements offered as a service plan bundle. In some embodiments, a user can customize the selection of service plan elements to include in a service plan bundle.

In some embodiments, a selection of options for service plans and/or service plan bundles is presented to a user of the mobile wireless communication device through a flexible user interface, and the user of the mobile wireless communication device selects one or more service plans or service plan bundles through the flexible user interface, e.g., Plan A, B or C, or Service Plan Bundle X, Y or Z. In some embodiments, a selection of options for individual service plan elements to include in a service plan bundle is presented to a user of the mobile wireless communication device through a flexible user interface, and the user of the mobile wireless communication device selects a set of service plan elements to build a customized service plan bundle. In some embodiments, a rotating "carousel" of service plan bundles is presented to the user of the mobile wireless communication device, and the user selects from the "carousel" a service plan bundle through the user interface. In some embodiments, the user cycles through the selection options by interacting with the user interface, e.g., through a touch screen, of the mobile wireless communication device. In some embodiments, multiple rotating "carousels" of service plan elements are presented to the user of the mobile wireless communication device, and the user selects individual service plan elements from each of the "carousels" to build a customized service plan bundle. In some embodiments, selection and customization occurs through an application on the mobile wireless communication device, e.g., connected to an application portal. In some embodiments, selection and customization occurs through a web browser, e.g. connected to a website. In some embodiments, selection options for service plans, service plan elements, and service plan bundles are stored in the mobile wireless communication device. In some embodiments, the selection options are provided through a communication link to a server communicatively coupled to the wireless network. In some embodiments, the selection options are partially stored in the mobile wireless communication device and partially obtained from a server in the wireless network. In some embodiments, display parameters for presenting selection options (or other service plan information) through a user interface are obtained from storage in the mobile wireless communication device, obtained from a server communicatively coupled to the wireless network, or obtained in part from the device and in part from a server communicatively coupled to the wireless network.

In some embodiments, a service plan (bundle) selection system interviews the user to determine a "best match" set of selection options to provide to the user. Based on responses obtained from the user to one or more interview questions, the service plan (bundle) selection system provides one or more service plan bundles (or constituent service plan elements thereof) and/or one or more service plans to include in one or more offered service plan bundles. In some embodiments, the service plan (bundle) selection system includes information gathered from previous service usage, present service usage, and/or a service usage history for the mobile wireless communication device or for a user thereof to determine options to present to the user for selection and customization of service plans and service plan bundles. In some embodiments, the service plan (bundle) selection system offers the user of the mobile wireless communication device assistance in selecting and configuring service plans and service plan bundles. In some embodiments, service plan offers and service plan bundle offers can match service usage patterns. In some embodiments, information about previous service usage and/or current service usage is presented simultaneously with service plan options and service plan bundle options to the user of the mobile wireless communication device. In some embodiments, service usage provides context to the user of the mobile wireless communication device when choosing and/or customization a service plan or service plan bundle.

In some embodiments, service plan bundle selection and customization can include one or more individual constituent service plan elements. In some embodiments, service plan bundle customization can include selecting an option for a constituent service plan element from each of a plurality of service plan categories. In some embodiments, service plan categories include voice service plans, messaging service plans, and data access service plans. In some embodiments, service plan categories include domestic voice service plans and international voice service plans. In some embodiments, service plan categories include "home network" service plans and "roaming" network service plans. In some embodiments, adding individual service plans to a base service plan bundle customizes the base service plan bundle. In some embodiments, selecting each of the individual constituent service plan elements of a base service plan bundle customizes the base service plan bundle. In some embodiments, recommendations for different levels of matching criteria are presented to the user in order to provide options for selecting and/or customizing service plan bundles. In some embodiments, the user selects criteria for service plan recommendations, e.g., "low cost," "high bandwidth," "roaming access," and the service plan bundle selection and customization system provides options for service plans to include in a service plan bundle. In some embodiments, a ranking of service plan options to include in a service plan bundle is provided. In some embodiments, when the user selects one or more service plan elements to include in a service plan bundle, a "better" matching service plan element is provided as an alternative selection option for the user of the mobile wireless communication device. In some embodiments, when the user customizes a service plan bundle, a "different" matching service plan bundle is provided as a service plan bundle offer to the user of the mobile wireless communication device. In some embodiments, matching criteria to determine the "better" matching service plan, service plan element or service plan bundle include service usage history. In some embodiments, sponsored service plans or service plan bundles based on service usage are presented to the user of the mobile wireless communication device. In some embodiments, service plans or service plan bundles are offered with one or more additional promotional features.

In some embodiments, a network system uses a service usage history of the mobile wireless communication device 100 to determine a set of service plans to offer to a user of the mobile wireless communication device 100. In some embodiments, the network system determines a set of service plans that provide a different set of features or benefits to the user of the mobile wireless communication device 100 compared with a current or recent set of service plans to which the user of the mobile wireless communication device 100 subscribes. In some embodiments, one or more service plans in the determined set of service plans includes a cost savings and/or a feature benefit compared with the current or recent set of service plans. In some embodiments, the network system categorizes the features and/or benefits (e.g., cost savings). In some embodiments, the network system provides for a notification message to the mobile wireless communication device 100 to indicate at least a portion of the determined set of service plans. In some embodiments, the notification message includes at least a portion of the categorized features and/or benefits of the service plans included in the notification message. In some embodiments, the notification message includes an option to subscribe to one of the service plans. In some embodiments, the notification message includes an option to review information about one or more of the service plans. In some embodiments, the notification message provides for a responsive action from the user of the mobile wireless communication device 100. In some embodiments, the network system obtains a response to the notification message. In some embodiments, the response indicates an acceptance or a rejection to subscribe to a service plan indicated in the notification message. In some embodiments, the network system provisions one or more network elements and/or the mobile wireless communication device 100 when obtaining a affirmative indication from the user of the mobile wireless communication device 100 to subscribe to a service plan offered in the notification message. In some embodiments, the network system replaces a current service plan with the selected new service plan. In some embodiments, the notification message indicates a cost savings to the user of the mobile wireless communication device for at least one of the service plans. In some embodiments, the network system determines a billing offset when the user selects to subscribe to a new service plan. In some embodiments, the network system applies the billing offset to a service account for the user of the mobile wireless communication device 100.

In some embodiments, a catalog of "free" services is presented to the user of the mobile wireless communication device 100. In some embodiments, a service plan provides access to a set of services, e.g., a quantity of voice minutes, and/or a number of text messages, and/or an amount of data access consumption, in return for subscribing to a particular service or for using a particular application. In some embodiments, promotional offers are provided for a limited time period. In some embodiments, promotional offers provide for a limited set of features. In some embodiments, promotional features are accessible only after the user takes additional actions, e.g., interacts with a particular application or website.

In some embodiments, service plan offers are displayed through the user interface of the mobile wireless communication device 100. In some embodiments, notification messages are displayed to provide service plan offers. In some embodiments, notification messages are triggered based on trigger conditions, e.g., based on a pre-determined condition being met, or based on a particular action of the user of the mobile wireless communication device 100, or based on a network state. In some embodiments, marketing interceptors offer service plan (bundle) selections or customization based on a set of numerical digits dialed by the user of the mobile wireless communication device 100 to establish a connection for a service, e.g., for a voice call. In some embodiments, a marketing interceptor offers an alternative service in response to the particular set of dialed numerical digits. In some embodiments, the marketing interceptor offers a different set of features or costs for an alternative service compared to the "dialed" service. In some embodiments, an application or a part of an operating system on the mobile wireless communication device 100, alone or in conjunction with one or more network based systems, uses an alternative service implicitly changing the connection without intervention by the user of the mobile wireless communication device. In a representative embodiment, a voice call is transformed to a voice over Internet protocol (VOIP) call or other packet/data based voice connection. In some embodiments, an SMS text message is converted to use an alternative text/data connection service, e.g., from a text messaging service that counts individual text messages to a data service that counts data bytes. In a representative embodiment, a "video chat" call through a cellular connection is changed to a "video chat" call through a wireless local area network connection. In some embodiments, a service having a higher cost per unit time and/or per unit message and/or per unit data byte is transformed to a lower cost service. In some embodiments, marketing interceptors for alternative service can depend on a set of networks available and/or based on types of networks available to the mobile wireless communication device 100.

In some embodiments, one or more device agents of a service processor 115 of a mobile wireless communication device 100 intercept establishment of (and/or use of) a communication service connection or service activity, classify the communication service connection or service activity, compare the communication service connection or service activity to a service policy, and initiates an action based on the service policy. In some embodiments, the service policy is stored at least in part in the mobile wireless communication device 100. In some embodiments, the service policy is stored at least in part in a network element and communicated to the mobile wireless communication device 100. In some embodiments, the action initiated includes providing a notification message to the mobile wireless communication device 100. In some embodiments, the action includes displaying the provided notification message to a user of the mobile wireless communication device 100, e.g., through the UI 101 of the mobile wireless communication device 100. In some embodiments, the action includes displaying an actionable notification message from which further actions can be initiated. In some embodiments, the actionable notification message includes one or more options presented to the user of the mobile wireless communication device 100. In some embodiments, the actionable notification message includes a service plan offer. In some embodiments, the actionable notification message includes an option to start and/or download an application.

In some embodiments, a mobile wireless communication device 100 intercepts a dialed phone number, classifies the phone number according to a pre-configured/pre-stored policy and initiates a policy action. In some embodiments, the mobile wireless communication device 100 displays a pop-up notification message that includes one or more actionable buttons. In some embodiments, the pop-up notification message provides one or more options for an alternate service corresponding to the classification of the phone number. In some embodiments, the mobile wireless communication device provides for a Voice over Internet Protocol (VoIP) connection in place of a "dialed" voice connection. In some embodiments, the notification message offers an option to download an application that provides for a VoIP connection.

In some embodiments, a method for intercepting a communication service connection includes detecting an aspect of a number dialed to establish a connection, classifying an aspect of the connection, obtaining a service policy associated with the connection, intercepting the establishment of the connection, and redirecting the connection through an alternative communication service.

In some embodiments, aspects of the number dialed to establish a connection include one or more of: a specific number, an emergency services number, an information number, a long distance number, a local number, an international number, a toll free number, a number belonging to a preferred calling group, a number of a white list, and a number of a black list.

In some embodiments, a method for intercepting a communication service connection includes detecting an aspect of an attempted access to a communication service, classifying an aspect of the attempted access to the communication service, obtaining a service policy associated with the communication service, interrupting access to the communication service, and redirecting access to the communication service through an alternative communication service.

In some embodiments, aspects of the attempted access to the communication service include an application used, a network endpoint address, a wireless access network type, a website on a white list, a website on a black list, or a combination thereof.

In some embodiments, service plan (bundle) selection options are grouped based on a characteristic of the service plan or service plan bundle. In some embodiments, service plan (bundle) selection options are grouped based on an applicable time period for the service plan or service plan bundle. In some embodiments, a user interface provides flexible navigation to view a subset of all available service plan or service plan bundle options. In some embodiments, service plan (bundle) selection options are presented using a rotatable "carousel." In some embodiments, service plan (bundle) selection options are presented using one or more scrollable lists. In some embodiments, service plan (bundle) selection options are presented using an array of icons. In some embodiments, service plan (bundle) selection options are presented as a combination of graphics and text. In some embodiments, service plan (bundle) selection options are presented through one or more drop down menus. In some embodiments, service plan (bundle) selection options are presented through a set of tabs. In some embodiments, particular service plans or service plan bundles are highlighted to the user based on one or more criteria. In some embodiments, highlighted selections are determined based on service usage. In some embodiments, one or more tabs organize service plan (bundle) selection options include "featured service plans," "application based service plans," "voice service plans," "data service plans," and "messaging service plans." In some embodiments, a banner area of the user interface presents graphics and advertisements for particular service plans or service plan bundles. In some embodiments, graphics are static. In some embodiments, graphics are dynamic.

In some embodiments, service usage history and/or service plan and/or service plan bundle subscription history influences a selection and customization of service plans and/or service plan bundles. In some embodiments, the selection of options for service plans or service plan bundles uses information resident in the mobile wireless communication device itself. In some embodiments, indicators are presented with service plan (bundle) selection options to provide the user information, e.g., "installed, purchased, expired, etc." In some embodiments, service plan (bundle) selection options are organized based on a history of viewing, e.g., "not seen" service plans or service plan bundles are presented, and "seen" service plans or service plan bundles are not presented. In some embodiments, service plan selection options presented are based on a set of user preferences. In some embodiments, a history of service plan and/or service plan bundle purchases and customizations is presented in conjunction with presentation of service plan selections and/or service plan offers. In some embodiments, one or more differences between an offered service plan (bundle), a current service plan (bundle), a past service plan (bundle), a customized service plan (bundle), and/or a standard service plan (bundle) are presented along with the service plan (bundle) options.

In some embodiments, "adding" a supplemental service plan element to a service plan bundle customizes the service plan bundle. In some embodiments, service plan (bundle) selection options include "upgrade" offers to provide the user a higher grade of service based on a current service plan or service plan bundle. In some embodiments, service plan or service plan bundle offers provide "upgrades" or "downgrades" based on service usage history.

In some embodiments, accounting information includes different billing options, including but not limited to credit cards, "virtual wallets" resident on the mobile wireless communication device, and "bill me later."

In some embodiments, an organization of information provided to the user to select and/or customize service plans and service plan bundles includes formatting the information based on choosing service plans and service plan bundles (or features of service plans and service plan bundles) for specific mobile wireless communication devices. In some embodiments, the organization of information, provided to the user to select and/or customize service plans and service plan bundles, includes formatting the information based on choosing mobile wireless communication devices for specific current or newly subscribed service plans or service plan bundles. In a representative embodiment, a user adds or deletes mobile wireless communication devices to a specific service plan or service plan bundle. In a representative embodiment, a user adds or deletes a service plan or service plan bundle to a specific mobile wireless communication device. In a representative embodiment, a user interface presents information for service plan (bundle) selection and customization using a "plan view," a "master device view" and/or a "slave device view." In some embodiments, the "plan view" provides for adding, deleting and/or modifying sharing/assignment of a mobile wireless communication device to a specific service plan or service plan bundle. In some embodiments, the "master device view" provides for adding, deleting or modifying sharing/assignment of a service plan or service plan bundle on one or more mobile wireless communication devices associated with a device group. In some embodiments, the "slave device view" provides for limited capabilities to add, delete or modify sharing/assignment of a service plan or service plan bundle on the specific "slave" mobile wireless communication device. In some embodiments, information is presented to the user of the mobile wireless communication device tailored to permissions controls that apply to the mobile wireless communication device.

In some embodiments, permissions controls for a mobile wireless communication device are contained in a device credential or in a user credential. In some embodiments, a level of permission control affects information displayed through a user interface of the mobile wireless communication device. In some embodiments, different applications and/or settings for applications are loaded based on permissions controls, e.g., based on a device credential or a user credential. In some embodiments, a network-based server determines information to provide to a mobile wireless communication device based on a device credential or a user credential. In some embodiments, an application on the mobile wireless communication device presents information to the user of the mobile wireless communication device based on a permission level.

In some embodiments, notifications are provided to a mobile wireless communication device for providing information to control and/or manage communication services available to, offered to, subscribed to, or otherwise usable by the mobile wireless communication device. In some embodiments, notifications are triggered to be obtained and/or displayed based on trigger conditions established by a user, an network administrator, a service provider, an enterprise administrator, a device group administrator, or a third party service partner. In some embodiments, notification trigger conditions and/or notification content and/or notification display parameters are configured through a service design center. In some embodiments, notification trigger conditions are configured through access to a service provider service management system (including third party service partners), e.g., through an application on the mobile wireless communication device, or through a web browser interacting with a specific website. In some embodiments, notification trigger conditions are configured through the user interface of the mobile wireless communication device, e.g., by the user of the mobile wireless communication device interacting with one or more screens presented on a display of the mobile wireless communication device.

In some embodiments, a service usage control policy includes a service usage notification policy. In some embodiments, the user notification includes one or more of the following: a notification that the application to be downloaded and/or launched is a network capacity controlled service; a list of one or more service activities (e.g., applications, OS/other software functions/utilities, and/or other functions/utilities as described herein) that have a network capacity controlled services classification; type of service policy in effect for one or more network capacity controlled services; notification that a service activity belongs to a network capacity controlled services class; notification that a service activity that is classified as network capacity controlled service can have the service class changed; notification that if the service class is changed for a service activity the service charges will change; notification that one or more networks are available (e.g., one or more alternative networks and/or network busy state information and/or charging information and/or incentives associated with such networks), a service plan upgrade/downgrade offer/option; and an offer for a service plan that rewards a user that responds to the notification a service plan is lower cost/discounted for responding to notification to use or not to use service activity based on usage level warning notification. In some embodiments, the user notification includes a user preference selection, including one or more of the following: a provision to associate an access policy control with the application (e.g., allow/block, notify of usage, notify of usage at a given threshold, traffic control settings, allow during certain times, allow when network not busy, and/or other policy controls as described herein), an over-ride option for selecting the service usage control policy; a modify option to select the service usage control policy; a select option to select a new service plan (e.g., an option to review and select alternative/new service plan upgrade/downgrade options), and an acknowledgement request (e.g., to confirm/acknowledge receipt of the notification, in which the acknowledgement can be transmitted to a network element/function and/or stored locally for later reference/transmission).

In some embodiments, before a given device application, process, function, OS service or other service activity is allowed to start, the intention to start is intercepted by a launch manager, the background service policy set or the network protection service policy set for the service activity is retrieved, and any necessary user notification or service launch control policies are implemented prior to allowing the service activity to launch. In such embodiments, a launch intercept manager may be used to implement this functionality. In some embodiments, this launch intercept manager is provided with a list identifying the service activities (e.g., application identifiers, OS function identifiers, aggregate service activity identifiers, and/or component service activity identifiers) that have a launch control policy in effect. In some embodiments, the list of launch control policies includes blocking or delaying launch of the one or more service activities. In some embodiments, the launch control policy includes a user notification before, during or after the service activity is launched. In some embodiments, the user is informed that a service activity that has a background service control policy in effect or a network protection service control policy in effect is attempting to launch, is about to launch or has launched. In a further set of embodiments, the launch is held up until the user is notified and is allowed to decide if they would like to launch the service activity. In some embodiments, the user notification includes a message that the service activity attempting to launch consumes a large amount of service usage and asks the user if they would like to continue (e.g., "This application consumes a large amount of data, would you like to continue?", "This application consumes data even when you are not using it, would you like to continue?", "This application consumes data while you are roaming which adds cost to your usage bill, would you like to continue?", etc.). In some embodiments, the decision on whether or not to launch a service activity is pre-programmed into the list identifying the service activities (e.g. application identifiers, OS function identifiers, aggregate service activity identifiers, and/or component service activity identifiers) that have a launch control policy in effect. In some embodiments, a portion of the list is pre-programmed by the user in accordance with user preference for controlling usage of service activities. In some embodiments, a portion of the list is pre-programmed by a network element (e.g., a service controller) in accordance with network background service or network protection service policies specified by a service policy design management system operated by a service provider as described herein. In some embodiments, the policy implementation defined by the list identifying the service activities (e.g. application identifiers, OS function identifiers, aggregate service activity identifiers, and/or component service activity identifiers) that have a launch control policy in effect is verified to ensure that the user or malicious software has not defeated the policy enforcement specified in the list. In some embodiments, the list identifying the service activities that have a launch control policy in effect includes launch policies that are a function of one or more of: background service state, network busy state (or performance state or QoS state), type of network the device is connected to, home or roaming connection, time of day or day of week.

In some embodiments, the various design techniques described herein that allow for intercepting a service activity intention to launch, and applying a background service policy set or a network protection service policy set can be designed into the OS itself. For example, the intercept and policy implementation functions can be designed into the activity manager, broadcast intent manger, media service manager, service manager, or other application or service activity management function in the Android OS. One of ordinary skill in the art will recognize that similarly, the various design techniques described herein that allow for intercepting a service activity intention to launch, and applying a background service policy set or a network protection service policy set can be designed into application launch management functions in the Apple iOS OS, Windows Phone OS, Windows PC OS, Blackberry OS, Palm OS, and other OS designs.

In some embodiments, the pre-launch user notification information indicates one or more of: typical service usage or cost, or projected service usage or cost for the service activity attempting to launch. In some embodiments, the user sets limitations on access for one or more service activities and once this limit is hit then when the service activities with exceeded limits attempt to launch the user is notified. In some embodiments, the user chooses from a set of service restrictions rather than simply blocking or allowing service activity launch, with example service restrictions including but not limited to: a pre-configured set of restriction policies to chose from (e.g. full access, limited access, highly restricted access or block access), block, throttle, delay, aggregate and hold, limit amount of usage per unit time, cap usage, set limit for additional notification, specify type of network, specify busy state (performance, QoS) or background state, or choose from pre-configured settings options.

In some embodiments, the user notification occurs after the user attempts to download or load an application onto the device (e.g., an application downloaded from the web or an online application store for a smart phone or other wireless/network computing device, such as an Apple iPhone or iPad, or Google Android/Chrome based device). In some embodiments, the user notification occurs after the user attempts to run the service activity or to initiate usage of a cloud based service/application (e.g., Google or Microsoft cloud service based apps). In some embodiments, the user notification occurs after one or more of the following: the service usage activity hits a usage threshold event, the service usage activity attempts a network service usage that satisfies a pre-condition, an update to a network capacity protection service activity classification list or policy set, and a network message is sent to the device triggering the notification. In some embodiments, the user notification provides information on the service usage activity that is possible, typical, or likely for the service usage activity. In some embodiments, the user notification includes a user option for obtaining more information about the service usage of the service activity (e.g., a message that the service usage activity may result in a high service usage and/or that the service usage activity may or will result in a high service usage as compared in some way to a limit of the current service plan) to make informed user preference settings.

In some embodiments, a user notification includes displaying (e.g., and as applicable, allowing users to provide UI input) one or more of the following: current and/or past/historical/logged network service usage activity list, current and/or past/historical/logged network capacity controlled service usage activities, current activity policy settings, current or available networks, service plan options (e.g., for how to treat one or more network capacity controlled service traffic types), selection option(s) to assign a network capacity controlled service activity into a different priority traffic control and/or charging buckets, network service usage by activity (e.g., network capacity controlled services and other services), network busy state (e.g., and with resulting policies in force), service activity policy setting vs. busy state and time/day/week, network service activity priority, network service activity usage statistics (e.g., vs. network busy state and/or network service usage control policy state).

In some embodiments, a UI notification is displayed when user attempts a network capacity controlled service activity during a network busy state (e.g., that modifies a network capacity controlled services policy). In some embodiments, the UI notification includes information on service plan choice and a network capacity controlled services policy over-ride option (e.g., one time, time window, usage amount, permanent by activity, and/or all), charging information based on a user selection, and/or service plan upgrade information and options.

In some embodiments, a UI notification is displayed for user input for preferences/configurations for multiple networks (e.g., Wi-Fi, 4G, 3G, and/or other wired or wireless access networks) including charging policy. In some embodiments, a UI notification is displayed when a specified network traffic service usage activity (e.g., based on network capacity controlled services classification, QoS classification, priority classification, time based criteria, network capacity, service plan, charging criteria, and/or other criteria/measures) is being attempted or is occurring and providing options (e.g., allow, block, delay, throttle, and/or other options).

In some embodiments, a UI fuel gauge is displayed (e.g., to depict current and/or historical network service usage, for example, relative to a service plan for the device, by network, relative to network busy state, time based criteria, and/or other criteria/measures). In some embodiments, a user notification includes a communication sent to the user (e.g., an email, SMS or other text message, voice message/call, and/or other electronic form of communication). In some embodiments, the communication sent to the user includes network service usage information, network capacity controlled service usage related information, and/or an instruction to log into a web page or send a communication for more information (e.g. regarding an information update and/or alert or warning message, such as related to network service usage and/or charging for network service usage).

In some embodiments, a notification (e.g., a user or network service cloud notification) is generated based on an aggregate service activity reports usage (e.g., allows network provider to generate user notifications and/or to notify application provider/service activity provider). In some embodiments, a notification (e.g., a user or network service cloud notification) is generated based on a publishing of an updated/new network capacity controlled services list based on an aggregate monitored activity (e.g., based on a service plan, velocity, sockets opening frequency/rate (e.g., messaging layer behavior), total data usage, peak busy time usage to formulate or update black list for monitoring, notifying, and/or controlling, which can be applied to one, multiple, group, or all devices). In some embodiments, a notification (e.g., a user or network service cloud notification) is generated based on data usage trends for particular device relative to an associated service plan and/or other comparable devices or data usage thresholds/statistical based data usage measures.

In some embodiments, an application is actually composed of several component applications, processes or functions. Examples of this include but are not limited to: the components of a Java application JAR file; applications that use OS functions; applications that use a proxy service function; applications, functions or processes that coordinate with one another to implement a composite process, function or application; and OS process functions that support an application or overall OS function. In such embodiments it is important to be able to categorize all applications, functions and processes on a device that contribute to the service usage of a service activity so that the service activity can be monitored for service usage, have the service usage accounted for, implement the appropriate user notification when one or more service activity components attempts to start or use the network, implement the appropriate user notification when one or more service activity components reaches a pre-determined service usage level that requires user notification, and implement the appropriate background service or network protection service usage controls as specified herein ((including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein). In the case of service activity components that belong exclusively to one aggregate service activity (e.g. an application, application JAR file or OS function), this may be accomplished by including each of the component service activities on a list that identifies the service activity components that belong to the aggregate service activity, and then monitoring, possibly controlling and providing user notifications based on the aggregate or component behavior of each service activity in accordance with the policies specified for the aggregate service activity. For example, it is necessary to group all application launch behavior and/or network access behavior under the monitoring, launch, notification, accounting and background service controls or network protection service controls (or other background or network protection service policies as specified herein) in accordance with the background service or network protection service policies for the aggregate application that the JAR file supports. As another example, if an OS network synch or update function utilizes various software components or processes to implement the network synch or update function, then each of the software components or process must be monitored and aggregated under the background service policies or network protection service policies for the aggregate OS synch or update function.

In some embodiments, this ability to group usage for a related set of service activity components dedicated to an aggregate service activity as described herein is used to improve usage reporting of service activities to a service controller for the purpose of statistically identifying service activities that are candidates for background service policy controls or network protections service policy controls.

In some cases, multiple applications, processes, functions, OS services or other service activities can utilize a common set of component software applications, processes, functions or OS services. In such cases, in order to implement background service policies and/or network protection service policies for service activity monitoring and accounting, service activity launch control, user notification, or network access control as described herein, it is necessary to associate the specific network access data or information flows to and from the common component software applications, processes or functions that belong to the specific initiating application, process, function or other service activity that is to be managed according to a background service or network protection service policy set. In what follows, a specific set of examples are provided on how to map common component service activity for a set of common OS functions referred to as proxy service functions to a specific application, process, function, OS service or other service activity for the purpose of implementing a background service policy set or a network protection service policy set as described herein. Once these examples are reviewed, it will be obvious to one of ordinary skill in the art how to apply similar mapping of service activity for a common set of components to a service activity that is to be managed in accordance with a background service policy set or a network protection service policy set as described herein.

In some embodiments, this ability to group usage for a common set of service activity components as described herein is used to improve usage reporting of service activities to a service controller for the purpose of statistically identifying service activities that are candidates for background service policy controls or network protections service policy controls.

In some embodiments, a proxy network service manager refers to an intermediary data flow function in a device operating system that sits on a data path between a device application and a device networking stack interface to provide a level of network service abstraction from the network stack interface, a higher level service function above the network stack interface, enhanced or special traffic processing functions, media service transfer management, file download service, HTTP proxy service functions, QoS differentiation, or other similar or related higher level traffic processing. Example Proxy Service Managers include the following: media service manager (e.g., android media service library function), email service manger, DNS function, software download service manager, media download manager (e.g., audio player, streaming media player, movie downloader, media service OS function, etc.), data download service manager, Android “media” library function, Android.net library function, Jave.net library function, Apache library function, other similar software/library functions or services in other device operating systems, SMTP/IMAP/POP proxy, HTTP proxy, IM proxy, VPN service manager, SSL proxy, etc. Herein these alternative network access data flows that are initiated by an application are termed application proxy service flows. In such embodiments an app can sometimes simply requests a network access service activity from an OS component such as a proxy service component rather then directly accessing the network. In such embodiments, in order to implement background service controls or user notification of application service usage, it is necessary to monitor the application proxy service flows, classify them as being initiated by or belonging to a particular application or service activity, and implement the proper background service classifications, user notifications, application process launch intercept, background service accounting, and background service usage restrictions as described herein in accordance with the policies intended for the initiating application or service activity. This is accomplished by inserting service usage monitors that allow a mapping of (i) the initiating application identifier (e.g., app name, app fingerprint, application identification tag, application process number, application credential, or other secure or non-secure application or process identifier) to (ii) the request to the proxy service and subsequently to (iii) the network service flows between the proxy service and the network elements that service the information communications. Once this mapping is accomplished, the service usage flows of the proxy service can then be accounted back to the initiating application, device software process or other service activity, the proper policies can then be applied to each service usage flow for user notification, service activity launch control, service activity background accounting (including variable charge rating dependent on background service state and/or sponsored service charging), service activity background service controls or network usage restrictions as described herein (including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein).

In some embodiments, this ability to track service usage for an service activity through a proxy service as described herein is used to improve usage reporting of service activities to a service controller for the purpose of statistically identifying service activities that are candidates for background service policy controls or network protections service policy controls.

In some embodiments, the various design techniques described herein that allow for monitoring, accounting for and/or implementing service policy for component service activities that belong to an aggregate service activity can be designed into the OS itself. For example, in certain current mobile OS implementations (e.g., Google Android, Apple iOS, Blackberry, etc.) there are some applications available in the market that allow a user to get an estimate for how much data a certain subset of applications are consuming on a wireless service provider network, but it is not possible for the user or application to get an indication of the service usage for certain OS functions, whereas the embodiments disclosed herein will allow for this. As another example, in certain current mobile OS implementations it is not possible to associate proxy service usage (e.g., media download and media streaming proxy library software functions) with the specific applications that use the proxy service, so while the user can be informed of generic common OS functions or proxy services (e.g., in the case of Android: “media service”, “media”, “gallery”, “Google service framework” and other generic common OS software library functions or proxy services), there is no way for the user to determine what applications widgets or other service activities are actually generating this common service function usage, whereas the invention described herein permits the user full visibility on such usage monitoring examples. Furthermore, if the OS is retrofitted with the intercept and policy implementation functions can be designed into the activity manager, broadcast intent manger, media service manager, service manager, or other application or service activity management function in the Android OS. One or ordinary skill in the art will recognize that similarly, the various design techniques described herein that allow for intercepting a service activity intention to launch, and applying a background service policy set or a network protection service policy set can be designed into application launch management functions in Apple iOS, Windows Phone OS, Microsoft Windows PC OS, Blackberry OS, Palm OS, and other OS designs.

Service Offers

Figure 114:
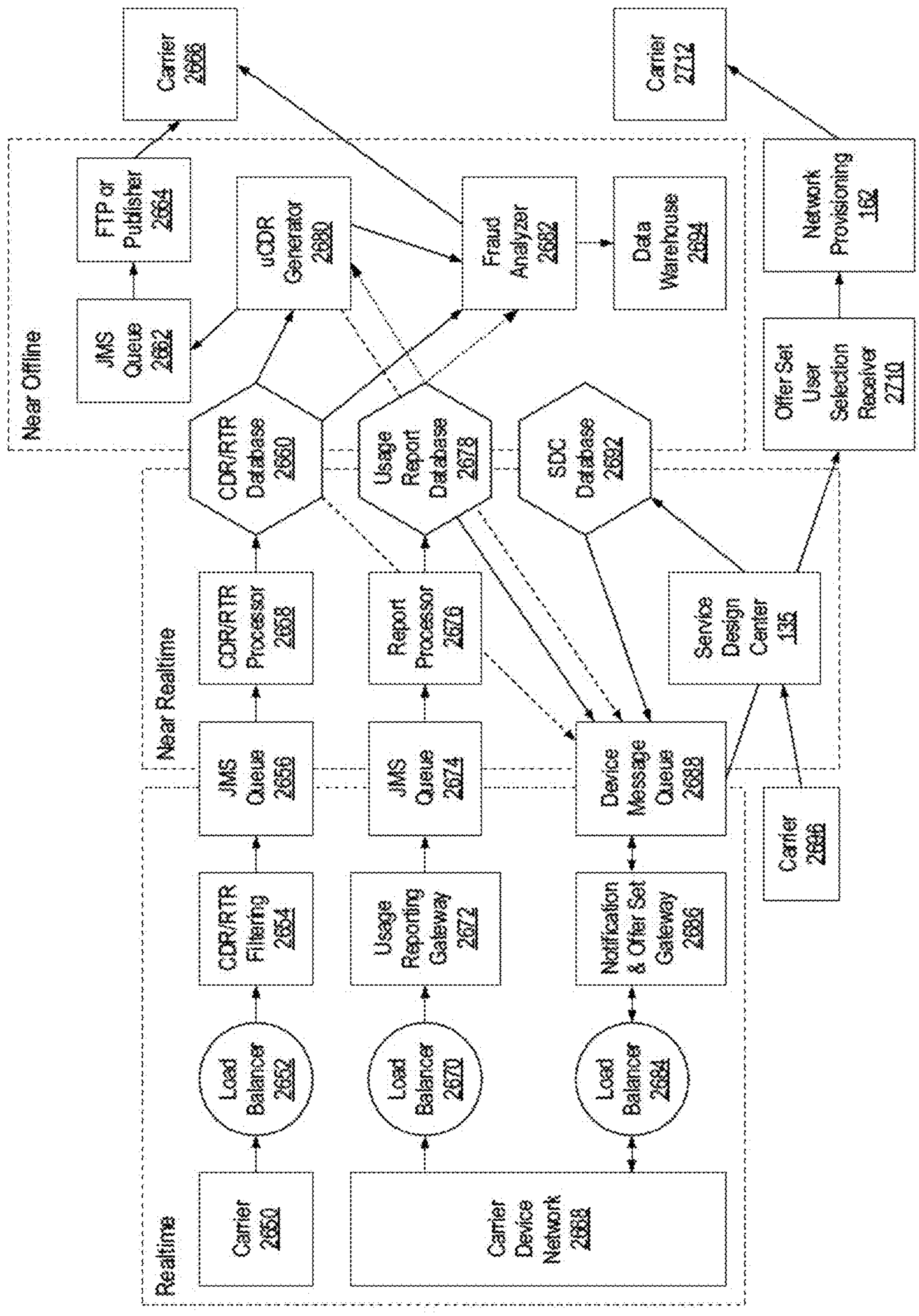
FIG. 114 illustrates an example embodiment with network system elements that can be included in a service controller system to facilitate a DAS implementation and the flow of information between those elements.

FIG. 114 illustrates an exemplary embodiment with network system elements that can be included in a service controller system to facilitate a device-assisted services (DAS) implementation and the flow of information between those elements. FIG. 114 shows the flow of information to facilitate reconciliation of device-generated data usage records with network-generated (e.g., wireless network carrier-generated) data usage records associated with an end-user device. In addition, FIG. 114 shows the flow of information from a carrier to an end-user device for the purpose of publishing an offer set. A user of the end-user device may then select or act on the offer set.

Carrier-generated charging data records (CDRs) or real-time reporting records (RTRs) (or other real-time or near-real-time usage record formats such as, e.g., FDRs, batch processed usage records, continuous usage record event feeds or SMS formatted usage record messages) flow from carrier 2650 (which can be, e.g., a real time reporting system, a network gateway, a network usage charging system element, a AAA, an HLR, a billing element, etc.) to load balancer 2652 to RTR filtering element 2654.

In some embodiments, load balancer 2652 selects one of many CDR/RTR processing threads that are available in the service controller information processing system. In some embodiments, the processing thread is an asynchronous software or firmware program running on a gateway or server CPU. In some embodiments, the processing thread is a virtual machine processing thread that exists in a resource pool of gateway or server CPUs or virtual machines, which may include geographically separated or redundant resource pools. As illustrated in FIG. 114, each processing thread includes the functional steps of CDR/RTR filtering 2654, JMS queue 2656, CDR/RTR processor 2658 and the interface to CDR/RTR database 2660. In some embodiments, processing threads are asynchronous in that they are initiated when load balancer 2652 directs one or more CDR/RTR data transfers to the thread and terminated when the processed CDR/RTR information has been processed and deposited into CDR/RTR database 2660. Note that FIG. 114 shows only one of potentially many available CDR/RTR processing threads.

CDR/RTR filtering element 2654 selects the records that are associated with devices that include a device client that communicates with the service controller (e.g., the device client can be a service processor configured to provide service usage notification updates, on-device service plan purchase or activation with UI options display and user selection actions, device-assisted access control policy enforcement, device-assisted service usage charging policy enforcement, device-assisted service notification messages, etc.). In some embodiments, devices supporting DAS are identified by device credentials or user credentials that are communicated to the service controller as described herein, where the device credential or user credential are members of a device group or user group that is managed by the service controller.

In some embodiments, CDR/RTR filtering element 2654 may be used advantageously to quickly receive and acknowledge a CDR/RTR record to provide asynchronous functionality because of real-time processing requirements, server processing thread scalability and maintainability requirements, or server processing thread geographic redundancy requirements. In some embodiments, filtering eliminates unnecessary load on JMS queue 2656 and/or CDR/RTR database 2660. CDR/RTR filtering element 2654 places the records from end-user devices known to be configured with a device client (e.g., a service processor configured to provide service usage notification updates, on-device service plan purchase or activation with UI options display and user selection actions, device-assisted access control policy enforcement, device-assisted service usage charging policy enforcement, device-assisted service notification messages) that communicates with the service controller through Java messaging service (JMS) queue 2656. In some embodiments, CDR/RTR filtering element 2654 filters out device records for devices that may have a form of service processor, but the service processor has not properly authenticated with the service controller. In some embodiments, the device clients that are known to be configured with a device client that communicates with the service controller are determined by looking up a device credential or user credential associated with CDRs or RTRs in a device group or user group management database (e.g., in SDC database 2692 or a subscriber management system).

JMS queue 2656 buffers the CDR/RTR information remaining after CDR/RTR filtering 2654 and allocates one or more CDRs/RTRs to a service usage processing thread in CDR/RTR processor 2658. In some embodiments, JMS queue 2656 is a persistent queue. In some embodiments, JMS queue 2656 is a primary messaging system between applications.

CDR/RTR processor 2658 retrieves the records from JMS queue 2656, transforms the records, and stores them in CDR/RTR database 2660. In some embodiments, CDR/RTR processor 2658 is an application or a process thread. In some embodiments, CDR/RTR processor 2658 pulls a CDR/RTR record from JMS queue 2656, transforms the record, and stores the transformed record in CDR/RTR database 2660 in one transaction in order to provide fault tolerance in the case of system failure. In some embodiments, CDR/RTR processor 2658 formats the CDR/RTR information to provide a common service usage information format to facilitate one or more of service usage processing, reporting, analysis, comparison, mediation and reconciliation operations performed within the service controller system. In some embodiments, CDR/RTR processor 2658 observes CDR/RTR time stamps and time synchronizes, time aligns, or time aggregates multiple CDR/RTR reports so that a more consistent measure of usage with a common time reference can be achieved within the service controller system for one or more of service usage processing, reporting, analysis, comparison, mediation and reconciliation purposes.

In some embodiments, end-user devices capable of DAS reporting (e.g., devices configured with a device client that communicates with the service controller, such as a service processor described herein) connect periodically or on occasion to usage reporting gateway 2672 to report their data usages. In some embodiments, DAS reporting information includes but is not limited to one or more of user service plan purchase or activation selection choices, device user service policy configuration preference selections (e.g., user-generated service policy assignments for applications, websites, network types, or home/roaming policies), DAS service usage reports, DAS device policy state reports, DAS software environment integrity reports, and other reports.

In some embodiments, DAS device usage reports and analytics flow from carrier device network 2668 (e.g., devices configured with service processors that are in communication with the service controller) to load balancer 2670 to usage reporting gateway 2672. In some embodiments, load balancer 2670 selects one of many usage reporting processing threads that are available in the service controller information processing system. In some embodiments, the usage reporting processing thread is an asynchronous software or firmware program running on a gateway or server CPU. In some embodiments, the usage reporting processing thread is a virtual machine processing thread that exists in a resource pool of gateway or server CPUs or virtual machines, which may include geographically separated or redundant resource pools. As illustrated in FIG. 114, each usage reporting processing thread consists of the functional steps of usage reporting gateway 2672, JMS queue 2674, report processor 2676, and the interface to usage report database 2678. In some embodiments, usage reporting processing threads are asynchronous in that they are initiated when load balancer 2670 directs one or more usage reporting data transfers to a thread and terminated when the processed usage reporting information has been processed and deposited into usage report database 2678. Note that FIG. 114 shows only one of potentially many available usage reporting processing threads.

Usage reporting gateway 2672 accepts reports from devices configured with a device client (e.g., a service processor configured to provide service usage notification updates, on-device service plan purchase or activation with UI options display and user selection actions, device assisted access control policy enforcement, device assisted service usage charging policy enforcement, device assisted service notification messages) that communicates with the service controller and places the reports on JMS queue 2674. In some embodiments, usage reporting gateway 2672 only accepts device reports from device service processors that have authenticated with the service controller system. In some embodiments, usage reporting gateway 2672 only accepts device reports from device service processors configured with device credentials or user credentials that are members of a device group or user group that is managed by the service controller. In some embodiments, usage reporting gateway 2672 rejects reports from end-user devices without authenticated service processors. In some embodiments, usage reporting gateway 2672 is an application or a process thread. In some embodiments, usage reporting gateway 2672 quickly receives and acknowledges end-user device reports. In some embodiments, usage reporting gateway 2672 provides asynchronous functionality that is advantageous to support real-time processing requirements.

In some embodiments, the end-user device is authenticated before reports are put onto JMS queue 2674. In some embodiments, JMS queue 2674 is a persistent queue. In some embodiments, JMS queue 2674 is a primary messaging system between applications.

Report processor 2676 retrieves reports from JMS queue 2674, transforms the reports, and stores the transformed reports in usage report database 2678. In some embodiments, report processor 2676 is an EAI. In some embodiments, report processor 2676 retrieves reports from JMS queue 2674, transforms the reports, and stores the transformed reports in usage report database 2678 in a single transaction in order to provide fault tolerance in case of system failure. In some embodiments, report processor 2676 formats the device usage report information to provide a common service usage information format to facilitate one or more of service usage processing, reporting, analysis, comparison mediation and reconciliation purposes internal processing and comparison within the service controller system. In some embodiments, report processor 2676 observes device usage report time stamps and time synchronizes, time aligns or time aggregates multiple device usage reports so that a more consistent measure of usage with a common time reference can be achieved within the service controller system for one or more of service usage processing, reporting, analysis, comparison mediation and reconciliation purposes.

In some embodiments, CDR/RTR filtering 2654, CDR/RTR processor 2658, report processor 2676, and usage reporting gateway 2672 share a host.

In some embodiments, micro-CDR generator 2680 retrieves records from CDR/RTR database 2660 and retrieves reports from usage report database 2678. In some embodiments, micro-CDR generator 2680 determines a service usage amount for a micro-CDR service usage classification, assigns a usage accounting identifier to the micro-CDR report that identifies the usage as being accounted to a device user for the device associated with a device credential or user credential, and reports this amount of service usage to the carrier network 2666 (in the exemplary embodiment of FIG. 114, through JMS queue 2662 and FTP or publisher 2664). In some embodiments, micro-CDR generator 2680 determines a service usage amount for a micro-CDR service usage classification, assigns a usage accounting identifier to the micro-CDR report that identifies the usage as being accounted to a service sponsor, and reports this amount of service usage to carrier network 2666. In some embodiments, the micro-CDR for the sponsored service usage report also includes an identifier for a device credential or user credential. In some embodiments, the amount of service usage accounted for in the micro-CDR is mediated or reconciled off of a device or user bulk service usage accounting. In some embodiments, micro-CDR generator 2680 sends micro-CDRs to JMS queue 2662. In some embodiments, FTP or publisher 2664 retrieves micro-CDRs from JMS queue 2662 and pushes the micro-CDRs to carrier 2666.

In some embodiments, fraud analyzer 2682 retrieves records from CDR/RTR database 2660. In some embodiments, fraud analyzer 2682 retrieves reports form usage report database 2678. In some embodiments, fraud analyzer 2682 retrieves micro-CDRs from micro-CDR generator 2680. In some embodiments, fraud analyzer 2682 performs a fraud analysis using one or more of the record and report information sources consisting of CDR/RTR database 2660, usage report database 2678, and micro-CDR generator 2680. In some embodiments, fraud analyzer 2682 compares usage records associated with a specific device or user credential from one or more of CDR/RTR database 2660, usage report database 2678, and micro-CDR generator 2680 to determine if service usage is outside of pre-defined service usage policy behavior limits. In some embodiments, fraud analyzer 2682 compares service usage information associated with a specific device or user credential from one or more of CDR/RTR database 2660, usage report database 2678, and micro-CDR generator 2680 to determine if a pre-defined service usage limit has been reached or exceeded. In some embodiments, fraud analyzer 2682 compares service usage information associated with a specific device or user credential from one or more of CDR/RTR database 2660, usage report database 2678 and micro-CDR generator 2680 to determine if the specific device or user is exhibiting a service usage behavior that is outside of pre-defined statistical limits as compared to the service usage behavior of a device or user population. In some embodiments, fraud analyzer 2682 stores the results of its fraud analysis in data warehouse 2694. In some embodiments, fraud analyzer 2682 sends fraud alerts to carrier network 2666.

In some embodiments, a service design center is used to create service offers (e.g., service plan offers to purchase or activate a bulk service plan, an application specific service plan, an application group-specific service plan, a website service plan, a website-group service plan, etc.). In some embodiments, the service offers are published to DAS-enabled devices. To publish an offer to one or more devices in carrier device network 2668, carrier 2696 enters information in service design center 135. Service design center (SDC) 135 stores the offer set in SDC database 2692. The offer set then flows to device message queue 2688. In some embodiments, device message queue 2688 is a database-backed persistent queue. In some embodiments, when an end-user device with an authenticated service processor connects to offer set gateway 2686, offer set gateway 2686 pushes the offer set to the end-user device. In some embodiments, offer set gateway pushes the offer set to the end-user device at the next usage report. In some embodiments, the new offer is an offer to purchase or activate a service plan, and the offer notification is configured with offer acceptance features that allow the device user to select an option to purchase or activate the service offer in the device UI.

In some embodiments, a list of service offers that are available to a device group or user group, wherein the list of service offers is created in a service design center user interface, is stored in SDC database 2692 and published to the devices that belong to the device group or user group.

In some embodiments, an offer set is defined in service design center (SDC) 135. In some embodiments, this offer set includes multiple service plans that can be communicated to the device service processor for display to the device end user for service plan selection, purchase or activation through the device UI. In some embodiments, the offer set UI display is configured to allow the user to purchase or activate a service plan within the offer set in real-time or near-real-time. In some embodiments, the offer set information is received from the service controller and the offer set information is processed for UI display by a device service processor. In some embodiments, service processor offer set information processing and UI display is configured to allow the user to purchase or activate a service plan within the offer set in real-time or near-real-time. In some embodiments, the user's selection of a service plan for purchase or activation is communicated to the user via an offer set UI display that is configured by a service processor, and the service processor communicates with a service controller via a communication interface to the notification and offer set gateway 2686 to purchase or activate the service plan in real-time or near real-time. In some embodiments, the notification and offer set gateway 2686 communicates the user selection of service plan to the offer user selection receiver 2710, which then causes the service plan policy enforcement settings corresponding to the user's service plan selection to be implemented by communicating the user's service plan selection to network provisioning system 162 (or a subscriber management system, an order management system, mobile wireless center 132, billing 123, etc.), which in turn communicates with carrier network 2712 to cause the proper service play policy enforcement settings to be programmed in the various network elements responsible for service plan policy enforcement. In this manner, in some embodiments the network service policy enforcement required to implement the new service plan for the device can be provisioned in the various network elements responsible for network-based policy enforcement (e.g., aggregation/transport gateways 420 [e.g., PDN or GGSN], mobile wireless center 132 [e.g., HLR], AAA server 121, RAN/access gateway 410 [e.g., SGSN, PDSN], BSC 125). In some embodiments, the network service policy enforcement that implement the new service plan for the device can be provisioned in the various service processor device agents responsible for network based policy enforcement. In some embodiments, when the service plan policy provisioning is complete, the service controller communicates with the device service processor that the new service plan has been purchased or activated. In some embodiments, the service processor communicates a message from the service controller to the device UI that the new service plan has been purchased or activated.

In some embodiments, the service processor offer set information processing and UI display is configured to allow the user to purchase or activate a service plan within the offer set in real-time or near-real-time. In some embodiments, the user's selection of a service plan for purchase or activation is accepted by an offer set UI display that is configured by a service processor, and the service processor communicates with a service controller to allow the user to purchase or activate the service plan in real-time or near real-time, and the service plan policy settings are communicated by the service controller to the service processor so that the service processor policy enforcement agents that implement the new service plan for the device can be provisioned.

In some embodiments, the provisioning of the various network elements responsible for network-based policy enforcement (so that the device can receive the proper service plan allowances and policies) can take a considerable amount of time, for example, minutes or even longer, and this can create a poor user experience that is not real-time or near-real-time. In such cases, the service controller can create a temporary service lease by provisioning a subset of the various network elements responsible for network based policy enforcement to allow for a temporary service plan that is put in place before all of the required network elements responsible for network-based policy enforcement and possibly service usage accounting or billing can be provisioned. For example, the temporary lease can provision some or all of the required traffic path or data path processing elements to allow the device service usage classifications that correspond to the allowable service usage classifications in the service plan that the user has selected, but do not account the usage to the correct service usage accounting or billing system configuration until the provisioning of the accounting or billing elements is complete. As another example, during the temporary service lease period before the provisioning of the accounting or billing elements is complete, the service controller can track service usage that is incurred during the temporary service lease period and, after the provisioning of the accounting or billing elements is complete, transfer the service usage that is incurred during the temporary service lease period to the appropriate service usage record database so that the usage incurred during the temporarily service lease period is properly accounted for or billed. In another example embodiment, during the temporary service lease the service controller causes a temporary service provisioning to take effect in the various network elements responsible for network access control, wherein the temporary service provisioning provides for all or a subset of the necessary data path provisioning required to allow the service plan allowances that correspond to the access control policies for the service plan the user has selected, and the service usage incurred during the temporary service lease period is accounted to a temporary accounting other than the final accounting that will be in effect once the provisioning of the new user-selected service plan is in full effect. In some embodiments, the temporary accounting is a catch bucket account that is configured to track device usage during the temporary lease period. In some embodiments, the temporary accounting has a service usage rating other than the service usage rating that will be in effect after the new user-selected service plan is fully provisioned (e.g., a zero-rated accounting). In some embodiments, the service usage during the temporary lease period is tracked and then transferred to the appropriate service accounting after the new user selected service plan is fully provisioned.

In some embodiments, some of the delay in activating a new service plan directly on a device UI can be related to performing a credit check or user service standing check for the user's credit credentials or service account credentials. In such cases, embodiments similar to those disclosed above can be used to provide a temporary service lease, possibly with temporary service accounting that is eventually transferred to the final usage accounting. If during the temporary service lease period an indication is returned to the service controller that the user's credit or user service standing is insufficient to provide the service plan the user has selected, then the user can be notified of this issue, possibly with instructions on how to resolve the issue, and the temporary service lease can be revoked, thus disabling the network access permissions that would have been provided to the device if the credit check had been approved and the final service plan provisioning had taken place. In such embodiments, the usage can be tracked during the temporary lease period prior to revoking the temporary lease, and this service usage can be accounted to an account used for the purpose of tracking usage lost due to failed credit checks or failed user service standing checks. In some embodiments, the usage incurred during a temporary lease that is eventually revoked due to a failed credit check or failed user service standing check can be accounted back to another user accounting or billing, and in some embodiments this is in accordance with a user service agreement.

As one of ordinary skill in the art will now recognize, prior to the time that the network can fully provision a new service plan selected by a device user on a device UI, there are many additional related embodiments too numerous to list here to facilitate rapidly enabling device network access permissions that are identical to or similar to the network access permissions the device would eventually be allowed after the new user selected service plan is fully provisioned so that the device user can enjoy a relatively short time delay from the time the user selects a service plan for purchase or activation on a device and the time the network is fully provisioned to implement the new service plan.

In some embodiments, the service processor is configured to display one or more service plan offers to the device end user, and the time at which this display takes place is determined by what the user is doing with the device or where the device is located (e.g., the end-user device attempts to access the network, an application on the device attempts to access the network, a given application or set of applications are used or attempted to be used, the device enters a roaming state, etc.). In some embodiments, the service processor determines the time at which the one or more service offers are to be displayed to the device user by detecting what the user is doing with the device or a condition of the device caused by the user (e.g., that the device is roaming, etc.).

In some embodiments, a service design center is used to create device user notification messages (e.g., a service offer message, a service usage notification message, a message indicating an amount of bulk service used, a notification indicating an amount of a micro-CDR service classification used, a notification indicating that a bulk usage limit has been reached, a notification indicating that a micro-CDR usage classification usage limit has been reached, etc.). In some embodiments, the notification messages are published to a device service processor (or a group of device service processors that belong to a device group or a user group), and the service processor determines when a trigger condition exists for displaying a specific notification message. In some embodiments, a service usage notification trigger condition (e.g., a state of device usage such as a state of bulk service usage or attempted usage, application usage or attempted usage, website usage or attempted usage, home/roaming usage or attempted usage, cellular/Wi-Fi usage or attempted usage, etc.) is associated with each message. In some embodiments, the service processor on a device determines when the trigger condition has been met and displays a pre-stored notification message associated with the trigger condition. In some embodiments, a network element determines when the trigger condition has been met and uses the notification and offer set gateway 2686 via device message queue 2688 to transmit the notification message to the device for display by the device service processor. In some embodiments, a device service notification message includes a service usage update from CDR/RTR database 2660, which is sent through notification and offer set gateway 2686 via device message queue 2688. In some embodiments, a device service notification message includes a service usage update from micro-CDR generator 2680, which is sent through notification and offer set gateway 2686 via device message queue 2688. In some embodiments, service usage updates from one or more of CDR/RTR database 2660 or micro-CDR generator 2680 are sent through the notification and offer set gateway 2686 via device message queue 2688 on a recurring basis. In some embodiments, the recurring basis is based on a pre-determined amount of usage being reached (e.g., a pre-determined byte count, pre-determined time count or pre-determined percentage of a pre-determined limit, etc.). In some embodiments, the recurring basis is based on a usage notification update frequency or time interval.

Shared Service Plans

It may also be desirable to associate more than one mobile wireless communication device with a particular service account. There are many potential benefits of associating multiple wireless communication devices to a particular service account, including, for example, simplifying billing for the service provider and for the subscriber, and potentially reducing service costs for subscribers, e.g., by sharing the particular service account among multiple wireless communication devices. For example, a husband and wife may want to establish a single service account for both of their smart phones. As another example, a parent may want to establish a single service account for the several mobile phones used by family members. As another example, an employer may want to establish a single service account for multiple smart phones used by one or more of its employees. As another example, a person may want to establish a single service plan for multiple mobile wireless communication devices that the person uses, such as, for example, one or more of a smart phone, a tablet, a laptop, and an intermediate networking device that forwards traffic between a local area network and a wireless cellular network. There are many other examples of situations in which it might be desirable to associate multiple mobile wireless communication devices to a single service account (hereinafter referred to as a master service account).

In addition to associating multiple mobile wireless communication devices with a master service account, it may be desirable to share a service plan that is associated with the master service account among the multiple wireless communication devices associated with the master service account. For example, a parent might want to purchase a single service plan that is shared among all members of the family, or an employer might want to purchase a single service plan that is shared among multiple employees.

Today, subscribers who wish to share a service plan among multiple mobile wireless communication devices can only do so with several limitations. For example, creating a master service account and sharing a service plan among multiple wireless communication devices can require direct involvement of a service provider, e.g., a service provider customer representative. The service provider associates each of the mobile wireless communication devices with a master service account and with a service plan, and the associated mobile wireless communication devices then share the service plan. Often, subscribers cannot add or delete mobile wireless communication devices from the master service account without assistance from the service provider. In order to make changes to the master account, subscribers may need to call the service provider or may be required to log in to a web portal (e.g., by logging into a website), e.g., through a separate computing system. Another drawback is that although all of the mobile wireless communication devices associated with a master service account share a service plan, there are no controls to prevent a particular mobile wireless communication device from "hogging" allocations provided by the service plan. Another drawback is that although some service providers today allow sharing of voice minutes or text message allocations, they do not allow or limit sharing of a data plan. Yet another drawback is that today's shared service plans do not allow subscribers to associate different kinds of mobile wireless communication devices (e.g., a tablet and a smart phone) with a master service account. As a result of these drawbacks, the utility of shared service plans available today is limited.

User Selection of Intermediate Networking Device Services

In some embodiments, service activities of a mobile wireless communication device are monitored, and when service activities are detected that are not available to or permitted by service plans to which the user of the mobile wireless communication device subscribes, one or more actions can be taken. In some embodiments, service activities are monitored to detect whether the mobile wireless communication device is being used as an intermediate networking device. In some embodiments, information about and/or indications of the monitored service activities are reported to one or more entities, e.g., the user of the mobile wireless communication device, an administrator of one or more mobile wireless communication devices, a network element that compiles reporting information, a network based service controller, or another entity that can receive and act on the reported information about the monitored service activities. In some embodiments, actions taken in response to detecting particular service activities include one or more of: controlling data traffic of the detected service activities, measuring service usage consumed by the service activities, providing notifications about the detected service activities, and providing offers for service plans based on the detected service activities. In some embodiments, in response to detecting the service activities, one or more agents in the mobile wireless communication device provide to the user of the mobile wireless communication device a set of service plan options, accept service plan selections, provide service plan billing options, and/or accept service plan billing choices. In some embodiments, reports, notifications, service plan selection options, and/or service plan controls are presented through a user interface of the mobile wireless communication device. In some embodiments, reports, notifications, service plan selection options, and/or service plan controls are presented through a user interface of an end-point device connected to the mobile wireless communication device. In some embodiments, reports, notifications, service plan selection options, and/or service plan controls are presented through an application on the mobile wireless communication device or on the end-point device or through another computing device. In some embodiments, the application on the mobile wireless communication device, the end-point device, or another computing device connects to a network based application server. In some embodiments, reports, notifications, service plan selection options, and/or service plan controls are presented through a web browser interface connected to a web portal or network based server. In some embodiments, the web browser interface is presented through the user interface of the mobile wireless communication device 100, through an end-point device, or through another computing device. In some embodiments, in response to detecting the service activities, the user is automatically directed to a web server, e.g., provided a URL link. In some embodiments, in response to detecting the service activities, the user is directed to contact one or more service providers, e.g., provided a contact telephone number, email address, instant messaging identifier, or other account to which the user can obtain information.

Figure 77A:
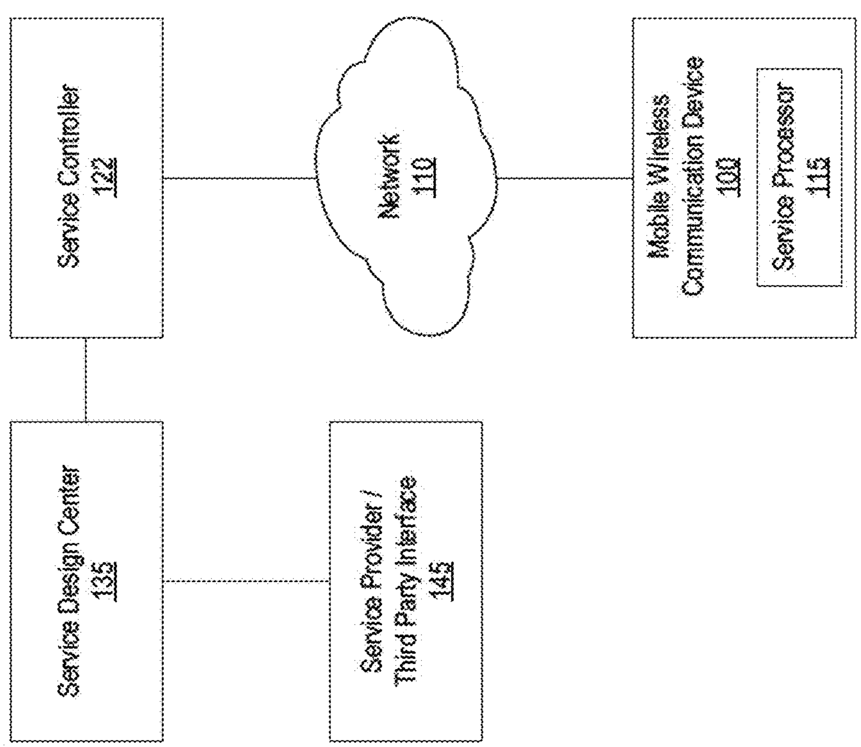
FIG. 77A illustrates a system of interconnected elements including a mobile wireless communication device communicatively coupled to a service controller through network in accordance with some embodiments.

FIG. 77A illustrates a system of interconnected elements including a mobile wireless communication device 100 communicatively coupled to a service controller 122 through a network 110. The service controller 122 in turn is communicatively coupled to a service design center (SDC) 135. The service design center 135 allows a service provider or a third party to design service plans and/or service plan bundles for mobile wireless communication devices, such as voice service plans, messaging service plans, data service plans, application specific service plans, and other service plans and service plan bundles as described herein. Representative embodiments of the SDC 135 are described in detail in related documents, including U.S. patent application Ser. No. 13/248,025, entitled "Service Design Center for Device Assisted Services." In some embodiments, a user of the mobile wireless communication device 100 obtains information about service plans and/or constituent elements of service plans from the service controller 122 through the network 110. In some embodiments, the user selects service plans to research, review, modify, and/or purchase for one or more wireless communication devices 100. In some embodiments, selection of service plans and/or constituent elements of service plans occurs through a user interface of the mobile wireless communication device 100. In some embodiments, the service controller 122 provides one or more options for service plans or constituent elements of a service plan to the user of the mobile wireless communication device 100 that match to a previous use of, present use of or attempt to access one or more communication services.

In some embodiments, a service provider or a third party, e.g., an equipment manufacturer or operating system supplier, interacts with the service design center 135 through a service provider/third party interface 145 to design service plans, service plan offers, elements of service plans, features of service plans, and characteristics of service plans that can be presented to the user of the mobile wireless communication device 100. In some embodiments, the service plans include features for providing intermediate networking device functions. In some embodiments, service plans designed through the service design center 135 are provided to the user of the mobile wireless communication device 100, e.g., through a user interface of the mobile wireless communication device 100 or through another device. In some embodiments, the service provider or the third party configures the format of information for display on the interface of the mobile wireless communication device 100.

Figure 77B:
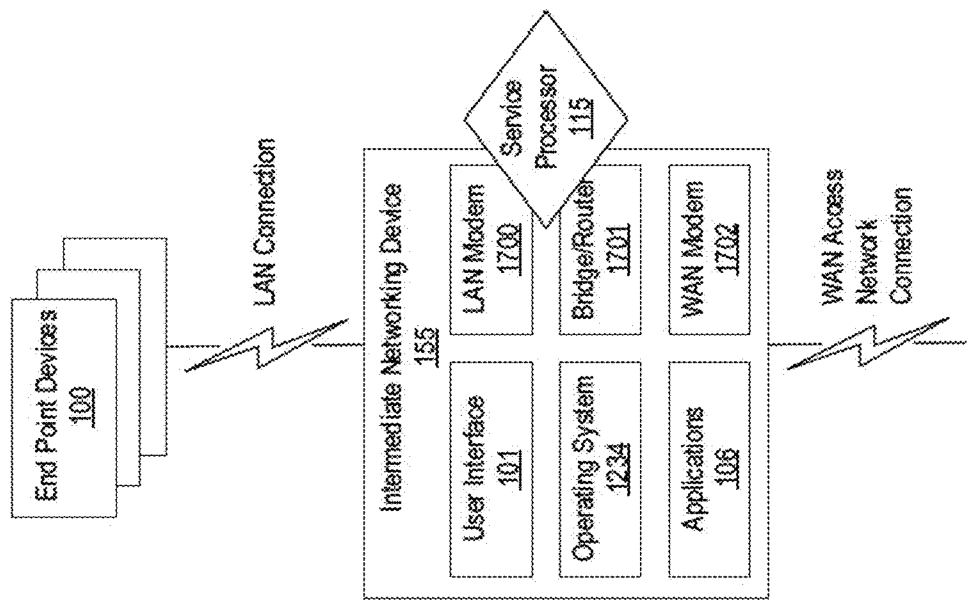
FIG. 77B illustrates a system including an intermediate networking device (IND) that can interconnect one or more end-point devices through a local area network (LAN) connection to a wide area network (WAN) through a WAN access network connection in accordance with some embodiments.

FIG. 77B illustrates a system including a representative embodiment of an intermediate networking device (IND) 155 that can interconnect one or more end-point devices through a local area network (LAN) connection to a wide area network (WAN) through a WAN access network connection. As would be understood by a person of ordinary skill in the art, mobile wireless communication devices 100, intermediate networking devices 155, and end-point devices can include many types of computing devices that have communication capabilities, e.g., mobile phones, computers, tablets, e-books, personal digital assistants, game consoles, and media storage and display systems. In some embodiments, the intermediate networking device 155 is a mobile wireless communication device 100 providing intermediate networking device service functions. In some embodiments, the intermediate networking device 155 is a mobile wireless communication device 100 that includes a service processor 115. In some embodiments, the service processor 115 in the intermediate networking device 155 communicates through a secure control communication link with the service controller 122 illustrated in FIG. 77A to manage and control intermediate networking device service functions of the intermediate networking device 155. In some embodiments, the intermediate networking device 155 includes a LAN modem for communication on the LAN connection to the one or more end-point devices. In some embodiments, the LAN connection is a wireless connection, e.g., a Wi-Fi connection or a Bluetooth connection. In some embodiments, the LAN connection is a wired connection, e.g., an Ethernet connection or a Universal Serial Bus (USB) connection. In some embodiments, the LAN connection supports communication with a plurality of end-point devices. In some embodiments, the LAN connection supports communication with a single end-point device. In some embodiments, the WAN access network connection is a wireless cellular access network connection, e.g., 2G, 2.5G, 3G, 3.5G, 4G, LTE, LTE Advanced or other cellular wireless protocol connection. In some embodiments, the WAN access network connection is a wired connection, e.g., a digital subscriber line (DSL) connection, a DOCSIS cable modem connection, or an optical fiber connection. In some embodiments, the intermediate networking device 155 includes multiple WAN modems to support connections to multiple WAN access networks, e.g., for WAN access networks that use different wireless communication protocols. In some embodiments, the intermediate networking device 155 connects to a single WAN access network at a time. In some embodiments, the intermediate networking device 155 connects to multiple WAN access networks simultaneously. In some embodiments, the intermediate networking device 155 forwards and/or routes traffic between the LAN connection and the WAN access network connection. In some embodiments, the intermediate networking device 155 includes the service processor 115 in whole or in part. In some embodiments, a mobile wireless communication device 100 (or other computing device with communication capabilities) inherently includes the ability to perform intermediate networking device functions, e.g., includes one or more LAN modems and one or more WAN modems; and the mobile wireless communication device 100 is configured to operate as an intermediate networking device 155, e.g., through operating system settings, and/or through a system level application, and/or through a user level application, and/or through obtaining or enabling a service plan that supports intermediate networking device functions for the mobile wireless communication device 100.

In some embodiments, the intermediate networking device 155 includes a user interface 101 through which service plan information, service plan controls and/or service plan notifications can be presented to the user and responses can be obtained from the user. In some embodiments, the intermediate networking device 155 includes software/firmware elements, including operating system components 1234, to control and manage functions of the intermediate networking device 155. In some embodiments, the intermediate networking device 155 includes one or more applications 106 that interwork with the operating system components 1234 and communication capabilities of the intermediate networking device 155 to provide services to the user of the intermediate networking device 155. In some embodiments, one or more operating system components and/or applications on the intermediate networking device 155 can assist in detecting, managing and controlling data traffic associated with an intermediate networking device function, e.g., a tethering or mobile "hot spot" function operating on the intermediate networking device 155. In some embodiments, tethering on the intermediate networking device 155 includes bridging or routing data traffic between the WAN access network connection and a single end-point device on the LAN connection, e.g., sharing a cellular wireless WAN connection with a single end-point device connected to the intermediate networking device 155 through a USB cable or through Bluetooth. In some embodiments, a mobile "hot spot" function on the intermediate networking device 155 includes bridging or routing data traffic between the WAN access network connection and multiple end-point devices on the LAN connection, e.g., sharing a cellular wireless WAN connection with multiple end-point devices connected to the intermediate networking device 155 through a Wi-Fi connection. In some embodiments, the number of end-point devices on the LAN connection for the mobile "hot spot" can be monitored and controlled. In some embodiments, data traffic for different end-point devices on the LAN connection that share the mobile "hot spot" function of the intermediate networking device 155 can be differentially controlled, e.g., some end-point devices allowed and other end-point devices blocked, different quality of service (QoS) levels applied to traffic for each end-point device, different throughput rates provided to each end-point device, etc.

In some embodiments, a wireless cellular service provider, e.g., a wireless cellular service provider or a mobile virtual network operator, provides the WAN access network connection. In some embodiments, the intermediate networking device 155 is a mobile wireless communication device 100 associated with one or more service plans provided by the wireless cellular service provider. In some embodiments, the wireless cellular service provider limits data traffic for intermediate networking device functions, e.g., tethering and mobile "hot spot" functions, of the intermediate networking device 155 to specific service plans. In some embodiments, the cellular wireless service provider may limit data service plans to disallow, block, or otherwise differentially control intermediate networking device functions. In some embodiments, the cellular wireless service provider may require the user of the intermediate networking device 155 to purchase an intermediate networking device data service plan or to pay additional fees associated with a data service plan to allow intermediate network device functions on the intermediate networking device 155. In some embodiments, operating system software of the intermediate networking device 155 can provide options for intermediate networking device functions, e.g., to enable a tethering function or a mobile "hot spot" function, on the intermediate networking device 155. In some embodiments, an application on the intermediate networking device 155 can provide intermediate networking device functions, e.g., a third party tethering application or a third party mobile "hot spot" application.

In some embodiments, one or more device agents on the mobile wireless communication device 100 detect an attempt to use or an actual use of one or more intermediate networking device functions, e.g., detection of data traffic associated with or attributable to a tethering application or to a mobile "hot spot" application. In some embodiments, in response to the detection of the intermediate networking device functions, one or more device agents determine whether the mobile wireless communication device 100 is authorized, configured, or otherwise approved to act as an intermediate networking device 155. In some embodiments, the one or more device agents verify whether the mobile wireless communication device 100 includes one or more service plans that allow the intermediate network device functions. In some embodiments, the one or more device agents communicate with the service controller 122 to determine whether intermediate networking device functions are allowed. In some embodiments, when no service plans that support intermediate networking device functions are found for the mobile wireless communication device 100, one or more actions are taken. In some embodiments, the actions taken include: providing an offer of one or more service plans to the user of the mobile wireless communication device 100, and/or providing one or more notifications to the user of the mobile wireless communication device 100 or to another entity, and/or controlling one or more aspects of communication services of the mobile wireless communication device 100. In some embodiments, service plan offers, notifications, and/or options for service controls are presented on the mobile wireless communication device 100, e.g., through the user interface. In some embodiments, service plan offers, notifications, and/or options for service controls are presented on an endpoint device connected to the mobile wireless communication device 100. In some embodiments, service plan offers, notifications, and/or options for service controls are presented through a separate mobile wireless communication device 100, e.g., through an administrative terminal, or through a device controlled by a device group manager.

In some embodiments, when no service plans that support intermediate networking device functions are found for the mobile wireless communication device 100, and an attempt to use or an actual use of one of more intermediate networking device functions is detected on the mobile wireless communication device 100, a limited intermediate networking device service is provided for the mobile wireless communication device 100. In some embodiments, the limited intermediate networking device service permits the mobile wireless communication device 100 to act as an intermediate networking device 155 with limited capabilities, e.g., connecting to a limited set of network addresses, connecting only to particular network endpoints, connecting to a specific network web server, or connecting to a particular network application server. In some embodiments, the limited intermediate networking device service is provided for a limited time. In some embodiments, the limited intermediate networking device service is provided for specific purposes, e.g., to provide for communication service management functions, such as providing the user limited access to information to obtain an intermediate networking device service plan. In some embodiments, the limited intermediate networking device service is provided on the mobile wireless communication device 100 to present information to and receive responses from the user of the mobile wireless communication device in order to review, select, and purchase an intermediate networking device service plan. In some embodiments, the presented information originates from local storage within the mobile wireless communication device 100, or from one or more network elements through the wireless access network, or from a combination of local storage and remote network elements.

In some embodiments, service plan offers, notifications, and/or service controls for an intermediate networking device service are presented to the user through an end-point device connected to the mobile wireless communication device 100. In some embodiments, service plan offers, notifications, and/or service controls for an intermediate networking device service are presented to the user through a web browser interface on the end-point device connected to a web server provided on the mobile wireless communication device 100, e.g., acting as a limited capability intermediate networking device 155. In some embodiments, the service plan offers, notifications, and/or service controls are presented to the user through an application interface on the end-point device connected to an application server provided on the mobile wireless communication device 100, e.g., acting as a limited capability intermediate networking device 155. In some embodiments, the service plan offers, notifications and/or service controls for an intermediate networking device service are presented to the user through a web browser interface on the end-point device connected through the mobile wireless communication device 100 to a network based web server (e.g., a "walled garden"), with the mobile wireless communication device 100 provided a limited intermediate networking device service allowance to redirect traffic from the end-point device connected to the mobile wireless communication device 100 to the network based web server. In some embodiments, the service plan offers, notifications and/or service controls for an intermediate networking device service are presented to the user through an application interface on the end-point device connected through the mobile wireless communication device 100 to a network based application server, with the mobile wireless communication device provided a limited intermediate networking device service allowance to pass specific application traffic from the end-point device connected to the mobile wireless communication device 100 to the network based application server. In some embodiments, the mobile wireless communication device 100 is provided a "limited" service usage allowance to act as an intermediate networking device 155 and communicate data traffic between particular end-point devices and particular network end points, e.g., for the purpose of presenting service plan offers, notifications and/or service controls for an intermediate networking device service to the user of the mobile wireless communication device 100.

In some embodiments, detection of active intermediate networking device functions (e.g., tethering or "mobile hot spot" service activity) on the intermediate networking device 155 includes use of one or more low level applications with root permissions. In some embodiments, the one or more low level applications search for one or more interface names in data traffic packets passing through the intermediate networking device 155. In some embodiments, certain interface names are identified with particular functional interfaces on the intermediate networking device 155, e.g., with a Wi-Fi interface operating in a "tethered" mode, or with a Wi-Fi interface operating in a "regular" mode, or with a USB interface. In some embodiments, data traffic of the intermediate networking device 155 flows through a WAN interface, e.g., in through a cellular wireless WAN interface from a cellular wireless access network, and also through a LAN interface, e.g., out through a Wi-Fi interface to a Wi-Fi local area network. (Similarly, in the opposite direction, data traffic can traverse the mobile wireless communication device 100 acting as an intermediate network device 155 by passing in through a LAN interface and out through a WAN interface.) Detection of whether intermediate networking device functions are active on the mobile wireless communication device 100 can include paying attention to data traffic associated with particular interfaces of the mobile wireless communication device 100. In some embodiments, detection of intermediate networking device service activity on the intermediate networking device 155 includes correlating destination Internet Protocol (IP) addresses of data traffic passing through certain LAN and WAN interfaces of the intermediate networking device 155. In some embodiments, data traffic flows with data packets having the same destination IP address that enter through a LAN interface and exit through a WAN interface (or conversely enter through a WAN interface and exit through a LAN interface) can indicate the presence of active intermediate networking device functions on the mobile wireless communication device 100, i.e., indicate that the mobile wireless communication device 100 is operating as an intermediate networking device 155. In some embodiments, matches of destination IP addresses for data traffic packets traversing specific interfaces of the intermediate networking device 155 can be detected. In some embodiments, suspected "tethered" or "hotspot" data traffic flows can be passed through a classification filter to determine if an IP address correlation exists. In some embodiments, the classification filter examines information contained in the data traffic packets for specific IP addresses and/or interface names and/or port numbers. In some embodiments, a table of IP addresses used for data traffic forwarding and routing is available in the mobile wireless communication device 100, and one or more device agents (or other low level applications) can examine the IP tables for information to determine whether intermediate networking device functions are active on the mobile wireless communication device 100. In some embodiments, the low level applications and/or device agents can check a combination of destination IP addresses and destination computing device port numbers in data traffic packets to identify unique traffic flows. In some embodiments, the low level applications operate in conjunction with a kernel portion of operating system software that is protected. In some embodiments, the low level applications have root access.

In some embodiments, an application operating in a user space is used for detection of intermediate networking device functions on the mobile wireless communication device 100. In some embodiments, the application is hidden. In some embodiments, the application operating in the user space searches through network routing tables maintained by an operating system on the mobile wireless communication device 100 to locate information that can indicate whether intermediate networking device functions are active on the mobile wireless communication device 100. In some embodiments, the application searches the network routing tables for IP addresses and port numbers. In some embodiments, the application searches the network routing tables for a correlation between IP addresses, port numbers and applications on the mobile wireless communication device 100. In some embodiments, the application searches the network routing tables for specific applications. In some embodiments, the application provides information about suspected or detected intermediate networking device functions to low level applications or operating system components operating at the kernel, e.g., for data traffic classification. In some embodiments, a list of suspected data traffic flows associated with intermediate networking device functions on the mobile wireless communication device 100 is compiled. In some embodiments, a list of detected data traffic flows associated with intermediate networking device functions on the mobile wireless communication device 100 is compiled. In some embodiments, the application searches for "proxy server" type applications that use specific ports operating on the mobile wireless communication device 100, e.g., "proxy apps" that use Android Debug Bridge (ADB) ports of an Android operating system, particularly for ADB forwarding. In some embodiments, the application examines ports opened by a hidden application (e.g., by an ADB daemon) and monitors data traffic on those ports to determine whether intermediate networking device functions are active on the mobile wireless communication device 100.

In some embodiments, an application blacklist is used to monitor for intermediate networking device functions on the mobile wireless communication device 100. In some embodiments, filters are applied to data traffic flows to detect known tethering and/or mobile "hot spot" applications. In some embodiments, a combination of low level applications and higher layer applications is used to detect intermediate networking device functions that are active (or an attempted use thereof) on the mobile wireless communication device 100.

Figure 78:
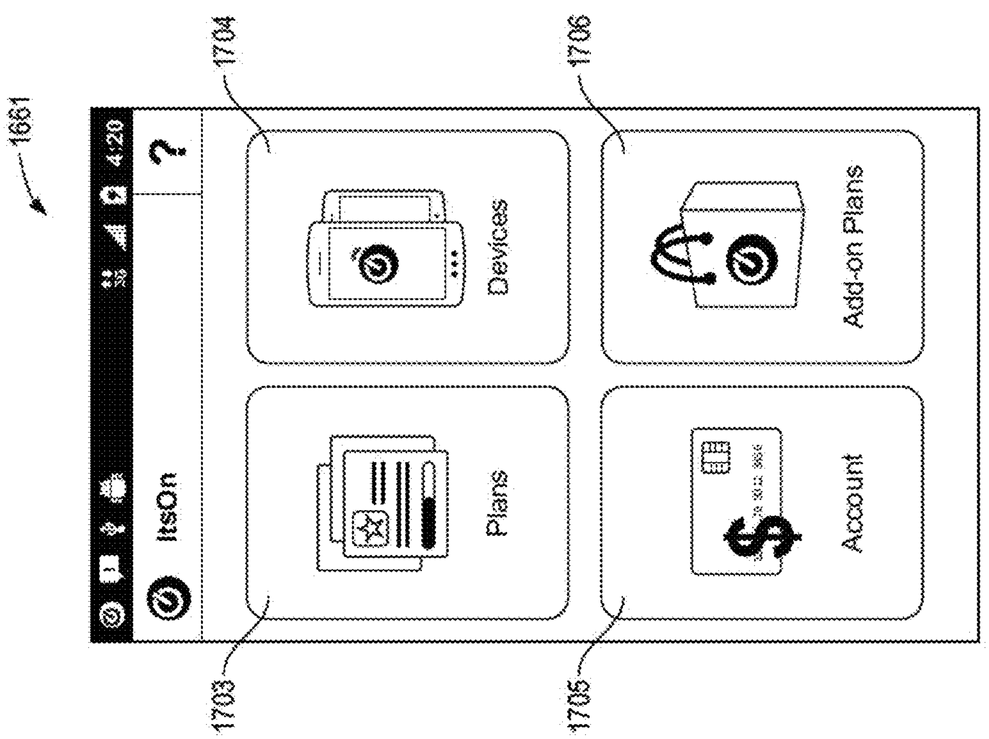
FIG. 78 illustrates a representative "Home" screen that can be presented to the user through the user interface of the mobile wireless communication device in accordance with some embodiments.

FIG. 78 illustrates a representative "Home" screen 1661 that can be presented to the user through the user interface of the mobile wireless communication device 100. In some embodiments, the user of the mobile wireless communication device 100 views the "Home" screen 1661 by selecting an icon for a service plan management application through the user interface of the mobile wireless communication device 100. Four different partitions of the "Home" screen 1661 provide the user access to subscribed service plans ("Plans" partition 1703), associated mobile wireless communication devices ("Devices" partition 1704), specific account information ("Account" partition 1705) and a store for viewing and purchasing additional service plans and service plan supplements ("Add-on Plans" partition 1706). Service plans presented through the user interface can include a variety of "base" service plans to which the user of the mobile wireless communication device 100 can subscribe. In some embodiments, the user of the mobile wireless communication device 100 can be required to purchase a "base" service plan in order to access services offered by a cellular wireless service provider. In some embodiments, the user of the mobile wireless communication device can purchase individual service plans without being required to subscribe to a "base" service plan. Service plans available to the user can include service plans that can be shared among multiple mobile wireless communication devices 100. Service plans can include "customizable" service plans that can be tailored to suit the user of the mobile wireless communication device 100. Service plan supplements can be appended to one or more subscribed to service plans. Supplemental service plans can provide access to specific services. Supplemental service plans can also provide for use of specific applications. Supplemental service plans can also provide for one time use or for recurring usage.

Figure 79:
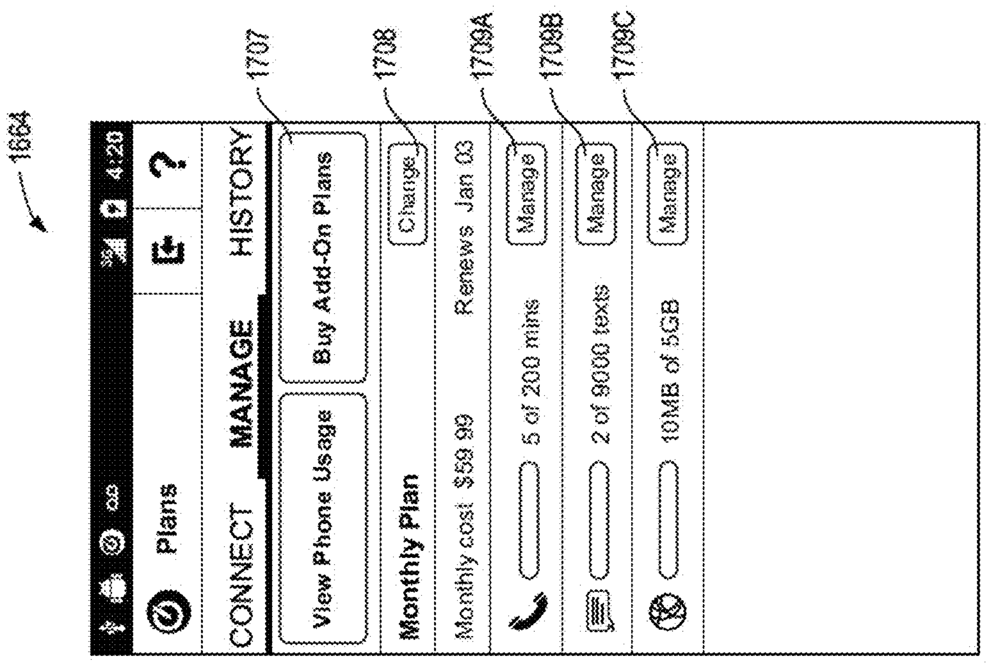
FIG. 79 illustrates a representative screen that may be presented through the user interface of the mobile wireless communication device to the user when selecting the "Plans" partition of FIG. 78 in accordance with some embodiments.

FIG. 79 illustrates a representative screen 1664 that may be presented through the user interface of the mobile wireless communication device 100 to the user when selecting the "Plans" partition 1703 of FIG. 78. A set of service plans may be presented to the user through the user interface 101 of the mobile wireless communication device 100 and may provide information about the set of service plans organized into a number of parallel "tabs." The tabs can present different information about service plans to the user of the mobile wireless communication device 100. In some embodiments, the user can review service plans subscribed to presently as well as previously subscribed to service plans. In some embodiments, the user can manage subscription to and sharing of service plans through one or more presented screens. In some embodiments, the user can track service usage of one or more service plans. In some embodiments, the user can view a service usage history for one or more presently subscribed to or previously subscribed to service plans.

The representative screen 1664 for service plan management includes several different "tabs" (of which a "Connect" tab, a "Manage" tab and a "History" tab are visible, while additional tabs can also be available, e.g., by scrolling right or left to view the additional tabs). The "Manage" tab of the "Plans" screen can provide a summary of service plans available to, subscribed to, or accessible by the user of the mobile wireless communication device 100. The service plans can be organized into one or more different groups according to relevant characteristics of the service plans. For example, a base service plan can include a set of service plan elements that provide for several different services to which the user of the wireless mobile communication device 100 can subscribe for a specified recurring time period, e.g., a monthly base service plan that includes quantities of voice minutes, text messages and data bytes. As illustrated in FIG. 79, the base service plan can include several individual service plan elements, such as a voice service plan element with access to voice communications for a number of minutes during a particular time period, e.g., 200 minutes per month. The base service plan can also include a messaging service plan element providing a capability to receive and transmit a number of messages each time period, e.g., 9000 texts per month. Messages can be text messages as illustrated, or more generally can be messages of one or more media types, e.g., audio messages, picture messages, video messages, and multimedia messages. The base service plan can also include a quantity of data units per time period, e.g., 5 GB per month as shown, that can be transmitted and received through the wireless network for one or more applications or operating system services. The mobile wireless communication device 100 can also include a number of additional service plans that apply for a specified time period, e.g., a monthly pass to access an Internet site or service (not shown). The mobile wireless communication device 100 can also include a number of additional service plans that apply for a specified usage, e.g., a single use service plan to download and view a movie (not shown).

As shown in FIG. 79, a summary of current service usage for each service plan element of a base service plan can be shown on the "Manage" screen 1664. For example, as shown in FIG. 79, the user of the mobile wireless communication device 100 has used a total of 5 voice minutes out of an allocation of 200 voice minutes for the month. In addition, the user has used 2 text messages out of an allocation of 9000 text messages for the month. In addition, the user has used 10 MB out of an allocation of 5 GB for the month. The "Manage" screen 1664 also includes a graphical representation of accumulated service usage for each service plan element. In some embodiments, the graphical representation of accumulated service usage updates in (near) real time. In some embodiments, the display of the graphical elements for accumulated service usage of a service plan element changes based on an amount of service usage, e.g., different colors for different amounts of service usage available or used. In some embodiments, the "Manage" screen 1664 also provides an accumulated service usage charge for each respective service plan element included in the service plan (not shown). In some embodiments, selecting a "Manage" button 1709 within a specific service plan element area can access additional detailed information about the specific service plan element. The user of the mobile wireless communication device 100 can also access screens by which the base service plan can be changed by selecting a change icon (e.g., button 1708). Supplemental service plans, e.g., monthly passes and single use service plans, can be added to the base service plan by the user of the mobile wireless communication device 100 by selecting a "Buy Add-On Plans" button 1707.

Figure 80:
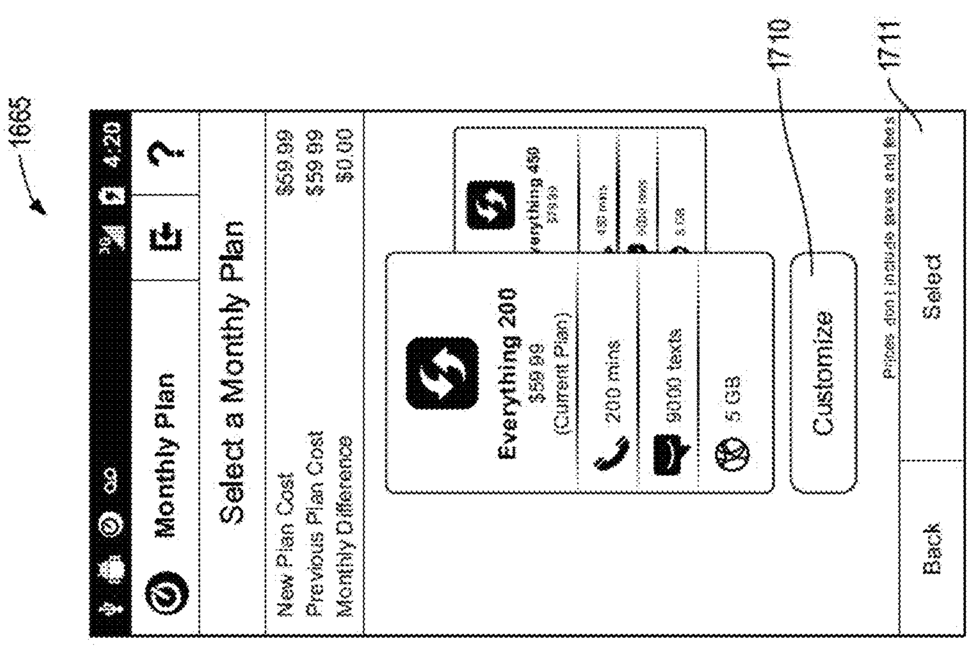
FIG. 80 illustrates a representative screen that provides to the user of the mobile wireless communication device a set of monthly service plans from which to select a monthly service plan to subscribe in accordance with some embodiments.

FIG. 80 illustrates a representative screen 1665 that provides to the user of the mobile wireless communication device 100 a set of monthly service plans from which to select a monthly service plan to subscribe. In some embodiments, the user of the mobile wireless communication device 100 accesses the monthly service plan selection screen 1665 by selecting the change button/icon 1708 illustrated in FIG. 79. In some embodiments, the monthly service plan bundle selection screen 1665 is accessed by selecting the "Plans" partition 1703 illustrated in FIG. 78 when no base service plan is presently subscribed to. Through the user interface 101 of the mobile wireless communication device 100, the user can select from several different monthly service plans, summaries of which can be displayed simultaneously to the user. The monthly service plan selection screen 1665 illustrated in FIG. 80 shows two different monthly service plans from a set of available service plans. The summaries of the monthly service plans can include information about the service plan, such as a title, a cost, and key features of the service plan, e.g., an amount of service usage for each service plan element included in the monthly service plan. As shown in FIG. 80, the monthly service plan selection screen 1665 can also indicate when a service plan is currently subscribed to. The user of the mobile wireless communication device 100 can select one of the monthly service plans (e.g., the "Everything 200" plan) by selecting the "Select" button. The graphical display through the user interface 101 can represent a virtual carousel of monthly service plans through which the user can scroll to view different monthly service plans available for subscription. The "largest" displayed monthly service plan bundle can be selected with the "Select" button 1711. A summary of a comparison of a selectable monthly service plan to a previously (or presently) subscribed to monthly service plan can also be displayed through the user interface 101. Numerous service plans can be available, and a limited number of service plans can be displayed simultaneously to the user through the user interface 101. The virtual carousel graphical interface can provide for browsing by the user of the mobile wireless communication device 100 through the different service plans. The user can also customize a service plan by selecting the "Customize" button 1710 for a particular service plan.

Figure 81:
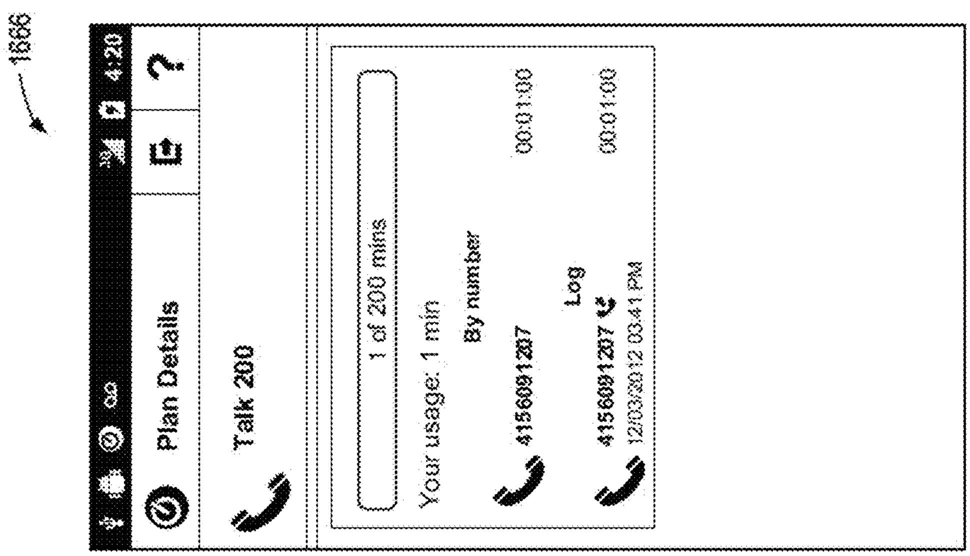
FIG. 81 illustrates a representative screen that details usage of a voice service plan element of the monthly service plan to which the user of the mobile wireless communication device currently subscribes in accordance with some embodiments.
Figure 82:
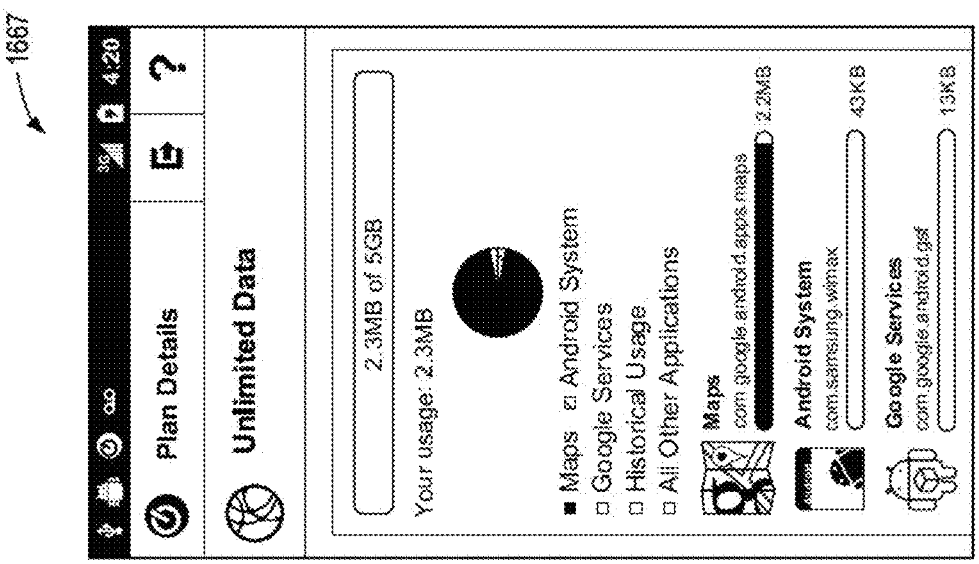
FIG. 82 illustrates a representative screen that details usage of a data service plan element of the monthly service plan to which the user of the mobile wireless communication device currently subscribes in accordance with some embodiments.

FIG. 81 and FIG. 82 illustrate representative screens that detail usage of particular service plan elements of a service plan. FIG. 81 illustrates a representative screen 1666 that details usage of a voice service plan element of the monthly service plan to which the user of the mobile wireless communication device 100 currently subscribes. In some embodiments, screen 1666 can be reached by selecting the "Manage" button 1709A within the summary area of the voice service plan element illustrated in screen 1664 of FIG. 79. As shown by screen 1666 in FIG. 81, the user of the mobile wireless communication device 100 can obtain detailed service usage information for the voice service plan, and the detailed service usage can be displayed by the number accessed and/or by a call log organized by date and time. FIG. 82 illustrates a representative screen 1667 that details usage of a data service plan element of the monthly service plan to which the user of the mobile wireless communication device 100 currently subscribes. In some embodiments, screen 1667 can be reached by selecting the "Manage" button 1709C within the summary area of the data service plan element illustrated in screen 1664 of FIG. 79. As shown by screen 1667 in FIG. 82, the user of the mobile wireless communication device 100 can obtain detailed service usage information for the data service plan, and the detailed service usage information can be displayed grouped according to specific applications and/or application types that consumed a portion of the service usage allocation for the data service plan. In the representative example of screen 1667 illustrated in FIG. 82, most of the consumption of data service usage by the mobile wireless communication device 100 for the data service plan is attributed to a particular application, e.g., the "Maps" application, while some additional service usage is also attributed to the operating system, e.g., the "Android" system, and to a service provider, e.g., the "Google" services.

Figure 83:
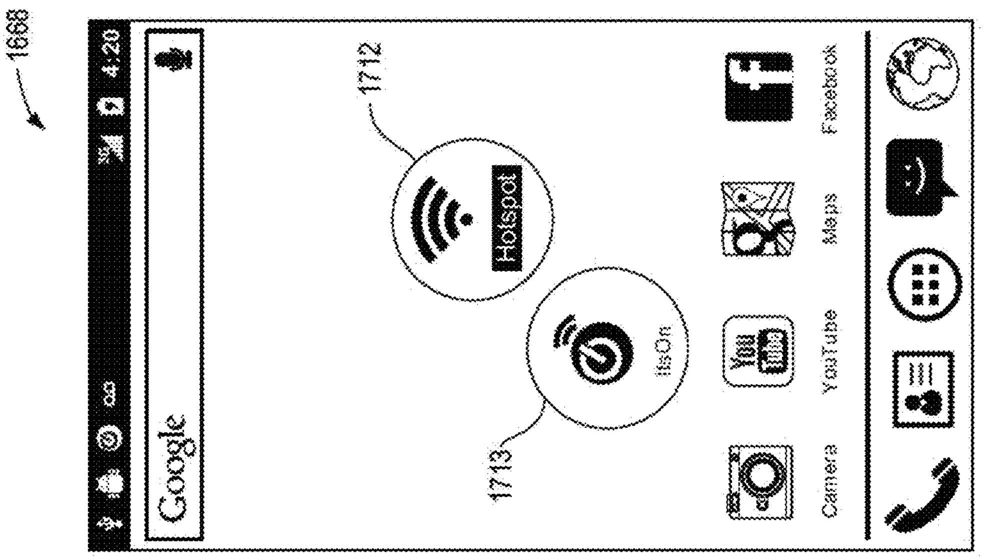
FIG. 83 illustrates a representative screen displaying a number of applications loaded on the mobile wireless communication device in accordance with some embodiments.

FIG. 83 illustrates a representative screen 1668 displaying a number of applications loaded on the mobile wireless communication device 100. In some embodiments, one or more of the applications displayed are pre-loaded into the mobile wireless communication device 100. In some embodiments, one or more of the applications displayed are loaded into the mobile wireless communication device 100 during an activation process for the mobile wireless communication device 100. In some embodiments, the user of the mobile wireless communication device 100 downloads one or more applications to the mobile wireless communication device 100. In some embodiments, one or more applications provide for management and control of wireless communication services on the mobile wireless communication device 100. In some embodiments, one or more applications work together with elements of the operating system to assist in managing and controlling communication services on the mobile wireless communication device 100. In some embodiments, the mobile wireless communication device 100 can be configured to operate as an intermediate networking device 155. In some embodiments, the user configures the mobile wireless communication device 100 to operate as an intermediate networking device 155 through a settings menu. In some embodiments, the settings menu is integrated with the operating system software on the mobile wireless communication device 100. In some embodiments, the user configures the mobile wireless communication device 100 to operate as an intermediate networking device 155 through settings of an application. In some embodiments, the user configures the mobile wireless communication device 100 to operate as an intermediate networking device 155 by starting or using an application on the mobile wireless communication device 155. In some embodiments, the user configures the mobile wireless communication device 100 to operate as an intermediate networking device 155 by connecting one or more end-point devices to the mobile wireless communication device 100.

In some embodiments, detection that the mobile wireless communication device 100 is operating as an intermediate networking device 155 includes recognizing installation of, activation of, an attempt to use, or an actual use of an application that provides intermediate networking device functions on the mobile wireless communication device 100. In some embodiments, detection that the mobile wireless communication device 100 is operating as an intermediate networking device 155 includes detecting data traffic from one or more end-point devices connected to the mobile wireless communication device 100.

Screen 1668 of FIG. 83 includes a representative communication services management application 1713, the "ItsOn" application, and a representative intermediate network services application 1712, the "Hotspot" application. In some embodiments, launching the communication services management application 1713, e.g., the "ItsOn" application, presents the user of the mobile wireless communication device 100 with a version of screen 1661 of FIG. 78 displayed through the user interface 101 of the mobile wireless communication device 100. In some embodiments, launching the intermediate networking services application 1712, e.g., the "Hotspot" application 1712, configures the mobile wireless communication device 100 to operate as an intermediate networking device 155. In some embodiments, the intermediate networking services application 1712 enables communication of data traffic between a LAN connection and a WAN access network connection. In some embodiments, the intermediate networking services application 1712 enables communication of data traffic between one or more end-point devices connected to the mobile wireless communication device 100 and a WAN access network. In some embodiments, the intermediate networking services application 1712 enables communication of data traffic between a wireless LAN connection, e.g., a Wi-Fi connection, of the mobile wireless communication device 100 and a wireless WAN access network connection, e.g., a 3G/4G/LTE cellular wireless access network connection, of the mobile wireless communication device 100. In some embodiments, launching the intermediate networking services application 1712 provides for limited communication between the wireless LAN connection and the wireless WAN access network connection. In some embodiments, software, firmware, hardware or a combination thereof determines that an intermediate networking services function is active on the mobile wireless communication device 100. In some embodiments, detection of the active intermediate networking services function on the mobile wireless communication device 100 is performed by one or more of: an operating system function, a kernel function, a system application, and a user application. In some embodiments, operating system software provides an option to enable the intermediate networking services function on the mobile wireless communication device 100. In some embodiments, a separate software application enables the intermediate networking services function on the mobile wireless communication device 100.

Figure 84:
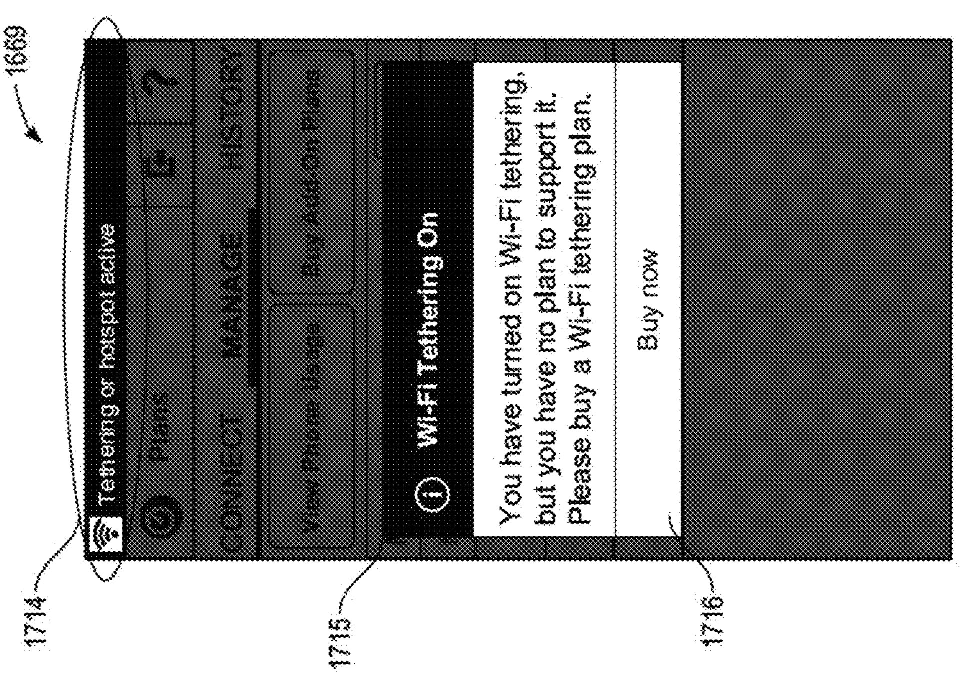
FIG. 84 illustrates a representative screen displayed through the user interface of the mobile wireless communication device when the intermediate network services function is enabled on the mobile wireless communication device and intermediate networking services are not authorized for the mobile wireless communication device or the user of the mobile wireless communication device in accordance with some embodiments.

FIG. 84 illustrates a representative screen 1669 displayed through the user interface 101 of the mobile wireless communication device 100 when the intermediate network services function is enabled on the mobile wireless communication device 100 and intermediate networking services are not authorized for the mobile wireless communication device 100 or the user of the mobile wireless communication device 100. In some embodiments, a notification message 1715 is displayed to the user of the mobile wireless communication device 100. In some embodiments, the notification message 1715 indicates the status of the intermediate networking services function, e.g., "Wi-Fi Tethering On," and informs the user of the mobile wireless communication device 100 about whether the intermediate networking services function is supported by currently subscribed to service plans for the mobile wireless communication device 100. In some embodiments, the notification message 1715 includes an option to review, select, and/or purchase a service plan that supports the intermediate networking services function. In some embodiments, an alert message 1714 is presented to indicate that the intermediate networking services function is active, e.g., "Tethering or hotspot active" as shown at the top of screen 1669 in FIG. 84. In some embodiments, the notification message 1715 includes a list of service plans that the user of mobile wireless communication device 100 can directly purchase by selecting an applicable service plan from the notification message 1715 (not shown). In some embodiments, by selecting a button, e.g., the "Buy now" button 1716, of the notification message, the user of the mobile wireless communication device 100 can access a catalog of service plans that provide for the intermediate networking services function. In some embodiments, the data traffic associated with detected active intermediate networking device functions are blocked until the user of the mobile wireless communication device 100 obtains an applicable service plan that supports the detected active intermediate networking device functions. In some embodiments, data traffic associated with detected active intermediate networking device functions is partially blocked until the user of the mobile wireless device 100 obtains an applicable service plan, e.g., by allowing data traffic for obtaining and purchasing service plans but disallowing other data traffic.

Figure 85:
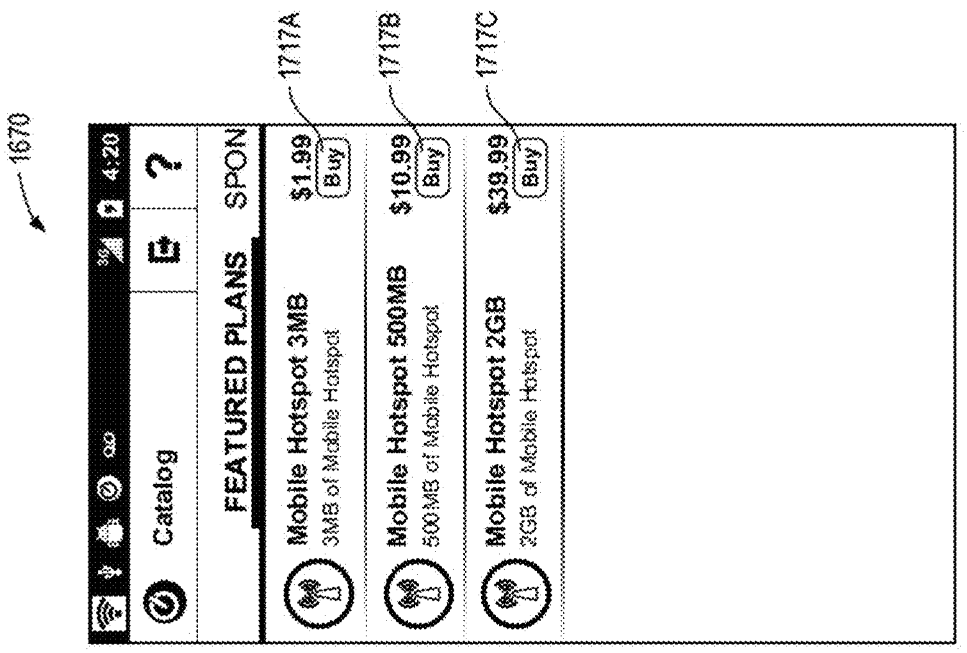
FIG. 85 illustrates a representative screen that presents to the user of the mobile wireless communication device, through the user interface, a selection of service plans that support intermediate networking services in accordance with some embodiments.

FIG. 85 illustrates a representative screen 1670 that presents to the user of the mobile wireless communication device 100, through the user interface, a selection of service plans that support intermediate networking services. In some embodiments, the service plan selection screen 1670 is presented in response to the user choosing to view a catalog of plans after receiving a notification that intermediate networking service function is not supported by currently subscribed to service plans. In some embodiments, the selection of service plans is presented as a list of service plans under a "Featured Plans" tab of a service plan catalog. In some embodiments, the selection of service plans presented to the user of the mobile wireless device 100 is matched to an attempted use, an actual use, a present use, a past use, or a combination of uses of intermediate networking services by the user of the mobile wireless communication device 100. In some embodiments, the presented selection of service plans includes service plans with different amounts of service usage for each service plan, e.g., different allocations of data as illustrated by the 3 MB, 500 MB and 2 GB "Mobile Hotspot" service plans shown on screen 1670 of FIG. 85. In some embodiments, the user of the mobile wireless communication device 100 can select one of the service plans provided in the selection of service plans screen 1670, e.g., by choosing one of the "Buy" buttons/icons 1717A, 1717B, 1717C. In some embodiments, the user is presented additional information about the chosen service plan in response to choosing to "Buy" the service plan.

In some embodiments, the selection of service plans presented to the user of the mobile wireless communication device 100 includes adding intermediate networking device functions to an existing service plan, e.g., to a base service plan or a data service plan. In some embodiments, the selection of service plans presented includes different service plans having different levels of intermediate networking service functions, e.g., tethering service plans for communication to one end-point device, "hot spot" plans for communication with multiple end-point devices. In some embodiments, the selection of service plans includes intermediate networking device (IND) service plans for a set of one or more specific applications. In some embodiments, the selection of service plans includes "sponsored" IND service plans that are wholly or in part subsidized by a service provider or third party. In some embodiments, the selection of service plans includes sponsored service plans associated with specific network end points, e.g., specific websites or application servers. In some embodiments, the selection of service plans includes offers of service plans that work with specific applications (or types of applications) when connected to specific application servers, web portals or other pre-determined network end points.

In some embodiments, in response to detection of active intermediate networking device functions on the mobile wireless communication device 100, one or more data traffic flows through the mobile wireless communication device 100 are monitored and/or controlled. In some embodiments, data traffic flows are classified into streams associated with different service activities. In some embodiments, different data traffic flows or streams of the mobile wireless communication device 100 are differentially controlled. In some embodiments, differential control of data traffic associated with intermediate networking device services is accomplished using one or more device agents operating in the mobile wireless communication device 100, and/or one or more device agents (or equivalents) operating in one or more end-point devices, and/or one or more network elements, e.g., the service controller 122. In some embodiments, data traffic destined for or originating from the mobile wireless communication device 100 is accounted for and/or controlled differently than data traffic destined for or originating from an end-point device connected to the mobile wireless communication device 100. In some embodiments, service plans are offered to the user of the mobile wireless communication device 100 in response to detection of intermediate networking device functions on the mobile wireless communication device 100, and the offered service plans include differential control of data traffic streams. In some embodiments, measuring service usage on an intermediate networking device 155 (including a mobile wireless communication device 100 with active intermediate networking device functions, with or without an IND service plan, or a mobile wireless communication device 100 acting as a "limited" capability IND), includes differentially accounting for data traffic streams, e.g., based on the device from which the data traffic originates or terminates, and/or based on the application or application server from which the data traffic originates or terminates, and/or based on a service activity classification of the data traffic. In some embodiments, differential accounting includes measuring an amount of service usage, e.g., bytes or time. In some embodiments, data traffic streams are accounted for or controlled differently when destined to or originating from an end-point device connected to the intermediate networking device 155, or when destined to or originating from the intermediate networking device 155. In some embodiments, data traffic streams for each end-point device connected to the intermediate networking device 155 can be differentially accounted for and differentially controlled. In some embodiments, data traffic streams of the intermediate networking device 155 can be counted against different service plans, e.g., data traffic sent to or originating from end-point devices can be accounted to a service plan with intermediate networking service capabilities, and data traffic sent to or originating directly from the intermediate networking device 155 can be accounted to a different service plan. In some embodiments, different traffic streams of the intermediate networking device 155 can be classified and accounted to different service plans. In some embodiments, different traffic streams of the intermediate networking device 155 can be associated with different service activities and accounted to different service plans accordingly.

In some embodiments, in response to detection of active intermediate networking device functions on the mobile wireless communication device 100, the user is automatically subscribed to (or offered) a sponsored service plan. In some embodiments, the sponsored service plan provides for limited intermediate networking device capabilities for one or more end-point devices to perform a limited set of service activities, e.g., to access a limited set of network endpoints, web addresses, to use specific applications, etc. In some embodiments, the sponsored service plan provides for a limited service usage amount and/or a limited service usage time period. In some embodiments, upon the exhaustion or expiration of the sponsored service plan, the user of the mobile wireless communication device 100 is offered one or more additional service plans that provide for intermediate networking device services.

Figure 86:
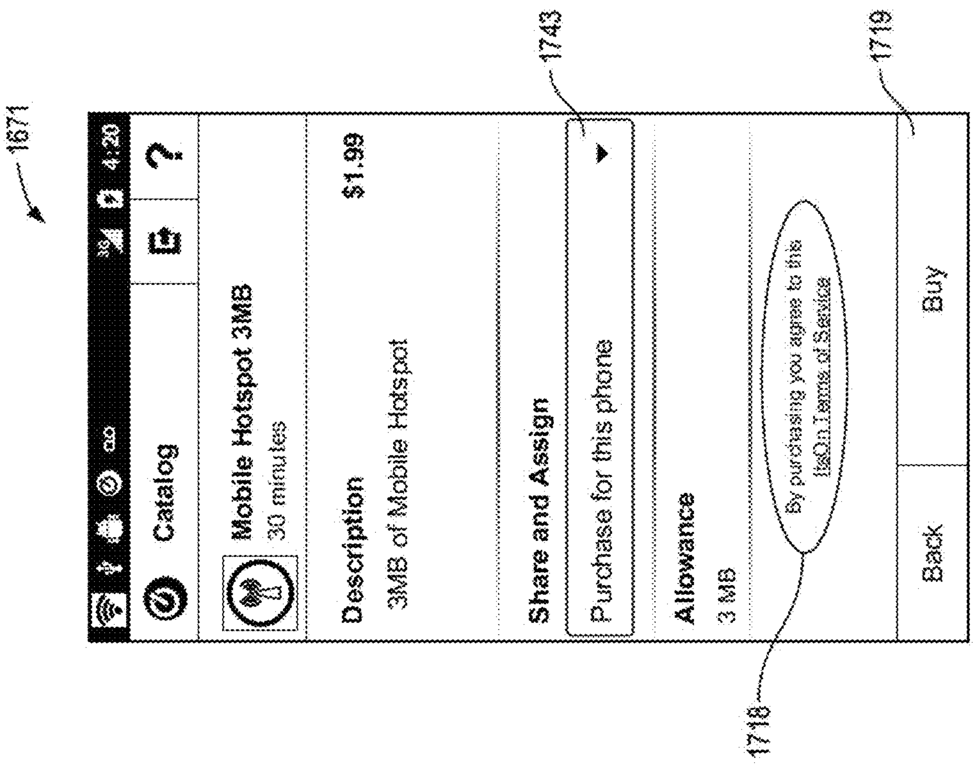
FIG. 86 illustrates a representative screen that presents to the user of the mobile wireless communication device, through the user interface, additional detailed information about a service plan selected by the user of the mobile wireless communication device from the set of service plans presented in FIG. 85.

FIG. 86 illustrates a representative screen 1671 that presents to the user of the mobile wireless communication device 100, through the user interface 101, additional detailed information about a service plan selected by the user of the mobile wireless communication device from the set of service plans presented in screen 1670 of FIG. 85. The 3 MB "Mobile Hotspot" service plan provides for a service usage allowance of 3 MB to be used for a "Mobile Hotspot" intermediate networking service through the mobile wireless communication device 100 at a cost of $1.99. In some embodiments, the user of the mobile wireless communication device 100 is presented a set of additional options on use of the selected service plan, e.g., to purchase the service plan for the particular wireless communication device 100, share the service plan with another mobile wireless communication device 100, and/or assign the service plan to another mobile wireless communication device 100. In some embodiments, the sharing and assignment options are presented as a drop down menu 1743 as illustrated by screen 1671 of FIG. 86. In some embodiments, a service plan can include a time limitation in addition to a service usage allowance, e.g., limited to 30 minutes once activated as shown for the 3 MB "Mobile Hotspot" service plan in screen 1671. In some embodiments, the service plan includes a service usage allowance (e.g., 3 MB) without a limitation on time (e.g., use the 3 MB service usage allowance until entirely consumed). In some embodiments, the service plan includes a limitation on time of use without an explicit limit on the amount of data consumed during the time period of the service plan (e.g., an unlimited service usage allowance for a specified time period). In some embodiments, the service plan includes a limitation on applications that can be used with the service plan. In some embodiments, the service plan includes a limitation on network endpoints (or network addresses) that can be accessed using the service plan. In some embodiments, the user of the mobile wireless communication device 100 can select the viewed service plan illustrated in screen 1671 by choosing a "Buy" button/icon 1719, which confirms the selection of the service plan. In some embodiments, the service plan includes a "terms and conditions" agreement (e.g., accessed by clicking link 1718 of screen 1671 of FIG. 86) to which the user of the mobile wireless communication device 100 agrees by electing to purchase the service plan.

Figure 87:
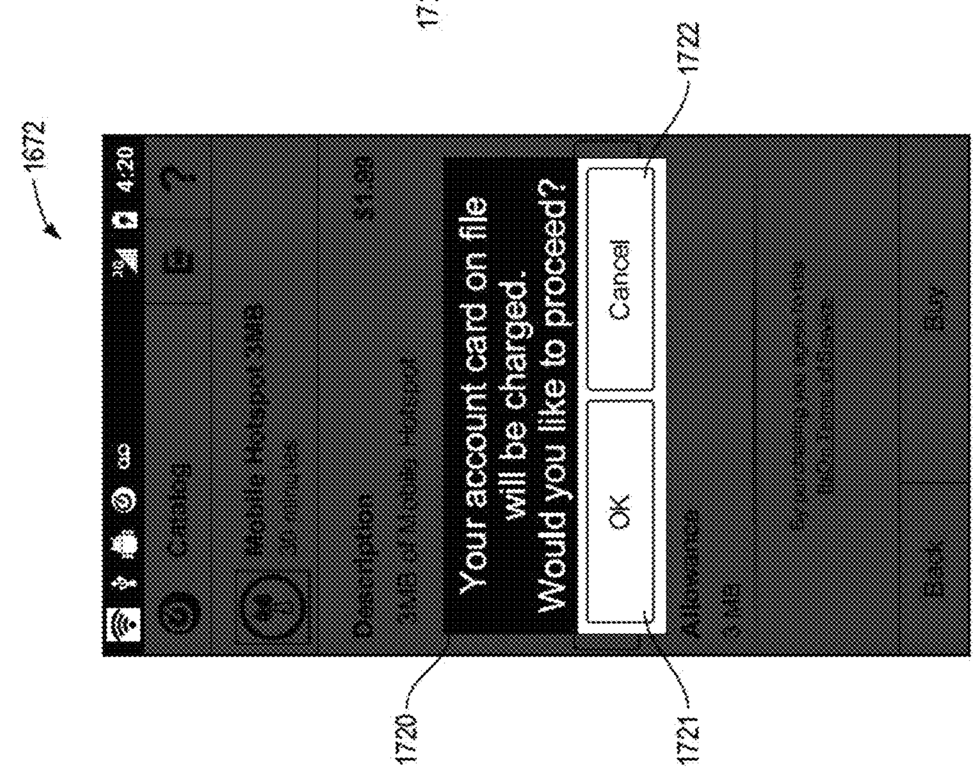
FIG. 87 illustrates a representative screen that presents, through the user interface, an overlay message to the user of the mobile wireless communication device indicating that in response to choosing the buy the service plan a particular account will be charged for the service plan in accordance with some embodiments.

FIG. 87 illustrates a representative screen 1672 that presents, through the user interface 101, an overlay message 1720 to the user of the mobile wireless communication device 100 indicating that in response to choosing the buy the service plan a particular account will be charged for the service plan. In some embodiments, the user of the mobile wireless communication device 100 is presented an option to approve the purchase (selecting the "OK" button/icon 1721) or to cancel the purchase (selecting the "Cancel" button/icon 1722). In some embodiments, the user is charged for the service plan upfront, i.e., as a pre-paid service plan. In some embodiments, the user is billed for the service plan later, i.e., as a post-paid service plan. In some embodiments, the user is presented one or more screens in which payment information is entered to purchase the service plan. In some embodiments, the user is presented a selection of accounts among which to choose to purchase the service plan.

Figure 88:
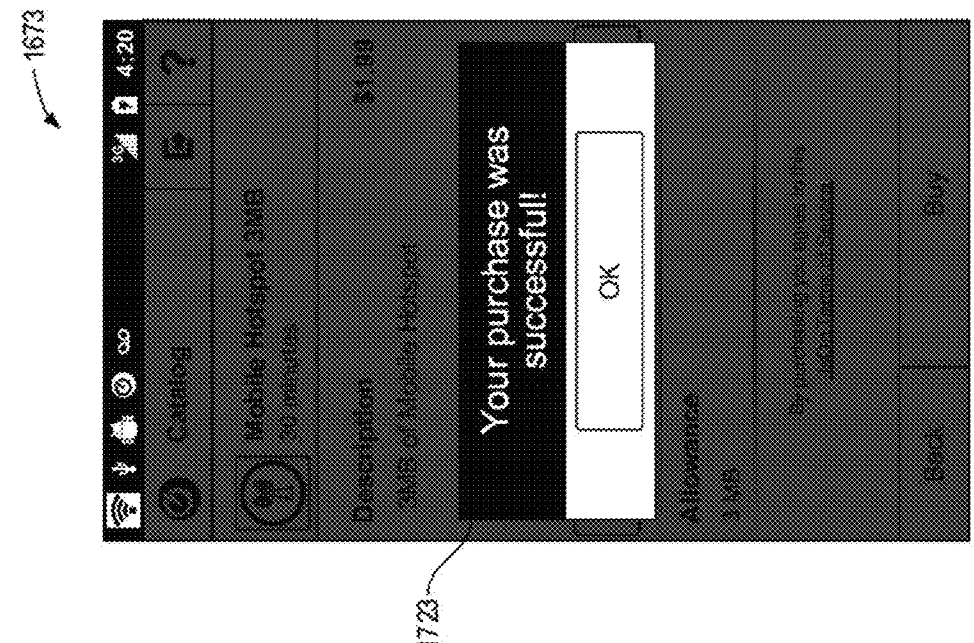
FIG. 88 illustrates a representative screen that presents, through the user interface, an overlay message to the user of the mobile wireless communication device indicating that purchase of the service plan is successful in accordance with some embodiments.

FIG. 88 illustrates a representative screen 1673 that presents, through the user interface 101, an overlay message 1723 to the user of the mobile wireless communication device 100 indicating that purchase of the service plan was successful. In some embodiments, the user is provided with the service plan without an additional confirmation message. In some embodiments, data traffic associated with intermediate networking device functions that was blocked, restricted, disallowed or otherwise controlled by the mobile wireless communication device 100 resumes after the user of the mobile wireless communication device 100 obtains an applicable service plan. In some embodiments, the user is presented an indication that the purchase of the service plan is not successful, e.g., when account information is not available. In some embodiments, when the service plan purchase is not successful, data traffic associated with intermediate networking device functions continues to be restricted until an application service plan is obtained.

Figure 89:
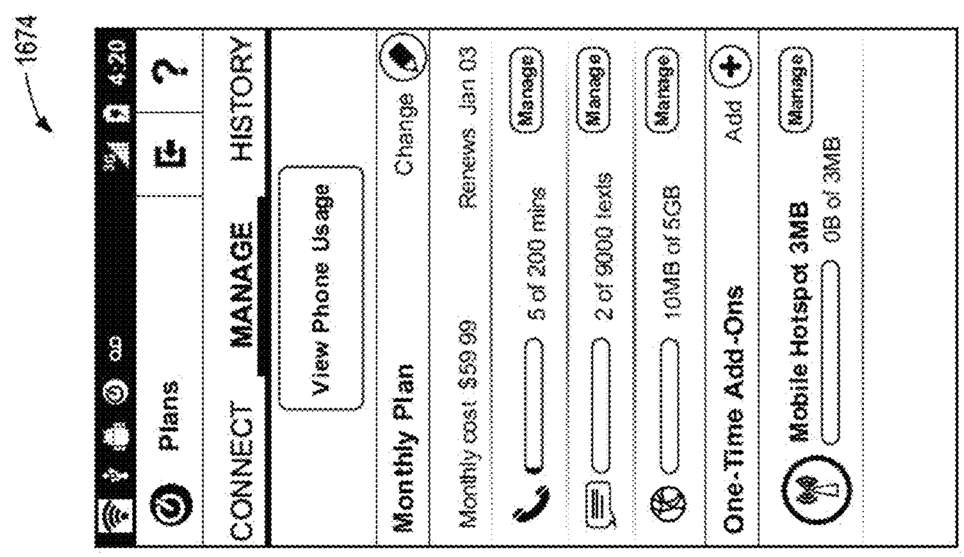
FIG. 89 illustrates a representative screen that presents, through the user interface, a summary of service plans to which the user of the mobile wireless communication device currently subscribes in accordance with some embodiments.

FIG. 89 illustrates a representative screen 1674 that presents, through the user interface 101, a summary of service plans to which the user of the mobile wireless communication device 100 currently subscribes. Representative screen 1674 represents an update of representative screen 1664 of FIG. 79 and includes the purchased intermediate networking device service plan. As illustrated in screen 1674, the mobile wireless communication device 100 includes access to a "Mobile Hotspot" intermediate networking device service plan with an allocation of 3 MB of service usage, of which none has been consumed. In some embodiments, service plans are presented in the "Manage" tab organized based on a characteristics of the service plans, e.g., grouping together recurring service plans in one set and grouping together "one time" service plans in another set. In the representative screen 1674, each grouping contains only one service plan; however, one of ordinary skill in the art would understand that the user of the mobile wireless communication device, in some embodiments, may subscribe to multiple service plans, which may be displayed on the representative screen 1674 (or its equivalent) conveniently grouped together. In some embodiments, the intermediate networking device service plan includes a service usage indicator, e.g., a progress bar as shown in FIG. 89, that provides information on an amount of service usage allocated and an amount of service usage consumed for the intermediate networking device service plan. In some embodiments, the service usage indicator is updated in (near) real time as the user of the mobile wireless communication device 100 uses the intermediate networking device service plan.

Figure 90:
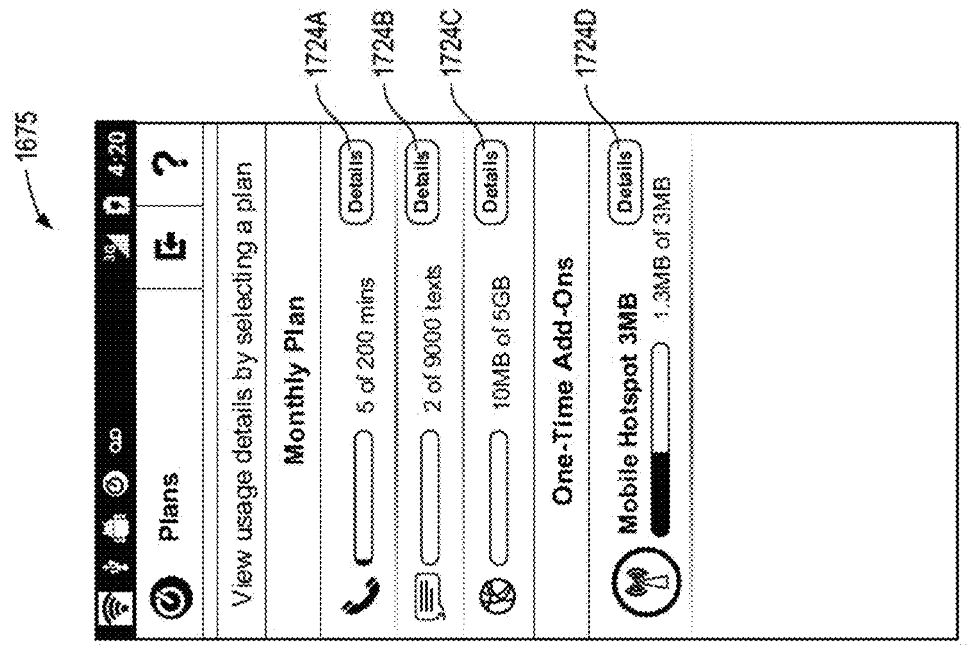
FIG. 90 illustrates a representative screen that presents, through the user interface, a summary of the service plans subscribed to by the user of the mobile wireless communication device after an amount of service usage for the intermediate networking device service plan has been consumed in accordance with some embodiments.

FIG. 90 illustrates a representative screen 1675 that presents, through the user interface 101, a summary of the service plans subscribed to by the user of the mobile wireless communication device 100 after an amount of service usage for the intermediate networking device service plan has been consumed. As illustrated in screen 1675, 1.3 MB of service usage has been counted against the "Mobile Hotspot 3 MB" intermediate networking device service plan. In some embodiments, the user of the mobile wireless communication device 100 can access additional detailed information about the intermediate networking device service plan (or any other service plan or element of a service plan) by selecting a "Details" button/icon 1724 in an area associated with a particular service plan.

Figure 91:
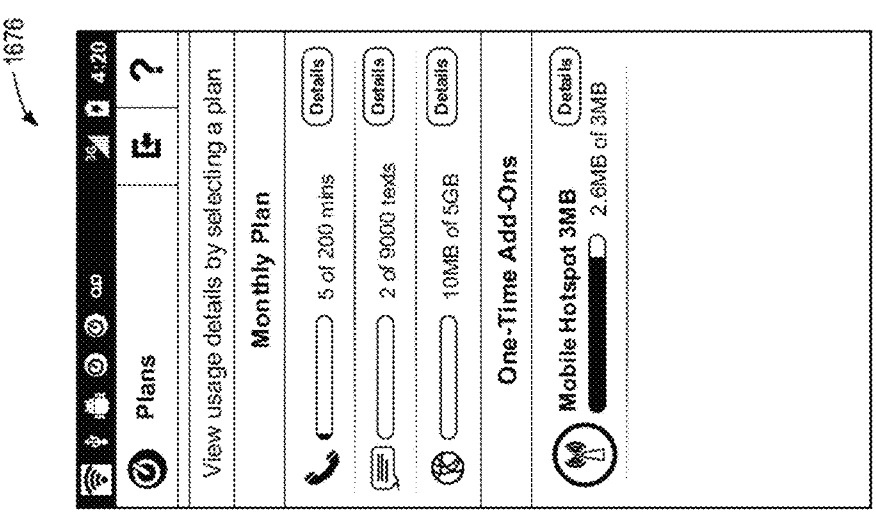
FIG. 91 illustrates a representative screen that presents, through the user interface, a summary of the service plans subscribed to by the user of the mobile wireless communication device after an additional amount of service usage for the intermediate networking device service plan has been consumed in accordance with some embodiments.

FIG. 91 illustrates a representative screen 1676 that presents, through the user interface 101, a summary of the service plans subscribed to by the user of the mobile wireless communication device 100 after an additional amount of service usage for the intermediate networking device service plan has been consumed. As illustrated in screen 1676, 2.6 MB of the 3.0 MB service usage allocation has been consumed. In some embodiments, the service usage indication (progress bar) provides a visual indication for different pre-determined ranges of service usage consumption of the total service usage allocation for the service plan (e.g., green for less than 80%, yellow for equal to or greater than 80% and less than 95%, and red for equal to or greater than 95%). In some embodiments, the user of the mobile wireless communication device 100 is provided notifications at pre-determined service usage levels (amounts and/or percentages). In some embodiments, the user of the mobile wireless communication device 100 sets notification alert triggers to determine when notification alerts are presented for a particular service plan, for a set of service plans, or for all service plans.

Figure 92:
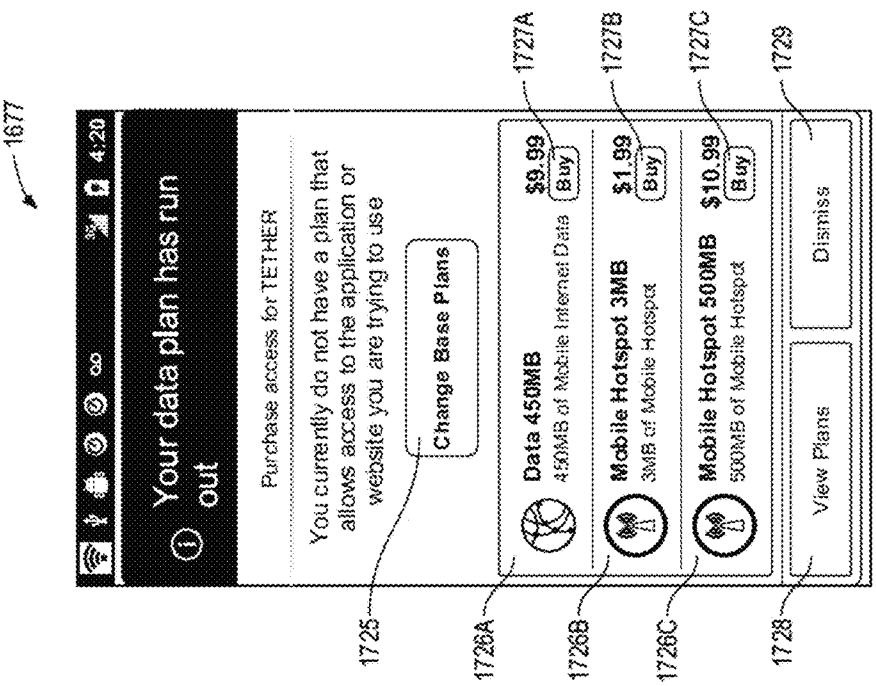
FIG. 92 illustrates a representative screen that presents, through the user interface of the mobile wireless communication device, a notification message that an allocation of service usage for a particular service plan has been exhausted in accordance with some embodiments.

FIG. 92 illustrates a representative screen 1677 that presents, through the user interface 101 of the mobile wireless communication device 100, a notification message that an allocation of service usage for a particular service plan has been exhausted. In some embodiments, the notification message provides one or more options to the user of the mobile wireless communication device 100 for viewing, selecting and/or purchasing an additional service plan to replace (or replenish) the exhausted service plan. In some embodiments, the notification message indicates that a particular service activity is unavailable to the user of the mobile wireless communication device 100 as a result of the expiration or exhaustion of the service plan. In some embodiments, the notification message includes a brief description of one or more service plans (e.g., plans 1726A, 1726B, 1726C) that can support a suspended service activity and provides options to purchase the one or more service plans (e.g., by selecting buy button 1727A, 1727B, and/or 1727C). In some embodiments, the notification message includes an option to change a base service plan to which the user of the mobile wireless communication device subscribes, e.g., by selecting the "Change Base Plans" button/icon 1725 shown on screen 1677. In some embodiments, the user of the mobile wireless communication device 100 can be presented one or more service plans (e.g., plans 1726A, 1726B, 1726C) that support specific service activities, e.g., allow access to an application or website that the user is trying to use. In some embodiments, the user can select the "Change Base Plans" button icon 1725 shown on screen 1677 to explore different service plans to which the user can subscribe and features available in the service plans. In some embodiments, the notification message includes an option to purchase a one-time service plan, e.g., by selecting the "Buy" button/icon for one of the presented one-time intermediate networking device service plans shown on screen 1677 (e.g., buy button 1727A, 1727B, or 1727C). In some embodiments, the notification message includes an option to explore a catalog of service plans, e.g., by selecting the "View Plans" button/icon 1728 shown on screen 1677. In some embodiments, the notification message includes options to purchase "upsell" service plans, i.e., to encourage the user of the mobile wireless communication device 100 to purchase a "higher level" service plan. In some embodiments, the set of service plans presented in the notification message is targeted for a specific service activity, e.g., service plans to support intermediate networking device service functions that may be presently suspended or unavailable. In some embodiments, the user of the mobile wireless communication device 100 can elect to not purchase any service plans offered in the notification message, e.g., by choosing the "Dismiss" button/icon 1729 as shown in FIG. 92. In some embodiments, a version of the representative screen 1677 is presented to the user of the mobile wireless communication device 100 upon detection of active intermediate networking device functions when the mobile wireless communication device 100 (or a user thereof) does not subscribe to a service plan that supports intermediate networking device functions (e.g., in place of or supplemental to screen 1669 of FIG. 84). In some embodiments, data traffic associated with an intermediate networking device service is blocked when the service plan expires or the service plan allocation is exhausted. In some embodiments, one or more service activities are suspended until the user obtains an applicable service plan that supports the intermediate networking device functions. In some embodiments, data traffic associated with intermediate networking device functions resumes after obtaining an applicable service plan.

IND Service Offers

Figure 93:
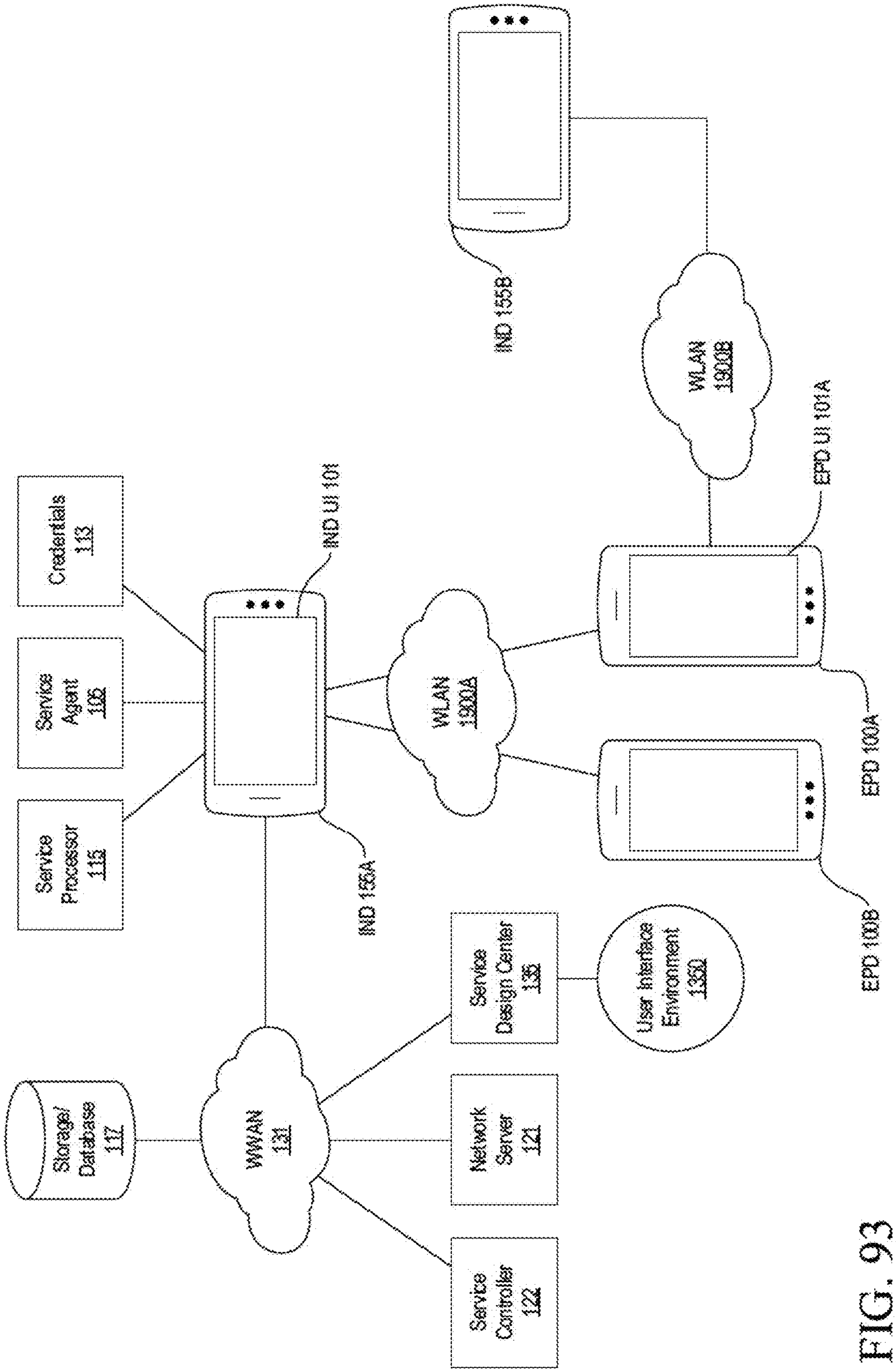
FIG. 93 illustrates a wireless ecosystem including a number of devices for communicating over one or more wireless networks in accordance with some embodiments.

FIG. 93 illustrates a wireless ecosystem according to some embodiments. FIG. 93 comprises a number of devices for communicating over one or more wireless networks, such as end-point devices (EPDs) 100A and 100B (alternatively referenced as end-point devices 100) and intermediate networking devices (INDs) 155A and 155B (alternatively or collectively referenced as intermediate networking devices 155). In some embodiments, the term "hotspot" (or "hot spot") may be used to refer to an intermediate networking device. In some embodiments, intermediate networking device 155 comprises one or more of a service processor 115, a service agent 105, a credential 113, or intermediate networking device user interface 101 (as shown in FIG. 93).

Examples of end-point devices (EPD) include feature phones, smartphones, tablets, notebooks, etc. End-point devices may comprise WLAN and/or WWAN connectivity (e.g., modems). In some embodiments, an intermediate networking device may be an end-point device (for example, a smartphone or tablet) with additional functionality (e.g., both WLAN and WWAN connectivity and specialized hardware and/or software to forward communications between the WLAN and WWAN connectivity). In some embodiments, an intermediate networking device may be a specialized device with reduced functionality relative to an end-point device (for example, the intermediate networking device may not have a user interface, or may not have voice capability, or may be smaller, etc.).

In some embodiments, an intermediate networking device (IND) 155A comprises a user interface (UI, such as IND UI 101) and a service agent (such as service agent 105) that assists in providing and activating communication service offers for forwarding of traffic from a first wireless local area network (such as WLAN 1900A), such as a Wi-Fi network, to one or more wireless wide area networks (such as WWAN 131), for example, cellular 2G, 3G, 4G, LTE, etc. In some embodiments, the intermediate networking device 155A has at least one cellular modem to connect over at least a WWAN 131 and at least one WLAN modem to forward communications from one or more additional user end-point devices (EPD) 100A, 100B over a wireless LAN 1900A. In some embodiments, the WLAN 1900A is Wi-Fi (or alternatively Bluetooth). In some embodiments, the intermediate networking device 155A has a service agent 105 and a UI screen 101 on the intermediate networking device 155A. In some embodiments, intermediate networking device service agent 105 assists in presenting a service purchase offer to the IND UI (for example, a screen, window, touchscreen, audio, etc.), for example, IND UI 101. In some embodiments, "assists in presenting" comprises one or more of determining a user desire to obtain WWAN communication services for the one or more additional end-point devices 100A, 100B, an attempted WWAN communication by the intermediate networking device 155A or at least one of the one or more additional end-point devices 100A, 100B, or a successful WWAN communication by the intermediate networking device 155A or at least one of the one or more additional end-point devices 100A, 100B. In some embodiments, a service offer notification is presented to the intermediate networking device UI 101 or a UI of at least one of the one or more additional end-point devices 100A, 100B. In some embodiments, the notification service offer is obtained at least in part from a network server 121, and the service agent 105 assists in presenting the notification to the intermediate networking device UI 101 or forwards it to one or more of the one or more additional end-point devices 100A, 100B. In some embodiments, the notification offer is obtained at least in part from the intermediate networking device local storage, and the intermediate networking device service agent 105 assists in presenting the notification to the intermediate networking device UI 101 or forwards it to at least one of the one or more additional end-point devices 100A, 100B. In some embodiments, a first portion of the notification offer is obtained from a network server 121 and a second portion of the notification is obtained from intermediate networking device local storage, and the intermediate networking device service agent 105 assists in presenting the notification to the intermediate networking device UI 101 or forwards it to one or more of the one or more additional end-point devices 100A, 100B. In some embodiments, the intermediate networking device 155A can be configured with a local web server or client server to assist in providing at least a portion of the notification to at least one of the one or more additional end-point devices 100A, 100B so that the at least one end-point device may use a web browser or downloadable application to communicate with the intermediate networking device 155A to obtain service for the one or more additional end-point devices 100A, 100B. In some embodiments, the intermediate networking device 155A can also be configured with a service processor (for example, service processor 115 within intermediate networking device 155A) that controls WWAN communication service for a first end-point device (for example, EPD 100A) of the one or more additional end-point devices (for example, EPDs 100A, 100B) in accordance with a first service plan purchased for the first end-point device (for example, EPD 100A) resulting in a different level of WWAN communication than is received by a second end-point device (for example, EPD 100B) that has a different service plan or no service plan. In this manner, the intermediate networking device 155A may assist in providing individual offers and service plan allowances for each end-point device 100A, 100B of the one or more additional end-point devices 100. In some embodiments, targeted/differentiated/individually managed policy (for example, control, notification, accounting, monitoring) is possible for at least one of the one or more EPDs 100 over the WWAN (for example, WWAN 131).

In some embodiments, a service design center (SDC) (for example, SDC 135) may be employed to manage a forwarding service for an IND 155A, wherein managing may include one or more of control policies, notification policies/instructions (such as messages, triggers, etc.), accounting/monitoring policies, access network policies, user management information, or service offers. In some embodiments, a SDC may design and provision at least a portion of a notification that is obtained from the network server (such as network server 121—shown as connected to SDC 135 over the WWAN 131, but could be connected over some alternative network or within a group of one or more servers), or at least a portion of the notification that is obtained from the device local storage (not shown in FIG. 93), or both. In some embodiments, an intermediate networking device service agent 105 obtains a user response to the service offer and communicates the response (for example, over a sponsored service control channel) to a network element (for example, one or more of a service controller 122 or a one or more network servers 121 or a service controller system or service charging control system). In some embodiments, the network element registers a billing event for service and a policy management system (not shown) provisions one or more network policies to provide WWAN communication service to the intermediate networking device 155A and/or enables/activates the intermediate networking device 155A to forward communications to/from an EPD 100. In some embodiments, provisioning network policies comprises provisioning one or more communication allowance policies into one or more network policy functions such as a gateway, GGSN, OCS or PCRF, the communication allowance policies being assigned to a device credential associated with the intermediate networking device 155A and/or the one or more additional EPDs 100A, 100B, the device credential used by the WWAN system to identify communication associated with the intermediate networking device 155A. In some embodiments, provisioning network policies comprises supplying a policy allowance instruction to one or more policy agents (for example, inside of a service processor 115) located on the intermediate networking device 155A. In some embodiments, provisioning network policies comprises provisioning one or more communication allowance policies into one or more network policy functions such as a gateway, GGSN, OCS or PCRF, the communication allowance policies being assigned to a device credential (for example, credentials 113 located on the intermediate networking device 155A) associated with the intermediate networking device 155A and/or the one or more additional end-point devices 100A, 100B, the device credential used by the WWAN system to identify communication associated with the intermediate networking device 155A, and provisioning network policies comprises supplying a policy allowance instruction to one or more policy agents (for example, inside of a service processor 115) located on the intermediate networking device 155A.

In some embodiments, service offers offered over the intermediate networking device UI 101 (or, alternatively, on one of the one or more additional end-point devices 100) through web browsers or portals or dedicated apps connected to an intermediate networking device service server could be based on one or more of: service for a time period (for example, an hour, day, week, month), allowance for an amount of data, allowance for an amount of data that expires in a period of time if not consumed, an amount of data per month comes free with intermediate networking device 155A (for example, based on a purchase subsidy) for a period of time. In some embodiments, if intermediate networking device usage exceeds a limit for a given period (for example, a month), then a service offer notification is presented (for example, popped) to a user (for example, user of intermediate networking device 155A or one of the end-point devices 100). In some embodiments, an intermediate networking device service agent 105 determines that a domestic network is not available and presents a roaming offer to be provided (for example, to a user of intermediate networking device 155A or one of the end-point devices 100).

In some embodiments, the intermediate networking device 155A may be configured/provisioned/pre-activated (or one of the additional end-point devices 100) with a service plan with no base plan, or a small base plan (for example, low cost or low usage limit/allocation), or a pre-paid base plan. In some embodiments, the intermediate networking device 155A may be offered instant buy-up service UI offers. In some embodiments, the intermediate networking device 155A may be configured with no base monthly plan with instant purchase as needed—day, week, month, etc. In some embodiments, the intermediate networking device 155A may be configured with a low base monthly plan with instant upgrade offers if the consumer goes over. In some embodiments, the intermediate networking device 155A may be configured wherein the intermediate networking device purchase price comprises a certain amount of service (for example, 100 to 300 MB per month for a year then get an upgrade offer to a service plan if it runs over on a given month or when the year expires). In some embodiments, the system may either allow the intermediate networking device 155A to use the 100-300 MB per month without creating an account or joining an existing account, or can prompt the intermediate networking device user to sign up for a new account or join an existing account prior to being able to use the free 100-300 MB per month. In some embodiments, the system can also obtain credit card information during the sign up process so that overage purchases can be made with 1 to 3 clicks, depending on the level of user acknowledgement desired. In some embodiments (for example, real time or instant), additional intermediate networking device services could be obtained from intermediate networking device 155A (or one of the end-point devices 100), such as access to a sponsored connection for sign up, sign-up for intermediate networking device services from the intermediate networking device UI 101, sign-up for intermediate networking device services from a web browser server, special offers for sign up, sponsored offers, roaming offers & service sign up, or multi-carrier sign up.

Intermediate Networking Device Multi-Network Offers and Plans

Figure 94:
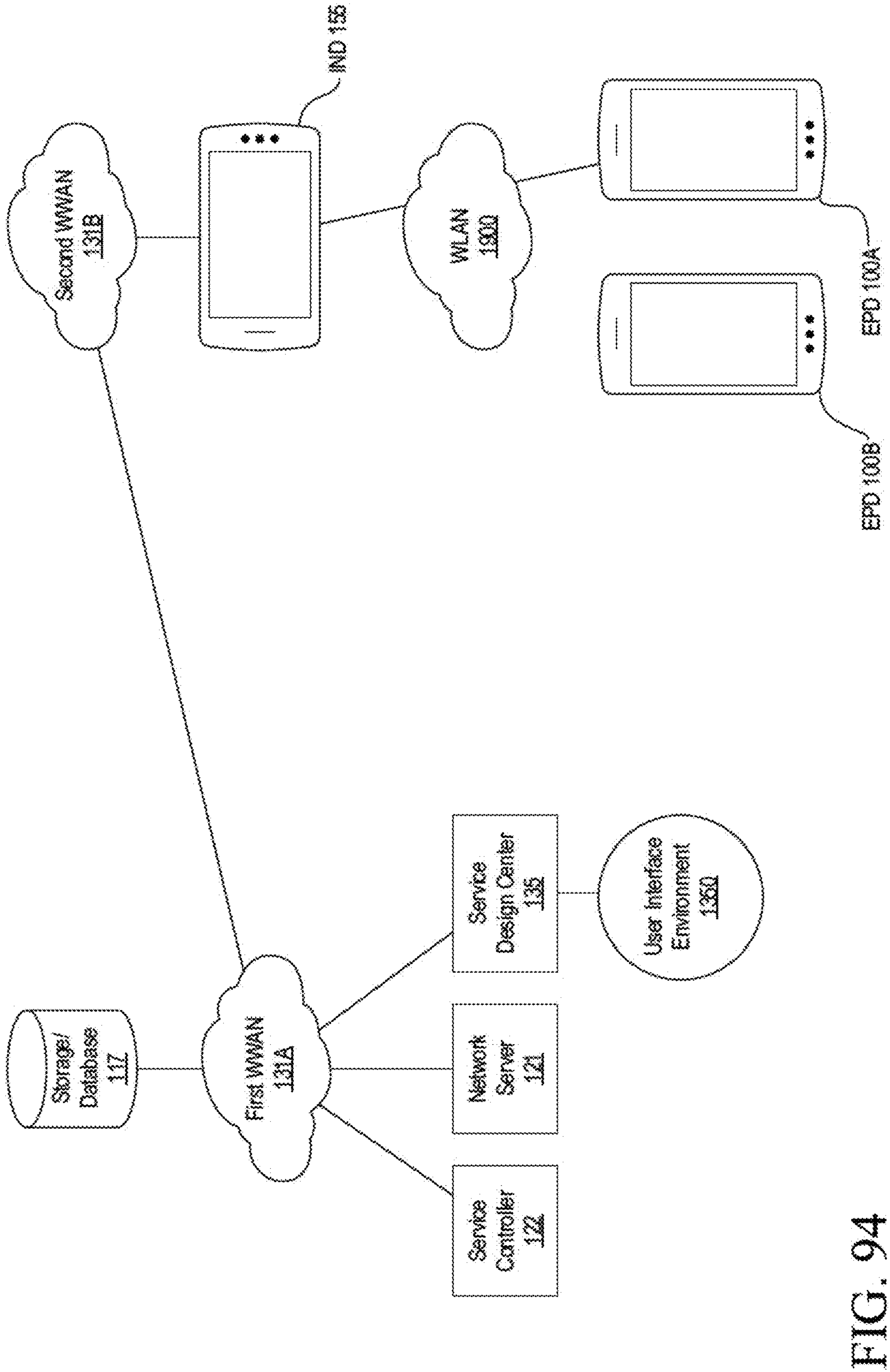
FIG. 94 illustrates a wireless ecosystem including one or more intermediate networking device (IND) wireless wide area network (WWAN) modems capable of roaming onto multiple mobile operator WWANs in accordance with some embodiments.

In some embodiments, the one or more intermediate networking device WWAN modems are capable of roaming onto multiple mobile operator WWAN (for example, cellular networks). FIG. 94 shows an intermediate networking device 155 at a second location and communicating with a second WWAN 131B (for example, may be an alternative mobile operator, MVNO or roaming partner) according to some embodiments. In some embodiments, the service agent 105 is configured to adapt the service plans offered on different networks so that the configuration and/or pricing of the service plan configurations and/or pricing offered on a first network can be different than the service plan configurations and/or pricing offered on a second network. In some embodiments, the differences in the service plan can include the communication allowances offered and/or the pricing for a given offered allowance or a different offered allowance. In some embodiments, the service plans offered to an intermediate networking device user can vary as a function of available WWAN (for example, cellular networks). Similarly, in some embodiments, the service plans offered can vary as a function of detected geography (for example, GPS determined location or location determined by other means such as a WWAN, WLAN signaling).

In some embodiments, the adaptations or changes in intermediate networking device service plan offers as a function of available network or geography are based in part upon a roaming pricing agreement between the entity responsible for managing and activating the intermediate networking device WWAN roaming communication services and one or more of the WWAN mobile operators who are roaming partners of the entity responsible for managing and activating the intermediate networking device cellular roaming communication services. In some embodiments, a roaming partner network database 117 that includes service offers as a function of mobile operator is made available to a network server (for example, service controller 122) responsible for providing information about roaming offer notifications, and the device uses a sponsored communication channel to (for example, securely) log into a network element (for example, network server 121), informing the network element of one or more available networks, and receiving one or more intermediate networking device service offers for the one or more available networks. In some embodiments, the network element is configured such that only a preferred service roaming partner offer is provided even if more than one roaming network is available. In some embodiments, the network server is configured to provide two or more service offers when two or more cellular service networks are available (for example, both WWAN 131A and 131B for which the entity responsible for managing and activating the intermediate networking device cellular roaming communication services has roaming agreements in place.

In some embodiments, the roaming offers included in the roaming partner network database are created in a service design center (for example, SDC 135 of FIG. 94) by a service plan design administrator utilizing a user interface environment 1350 of the service design center 135. In some embodiments, the offers include a mobile operator identifier, a text description of the offer, and/or a monetary price and amount of service for the offer. In some embodiments, the service design center 135 may be configured to include branding in the service offer, the branding including logos and/or colors and/or graphics of either one or more roaming partners and/or the entity responsible for managing and activating the intermediate networking device cellular roaming communication services. In some embodiments, the service design center 135 provides a simple graphical interface for configuring a roaming network identifier to identify a particular roaming network, a service plan offer set associated with the roaming network identifier comprising offer notification information, service allowances and/or pricing for the service plans being offered. In some embodiments, the service design center 135 may also be used to create a policy provisioning file for provisioning the network element service plan policies associated with the roaming offer and the roaming network identifier. In some embodiments, these service offers are then "published" to the roaming offer database (for example, storage/database 117) so that they go into effect.

Figure 95:
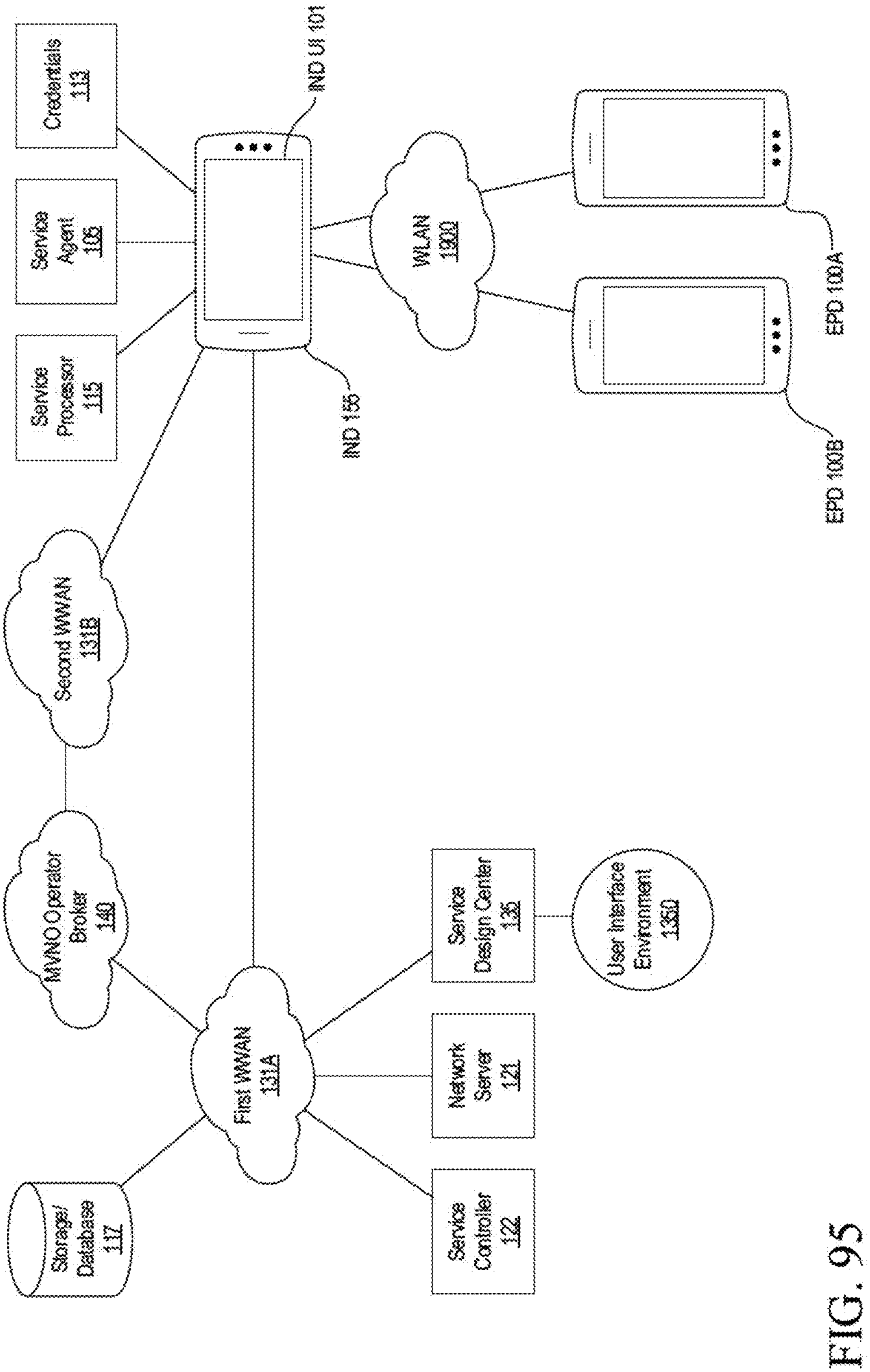
FIG. 95 illustrates a wireless ecosystem including multiple mobile operators providing connection services to an intermediate networking device in accordance with some embodiments.

FIG. 95 shows an intermediate networking device system wherein multiple mobile operators (for example, a first mobile operator associated with WWAN 131A and a second mobile operator associated with WWAN 131B) agree to provide connection services (for example, broker one or more domestic offers, or one or more roaming partners for a first service provider, or a first service provider with multiple MVNO wholesale deals) according to some embodiments. In some embodiments, an intermediate networking device 155 is configured to: store a list of preferred sponsored service network identifiers (for example, to access WWAN 131B and/or 131A), determine the intermediate networking device 155 is in a first geography or determine there are one or more first available WWAN. In some embodiments, based on the determination that the intermediate networking device 155 is in the first geography or the determination that there are one or more first available networks and the list of preferred sponsored service network identifiers connect to a first sponsored network, over the first sponsored network establish a (for example, secure) channel to a service controller (for example, service controller 122 associated with WWAN 131A—but could alternatively be associated with WWAN 131B or both), assist in providing a first service offer set based on the first geography or one of the one or more first available networks, assist in obtaining a first user preference (for example, a service offer based on an intermediate networking device credential 113 or a user/owner/subscriber of intermediate networking device 155), assist in establishing a first user paid connection to a first paid network specified in the first user preference (for example, by selecting a pre-paid monthly plan), provide forwarding service for one or more end-point devices (for example, 100A) over the first paid network (for example, WWAN 131A).

In some embodiments, assisting in providing a first service offer comprises presenting to the intermediate networking device UI 101 a webpage, WAP page, or application portal information obtained from the service controller 122. In some embodiments, assisting in providing a first service offer comprises presenting to the intermediate networking device UI 101 first offer set information stored in intermediate networking device memory (for example, a memory within intermediate networking device 155—not shown). In some embodiments, assisting in providing a first service offer comprises detecting an end-point device communication on the intermediate networking device WLAN modem port (for example, a request for access from EPD 100A over Wi-Fi) and forwarding the end-point device communication to the service controller 122. In some embodiments, assisting in providing a first service offer comprises detecting an end-point device communication on the intermediate networking device WLAN modem port and providing information about the first service offer to the end-point device (e.g., EPD 100A) using a web server, a WAP server, or a portal server located on the intermediate networking device 155. In some embodiments, the first paid network is one of the one or more first available networks (such as WWAN 131A). In some embodiments, the first sponsored network is the first paid network. In some embodiments, the first service offer set comprises one or more first paid service offers (or alternatively service plans) for at least one of the one or more first available networks. In some embodiments, the intermediate networking device UI 101 may allow signing up for a new account or service (for example, FIG. 99), adding to an existing account or service plan (for example, see FIG. 100) or sharing one or more service plan components with other devices in a group.

In some embodiments, the intermediate networking device 155 is further configured to determine that the intermediate networking device 155 is in a second geography (e.g., based on coverage, signaling of WWAN 131B, GPS, or with the assistance of a local or network database), determine there are one or more second available networks, and based on the determination that the intermediate networking device is in the second geography or the determination that there are one or more second available networks and the list of preferred sponsored service network identifiers, connect to a second network (may be sponsored prior to service activation), over the second (may be sponsored) network establish a (for example, secure) channel to the service controller 122, assist in providing a second service offer set based on the second geography or one or the more second available networks, assist in obtaining a second user preference (for example, a selection in FIG. 101 and/or FIG. 102), assist in establishing a second user paid connection to a second paid network (for example, WWAN 131B) specified in the second user preference (for example, the 500 MB for $8.99 selection shown in FIG. 102), provide forwarding service for one or more end-point devices 100 over the second paid network.

In some embodiments, assisting in providing a second service offer comprises presenting to the intermediate networking device UI 101 a webpage, WAP page, or application portal information obtained from the service controller 122. In some embodiments, assisting in providing a second service offer comprises presenting to the intermediate networking device UI 101 second offer set information stored in intermediate networking device memory (for example, a memory within intermediate networking device 155—not shown). In some embodiments, assisting in providing a second service offer comprises detecting an end-point device communication on the intermediate networking device WLAN modem port (for example, a request for access from EPD 100A over Wi-Fi) and forwarding the end-point device communication to the service controller 122. In some embodiments, assisting in providing a second service offer comprises detecting an end-point device communication on the intermediate networking device WLAN modem port and providing information about the second service offer to the end-point device 100 using a web server, a WAP server, or a portal server located on the intermediate networking device 155. In some embodiments, the second paid network is one of the one or more second available networks (such as WWAN 131B). In some embodiments, the second sponsored network is the second paid network. In some embodiments, the second service offer set comprises one or more second paid service offers (or alternatively service plans) for at least one of the one or more first available networks.

Figure 99:
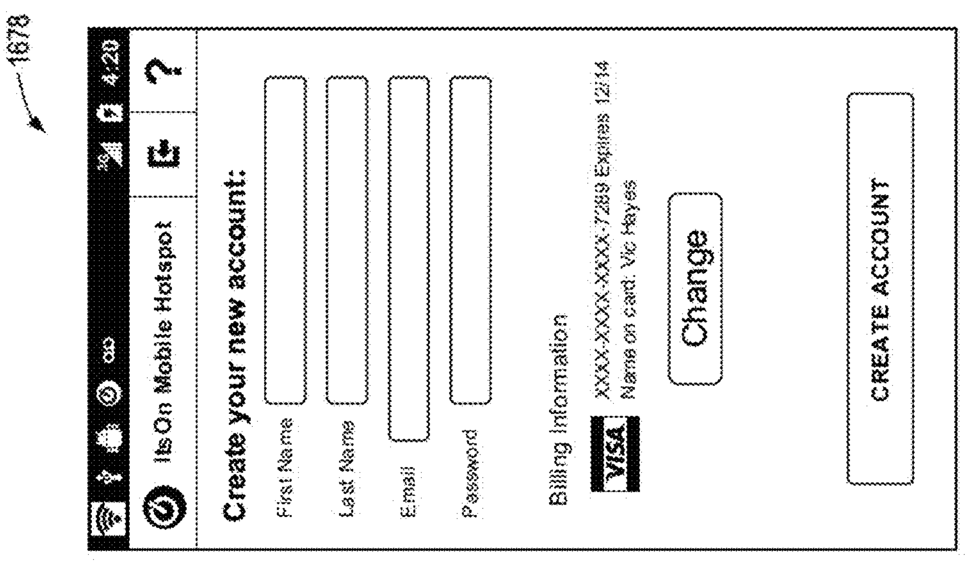
FIG. 99 illustrates a representative "new account" screen that can be presented to the user through the user interface of the intermediate networking device, through which the user may input information necessary to create a new account with a service provider in accordance with some embodiments.

In some embodiments, the intermediate networking device user interface 101 may allow the user to sign up for a new account or service. FIG. 99 illustrates a representative "new account" screen 1678 that can be presented to the user through the user interface 101 of the intermediate networking device 155, through which the user may input information necessary to create a new account with a service provider in accordance with some embodiments.

Figure 100:
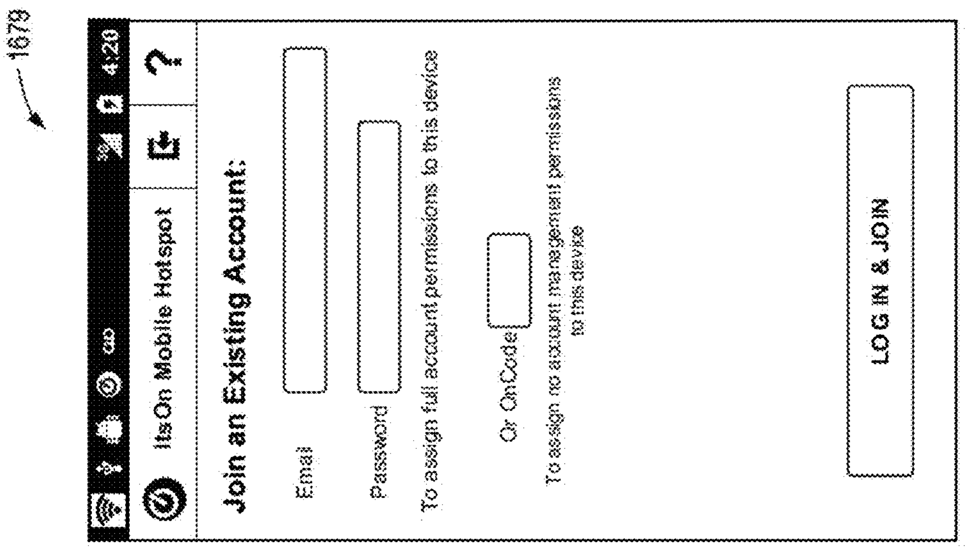
FIG. 100 illustrates a representative "join account" screen that can be presented to the user through the user interface of the intermediate networking device, through which the user may input information necessary to join an existing account with a service provider in accordance with some embodiments.

In some embodiments, the intermediate networking device user interface 101 may allow the user to add the intermediate networking device 155 to an existing account or service plan, or to share one or more service plan components with other devices in a group. FIG. 100 illustrates a representative "join account" screen 1679 that can be presented to the user through the user interface 101 of the intermediate networking device 155, through which the user may input information necessary to associate the intermediate networking device 155 with an existing account with a service provider in accordance with some embodiments.

Referring again to FIG. 95, in some embodiments, a wholesale MVNO or operator broker 140 comprises a wholesale MVNO/bandwidth with multiple wholesale network connections servicing multiple geographies (for example, WWAN 131A and 131B) comprising one or more service controllers 122 at each of the mobile operators (only WWAN 131A's service controller 122 is shown in FIG. 95) and/or at the operator broker. In some embodiments, the service controller 122 is associated with/managed by/operated on behalf of the home carrier/operator (such as WWAN 131A) and manages service offers and/or policies or intermediate networking devices 155 (and/or end-point devices 100) over multiple roaming network partners servicing multiple geographies with the service controller 122. In some embodiments, an SDC 135 associated with/managed by/operated on behalf of the home carrier/operator assists in updating roaming offers as new offers are developed and/or new roaming partners are added and/or new deals are generated. In some embodiments, IND service offers (or alternatively service policies) are based on geography or are geography specific, or are based on carrier or are carrier specific, or are based on time/day/week, or are temporary, etc. In some embodiments, service offers (or service policies) comprise geographic specific branding or carrier specific branding. In some embodiments, the IND 155 may be a "blank" or "warm" device (i.e., not associated with any plan or carrier, or not including preferred lists or only a small list) that detects WWAN signals/control and activates with a carrier/operator to become carrier specific and inherit carrier properties (for example, by downloading at least a portion of a service processor 115—for example, over the air (OTA)). In some embodiments, the IND service offer comprises multi-carrier offer (for example, an offer from a operator of WWAN 131A and an offer from operator of WWAN 131B— which could be on the same menu or separate menus) to activate. In some embodiments, a multi-carrier offer comprises a listed pricing for one or more roaming partners. In some embodiments, a broker (or some other backend system) collects/aggregates roaming prices from a plurality of operators and provides one or more offers (for example, based on markup, revenue share, etc.).

In some embodiments, an IND 155 is configured to communicate with one or more WWAN including at least a first WWAN (for example, WWAN 131A) and forward traffic to one or more additional end-point devices 100 over a WLAN network 1900, the IND 155 comprising a UI 101 and a service agent 105 to assist in presenting an actionable first service offer for WWAN service (for example, cellular service) over the first WWAN 131A, at least a portion of the service offer notification information fetched from IND storage or a cloud server and formatted by the service agent 105 for presentation on the IND UI 101, wherein a user response to the service offer notification is relayed/sent to a network element (for example, network server 121 or service controller 122) over a channel (for example, a secure channel) with IND service agent 105. In some embodiments, subsequent to receipt of a network element acknowledgement of service plan activation, the service agent 105 assists in providing/presenting an IND UI notification that the service is active or activation is in progress (in an alternative embodiment, the actionable first service offer is presented on at least one of the one or more alternative end-point device UIs 101, or the user response is obtained by one or more of the alternative end-point devices 100, or the providing/presenting of the notification that service is active or activation is in progress is presented at one of the alternative one or more end-point device UIs 101).

Figure 96:
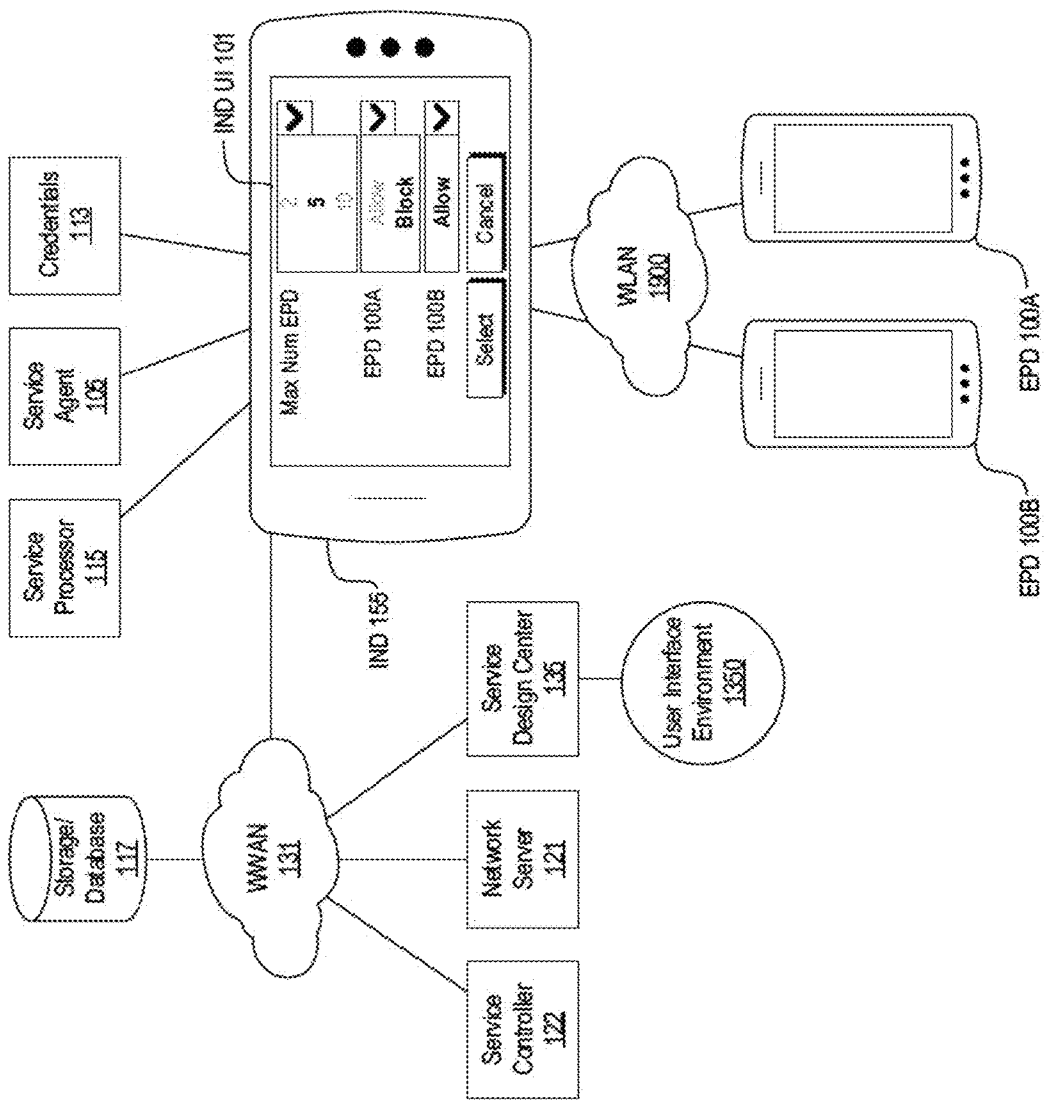
FIG. 96 illustrates a wireless ecosystem including an intermediate networking device configured to manage connections for one or more end-point devices (EPD) in accordance with some embodiments.
Figure 97:
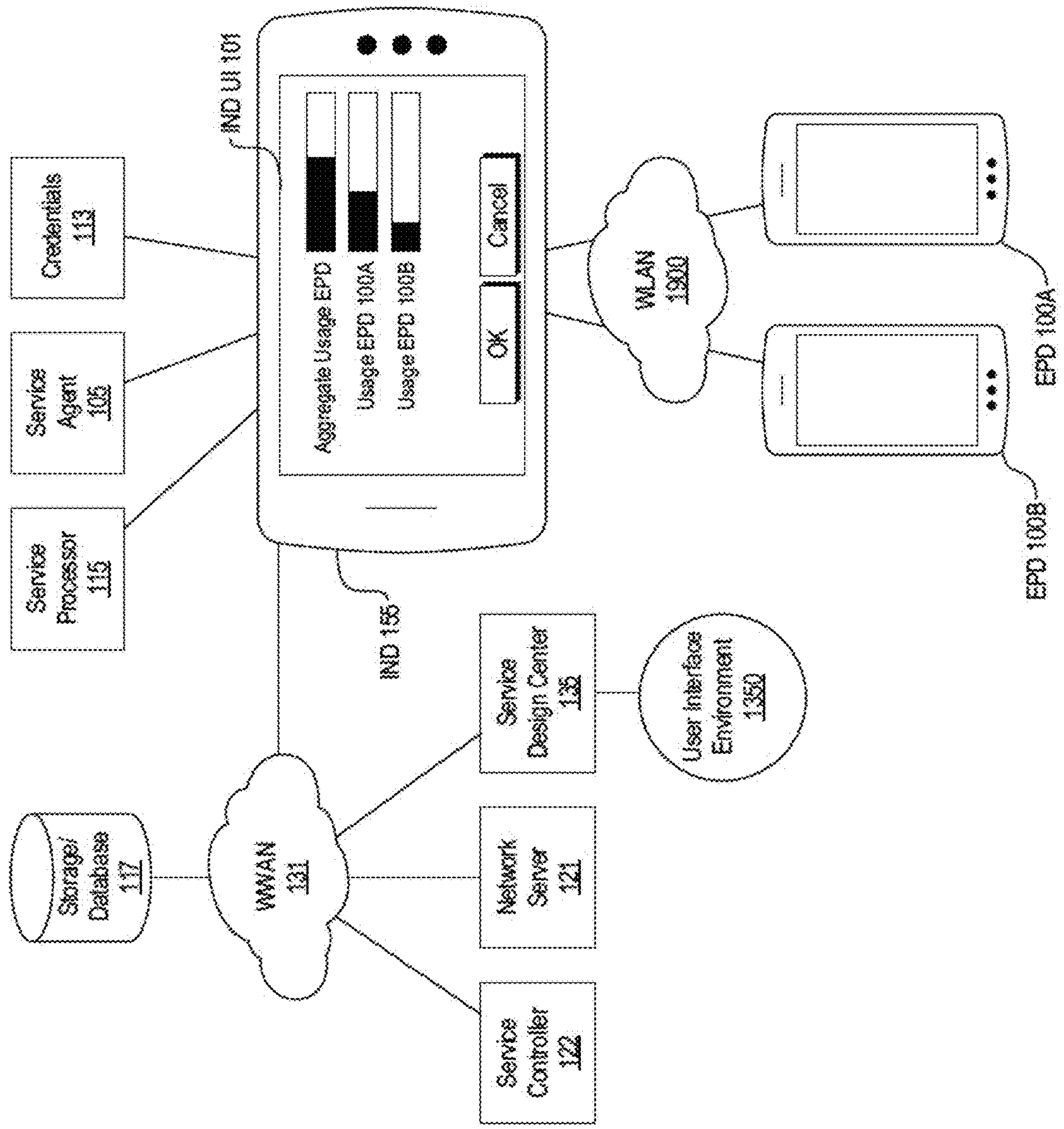
FIG. 97 illustrates a wireless ecosystem including an intermediate networking device accounting aggregate usage for all connected end-point devices and individual usage for each end-point device in accordance with some embodiments.

In some embodiments, IND 155 is further configured to manage the connections over the WLAN or WWAN for at least one of the one or more additional end-point devices 100. FIG. 96 shows an IND 155 configured to manage the connections for at least one of the one or more EPD 100A and EPD 100B according to some embodiments. In some embodiments, a user of the IND 155 enters control policy through the IND UI 101. In some embodiments, control policy obtained from a network element (for example, SDC 135—for example, based on an SDC administrator). In some embodiments, a number of additional end-point devices 100 allowed to connect is selected (for example, "5" in the "Max Numb EPD" field of FIG. 96). In some embodiments, one or more specific additional end-point devices are allowed or blocked from forwarding/connection (for example, EPD 100A's access is "Block," and EPD 100B's access is "Allow"). In some embodiments, a traffic/access control may include all of the additional EPDs 100. In some embodiments, a traffic control is for a specific (for example, one, a subset, a type, a group of) additional EPDs 100. In some embodiments, an IND 155 is further configured to account for communication over the WWAN 131 for the one or more additional EPDs 100. In some embodiments, the IND 155 accounts for an aggregate communication use for multiple additional EPDs 100 (for example, all the EPDs 100 or a subset of EPDs 100). In some embodiments, the IND 155 may account for access communication usage for a particular EPD 100. FIG. 97 shows aggregate usage for all EPDs 100 and individually for each of the two EPDs 100A and 100B according to an embodiment (for example, as a bar relative to a fixed amount or a service plan limit or allocation or threshold). In some embodiments, an IND 155 is further configured to assist in providing a notification associated with the WWAN 131 connection to the one or more additional EPDs 100, for example, to all EPDs 100, a subset of EPDs 100 or a particular/specific EPD (e.g., EPD 100A or EPD 100B). In some embodiments, an IND 155 is further configured to assist in providing through the IND UI 101 an offer to allow additional EPDs 100 to obtain forwarding service to the WWAN 131 through the IND 155, the service offer providing an economic incentive to the user of the IND 155. In some embodiments, the economic incentive comprises a revenue share of the service revenue obtained from the one or more additional EPDs 100. In some embodiments, the economic incentive comprises a discount on service for the IND 155. In some embodiments, assisting in providing comprises making the offer via an IND UI 101 web browser server or application server. In some embodiments, assisting in providing comprises relaying/sending the offer and response in communication with a network element (for example, service controller/activation server) over the forwarded connection between the WLAN 1900 and the WWAN 131.

In some embodiments, an IND service agent 105 is combined with a service controller 122 (or service activation server) and an SDC 135 to create a dynamic service offer set system, where a first service offer set comprises a group of one or more first service plan offers actionable (for example, selectable by a user) from an IND UI 101. In some embodiments, the first service offer set is programmable (for example, based on IND 155 or EPD 100 credential(s) 113 or based on tag/name of the IND 155 or EPD 100 or an agent/browser/app of the IND 155 or EPD 100), where the programmable first offer set configuration is managed by an SDC 135 that provides an offer creation and management user interface environment 1350 for a service offer administrator. In some embodiments, alternatively or in addition, there is a first service offer provisioning output to provision service policies to implement the first service offer set for the IND 155. In some embodiments, the dynamic offer system is further configured to provision the service policies to implement the first service offer set for additional INDs 155 identified by device credentials or subscriber/user/manager credentials stored in a device group (for example, comprising the IND 155 or to further include the IND 155) or subscriber group. In some embodiments, a dynamic offer system is further configured to manage which additional IND credentials or subscriber credentials are enrolled in or belong to the device group or subscriber group. In some embodiments, the dynamic offer system is further configured to allow an administrator to define and/or provision a first additional EPD service offer set (for example, to present at an EPD UI) similarly to the first service offer set definition and provisioning described herein for the IND UI 101 offers. In some embodiments, the dynamic offer system further comprises one or more of a service accounting sub-system (or element or network element), a service control sub-system and a service billing sub-system. In some embodiments, the SDC UI environment 1350 is configured to accept one or more of a first accounting policy input, a first control policy input and a first service billing policy input. In some embodiments, there is an SDC provisioning output configured to convert these policy inputs into first policy provisioning instructions for the service accounting sub-system, service control sub-system and service billing sub-system.

In some embodiments, the dynamic offer system further comprises a service notification sub-system (or element or function—for example, within one or more servers) comprising a notification trigger condition detector, a notification message content storage and a notification message delivery element. In some embodiments, the SDC UI environment 1350 is configured to accept one or more first notification policy inputs comprising one or more first notification trigger events or filters and one or more first notification message contents to be delivered to the device UI (for example, the IND UI 101 or one of the EPD UIs), and an SDC provisioning output is configured to convert these policy inputs into policy provisioning instructions for the notification sub-system trigger condition detector, notification message content storage and notification message delivery element. In some embodiments, at least a portion of first notification message content storage is on the IND 155. In some embodiments, at least a portion of first notification message content storage is in network storage (for example, storage accessible by an activation server/service controller). In some embodiments, at least an aspect of a first trigger condition detection is determined by the IND 155. In some embodiments, at least an aspect of a first trigger condition detection is determined by a network service monitor. In some embodiments, a first notification can comprise one or more of a usage report, a usage limit reached message, a usage overage, or a first service offer set.

In some embodiments, a first service offer set comprises a multitude of service plans configured to be presented and acted upon (for example, selected by a user) on the IND UI 101, and an IND service agent 105 is configured to obtain first service offer set information and assist in presenting the information on the IND UI 101 in a presentation (for example, display) configuration defined in the SDC 135. In some embodiments, the first service offer set presentation configuration includes one or more of a first mobile operator identifier, a text description of the first offer set, a first monetary price and first amount of service for the offer, first branding in the service offer, first logos, a first color scheme, a first placement of display objects in the offer, a first configuration of action buttons in the offer, first actions associated with action buttons in the offer, or first UI display graphics. In some embodiments, at least a portion of the first service offer set is obtained from a network based service controller or activation server. In some embodiments, the first service offer set may be updated over time (for example, regularly, periodically, based on event triggers or at any time) by the SDC 135 refreshing a provisioning instruction set to re-provision the service offer.

In some embodiments, the dynamic offer system is further configured to enable a first limited sponsored service connection over the WWAN 131 to the service controller 122 or activation server for the purpose of providing the first service offer set and/or accepting user responses to the first offer set and/or provisioning a service plan over the WWAN 131.

In some embodiments, the IND 155 is further configured to communicate over a second WWAN (for example, WWAN 131B shown in FIG. 94 or FIG. 95), and an IND service agent 105 is further configured to assist in presenting on the IND UI 101 an actionable/selectable second service offer for cellular service over the second WWAN 131B, where at least a portion of the offer notification information is fetched from IND storage or a cloud server and formatted by the service agent 105 for presentation on the IND UI 101. A user response to the offer is relayed to a network server over a (secure) channel with the IND service agent 105, and upon receipt of a server acknowledgement of a service plan, an activation service agent assists in providing to the device (IND 155 or EPD 100A, 100B) a UI notification that the service is active (or activation is in progress). The SDC 135 is configured to create the second service offer set comprising a group of one or more second service plan offers actionable from the IND UI 101 (or alternatively one of the EPD UIs 101), where the second service offer set is programmable, and the programmable second offer set configuration is managed by an SDC offer creation and management user interface environment 1350 and a second service offer provisioning output.

In some embodiments, a dynamic service offer set system is configured to determine when to offer the first service offer set (for example, for first WWAN 131A) on the IND UI 101 (or an EPD UI) and when to offer the second service offer set (for example, for second WWAN 131B) on the IND UI 101 (or an EPD UI) based on an available network condition. In some embodiments, the condition is based on the IND 155 detecting whether the first WWAN 131A is available to it, the second WWAN 131B is available to it, or both the first WWAN 131A and second WWAN 131B are available to it. In some embodiments, the condition is based on the IND 155 detecting a geographic location and determining—based on the geography—which offer set(s) to offer/present. In some embodiments, the condition is based on a preferred network priority list that is stored on the IND 155 (or obtained by the IND 155 from a network element or service controller 122—for example, over a sponsored control channel). In some embodiments, a preferred network priority list is created in the SDC 135 and downloaded/pushed/preloaded to the IND 155. In some embodiments, a preferred network priority list is specified by a user of the IND 155 (or one of the EPDs 100) or an account administrator associated with the IND 155. In some embodiments, if only one network is available to the IND 155, the condition is to present the offer set for that network. In some embodiments, if two networks are available to the IND 155, the condition is to display the highest priority offer set. In some embodiments, if two networks are available to the IND 155, the condition is to display both offer sets. In some embodiments, the first offer set is configured with branding information for a first mobile operator (for example, associated with first WWAN 131A), and the second offer set is configured with a branding configuration of a second mobile operator.

In some embodiments, the SDC UI environment 1350 is further configured to accept one or more second notification policy inputs comprising one or more second notification trigger events or filters and one or more second notification message contents to be delivered to the device UI 101, and an SDC provisioning output is configured to convert these policy inputs into policy provisioning instructions for the notification sub-system trigger condition detector, notification message content storage and notification message delivery element.

In some embodiments, the dynamic offer system further comprises a service notification sub-system (or element or function—for example, within one or more servers) comprising a notification trigger condition detector, a notification message content storage and a notification message delivery element. In some embodiments, the SDC UI environment 1350 is configured to accept one or more second notification policy inputs comprising one or more second notification trigger events or filters and one or more second notification message contents to be delivered to the device UI 101 (for example, the IND UI 101 or one of the EPD UIs), and the SDC provisioning output is configured to convert these policy inputs into policy provisioning instructions for the notification sub-system trigger condition detector, notification message content storage and notification message delivery element. In some embodiments, at least a portion of second notification message content storage is on the IND 155. In some embodiments, at least a portion of second notification message content storage is in network storage (for example, storage accessible by an activation server/service controller). In some embodiments, at least an aspect of a second trigger condition detection is determined by the IND 155. In some embodiments, at least an aspect of the second trigger condition detection is determined by a network service monitor. In some embodiments, a second notification can comprise one or more of a usage report, a usage limit reached message, a usage overage, or a second service offer set.

In some embodiments, a second service offer set comprises a multitude of service plans configured to be presented and acted upon (for example, selected by a user) on the IND UI 101, and an IND service agent 105 is configured to obtain second service offer set information and assist in presenting the information on the IND UI 101 in a presentation (for example, display) configuration defined in the SDC 135. In some embodiments, the second service offer set presentation configuration includes one or more of a second mobile operator identifier, a text description of the second offer set, a second monetary price and second amount of service for the offer, second branding in the service offer, second logos, a second color scheme, a second placement of display objects in the offer, a second configuration of action buttons in the offer, second actions associated with action buttons in the offer, or second UI display graphics. In some embodiments, at least a portion of the second service offer set is obtained from a network based service controller 122 or activation server. In some embodiments, the second service offer set may be updated over time (e.g., regularly, periodically, based on event triggers, or at any time) by the SDC 135 refreshing a provisioning instruction set to re-provision the service offer.

In some embodiments, a dynamic offer system is further configured with a mobile operator partner (for example, a third party or operated on behalf of) billing system to authorize a roaming request to allow roaming of the IND 155 on the second WWAN (for example, second WWAN 131B) and accept roaming billing records from a second mobile operator network roaming or wholesale service billing element (for example, a broker) for service provided to the IND 155 over the second WWAN 131B, or a first mobile operator network roaming or wholesale service billing element for service provided to the IND 155 over the first WWAN 131A, or both a second mobile operator network roaming or wholesale service billing element and a first mobile operator network roaming or wholesale service billing element. In some embodiments, the mobile operator partner billing system is further configured to cause a payment to be made to the first or second mobile operator or both. In some embodiments, the mobile operator partner billing system is further configured to reconcile a first service usage accounting.

In some embodiments, the dynamic offer system is further configured to enable a second limited sponsored service connection over the second WWAN 131B to the service controller 122 or activation server for the purpose of providing the second service offer set and/or accepting user responses to the second offer set and/or provisioning a service plan over the second WWAN 131B. In some embodiments, the dynamic offer system accepts partner billing records for the second sponsored service.

In some embodiments, the IND 155 is further configured to manage the connections over the WLAN 1900 or the second WWAN 131B for at least one of the one or more additional EPDs 100. FIG. 96 shows an IND 155 configured to manage the connections for at least one of the one or more EPD 100A and EPD 100B according to some embodiments. In some embodiments, a user of the IND 155 enters a control policy through the IND UI 101. In some embodiments, a control policy is obtained from a network element (for example, SDC 135—for example, based on an SDC administrator). In some embodiments, a number of additional EPDs 100 allowed to connect is selected (for example, "5" in the "Max Num EPD" field in FIG. 96). In some embodiments, one or more specific additional EPDs are allowed or blocked from forwarding/connection (for example, EPD 100A's access is "Block" and EPD 100B's access is "Allow"). In some embodiments, a traffic/access control may include all of the additional EPDs 100. In some embodiments, a traffic control may be for a specific (for example, one, a subset, a type, a group of) additional EPDs 100. In some embodiments, an IND 155 is further configured to account for communication over the second WWAN 131B for the one or more additional EPDs 100. In some embodiments, the IND accounts for an aggregate communication use for multiple additional EPDs 100 (for example, all the EPDs 100 or a subset of EPDs 100). In some embodiments, the IND may account for access communication usage for a particular EPD 100. FIG. 97 shows aggregate usage for all EPDs and individually for each of the two EPDs 100A, 100B according to an embodiment (for example, as a bar relative to a fixed amount or a service plan limit or allocation or threshold). In some embodiments, an IND 155 is further configured to assist in providing a notification associated with the second WWAN connection to the one or more additional EPDs 100, for example, to all EPDs 100, a subset of EPDs 100 or a particular/specific EPD 100. In some embodiments, an IND 155 is further configured to assist in providing through the IND UI 101 an offer to allow additional EPDs 100 to obtain forwarding service to the second WWAN 131B through the IND 155, the service offer providing an economic incentive to the user of the IND 155. In some embodiments, the economic incentive comprises a revenue share of the service revenue obtained from the one or more additional EPDs 100. In some embodiments, the economic incentive comprises a discount on service for the IND 155. In some embodiments, assisting in providing comprises making the offer via an IND UI web browser server or application server. In some embodiments, assisting in providing comprises relaying/sending the offer and response in communication with a network element (for example, service controller/activation server) over the forwarded connection between the WLAN 1900 and the WWAN 131.

In some embodiments, an IND 155 is further configured to communicate over a third WWAN, and an IND service agent 105 is further configured to assist in presenting through the IND UI 101 an actionable third service offer for cellular service over the third WWAN. In some embodiments, the third offer set for communication over the third WWAN is not configured at a time that the first offer set or the second offer set is configured and/or deployed, and after the first offer set or the second offer set is configured and/or deployed the dynamic offer system subsequently creates and provisions the third service offer set for communication over the third WWAN and updates the WWAN service offer set options available to the IND 155 so that the available mobile operator networks can be easily expanded as more roaming and/or wholesale agreements are reached.

In some embodiments, an IND 155 is configured to communicate with one or more WWANs using at least a first WWAN 131A to forward traffic to one or more additional EPDs 100 on a WLAN network 1900, and a service agent to assist in displaying an actionable first service offer for cellular service over the first WWAN 131A to the UIs of the one or more additional EPDs 100, where at least a portion of offer notification information is fetched from IND storage or a cloud server and formatted by the service agent for presentation on the IND UI. A user response to the offer from the one or more additional EPDs 100 is relayed to a network server over a secure channel with the IND service agent 105, and upon receipt of a server acknowledgement of service plan activation, the service agent 105 assists in providing a UI notification to the one or more additional EPDs 100 that service is active.

Figure 98:
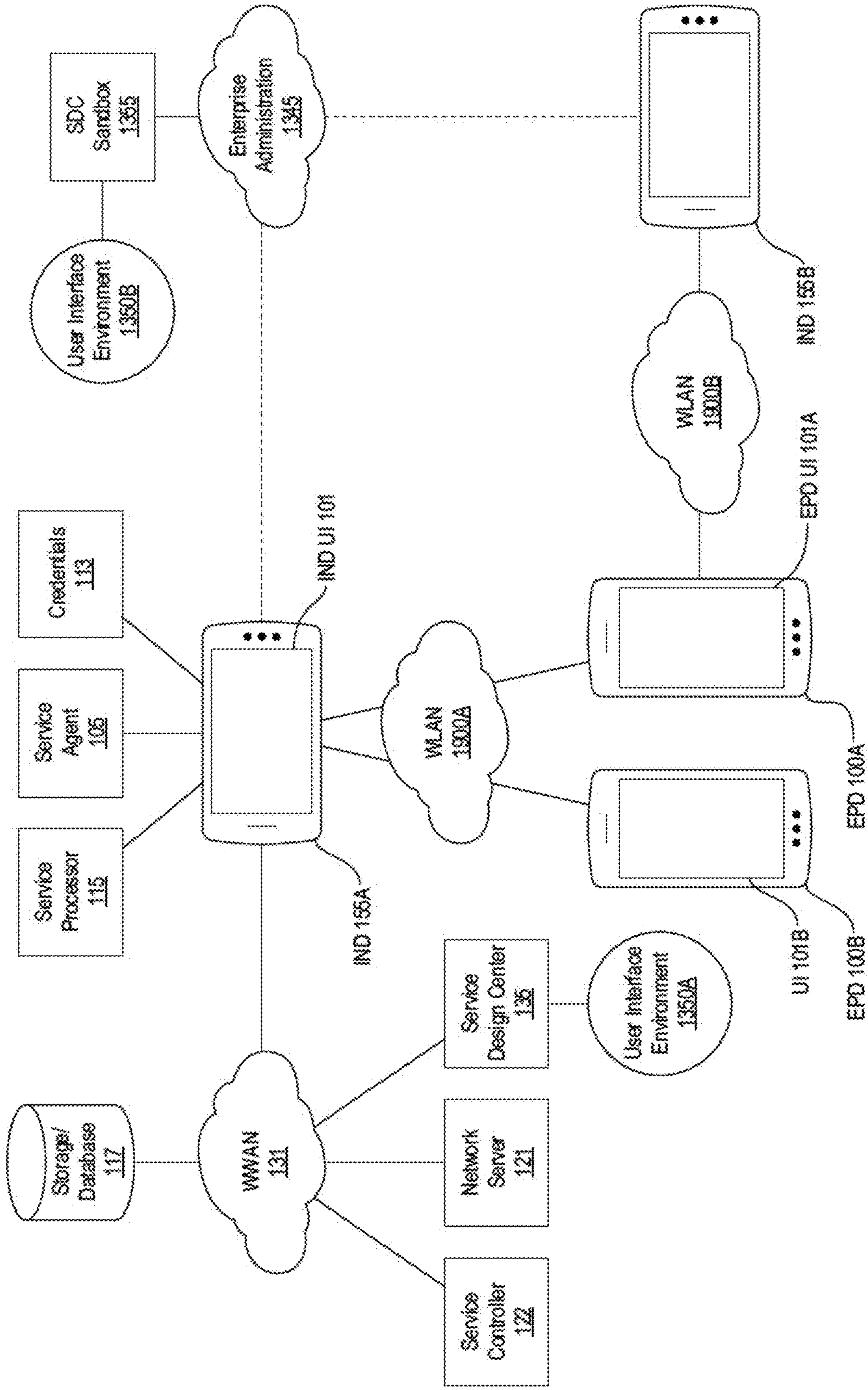
FIG. 98 illustrates a wireless ecosystem including an enterprise administration communicating with intermediate networking devices in accordance with some embodiments.

In some embodiments, an IND 155 is configured to communicate with one or more WWANs, including at least a first WWAN, and forward traffic to one or more additional EPDs 100 on a WLAN network 1900, where the IND 155 comprises an IND service agent 105 to assist in implementing a service message or traffic control defined by an enterprise account administrator (for example, by an administrator on a enterprise server or processor or controller). FIG. 98 shows an enterprise administration 1345 communicating with INDs 155A and 155B, for example, for activation, management, control, notification, etc. according to some embodiments. In some embodiments, the enterprise account administrator administrates an enterprise service account for a device group (for example, a group of INDs 155) or subscriber group (for example, a group of users associated with one or more INDs 155—for example, an employee's IND 155 or a joint consumer/business IND 155). In some embodiments, the enterprise account administrator has access to an SDC sandbox (for example, SDC sandbox 1355) for the purpose of enrolling/activating/provisioning an IND 155 (for example, IND 155B) into the device group or subscriber group. In some embodiments, the enterprise account administrator has access to an SDC sandbox 1355 for the purpose of defining usage limits for the INDs 155 enrolled in the device group or subscriber group. In some embodiments, the enterprise account administrator has access to an SDC sandbox 1355 for the purpose of defining usage notifications for the INDs 155 enrolled in the device group or subscriber group. In some embodiments, the enterprise account administrator has access to an SDC sandbox 1355 for the purpose of defining roaming allowances for the INDs 155 enrolled in the device group or subscriber group. In some embodiments, the enterprise account administrator has access to an SDC sandbox 1355 for the purpose of defining more than one device group or subscriber group, including at least a first device group or subscriber group and a second device group or subscriber group, and enrolling devices in the first or second device/subscriber group, and assigning one or more of a first device/subscriber group usage limit, usage notification, or roaming allowance, and assigning one or more of a second device/subscriber group usage limit, usage notification, or roaming allowance.

Joining/Activating an IND to an Existing Plan/Account/Shared-Plan

In some embodiments, the IND 155 is configured so that an IND user can sign up to share an existing cellular service account or service plan or share plan or IND plan or IND share plan from the IND UI 101 (for example, over an app, settings menu, web browser, portal, etc.) or from an EPD UI communicating with the IND 155 (for example, over an app, settings menu, web browser, portal, etc.). In some embodiments, a sign up or partial sign up or pre-activation is performed prior to access. In some embodiments, a client is provided to the EPD 100 (for example, prior or from the network or from the IND 155). In some embodiments, this is accomplished by the IND service agent 105 providing a UI offer to enroll in an existing service account (or WWAN/cellular service account/plan/share-plan/family plan, etc.), accepting a user response indicating a user desire that the IND 155 should join an existing service account, the user response including entering an identifier of the account and a credential (for example, a private credential) known by or obtained by an account administrator/manager/owner/subscriber of the existing account (for example, a phone number, username or email associated with the account and a password or PIN), provisioning a network element and/or a device agent responsible for managing/accounting for IND 155 communication use (or EPD 100 forwarding use) to identify the accounting records as belonging to the existing account, and/or provisioning the billing system to process the accounting along with the other devices (for example, other IND 155 or EPD 100 able to communicate directly or over an IND 155) that have service provided under the existing account. In some embodiments, the IND 155 can join an existing account only after an account administrator (or alternatively manager, owner, subscriber) also acknowledges a message sent to their device UI 101 or email. In some embodiments, the acknowledgement message includes a device credential and/or user credential of the requesting device or user.

In some embodiments, the IND system is configured so that an IND user (or subscriber/owner/manager) can join the IND 155 to an existing account from the IND UI 101 by entering a non-private credential associated with the existing account (for example, a phone number, username or email associated with the account). In some embodiments, the IND service agent 105 sends an acknowledgement message to a device UI 101 (for example, the IND UI 101 or an EPD UI 101) or email of an account administrator who may then approve the addition of the IND 155 to the existing account.

In some embodiments, an IND service agent 105 can be configured to enroll the IND 155 in an existing service plan by providing a UI option/selection for the user to accept an enrollment invite message that is sent to the service agent 105 via a communication from a network element (for example, service controller 122) over a service control channel, by monitoring an SMS enrollment invite message, or by monitoring another type of enrollment invite notification. In this embodiment, if the user accepts the enrollment invite (for example, by entering a private user credential), the IND 155 initiates one or more enrollment processes described herein.

In some embodiments, the IND service agent 105 is configured so that a corporate (or business or enterprise) WWAN (for example, cellular) plan administrator can efficiently/quickly join a number of INDs 155 to an enterprise plan by automating the enrollment process (for example, with an auto-enrollment process). For example, the administrator can process batch enrollment requests (similar to those described herein) from one or more INDs 155 at a terminal, in his or her email or on his or her own mobile device (for example, IND 155 or EPD 100). As another embodiment example, the system can be configured so that an administrator may create a batch of enrollment invites that are sent to multiple INDs 155.

In some embodiments, the IND service agent 105 is configured so that a user of one or the one or more additional EPDs 100 can utilize a web browser or application to sign up for services with the assistance of the IND 155. In some embodiments, sign up assistance comprises providing a web server or application server on the IND 155 and processing a service sign up request. In some embodiments, sign up assistance comprises assisting in providing a limited access forwarding service over the WLAN 1900 through the IND 155 and over the WWAN 131 to connect the additional EPD 100 with a network server that provides the service offer. In some embodiments, the control of traffic for an individual (or each or a particular) EPD 100 that is required to provide individual EPD service plans is accomplished in some embodiments by provisioning WWAN/cellular forwarding service allowance policies in an IND forwarding agent. In another embodiment, the control of traffic for an individual EPD 100 that is required to provide individual EPD service plans is accomplished by maintaining separately identified traffic connections, paths or flows from each of the additional EPDs 100 through the IND 155 and/or to network elements that apply separate accounting policies and control policies to each of the separate separately identified traffic connections, paths or flows. Examples of this embodiment comprise assigning a separate data session, IP address, logical channel, user ID or password, network communication endpoint, APN or traffic tag to individual EPDs 100 and passing the separately identified communication connections, paths or flows through the IND 155 to the WWAN 131.

In some embodiments, the IND service agent 105 (for example, service processor 115) is configured to provide UI screens/displays/menus that allow a user of the IND 155 to control one or more of the EPDs 100 (for example, FIG. 96).

IND Cellular Usage Notification

In some embodiments, an IND agent 105 provides IND UI WWAN/cellular service usage notifications for forwarding services. In some embodiments, the one or more EPDs 100 may also get usage notifications via a server on the IND 155 or in the network. In some embodiments, the notifications are sent from the network to the IND 155 or a first EPD UI 101A. In some embodiments, the notifications are sent first device agent to the IND 155 or a first EPD UI 101A. In some embodiments, the notifications are sent from the network to a second EPD UI 101B. In some embodiments, the notifications are sent from the first device to a second EPD UI 101B. In some embodiments, the notifications are sent (by IND user) to one or more of: from first device (IND or EPD) to first device UI, from network to first device UI (may require first device to acquire IP addresses or otherwise individually pass traffic to the network so network can account for each device's traffic), from first device to second device UI (for example, inform second device what they are using, or tell second device what everyone is using), or from network to second device UI.

In some embodiments, IND usage may be viewed from a device UI 101 (IND UI 101 or EPD UI 101A, 101B), for example, as shown in FIG. 97. In some embodiments, IND associated usage is presented on an IND UI 101 (for example, based on a web server UI). In some embodiments, the IND 155 synchronizes device usage accounting/monitoring with the cloud. In some embodiments, the IND 155 retrieves the IND usage from the cloud. In some embodiments, IND associated usage of multiple devices may be presented, for example, by device credential or by device name. In some embodiments, the notification comprises a pop-up notification via the IND screen at a certain level of usage or when additional service purchase is required. In some embodiments, the notification comprises a pop-up notification via browser window intercept at a certain level of usage or when additional service purchase is required. In some embodiments, the notification comprises a pop notification via EPD client at a certain level of usage or when additional service purchase is required.

IND Ambient Services

As described above, in some embodiments an ambient service connection may be configured with the assistance of the IND service agent 105, the WWAN system, or both to provide a connection to the network servers required to sign up (or alternatively or in addition to provide software updates, network information updates, management, control, etc.) for IND services when there is no WWAN service plan in place. In addition, service policies provisioned on the IND service agent 105 (for example, service processor 115) in the network elements (for example, gateways, OCS, PCRF) or both can provide for sponsored IND services to the one or more additional EPDs 100. In some embodiments, sponsored IND access comprises one or more of: sponsored connections to websites (for example, shopping, maps/directions, emergency, search), sponsored connections for apps (for example, maps/directions, shopping, search, limited email with no downloads), sponsored try before buy offers with instant buy-up. In some embodiments, sponsored IND access comprises commercial (or business/enterprise) use for an IND 155 that includes a service offer when the user desires to go beyond commercial use (for example, enterprise split billing may be provided). In some embodiments, sponsored IND access is assisted by sponsored connections via a client on the IND 155, sponsored connections via a client on an EPD 100, or sponsored connections via DPI or proxy server in the network. In some embodiments, a sponsored connection is based on good customer feedback/reward points that reduce the IND service bill or is provided for purchases/transactions. In some embodiments, sponsored access is provided based on getting additional EPD users to sign up or obtain/upgrade service through the IND 155. In some embodiments, a sponsored connection is provided based on ad viewing or user feedback. Use of an EPD may reward/pay an owner/manager of the IND 155 for access.

In some embodiments, sponsored IND access/connections may include one or more of sponsored search, email, limited email, social, reduced resolution/content surfing, reduced resolution photos/video/music, etc. In some embodiments, sponsored IND access/connections may include revenue sharing with sponsored partners (for example, purchase/ad partners). In some embodiments, sponsored IND access/connections may include sponsored service to M2M EPDs (for example, utility meters, appliances, cars/vehicles, etc.). In some embodiments, sponsored IND service is for assisting sign up. In some embodiments, sponsored IND service is part of a content provider service package. In some embodiments, sponsored IND service is part of a car package (for example, to provide/report diagnostics or to provide ads or suggest car service or for location based ads, etc.).

Securing the IND Policy Agent

In some embodiments, the IND policy agent is responsible for assisting in implementing WWAN/cellular communication allowance policies and/or WWAN/cellular accounting policies. In such embodiments, it may be desirable to create embodiments that make it difficult to tamper with or hack the IND 155 or the IND service agent 105 so that service policies are properly implemented. In some embodiments, it is important to determine when tampering or hacking has occurred so that a corrective action may be taken to prevent use of services that are outside of allowed policies.

In some embodiments, to protect against hacking, each (or a subset of) IND can have its own communication certificate with the network element with which it interfaces to provide IND services (for example, service controller 122, activation server, integrity server). In some embodiments, the network servers can track how many INDs log in with the same certificate. In this manner, if a given IND is hacked so that the certificate is known, multiple copies of the hacked code cannot be used because as soon as multiple INDs log in with the same certificate they may be recognized as hacked or tampered with, thus preventing/reducing a mass hack. In some embodiments, if an IND is determined to be hacked, then its certificate may be disallowed and the device credentials associated with the certificate can be disallowed from the WWAN authentication system so that the IND cannot get access or can be provided with only quarantine state access.

In some embodiments, wherein the IND service agent 105 (for example, service processor 115) is responsible for a WWAN access control policy or a WWAN accounting policy, a network measure of WWAN 131 use can be utilized to ensure that the IND 155 is properly implementing policy. For example, if the IND 155 is initially configured with a WWAN communication accounting policy, and the IND 155 is hacked and does not properly report cellular communication accounting, a network based measure of cellular communication received on a delayed feed can be compared in the network elements (for example, service controller 122 or policy integrity server) with the IND reported accounting to see if they match within expected tolerances, and if they do not match then an action may be taken. In a further example, if the IND 155 is initially configured with a WWAN communication control policy (for example, a limit on an amount of communication or a time communication is allowed), and the IND 155 is hacked and does not properly implement the communication control policy, a network based measure of cellular communication received on a delayed feed can be compared in the network elements (for example, service controller 122 or policy integrity server) with an expected accounting of communication that would result if the communication control policy were properly implemented, and if there is an inconsistency between the actual cellular communication use and what should be used if the control policy were properly implemented (for example, usage beyond a communication limit policy), then an action can be taken. In some embodiments, the action is to place the IND 155 on a different service rating plan, such as a more expensive or "pay as you go" rate plan, and, in some embodiments, the service user agreement can specify that this is what will happen if the user hacks the device or if the device becomes defective. In other embodiments, the action can comprise denying service to the device or quarantining the device. IND reported accounting to see if they match within expected tolerances, and if they do not match then an action may be taken.

IND Service Design

In some embodiments, a service design center (for example, SDC 135 or SDC sandbox 1355) may be employed to design or configure IND services. In some embodiments, the SDC 135 may be utilized to design or configure one or more of: service plan offers that appear on an IND UI 101 or via web browser on EPD 100, configure notifications for an IND user, configure and provision notifications for an IND service manager, configure and provision notifications for an EPD 100, or configure limits for all of the above. In some embodiments, the SDC 135 may be utilized to design or configure one or more of: a number of devices, an IND web server page, an IND sponsored service for sign up, other IND sponsored services, an IND client for an EPD 100, IND roaming controls, configure and manage fail-over for enterprise applications, a rate limit for enterprise applications, security, an EPD 100 or IND 155 log-in or sign-up display/menu/screen.

Figure 101:
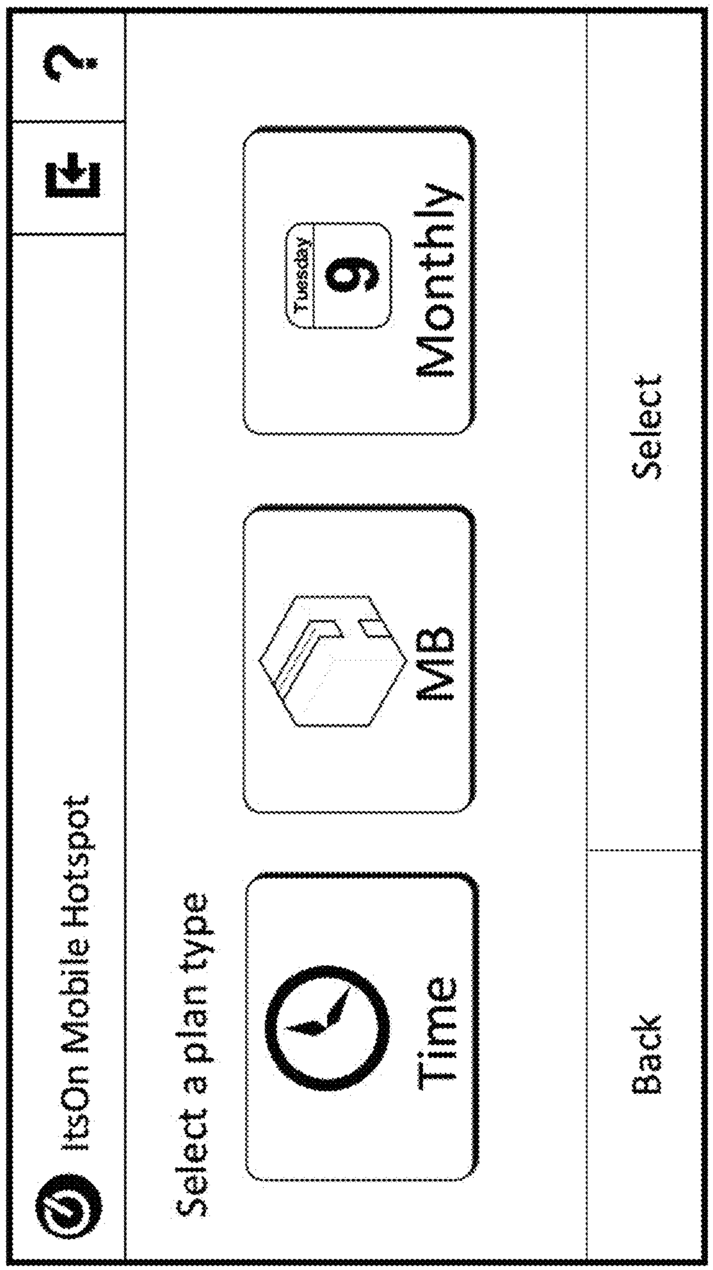
FIG. 101 illustrates a representative screen that presents to the user of the intermediate networking device, through the user interface, a selection of intermediate networking service plan types in accordance with some embodiments.

FIG. 101 illustrates a representative screen 1680 that presents to the user of the intermediate networking device 155, through the user interface 101, a selection of intermediate networking service plan types in accordance with some embodiments. In the representative screen 1680 of FIG. 101, the user is presented with the option to select a service plan providing intermediate networking services for a specified time period (for example, an hour, day, week, or month), allowance for a specified amount of data (for example, 5 MB, 300 MB, or 2 GB), or a monthly plan that allows for a certain amount of service usage per month and automatically charges the user from month to month until the plan is cancelled. In some embodiments, the intermediate networking device may present intermediate networking service offers to the user in response to user inputs or upon detecting a condition (e.g., a predetermined amount of service usage, usage of a particular application, roaming onto another network, etc.).

Figure 102:
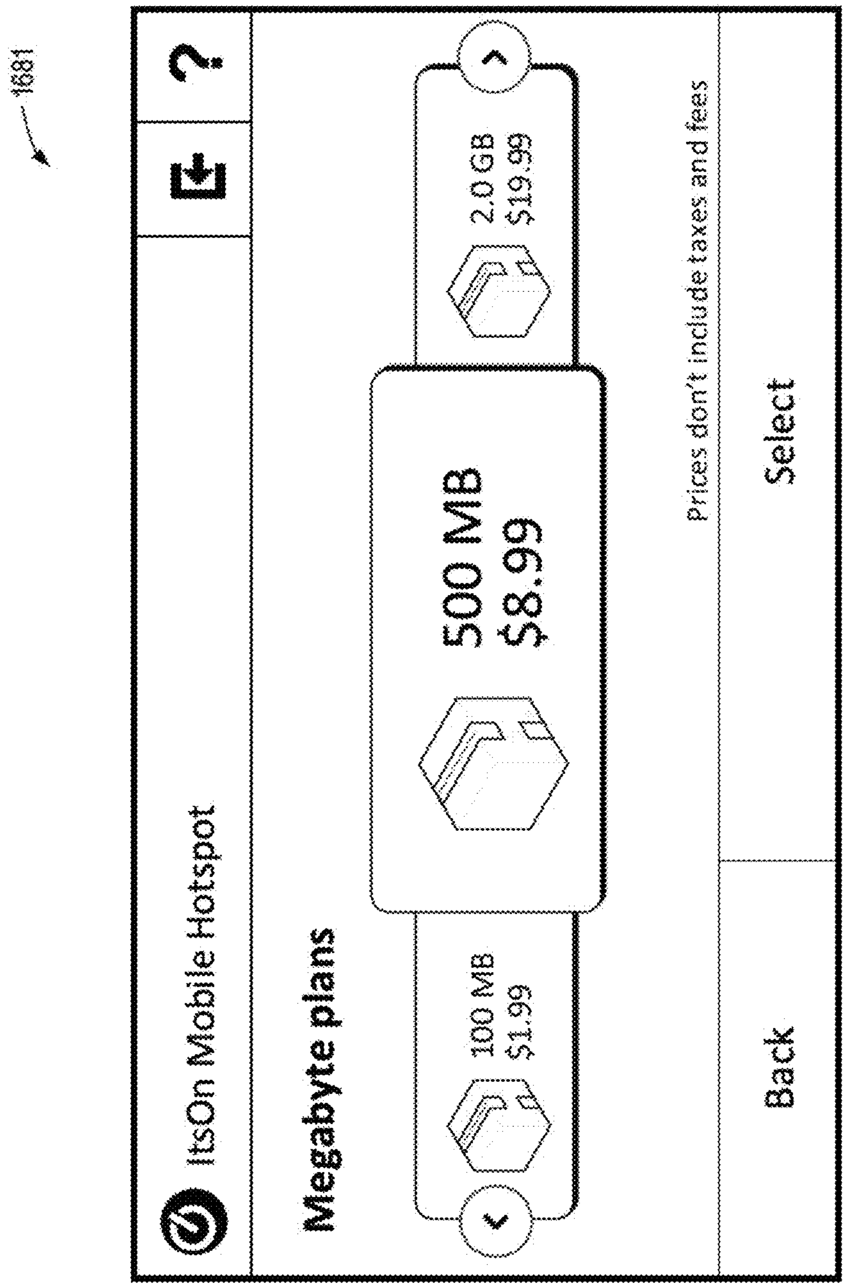
FIG. 102 illustrates a representative screen that presents to the user of the intermediate networking device, through the user interface, a selection of plans providing intermediate networking services with specified amounts of service usage data in accordance with some embodiments.

In some embodiments, intermediate networking service plans may be limited by the amount of data service usage the user is allowed to use. FIG. 102 illustrates a representative screen 1681 that presents to the user of the intermediate networking device 155, through the user interface 101, a selection of plans providing intermediate networking services with specified amounts of service usage data in accordance with some embodiments. In the representative screen 1681 in FIG. 102, the user is presented with three options for plans based on an allocation of service usage data: 100 MB of service usage for $1.99, 500 MB of service for $8.99, or 2.0 GB for $19.99. In some embodiments, data-allocated service plans such as the ones presented in the representative screen 1681 are limited by a predetermined amount of time (e.g., one week, one month, one year, etc.) after which any remaining service usage data allocated that the user has not yet consumed expires. In other embodiments, such data-allocated service plans are not limited by any predetermined amount of time, and the user may continue to make use of the intermediate networking services as long as the intermediate networking device 155 has not yet consumed the predetermined amount of service usage data.

In some embodiments, when the user has reached the limit of service usage data for a data-allocated intermediate networking service plan, the user may be presented with an "upsell" service offer, wherein a notification is displayed on the user interface 101 indicating that the data service usage limit has been reached, and the user is given the option of purchasing additional usage or signing up for another intermediate networking service plan in order to continue use of intermediate networking services.

In some embodiments, where the data-allocated service plan is limited by a predetermined amount of time, any remaining amount of service usage not yet used by the end of the predetermined amount of time may "roll over" to the next period of time. For example, where a user has selected a service plan that allows for 300 MB of intermediate networking services that may expire after a period of one month, if at the end of the month the user has only used 150 MB of intermediate networking services, the user may have the option of "rolling over" the unused 150 MB into the next month of the user's service plan, allowing the user to use up to 450 MB of service usage in the following month. In some embodiments, the user may be presented with the option to "opt-in" to such a rollover option on a data-allocated service usage plan. In other embodiments, such data-allocated service usage plans may come with a rollover option enabled by default, and the user may be presented with the option to "opt-out" of the rollover option.

Figure 103:
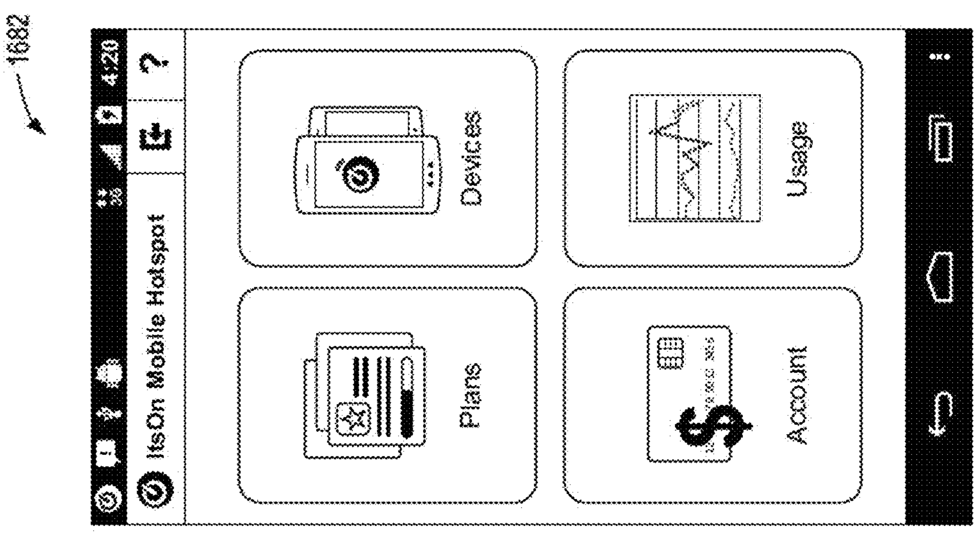
FIG. 103 illustrates a representative "Home" screen that can be presented to the user through the user interface of the intermediate networking device in accordance with some embodiments.

FIG. 103 illustrates a representative "Home" screen 1682 that can be presented to the user through the user interface 101 of the intermediate networking device 155 in accordance with some embodiments.

Figure 104:
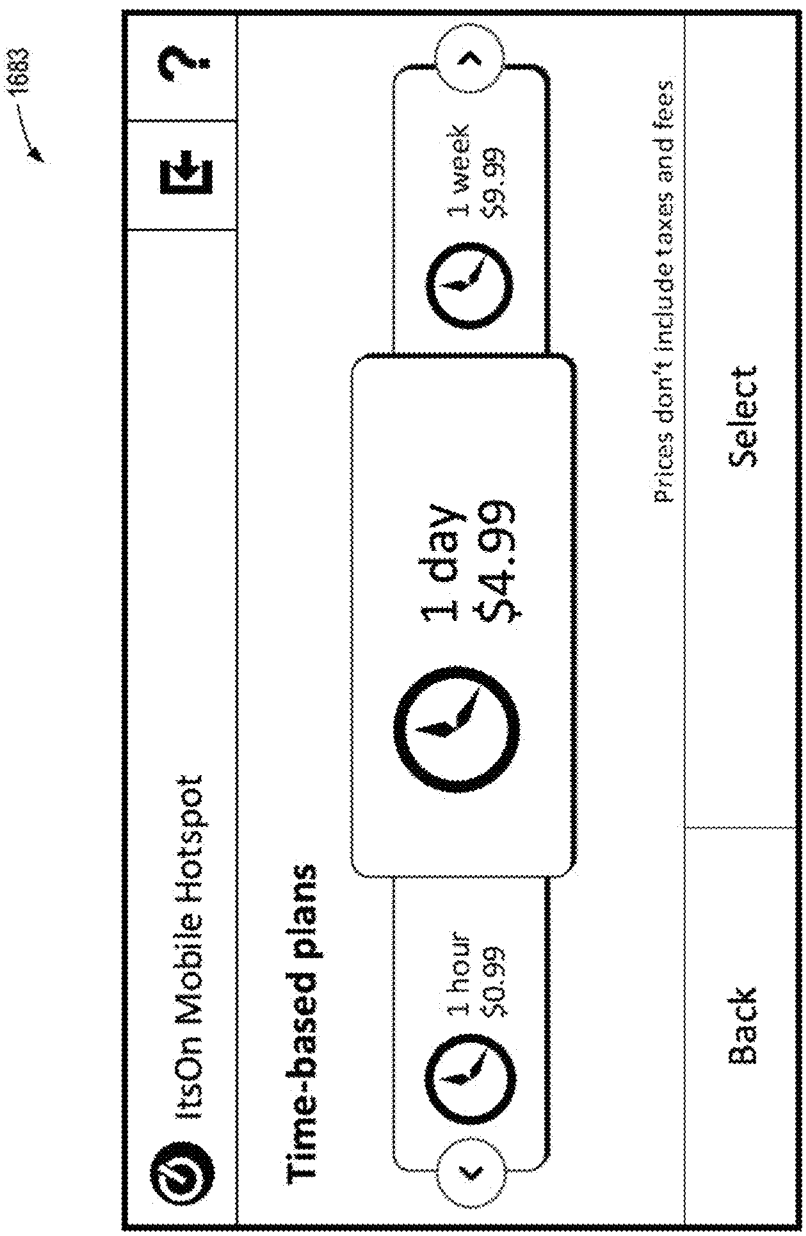
FIG. 104 illustrates a representative screen that presents to the user of the intermediate networking device, through the user interface, a selection of plans providing intermediate networking services for specified amounts of service usage time in accordance with some embodiments.

In some embodiments, intermediate networking service plans may be limited by a specified amount of time. FIG. 104 illustrates a representative screen that presents to the user of the intermediate networking device 155, through the user interface 101, a selection of plans providing intermediate networking services for specified amounts of service usage time in accordance with some embodiments. In the representative screen 1683 illustrated in FIG. 104, the user is presented with three options for time-based intermediate networking service plans: 1 hour of intermediate networking service usage for $0.99, one day of intermediate networking service usage for $4.99, and one week of intermediate networking service usage for $9.99. In some embodiments, such time-based service plans are not limited by an amount of service usage data. Such time-based service plans are advantageous to users in circumstances when services are needed for a known period of time, but the specific amount of service usage needed is not known.

In some embodiments, when the user has reached the end of the time period for a time-based intermediate networking service plan, the user may be presented with an "upsell" service offer, wherein a notification is displayed on the user interface 101 indicating that the service plan time limit has been reached, and the user is given the option of purchasing additional usage or signing up for another intermediate networking service plan in order to continue use of intermediate networking services.

Figure 105:
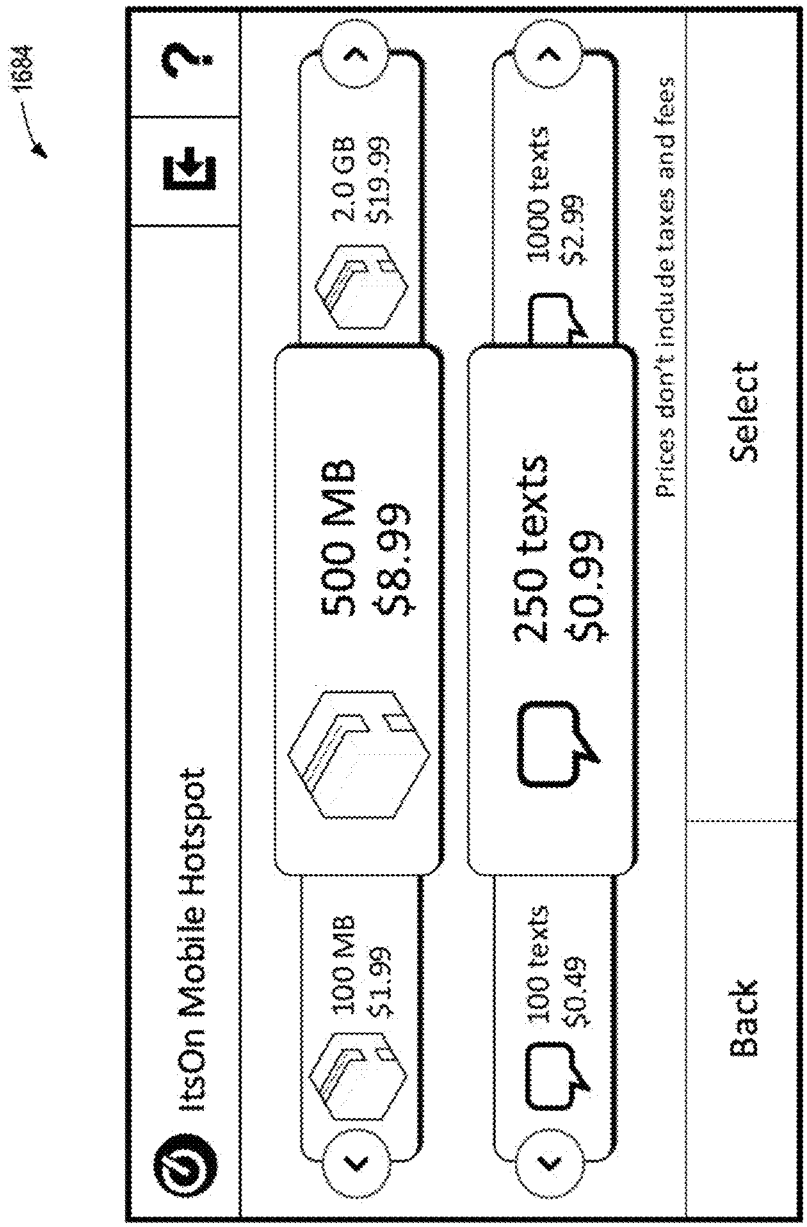
FIG. 105 illustrates a representative screen that presents, through the user interface of the mobile wireless communication device, an offer to bundle intermediate networking services and text messaging services in accordance with some embodiments.

In some embodiments, the intermediate networking device 155 may present the user with offers for service plan "bundles," wherein one plan provides for multiple services (e.g., SMS text messaging and intermediate networking service usage). In some embodiments, the user may select each of the component services of the service plan bundle. FIG. 105 illustrates a representative screen 1684 that presents, through the user interface 101 of the mobile wireless communication device, an offer to bundle intermediate networking services and text messaging services in accordance with some embodiments. In some embodiments, such service plan bundles may include one or more of: voice plans, data plans, SMS/MMS messaging plans, data plans for specified applications, application types, or application categories, network destinations, content types or any other classification of service.

Figure 106A:
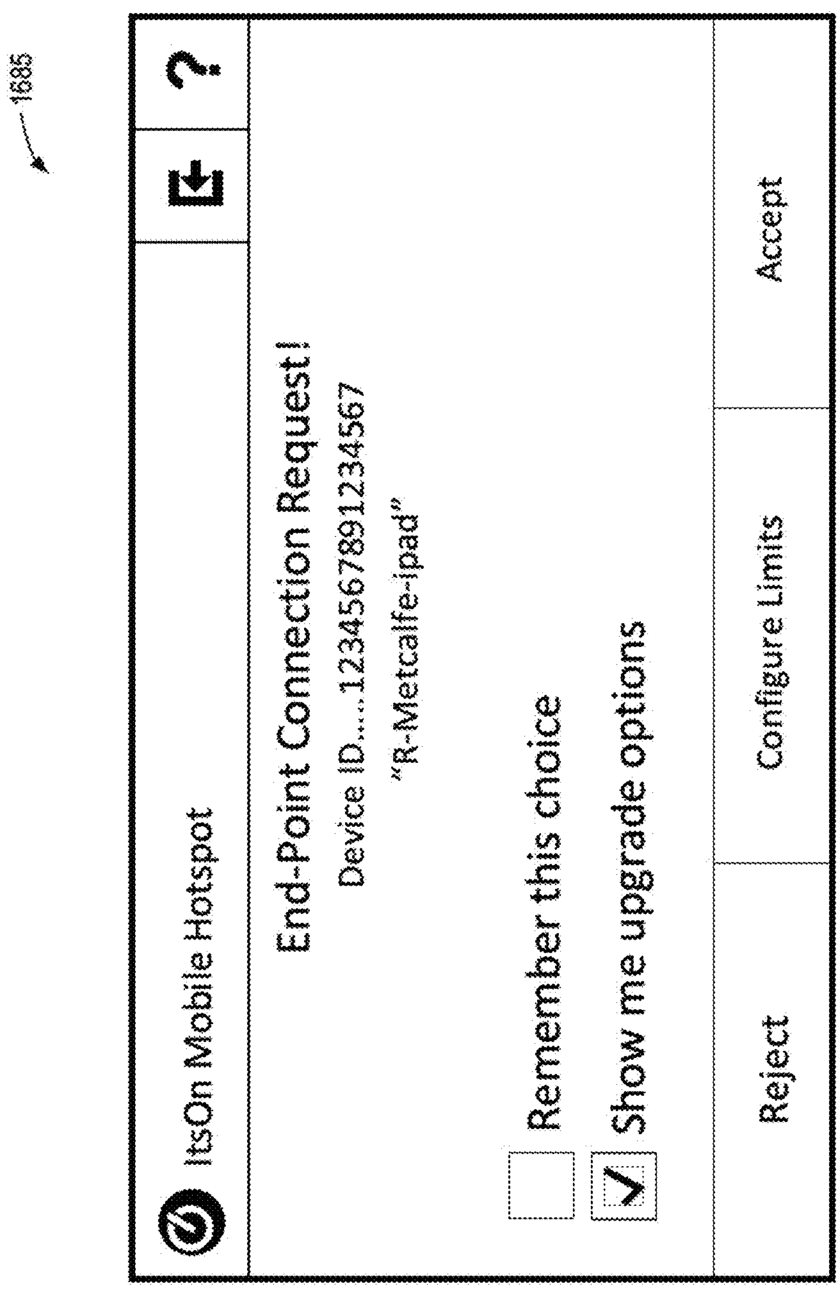
FIGS. 106A and 106B illustrate representative screens that present, through the user interface of the intermediate networking device, information and options that may be presented to the user when an end-point device requests a connection with the intermediate networking device in accordance with some embodiments.
Figure 106B:
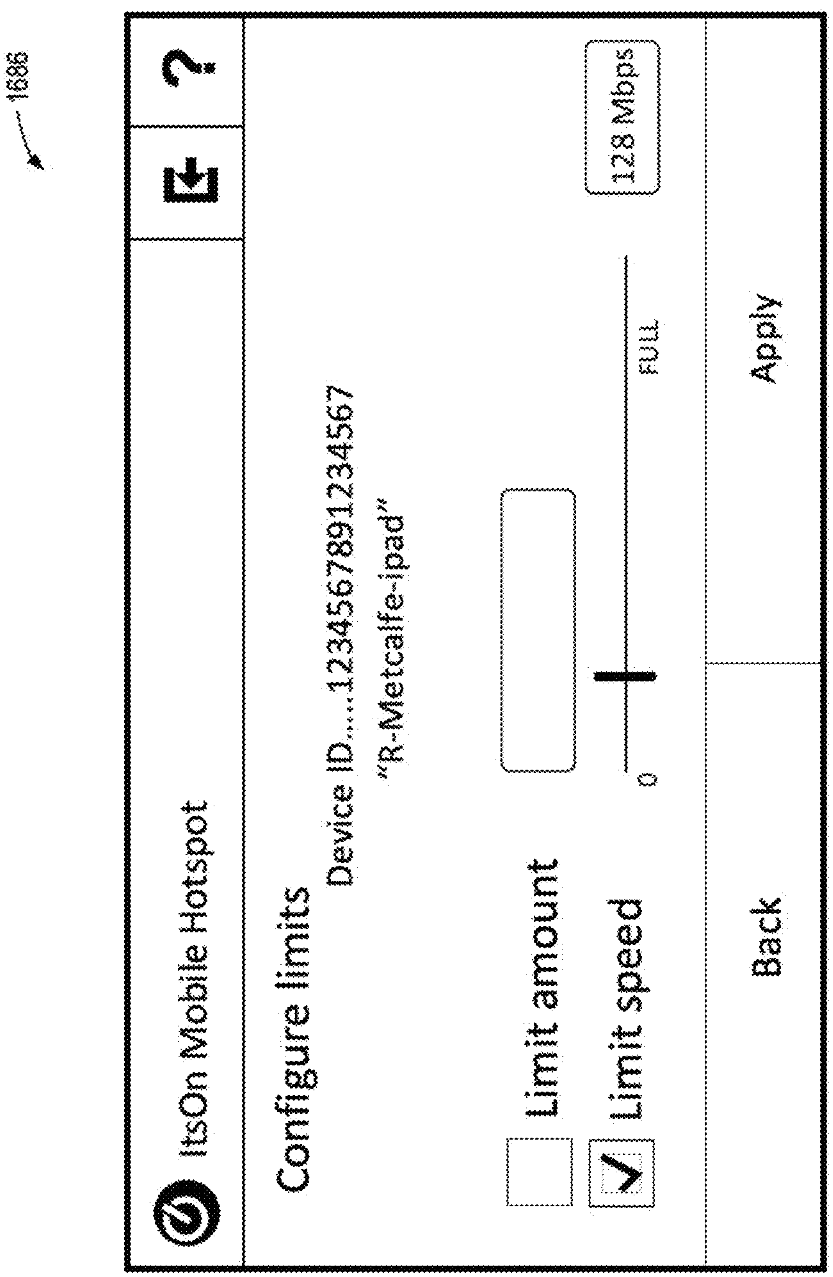

In some embodiments, the intermediate networking device 155 may, via the user interface 101, allow the user to allow or deny a particular end-point device 100 to connect to the intermediate networking device 155, and also to manage permissions and allowances for all connected end-point devices 100. FIG. 106A illustrates a representative screen 1685 that presents, through the user interface 101 of the intermediate networking device 155, a notification that a particular end-point device 100 has requested a connection to the intermediate networking device 155 in accordance with some embodiments. In the representative screen of 1685, the user is notified of the requesting end-point device's identification and name, and is further presented with the option to reject the connection, accept the connection, or configure limits for the connection. In some embodiments, different screens or notifications may be presented to the user when a known device attempts to connect and when a new device attempts to connect. In some embodiments, a notification may be presented to the user when the maximum number of connected end-point devices 100 is exceeded. FIG. 106B illustrates a representative screen 1686 that presents, through the user interface 101 of the intermediate networking device 155, options to configure service usage limits on a particular connected end-point device 100 according to some embodiments. In the representative screen of 1686, the user is presented with the option of limiting the amount of service usage data the end-point device 100 may use, and/or limiting the speed of the connection between the end-point device 100 and the intermediate networking device 155.

Figure 107:
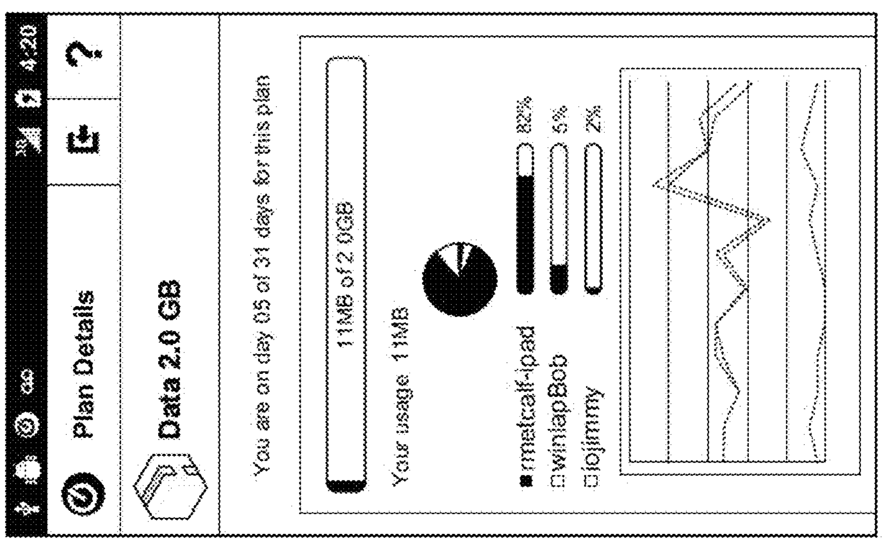
FIG. 107 illustrates a representative screen that presents to the user of the intermediate networking device, through the user interface, a summary of the service usage of the intermediate networking device service plan, specifying the amount of service usage consumed by particular end-point devices in accordance with some embodiments.

In some embodiments, the intermediate networking device 155 may present the user with a summary of the aggregate service usage consumed by connected end-point devices 100. In some embodiments, this measurement may be synchronized from the network, measured directly from the device, or measured on the device in-between network synchronizations. In some embodiments, the intermediate networking device 155 may present the user with the service usage of each individual end-point device 100. In some embodiments, this measurement may be measured on the intermediate networking device 155 or in the network via end-point device address/credential. In some embodiments, the intermediate networking device 155 may display real-time information for current end-point device usage. In some embodiments, the intermediate networking device 155 may show information regarding different types of usage, e.g., 3G/2G usage vs. 4G usage, home usage vs. roaming usage, etc. FIG. 107 illustrates a representative screen 1687 that presents to the user of the intermediate networking device 155, through the user interface 101, a summary of the service usage of the intermediate networking device service plan, specifying the amount of service usage consumed by particular end-point devices 100 in accordance with some embodiments. In the representative screen 1687, the user is presented with the total amount of service usage consumed by all devices during the current plan period, as well as the amount of service usage consumed by each particular end-point device 100. This usage data may be presented in a variety of ways, such as a pie chart, bar graph, and line graph, as in screen 1687. In some embodiments, the intermediate networking device 155 may present, through the user interface 101, an alert when the allocated service usage data for the current plan is almost exhausted, or when a time-based service plan is nearing expiration. In some embodiments, the user interface 101 may also present offers for services or services plans that may be partially or fully sponsored by a third party, also known as "marketing interceptors."

Figure 108:
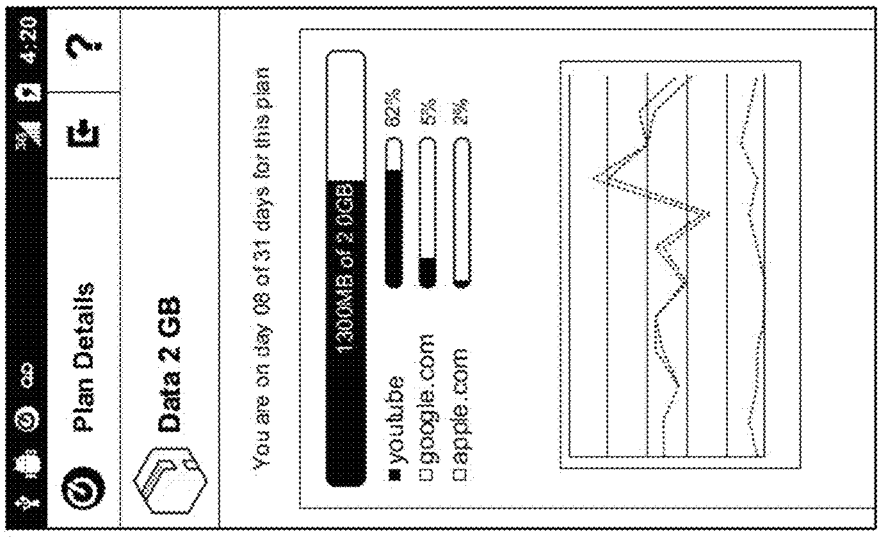
FIG. 108 illustrates a representative screen that presents to the user of the intermediate networking device, through the user interface, a summary of the service usage of the intermediate networking device service plan, specifying the amount of service usage consumed from particular web addresses in accordance with some embodiments.

FIG. 108 illustrates a representative screen 1688 that presents to the user of the intermediate networking device 155, through the user interface 101, a summary of the service usage of the intermediate networking device service plan, specifying the amount of service usage consumed accessing particular web addresses or applications in accordance with some embodiments. In the representative screen 1688, the user is presented with the total amount of service usage consumed during the current plan period, as well as the amount of service usage consumed for each Internet destination or application. This usage data may be presented in a variety of ways, such as a pie chart, bar graph, and line graph, as in screen 1688. In some embodiments, service usage data may also be classified according to the type of content accessed (e.g., streaming video, streaming audio, web access, email, etc.). In some embodiments, the intermediate networking device 155 may make such visibility into end-point device usage a precondition to connecting to the intermediate networking device 155.

In some embodiments, the user of the intermediate networking device may control connected end-point device usage. For example, the user may set a limit on the aggregate usage by all connected end-point devices 100, set a limit on the service usage of individual end-point devices 100, and/or set a limit on the number of end-point devices 100 that may simultaneously connect to the intermediate networking service. In some embodiments, the user may set restrictions on the destinations or types of content that connected end-point devices 100 may access. For example, the user may add certain Internet destinations (e.g., www.google.com, www.apple.com, etc.) or applications (e.g., Facebook, Google Maps) to a "white list" that end-point devices 100 will always be allowed to access, and the user may add other Internet destinations or applications to a "black list" that end-point devices 100 will not be permitted to access. In some embodiments, certain network destinations may be sponsored by a third-party, allowing connected end-point devices 100 to access such destinations free of charge or at a reduced rate. In some embodiments, the user of the intermediate networking device 155 may also have the option of disconnecting one or more connected end-point devices 100, for example, to prevent one end-point device from using too much data. In some embodiments, the user may establish usage level warnings for individual end-point devices 100. In some embodiments, the user may establish fair queuing to prevent one end-point device from using a disproportionate amount of data. In some embodiments, the user may establish different priorities for specific end-point devices 100. In some embodiments, the user may enable or disable a QoS access level for different end-point devices 100. In some embodiments, the intermediate networking device 155 may be managed by a sandbox 1355 (e.g., on a website, on another device, or by a corporate IT manager via web service with secure login to manage a device group).

Figure 109:
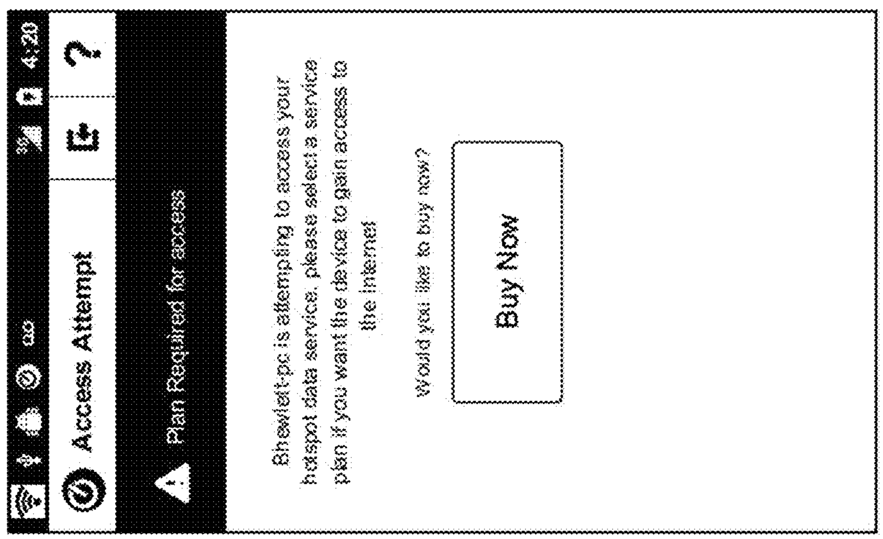
FIG. 109 illustrates a representative screen displayed through the user interface of the intermediate networking device when an end-point device attempts to access intermediate networking services through the intermediate networking device and an intermediate networking service plan has not been selected for the intermediate networking device in accordance with some embodiments.

In some embodiments, the intermediate networking device 155 may, through the user interface 101, present the user with an offer to purchase or select an intermediate networking service or service plan. FIG. 109 illustrates a representative screen 1689 displayed through the user interface 101 of the intermediate networking device 155 when an end-point device 100 attempts to access intermediate networking services through the intermediate networking device 155, and an intermediate networking service plan has not been selected for the intermediate networking device 155 in accordance with some embodiments. In the representative screen of 1689, the user is notified of the specific end-point device 100 attempting to establish a connection with the intermediate networking device 155, and the user is presented with the option to purchase an intermediate networking service or service plan. In some embodiments, the option to purchase an intermediate networking service or service plan may be presented to the user when the intermediate networking device's "hotspot" capability is activated. In some embodiments, an offer to purchase an intermediate networking service or service plan may be presented to the user when a time-based service plan is nearing expiration, or when a service usage-based plan is nearly exhausted or projected to be exhausted. In some embodiments, the intermediate networking device 155 may analyze the user's usage and/or purchases and/or purchase history, and, as a result, present the user with an option to purchase an alternative service plan better suited to the user's usage habits. In some embodiments, where the intermediate networking device 155 is within range of another compatible wireless access network, the user may be presented, through the user interface 101, with an offer to purchase a roaming service plan. In some embodiments, where the intermediate networking service plan limits the number of end-point devices 100 that may connect to the intermediate networking device 155, the user may be presented with an offer to purchase an alternative service plan with an increased maximum device count limit when the intermediate networking device 155 is connected with the maximum number of devices allowed and another end-point device 100 requests a connection.

In some embodiments, alternatively or in addition to the management, notifications, marketing interceptors, service offers/plans for presentation at an IND UI 101 or EPD UI 101 (or the SDC UI 1350 or SDC sandbox UI 1355) as shown in the examples of FIGS. 103 to 109, and the examples of IND UI 101 in FIG. 96 and FIG. 97 (or equivalent EPD UI 101 presentations not shown), many other embodiments of UI presentations (for example, assisted by one or more of screens, touchscreens, menus, settings selection, apps, web pages, visual UI, audio UI, keyboard UI, microphone/speaker, etc.) may be advantageous for an IND system.

Sponsored IND Services

In some embodiments, a basic connection that allows an end-point device user to sign up, select a service plan, determine usage, manage service, etc. is sponsored by a third-party. In some embodiments, a certain amount of service usage (e.g., 100 MB) may come with the intermediate networking device 155 or sponsored service, presenting the user with a "try before buy" offer. In some embodiments, a user is required to sign up for an account or join an existing account with the service provider prior to using intermediate networking services. In some embodiments, a user may use the intermediate networking services prior to signing up for an account or joining an existing account, and instead will be presented with an offer to purchase a service plan when the initial amount of service usage has been exhausted. In some embodiments, the initial amount of service usage may be limited to a period of time, a total amount of service usage, or a total amount of service usage per first period of time or second period of time.

In some embodiments, certain websites and application services may be available as basic sponsored services paid for by a service provider. In some embodiments, certain websites and application services may be available from sponsored partners. In some embodiments, the intermediate networking device 155 may have accounting systems in place for all such sponsored services. In some embodiments, interceptors are presented to make the user of the intermediate networking device 155 aware of the sponsored service capabilities. In some embodiments, interceptors also notify the end-point device user, for example, via web browser or downloaded service processor 115. In some embodiments, the interceptor may "pop up" when the user attempts use that exceeds sponsored permissions.

In some embodiments, the end-point device user may sign up for intermediate networking service via a web browser on the end-point device 100. In some embodiments, the intermediate networking device 155 provides the end-point device 100 with sponsored access to the sign-up website and directs all web traffic to that website. In some embodiments, the intermediate networking device 155 provides an on-device web server to facilitate end-point user signup via web browser.

In some embodiments, the user of the intermediate networking device 155 may have the option of allowing their intermediate networking device 155 to provide service to end-point user devices 100. In some embodiments, the intermediate networking device user receives a benefit (e.g., a credit to the user's account, additional service usage, etc.) when end-point device users use the intermediate networking device to sign up for a new account or use data services. In some embodiments, the intermediate networking device 155 manages permissions and controls for additional end-point device users. In some embodiments, the intermediate networking device 155 cooperates with the access network to manage permissions and controls for additional end-point device users. In some embodiments, the access network manages permissions and controls for additional end-point device users.

In some embodiments, a service processor application (e.g., to allow finer grain control of end-point device services) is present on the end-point device 100. In some embodiments, the service processor application is downloaded from a website. In some embodiments, the service processor application is downloaded from an application server on the intermediate networking device 155.

In some embodiments, a subscriber can avail himself or herself of a multi-carrier sign-up (i.e., select a service provider or carrier) for an IND "out-of-box" experience enabling initial sign-up or on-going sign-up (e.g., renewal of a plan upon expiration).

Multi-Radio Intermediate Networking Devices

In some embodiments, an intermediate networking device 155 may be multi-mode to have the ability to sign up to different types of networks (e.g., CDMA/HSPA, 3G/4G, etc.). In some embodiments, a multi-mode intermediate networking device 155 may evaluate available networks and select the best available network. In some embodiments, the intermediate networking device 155 may be associated with a multi-service provider account. In some embodiments, the intermediate networking device 155 may have multiple modems that allow the device to set up multiple channel (i.e., higher bandwidth) intermediate networking service plans. In some embodiments, the user of the intermediate networking device 155 may purchase or select the option to enable a multi-channel connection.

Enterprise Router Configuration

In some embodiments, the intermediate networking device 155 is managed by a service device center 135 (SDC). In some embodiments, the intermediate networking device 155 may be used as an instant networking device. In some embodiments, the intermediate networking device 155 may be configured to automatically begin providing intermediate networking services in the event that a wired network becomes inoperable. In some embodiments, multiple modems on the same account may be in the same router. In some embodiments, usage level warnings may be set up for individual end-point devices 100 (e.g., to limit usage to home networks, to particular geographic locations, to a particular rate of use, or to particular types of use (e.g., websites, applications, streaming, etc.)). In some embodiments, permissions specific to a particular intermediate networking device 155 may also be established (e.g., to limit usage to home networks, to particular geographic locations, to a particular rate of use, or to particular types of use (e.g., websites, applications, streaming, etc.)). In some embodiments, notification levels for an intermediate networking device 155 may be preconfigured. In some embodiments, the notification levels may be configured by the SDC administrator. In some embodiments, the notification levels may be configured by the intermediate networking device user.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference for all purposes the following non-provisional U.S. patent applications: U.S. application Ser. No. 12/380,780, filed Mar. 2, 2009, entitled AUTOMATED DEVICE PROVISIONING AND ACTIVATION; U.S. application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); U.S. application Ser. No. 12/695,020, filed Jan. 27, 2010, entitled ADAPTIVE AMBIENT SERVICES, now U.S. Pat. No. 8,406,748 (issued Mar. 26, 2013); U.S. application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); U.S. application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); U.S. application Ser. No. 12/694,455, filed Jan. 27, 2010, entitled DEVICE ASSISTED SERVICES INSTALL, now U.S. Pat. No. 8,402,111 (issued Mar. 19, 2013); U.S. application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); U.S. application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); U.S. application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); U.S. application Ser. No. 13/229,580, filed Sep. 9, 2011, entitled WIRELESS NETWORK SERVICE INTERFACES; U.S. application Ser. No. 13/237,827, filed Sep. 20, 2011, entitled ADAPTING NETWORK POLICIES BASED ON DEVICE SERVICE PROCESSOR CONFIGURATION; U.S. application Ser. No. 13/253,013, filed Oct. 4, 2011, entitled SYSTEM AND METHOD FOR PROVIDING USER NOTIFICATIONS; U.S. application Ser. No. 13/239,321, filed Sep. 21, 2011, entitled SERVICE OFFER SET PUBLISHING TO DEVICE AGENT WITH ON-DEVICE SERVICE SELECTION; U.S. application Ser. No. 13/248,028, filed Sep. 28, 2011, entitled ENTERPRISE ACCESS CONTROL AND ACCOUNTING ALLOCATION FOR ACCESS NETWORKS; U.S. application Ser. No. 13/247,998, filed Sep. 28, 2011, entitled SECURE DEVICE DATA RECORDS; U.S. application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK; U.S. application Ser. No. 13/309,463, , filed Dec. 1, 2011, entitled SECURITY, FRAUD DETECTION, AND FRAUD MITIGATION IN DEVICE-ASSISTED SERVICES SYSTEMS; U.S. application Ser. No. 13/248,025, filed Sep. 28, 2011, entitled SERVICE DESIGN CENTER FOR DEVICE ASSISTED SERVICES; and U.S. application Ser. No. 13/374,959, filed Jan. 24, 2012, entitled FLOW TAGGING FOR SERVICE POLICY IMPLEMENTATION; U.S. application Ser. No. 13/441,821, filed Apr. 6, 2012, entitled MANAGING SERVICE USER DISCOVERY AND SERVICE LAUNCH OBJECT PLACEMENT ON A DEVICE; U.S. application Ser. No. 13/134,005, filed May 25, 2011, entitled SYSTEM AND METHOD FOR WIRELESS NETWORK OFFLOADING; U.S. application Ser. No. 13/802,483, filed Mar. 13, 2013, entitled MOBILE DEVICE ACTIVATION VIA DYNAMICALLY SELECTED ACCESS NETWORK; U.S. application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT; U.S. application Ser. No. 13/842,172, filed Mar. 15, 2013, entitled NETWORK SERVICE PLAN DESIGN; U.S. application Ser. No. 13/947,099, filed Jul. 21, 2013, entitled VIRTUALIZED POLICY & CHARGING SYSTEM; U.S. application Ser. No. 14/083,324, filed Nov. 18, 2013, entitled SERVICE PROCESSOR CONFIGURATIONS FOR ENHANCING OR AUGMENTING SYSTEM SOFTWARE OF A MOBILE COMMUNICATIONS DEVICE; and U.S. application Ser. No. 14/098,523, filed Dec. 5, 2013, entitled INTERMEDIATE NETWORKING DEVICES.

This application incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4, 2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; and U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; and U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; U.S. Provisional Application No. 61/252,153, filed Oct. 15, 2009, entitled DEVICE GROUP PARTITIONS AND SETTLEMENT PLATFORM; U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY; U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed September 28, entitled SECURED DEVICE DATA RECORDS, 2010; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PROVIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; U.S. Provisional Application No. 61/472,606, filed Apr. 6, 2011, entitled MANAGING SERVICE USER DISCOVERY AND SERVICE LAUNCH OBJECT PLACEMENT ON A DEVICE; U.S. Provisional Application No. 61/550,906, filed Oct. 24, 2011, entitled SECURITY FOR DEVICE-ASSISTED SERVICES; U.S. Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; U.S. Provisional Application No. 61/610,876, filed Mar. 14, 2012, entitled METHODS AND APPARATUS FOR APPLICATION PROMOTION AND SPONSORSHIP; U.S. Provisional Application No. 61/610,910, filed Mar. 14, 2012, entitled WIFI ACTIVATION BACKUP PROCESS; U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; U.S. Provisional Application No. 61/674,331, filed Jul. 21, 2012, entitled SERVICE CONTROLLER FOR MANAGING CLOUD-BASED POLICY; U.S. Provisional Application No. 61/724,267, filed Nov. 8, 2012, entitled FLEXIBLE SERVICE PLAN DESIGN, USER INTERFACE AND DEVICE MANAGEMENT; U.S. Provisional Application No. 61/724,837, filed Nov. 9, 2012, entitled SERVICE PLAN DISCOVERY, CUSTOMIZATION, AND MANAGEMENT; U.S. Provisional Application No. 61/724,974, filed Nov. 10, 2012, entitled SERVICE PLAN DISCOVERY, CUSTOMIZATION, AND MANAGEMENT; U.S. Provisional Application No. 61/732,249, filed Nov. 30, 2012, entitled APPLICATION PROGRAMMING INTERFACES FOR SMART SERVICES; U.S. Provisional Application No. 61/734,288, filed Dec. 6, 2012, entitled INTERMEDIATE NETWORKING DEVICE SERVICES; and U.S. Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; U.S. Provisional Application No. 61/756,332, filed Jan. 24, 2013, entitled MOBILE HOTSPOT; U.S. Provisional Application No. 61/758,964, filed Jan. 30, 2013, entitled MOBILE HOTSPOT; U.S. Provisional Application No. 61/765,978, filed Feb. 18, 2013, entitled ENHANCED CURFEW AND PROTECTION ASSOCIATED WITH A DEVICE GROUP; U.S. Provisional Application No. 61/785,988, filed Mar. 14, 2013, entitled AUTOMATED CREDENTIAL PORTING FOR MOBILE DEVICES; U.S. Provisional Application No. 61/794,116, filed Mar. 15, 2013, entitled ENHANCED INTERMEDIATE NETWORKING DEVICE; U.S. Provisional Application No. 61/792,765, filed Mar. 15, 2013, entitled DEVICE GROUP AND SERVICE PLAN MANAGEMENT; U.S. Provisional Application No. 61/793,894, filed Mar. 15, 2013, entitled SIMPLIFIED POLICY DESIGN, MANAGEMENT, AND IMPLEMENTATION; U.S. Provisional Application No. 61/799,710, filed Mar. 15, 2013, entitled AMBIENT OR SPONSORED SERVICES; U.S. Provisional Application No. 61/801,074, filed Mar. 15, 2013, entitled DEVICE GROUP AND SERVICE PLAN MANAGEMENT; and U.S. Provisional Application No. 61/822,850, filed May 13, 2013, entitled MOBILE DEVICE AND SERVICE MANAGEMENT.

What is claimed is:

1. A first wireless end-user device, comprising:

a wireless wide-area network (WWAN) modem to communicate Internet data over at least a first WWAN;

a wireless local area network (WLAN) modem to directly communicate Internet data with a plurality of other wireless end-user devices not in direct communication with the first WWAN;

a physical user interface; and a processor to execute one or more stored instructions that cause the processor to execute a plurality of interactive data applications via the physical user interface with a user of the first wireless end-user device, at least some of the interactive applications accessing Internet data over the at least a first WWAN via the WWAN modem;

determine whether a device forwarding policy, set by a network element within a network system associated with the first WWAN, allows the first wireless end-user device to forward Internet data between the first WWAN and the plurality of other wireless end-user devices connected to the first wireless end-user device via the WLAN modem, provide via the physical user interface, a forwarding controls interface to a user of the first wireless end-user device, to allow the user to specify and store on the first wireless end-user device, for second and third wireless end-user devices, respectively, second and third network usage controls applicable to connecting the second and third wireless end-user devices as ones of the plurality of other wireless end-user devices, based at least in part on determining that the device forwarding policy allows forwarding, apply the second network usage control to Internet data traffic forwarded by the first wireless end-user device between the first WWAN and the second wireless end-user device, at a first time when the first and second wireless end-user devices are directly connected via the WLAN modem, and based at least in part on determining that the device forwarding policy allows forwarding, apply the third network usage control to Internet data traffic forwarded by the first wireless end-user device between the first WWAN and the third wireless end-user device, at a second time when the first and third wireless end-user devices are directly connected via the WLAN modem.

* * * * *